(12) United States Patent
Hayata et al.

(10) Patent No.: US 12,724,130 B2
(45) Date of Patent: Sep. 1, 2026

(54) OPTICAL DEVICE, LIGHT APPLYING METHOD, AND SERVICE PROVIDING METHOD

(71) Applicant: Japan Cell Co., Ltd., Machida (JP)

(72) Inventors: Satoshi Hayata, Machida (JP); Hideo Ando, Machida (JP); Yuki Endo, Machida (JP); Sueo Ueno, Machida (JP); Yuta Hiraide, Machida (JP)

(73) Assignee: JAPAN CELL CO., LTD., Tokyo (JP)

( * ) Notice: Subject to any disclaimer, the term of this patent is extended or adjusted under 35 U.S.C. 154(b) by 0 days.

(21) Appl. No.: 19/094,267

(22) Filed: Mar. 28, 2025

(65) Prior Publication Data

US 2025/0224087 A1 Jul. 10, 2025

Related U.S. Application Data

(62) Division of application No. 18/588,330, filed on Feb. 27, 2024, now abandoned.

(30) Foreign Application Priority Data

Feb. 28, 2023 (JP) ................................ 2023-029741
Dec. 26, 2023 (JP) ................................ 2023-219945

(51) Int. Cl.
*G01S 7/4865* (2020.01)
*G01C 3/08* (2006.01)
(Continued)

(52) U.S. Cl.
CPC .............. *G01S 7/4865* (2013.01); *G01C 3/08* (2013.01); *G01N 21/359* (2013.01); *G01N 21/39* (2013.01);
(Continued)

(58) Field of Classification Search
CPC .................................................... G01S 7/4865
See application file for complete search history.

(56) References Cited

U.S. PATENT DOCUMENTS 5,804,451 A 9/1998 Wang et al.
6,169,634 B1 1/2001 Sirat
(Continued)

FOREIGN PATENT DOCUMENTS

CN 108717236 A 10/2018
JP S57-188165 U 11/1982
(Continued)

OTHER PUBLICATIONS

International Search Report and Written Opinion mailed on Nov. 1, 2022, received for PCT Application PCT/JP2022/031122, filed on Aug. 17, 2022, 9 pages including English Translation.
(Continued)

*Primary Examiner* — Keith G. Delahoussaye
(74) *Attorney, Agent, or Firm* — XSENSUS LLP

(57) ABSTRACT

A light source emits modulation light and irradiates a measured object with the modulation light, and a measurer receives modulated detection light obtained from the measured object. Charge is accumulated with respect to a relative exposure timing in the measurer according to the modulated detection light. Using a variation profile of charge accumulation values respectively relating to the relative exposure timings, a system controller calculates distance to the measured object.

9 Claims, 123 Drawing Sheets

(51) Int. Cl.

| | |
|---|---|
| *G01N 21/359* | (2014.01) |
| *G01N 21/39* | (2006.01) |
| *G01S 7/483* | (2006.01) |
| *G01S 7/484* | (2006.01) |
| *G01S 7/4861* | (2020.01) |

(52) U.S. Cl.

CPC ............ *G01S 7/484* (2013.01); *G01S 7/4861* (2013.01); *G01S 7/483* (2013.01)

(56) References Cited

U.S. PATENT DOCUMENTS

| | | | |
|---|---|---|---|
| 6,754,515 B1 | 6/2004 | Pologe | |
| 7,773,655 B2 | 8/2010 | Chuyanov et al. | |
| 7,978,312 B2 | 7/2011 | Scott et al. | |
| 10,660,523 B2 | 5/2020 | Ando et al. | |
| 10,918,284 B2 | 2/2021 | Ando et al. | |
| 2003/0117618 A1 | 6/2003 | Itoh et al. | |
| 2003/0181796 A1 | 9/2003 | Pologe | |
| 2007/0019909 A1 | 1/2007 | Yamauchi et al. | |
| 2008/0055567 A1 | 3/2008 | Sumiyama et al. | |
| 2009/0068742 A1 | 3/2009 | Yamanaka | |
| 2009/0079955 A1* | 3/2009 | Tsunesada | H04N 23/74 356/4.01 |
| 2010/0062422 A1 | 3/2010 | Ausserre | |
| 2011/0169944 A1 | 7/2011 | Zhao et al. | |
| 2012/0155079 A1 | 6/2012 | Miura | |
| 2013/0265566 A1 | 10/2013 | Smith | |
| 2015/0141268 A1* | 5/2015 | Rothberg | G01N 21/64 438/22 |
| 2017/0122806 A1 | 5/2017 | Capelle et al. | |
| 2018/0120423 A1* | 5/2018 | Nishikawa | G01S 7/4865 |
| 2019/0008388 A1 | 1/2019 | Ando et al. | |
| 2019/0383906 A1* | 12/2019 | Nakamura | G01S 17/894 |
| 2022/0064727 A1* | 3/2022 | Almogy | C12Q 1/6874 |
| 2022/0334233 A1* | 10/2022 | Imai | G01S 7/4816 |
| 2023/0341263 A1 | 10/2023 | Endo et al. | |
| 2024/0295297 A1 | 9/2024 | Hayata et al. | |

FOREIGN PATENT DOCUMENTS

| | | |
|---|---|---|
| JP | H01-292821 A | 11/1989 |
| JP | H02-240545 A | 9/1990 |
| JP | H06-167640 A | 6/1994 |
| JP | H11-23819 A | 1/1999 |
| JP | 2000-206449 A | 7/2000 |
| JP | 2001-100104 A | 4/2001 |
| JP | 2002-005823 A | 1/2002 |
| JP | 2003-500255 A | 1/2003 |
| JP | 2008-180650 A | 8/2008 |
| JP | 2008-256784 A | 10/2008 |
| JP | 5098028 B2 | 12/2012 |
| JP | 2013-44727 A | 3/2013 |
| JP | 2013-122443 A | 6/2013 |
| JP | 2013-533502 A | 8/2013 |
| JP | 2014-013833 A | 1/2014 |
| JP | 2014-170014 A | 9/2014 |
| JP | 2014-222239 A | 11/2014 |
| JP | 2016-004005 A | 1/2016 |
| JP | 2019-15709 A | 1/2019 |
| JP | 2020-159973 A | 10/2020 |
| JP | 2022-123119 A | 8/2022 |
| WO | 00/73041 A1 | 12/2000 |
| WO | 2007/069666 A1 | 6/2007 |
| WO | 2011/146351 A1 | 11/2011 |
| WO | 2018/124299 A1 | 7/2018 |
| WO | 2018/211704 A1 | 11/2018 |
| WO | 2022/176208 A1 | 8/2022 |

OTHER PUBLICATIONS

International Search Report mailed on May 18, 2021, received for PCT Application PCT/JP2021/006685, filed on Feb. 22, 2021, 7 pages including English Translation.

Ando et al., "Spectral noise reduction and temporal coherence control using a phase unsynchronized wave synthesizing method", Optics Express, vol. 29, No. 23, 2021, pp. 38691-38719.

Torres-Company et al., "Controllable generation of partially coherent light pulses with direct space-to-time pulse shaper", Optics Letters, vol. 32, No. 12, Jun. 15, 2007, pp. 1608-1610.

Yukihiro Ozaki and Satoshi Kawada (Eds.), "Near Infrared Spectroscopy", Gakkai Shuppan Center, 1996, p. 211.

International Search Report and Written Opinion mailed on Apr. 5, 2022, received for PCT Application PCT/JP2022/001156, filed on Jan. 14, 2022, 9 pages including English Translation.

Max Born, et al., "Principles of Optics—Electromagnetic Theory of Propagation, Interference and Diffraction of Light", Tokai University Press, Nov. 14, 1975, 32 pages.

Groningen F. Zernike, "The concept of degree of coherence and its application to optical problems", Physica, vol. 5, No. 8, 1938, 6 pages. (DOI : 10.1016/S0031-8914(38)80203-2).

Office Action issued Aug. 27, 2024 in Japanese Patent Application No. 2023-500635, 10 pages.

Office Action issued Nov. 19, 2024, in Japanese Patent Application No. 2023-500635, 8 pages.

Keith Delahoussaye, Ruyan Guo, and Amar Bhalla "Homodyne and heterodyne optical interferometry for frequency dependent piezoelectric displacement measurement", Proc. SPIE 9200, Photonic Fiber and Crystal Devices: Advances in Materials and Innovations in Device Applications VIII, 92001M (2014) (Year: 2014).

* cited by examiner

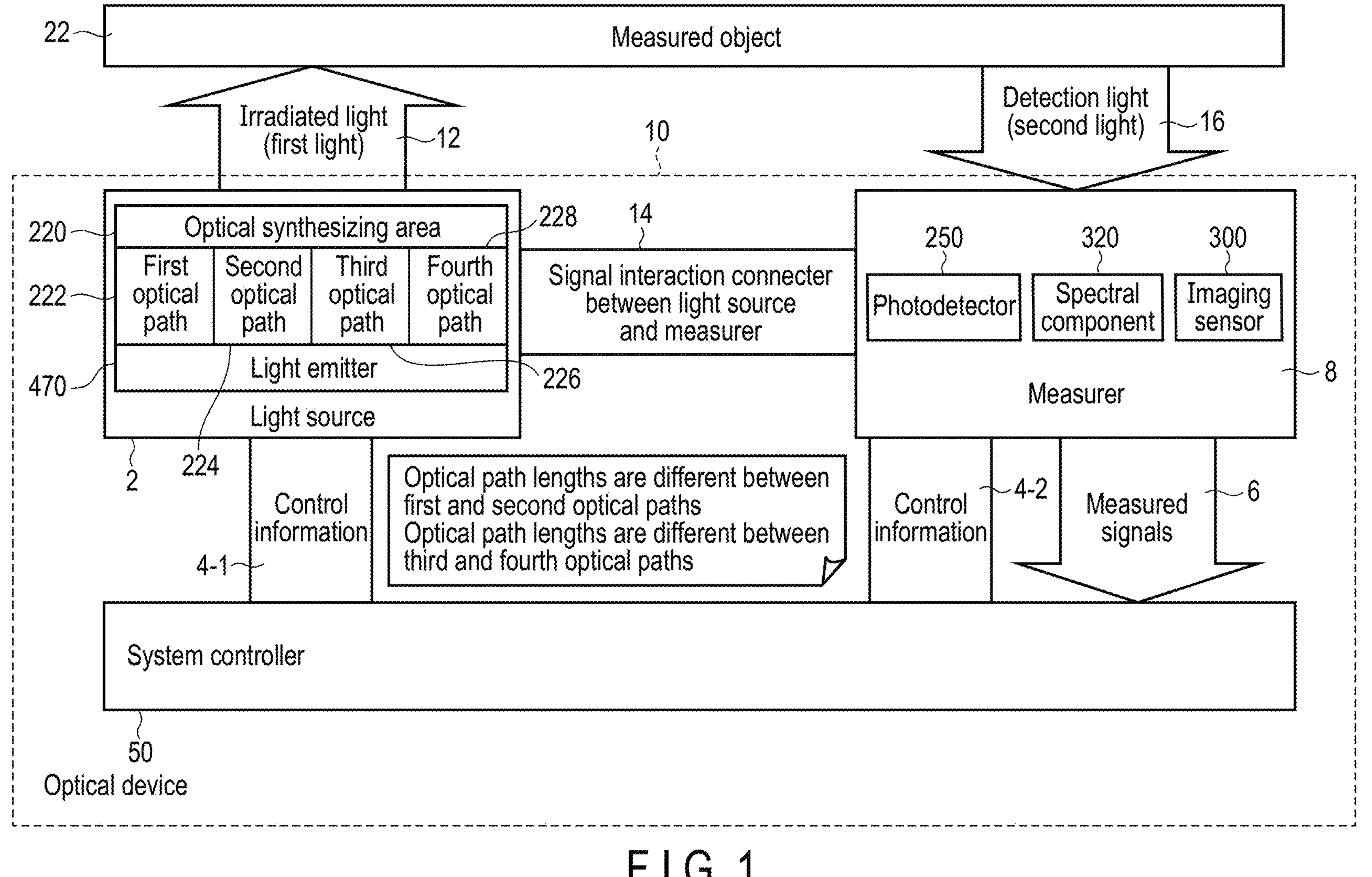
F I G. 1

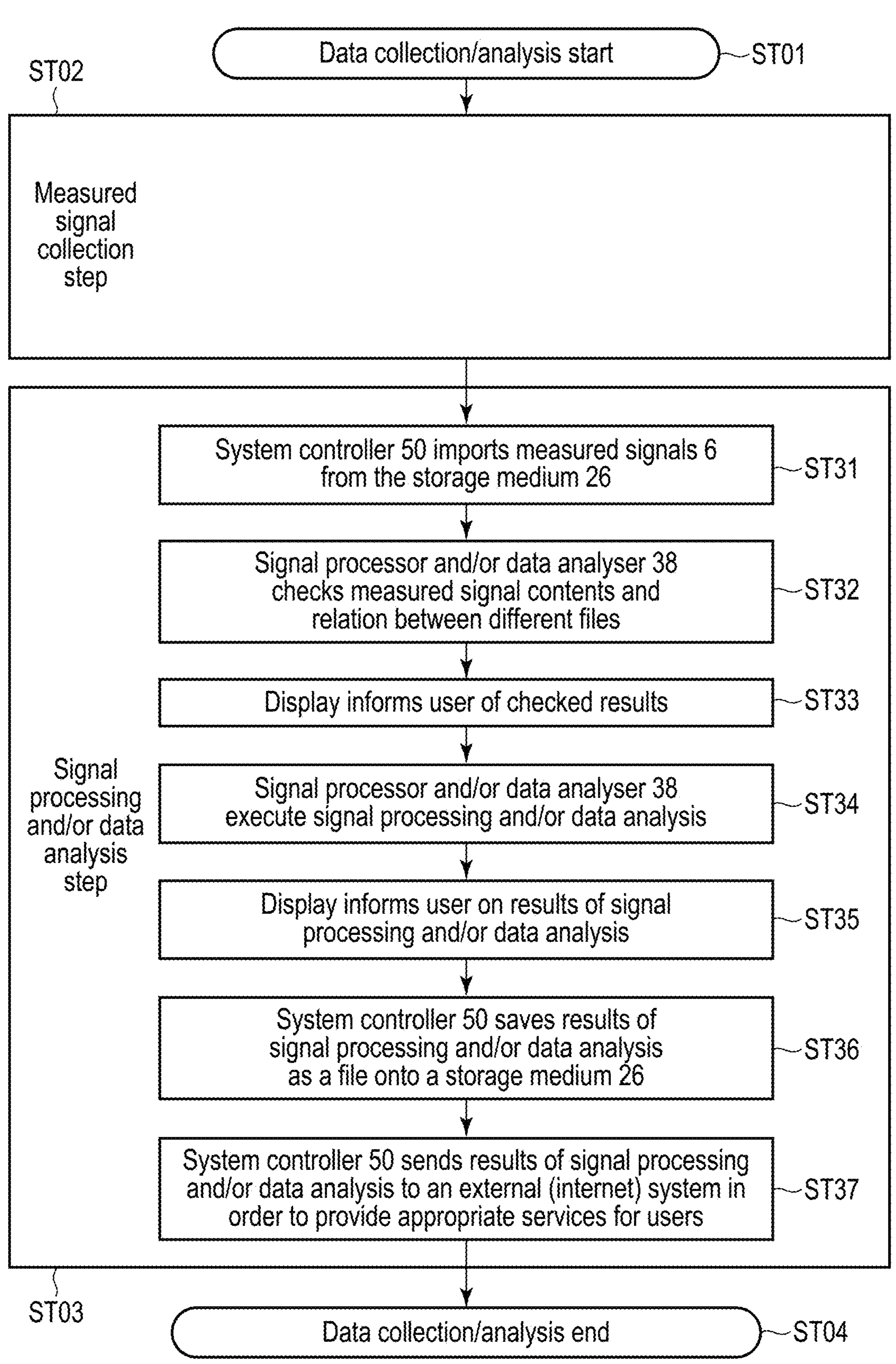
F I G. 4

| Optical application field (100) | Measured object type (category) (102) | First measured signal constituent (reference signal constituent) (104) | Second measured signal constituent (106) | Calculation combination example (108) |
|---|---|---|---|---|
| Spectral measurement (absorbance profile) | Spectral profile of solute included in a solution (spectral profile of solute constituent) | Spectral profile (absorbance profile) of solvent only | Spectral profile (absorbance profile) of whole solution | Subtractive operation between solution and solvent profiles |
| | Blood components (constituent elements) analysis in vivo | Blood pulsation profile (time-dependent blood flow value) | Spectral profile (absorbance profile) of each of blood components (constituent elements) | Pattern matching between constituent and pulsation profiles (lock-in processing) |

FIG. 6

| Optical application field (100) | Measured object type (category) (102) | First measured signal constituent (reference signal constituent) (104) | Second measured signal constituent (106) | Calculation combination example (108) |
|---|---|---|---|---|
| 3D imaging | Time of flight camera | Measured signal obtained from a calibration object having standard distance or time-dependent profile of irradiated light intensity | Delayed timing of reflected light obtained from measured object (photographed subject) | Pattern matching between a measured signal and a compared signal (lock-in processing) |
| Imaging utilizing optical interference phenomenon | Position/displacement detection utilizing optical interference system | Calibration signal obtained from reference light passing through a prescribed optical path | Pattern image and delayed timing of detection light obtained from measured object (photographed subject) | Displacement value prediction from standard position based on optical interference |

F I G. 7

F I G. 10
F I G. 11
F I G. 12
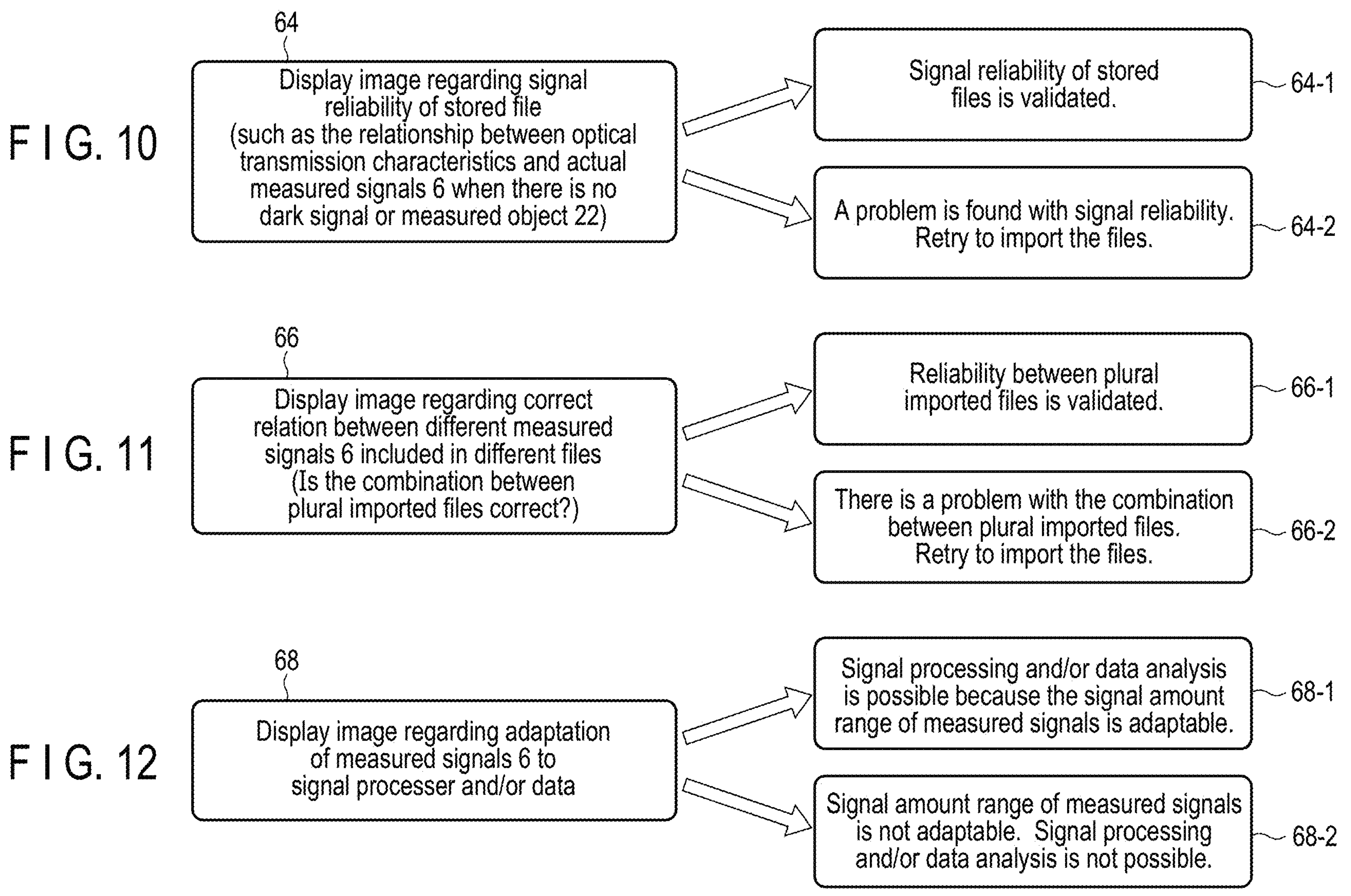

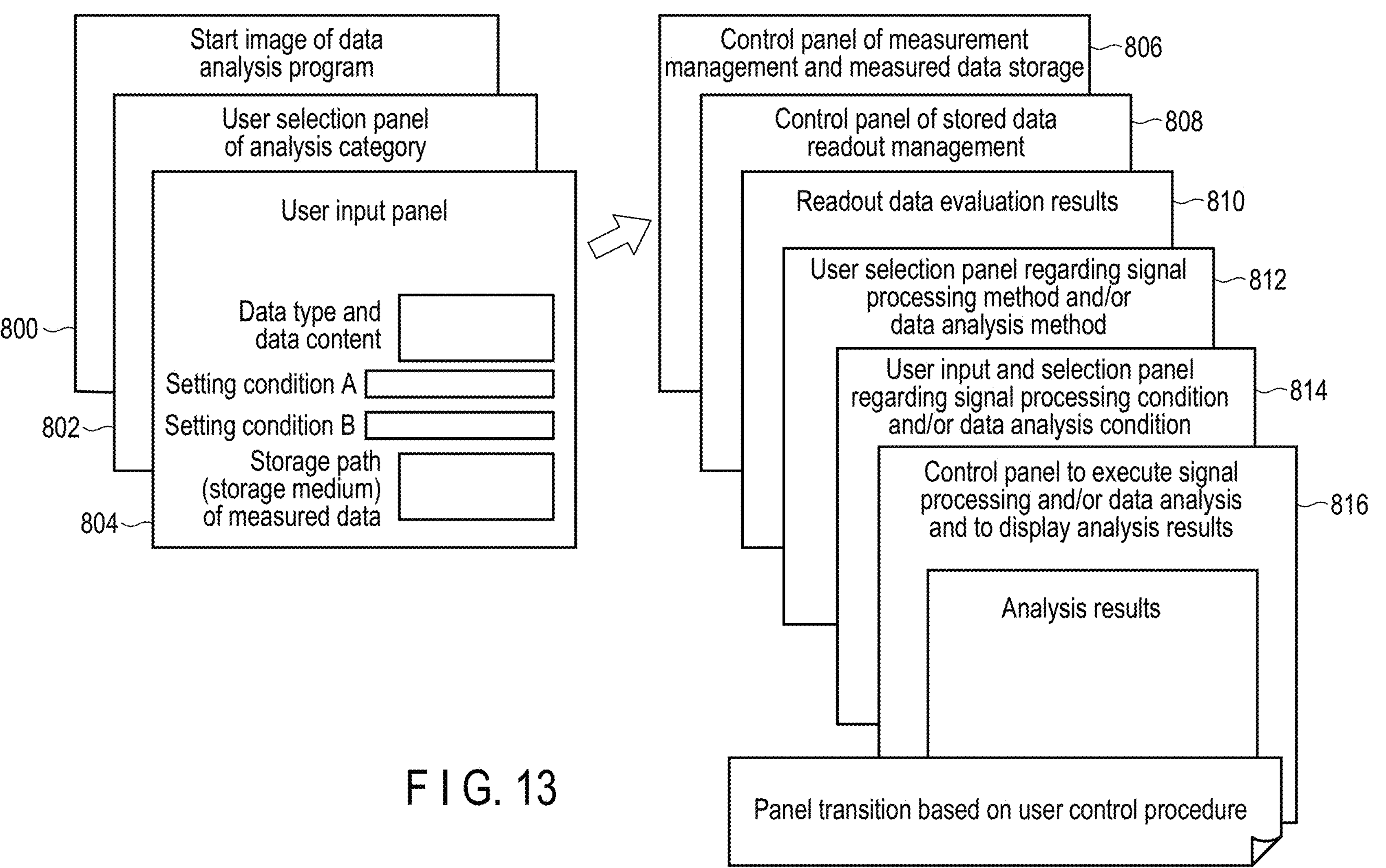
F I G. 13

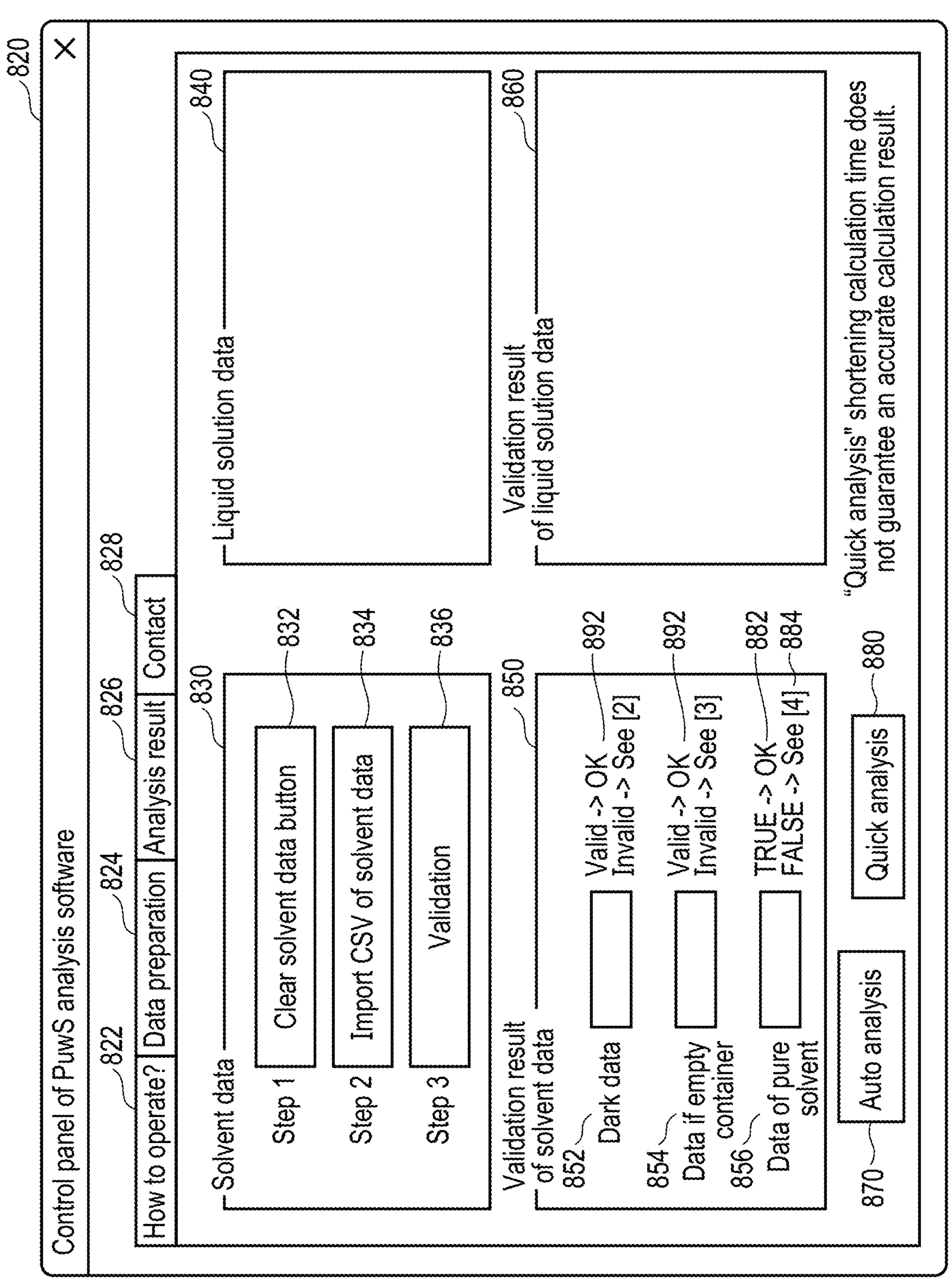
F I G. 14

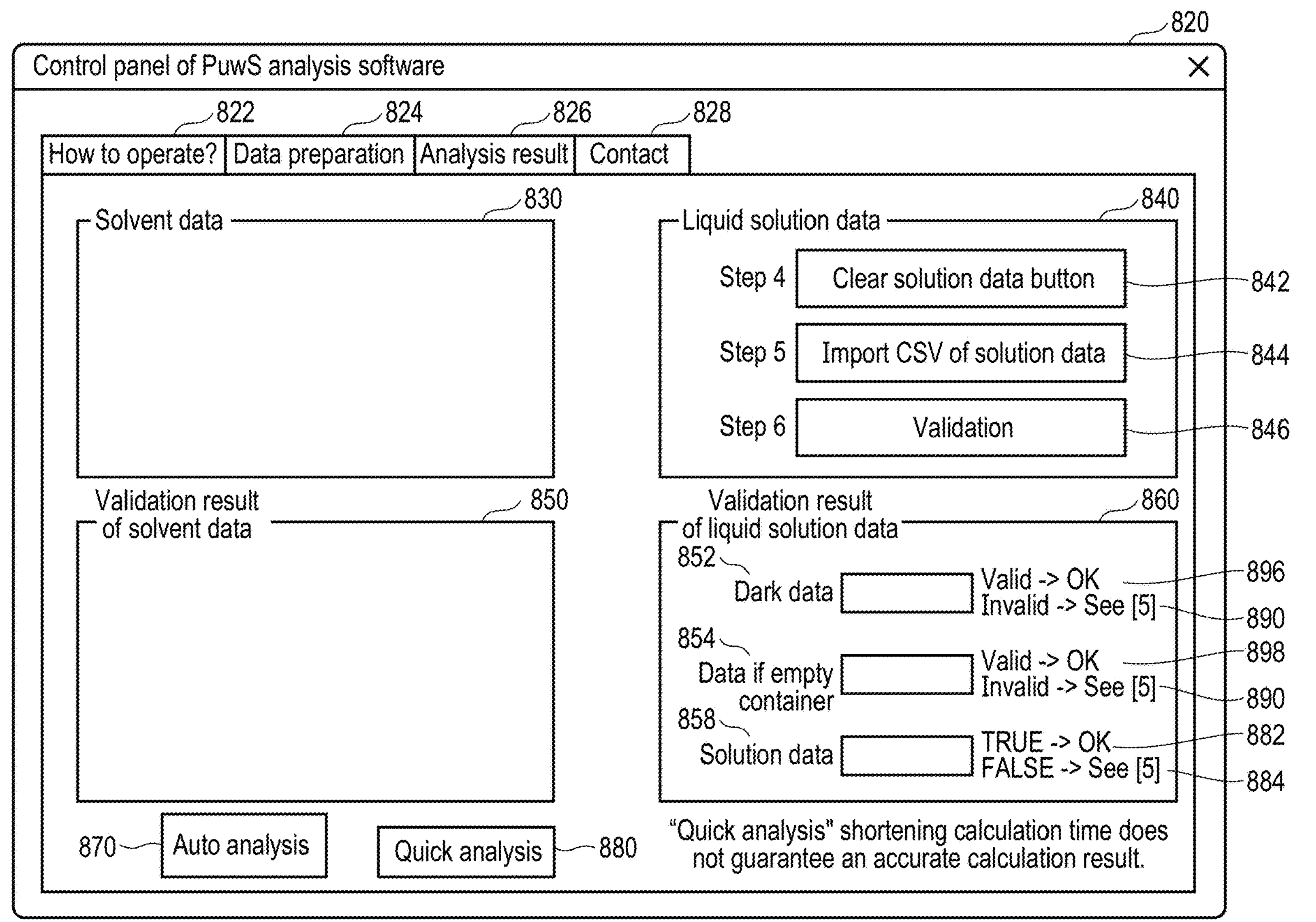
F I G. 15

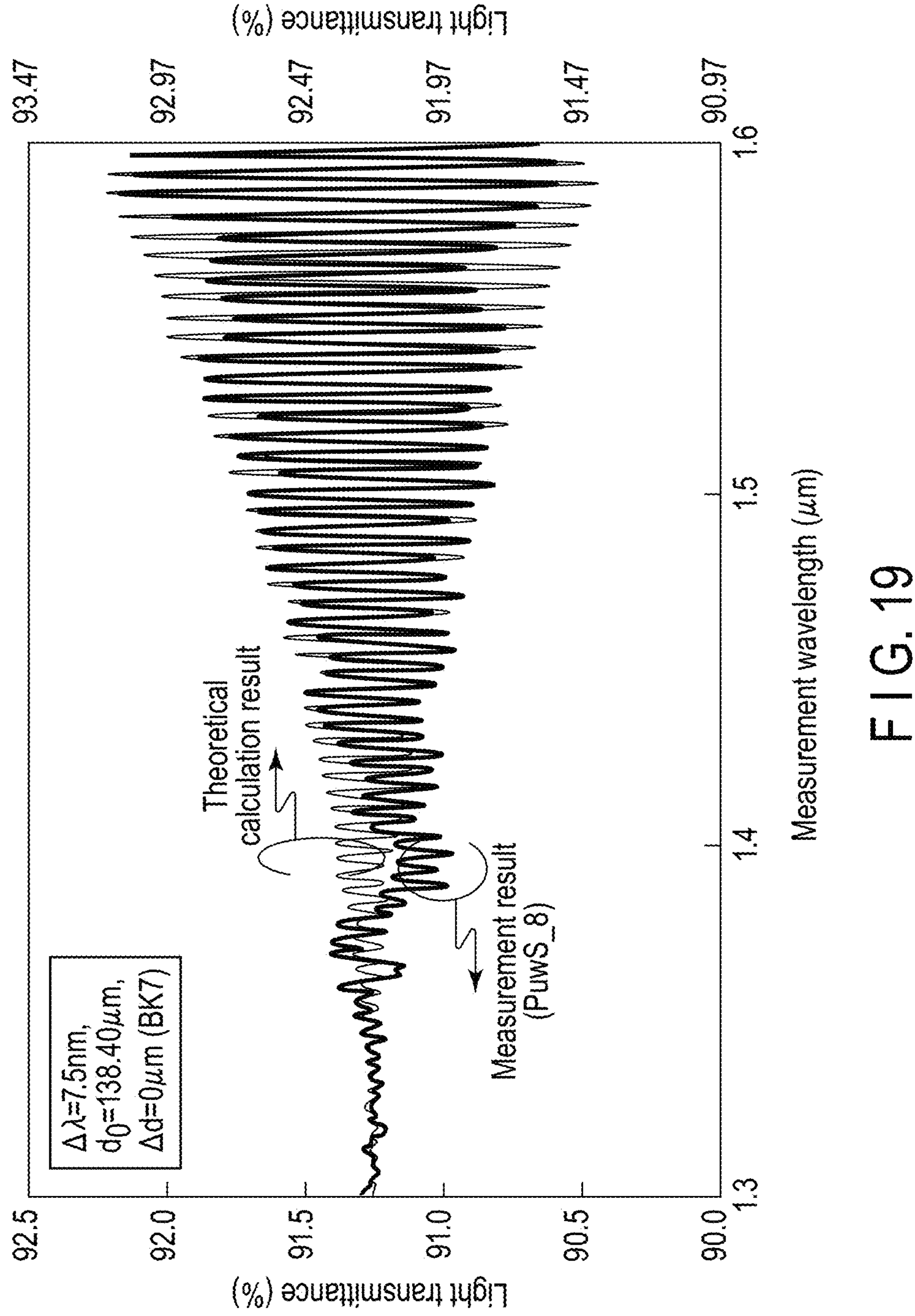
F I G. 19

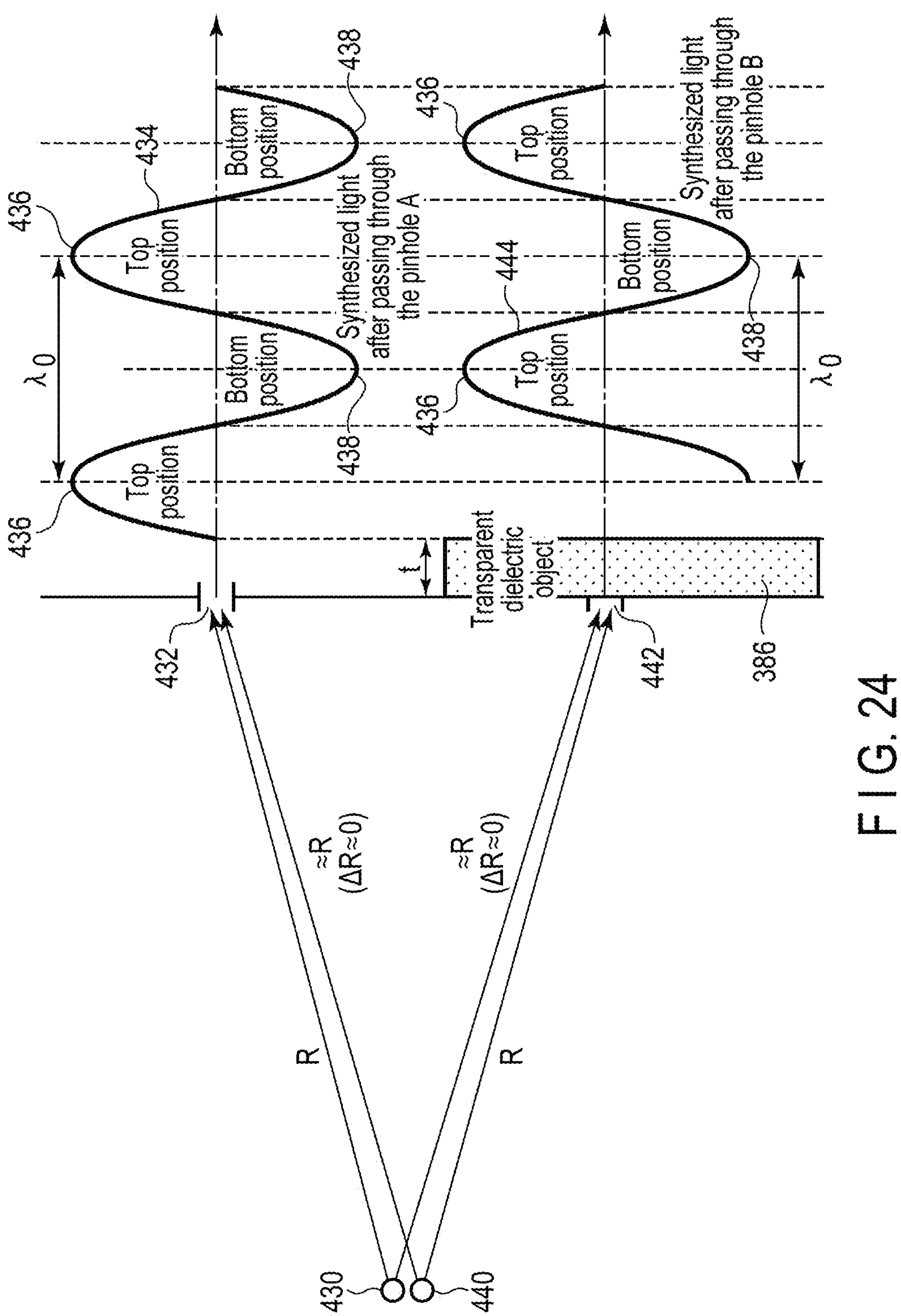
F I G. 24

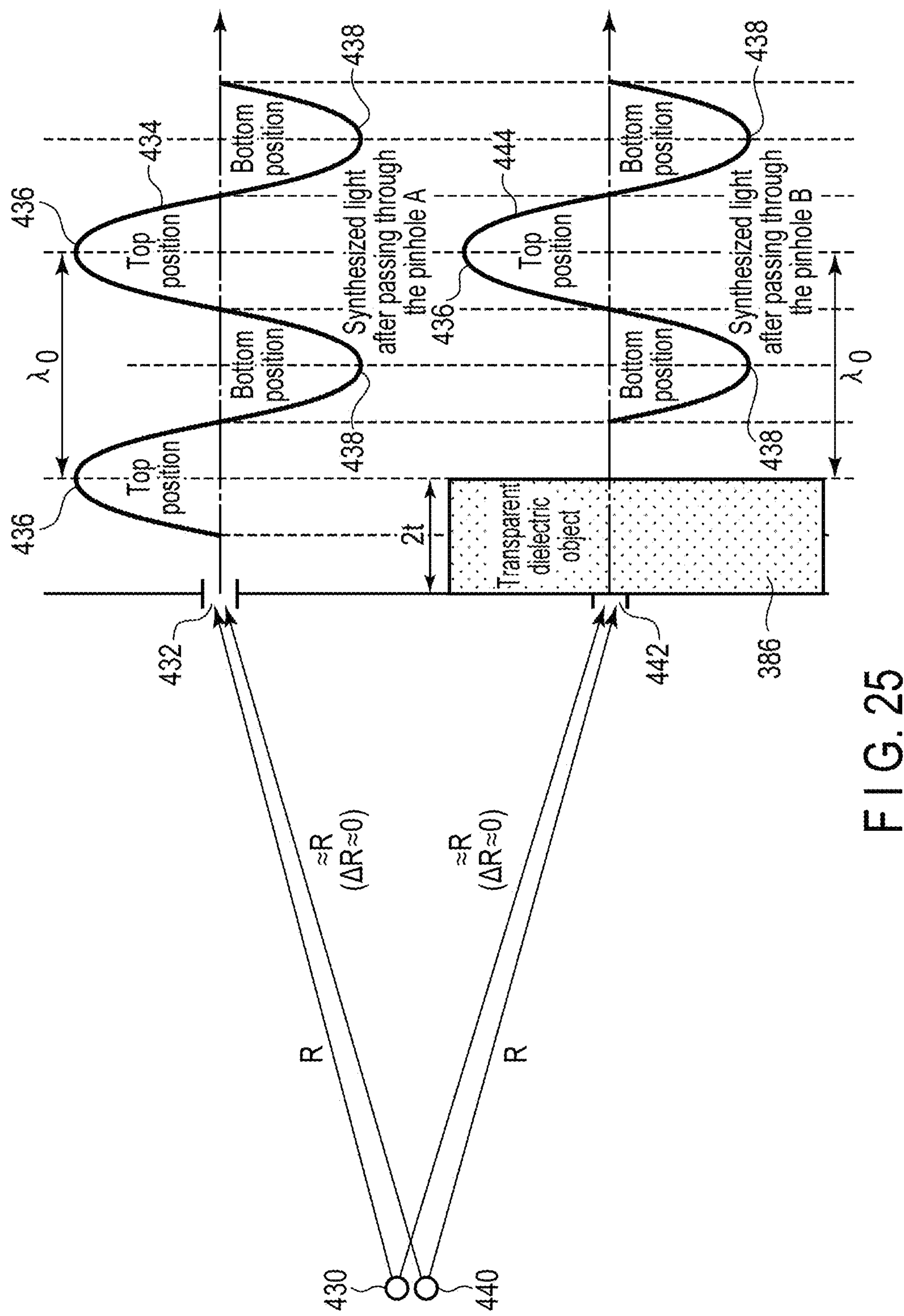
F I G. 25

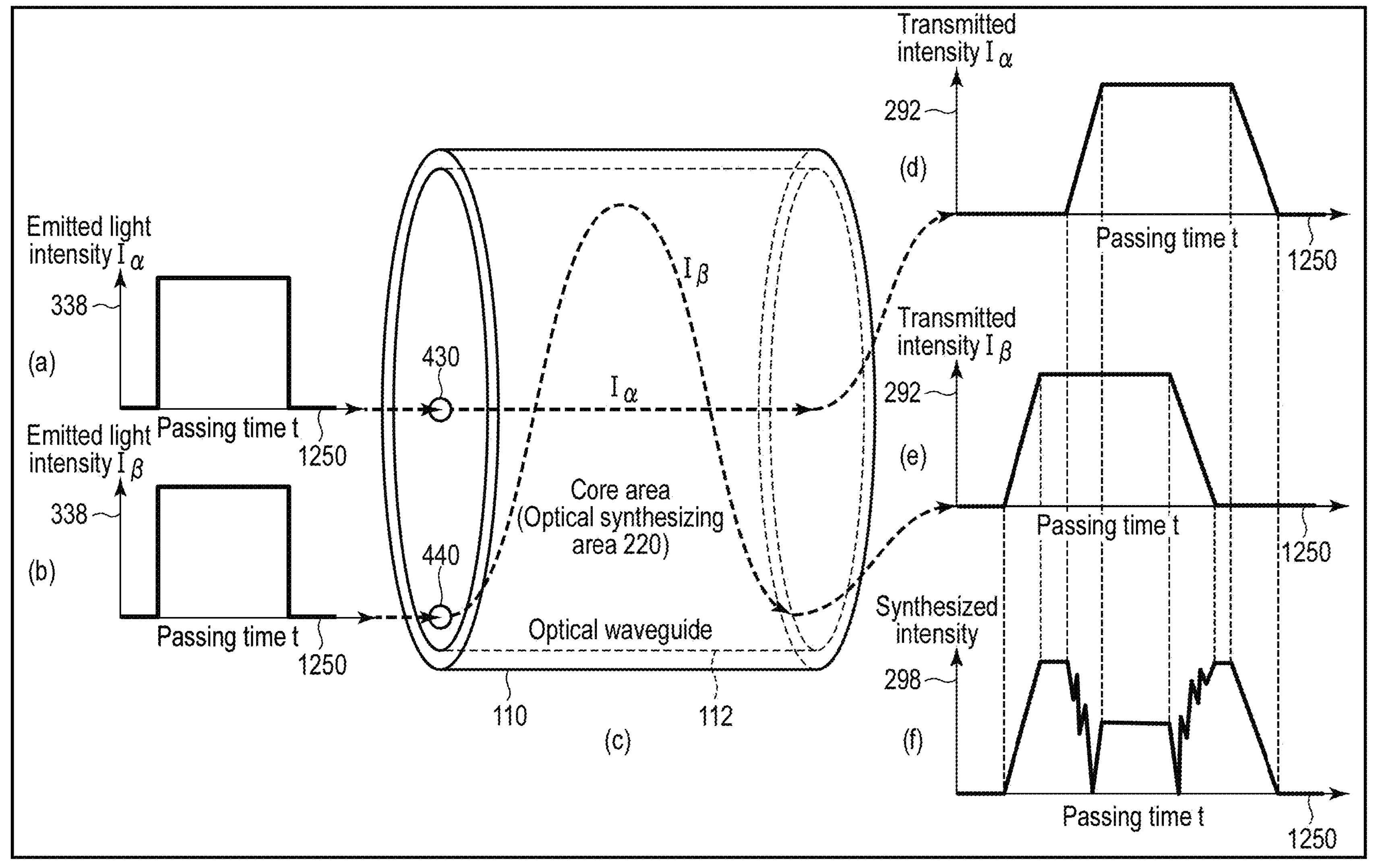
F I G. 26

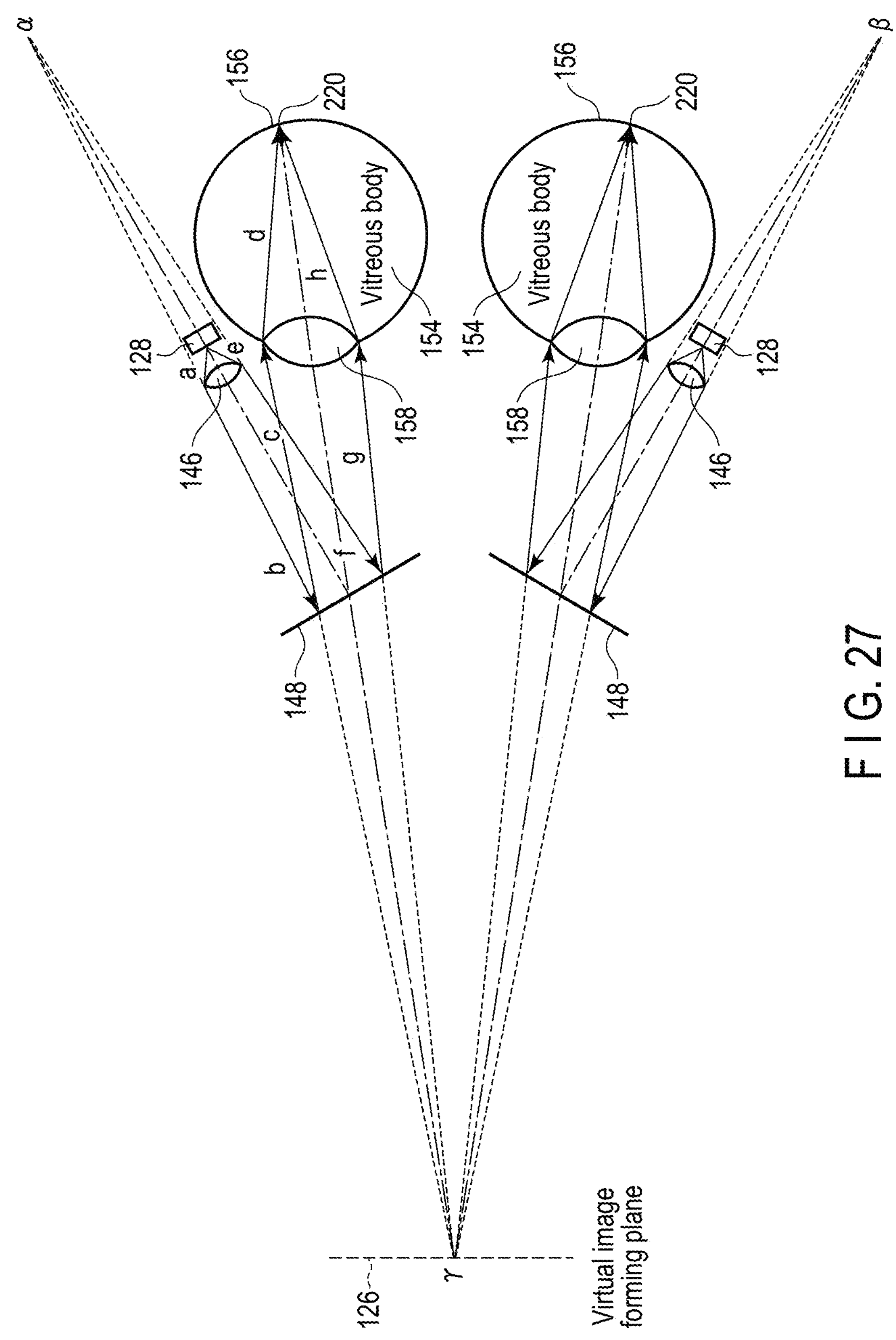
F I G. 27

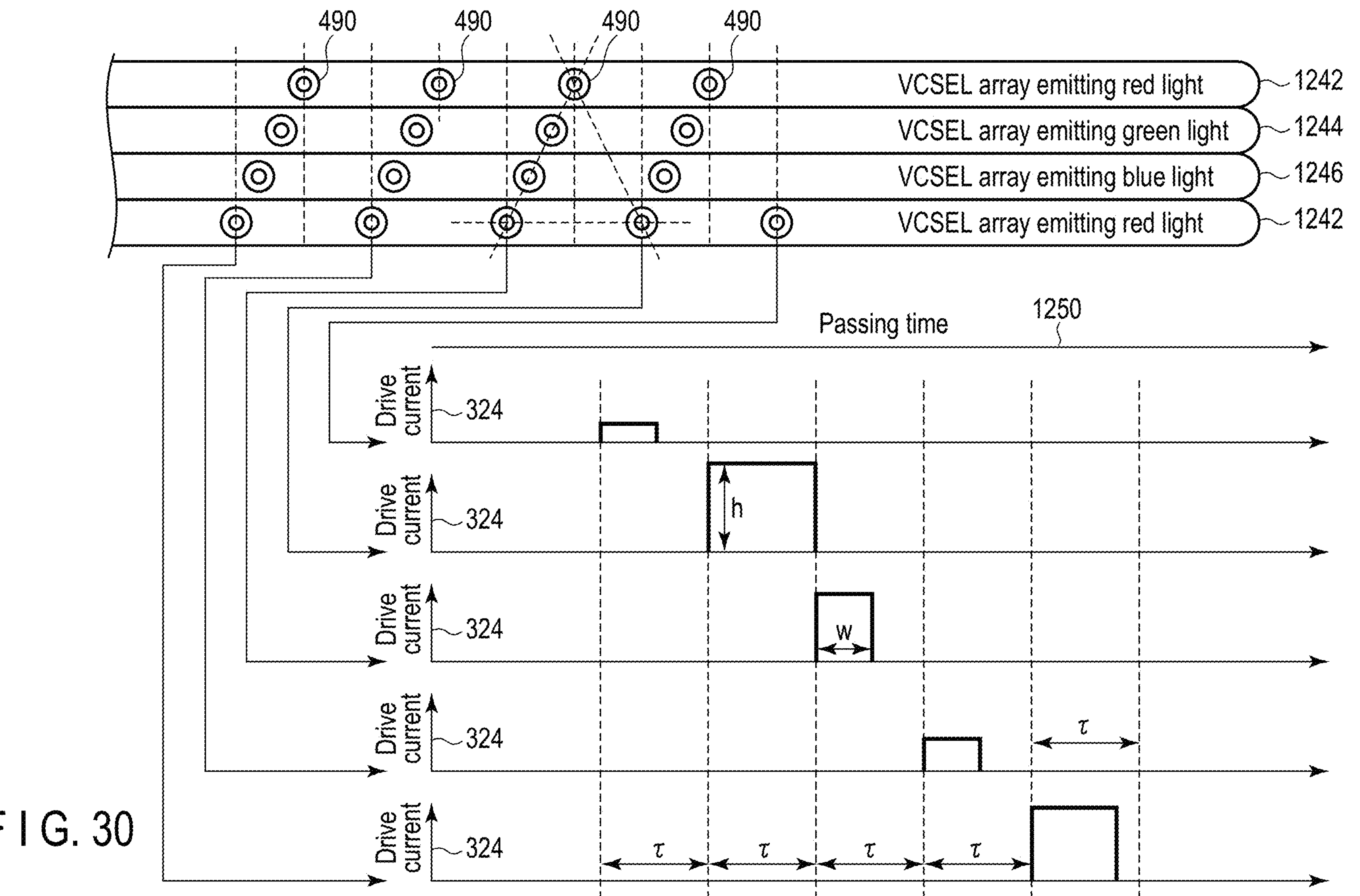
F I G. 30

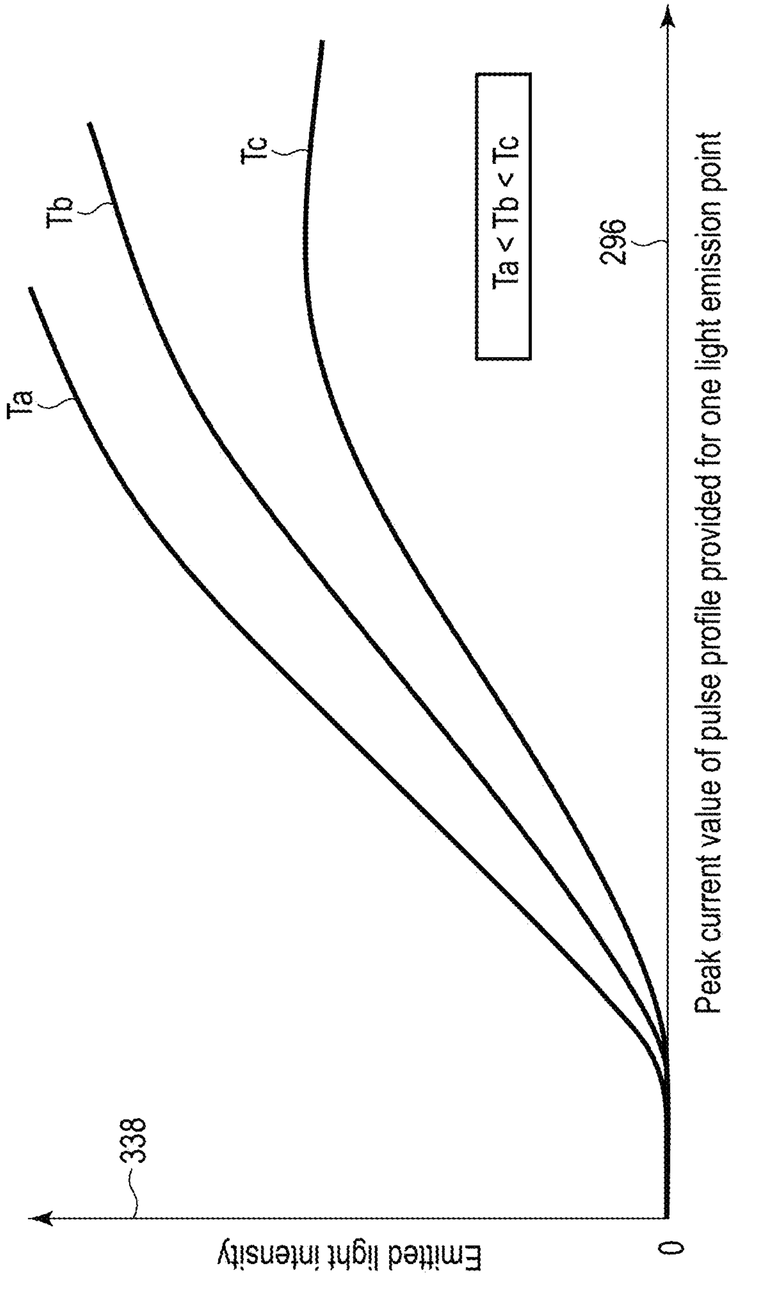
F I G. 31

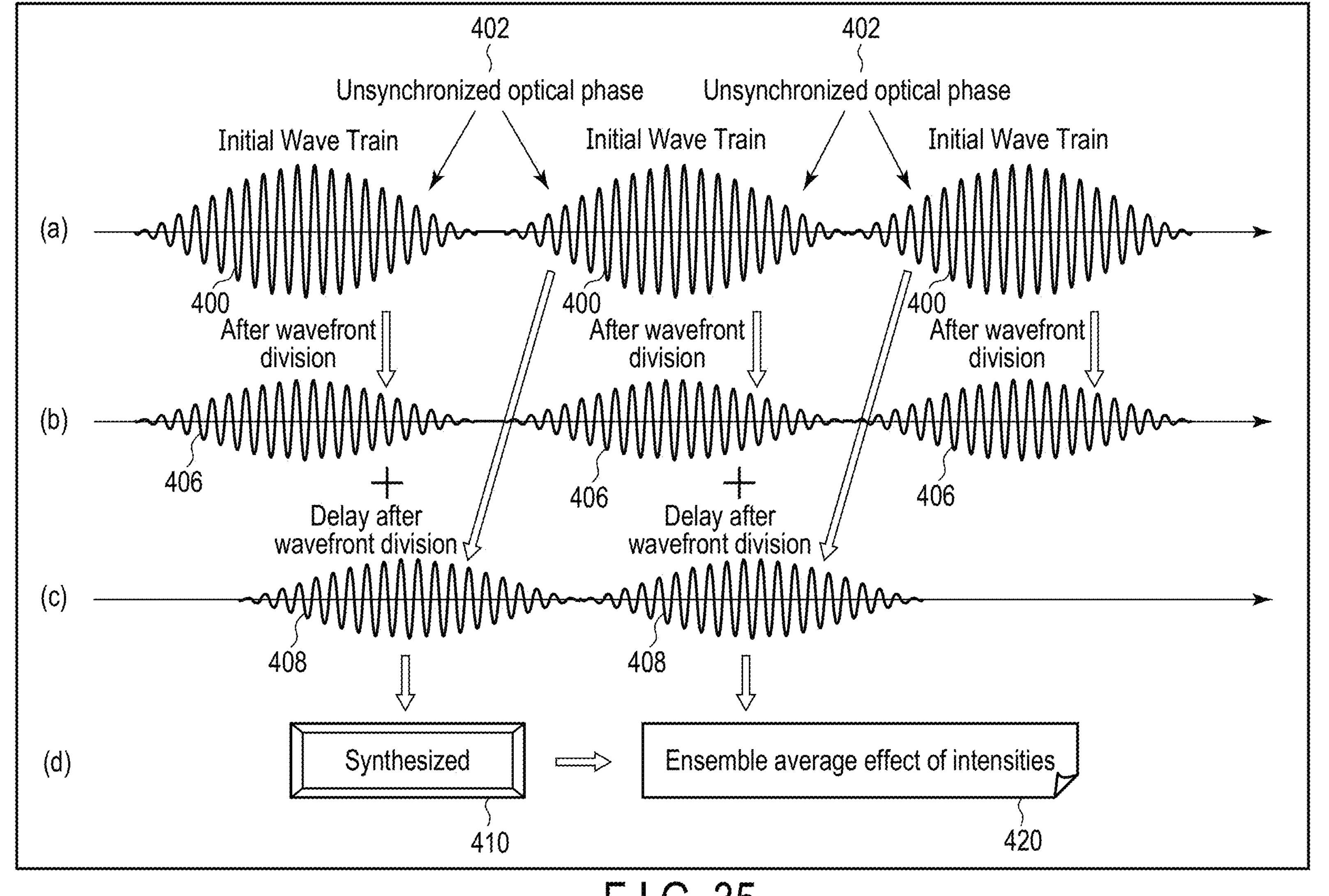
F I G. 35

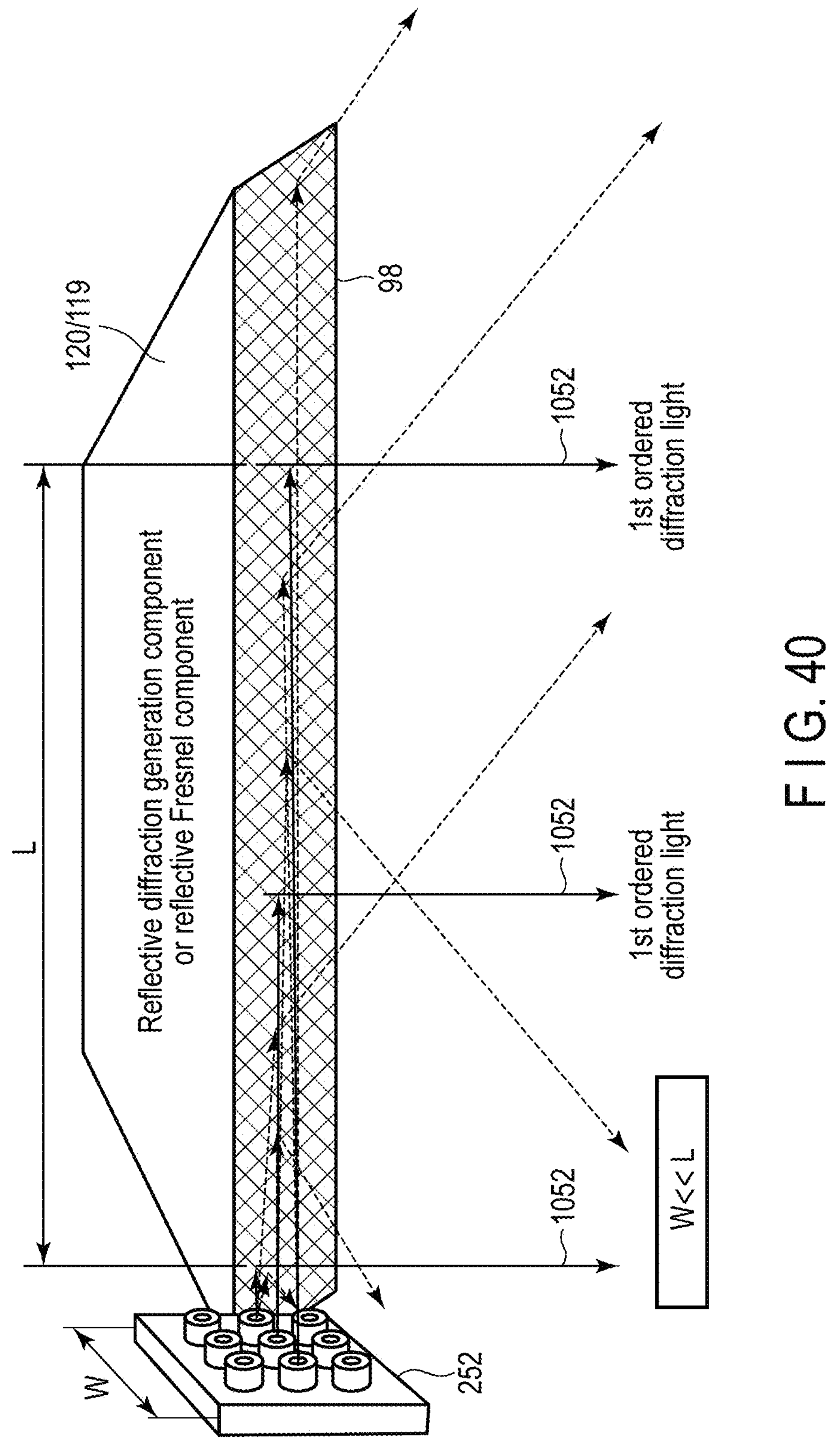
F I G. 40

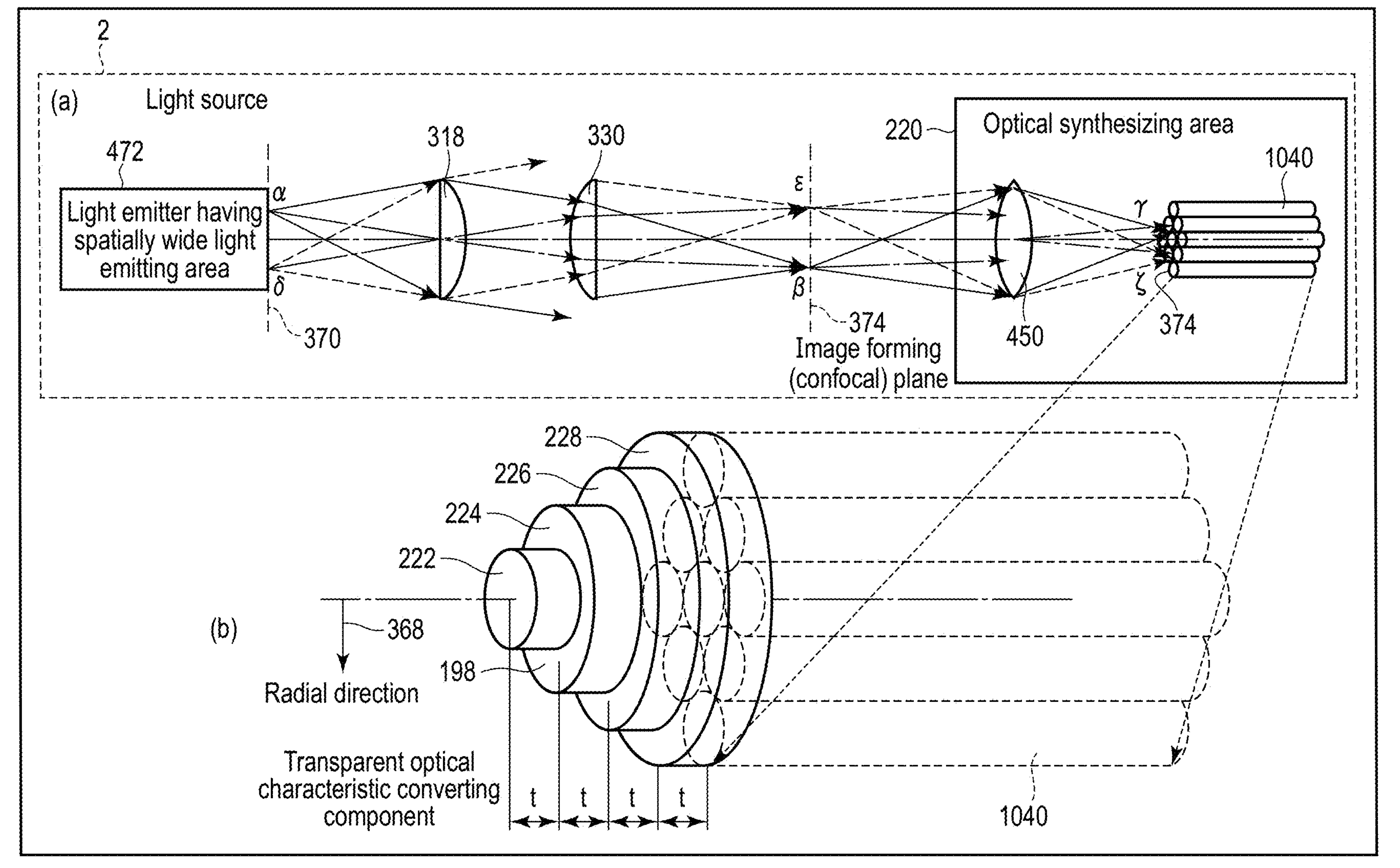
F I G. 54

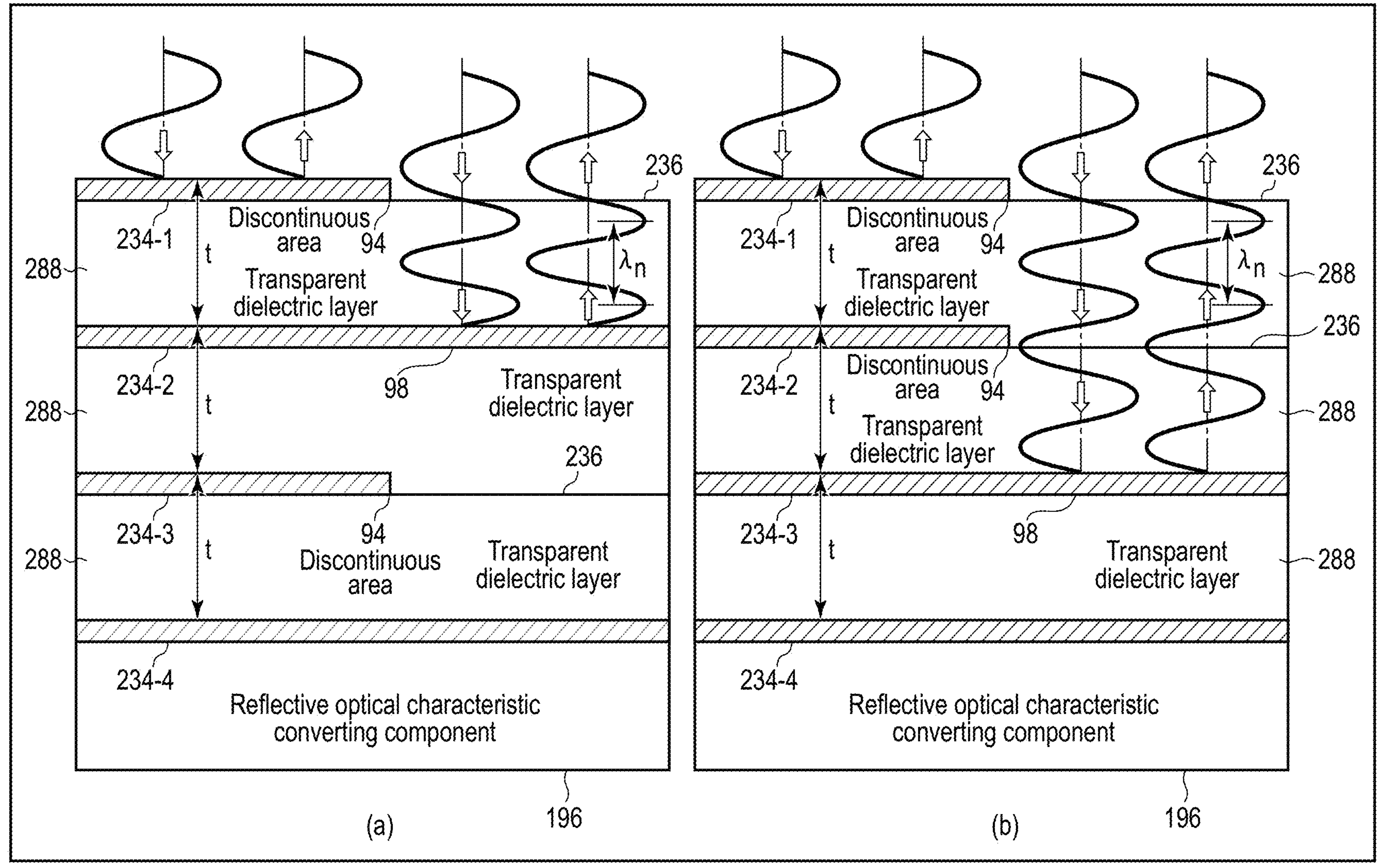
F I G. 58

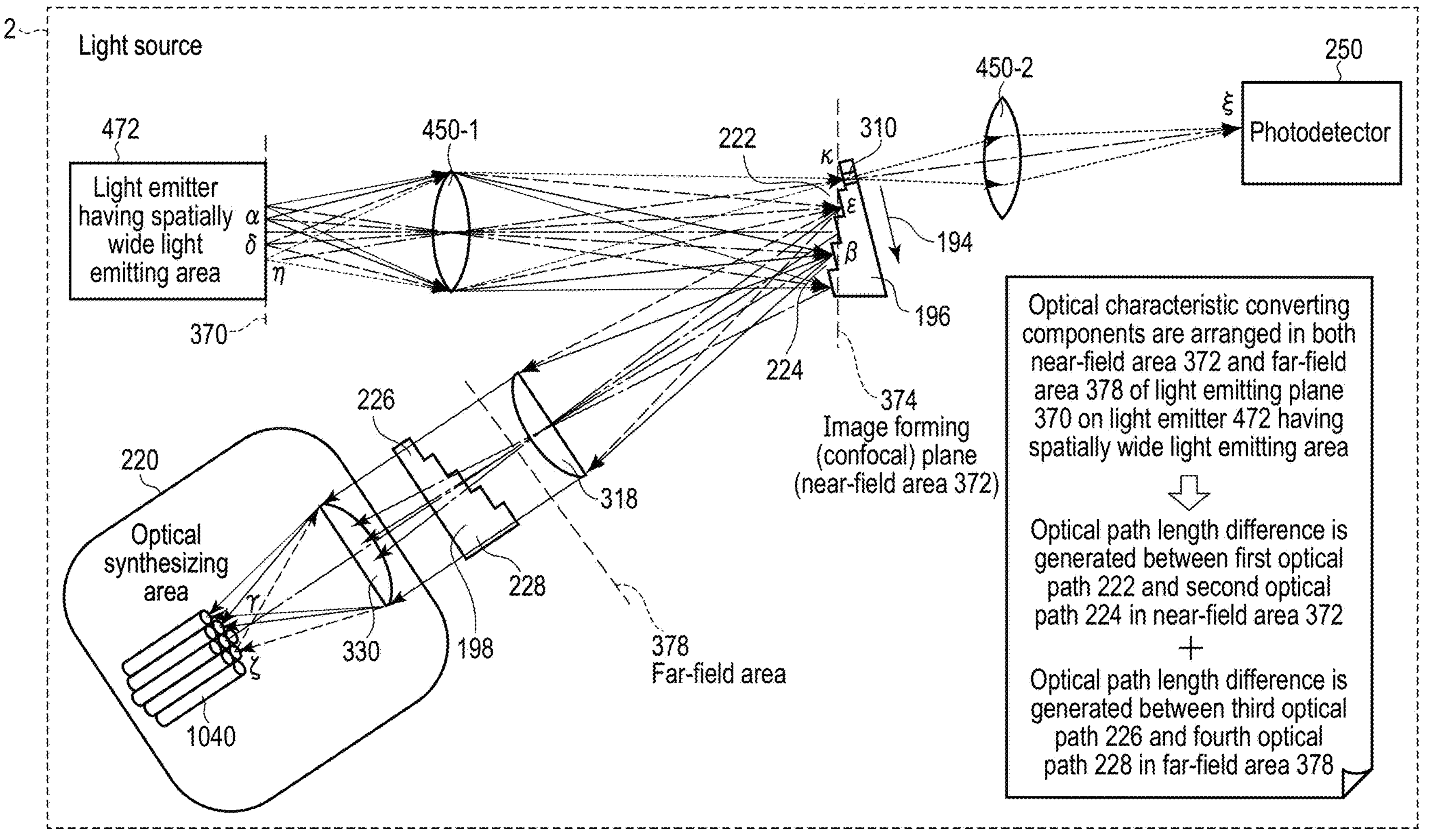
F I G. 65

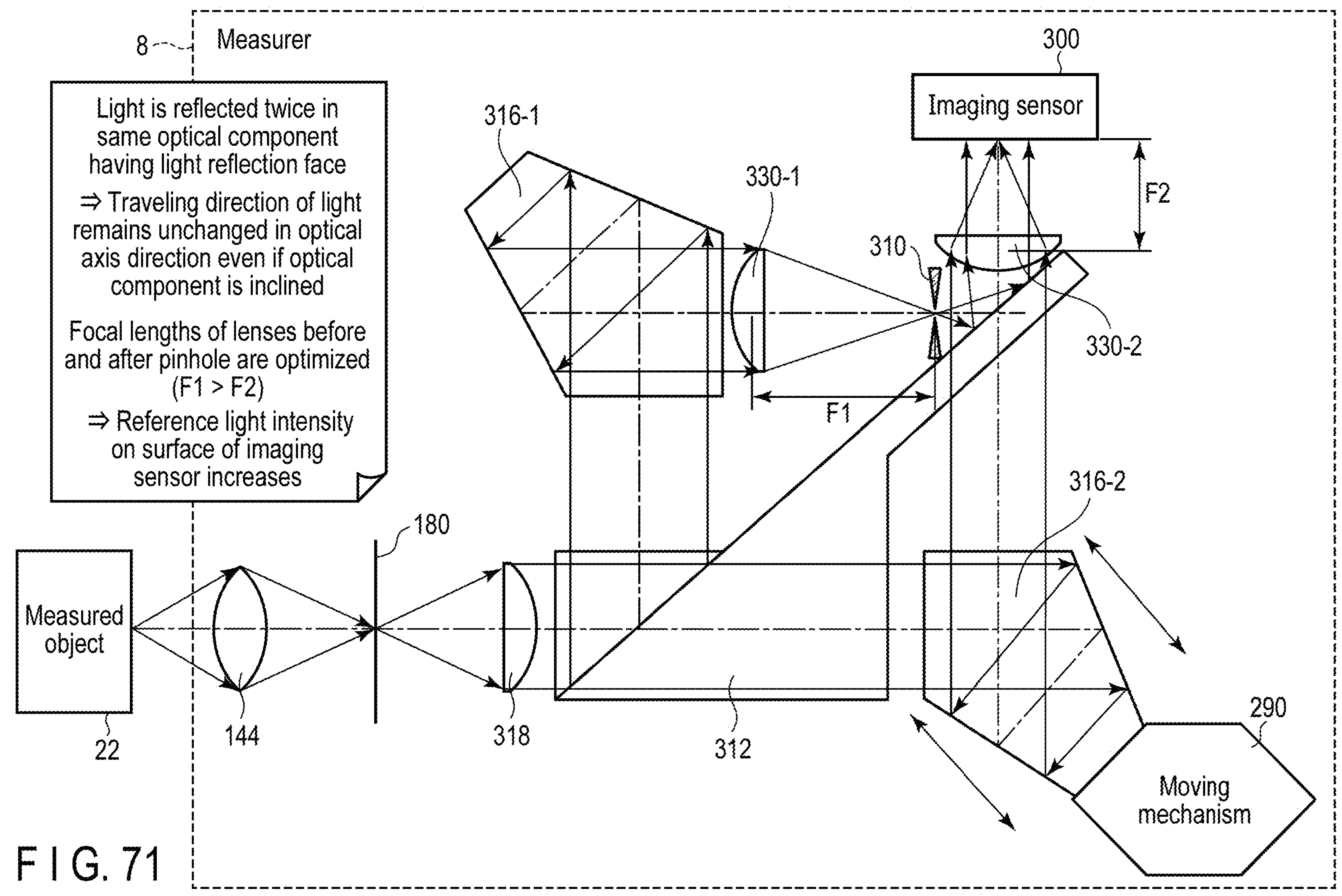
F I G. 71

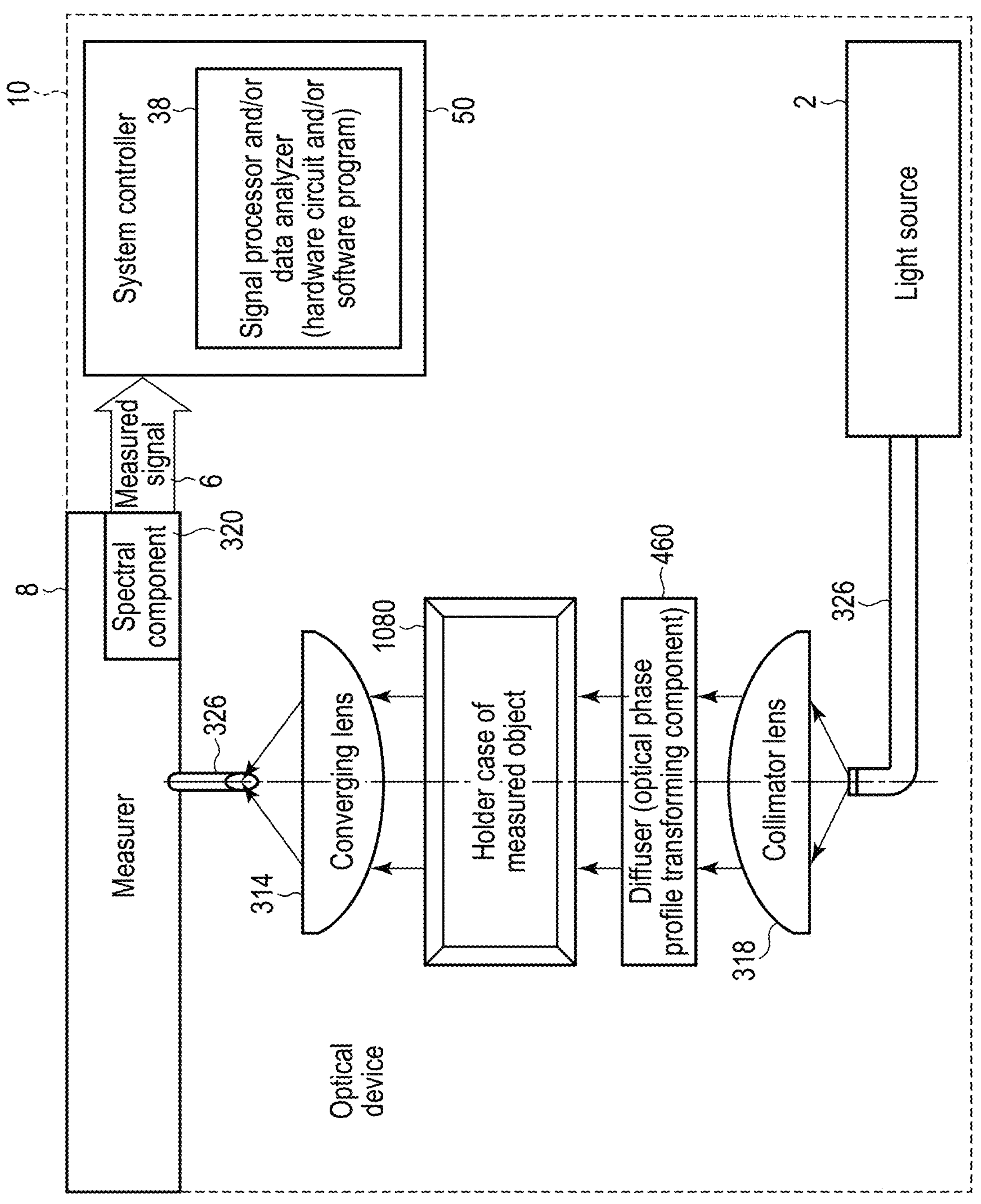
F I G. 75

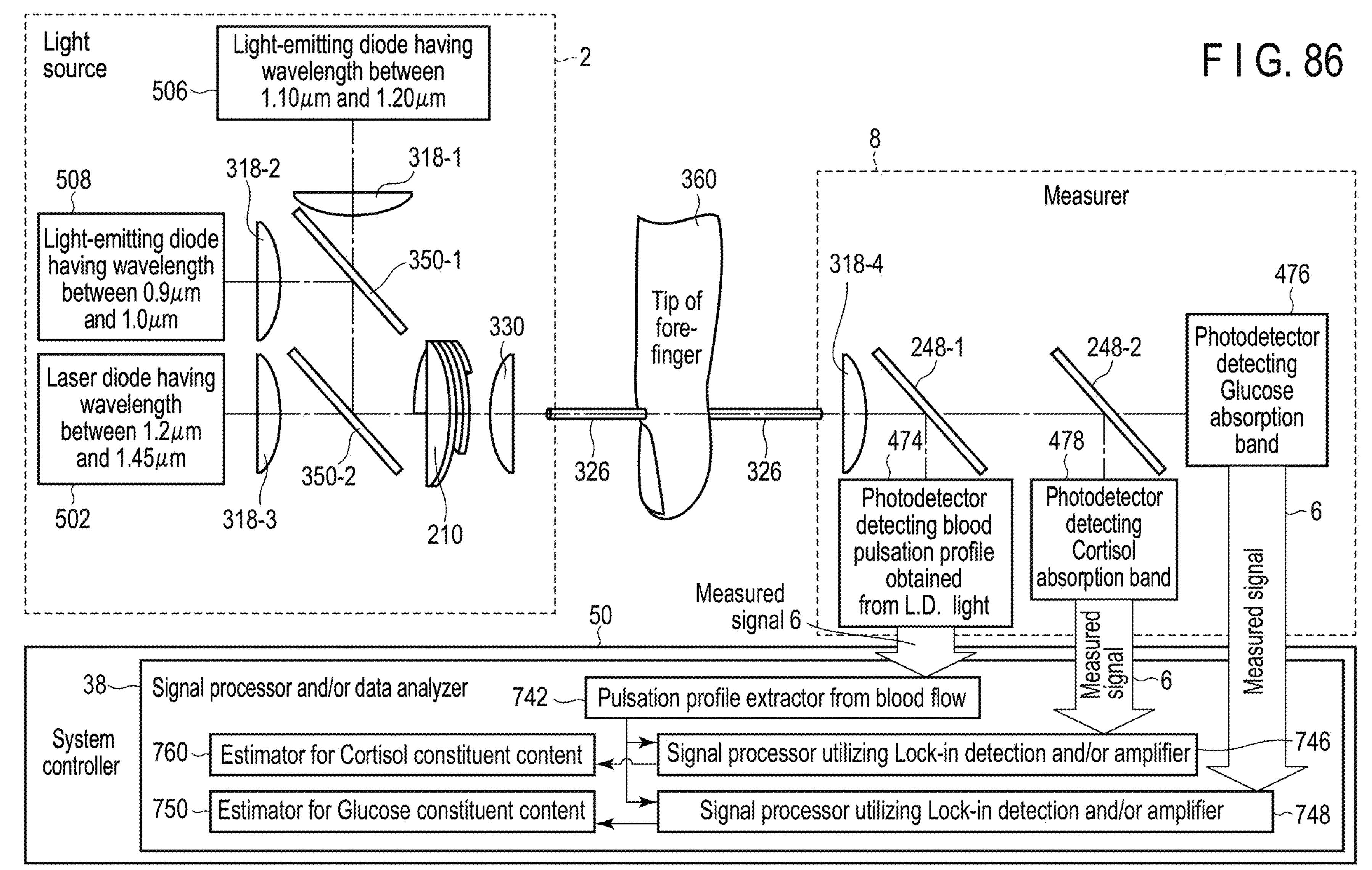
F I G. 86
Light source
2
Light-emitting diode having wavelength between 1.10μm and 1.20μm
506
Light-emitting diode having wavelength between 0.9μm and 1.0μm
508
Laser diode having wavelength between 1.2μm and 1.45μm
502
318-1
318-2
318-3
350-1
350-2
210
330
326
360
Tip of fore-finger
326
318-4
248-1
248-2
8
Measurer
474
Photodetector detecting blood pulsation profile obtained from L.D. light
478
Photodetector detecting Cortisol absorption band
476
Photodetector detecting Glucose absorption band
6
Measured signal
6
Measured signal
Measured signal 6
50
Signal processor and/or data analyzer
742
Pulsation profile extractor from blood flow
746
Signal processor utilizing Lock-in detection and/or amplifier
748
Signal processor utilizing Lock-in detection and/or amplifier
760
Estimator for Cortisol constituent content
750
Estimator for Glucose constituent content
38
System controller

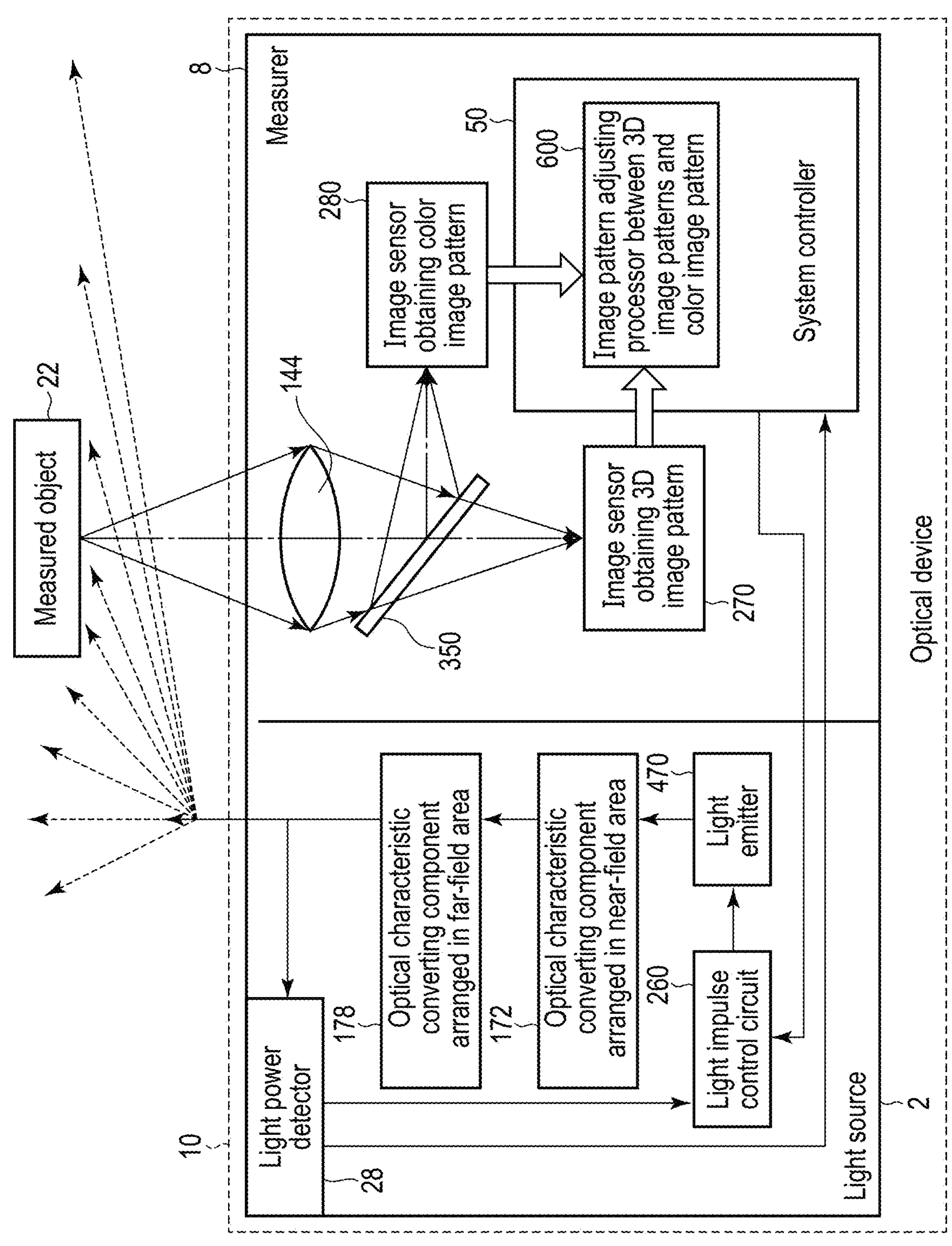
F I G. 91

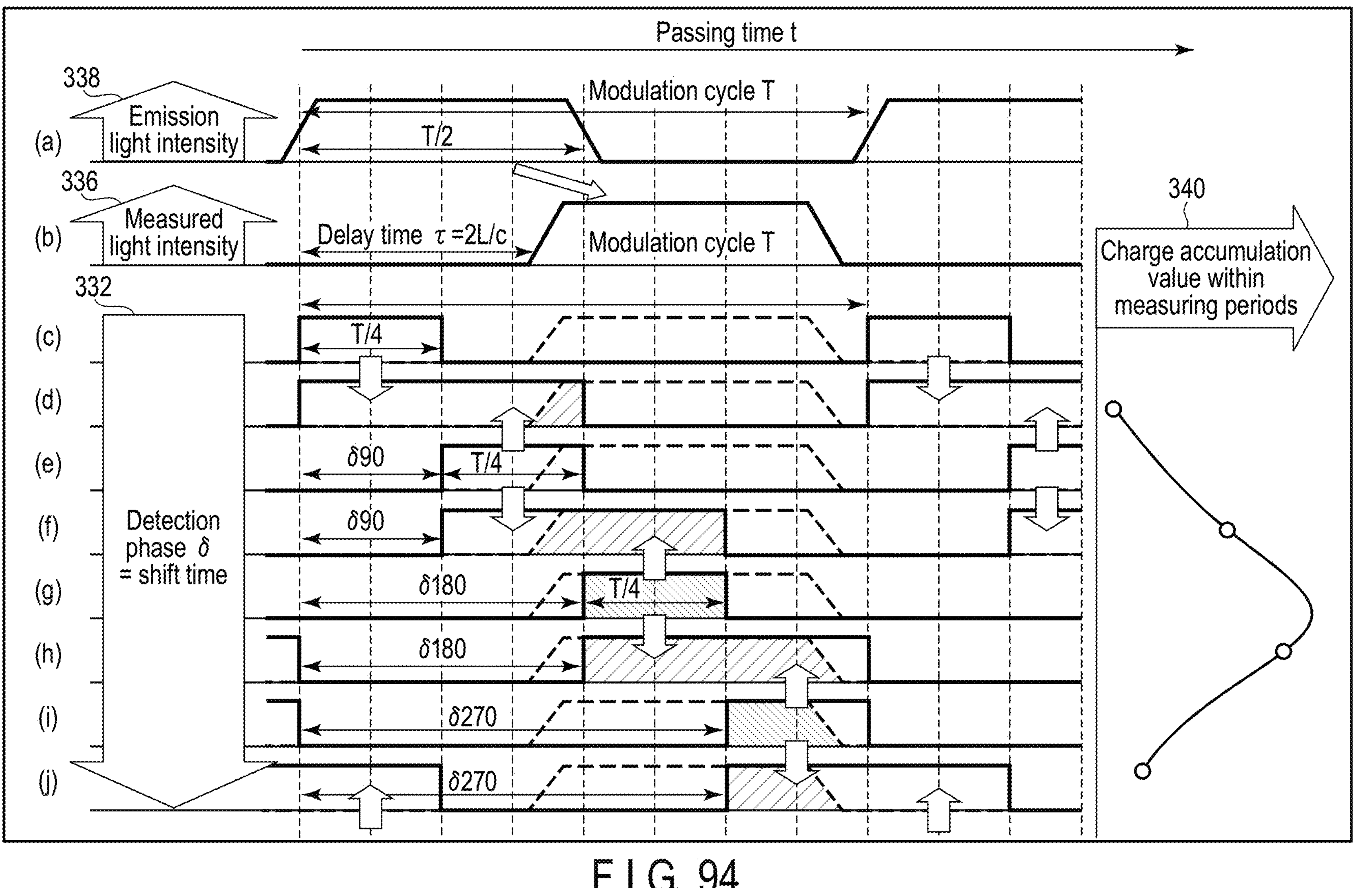
F I G. 94

| Example of detection phase value to be set individually | Number of repeated measurements | | |
|---|---|---|---|
| | First measurement | Second measurement | Third measurement |
| Image sensor #1 (270-1) | 0 degrees/ 180 degrees | 20 degrees/ 200 degrees | 40 degrees/ 220 degrees |
| Image sensor #2 (270-2) | 60 degrees/ 240 degrees | 80 degrees/ 260 degrees | 100 degrees/ 280 degrees |
| Image sensor #3 (270-3) | 120 degrees/ 300 degrees | 140 degrees/ 320 degrees | 160 degrees/ 340 degrees |

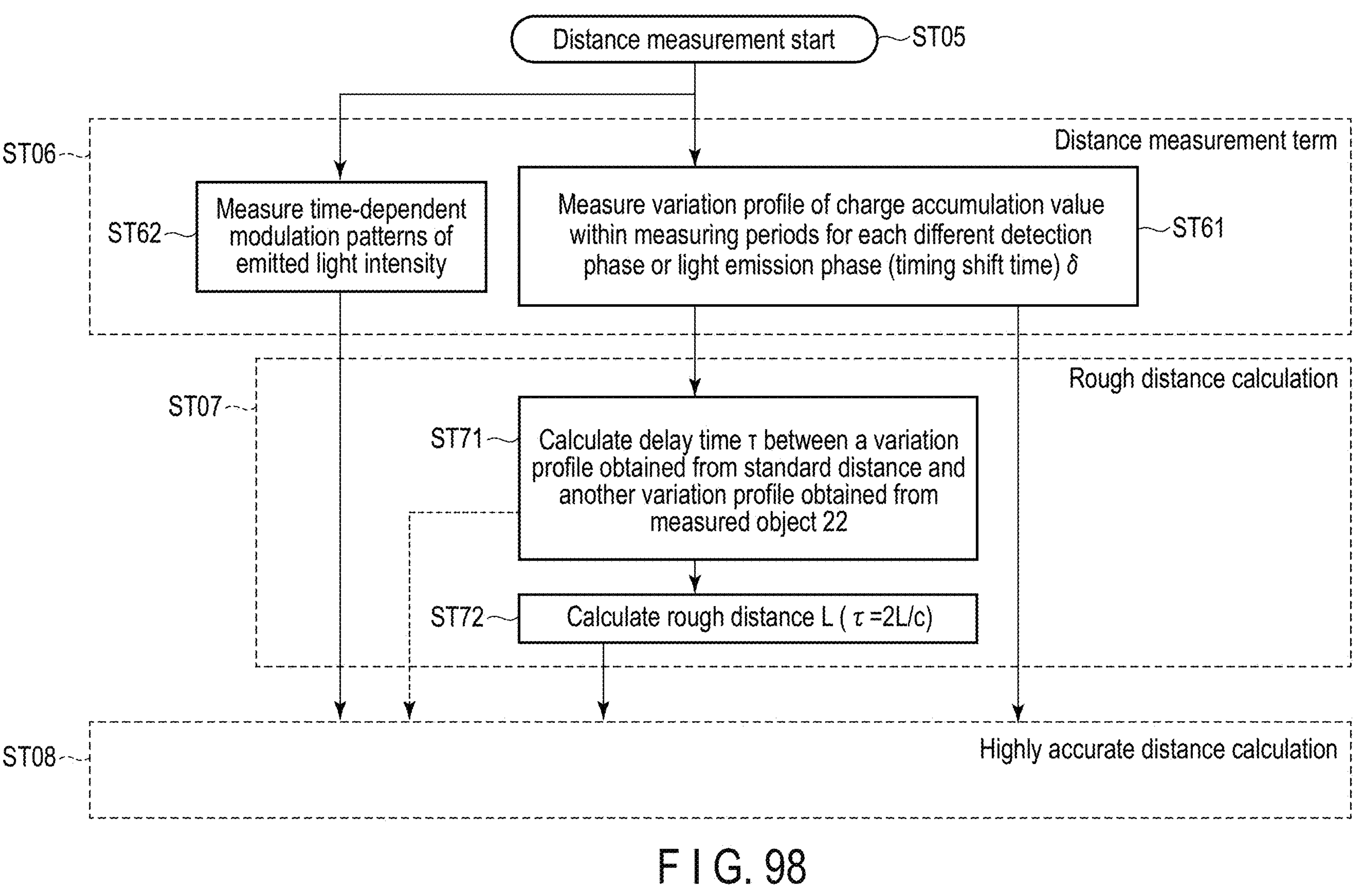
F I G. 98

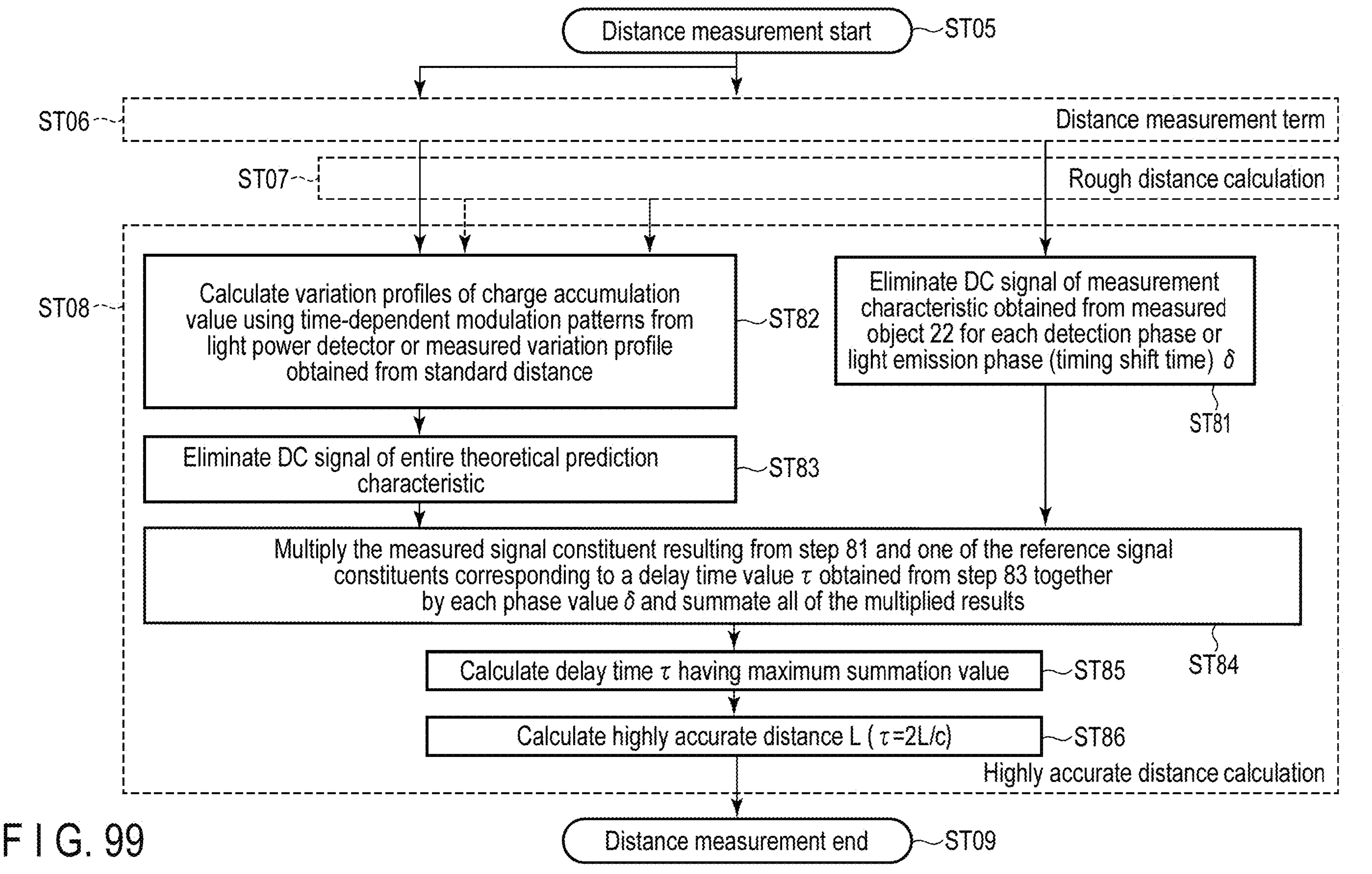
F I G. 99

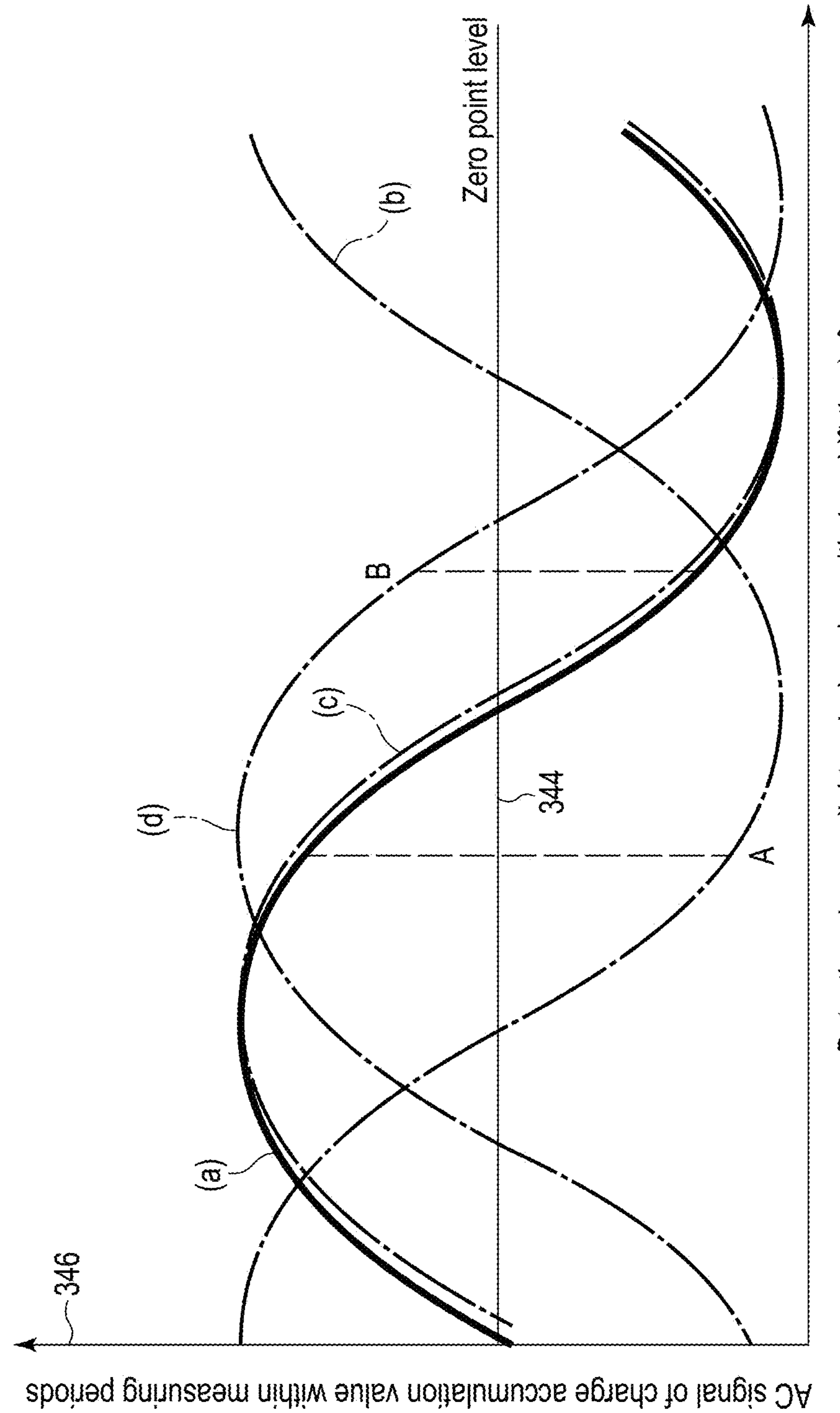
F I G. 102

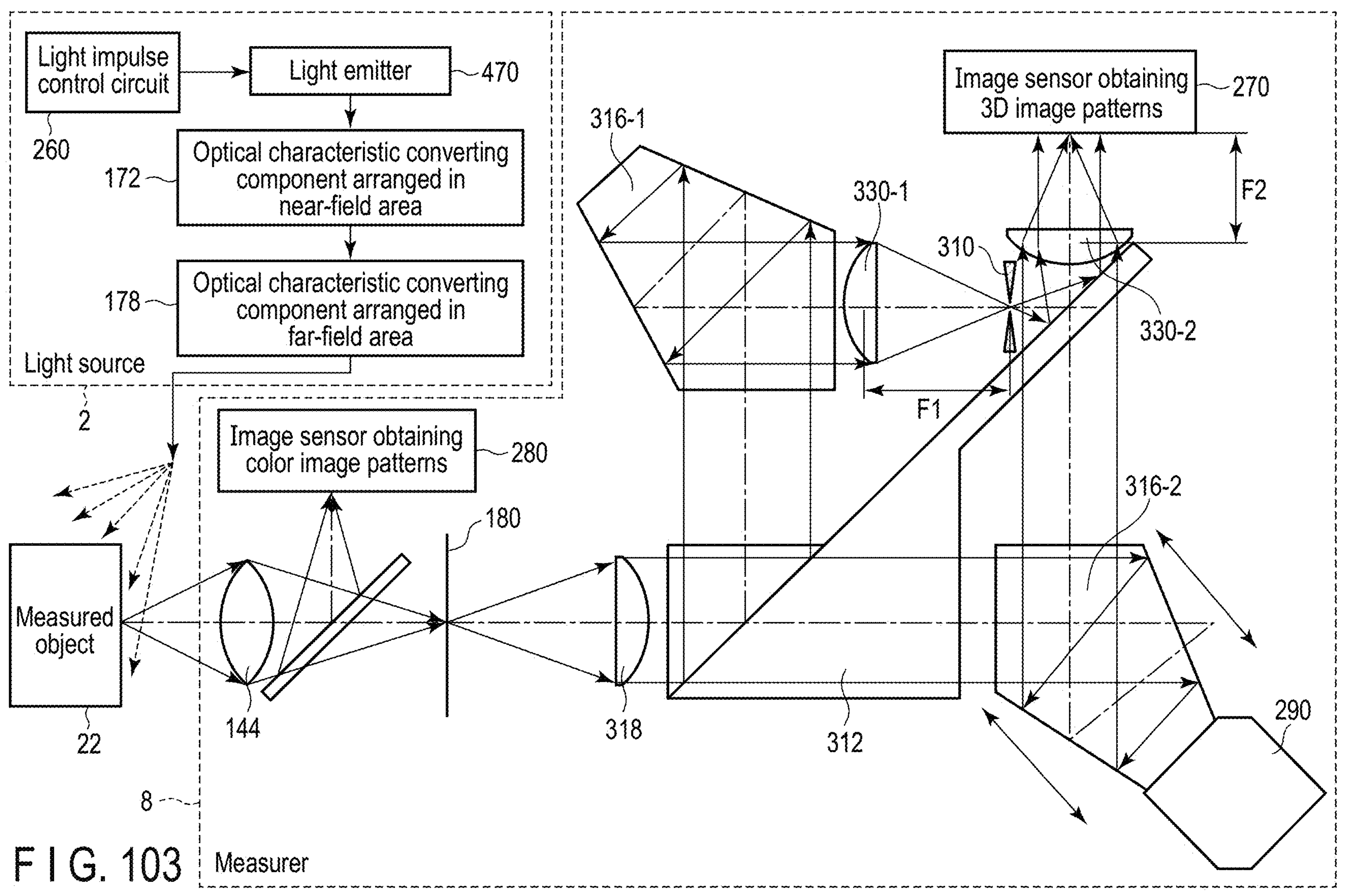
F I G. 103

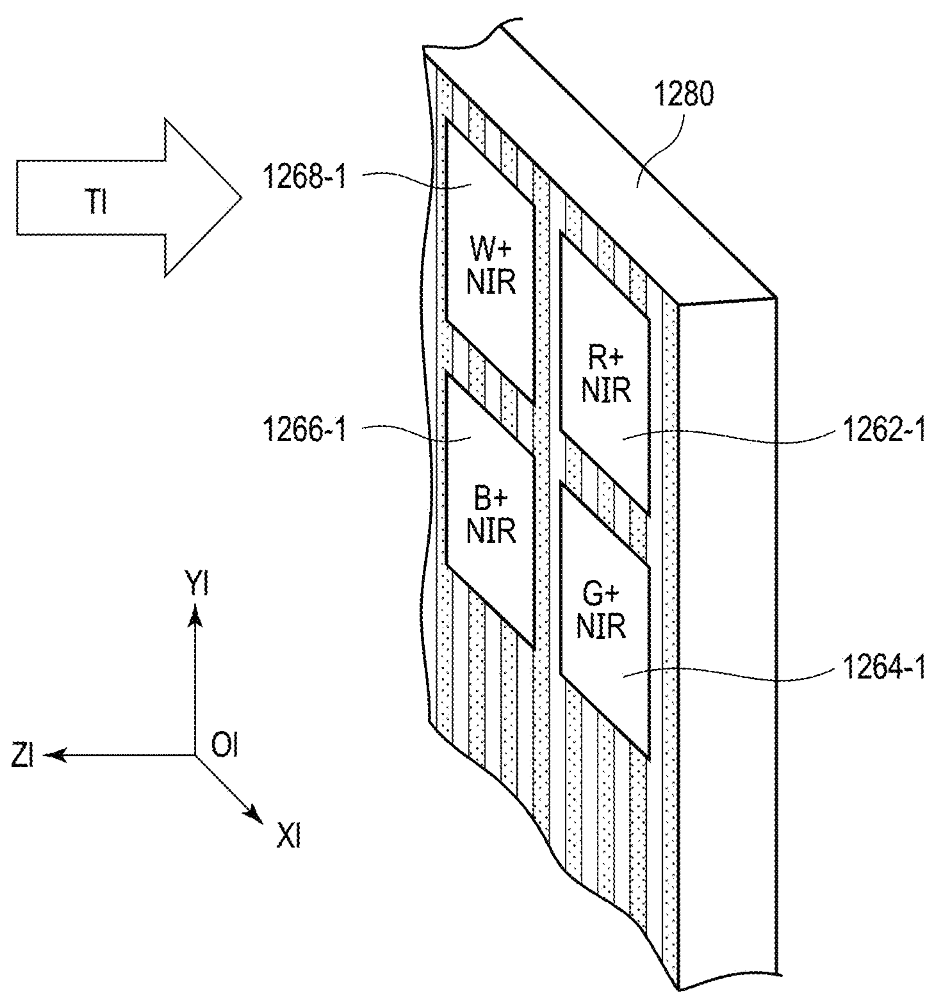
F I G. 106

OI → XI, ↓ YI (a)

| A1 | B1 | C1 | D1 | E1 | – – |
|---|---|---|---|---|---|
| A2 | B2 | C2 | D2 | E2 | – – |
| A3 | B3 | C3 | D3 | E3 | – – |
| A4 | B4 | C4 | D4 | E4 | – – |
| A5 | B5 | C5 | D5 | E5 | – – |
| – – | – – | – – | – – | – – | – – |

(b)

| Row number on image sensor (Row Number) (1800) | Column number on image sensor (Column Number) (1802) | Location value on XI-coordinate (1806) | Location value on YI-coordinate (1808) | Location value on ZI-coordinate (1810) | White intensity (1812) | Red intensity (1814) | Green intensity (1816) | Blue intensity (1818) |
|---|---|---|---|---|---|---|---|---|
| 1 | A | $X_{a1}$ | $Y_{a1}$ | $Z_{a1}$ | $W_{a1}$ | $R_{a1}$ | $G_{a1}$ | $B_{a1}$ |
| 1 | B | $X_{b1}$ | $Y_{b1}$ | $Z_{b1}$ | $W_{b1}$ | $R_{b1}$ | $G_{b1}$ | $B_{b1}$ |
| – – | – – | – | – | – | – | – | – | – |
| 2 | A | $X_{a2}$ | $Y_{a2}$ | $Z_{a2}$ | $W_{a2}$ | $R_{a2}$ | $G_{a2}$ | $B_{a2}$ |
| 2 | B | $X_{b2}$ | $Y_{b2}$ | $Z_{b2}$ | $W_{b2}$ | $R_{b2}$ | $G_{b2}$ | $B_{b2}$ |
| – – | – – | – | – | – | – | – | – | – |

FIG. 107

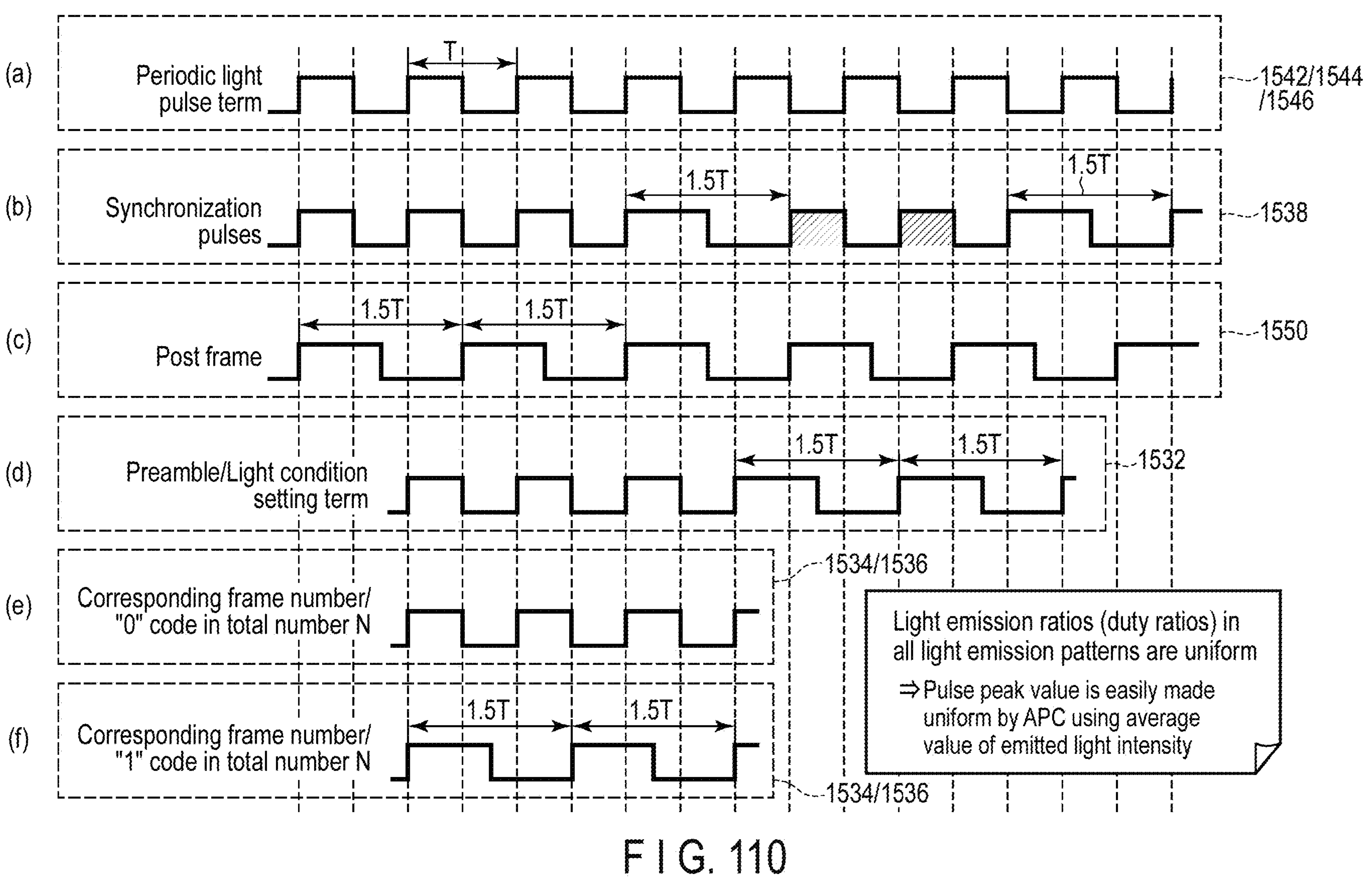
F I G. 110

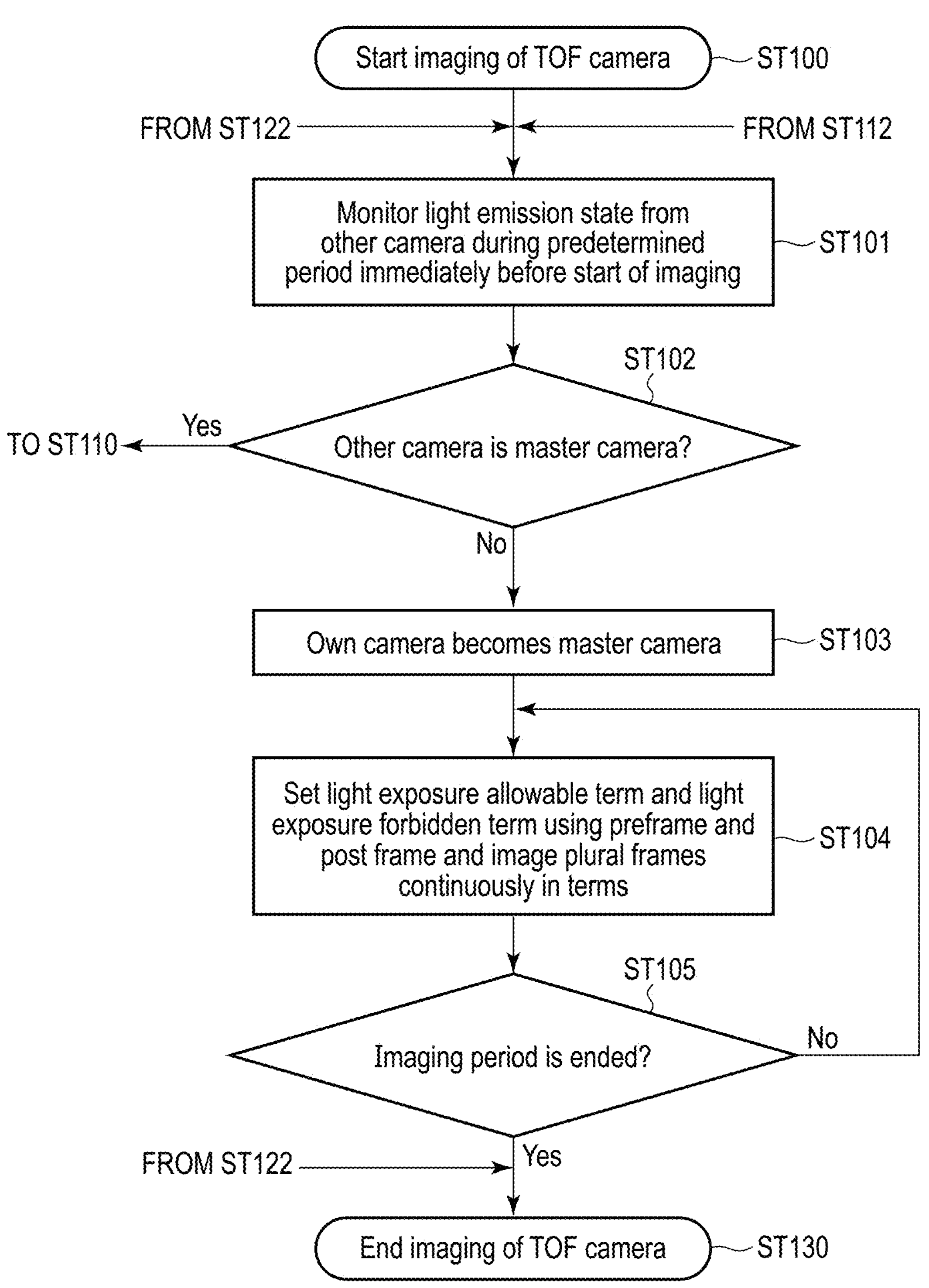
F I G. 112

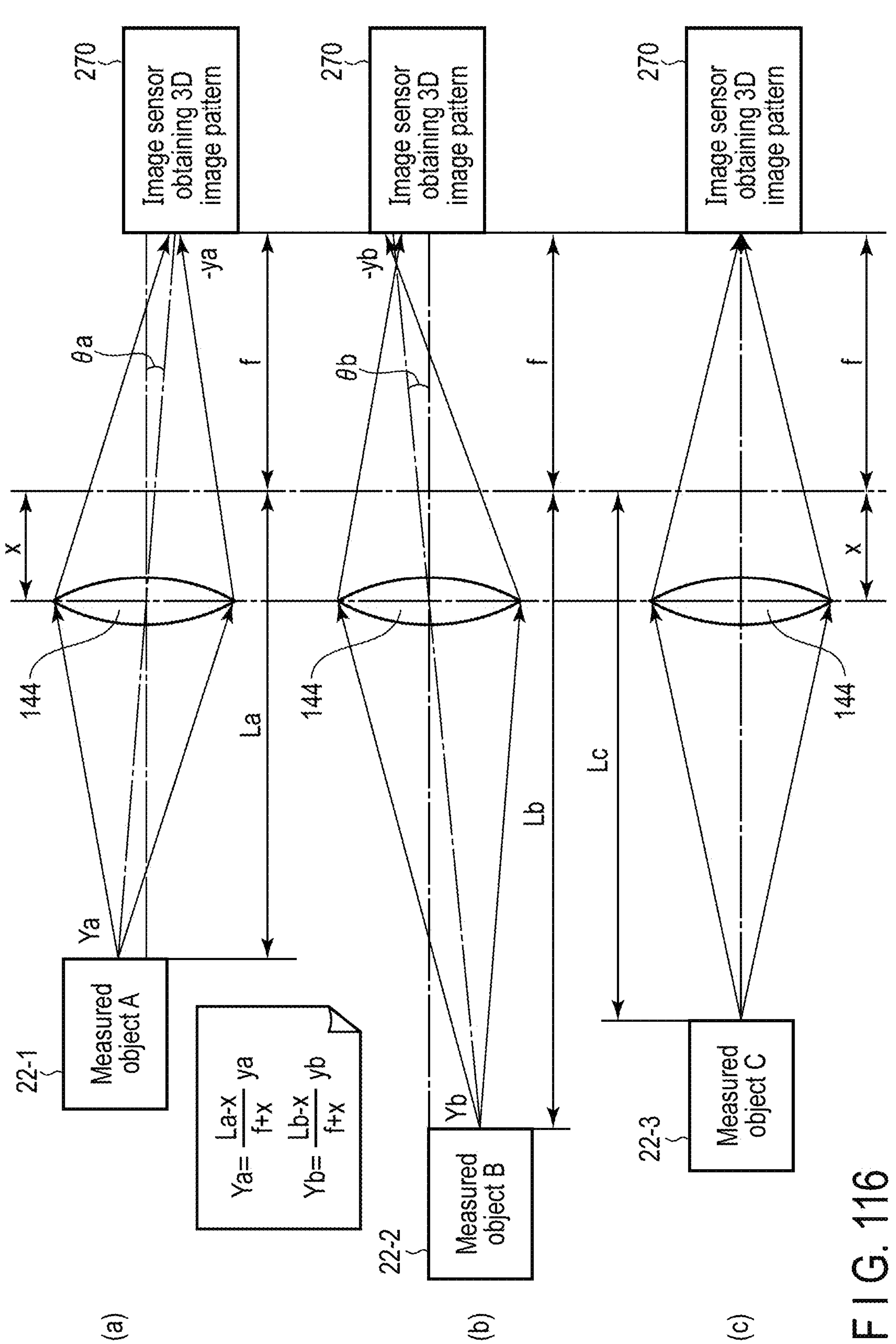
F I G. 116

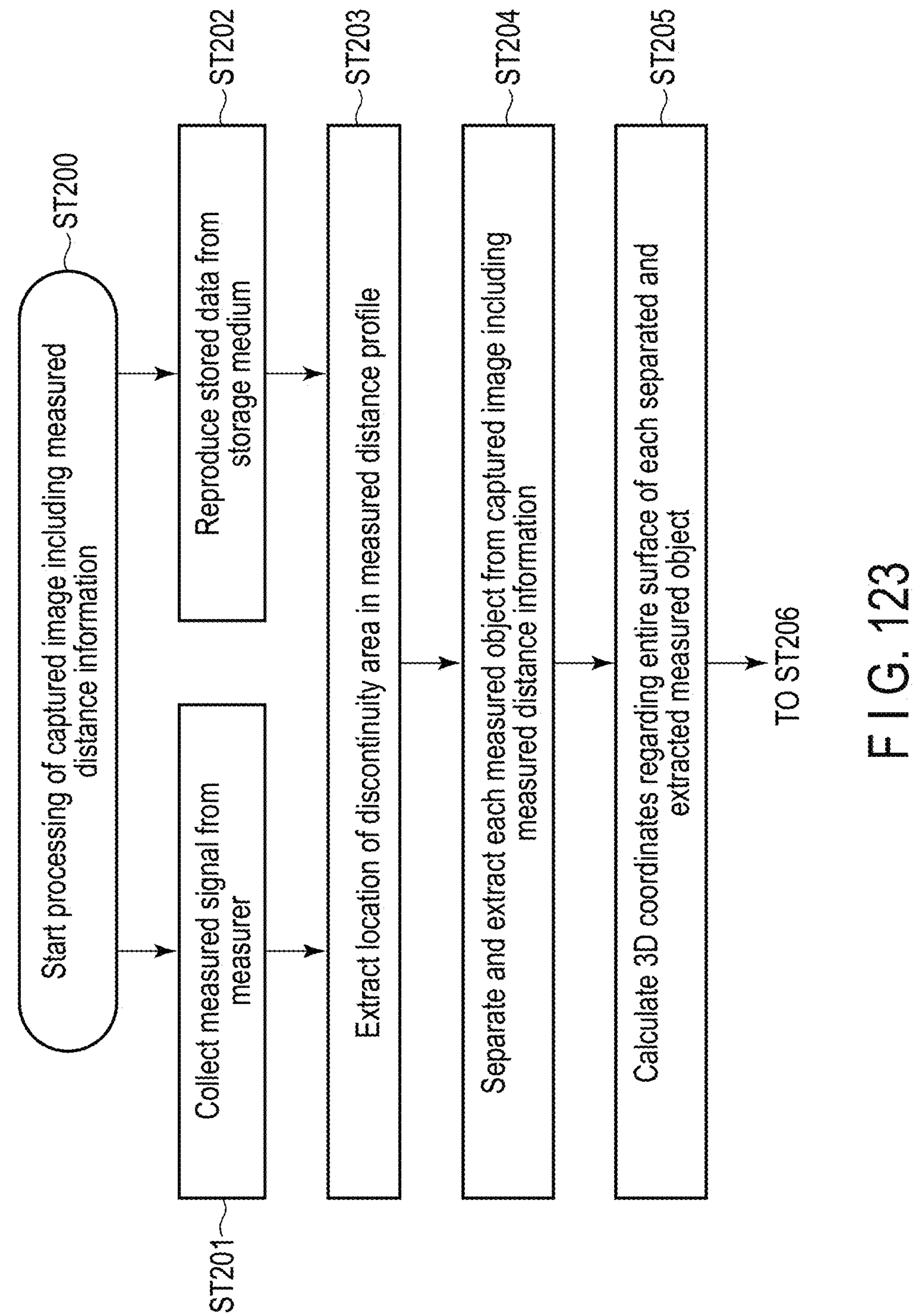
F I G. 123

OPTICAL DEVICE, LIGHT APPLYING METHOD, AND SERVICE PROVIDING METHOD

CROSS-REFERENCE TO RELATED APPLICATIONS

This application is a divisional of U.S. application Ser. No. 18/588,330, filed Feb. 27, 2024, which is based upon and claims the benefit of priority from prior Japanese Patent Applications No. 2023-029741, filed Feb. 28, 2023; and No. 2023-219945, filed Dec. 26, 2023, the entire contents of all of which are incorporated herein by reference.

BACKGROUND OF THE INVENTION

1. Field of the Invention

The present embodiment relates to the field of optical technology for controlling the characteristics of light itself, the field related to the component structure and optical system in light sources, the field related to the optical system/mechanical system/electrical control system structure in optical devices, the field of optical application technology using light or electromagnetic waves, the field of measurement and imaging processing using light, the field of signal processing and/or data analysis, the field of data analysis program, the field related to display technology and display contents, the field of optical communication, or the field of service provision using light.

2. Description of the Related Art

As for the profiles of light itself, in addition to wavelength profile, intensity distribution profile, and the profile of optical phase differences (including wavefront characteristics), various attributes such as directivity and coherence are known. There are various technologies for controlling the optical characteristics and attributes described above. The various technologies for controlling the optical characteristics and attributes described herein include temporal and spatial control techniques using optical or electrical methods.

As application fields using light, there are various application fields such as an optical characteristic converting technology, an optical characteristic converting technology, an optical display technology, an optical recording technology, a light processing technology, and an optical communication technology. Other known application fields include an imaging technology corresponding to the object, a technology for measuring spectral profile of the object to be measured, a length measurement technology, and a display technology. Furthermore, application fields such as 3D measurement combining the imaging technology and the length measurement technology have recently been developed. In addition, there are also application fields using measurement results such as the light reflection amount, transmission amount, absorption amount, and scattering amount or time-dependent changes thereof. Then, optimum characteristics and attributes of light are individually determined for each of these application fields. When the characteristics and attributes of light are optimized in this manner, maximum functionality can be achieved for each application field.

A method for providing an optimal service to users by utilizing various types of information obtained in the optical application field (including measured information) is known. Specific examples of method of providing services to users include the provision of proper information to users, optimization of user environments, and various controls corresponding to user requests. Other examples include the provision of interactive services between users and servers or between users, and the provision of services using activities on virtual spaces formed on a network.

BRIEF SUMMARY OF THE INVENTION

In all application fields using light, not limited in the above technical field, it is necessary to maximize the implementation effect in each field of optical application or in each field of service provision using light. For this purpose, it is necessary to realize appropriate characteristics and attributes of light or to acquire various types of information (including measured information) with high accuracy and reliability for each optical application field or service provision field, and provision of convenience, high added value, and high expressive power to the user is required. In addition, it is desirable to provide a synthesized light generation method, an optical characteristic converting component, a light source, an optical noise reduction method, a measurement method, an imaging method, a signal processing and/or data analysis method, a data analysis program, a display method, a communication method, a service providing method, an optical device, and a service providing system that can realize the above requirements.

Supplementary description will be added below regarding the above outlined problems. For example, in each field such as a display technology, a light measurement technology, an imaging technology, a light control technology, an optical recording technology, a light processing technology, and an optical communication technology, it is important to ensure high quality optical characteristics or electrical high quality. The "quality" mentioned here is greatly related to an optical or electrical signal to noise ratio (S/N ratio). On the other hand, if light with less optical interference noise can be provided to the optical communication technology, the accumulation density of spatial signals is improved, and large data transmission and data processing can be performed.

Furthermore, as an expression having a high realistic feeling in the display field or the image processing field, 3D expression or clear image expression is desired in recent years. In order to realize them, provision of light with less optical noise, provision of high-quality electrical signals with reduced electrical noise, and the like are required.

In each field of the display technology, the light control technology, and the optical communication technology and any field of the detection or measurement, imaging, and service provision, a signal processing and/or data analysis method using measured signals may be provided. The provision form of the data analysis method may be a hardware form, a software form, or a combination form of both. That is, a data analysis program for performing the signal processing and/or data analysis may be provided. As a result, the amount of noise in the measured signal is reduced, and a clear signal with high accuracy is increased.

As a method for reducing optical noise, the techniques of JP 2014-222239 A and JP 2000-206449 A described above are disclosed. In JP 2014-222239 A, the inclination angle of irradiation is changed for each emitting light from plural light sources. When plural light sources are used, the device tends to be complicated and large. On the other hand, when a single light source is used, the phase difference between irradiated lights at inclination angles is always fixed, so that the problem of increased optical noise occurs.

JP 2000-206449 A describes a method for reducing optical interference noise. However, in order to realize highly accurate detection or measurement or imaging, further reduction of optical interference noise is desired. Similarly, it is desired to reduce optical interference noise beyond the technology disclosed in JP 2019-015709 A.

According to M born & E Wolf: Principle of Optics (Tokai University Press, 1974) (M. Born and E. Wolf, "Principles of Optics," 6th Ed. (Pergamon Press, 1980), Chaps. 1, 7, 8, 10, and 13), there are two types of optical coherence: spatially partial coherence and temporally partial coherence. M born & E Wolf: Principle of Optics (Tokai University Press, 1974) (M. Born and E. Wolf, "Principles of Optics," 6th Ed. (Pergamon Press, 1980), Chaps. 1, 7, 8, 10, and 13) and F. Zernike, "The Concept of Degree of Coherence and Its Application to Optical Problems," Physica, vol. 5, No. 8 (1938) P. 785 to P. 795 disclose methods for reducing spatially partial coherence using spatial phase control. However, when this spatial phase control is performed, a problem of reduction of light utilization efficiency occurs. Therefore, it is desired to propose a technology in which the amount of reduction in light utilization efficiency is small (high utilization efficiency can be secured) even when optical noise is reduced.

In the present embodiment, an operation capable of performing optical synthesizing using signal accumulation along time direction or intensity summation is performed on each light element emitted from each of plural different light emission points. Here, the light emission timing between different light emission points is shifted to enable signal accumulation along time direction. In the operation that enables the intensity summation, the traveling direction of the light elements may be changed using the "partially discontinuous surface".

Here, the same light emitter may have a spatially wide light emitting area, and this wide light emitting area may include the plural light emission points. The "partially discontinuous surface" described above may be arranged in the near-field area or the near field with respect to the light emitting area. Then, an optical path length variation between the plural optical paths occurs by the action of the "partially discontinuous surface".

The measured object may be irradiated with irradiated light (first light or synthesized light) including the first optical path light element and the second optical path light element (that is, the first optical path light element and the second optical path light element obtained by disposing a "partially discontinuous surface" in the optical path) resulting from the "partially discontinuous surface", and the measured signal may be collected using detection light (second light) obtained from the measured object. In this case, the measured information may be calculated by performing signal processing and/or data analysis from the measured signal. Then, the signal processing results or data analysis results may be displayed. In addition, when it is determined that the measured signal is incompatible with signal processing and/or data analysis, the determination result may be displayed.

Here, the first measured signal constituent (reference signal constituent) may be extracted from the measured signal, the second measured signal constituent may be extracted from the measured signal, and the signal processing and/or data analysis may be performed according to the calculation combination of the first and second measured signal constituents.

In addition, a data analysis program may be used for signal processing and/or data analysis using the measured signal or determination on the measured signal. Here, plural signal processing and/or data analysis methods may be prepared, and the methods may be user-selectable. As a result, the user can select the time required for signal processing and/or data analysis and the accuracy of the results. Then, the above determination results or information obtained as a result of signal processing and/or data analysis may be displayed. Furthermore, service provision may be performed using the calculated measured information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a configuration diagram illustrating a system overview example in the present embodiment.

FIG. 4 is an explanatory diagram illustrating a procedure of measuring the profile of the measured object using light.

FIG. 6 is an explanatory diagram of an example of a combination related to two types of measured signal constituents used for signal processing and/or data analysis.

FIG. 7 is an explanatory diagram of an example of a combination related to two types of measured signal constituents used for signal processing and/or data analysis.

FIG. 10 is an explanatory diagram illustrating a transition example of notification contents to the user related to the imported measured signals.

FIG. 11 is an explanatory diagram illustrating a transition example of notification contents to the user related to the imported measured signals.

FIG. 12 is an explanatory diagram illustrating a transition example of notification contents to the user related to the imported measured signals.

FIG. 13 is an explanatory diagram of an example of a display image transitioning according to the user operation procedure.

FIG. 14 is an explanatory diagram of a display image example of the analysis software operation panel.

FIG. 15 is an explanatory diagram of a display image example of the analysis software operation panel.

FIG. 19 illustrates an experimental result of measuring the Wave Train profile.

FIG. 24 is an explanatory diagram of optical interference noise generated from a phase synchronizing type multipoint light emitter.

FIG. 25 is another related explanatory diagram related to optical interference noise generated from a phase synchronizing type multipoint light emitter.

FIG. 26 is an explanatory diagram of a problem in a case where a phase synchronizing type multipoint light emitter (wide light emitting area) is used for optical communication.

FIG. 27 is an explanatory diagram illustrating a problem in a case where a multipoint light emitter is used for display.

FIG. 30 is an explanatory diagram illustrating an example of a light emission control mode for the multipoint light emitter in a case where accumulation along time direction is used.

FIG. 31 is an explanatory diagram illustrating the temperature profile of the VCSEL light emission intensity.

FIG. 35 is an explanatory diagram of the method for using the optical phase unsynchronized characteristic between front and rear Wave Trains in the present embodiment.

FIG. 40 is an explanatory diagram of an embodiment example of a light source in which a multipoint light emitter and a partially discontinuous surface are combined.

FIG. 54 is an explanatory diagram of an application example in which the transmissive optical characteristic converting component is arranged in a near-field area.

FIG. 58 is an explanatory diagram of an embodiment example related to the reflective optical characteristic converting component.

FIG. 65 is an explanatory diagram of an embodiment of a case where optical characteristic converting components are arranged in both a near-field area and a far-field area.

FIG. 71 is an explanatory diagram of optical arrangement in an imaging method using the optical interference phenomenon in the present embodiment.

FIG. 75 is an explanatory diagram of the present embodiment example in a case of measuring a spectral profile of a measured object using transmitted light.

FIG. 86 illustrates an application example of an experimental system corresponding to an experiment for signal processing/data analysis.

FIG. 91 illustrates a basic configuration related to 3D measurement of color image/video obtained by combining a light source, a measurer, and signal processing/data analysis.

FIG. 94 illustrates a distance measurement method in which a detection phase is changed by effectively using a charge accumulation amount.

FIG. 98 illustrates an example of a distance measurement procedure in the present embodiment.

FIG. 99 illustrates an example of a distance measurement procedure in the present embodiment.

FIG. 102 is an explanatory diagram of a high-accuracy distance measurement method in the present embodiment.

FIG. 103 is an explanatory diagram of an ultra-high-accuracy distance measurement method in the present embodiment.

FIG. 106 illustrates 3D measurement coordinates based on the imaging sensor.

FIG. 107 illustrates an example of a data format of 3D color image information measured for each pixel.

FIG. 110 illustrates an example of a light emission format within a light exposure allowable term in the present embodiment.

FIG. 112 illustrates an example of cooperation between cameras in a case where a plurality of 3D measurement cameras are used.

FIG. 116 is an explanatory diagram illustrating a 3D coordinate estimation method of the measured object corresponding to an image forming lens position change in the present embodiment.

FIG. 119 is an explanatory diagram of an object separation/extraction method in the present embodiment.

FIG. 120 is an explanatory diagram of a method for providing distance information from a center of volume balance to a surface of an extracted object for each pixel in a development diagram in the present embodiment.

FIG. 121 is an explanatory diagram illustrating a structure of a system controller for embodying real size construction technology in the present embodiment.

FIG. 122 is an explanatory diagram illustrating a structure of a system controller for embodying real size construction technology in the present embodiment.

FIG. 123 is an explanatory diagram of a processing process related to generation of a 3D structure of an extracted target using measured distance information and a method for storing a generation result in the present embodiment.

FIG. 124 is an explanatory diagram of a processing process related to generation of a 3D structure of an extracted target using measured distance information and a method for storing a generation result in the present embodiment.

FIG. 125 illustrates an application example using the real size construction technology in the present embodiment.

DETAILED DESCRIPTION

A synthesized light generation method, an optical characteristic converting component, a light source, an optical noise reduction method, a measurement method, an imaging method, a signal processing and/or data analysis method, a data analysis program, a display method, a communication method, a service providing method, an optical device, and a service providing system according to the present embodiment will be described in the following procedure with reference to the drawings.

Chapter 1: System outline example, signal processing and/or data analysis, and result display example in the present embodiment Chapter 2: Study of characteristics of light having plural different wavelengths Chapter 3: Method for reducing optical interference noise in the present embodiment Chapter 4: Method for reducing speckle noise in the present embodiment Chapter 5: Method for generating optical path length difference in near-field area or near field thereof Chapter 6: Example of 3D imaging using optical interference in present embodiment Chapter 7: Example of method for measuring absorbance of single solute in solution Chapter 8: Example of method for measuring profile inside measured object 22 using specific reference signal Chapter 9: Example of 3D imaging example using spatial propagation speed of light Chapter 10: Embodiment example of real size construction As indicated by the above procedure, an overall system overview example in the present embodiment will be described in Chapter 1. Next, according to the basic system illustrated in FIG. 1 and FIG. 2, Chapters 2 to 5 describe a unique light generation method (in which intensity summation or accumulation along time direction is performed between light having low temporal coherence) and an optical embodiment example in the light source 2 that realizes the light generation method. Then, Chapter 6 and the following chapters describe various application forms using that unique light and describe the embodiment examples focusing on the operation of the measurer 8 and the signal processor and/or data analyzer 38 in relation to them.

Figure 2:
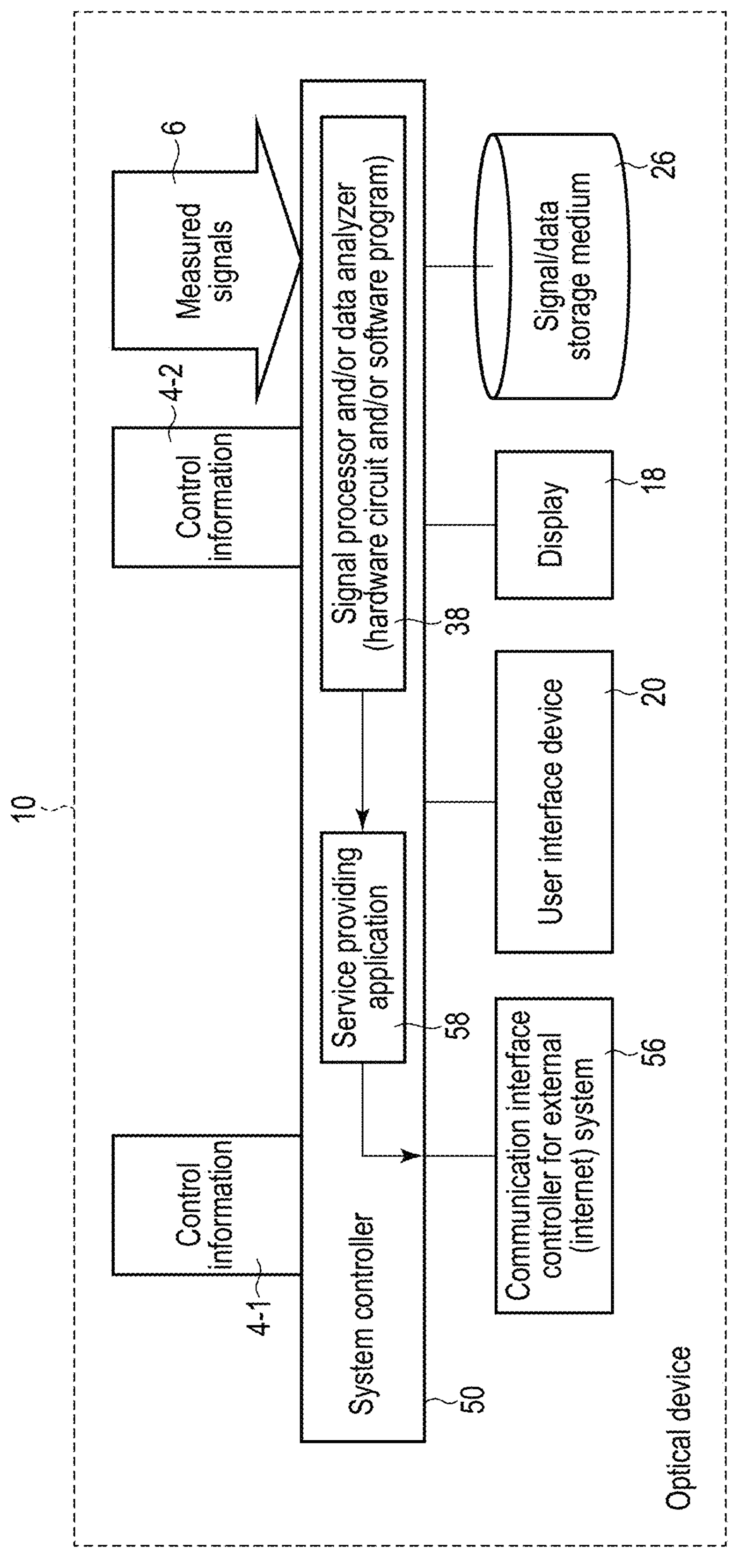
FIG. 2 is a configuration diagram illustrating a system overview example in the present embodiment.

Chapter 1: System outline example, signal processing and/or data analysis, and result display example in the present embodiment FIG. 1 and FIG. 2 show an example of system overview in the present embodiment. The present system embodiment example includes a light source 2, a measurer 8, and a system controller 50. The light source 2 emits irradiated light 12 corresponding to the first light. Then, a measured object 22 is irradiated with the irradiated light (first light) 12, and the measurer 8 detects/measures the second light obtained from the measured object 22 as detection light 16.

A light emitter 470 exists in the light source 2, and the light emitter 470 emits initial light 200. The initial light 200 emitted by the light emitter 470 may be either panchromatic light or monochromatic light, or may be light in between. Further, the initial light 200 emitted by the light emitter 470 may include all types of electromagnetic waves (X-ray to ultraviolet ray, microwave, millimeter wave, radio wave, etc).

This embodiment explanation calls "the prescribed Light having plural different wavelength lights within a wide wavelength range exceeding a width of 25 nm or 100 nm" panchromatic light in a broad sense. For example, a thermal light source such as an incandescent lamp, a halogen tungsten lamp, or a mercury lamp belongs to panchromatic light. White light also belongs to the panchromatic light. Therefore, sunlight also belongs to a kind of panchromatic light.

What is important here is that an optical interference phenomenon occurs even with panchromatic light including sunlight. As an example using an optical interference phenomenon of panchromatic light, an interference microscope is known. In this interference microscope, incandescent lamp light that has passed through the pinhole arranged at the converging position is used for the light source 2. Then, the narrow band light having passed through the optical band pass filter irradiates the measured object 22. Then, an enlarged image of the measured object 22 is observed in the measurer 8. From the deviation value of the interference fringes appearing in the enlarged image, the value of uneven different levels on the surface of the measured object 22 can be measured.

As described above, an optical interference phenomenon occurs even with panchromatic light (interference fringes appear). Therefore, even in panchromatic light, optical interference noise due to an optical interference phenomenon occurs. As a specific example, optical interference noise also appears in the spectral profile obtained from the measured object 22. In particular, in the near-infrared spectroscopy in the wavelength range of 0.8 to 2.5 μm, since the variation level of the measured signals 6 (the variation value of absorbance profile within the corresponding absorption band) is small enough, the influence of this optical interference noise appears significant.

Here, this embodiment explanation calls "the prescribed light including only wavelength lights in the wavelength range of a width of 25 nm or less" monochromatic light in a broad sense. There are some kinds of Laser light classified as monochromatic light, and each kind of Laser light has each wavelength range (wavelength width or spectral bandwidth). For example, the wavelength width of gas laser light or solid laser light is very narrow. On the other hand, semiconductor laser light has a half-width of wavelength (spectral bandwidth) of about 2 nm even for single mode light. Therefore, here, light having a wavelength width of 10 nm or less is classified into monochromatic light in a narrow sense. As optical interference noise appearing in imaging using laser light, speckle noise is known.

Here, light emitting diode (LED) light is positioned between panchromatic light and monochromatic light. However, this LED may also be interpreted as a kind of monochromatic light in a broad sense. As indicated by the above description, optical interference noise also occurs in LED light.

The light source 2 in FIG. 1 includes a light emitter 470, first to fourth optical paths 222 to 228, and an optical synthesizing area 220. Not limited to the embodiment in FIG. 1 and FIG. 2, for example, the optical synthesizing area 220 may be arranged in the near field of the measured object 22 (the surface, inside, or outside of the measured object 22).

This embodiment explanation calls "the emission light immediately after being emitted by the light emitter 470" initial light 200. At least a part of the initial light 200 passes through any one of the first optical path 222, the second optical path 224, the third optical path 226, and the fourth optical path 228. In addition, at least a part of the initial light 200 may pass over the plural optical paths 222 to 228. For example, it may pass through the third optical path 226 after passing through the first optical path 222. Here, as a method in which the initial light 200 passes through the optical paths 222 to 228, either a light transmission phenomenon or a light reflection phenomenon may be used, or both may be combined.

Here, the optical path length changes between the first optical path 222 and the second optical path 224, and the optical path length changes between the third optical path 226 and the fourth optical path 228. Furthermore, in a case where the same light emitter 470 has a spatially wide light emitting area, the optical path length between the first optical path and the second optical path may be changed within the near-field area to the light emitting area or a near field thereof (details are described later in Chapter 3).

Then, the light element 202 passing through the first optical path 222 and the light element 204 passing through the second optical path 224 (or the light element 206 passing through the third optical path 226 and the light element 207 passing through the fourth optical path 228) are synthesized (operated to perform intensity summation or accumulation along time direction) in the optical synthesizing area 220. The synthesized light (after performing intensity summation or accumulation along time direction) becomes the irradiated light (first light) 12. In the first light (irradiated light) 12, the occurrence of optical noise due to optical interference is small. Although not illustrated, an optical filter, a diffuser 460, an optical characteristic converting component 210, or the like may be further arranged at the outlet of the light source 2 to control the wavelength range or spatial coherence of the irradiated light (first light) 12.

According to the purpose of use, the optical device 10 may temporally vary the irradiated light intensity (emitted light intensity 338) along the time direction with respect to the irradiated light (first light beam). For example, in the case of measuring the spectral profile of the measured object 22, a constant light intensity in which the irradiated light intensity does not change for a long time may be continuously emitted. When the specific signal is transmitted to the measurer 8 using the detection light (second light beam) 16, prescribed intensity modulated light may be used as the irradiated light (first light beam) 12. Further, when distance measurement (length measurement) is performed on the basis of the delay time τ between an arrival timing of the detection light (second light) 16 and an irradiation timing of the irradiated light (first light) 12, pulsed light (or repetitive light pattern including a prescribed irradiated light intensity change in the time axis direction) of a specific cycle τ may be used as the irradiated light (first light) 12.

According to the embodiment example shown in FIG. 1 and FIG. 2, a signal interaction connecter 14 connects the light source 2 to the measurer 8. Then, through this, signal transmission performs between the light source 2 and the measurer 8. Using the signal interaction connecter 14 between the light source and the measurer, the measurer 8 may control the light intensity modulation signal, the pulse waveform, and the timing of the irradiated light (first light) 12 emitted from the light source 2. Not limited to that, using the control information 4-1 transmitted to the light source 2, the system controller 50 may control the temporal change or the repetition timing of the emitted light intensity 338 of the irradiated light (first light) 12.

At least one of a photodetector 250, a spectral component 320, and an imaging sensor 300 may exist in the measurer 8 that receives the detection light (second light) 16 obtained from the measured object 22. In a case where the measurer 8 includes the photodetector 250, the time-dependent change of the detection light intensity (measured light intensity 336) related to the detection light (second light) 16 is obtained as the measured signals 6. In addition, in a case where the measurer 8 includes the spectral component 320, the spectral profile of the detection light (second light) 16 is obtained as the measured signals 6. Furthermore, in a case where the measurer 8 includes the imaging sensor 300, image information (a movie image or a still picture image) for the measured object 22 is obtained as the measured signals 6.

Not limited to that, the same measurer 8 may include plural different optical components 250 to 320. For example, in a case where the same measurer 8 simultaneously owns the spectral component 320 and the imaging sensor 300, the spectral profile of each pixel of the measured object 22 can be measured.

The measurer 8 performs measurement based on the control information 4-2 transmitted from the system controller 50, and transmits the measured signals 6 obtained in the measurer 8 to the system controller 50. The control information 4-2 includes the type of the measured signals 6 (type of time-dependent change of detection light intensity (measured light intensity 336), spectral profile, and image information), the timing for performing these measurements, and the transmission timing of the measured signals 6, and the like.

The signal processor and/or data analyzer 38 in the system controller 50 performs signal processing and/or data analysis on the transmitted measured signals 6. Here, the processing form executed in the signal processor and/or data analyzer 38 may be either a hardware configuration or execution of program software, or a mixture of both.

Then, the measured information obtained as a result of the signal processing and/or data analysis moves into a service providing application 58 installed in the system controller 50. Then, the service providing application 58 analyzes the content of the measured information and provides an optimal service for the user. This content of the optimal service is transmitted via the network via a communication interface controller 56 for external (internet) system. The network transmission destination can be arbitrarily set to a cloud server, a web server; various control terminals, or the like.

As an example of providing the service to the user, it is possible to detect abnormal blood-sugar levels of the user and suggest 'how to cure the user of the abnormal condition' to the user and his/her physician. It is also possible to predict the user's stress status from the cortisol content in the blood and execute various stress-relieving controls (playing quiet music, lower illuminance of illumination, etc.)

Not limited to that, the user's biometric information may be collected and used to prevent improper operation not intended by the user, or to provide highly reliable services. Furthermore, the feeling and the health state of the user may be estimated from the facial expression, voice, movement characteristics, respiration, pulsation, blood component change, and the like, and the appropriate environment based on the estimation result may be provided to the user. As a result, the optical device 10 may provide comfortable service for the user.

The service providing application 58 installed in the system controller 50 determines the service content provided for the user. Not limited to that, the signal processor and/or data analyzer 38 may directly transfer the measured information to the communication interface controller 56 for external (internet) system. Then, a web server, a cloud server, or a mobile terminal may estimate or determine the service content provided for the user.

Then, using activities on a virtual space formed on the network, the web server, the cloud server, or the mobile terminal may provide a service for the user. For example, using the measured signals 6 collected from the real world, a virtual space imitating the simulated world is constructed on a cyberspace. Then, using the display 18, a service for displaying the content of activities such as an attraction occurring in the cyberspace or information desired by the user may be provided for the user.

The system controller 50 connects not only to the display 18 but also to a user interface device 20 with a user and to a signal/data storage medium 26. Specific examples of the user interface device 20 include a keyboard, a touch panel, a touch pad, a microphone with a voice recognition function, and an imaging sensor with an image recognition processing function. The user inputs necessary information to the system controller 50 via the user interface device 20.

As the signal/data storage medium 26, any recording device such as a magnetic recording device (hard disk or the like), a semiconductor recording device, or an optical memory can be used. The measured signals 6 transmitted from the measurer 8 may be temporarily saved in the signal/data storage medium 26, and the signal processor and/or data analyzer 38 may reproduce and utilize the measured signals 6 at a necessary timing. When the signal/data storage medium 26 is used, the effect of ensuring flexibility for signal processing and/or data analysis is created. And it is possible to perform advanced signal processing and/or data analysis that takes long time in real-time signal processing and/or data analysis.

In the system outline example in the present embodiment shown in FIG. 1 and FIG. 2, an optical device 10 usually has the signal processor and/or data analyzer 38. Not limited to that, for example, a calculation processor (a web server, a cloud server, a personal computer, an edge computer, a mobile terminal such as a smart phone, or the like) may connect to the outside of the optical device 10 as a service providing system, and the external calculation processor may have the signal processor and/or data analyzer 38.

Figure 3:
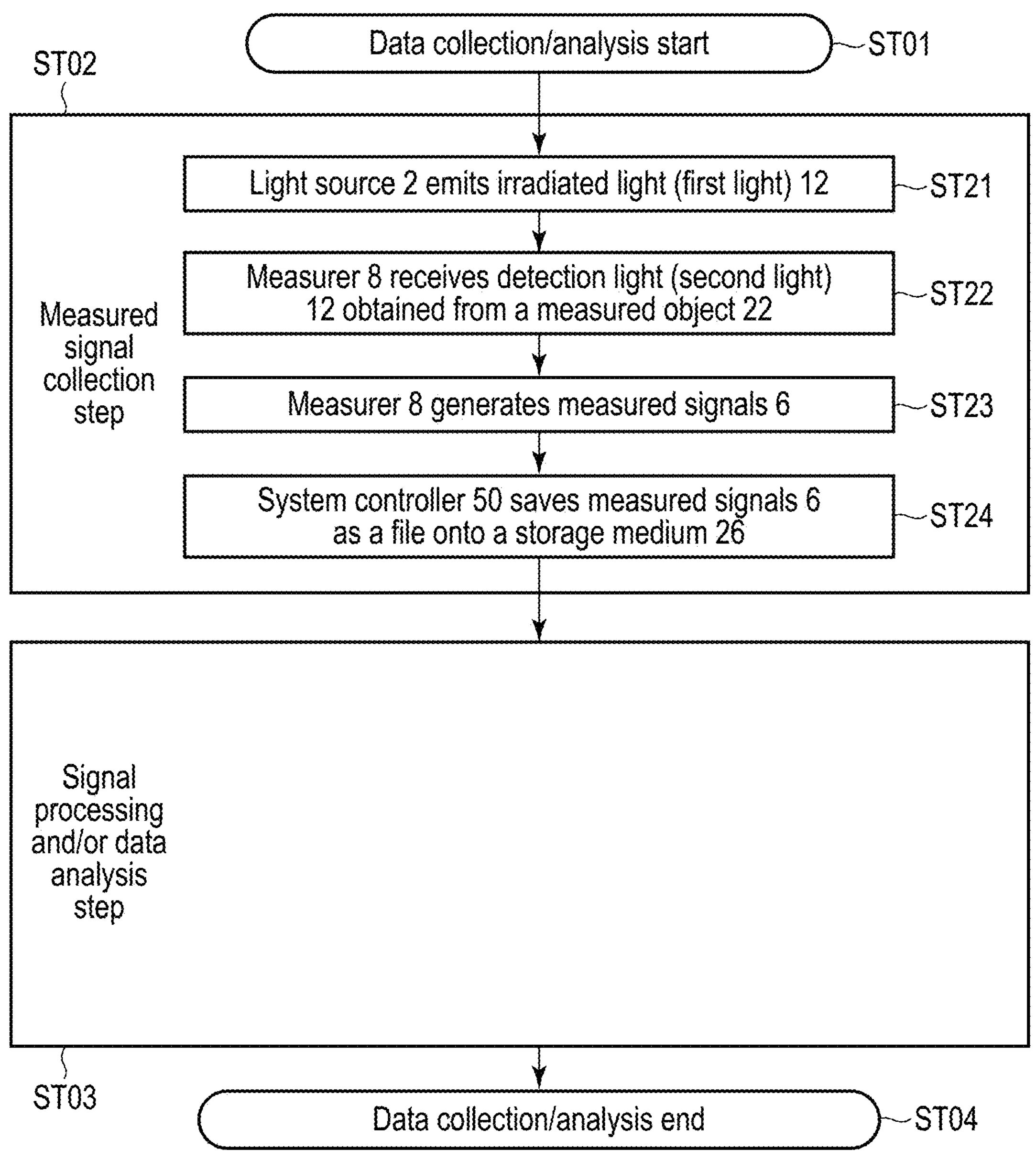
FIG. 3 is an explanatory diagram illustrating a procedure of measuring the profile of the measured object using light.

FIG. 3 and FIG. 4 illustrates an example of the method of signal processing and/or data analysis using the signal/data storage medium 26. Between the start (ST01) and end (ST04) of the measurement using light and signal processing and/or data analysis, there are a step of collecting measured signals 6 (ST02) and a step of signal processing and/or data analysis of the collected measured signals 6 (ST03).

In the step of collecting the measured signals (ST02) of collecting measured signals 6, the light source 2 emits the irradiated light (first light beam) 12 to irradiate the measured object 22 (ST21), and the measurer 8 receives the detection light (second light beam) 16 obtained from the measured object 22 (ST22). Then, in ST23, the measurer 8 generates measured signals 6 from the received detection light (second light beam) 16. Then, as indicated in ST24, the system controller 50 sequentially saves the measured signals 6 as a file onto the signal/data storage medium 26.

As a format (storage format) for saving the measured signals 6 in the signal/data storage medium 26 at this time, all the measured signals 6 may be saved in the form of a single file. Not limited to that, the measured signals 6 may be divided into plural files and saved. As a dividing method at this time, the measured signals 6 may be divided into files for each type (type of time-dependent change of detection light intensity or spectral profile, and image signals or the like). As another dividing method, the measured signals 6 transmitted by the measurer 8 may be divided into files and saved in chronological order (in order of transmission time).

In FIG. 3 and FIG. 4, Measured signal collection step (ST02) of collecting measured signals 6 and Signal processing and/or data analysis step (ST03) of collecting measured signals 6 are separated chronologically. Not limited to that, Measured signal collection step (ST02) of collecting measured signals 6 and Signal processing and/or data analysis step (ST03) may be performed simultaneously in parallel.

In the Signal processing and/or data analysis step (ST03), first, the signal processor and/or data analyzer 38 imports the measured signals 6 saved in a file in the signal/data storage medium 26 (ST31). In a case where the measured signals 6 are divided into files and saved in the signal/data storage medium 26, there is a risk that the signal processor and/or data analyzer 38 imports a wrong file. In order to avoid the risk, in the next step 32, the signal contents measured by the signal processor and/or data analyzer 38 is checked. At this time, in a case where the signal processor and/or data analyzer 38 imports plural files at the same time, it is also necessary to check the relationship between the plural imported files. Therefore, in ST32, the contents of the imported files are checked and the relationships between the different files are checked.

The confirmation result performed by the signal processor and/or data analyzer 38 is transmitted to the display 18, and the display 18 notifies the user of the confirmation result (ST33). The user pre-sets the measurement method or the analysis method for the measured object 22. This pre-setting is performed via the user interface device 20. Therefore, in a case where the user's pre-setting is wrong, the user is informed of the error status, thereby prompting the user to perform re-setting (ST33). Thus, the display of the confirmation result produces an effect of guaranteeing the measurement accuracy and the analysis accuracy.

Here, for example, plural signal processing and/or data analysis methods related to calculation processing time and accuracy of a result may be prepared. For example, options such as 'the accuracy of the obtained result will decrease, but the calculation process will take a shorter time' or 'the calculation process will take time, but a highly accurate result will be obtained' may be prepared in advance. Enabling user selection improves user convenience.

In ST34 after the user checks the above confirmation result, signal processing and/or data analysis is executed using the measured signals 6 imported by the signal processor and/or data analyzer 38. Then, the signal processor and/or data analyzer 38 transmits the result of the signal processing and/or data analysis to the display 18. In response to this, the display 18 informs the user of the result of the signal processing and/or data analysis (ST35). At the same time, the result of the signal processing and/or data analysis may be saved as a file (ST36) in the signal/data storage medium 26.

Using the measured information obtained as a result of the signal processing and/or data analysis, the Service providing application 58 estimates/determines the service content to be provided to the user. Alternatively, as shown in step 37, when a result of signal processing and/or data analysis (measured information) is transferred to the outside (a server, a cloud server, a personal computer, an edge computer, a mobile terminal such as a smartphone, and the like) via the communication interface controller 56 for external (internet) system, service provision from the outside to the user becomes possible.

Figure 5:
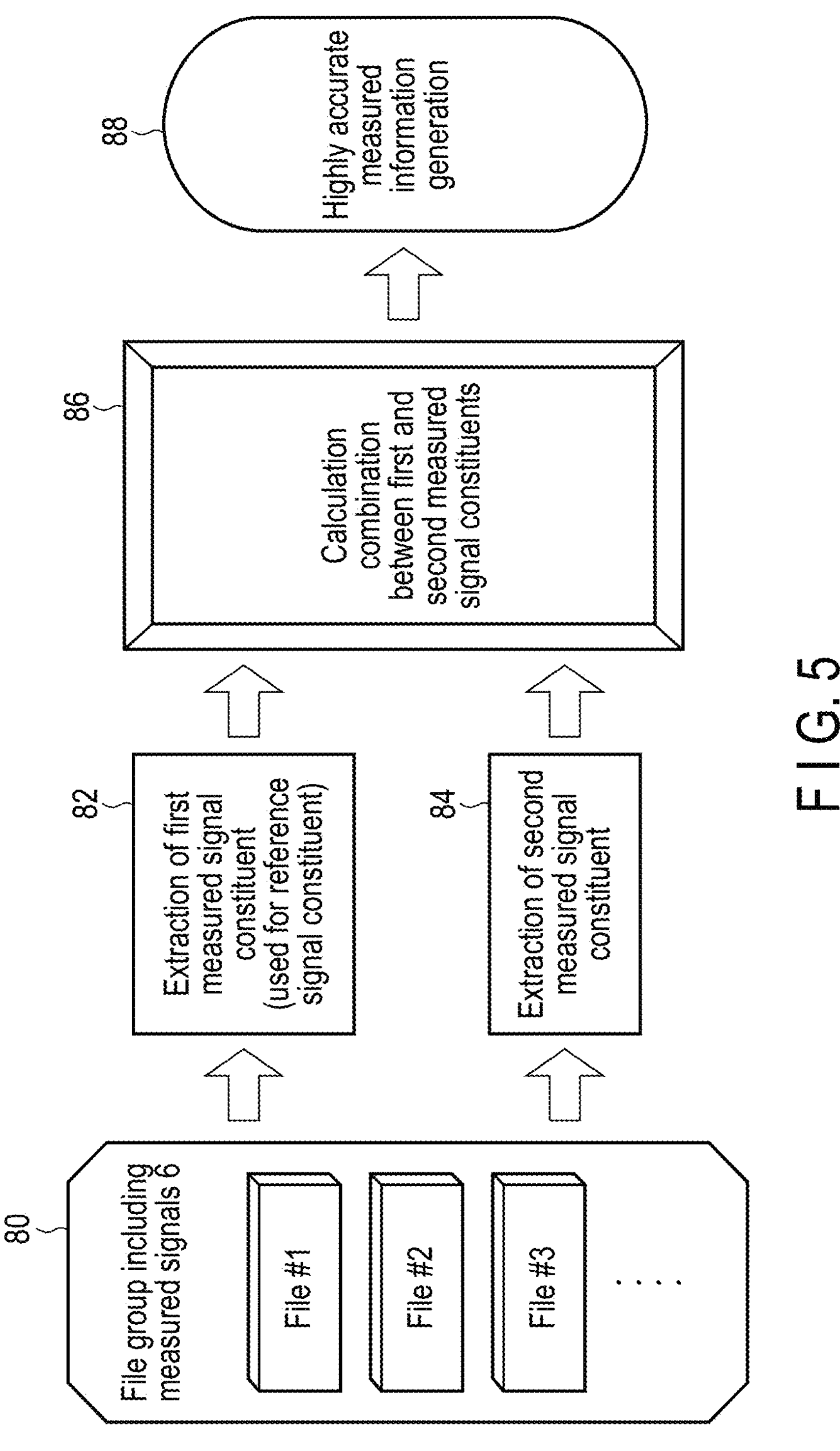
FIG. 5 illustrates an example of a procedure of signal processing and/or data analysis according to the present embodiment.

FIG. 5 illustrates an example of a basic concept regarding the method of signal processing and/or data analysis executed by the signal processor and/or data analyzer 38. A file group 80 including the measured signals 6 is saved in the signal/data storage medium 26. The signal processor and/or data analyzer 38 imports plural files #1 to #3 (ST31), and performs the extraction of the first measured signal constituent 82. The first measured signal constituent may be used as a reference signal constituent. At the same time, the signal processor and/or data analyzer 38 performs the extraction of the second measured signal constituent 84 from the plural files #1 to #3. Then, calculation combination between first and second measured signal constituents 86 is performed, and highly accurate measured information generation 88 can be performed.

FIG. 6 and FIG. 7 show an explanatory diagram illustrating a specific example of a first measured signal constituent (reference signal constituent) 104 and a second measured signal constituent 106. Specific examples of the optical application field 100 to which the above-described signal processing and/or data analysis is applied include, for example, a spectral profile measurement field such as absorbance profile measurement of the measured object 22, a 3D imaging field, and an imaging field using an interference phenomenon. Not limited to that, the processing described with reference to FIG. 5 may be performed in any technical field using the system (or the optical device 10) in FIG. 1 and FIG. 2.

As an example of a measured object type (category) 102 in the field of spectral profile measurement (absorbance profile), an embodiment example in which the spectral profile of a solute alone contained in a solution is measured will be described. In this case, the profile of the entire solution containing the solute is obtained as the measured signals 6. In addition, the profile of a solvent alone not containing a solute is also obtained as the measured signals 6.

As a specific example, in the case of a liquid solution of glucose in pure water, pure water corresponds to a solvent, and glucose corresponds to a solute. It is difficult to directly measure the spectral profile (absorbance profile) of glucose alone dissolved in pure water. However, it is possible to measure the absorbance profile of a liquid solution in which glucose is dissolved and the absorbance profile of pure water alone.

Here, the spectral profile obtained from pure water corresponds to the first measured signal constituent (reference signal constituent) 104 (spectral profile of the solvent alone), and may be saved as a single file #1 in the signal/data storage medium 26. In addition, the spectral profile obtained from the liquid solution of glucose corresponds to the second measured signal constituent 106 (spectral profile of the entire solution), and may be saved as a single file #2 in the signal/data storage medium 26. In this case, the signal processor and/or data analyzer 38 imports the file #1 and the file #2 from the signal/data storage medium 26. Then, the subtractive operation between the solution profile and the solvent profiles executed in the signal processor and/or data analyzer 38 corresponds to a calculation combination example 108.

As another embodiment example, when blood components analysis in vivo is performed, a pulsation profile of blood flowing in a blood vessel may be extracted as the first measured signal constituent 104 as a reference signal constituent. Then, spectral profile obtained from the entire living body is measured as the second measured signal constituent 106. As an example of the calculation combination example 108 in this case, there is a lock-in processing using the pulsation profile of the first measured signal constituent 104 as a reference signal, or pattern matching between a constituent profile and a pulsation profile (or waveform correlation coefficient calculation processing, etc.) may be performed.

Other than the above, the lock-in processing included in pattern matching in a broad sense as the calculation combination example 108 may be used for distance measurement (length measurement) of a time of flight (TOF) camera 28. In this case, the delay characteristic of the light reflection time from the measured object (photographed subject) 22 corresponds to the second measured signal constituent 106, and the measured signals 6 from the reference distance or the time-dependent emitted light intensity waveform of the irradiated light (first light beam 12) may be used as the first measured signal constituent (reference signal constituent) 104.

As another embodiment example, the position/displacement detection may be performed using an optical interference system. In this case, the light intensity pattern and the time delay amount of the detection light 16 obtained from the measurement point on the surface of the measured object (photographed subject) 22 may be used as the second measured signal constituent 106. The measured signal from the standard position using the light passing through the prescribed optical path may be used as the first measured signal constituent 104. Then, as the calculation combination example 108 of both, the distance (displacement amount) between the measurement point position and the standard position when the optical interference phenomenon is maximized may be calculated.

The embodiment example illustrated in the list in FIG. 6 and FIG. 7 merely illustrates examples to which the method of signal processing and/or data analysis executed in the procedure in FIG. 5 can be applied. Not limited to that, any signal processing and/or data analysis method that can be executed by the procedure in FIG. 5 is included in the present embodiment example.

Figure 8:
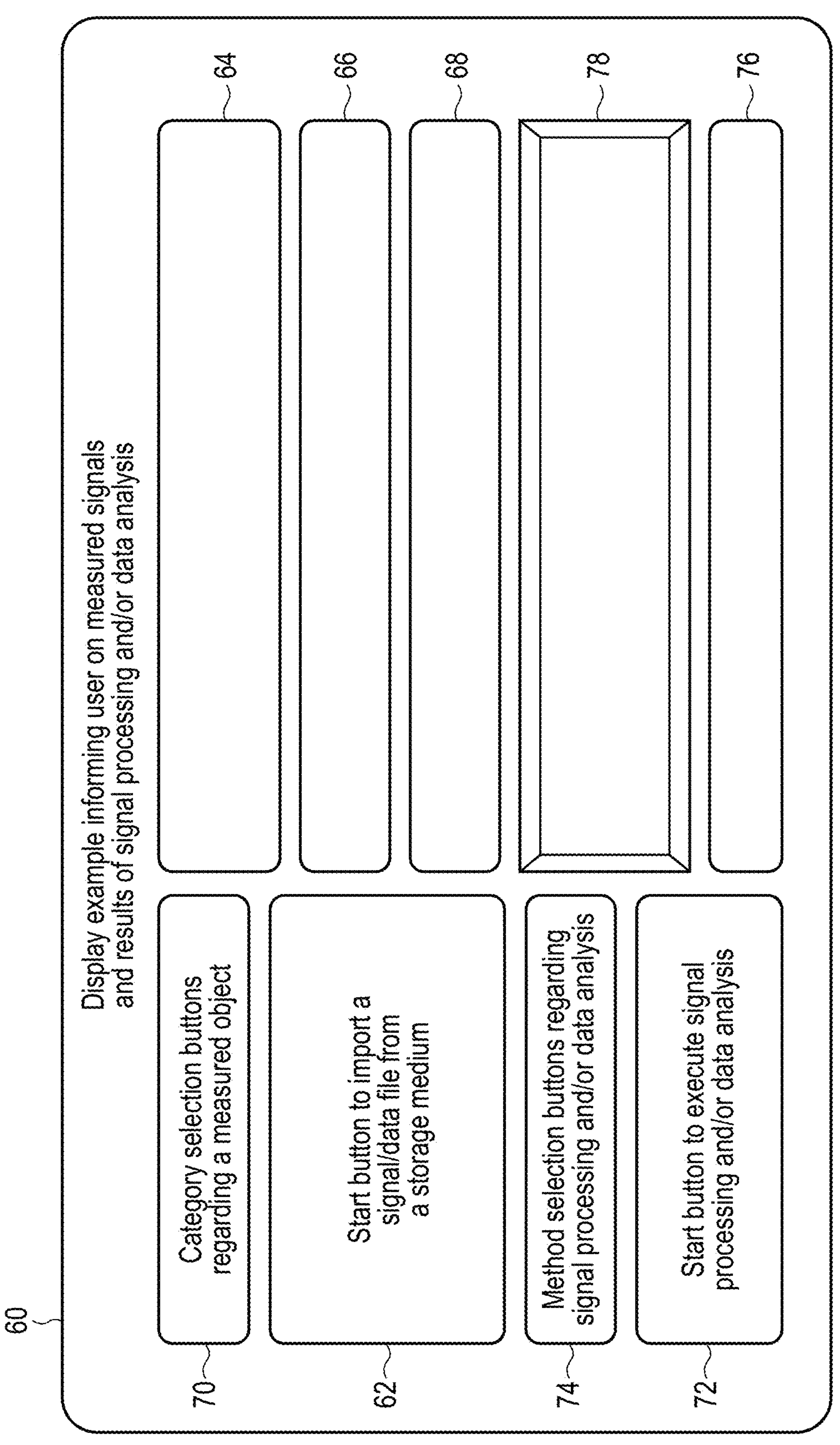
FIG. 8 is an explanatory diagram illustrating an example of a display image to a user related to signal processing and/or data analysis.
Figure 9:
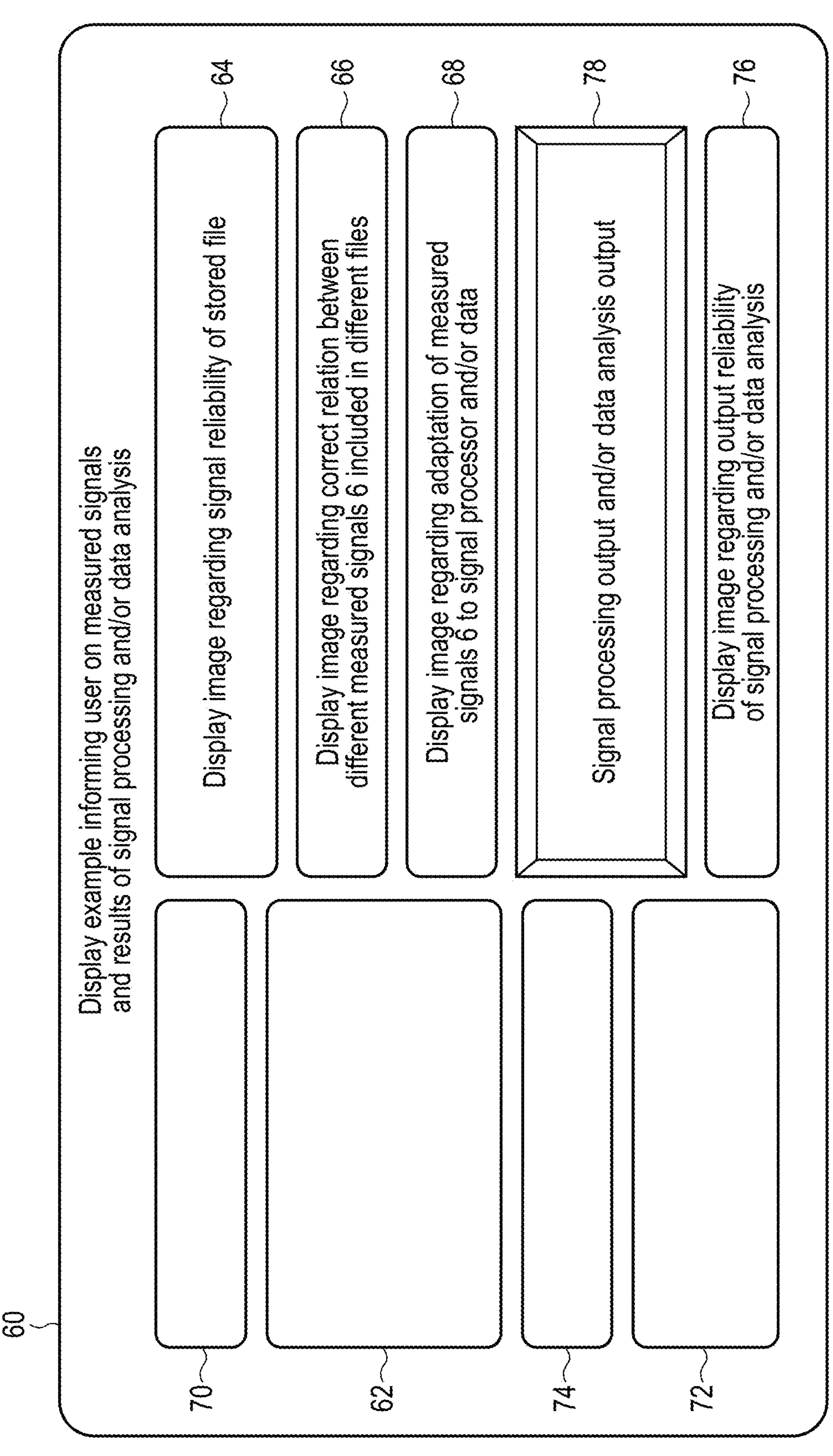
FIG. 9 is an explanatory diagram illustrating an example of a display image to a user related to signal processing and/or data analysis.

FIG. 8 and FIG. 9 illustrate an image example displayed by the display 18 to the user (display example 60 informing user) in steps 33 and 35 in FIG. 3 and FIG. 4. Here, for convenience of description, an example in which the items are simultaneously displayed in the same image is illustrated. However, the time-dependent timing may be shifted for each item.

The type (category) 70 of the measured object 22 in FIG. 8 and FIG. 9 means the type (category) related to the detection unit (transmission/reflection/scattering or the like) for the detection light (second light beam) 16, the form of the measured object 22, and its shape and structure. Here, the form of the measured object 22 indicates the form of a solid, a liquid, a gas, or the like. The profile of the measured object 22 in the liquid state can be selected by the user selecting the category selection buttons 70 regarding the measured object 22. When the measured object 22 is a solid, any shape/structure can be used for the measurement. Furthermore, any detection unit such as transmitted light beams, reflected light beams, and scattered light beams from the measured object 22 can be used for light measurement as the detection light (second light beam) 16.

Specifically, before starting the measurement, the user presses the "Category selection buttons 70 regarding the measured object 22". Then, a pull-down menu is displayed, and the image on which the user can select the detection unit (transmission/reflection/scattering and the like) of the detection light (second light beam) and the form and shape/structure of the measured object 22 is displayed. In this manner, the user selects the "Category selection buttons 70 regarding the measured object 22", whereby the measurement accuracy is greatly improved.

In a case where the same measurer 8 includes plural different optical components 250 to 320, the content of signal processing and/or data analysis varies depending on the content of the obtained measured signals 6. The signal processing and/or data analysis desired by the user can be confirmed with "Method selection buttons regarding signal processing and/or data analysis" 74, so that the convenience of the user is improved.

When the user presses "Method selection buttons regarding signal processing and/or data analysis" 74, for example, a pull-down menu appears, and the content of signal processing and/or data analysis desired by the user can be selected from a summary menu of time-dependent change of the detection light intensity, spectral profile, imaging, and the like. Then, when the user selects the displayed summary menu, a list of the measured object type (category) 102 (FIG. 6 and FIG. 7) may be displayed. The user selects a corresponding type (category) from the list of the measured object type (category) 102, and pre-setting necessary for signal processing and/or data analysis is completed.

Next, when the user presses the "Start button to import a signal/data file from a storage medium 26" 62, the process of importing the measured signals 6 saved as a file in the signal/data storage medium 26 described in step 31 in FIG. 4 is started. Then, it becomes possible to "check the measured signal contents and relationship between different files" described in ST32 in FIG. 4. Then, this check is executed by the user sequentially pressing three buttons from the top displayed on the right side of FIG. 8 and FIG. 9. Then, the confirmation result is displayed on the same image (corresponding to step 33 in FIG. 4).

In a case where there is no problem in the check result, when the user presses "Start button to execute signal processing and/or data analysis" 72, the execution processing of signal processing and/or data analysis is started. The result is then displayed on the image of "Signal processing output and/or data analysis output" 78. At the same time, the reliability evaluation result for the above result is displayed on the "Display image regarding output reliability of signal processing and/or data analysis" 76.

In this manner, by providing the pre-set image buttons 70 and 74 for setting conditions and the display images 62 to 68 necessary before and after signal processing and/or data analysis in detail, it is possible to prevent erroneous operation by the user. As a result, there is an effect of improving the operation accuracy of signal processing and/or data analysis.

FIG. 10 and FIG. 11 and FIG. 12 illustrate detailed contents of check regarding the measured signal contents and relationship between different files, and display image transition according to the confirmation result. That is, the left side of FIG. 10 and FIG. 11 and FIG. 12 coincides with display images 64 to 68 displayed on the upper right side of FIG. 8 and FIG. 9. Then, the confirmation results corresponding to the display images 64 to 68 is displayed as illustrated on the right side of FIG. 10 and FIG. 11 and FIG. 12.

The specific contents of checking the measured signal contents or checking the relationship between different files can be broadly classified into the followings:

a) Evaluation 64 on the signal reliability of saved file b) Evaluation 66 of relationship between measured signals 6 in plural different files c) Evaluation 68 on whether the range of signal amount saved in the file is proper a) The evaluation 64 as to the signal reliability of saved file is first described. For example, in a case where the spectral profile obtained from the measured object 22 is measured using the spectral component 320, it is necessary to measure dark signals and the optical transmission characteristics in advance. Here, the dark signals mean the measured signals 6 obtained from the measurer 8 in a state where the irradiated light (first light beam) 12 are not emitted. In addition, the optical transmission characteristics means the optical characteristics of the measured signals 6 obtained from the measurer 8 in a state where the irradiated light 12 is emitted in a state where the measured object 22 does not exist.

At the time of spectral profile measurement, the measured signals 6 obtained by arranging the measured object 22 are measured, and arithmetic processing with the dark signals or optical transmission characteristic is performed in the signal processor and/or data analyzer 38. Specifically, the signal obtained by subtracting the dark signals from the measured signals 6 obtained from the measured object 22 are divided by the optical transmission characteristic obtained by subtracting the dark signals.

Therefore, in the case of accurate measurement, the measured signals 6 obtained from the measured object 22 take larger values than the dark signals. The result of the division takes a value between 0 and 1 within all the measured wavelengths. If there is a defect in the above magnitude relation or if the value obtained by division is out of the prescribed range, the signal itself can be evaluated as unreliable.

In a case where the user designates (clicks) the "Display image regarding signal reliability of stored file" 64 in FIG. 10, for example, the above magnitude relation and the range of values obtained by division are determined. When the expected evaluation result is obtained, it is evaluated that the measurement result is correct, and the display image transitions to "Signal reliability of stored files is validated." 64-1. If the measurement result is evaluated to be incorrect, the display image transitions to "A problem is found with signal reliability. Retry to import the files" 64-2.

c) The evaluation 68 as to whether the range of the signal amount saved in the file is appropriate will be described next. When the light intensity of the detection light (second light beam) 16 obtained from the measured object 22 is low, the measurement accuracy generally decreases. Specifically, when the result obtained by dividing the signals obtained by subtracting the dark signals from the measured signals 6 by the optical transmission characteristic obtained by subtracting the dark signals is 20% or less (at least 5% or less), the measurement accuracy is significantly deteriorated. Therefore, in the present embodiment example, when it is determined that the division result is 20% or less (at least 5% or less), the signal processing and/or data analysis may be stopped by warning the user. As another determination criterion, when the measured signals 6 obtained from the measured object 22 are equal to or less than twice the dark signals (at least equal to or less than 1 time), the signal processing and/or data analysis may be stopped by warning the user.

When the user designates (clicks) the "display image regarding adaptation of signal amount range of measured signals 6 to the signal processor and/or a data analyzer" 68 in FIG. 12, the signal processor and/or data analyzer 38 evaluates the light intensity of the detection light 16 obtained from the measured object 22. If an appropriate light intensity is obtained, the display image transitions to "Signal processing and/or data analysis is possible because the signal amount range of measured signals is adaptable." 68-1. On the other hand, when the light intensity of the detection light (second light beam) 16 is too low, the display image transitions to "Signal amount range of measured signals is not adaptable. Signal processing and/or data analysis is not possible." 68-2 to warn the user.

b) The evaluation 66 of the relationship between the measured signals in the plural different files will be described at the end.

As described with reference to FIG. 5, in the present embodiment example, extraction 82 of the first measured signal constituent that can be used as the reference signal constituent 104 and extraction 84 of the second measured signal constituent are performed in parallel. In a case where the measured signal constituents 104 and 106 are saved in separate files, there is a risk that the user erroneously imports a different file.

In the present embodiment example, information for identifying the combination between different files may be recorded in the file name or a part of data in the file. The correctness/incorrectness of the combination between the different files may be evaluated using the identification information or the relevance of the file storage date and time method.

When the user designates (clicks) "Display image regarding correct relation between different measured signals 6 included in different files" 66 in FIG. 11, the signal processor and/or data analyzer 38 starts the above combination evaluation. When the combination is correct, the image transitions to "Reliability between plural imported files is validated." 66-1. On the other hand, if the combination is wrong, the image transitions to "There is a problem with the combination between plural imported files. Retry to import the files" 66-2 to warn the user.

Here, regarding the case of spectral profile measurement, specific evaluation method examples of the above (a) to (c) are described. Not limited to that, in the present embodiment example, evaluation/determination may be performed for any optical application field 100 by any method.

If an erroneous file saved in the signal/data storage medium 26 is imported, not only signal processing and/or data analysis is wasted, but also there is a risk that erroneous measured information 1018 is given to the user. As described above, in the present embodiment example, the imported signal contents and the combination between different files can be checked before the signal processing and/or data analysis. Thereby, not only erroneous signal processing and/or data analysis can be prevented, but also the accuracy of signal processing and/or data analysis can be guaranteed to the user.

FIG. 13 illustrates another embodiment example with respect to the display image in FIG. 8 and FIG. 9. The display image on the display 18 transitions in accordance with the user operation procedure. When the user starts signal processing and/or data analysis, Start image of data analysis program 800 is first displayed on the display 18. Then, immediately thereafter, the image transitions to User selection panel of analysis category 802. This image corresponds to a part of the "category selection buttons 70 regarding the measured object 22" and the "method selection buttons 74 regarding signal processing and/or data analysis" in FIG. 8 and FIG. 9. For example, in this image, first, an image is displayed on which the user can select the form of the measured object 22 (solid/liquid/gas), the shape/structure thereof, the detection unit (transmitted light beams/reflected light beams/scattered light beams), and the like. Then, next, a list of the optical application field 100 may be displayed, and an image on which the user designates and selects (clicks) the corresponding optical application field 100 may be displayed. Not limited to that, for example, a form in which the user directly inputs a text of the optical application field 100 may be adopted.

When the designation selection of the optical application field 100 depending on the user is completed, the display image on the display 18 transitions to User input panel 804. A part of User input panel 804 corresponds to the "Method selection buttons regarding signal processing and/or data analysis" 74 in FIG. 8. That is, when the user designates (clicks) the item "What type/content of analysis data?" on User input panel 804, a pull-down menu appears to the right of the item with a list of items in the field of the measured object type (category) 102. The user selects the corresponding item using the pull-down menu. In addition to the menu selection, the user may directly input the corresponding content by text to the corresponding portion.

In the user input panel 804, the user can set the setting conditions A/B. At the time of measuring the optical characteristics of the measured object 22, the measured object 22 is irradiated with irradiated light (first light beam) 12 in the present embodiment example. When the irradiation intensity and the irradiation form (continuous irradiation with a constant light intensity/irradiation with prescribed modulated light/irradiation with pulsed light) of the irradiated light (first light beam) 12 at this time can be set under the setting conditions A/B, user convenience is improved and measurement accuracy is improved. Not limited to that, for example, when the irradiated light (first light beam) 12 is irradiated in a pulsed manner (at intermittent timing), the pulsed light emission timing, the pulsed light emission period, the pulsed duty ratio, and the like may be set under the setting conditions A/B. As the pulsed light emission timing, a light emission phase value 342 and a phase division number described later may be set.

In addition, the period during which the measurer 8 uses the detection light (second light beam) 16 obtained from the measured object 22 may be set as an exposure time or a shutter time under the setting conditions A/B. When this period is set as a part of the setting conditions A/B, the effect of ensuring high measurement accuracy is created.

Furthermore, if the storage path (storage medium) of measured data can be designated at the data input stage of the user input panel 804 before the measurement is started, there is an effect that the measured signals 6 processing proceeds smoothly. In the field related to the storage path (storage medium) of measured data, designation of the signal/data storage medium 26, the directory (folder) hierarchy therein, and the individual file names therein are designated.

Once the user has completed information input or information selection for the required items in the user input panel 804, the signal processor and/or data analyzer 38 controls generation and storage of a measured signal 6. This execution status is displayed on a control panel of measurement management and measured data storage 806.

When the transmission of the measured signals 6 from the measurer 8 is completed, the screen transitions to a save file importing image 808. The imported data evaluation screen 810 to be displayed next corresponds to the display images 64 to 68 displayed in the upper right part of FIG. 9. After the user designates the content of the signal processing and/or data analysis on the user selection panel regarding signal processing method and/or data analysis method 812, the user sets the analysis conditions necessary for the signal processing and/or data analysis on a user input and selection panel regarding signal processing condition and/or data analysis condition 814. Then, the result of the signal processing and/or data analysis is displayed in the field of the analysis results in Control panel to execute signal processing and/or data analysis and to display analysis results 816.

When the display image changes (transitions) in accordance with the operation procedure to be performed by the user in this manner, user convenience is greatly improved. The procedure of the display image transition illustrated in FIG. 13 is merely an example of the embodiment, and any other transition procedure may be displayed.

FIG. 14 and FIG. 15 illustrate an application example of the display image displayed in ST33 or ST35 in FIG. 4.

When the data analysis program executed by the signal processor and/or data analyzer 38 is activated, Control panel of PuwS (Phase Unsynchronized Wave Synthesizing: registered trademark) analysis software 820 is first displayed. Alternatively, when "Category selection buttons 70 regarding the measured object 22" in FIG. 8 is pressed and "Liquid" is selected as the form of the measured object 22, the display image may transition to Control panel of PuwS analysis software 820.

Control panel of PuwS analysis software operation panel 820 includes four sheets. The sheet of How to operate? 822 describes the operation procedure (operation method) of the data analysis program. The sheet of Contact 828 describes the contact when a trouble occurs or a question occurs during the operation according to the operation procedure (operation method).

In the sheet of Data preparation 824, operations (control) up to ST34 (execution of signal processing and/or data analysis) in FIG. 4 are processed. Then, the processing after ST35 in FIG. 4 (displaying the results of signal processing and/or data analysis and saving the file) is executed on the sheet of Analysis result 826.

The measured signals 6 obtained by the measurer 8 are saved in the signal/data storage medium 26 in the form of a comma separated value (CSV) file. Therefore, this data analysis program performs signal processing and/or data analysis on the measured signals 6 saved in the CSV file format.

It is also possible to perform signal processing and/or data analysis on plural different measured signals 6 by shifting the processing time during the operation of the data analysis program. Here, in order to execute signal processing and/or data analysis on the next new measured signals 6, it is necessary to erase CSV data of the measured signals 6 processed immediately before that remains in the data analysis program. To do so, when Clear CSV of solvent data button 832 and Clear CSV of solution data button 842 are pressed (the corresponding area of the image is clicked), CSV data of the measured signals 6 processed immediately before can be erased.

Then, in order to execute signal processing and/or data analysis on the next new measured signals 6, a button of Import CSV of solvent data 834 and a button of Import CSV of solution data 844 are pressed (the corresponding area of the image is clicked). Then, the saved CSV file list is displayed for each folder (directory) in the signal/data storage medium 26, and the user can select the CSV file to be imported. At this time, there is a risk that the user selects a wrong CSV file.

The check of the contents of the CSV file executed in step 32 in FIG. 4 is executed by the button of Validation 836 in the field of Solvent data 830. Further, the check between the different CSV files is executed by the button of Validation 846 in the field of Liquid solution data 840. Here, only after both Solvent data 830 and Liquid solution data 840 are imported, the relationship between them (between different CSV files) can be checked. Accordingly, the sheet of Data preparation 824 specifies the user operation procedure from "ST01" to "ST06". That is, before Validation 846 in "ST06" is executed, Import CSV 834 and 844 of Solvent data 830 and Liquid solution data 840 designated in "ST02" and "ST05" are completed.

The specific content of Validation 836 displayed in 830 in Validation result of solvent data 850 is consistent with the content of a) Evaluation 64 on the signal reliability of saved file.

That is, when the dark signals and the data of the optical transmission characteristic measured in advance are recorded in the CSV of Solvent data 830, both the fields of Dark data 852 and Data if empty container 854 in Validation result of solvent data 850 are displayed as "Valid" 892. Conversely, when any data is not recorded in the CSV file, "Invalid" 892 is displayed.

Then, as described above, the reliability of Solvent data 830 itself is evaluated using the "magnitude relation between the measured signals 6 (Solvent data 830) and the dark signals" and the "range of division result of the measured signals 6 (Solvent data 830) with respect to optical transmission characteristic after subtraction of the dark signals". When the evaluation results show that the reliability is above the prescribed level, "TRUE" 882 is displayed in the field of Data of pure solvent Data 856. On the other hand, when sufficient reliability cannot be obtained, "FALSE" 884 is displayed to prompt the user for check.

The specific content of Validation 846 displayed in Validation result of liquid solution 860 corresponds to b) Evaluation 66 of relationship between measured signals 6 in plural different files described above.

That is, both the data of the dark signals and the data of the optical transmission characteristic described above need to be commonly recorded in both the CSV file of Solvent data 830 and the CSV file of Liquid solution data 840.

Therefore, in a case where the common dark signals and data of the optical transmission characteristic are recorded in both the CSV files 830 and 840, "Valid" 896 and "Valid" 898 are displayed in the column of Dark data 852 and the column of Data if empty container 854 in Validation result of liquid solution 860. On the other hand, when the two do not match, "Invalid" 890 is displayed. In addition, the evaluation contents and evaluation results to be displayed in the column of Solution data 858 in Validation result of liquid solution 860 coincide with the field of Solvent data 856 in Validation result of solvent data 850 described above.

Execution of Auto analysis 870 or Quick analysis 880 starts signal processing and/or data analysis (corresponding to ST34 in FIG. 4). In the signal processing and/or data analysis executed in the data analysis program, highly accurate measured information is generated 88 using the arithmetic processing 86 described with reference to FIG. 5. When high accuracy is pursued for the measured information generated here, the arithmetic processing 86 tends to take a long time. Conversely, when aiming to shorten the time of the arithmetic processing 86, the accuracy of the measured information tends to be relatively lowered.

When the auto analysis 870 is selected, highly accurate measured information is generated 88. Instead, the arithmetic processing 86 takes a relatively long time. Some users want to know the result of signal processing and/or data analysis in a short time without requiring high accuracy. In this case, when the quick analysis 880 is executed, the result can be known in a short time. When the user select the method of the arithmetic processing 86 performed by the signal processing and/or data analysis in this manner, it is possible to flexibly respond to the request for each user.

Chapter 2: Study of characteristics of light having plural different wavelengths As described above, the improvement of the optical or electrical S/N ratio is a major factor in securing the high-quality measured signals 6 and the clear image and signal with a sense of presence. For this purpose, in the optical application field and the field of service provision using light, it is important to reduce optical noise and reduce the influence of electrical noise (after signal processing is performed).

Most of optical interference noise occurs due to the phenomenon of optical interference. Therefore, in the optical application field and the field of providing services using light, "suppressing the occurrence of an optical interference phenomena of the light used" makes it easier to obtain a high-quality measured signal 6 and a clear image and signal with a sense of presence. Therefore, this chapter starts with a technical study on the interference principle of light.

In this chapter, research results on synthesized light (amplitude summation light) having plural different wavelength lights is described in the first (https://doi.org/10.1364/OE.441562). As described above, panchromatic light includes plural different wavelength lights. In addition, even in light generally called monochromatic light, completely monochromatic light is rare. Therefore, light generally called monochromatic light often has plural different wavelength lights.

Figure 16:
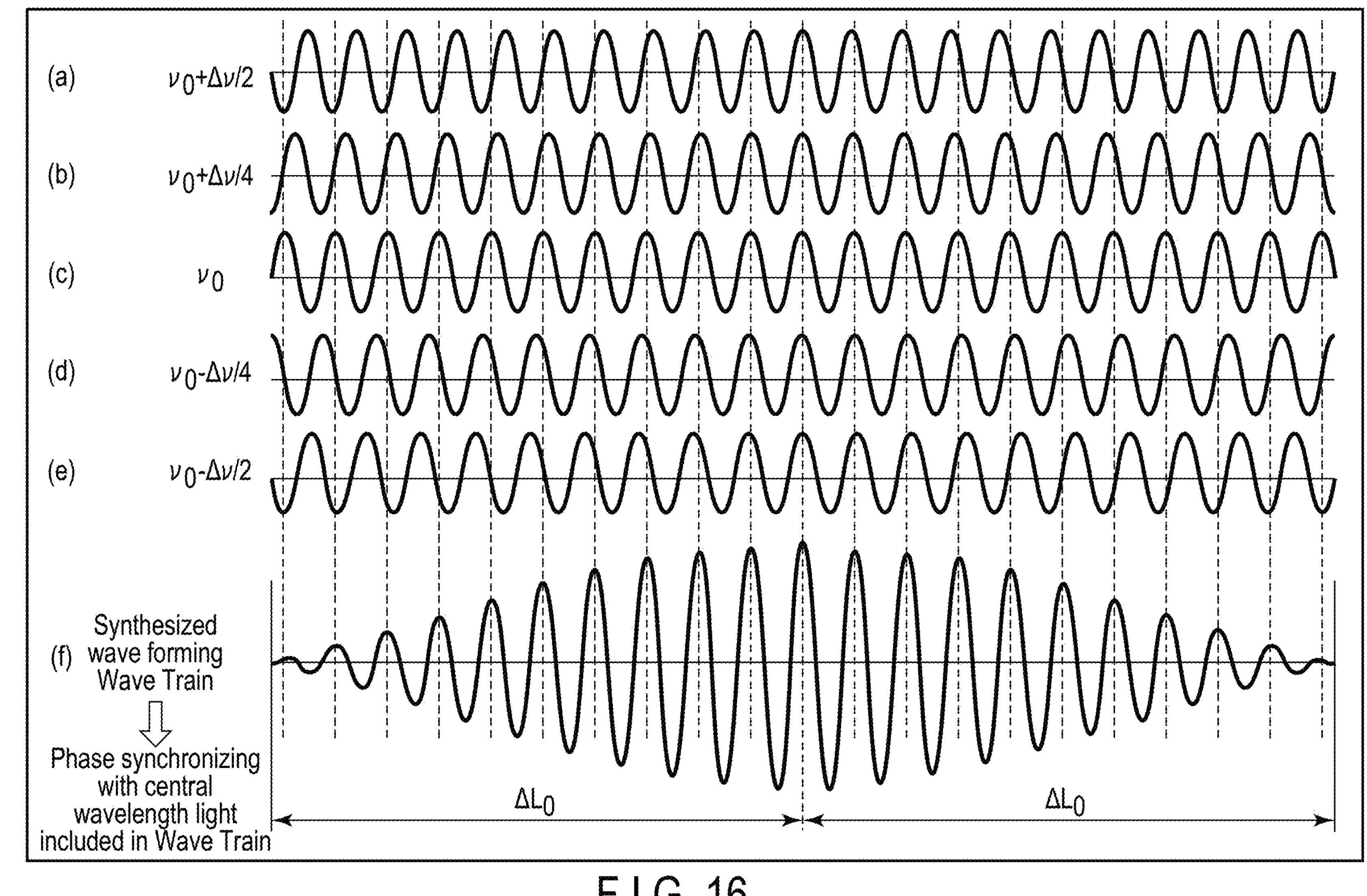
FIG. 16 is an explanatory diagram of a mechanism by which a set of light of different wavelengths constitutes a Wave Train.

The vertical axis in FIG. 16 indicates an amplitude distribution profile of the electric field at a prescribed time, and the horizontal axis indicates a spatial location along the light traveling direction. Here, FIG. 16(*c*) shows the traveling of the light having the central wavelength λ0 (the frequency ν0 corresponding to the central wavelength λ0). FIGS. 16(*a*) and 16(*e*) show the amplitude distribution profiles of the lights having each of wavelengths corresponding to the frequencies "ν0+Δν/2" and "ν0−Δν/2". Moreover, FIGS. 16(*b*) and 16(*d*) show the amplitude distribution profiles of the lights having each of wavelengths corresponding to the frequencies "ν0+Δν/4" and "ν0−Δν/4".

FIG. 16(*f*) shows the result of amplitude summation (synthesizing) of all wavelength lights. Here, the amplitude summation means arithmetic processing of summating the total amplitude distribution of the electric field along the traveling direction of each light at a prescribed time within the spectral bandwidth (wavelength width) Δλ (or the frequency width Δν). This arithmetic processing is not merely mathematical arithmetic processing, and the amplitude summation (synthesizing) operation forms a kind of physically synthesized wave.

As shown in FIG. 16(*f*), a large amplitude undulation occurs in the synthesized wave. In Chapter 7 in "Principles of Optics" (M. Born and E. Wolf, "Principles of Optics," 6th Ed. (Pergamon Press, 1980)), this one cluster of undulations with amplitude is called Wave Train. This Wave Train is not merely a mathematical description (logical model), and Wave Train is a physical existence that is to be described later with reference to FIG. 19.

According to FIG. 16, in a case where the positions (phases) of the peaks of all the wavelength lights coincide with each other at the center position, the added (synthesized) amplitude forms the maximum value (peak height) at the center position in FIG. 16(*f*). That is, when the near field of the center position of Wave Train is mathematically decomposed into different wavelength lights, it appears that "each of phases is synchronized between the different wavelength lights". But in response to FIGS. 16(*a*) to 16(*e*), it is difficult to consider that the positions (phases) of the peaks of all wavelength lights coincide at the center position 'by chance'. It may be considered that this phase synchronizing phenomenon at the center position results from a physical "stimulated emission phenomenon (induced emission phenomenon)" described later with reference to FIG. 21.

The phase shift phenomenon occurs between wavelength lights as it moves from the center position to the right and left in FIG. 16. Then, at both left and right ends in FIG. 16, phases between wavelength lights are completely random. As described above, since the phase shift phenomenon occurs between the wavelength lights at the peripheral positions (both left and right ends) in FIGS. 16(*a*) to 16(*e*), the maximum value (amplitude value of the envelope) of the amplitude profile of the entire Wave Train (FIG. 16(*f*)) obtained by amplitude summation (synthesizing) of these amplitudes decreases.

With respect to Wave Train profile illustrated in FIG. 16(*f*), the spatial distance from the center maximum amplitude position to the position where the maximum value of the amplitude (amplitude value of Wave Train envelope profile) becomes "0" represents "ΔL0". FIG. 16 shows that the value of "ΔL0" depends on a combination between the spectral bandwidth (wavelength width) Δλ (or frequency width Δν) corresponding to a range of the amplitude summation.

As indicated by the broken line in the vertical direction connecting FIGS. 16(*c*) and 16(*f*), the phase of the Wave Train coincides with the phase of the light having the central wavelength λ0 (the frequency ν0 corresponding to the central wavelength λ0), and Equation 1 mentioned later explains this phenomenon. As described above, Wave Train profile greatly changes depending on the values of the spectral bandwidth (wavelength width) Δλ (or the frequency width Δν) and the central wavelength λ0.

Figure 21:
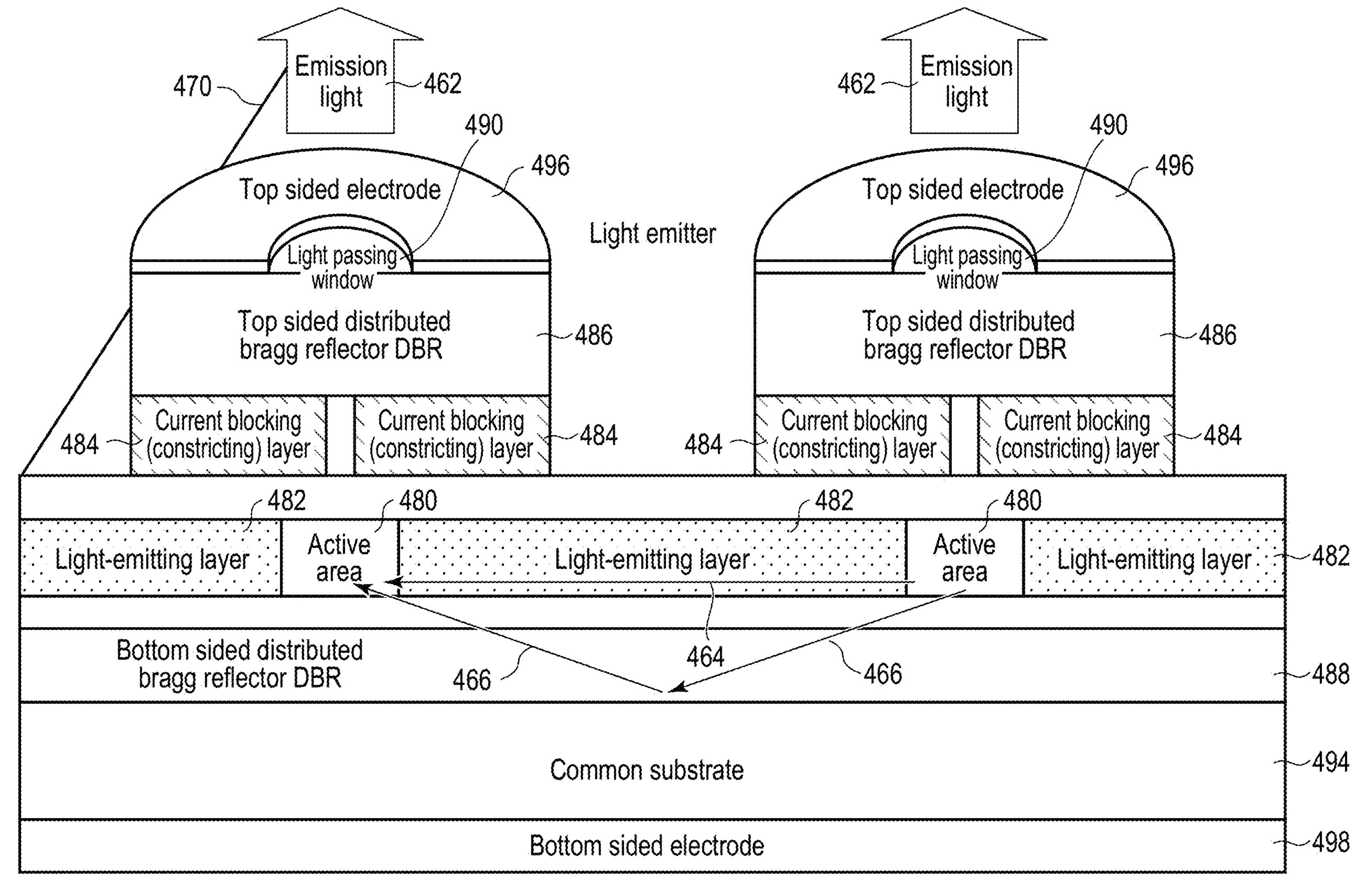
FIG. 21 is an explanatory diagram illustrating a cross-sectional structure example of VCSEL.

In the system overview example in the present embodiment shown in FIG. 1 and FIG. 2, the values and definition methods of the central wavelength λ0 and wavelength width Δλ are different in each of the following:

1. Plural different wavelength lights included within the emission light 462 emitted from the wide area light emitter (multipoint light emitter) as shown in FIG. 21;
2. Plural different wavelength lights included in the irradiated light (first light) 12;
3. Plural different wavelength lights included in the detection light (second light) 16; and
4. Plural different wavelength lights included in a prescribed unit measured in the measurer 8 (for example, wavelength resolution in the spectral component 320=wavelength range detected within one cell (prescribed unit)).

Therefore, the Wave Train profiles are different for each light from the above 1 to 4. And it is necessary to clarify the definition method of the central wavelength λ0 and the definition method of the wavelength width Δλ in plural different wavelength lights included in the various types of light from 1 to 4 above.

First, "1. Plural different wavelength lights included within the emission light 462 emitted from the wide area light emitter (multipoint light emitter) as shown in FIG. 21" is described. If a laser diode is used as the light emitter 470, plural different wavelength lights are also included within the emission light beam 462 from the "single-mode" diode in the wavelength direction. In the specific tables of many laser diodes, values of the spectral bandwidth (half-width along wavelength) Δλ are listed.

The value of the central wavelength λ0 at this time is included in the range of the spectral bandwidth (half-width along wavelength) Δλ. That is, any wavelength value included in the range of the spectral bandwidth (half-width along wavelength) Δλ may be defined as the central wavelength λ0. Not limited to that, the central wavelength value within the range of the spectral bandwidth (half-width along wavelength) Δλ may be defined as the value of the central wavelength λ0.

The same definition as described above can be made not only for the monochromatic light emitter 470 but also for panchromatic light emitter 470. For example, thermal light sources such as an incandescent lamp, a halogen tungsten lamp, or a mercury lamp, and even sunlight (white light) have a finite emission spectrum wavelength width Δλ.

It is assumed that the intensity distribution between wavelength lights from frequencies from ν0+Δν/2 to ν0−Δν/2 included in the emission light 462 in FIG. 16 is constant. However, the intensity distribution along the wavelength direction (frequency direction) in the emission light 462 is often non-uniform. For example, when the intensity distribution along the wavelength direction (frequency direction) in the emission light 462 has a Gaussian distribution or an intensity distribution similar thereto, the wavelength value at the maximum intensity may be defined as the central wavelength λ0. The half-width of wavelength (wavelength range with half intensity relative to maximum intensity) or the e−2 width (wavelength range having the intensity of e−2 with respect to the maximum intensity) with respect to the intensity at the central wavelength λ0 may be defined as the wavelength width Δλ.

Next, "2. Plural different wavelength lights included in the irradiated light (first light beam) 12" is described. For example, the present embodiment system shown in FIG. 1 and FIG. 2 may arrange an optical filter (for example, a band pass filter, a low-pass filter, a high-pass filter, or the like) or a phase converting component (diffuser 460 or the like) between the optical synthesizing area 220 and the measured object 22 in the light source 2. The irradiated light (first light) 12 after passing through the optical filter and phase converting components changes its intensity distribution along the wavelength direction (frequency direction). The spectral bandwidth (wavelength width) Δλ after the intensity distribution change is narrower than the spectral bandwidth (wavelength width) in the emission light emitted from the light emitter 470. In this case, the spectral bandwidth (wavelength width) Δλ after the intensity distribution change corresponds to the spectral bandwidth (wavelength width) Δλ in response to FIG. 16. As will be described later with reference to Equation 1, Wave Train profile changes depending on the change of spectral bandwidth (wavelength width) λν. That is, Wave Train profile changes due to the influence of the optical filter and the phase converting component.

In this case, the value of the central wavelength $M_C$ may also be defined as any value within the range of the wavelength width (spectral bandwidth) Δλ after the change. Not limited to that, the central wavelength value of the wavelength width (spectral bandwidth) Δλ after the intensity distribution change may be defined as the value of the central wavelength λ0. Alternatively, in the intensity distribution profile after the change in the intensity distribution, the wavelength at the place with the highest intensity may be defined as the central wavelength λ0.

The intensity distribution of the irradiated light (first light) 12 after passing through the optical filter is also often non-uniform in the wavelength direction (frequency direction). For the non-uniform intensity distribution in the wavelength direction (frequency direction), a central wavelength λ0 value and a wavelength width (spectral bandwidth) Δλ similar to the above "2." may be defined.

"3. Plural different wavelength lights included in detection light (second light) 16" is considered. Each measured object 22 has different spectral profile (absorbance profile). Therefore, the detection light (second light) 16 obtained from the measured object 22 often has an intensity distribution different from that of the irradiated light (first light) 12. Therefore, also with respect to the detection light (second light) 16, the central wavelength λ0 and the wavelength width (spectral bandwidth) Δλ may be defined in the same manner as for the light after passing through the optical filter or the phase converting component described above.

The "4. Plural different wavelength lights included in a prescribed unit measured in the measurer 8 (for example, wavelength resolution in the spectral component 320=wavelength range detected within one cell (prescribed unit))" may be defined differently from the above. For example, in the case of measuring the spectral profile (or absorbance profile) based on the detection light (second light) 16, the spectral component 320 disperses the detection light (second light)

16 into different wavelength lights, and the measurer 8 measures the intensity distribution profile along the wavelength direction (axis) as the spectral profile. And the wavelength width (spectral bandwidth) $\Delta\lambda$ corresponds to "wavelength resolution" of the measurer 8 for each dispersed wavelength light. In other words, the measurer 8 includes a series of arrayed units (detection cells), and each unit (detection cell) detects intensity of each dispersed wavelength light. Here, in response to one unit (detection cell), the corresponding dispersed wavelength light includes a small wavelength range, and the wavelength range corresponds to "wavelength resolution". That is, one unit (detection cell) in the measurer 8 simultaneously detects a slightly different wavelength lights, and a group of the slightly different wavelength lights detected by the unit (detection cell) forms "wavelength resolution". Therefore, this embodiment explanation may call "wavelength resolution" the wavelength width (spectral bandwidth) $\Delta\lambda$. In many cases, the wavelength resolution $\Delta\lambda$ of the measurer 8 takes a constant value regardless of the wavelength of the spectrally extracted light.

With respect to each unit (detection cell) in the measurer 8, this embodiment explanation may define an arbitrary wavelength value detected by the corresponding unit (detection cell) as each central wavelength $\lambda 0$. In other words, an arbitrary wavelength value included in the range of the wavelength resolution $\Delta\lambda$ may be considered as the central wavelength $\lambda 0$ in response to each unit (detection cell).

In addition, not limited to it, the wavelength value indicating the maximum intensity may be defined as the central wavelength $\lambda 0$ when the slightly different wavelength lights detected by one unit (detection cell) provide a non-uniform intensity distribution along the wavelength direction (or the frequency direction). And this embodiment explanation may define the wavelength width (spectral bandwidth) $\Delta\lambda$ based on the central wavelength $\lambda 0$.

For example, one unit (detection cell) in the measurer 8 simultaneously detects the slightly different wavelength lights, and the slightly different wavelength lights may provide a Gaussian distribution or an intensity distribution similar thereto. In this case, the embodiment explanation may define the wavelength value indicating the maximum intensity as the central wavelength $\lambda 0$. Then, the wavelength range that takes the half intensity (half intensity value) with respect to the maximum intensity within the spectrally extracted specific wavelength may be defined as the wavelength width (spectral bandwidth) $\Delta\lambda$. Not limited to that, the wavelength range in which the value of e−2 (intensity value of e−2) of the maximum intensity is obtained may be defined as the wavelength width (spectral bandwidth) $\Delta\lambda$.

As a method of measuring spectral profile, there is also a method of simultaneously measuring all wavelengths in a wide range such as Fourier transformation infrared (FT-IR). Also in this method, the wavelength resolution $\Delta\lambda$ is defined as an index for evaluating the performance of the measurer 8. Therefore, also in this case, the wavelength resolution $\Delta\lambda$ may be made to correspond to the wavelength width $\Delta\lambda$, and the wavelength included within the width of the wavelength resolution $\Delta\lambda$ for each dispersed (separated) wavelength may be defined as the central wavelength $\lambda 0$.

The profile in one Wave Train shown in FIG. 16(*f*) is mathematically analyzed as follows. The individual wavelength lights in FIGS. 16(*a*) to 16(*e*) can be expressed by plane waves having different frequencies $\nu$ from frequencies $\nu 0+\Delta\nu/2$ to $\nu 0-\Delta\nu/2$. Therefore, the profile of one Wave Train obtained by amplitude summation of these wavelength lights is obtained by integrating the plane wave in the frequency range $\Delta\nu$. As a result, one Wave Train profile is given by Equation 1.

$$\begin{aligned}\varphi_R(\nu_0) &\equiv \int_{\nu_0-\Delta\nu/2}^{\nu_0+\Delta\nu/2} \exp\{-i2\pi\nu(t-r/c-\tau_j)\}d\nu \\ &= \Delta\nu\,\mathrm{sinc}\{\pi\Delta\nu(t-r/c-\tau_j)\}e^{-i2\pi\nu_0(t-r/c-\tau_j)}\end{aligned} \quad \text{Equation 1}$$

The sinc function obtained here corresponds to the envelope profile of FIG. 16(*f*). Furthermore, according to Equation 1, the wavelength and the phase in FIG. 16(*f*) match the wavelength and the phase of the light expressed in FIG. 16(*c*). And the wavelength value of the light expressed in FIG. 16(*c*) corresponds to the central wavelength $\lambda 0$ (and the center frequency $\nu 0$ corresponding thereto). That is, the Wave Train profile obtained by integrating the plane wave in the frequency range $\Delta\nu$ has a plane wave component having the center frequency $\nu 0$, and the amplitude changes according to the sinc function.

Since the relationships between the central wavelength $\lambda 0$ and the center frequency $\nu 0$ of the above wavelength, and between the frequency width $\lambda\nu$ and the wavelength width $\Delta\lambda$ of the wavelength included in Wave Train are established in Equation 2, the approximate relational expression Equation 3 is derived from Equation 2.

$$\begin{aligned}c = \nu_0\lambda_0 &= (\nu_0-\Delta\nu/2)(\lambda_0+\Delta\lambda/2) \\ &\approx \nu_0\lambda_0 + \nu_0\Delta\lambda/2 - \lambda_0\Delta\nu/2\end{aligned} \quad \text{Equation 2}$$

$$\Delta\nu/c \approx \Delta\lambda/\lambda_0^2 \quad \text{Equation 3}$$

For simplification of description, a case where "$t=\tau_j=0$" is considered in Equation 1. Here, when "r=0" is substituted for Equation 1, the value of the sinc function becomes "1". Next, substituting Equation 4 as the value of the variable r, the value of the sinc function becomes "0".

$$r = \Delta L_0 = \lambda_0^2/\Delta\lambda \quad \text{Equation 4}$$

The place where the sinc function value is "0" corresponds to the position where the amplitude value is "0" at both left and right ends in FIG. 16(*f*). Using the relationship between Equations 4 and 3, the following relationship is derived.

$$\Delta\nu = (\Delta\lambda/\lambda_0)\nu_0 = c/\Delta L_0 \quad \text{Equation 5}$$

In Chapter 7 of "Principles of Optics," (M. Born and E. Wolf, "Principles of Optics," 6th Ed. (Pergamon Press, 1980), Chaps. 1, 7, 8, 10, and 13), the physical distance ΔL0 indicated by Equation 4 is referred to as a coherence length. The Wave Train represented by Equation 1 moves at the light speed c in the positive direction of the r axis with the progress of time t. The period $\Delta\tau$ required for passing one Wave Train at a place where the position on the r axis is fixed is referred to as a coherence time. An experimental result (https://doi.org/10.1364/OE.441562) obtained by examining the Wave Train profile described above is described below.

Figure 17:
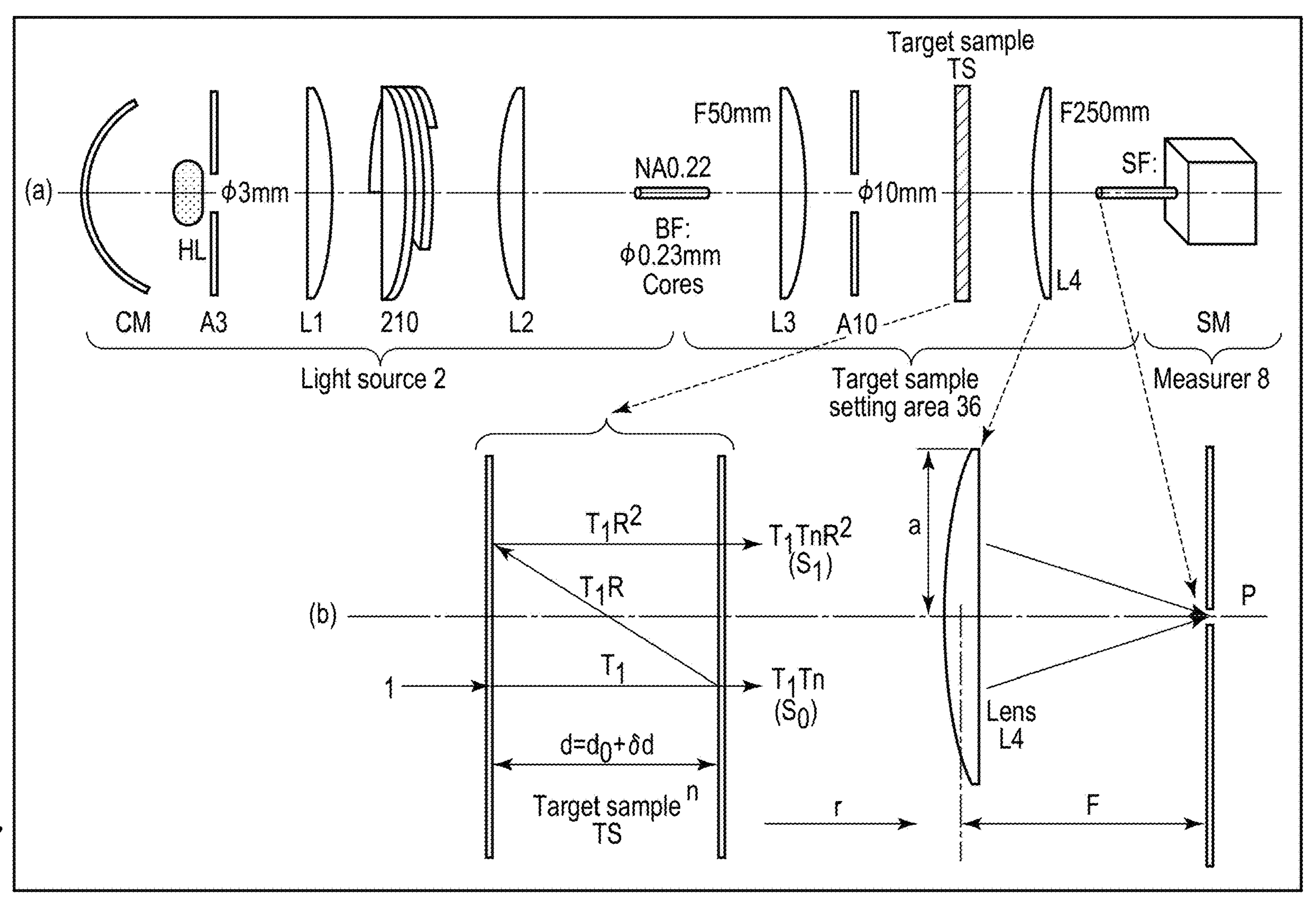
FIG. 17 is an explanatory diagram of a Wave Train profile measurement experimental system using an optical interference phenomenon.

FIG. 17(*a*) shows an optical system used in the experiment. This optical system schematically includes a light source 2, a target sample setting area 36, and a measurer 8.

A tungsten halogen lamp HL is used for the light emitter 470 in the light source 2. A concave mirror CM is arranged on the opposite side of the optical path traveling in the right direction in FIG. 17(*a*), and the concave mirror CM increases the utilization efficiency of the emission light from the halogen lamp HL. That is, the concave mirror CM reflects the emission light toward the rear of the halogen lamps HL (the left side of FIG. 17(*a*)) and returns the emission light to the inside of the halogen lamp HL again. Then, the light passing through the inside of the halogen lamp HL travels toward the front of the halogen lamp HL (right side of FIG. 17(*a*)).

A lens L1 having a focal length of 25.4 mm converts the emission light from the halogen lamp HL into parallel light. Thereafter, the lens L2 having a focal length of 25.4 mm converges the parallel light onto the entrance surface of an optical bundle fiber BF. The core diameter per optical bundle fiber BF is 230 μm, and 320 optical fibers having an NA 0.22 are bundled. The optical system arranges an optical characteristic converting component 210 in the parallel optical path between the two lenses L1 and L2.

The filament that emits light in the halogen lamp HL has a size of width 2 mm×length 4 mm×depth 1.5 mm. Therefore, the emission light emitted from the outermost side in the filament generates off-axis aberration (coma aberration) in the imaging (confocal) optical system including the two lenses L1 and L2. In order to remove the influence of coma aberration, the optical system arranges an aperture A3 having a diameter of 3 mm immediately after the halogen lamp HL.

In the target sample setting area 36, a lens L3 having a focal length of 50 mm converts the outgoing light beam from the optical bundle fiber BF into parallel light. Then, the sample TS is irradiated with the parallel light flux. Here, the optical system arranges an aperture A10 having a diameter of 10 mm immediately before the sample to improve the accuracy and reproducibility of the obtained spectral profile data.

In the experimental optical system shown in FIG. 17(*a*), spectral profile data is acquired using the transmitted light beam of the sample TS. A lens L4 having a focal length of 250 mm converges the transmitted light of the sample TS onto the incident surface (core diameter: 600 μm) of a single core fiber SF. As a spectrometer SM, a near-infrared spectrometer (C11482 GA manufactured by Hamamatsu Photonics co.) having a wavelength resolution of 7.5 nm was used. The structure example of the optical characteristic converting component 210 will be described later with reference to FIG. 44(*b*). Since the experimental optical system uses the spectral component 320 as the near-infrared spectrometer, the wavelength resolution of 7.5 nm corresponds to the value of the wavelength width λν. Then, the profile of Wave Train corresponding to the wavelength width Δλ is measured in the near-infrared spectrometer.

The structure of the sample TS used in the experiment is illustrated in FIG. 17(*b*). That is, a transparent glass flat plate having a refractive index of "n" and a mechanical thickness of "d=d0+δd" was arranged at the position of the sample TS in the target sample setting area 36 (where δd represents the thickness change value of the transparent glass flat plate for each optical path of light passing through the aperture A10 having a diameter of 10 mm). Then, the lens L4 converges the light passing through the transparent glass flat plate onto the entrance surface of the single core fiber SF. The inside of the core area on the entrance surface of the single core fiber SF corresponds to the "point P" in FIG. 17(*b*).

Since the front and back surfaces of the transparent glass flat plate are in an uncoated state, about 4% of the light intensity passing through the front and back surfaces of the transparent glass flat plate is reflected by the front and back surfaces. Therefore, a Wave Train S0 traveling straight on the transparent glass flat plate and another Wave Train S1 that is reflected twice on the front and back surfaces and then travels toward the lens L4 interfere at the "point P".

Figure 18:
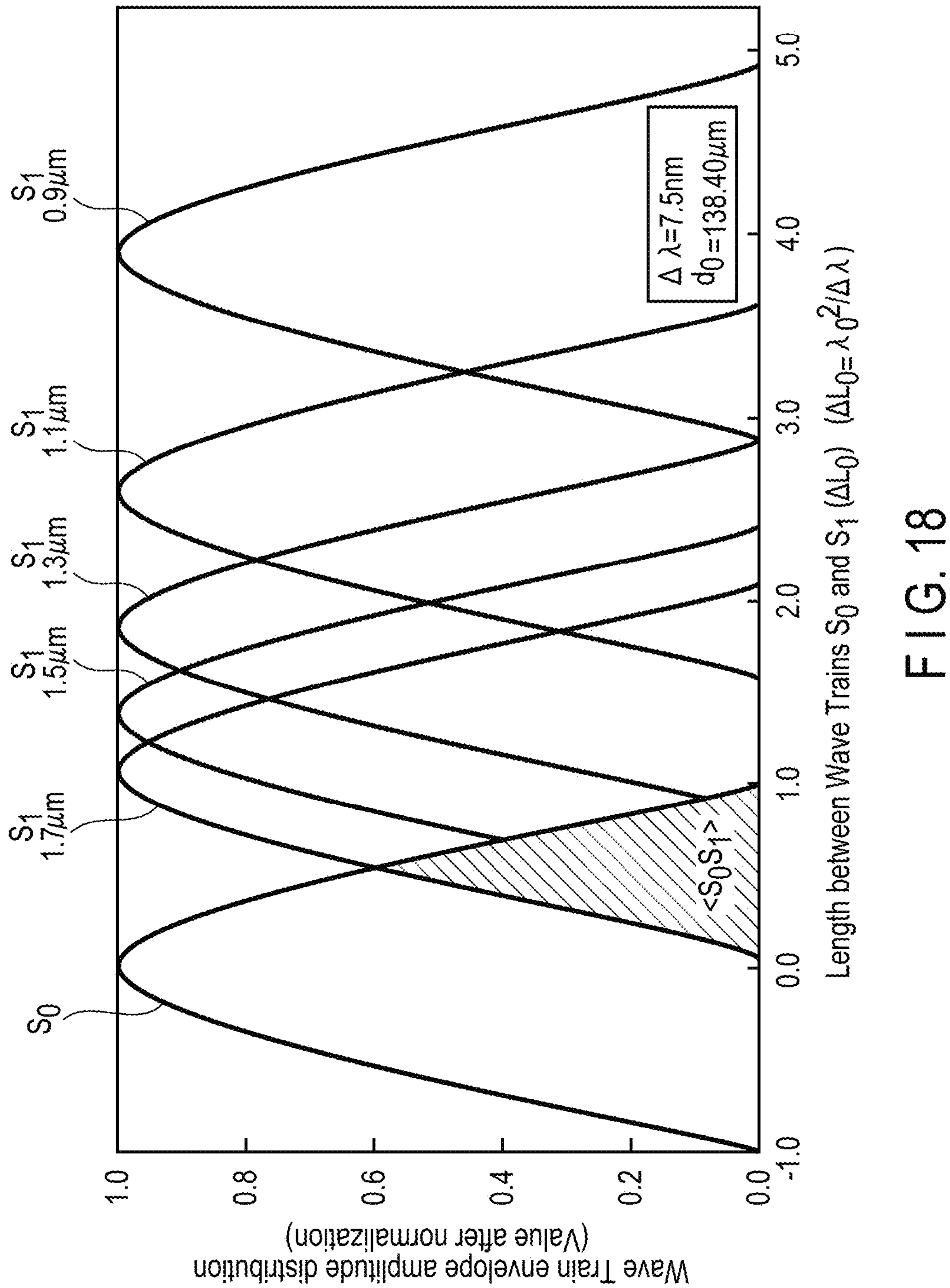
FIG. 18 illustrates an interference characteristic between single Wave Trains one of which is delayed.

FIG. 18 illustrates the interference status between the straight Wave Train S0 and the Wave Train S1 after being reflected twice. The position of the envelope profile S0 of the Wave Train traveling straight in the transparent glass flat plate was fixed at the standard position. The function S1 representing the envelope profile of the Wave Train after two reflections is described as a relative position change when the central wavelength λ0 was changed from 0.9 μm to 1.7 μm.

In response to the horizontal axis in FIG. 18, this embodiment explanation substitutes the coherence length ΔL0 expressed in Equation 4 for a reference unit. Since the mechanical average thickness d0 between the front and back surfaces of the transparent glass flat plate is a fixed value, the mechanical interval between the center position of the Wave Train S0 traveling straight in the transparent glass plate and the center position of the Wave Train S1 after being reflected twice is kept constant. Here, a case where the mechanical constant distance is converted in the reference unit of the coherence length ΔL0 is considered. As indicated by Equation 4, the coherence length ΔL0 changes in proportion to the square of the central wavelength λ0. Therefore, the relative position between the two Wave Trains in FIG. 18 seems to change according to the value of the central wavelength λ0.

The area of the overlapping area (shaded area in FIG. 18) $<S_0S_1>$ between both Wave Trains corresponds to the size of the optical interference fringe generated between the two Wave Trains. In particular, when the central wavelength λ0 is 1.7 μm or 1.5 μm, two Wave Trains overlap as illustrated in FIG. 18. However, when the central wavelength λ0 is 1.1 μm or less, the overlapping area between the two Wave Trains becomes "0", and the interference fringes are not generated.

It is known that an optical interference phenomenon occurs within only one Wave Train having the profile in FIG. 16(*f*). Then, the amplitude value of the interference fringe is determined by the overlapping area $<S_0S_1>$ value between the same Wave Train S0 and S1 whose center positions are shifted from each other after passing through the transparent glass flat plate (https://doi.org/10.1364/OE.441562).

Two types of interference phenomena of light are known: an interference phenomenon caused by spatial coherence of light; and an interference phenomenon caused by temporal coherence of light. A kind of the interference phenomenon shown in FIG. 18 corresponds to the temporal coherence.

As an index representing the degree of spatial coherence, the degree of spatial coherence is defined. Similarly, the degree temporal coherence can be defined as the index representing the degree of temporally partial coherence. There is a correlation between the size (amplitude value) of the interference fringes generated by the optical interference and the degree of coherence. The overlapping area <S0S1> between the Wave Trains S0 and S1 whose center positions are shifted from each other is proportional to the value of the degree of temporal coherence.

Both interference phenomena basically occur in Wave Train. In addition, spatial coherence and temporal coherence are considered to be independent phenomena. Therefore, the degree of interference corresponding to the size (amplitude value) of the interference fringe is basically given by a product value of the degree of spatial coherence and the degree of temporal coherence.

FIG. 19 shows experimental results obtained using the experimental optical system in FIG. 17. The bold curve in FIG. 19 shows the measurement data. In addition, the theoretical calculation result calculated according to the description in FIG. 18 is indicated by a thin curve in FIG. 19. The value of the wavelength range $\Delta\lambda$ as a condition for this theoretical calculation coincides with 7.5 nm of the wavelength resolution $\Delta\lambda$ of the spectrometer SM. Here, when the thickness d0 of the transparent glass flat plate is calculated to be 138.40 μm, the measurement data and the theoretical calculation result based on the existing theory substantially coincide with each other. There is a limit to the measurement accuracy of the micrometer, but the measurement value of the micrometer close to the above is obtained with respect to the thickness d0 of the transparent glass flat plate.

A deviation between the local measurement data and the theoretical calculation result is observed in the vicinity of the measurement wavelength of 1.39 μm in FIG. 19. This deviation may be considered to result from a light absorption phenomenon of hydroxyl groups in the transparent glass plate, which is irrelevant to the Wave Train profile.

The size (amplitude value) of the interference fringes in FIG. 19 takes substantially the same value as the measurement data and the theoretical calculation result. From this result, it is considered that "degree of spatial coherence in the experimental result is close to 100%". That is, the change in amplitude of the interference fringes appearing in FIG. 19 is considered to be a phenomenon caused almost by temporal coherence. In addition, the reproducibility of the experimental data is good no matter how many times the measurement is performed. Therefore, in FIG. 19, a part of the Wave Train profile shown in FIG. 16(*f*) appears very stably and reproducibly. And the measurement data and theoretical calculation result for the phase in the interference fringes in FIG. 19 are in agreement everywhere. This experimental result also suggests that "the phase value ($\tau_j$ value in Equation 1) is kept constant everywhere in the same Wave Train". The experimental result shown in FIG. 19 indicates "Wave Train having the profile shown in FIG. 16(*f*) is not a mathematical imaginary model but is a physically existence".

As described above, both spatial coherence and temporal coherence basically appear in one Wave Train. As a basis for the reproducible and stable occurrence of this optical interference phenomenon, the following characteristics must always be ensured:

[α] Wave Train includes only a single frequency ν0 (see the right side of Equation 1); and

[β] The value of the phase $\tau_j$ is fixed everywhere in the same Wave Train (phase uniformity: see the right side of Equation 1).

That is, a stable optical interference phenomenon occurs when the frequency ν0 and the phase $\tau_j$ are fixed everywhere within the same Wave Train. Here, the situation in which the characteristics of the above [α] and [β] are always ensured in Wave Train is referred to as "independence of characteristics within Wave Train".

As a basis (guarantee) of constantly guaranteeing the "independence of characteristics within Wave Train", it is presumed that "gradual temporal continuity of the light emission amplitude" and "gradual spatial continuity of light emission phase" always occur in the light emitter 470. Then, the above important basis that the "independence of characteristics within Wave Train" is always guaranteed is described in detail below.

As a method of this technical study, paradoxical validation is performed. That is, first, a paradoxical situation is assumed, and it is theoretically validated that the paradoxical situation does not occur. For example, the following situations can be assumed as factors that hinder the "independence of characteristics within Wave Train":

A) Phase mismatch in the center between different wavelength lights (for example, FIGS. 16(*a*) to 16(*e*)) constituting Wave Train;

B) Simultaneous generation of multiple Wave Trains of unique phase at multiple points closer than the coherence length ΔL0 in the light emitter 470; and C) Plural occurrence of Wave Trains respectively having independent phases within the coherent time Δτ at the same light emission point in the light emitter 470.

That is, when any one of the phenomena (A) to (C) occurs, the phase changes in the middle of the same Wave Train, and the "independence of characteristics within Wave Train" collapses. However, from the reproducibility of the experimental results shown in FIG. 19, it is concluded that none of the situations (A) to (C) occurs.

First, the specific situation regarding the cause of the occurrence of the above (B) will be described. As the light emitter 470 in the experimental optical system in FIG. 17(*a*), a halogen lamp HL having a depth size of 1.5 mm was used. It is not surprising that emission lights having mutually independent phases are generated simultaneously between two adjacent points along the direction in which light is emitted in the halogen lamp HL.

The amplitude distribution profile of Wave Trains (emission lights) individually emitted by the light emission points in the halogen lamp HL takes a "gentle slope shape" illustrated in FIG. 16(*f*). In addition, since the positions between two adjacent light emission points are different, the maximum amplitude positions of the respective Wave Trains (emission light) are shifted from each other. Here, the maximum amplitude position of a Wave Train (emitting light beam) from a light emission point "α" at the specific time is defined as "ra", and the phase value of the corresponding Wave Train (emission light) is defined as "τa" (see Equation 1). Similarly, the maximum amplitude position of other Wave Train (emission light) from other light emission point "b" is defined as "rb", and the corresponding phase value is defined as "τb".

A case is considered in which the amplitude summation is caused to 'the two Wave Trains (emission lights) having mutually independent phases and simultaneously emitted from two different light emission points respectively' to generate synthesized light (synthesizing of the two Wave Trains). At the position "ra", an amplitude value of a Wave Train (emission light) emitted from a light emission point "α" is bigger than other amplitude value of other Wave Train (emission light) emitted from other light emission point "b". Therefore, the phase value of the synthesized light at the position of "ra" approaches the phase value "τa" of a Wave Train (emission light) emitted from the light emission point "α". For the same reason, the phase value of the synthesized light at the position "rb" approaches "τb". That is, when the phases between the emission lights simultaneously emitted at the two adjacent points are independent from each other, the phase uniformity [β] in the synthesized light generated by amplitude summation of both the emission lights during traveling collapses.

The individual emission lights simultaneously emitted at the two adjacent points in the halogen lamp HL individually form a Wave Train. However, in order to avoid confusion in the description, this embodiment explanation calls the "light emitted from one point in the light emitter 470" as "emission light" for convenience. And this embodiment explanation calls the "synthesized light obtained by amplitude summation of emission lights emitted from plural points in the light emitter 470" as "Wave Train light".

In the above situation, the different light emission points "α" and "b" are arranged along the traveling direction of the emission lights. As another situation, a situation in which the light emission points "α" and "b" are arranged at different positions in a plane orthogonal to the traveling direction of the emission light is also assumed. As a specific example, it is not surprising that emission lights having mutually independent phases respectively are generated simultaneously between two adjacent points in the surface of the halogen lamp HL orthogonal to the direction in which light is emitted.

In the light source 2 in FIG. 17(*a*), the imaging magnification to the entrance surface of the optical bundle fiber BF with respect to the halogen lamp HL is set to equal magnification. The core diameter of one optical fiber in the optical bundle fiber BF is 230 μm. Therefore, a situation can be sufficiently assumed in which two emission lights having independent phases from each other are simultaneously emitted from two different light emission points in a small area having a diameter of 230 μm on the surface of the halogen lamp HL.

When this phenomenon occurs, two emission lights having independent phases from each other are amplitude-summated in a fiber having a core diameter of 230 μm. For the same reason described above, the phase changes in the middle of Wave Train generated by summating the amplitudes of the plural emission lights. However, Wave Train profile with collapsed phase uniformity [β] does not appear in FIG. 19. That is, the experimental result shown in FIG. 19 suggests the existence of some mechanism that prohibits all the phenomena (A) to (C). In addition, it is known that an optical interference phenomenon is observed even in sunlight (white light). As a mechanism that prohibits all the phenomena (A) to (C), the involvement of the "stimulated emission phenomenon" cannot be denied. For example, assuming that the "stimulated emission phenomenon" occurs in the halogen lamp HL and the sun, the above phenomenon can be easily described.

In Chapter 10 of Principles of Optics (M. Born and E. Wolf, "Principles of Optics," 6th Ed. (Pergamon Press, 1980), Chaps. 1, 7, 8, 10, and 13), a consideration related to the phenomenon (C) above is made. In this reference, the self-coherence function describing the interference effect occurring in the experimental optical system shown in FIG. 17 is defined as follows:

$$\Gamma(\tau) \equiv 4\int_0^\infty G(\nu)\exp\{-i2\pi\nu\tau\}d\nu \quad \text{Equation 6}$$

G(ν) in Equation 6 represents the spectral density. Further, the standard deviation of the coherence time Δτ is defined by Equation 7, and this equation is combined with Equation 8, which indicates the standard deviation of the frequency width λν, to derive Equation 9.

$$(\Delta\tau)^2 \equiv \frac{\int_{-\infty}^{\infty}\tau^2|\Gamma(\tau)|^2 d\tau}{\int_{-\infty}^{\infty}|\Gamma(\tau)|^2 d\tau} \quad \text{Equation 7}$$

$$(\Delta\nu)^2 \equiv \frac{\int_0^\infty (\nu-\overline{\nu})^2 G(\nu)^2 d\nu}{\int_0^\infty G(\nu)^2 d\nu} \quad \text{Equation 8}$$

$$\Delta\tau\cdot\Delta\nu \geq 1/(4\pi) \quad \text{Equation 9}$$

When the amplitude value of each wavelength constituting the prescribed wavelength width Δλ is uniform, the relationship equation in Equation 4 is established between the wavelength width Δλ and the coherence length ΔL0. On the other hand, the relationship between the frequency width λν and the coherence time Δτ in a case where the amplitude distribution of the wavelengths included in the prescribed frequency width λν is given in a general form of G(ν) is expressed by Equation 9.

The contents discussed in the above reference are considered from another point of view. In a case where each amplitude distribution of the different wavelength light within the prescribed frequency width λν is uniform, Equation 1 shows Wave Train profile obtained by amplitude summation between different wavelength lights. Therefore, in a case where the amplitude profile of the wavelength light having the frequency ν is given by G(ν), Equation 6 can also be interpreted as representing one Wave Train profile obtained by amplitude summation of the respective wavelength lights.

In the right side of Equation 6, each wavelength light characteristic is expressed by a plane wave at a fixed position (r=0). Therefore, the variable "τ" in Equation 7 may be interpreted as the time at which one Wave Train is emitted (the light emission time of the specific Wave Train). Then, Equation 9 can also be interpreted as indicating the relationship between the frequency width λν and the fluctuation Δτ of the radiation time of Wave Train. According to this interpretation, it can also be understood that "the light emission time of Wave Train having the frequency width λν has uncertainty within the range of Δτ". That is, since the light emission time of Wave Train emitted from the light emitter 470 has uncertainty within the coherence time Δτ, the emission time of Wave Train within the coherence time Δτ cannot be accurately identified.

The above interpretation for Equation 9 is applied to the following case:

C) Multiple Wave Trains of independent phase occur at the same light emission point in the light emitter 470 within the coherence time Δτ.

It is assumed that the same light emission point in the light emitter 470 emits one Wave Train having the phase "τa" at the frequency ν0 at the time "ta". Next, a case where the same light emission point emits another Wave Train having the phase "τb" at the frequency ν0 at the time "tb" included in the coherence time Δτ is considered.

Since each Wave Train has the size of the coherence length ΔL0, optical interference occurs between both Wave Trains. However, since the times "ta" and "tb" cannot be accurately identified within the coherence time Δτ, the optical interference characteristics cannot be accurately described. Therefore, since a contradiction occurs in the situation (C), it is considered that the situation (C) does not occur.

The interpretation of Equation 9 will be further investigated. From Equation 9, it is considered that "the light emission time of the Wave Train from the same light emission point in the light emitter 470 cannot be defined finer than the coherence time $\Delta\tau$". Therefore, when one Wave Train is emitted in a "short period", the light emission time cannot be finely defined. Meanwhile, one Wave Train has the size of the coherence length $\Delta L0$, and it takes time for the coherence time $\Delta\tau$ to pass through the specific point. Therefore, it is difficult to consider that the light emission point can emit the Wave Train having the above size in a "short period" much shorter than the coherence time $\Delta\tau$.

As another interpretation for Equation 9, it is easy to understand that "the light emission point continuously emits one Wave Train during the period of the coherence time $\Delta\tau$". Here, as a basis that a specific light emission point continues to emit one Wave Train having the profile in FIG. 16(*f*) over a prescribed time (coherence time $\Delta\tau$), "gradual temporal continuity of the light emission amplitude" at the light emission point needs to be secured. Then, as a first attribute of "gradual temporal continuity of the light emission amplitude" at the light emission point, it is considered that "the light emission amplitude of the Wave Train at the light emission point basically increases or decreases only once along the lapse of time within the period of the coherence time $\Delta\tau$".

The feasibility of a situation in which a specific light emission point "starts emitting one Wave Train" in the middle of "emitting one Wave Train" (before completing the radiation of one Wave Train over a period of the coherence time $\Delta\tau$) is examined. If this situation is realized, unlike FIG. 16(*f*), plural maximum amplitude positions are generated in the synthesized Wave Train. In addition, it is not possible to uniquely determine the emission start time difference between both Wave Trains from the above interpretation content for Equation 9. Therefore, the phase at the overlapping position between the two Wave Trains is not determined. For the above reasons, it can be understood that "the light emission amplitude of the Wave Train involved in the optical interference phenomenon increases or decreases only once along the lapse of time within the period of the coherence time $\Delta\tau$".

Note that Chapter 3 will describe an embodiment example in which optical interference noise is reduced by intentionally overlapping different Wave Trains. The optical operation achieved in Chapter 3 corresponds to "intensity summation" between different Wave Trains. On the other hand, this chapter discusses "amplitude summation" within at least one Wave Train. Therefore, as a physical phenomenon inside the light emitter 470 that emits a Wave Train contributing to the optical interference phenomenon including the spatial coherence and the temporal coherence, the description will be continued on the assumption that "within the period of the coherence time $\Delta\tau$, the light emission amplitude increases or decreases only once with the lapse of time". The basic profile of the Wave Train relates to the first attribute of "gradual temporal continuity of the light emission amplitude" at the light emission point.

The light emission amplitude of the Wave Train contributing to the optical interference phenomenon shows the basic characteristics in FIG. 16(*f*) that increases and decreases only once with time. When the waveform is decomposed into different wavelengths, the phases coincide with each other at the center portion as illustrated in FIGS. 16(*a*) to 16(*e*). That is, as a result of "gradual temporal continuity of the light emission amplitude" at the light emission point, A) Phases between the different wavelengths (for example, FIGS. 16(*a*) and 16(*c*)) constituting Wave Train coincide with each other at the center.

For example, the wavelength range $\Delta\lambda$ of the emitting light from the halogen lamp HL is very wide. Therefore, the coherence time $\Delta\tau$ of the emitting light beams from the halogen lamp HL is very short. A case where only the wavelengths within a narrow wavelength range $\Delta\lambda$ are extracted using the optical filter or the spectral component 320 in the middle of the optical path of the emitting light beams will be considered.

At this time, first, the Wave Train in FIG. 16(*f*) is decomposed into plural different wavelengths as illustrated in FIGS. 16(*a*) to 16(*e*). Next, the optical filter or the spectral component 320 extracts only the wavelengths within the narrow wavelength range $\Delta\lambda$. Then, only the extracted wavelengths are subjected to amplitude summation (synthesizing) to form a Wave Train having a relatively long coherence time $\Delta\tau$. This situation may seem inconsistent. However, for example, the pulse width of pulsed ultrashort light increases while passing through a very long optical fiber. As described above, the Wave Train profile changes according to the transfer function in the optical transmission path.

The "gradual temporal continuity of the light emission amplitude" at the light emission point may also be related to the "stimulated emission phenomenon" of photons, which is well known in quantum mechanics. When the same light emission point in the light emitter 470 starts emission of the emitting light beams in the vicinity of the frequency $\nu0$, the emitting light intensity increases due to the stimulated emission phenomenon in the same light emission point. When the emitting light intensity from the same light emission point is saturated, it can be interpreted that the emitting light intensity decreases due to the action of the stimulated emission phenomenon.

In a laser diode having a relatively low output light intensity, laser light is emitted from a very narrow light emitting area. When this very narrow light emitting area is regarded as a "point" (light emission point), the above examination result is compatible with a point emission type laser diode. As the output light intensity of the laser light increases, the light emitting area of the laser diode tends to spatially expand to multipoint light emitter, line type light emitter array, and 2D light emitter. In consideration of this tendency, the Wave Train emitted from the light emitter 470 having spatially wide light emitting area will be considered next.

Equation 6 does not include the spatial coordinates. Here, Expression 6 is extended to define Equation 10, which also incorporates the traveling wave profile that travels in the positive direction of the coordinate r with the lapse of time t.

$$\Gamma^{*}(r) \equiv 4\int_{0}^{\infty} G(\nu)\exp\{-i2\pi\nu(t-r/c)\}d\nu \qquad \text{Equation 10}$$

In the integrand function in Equation 10, the time variable t and the spatial variable r/c are described in the same column. Therefore, Equation 11 corresponding to Equation 7 can be defined.

$$(\Delta r)^2 \equiv \frac{\int_{-\infty}^{\infty} r^2 |\Gamma^*(r)|^2 dr}{\int_{-\infty}^{\infty} |\Gamma^*(r)|^2 dr} \quad \text{Equation 11}$$

This Or indicates "the fluctuation of the position of the light emission points that radiate the Wave Train along the Wave Train traveling direction r at the specific time". Since there is a relationship in Equation 12 with respect to the spatial propagation speed c of the Wave Train, the relational expression Equation 13 corresponding to Equation 9 is derived:

$$\Delta r = c\Delta\tau \quad \text{Equation 12}$$

$$\Delta r \cdot \Delta v \geq c/4\pi \quad \text{Equation 13}$$

Further, since $\Delta\tau$ can be regarded as a coherence time in the above reference, the relationship in Equation 14 is also established:

$$\Delta r \leq \Delta L0 \quad \text{Equation 14}$$

From the relational expression in the above Equation 13, it can be understood that "the light emission point position of one Wave Train including plural different wavelengths having the frequency width $\Delta\nu$ has uncertainty according to $\Delta r$". Since the position of the light emission point of one Wave Train in the light emitter 470 has uncertainty within the coherence length ΔL0, the position of the light emission point of one Wave Train within the coherence length ΔL0 cannot be accurately identified.

In exploring the above phenomenon, paradoxically, a situation is assumed in which there is no restriction on the relational expression in Equations 13 and 14. It is assumed that the point α position within the coherence length ΔL0 emits the emitting light beams having the center frequency ν0 and the phase value "τa". At the same time, it is assumed that a point b located within the range of the coherence length ΔL0 from the point "α" emits emitting light beams having the center frequency ν0 and the phase value "τb". Since both emitting light beams have phase values independent from each other, it is assumed that there is no phase correlation between "τa" and "τb". When the positions of the points "α" and "b" within the coherence length ΔL0 are accurately determined, the optical path length difference "rab" between the positions is uniquely determined. The phase difference between both emitting light beams in this case is uniquely determined by "rab/c+(τa−τb)". Therefore, it is possible to calculate the phase value of the Wave Train obtained by amplitude summation of both emission lights.

However, when the constraints of Equations 13 and 14 occur, the optical path length difference "rab" between them is not determined, and the phase value of the Wave Train obtained by amplitude summation of both emitting light beams cannot be calculated. Therefore, the constraints of Equations 13 and 14 do not allow the following situation:

B) Simultaneous generation of multiple Wave Trains of unique phase at multiple points closer than the coherence length ΔL0 in the light emitter.

What is important in Equations 13 and 14 is that "when one Wave Train is emitted from one point within the coherence length ΔL0 of the light emitter 470, the position of this light emission point cannot be identified with high accuracy". The fact that "the position of the light emission point within the coherence length ΔL0 cannot be identified" means a phenomenon that "the profiles of the emitting light beams emitted from the light emission points at any positions within the coherence length ΔL0 are all the same". In addition, this suggests that the same profile is exhibited even after amplitude summation (synthesizing) of emission lights simultaneously emitted from the entire area within the coherence length ΔL0.

In the phenomenon suggested by Equations 13 and 14, the optical path length difference "rab" between the two light emission points within the coherence length ΔL0 is uncertain. However, if the emission probabilities at all the light emission points in the small area narrower than the coherence length ΔL0 are weighted and all the light emitting positions in the small area are integrated, the value corresponding to the above-described "rab" is determined. Therefore, in consideration of simultaneous light emission from all light emission positions in the small area, a part of the constraints from Equations 13 and 14 is resolved.

Here, if "the phase values "τa" and "τb" at the time of emission from each light emission point in the light emitting area are independent", the phase value of Wave Train cannot be calculated. However, if the "correlation between the position of each light emission point and the phase value at the time of emission" can be defined, the phase value of Wave Train generated by the amplitude summation (synthesizing) of the all emission lights can be calculated.

The "correlation between the position of each light emission point and the phase value at the time of emission" may be rephrased as "gradual spatial continuity of light emission phase" in a small area smaller than the coherence length ΔL0 in the light emitting area. That is, this "gradual spatial continuity of light emission phase" is the condition under which Wave Train profile can be defined in conformity with the constraints of Equations 13 and 14.

The variable "r" in the above Equation 13 represents only the coordinates indicating the traveling direction of Wave Train. Therefore, it is also necessary to consider plural emission lights simultaneously emitted from plural different light emission points in a plane orthogonal to the traveling direction of Wave Train.

Figure 20:
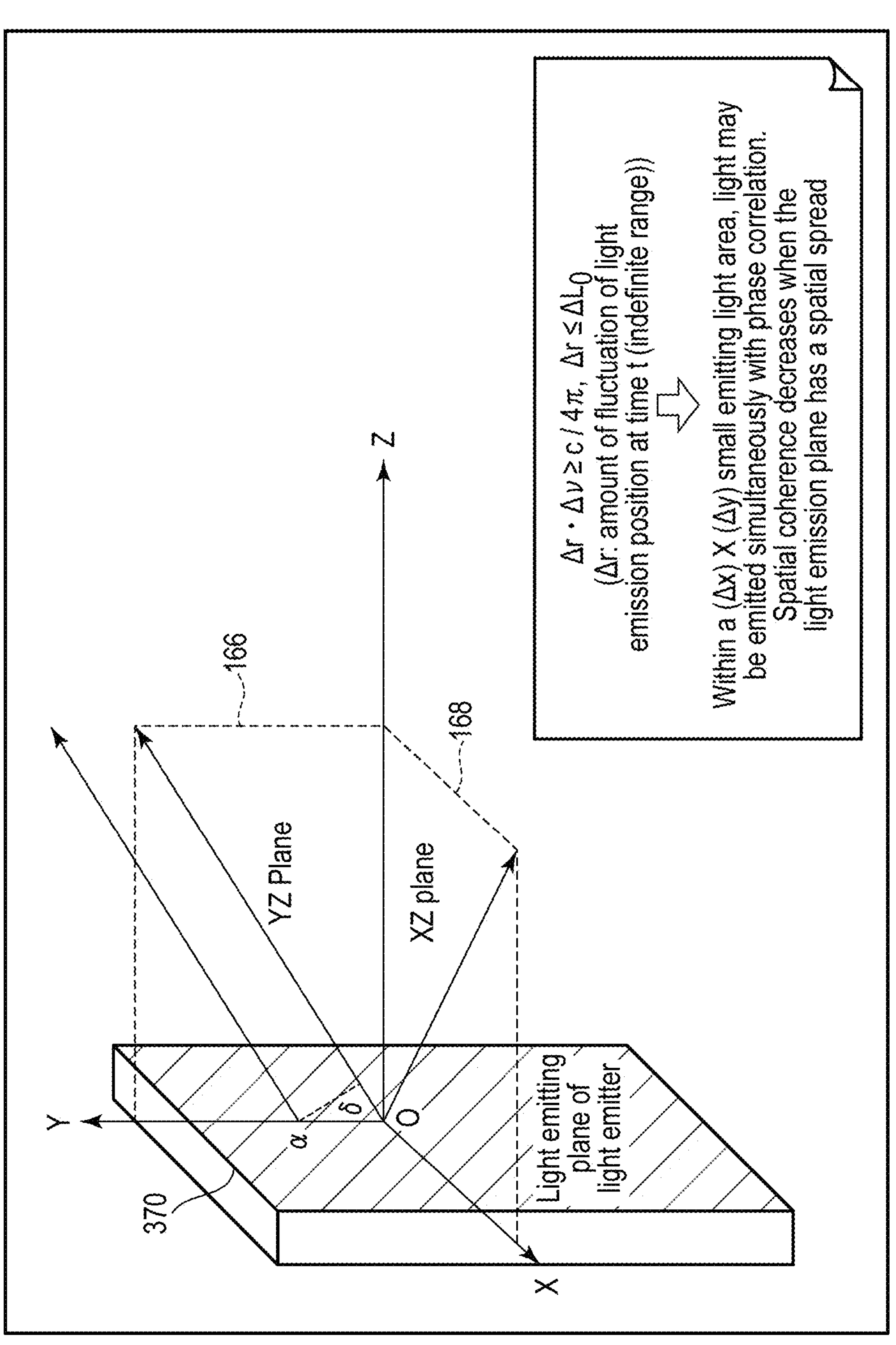
FIG. 20 is an explanatory diagram illustrating phase correlation between light emission points in a spatially wide light emitting area.

FIG. 20 illustrates the state of emission lights from the light emitter 470 having a spatially wide light emitting area. Here, an example of a state (surface emission state) in which the light emitting plane 370 on the light emitter is arranged on a plane formed by the X axis and the Y axis instead of the tungsten filament in the halogen lamp HL used in the experimental optical system is described. For example, a vertical cavity surface emitting laser (VCSEL) or the like included in a type of the laser diode described later corresponds to this light emitter.

Again, a paradoxical assumption is made. That is, it is assumed that the origin "O" of the X/Y/Z axes and the point α in the vicinity of the origin "O" on the Y axis simultaneously emit light elements having independent phase values "τo" and "τα". The light element emitted from the origin "O" simultaneously travels in each direction in YZ plane 166 and XZ plane 168 together with the Z-axis direction. The light element emitted from the point "α" also travels in the same direction in the YZ plane 166.

Here, a case where the light traveling direction in the YZ plane 166 coincides with the "r" axis direction of Equation 10 is considered. When viewed in the "r" axis direction, an optical path length difference "δ" is generated between the light emission point "O" and the light emission point "α". When the optical path length difference "δ" is smaller than the coherence length ΔL0 (that is, when the optical path length difference "δ" obtained by projecting the distance between the light emission point "O" and the light emission point "α" on the light traveling direction r-axis is smaller than the coherence length ΔL0), fluctuation (uncertainty) occurs in the value of the optical path length difference "δ" from the relationship between Equation 13 and Equation 14.

Since the phase difference value between the light element emitted from the light emission point "O" and the light element emitted from the light emission point "α" is not uniquely determined, the phase value of Wave Train generated by the amplitude summation (synthesizing) of both light elements becomes undefined. Therefore, also in the above case, the following situation does not occur:

B) Simultaneous generation of multiple Wave Trains of unique phase at multiple points closer than the coherence length ΔL0 in the light emitter.

Next, regarding the above situation, the same examination as the above description is performed below. That is, since the specific light emission point position is uncertain in the small area in the light emitting plane 370 on the light emitter 470, a case where the entire small area simultaneously emits plural light elements is considered. Here, regarding the size range of the small area, it is assumed that the size when the small area is projected in the traveling direction "r" of the light elements is narrower than the coherence length ΔL0.

It has already been described that, in a case where "one Wave Train involved in the optical interference phenomenon" is emitted from a specific point in a spatially wide light emitting area, a long period corresponding to the coherence time Δτ is required between the start of emission and the end of emission. Therefore, when plural light elements are emitted from a spatially wide light emitting area, a situation occurs in which the entire area in the spatially wide light emitting area simultaneously emits the plural light elements.

When the plural light elements are simultaneously emitted from the entire surface of the light emitting plane 370 on the light emitter 470 illustrated in FIG. 20, the following situation is considered again from a different angle from what has been described above:

B) Simultaneous generation of multiple Wave Trains of unique phase at multiple points closer than the coherence length ΔL0 in the emitter.

When each light element emitted from each light emission point in the light emitting plane 370 on the light emitter 470 has a unique phase (does not have a spatial phase correlation), a wavefront (uniform phase plane) immediately behind the light emitting plane 370 on the light emitter 470 is in a random state. As a result, the entire light elements from the light emitting plane 370 of the light emitter 470 become diffused light having reduced directivity like the laser light after passing through the diffuser 460. However, the semiconductor laser light has directivity regardless whether it is multipoint emission type, linear emission type, and surface emission type. Basically, continuity of a wavefront (uniform phase plane) is maintained for light having directivity. Therefore, in the light emitting area (light emitting plane 370) on a laser diode, the following situation does not occur:

B) Simultaneous generation of multiple Wave Trains of unique phase at multiple points closer than the coherence length ΔL0 in the light emitter.

FIG. 21 shows a part of a cross-sectional structure example of a kind of VCSEL. In the kind of VCSEL structure example shown in FIG. 21, the emission light 462 passes through the 'light passing window' 490 and out. Since FIG. 21 is an excerpt of a part of the overall structure, FIG. 21 shows only two light passing windows 490. However, in many cases, plural light passing windows 490 are regularly arranged in the two-dimensional direction (in a matrix).

In many cases, the diameter of the 'light passing window' 490 is as small as 30 μm or less (300 μm or less at the maximum). Therefore, the emission light 462 having passed through the 'light passing window' 490 can be regarded approximately as the emission light 462 emitted from one "light emission point". Since the VCSEL structure example shown in FIG. 21 includes plural light passing windows 490 (light emission points), the kind of VCSEL may be interpreted as a "multipoint light emitter" when viewed microscopically.

In a macroscopic view, FIG. 20 illustrates a state in which plural light elements are simultaneously emitted from the entire surface of the 'light emitting plane' 370 on the light emitter. When the structure in FIG. 21 is compared with that in FIG. 20, this corresponds to a structure in which a large number of light emission points (light passing windows 490) are discretely and regularly arranged in the two-dimensional direction in the 'light emitting plane' 370 on the light emitter. That is, the VCSEL actually corresponds to a 2D light emitter in a macroscopic view, but often takes the form of a multipoint light emitter in a microscopic view.

The area emitting the emission light 462 in the light emitter 470 is referred to as a "light emitting area". Then, the central wavelength of the emission light 462 may represent λ0. And this embodiment explanation may define "spatially wide light emitting area (wide light emitting area)" that has a width wider than λ0, and the emission lights 462 can be simultaneously emitted from the "spatially wide light emitting area (wide light emitting area)". Here, in a case where "the width of the widest portion in the light emitting area is wider than λ0", it belongs to the category of the light emitter 470 having the "spatially wide light emitting area (wide light emitting area)". In the present embodiment, in consideration of operability and portability, it is assumed that "the width of the widest portion in the light emitting area is 1 km or less". Therefore, all of the multipoint light emitter, the line light emitter, and the 2D light emitter may have the "spatially wide light emitting area (wide light emitting area)". The generic name of the light emitter having the wide light emitting area is referred to as a "wide area light emitter". In the present embodiment, the wide area light emitter (light emitter 470 having a wide light emitting area) may be used for the light emitter 470 in the embodiment system shown in FIG. 1 and FIG. 2.

Basically, the inside of the "spatially wide light emitting area (wide light emitting area)" has a first light emission point and a second light emission point different from each other. Then, the first light emission point may be separated from the second light emission point with a distance of λ0 or more. That is, the "spatially wide light emitting area (wide light emitting area)" may arrange the first light emission point and the second light emission point at different positions from each other, and the distance between the first and second emission points may be more than λ0. The emission light 462 emitted by the first light emission point may be referred to as first light element (first emitting light), and the emitting light emitted by the second light emission point is referred to as second light element (second emitting light) to distinguish them.

As the reason for this distinction, in the optical path shown in FIG. 1 and FIG. 2, the first and second light elements are synthesized (summated) in the optical synthesizing area 220. Then, when "amplitude summation" is performed at the time of synthesizing (summation), optical interference noise occurs.

In FIG. 21, a top sided electrode 496 surrounds the outer peripheral portion of the 'light passing window' 490 (light emission point). In addition, a bottom sided electrode 498 exists at the bottom of a common substrate 494, and a current flows between the bottom sided electrode 498 and the top sided electrode 496. Then, a current blocking (constricting) layer 484 efficiently controls the flow of the current (carrier) passing through the inside of VCSEL (light emitter 470). That is, since the current (carrier) does not flow through the current blocking (constricting) layer 484, the current (carrier) intensively flows through the aperture within the current blocking (constricting) layer 484.

When the concentrated current (carrier) passes through the active area 480, the active area 480 emits laser light (the emission light 462). Both the active area 480 and the peripheral light-emitting layer 482 basically have the same composition and the same structure. That is, a concentrated current (carrier) passes through a portion of the light-emitting layer 482, and the portion of the light emitting-layer 482 emits laser light (the emission light 462) as the active area 480. When the light-emitting layer 482 has a quantum well structure, the corresponding VCSEL (multipoint light emitter or wide area light emitter) has a small threshold current value for laser emission and high light emission efficiency.

It is considered that "stimulated emission (induced emission)" and "light resonance based on light reflection" occur in VCSEL (multipoint light emitter or wide area light emitter) similarly to a gas laser, a solid laser, or the like. The laser light (the emission light 462) generated in the active area 480 is repeatedly reflected between a top sided distributed Bragg reflector (DBR) 486 and a bottom sided distributed Bragg reflector (DBR) 488. Here, it is known that the light reflectance of each of the DBRs 486 and 488 needs to be 99% or more. In order to ensure this high light reflectance, the inside of each of the DBRs 486 and 488 has a multilayer film structure. Specifically, two types of different refractive index materials are alternately stacked to form the multilayer film structure. The thickness of each refractive index material at this time is devised so as to generate an optical path length difference of ¼ ($\lambda 0/4$) of the central wavelength $\lambda 0$ of the emission light (laser light) 462.

In the example VCSEL structure shown in FIG. 21, it is considered that a stimulated emission (induced emission) phenomenon can occur between adjacent active areas 480. For example, a case is considered in which the laser light emission current (carrier) simultaneously starts flowing through the left and right top sided electrodes 496.

Here, it is assumed that only the active area 480 on the right side in FIG. 21 starts emitting laser light (emission light 462) first. And the light-emitting layer 482 may transmit a part of the laser light to reach the left active area 480. And then, the part of the laser light arriving at the left active area 480 may serve as stimulation light (induction light) 464. Similarly, the bottom sided DBR 488 may reflect the part of the laser light to reach the active area 480 on the left side. Then, the part of the laser light reflected in the bottom sided DBR 488 acts as stimulation light (induction light) 466.

As a result, the stimulation light (induction light) 464 or 466 toward neighbor active areas 480 may act to guide the next laser light emission in the neighbor active areas 480. Thereafter, as a result of mutual influence of the laser light from the left and right active areas 480, phases of the emission light 462 emitted from the left and right light passing windows 490 may coincide (optical phase synchronizing).

The VCSEL light results from a transition between different electron orbits (or electron-hole coupling) in the active area 480. Generally a series of pulsed electric currents drive the emission light 462 of VCSEL because a direct current drive tends to account for the thermal saturation characteristic (the light emission efficiency reduction as shown in FIG. 31). When a technique of incorporating a current drive circuit in VCSEL (light emitter 470) is used, the rising/falling period of light emission can be shortened to about 1 nanosecond. But this order of macroscopic time range (1 nanosecond) is bigger enough than the coherence time $\Delta\tau$.

When VCSEL does not emit the emission light 462 for a long time, there are no carriers within the active area 480. When the pulsed drive current starts rising and a prescribed amount or more of carriers are accumulated in the active areas 480, one of active areas 480 start generating laser light that immediately becomes the emission light 462 and the stimulation light (induction light) 464 or 466. It may be considered that there is a possibility that the plural active areas 480 simultaneously emit the emission lights 462 when the stimulation light (induction light) 464 or 466 reaches the peripheral active areas 480.

A certain number of carriers are continuously supplied into the active area 480. However, in a case where the carrier supply does not catch up with the generation of the emission light 462 in a time range of the coherence time $\Delta\tau$ order, the laser light generation amount in the active area 480 may decrease. When the accumulated carriers in the active area 480 increase due to the decrease in the laser light generation amount in the active area 480, it may be considered that the increase in the emission light 462 is repeated again by the stimulated emission (induced emission) phenomenon. This repetition of the increase and decrease of the emission light 462 may contribute to Wave Train profile in FIG. 16(*f*).

For example, a case where a wavelength width (spectral bandwidth) $\Delta\lambda$ of VCSEL having a central wavelength $\lambda 0$ of 0.85 μm is 2 nm is considered. The value of the coherence length $\Delta L0$ in this case is 0.36 mm on the basis of Equation 4. Therefore, the coherence time $\Delta\tau$ corresponds to 1.2 picoseconds. Incidentally, the photon life of a semiconductor laser is generally said to be on the order of about 1 picosecond. Therefore, the coherence time $\Delta\tau$ may relate to the photon lifetime.

Figure 22:
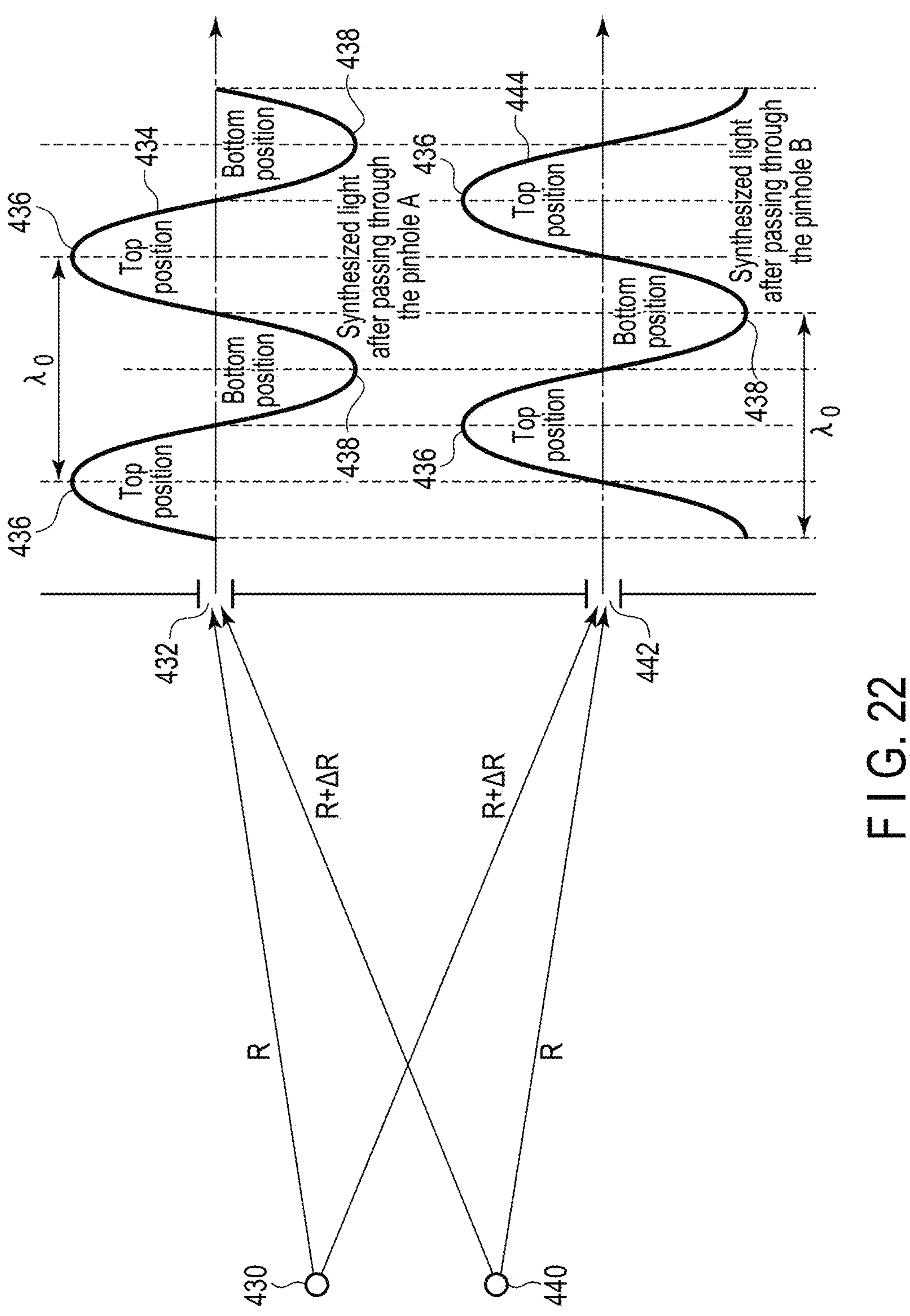
FIG. 22 is a theoretical analysis model explanatory diagram for explaining the coherence profile of emitting light beams from two light emission points.

FIG. 22 illustrates a theoretical analysis model showing a coherence profile between synthesized lights obtained by synthesizing the emission lights 462 (first light element 202 and second light element 204) from two light emission points 430 and 440. As described above, since the size of the light passing window 490 is relatively small, VCSEL is regarded as a multipoint light emitter. Therefore, this embodiment explanation may regard the light passing window 490 as a light emission point. And simplifying the theoretical analysis model, the behavior of the emission lights 462 (first light element 202 and second light element 204) from two light emission points (two light passing windows 490) in VCSEL may be studied. That is, the position of the light emission point α 430 on the upper side of FIG. 22 corresponds to the position of the light passing window 490 on the left side of FIG. 21. Similarly, the position of the light emission point β 440 on the lower side corresponds to the position of the light passing window 490 on the right side of FIG. 21.

The left side of FIG. 22 illustrates optical paths from the light emission point α 430 and the light emission point β 440 to a pinhole A 432 and a pinhole B 442, respectively. In addition, the right side of FIG. 22 shows an investigation model of the optical interference characteristic (coherence) between the synthesized light 434 after passing through the pinhole A 432 and the synthesized light 444 after passing through the pinhole B 442.

In order to simplify the calculation formula, the distance from the light emission point α 430 to the pinhole A 432 is made equal to the distance from the light emission point β 440 to the pinhole B 442.

Each distance represents "R". Then, the distance from the light emission point α 430 to the pinhole B 442 and the distance from the light emission point β 440 to the pinhole A 432 are also equal to each other, and become "R+ΔR". Here, this embodiment explanation may presume that the distance changing value "ΔR" is sufficiently smaller than the distance "R".

If there is the effect of the stimulated emission (induced emission) phenomenon, the phases of the emission lights 462 (first light element 202 and second light element 204) from the different light emission points α 430 and β 440 in VCSEL may coincide with each other (phase synchronizing type multipoint light emitter). On other way, the phases of the emission lights 462 are unsynchronized with each other when the corresponding VCSEL belongs to the phase unsynchronized type.

The phase value of the emission light 462 from the light emission point α 430 (first light element 202) is used as a reference phase, and the temporally variable phase of the emission light 462 (second light element 204) from the light emission point β 440 along time direction represents "Δτ(t)". Here, in a case where the phases of the emission lights 462 (first light element 202 and second light element 204) from the different light emission points α 430 and β 440 coincide with each other (optical phase synchronizing), the condition "Δτ(t)=0" is satisfied. On the other hand, when "Δτ(t)≠0", it indicates that the phases of the emission light 462 (first light element 202 and second light element 204) from the different light emission points α 430 and β 440 do not coincide with each other (unsynchronized optical phase).

As a result, the coherence profile between the different conditions "Δτ(t)=0" or "Δτ(t)≠0" can be theoretically predicted. By comparing the following theoretical prediction results with the experimental result, it is possible to determine whether the corresponding VCSEL is the phase synchronizing type multipoint light emitter or the phase unsynchronized type multipoint light emitter.

Using the Huygens-Fresnel's formula (M. Born and E. Wolf, "Principles of Optics," 6th Ed. (Pergamon Press, 1980), Chaps. 1, 7, 8, 10, and 13)), the amplitude profile of the emission light 462 (a part of the first light element 202) reaching the pinhole A 432 from the light emission point α 430 can be described as follows.

$$\Psi_{\alpha A} = \frac{1}{R}\exp\{-i2\pi\nu(t - R/c)\} \quad \text{Equation 15}$$

Similarly, the amplitude profile of the emission light 462 (a part of the second light element 204) reaching the pinhole B 442 from the light emission point β 440 can be described as follows.

$$\Psi_{\beta B} = \frac{1}{R}\exp\{-i2\pi\nu[t - R/c + \Delta\tau(t)]\} \quad \text{Equation 16}$$

When the distance changing value "ΔR" is sufficiently smaller than the distance "R" in FIG. 22, the amplitude profile of the emission light 462 (another part of the first light element 202) reaching the pinhole B 442 from the light emission point α 430 can be approximated by Equation 17.

$$\begin{aligned}\Psi_{\alpha B} &= \frac{1}{R+\Delta R}\exp\left\{-i2\pi\nu\left(t - \frac{R+\Delta R}{c}\right)\right\} \\ &\approx \frac{1}{R}\exp\left\{-i2\pi\nu\left(t - \frac{R+\Delta R}{c}\right)\right\}\end{aligned} \quad \text{Equation 17}$$

Similarly, the amplitude profile of the emission light 462 (another part of the second light element 204) reaching the pinhole A 432 from the light emission point β 440 can be approximated by Equation 18.

$$\begin{aligned}\Psi_{\beta A} &= \frac{1}{R+\Delta R}\exp\left\{-i2\pi\nu\left[t - \frac{R+\Delta R}{c} + \Delta\tau(t)\right]\right\} \\ &\approx \frac{1}{R}\exp\left\{-i2\pi\nu\left[t - \frac{R+\Delta R}{c} + \Delta\tau(t)\right]\right\}\end{aligned} \quad \text{Equation 18}$$

Wolf (M. Born and E. Wolf, "Principles of Optics," 6th Ed. (Pergamon Press, 1980), Chaps. 1, 7, 8, 10, and 13) and Zernike (F. Zernike, "The Concept of Degree of Coherence and Its Application to Optical Problems," Physica, vol. 5, No. 8 (1938) P. 785-P. 795) teach us that the light intensity summation JT of the emission light 462 emitted from the light emission points α 430 and β 440 and passing through the pinholes A 432 (the part of first and second light elements 202 and 204) and B 442 (the another part of first and second light elements 202 and 204) can be expressed by Equation 19.

$$\begin{aligned}J_T &\equiv J_{AA} + J_{BB} \\ &= \Psi^*_{\alpha A}\Psi_{\alpha A} + \Psi^*_{\beta A}\Psi_{\beta A} + \Psi^*_{\alpha B}\Psi_{\alpha B} + \Psi^*_{\beta B}\Psi_{\beta B} \\ &\approx 4/R^2\end{aligned} \quad \text{Equation 19}$$

In the above formula, for example, "Ψ*αA" means a complex conjugate function of the amplitude profile "ΨαA".

The amplitude profile of the synthesized light 434 after passing through the pinhole A 432 in FIG. 22 is given as "ΨαA+ΨβA". The amplitude profile of the synthesized light 444 after passing through the pinhole B 442 is also given as "ΨαB+ΨβB".

And Wolf (M. Born and E. Wolf, "Principles of Optics," 6th Ed. (Pergamon Press, 1980), Chaps. 1, 7, 8, 10, and 13) and Zernike (F. Zernike, "The Concept of Degree of Coherence and Its Application to Optical Problems," Physica, vol. 5, No. 8 (1938) P. 785-P. 795) teach us that the coherence profile between the synthesized light 434 after passing through the pinhole A 432 and the synthesized light 444 after passing through the pinhole B 442 is given by mutual coherence function (mutual-intensity) JAB defined by the following Equation 20.

$$J_{AB} = \langle(\Psi_{\alpha A} + \Psi_{\beta A})^*(\Psi_{\alpha B} + \Psi_{\beta B})\rangle = \Psi_{\alpha A}^*\Psi_{\alpha B} + \Psi_{\beta A}^*\Psi_{\beta B} + \langle\Psi_{\alpha A}^*\Psi_{\beta B}\rangle + \langle\Psi_{\beta A}^*\Psi_{\alpha B}\rangle = \frac{2}{R^2}\cos(2\pi\nu\Delta R/c) + \frac{2}{R^2}\langle\cos[2\pi\nu\Delta\tau(t)]\rangle \quad \text{Equation 20}$$

Here, the square brackets "< >" in the above Equation 20 mean a time average. This "time average" means the value obtained by performing time integration over the cycle τ during which the same phenomenon is repeated and normalizing with the cycle τ. When the repetitive phenomenon does not occur, time integration is performed over the effective period τ. Therefore, the above "time average" corresponds to the cumulative summation result along time direction.

With respect to the amplitude profiles described in Equations 15 to 18, the only function that varies along time direction is "Δτ(t)". Therefore, the time averaging processing is unnecessary in the portion not including the function "Δτ(t)". That is, the phase term "Δτ(t)" with a temporal change is not included in the function formula "Ψ*αAΨαB+Ψ*βAΨβB" described in the second step of Equation 20. Therefore, this functional expression is out of the calculation target of the time average. Further, when the relational expression "k≡2π/λ0" is substituted for Equation 20, the following relational equation is established:

$$J_{AB} = \frac{2}{R^2}\cos(k\Delta R) + \frac{2}{R^2}\langle\cos[2\pi\nu\Delta\tau(t)]\rangle \quad \text{Equation 21}$$

Wolf (M. Born and E. Wolf, "Principles of Optics," 6th Ed. (Pergamon Press, 1980), Chaps. 1, 7, 8, 10, and 13) and Zernike (F. Zernike, "The Concept of Degree of Coherence and Its Application to Optical Problems," Physica, vol. 5, No. 8 (1938) P. 785-P. 795) defined a "degree of coherence". And according to the theoretical analysis model shown in FIG. 22, this embodiment explanation may redefine the "degree of coherence" as Equation 22.

$$|\mu_{AB}| \equiv |J_{AB}|/J_T = |J_{AB}|/(J_{AA} + J_{BB}) \quad \text{Equation 22}$$

Substituting Equations 19 and 21 for Equation 22, the following Equation 23 is obtained.

$$|\mu_{AB}| = \left|\frac{1}{2}\cos(k\Delta R) + \frac{1}{2}\langle\cos[2\pi\nu\Delta\tau(t)]\rangle\right| \quad \text{Equation 23}$$

The degree of coherence expressed by Equation 23 represents the degree of coherence between the amplitude profile of the synthesized light 434 "ΨαA+ΨβA" and the amplitude profile of the synthesized light 444 "ΨαB+ΨβB".

When the condition "|μAB|=1" is satisfied, the degree of coherence takes its maximum value. At this time, the optical interference phenomenon between the synthesized lights 434 and 444 appears the largest. On the other hand, when the condition "|μAB|=0" is satisfied, the degree of coherence takes its minimum value. At this time, the optical interference phenomenon between the synthesized lights 434 and 444 hardly appears.

A case where the phases of the emission lights 462 (the first light element 202 and the second light element 204) from the different light emission points α 430 and β 440 in FIG. 22 coincide with each other (optical phase synchronizing) is first considered. In the case of optical phase synchronizing between the two points, "Δτ(t)=0" is always obtained in Equation 23. Therefore, in this case, Equation 23 can be transformed into Equation 24:

$$|\mu_{AB}| = \frac{1}{2}|1 + \cos(k\Delta R)| \quad \text{Equation 24}$$

Under this condition, the degree of coherence is maximized at "ΔR=Nλ0" (N: integer).

In general, from the geometrical characteristics, "ΔR" approaches to "0" as the distance from the light emission points α 430 and β 440 to the two pinholes A 432 and B 442 increases. Therefore, Equation 24 suggests a tendency for "the degree of coherence approaches to "1" (|μAB|=1) at a position greatly away from the light emission points α 430 and β 440".

In addition, Equation 24 also allows the condition that "|μAB|=0". That is, it is indicated that there is an optical condition that greatly reduces the degree of coherence even when the phases of the emission lights 462 from the different light emission points α 430 and β 440 (the first light element 202 and the second light element 204) coincide with each other (optical phase synchronizing).

For example, even in a case where the above-described VCSEL exhibits the characteristic of the phase synchronizing type multipoint light emitter, it is suggested that the optical system that "seems to have low coherence" can be set. For example, when the distances from the light emission points α 430 and β 440 to the two pinholes A 432 and B 442 are shortened, the value of "ΔR" relatively increases for geometric reasons, and the degree of coherence can be lowered.

Next, a case where the phases of the emission lights 462 from the different light emission points α 430 and β 440 (the first light element 202 and the second light element 204) do not coincide with each other (unsynchronized optical phase) will be considered. In the case of unsynchronized optical phase case between the two points, the condition "Δτ(t)≠0" is satisfied. Therefore, the relational expression in Equation 25 is established.

$$\langle\cos[2\pi\nu\Delta\tau(t)]\rangle = 0 \quad \text{Equation 25}$$

Substituting Equation 25 for Equation 23, the following Equation 26 is obtained.

$$|\mu_{AB}| = \frac{1}{2}|\cos(k\Delta R)| \quad \text{Equation 26}$$

In Equation 26, "|μAB|=0" is obtained when "ΔR=(2N+1)λ0/4" (N: integer). The degree of coherence between the synthesized lights 434 and 444 after passing through the pinholes A 432 and B 442 provides a unique characteristic. The result of simple amplitude summation of the four light elements expressed by Equations 15 to 18 does not provide the unique characteristic shown in Equation 26.

A phase of the emission light 462 from the light emission point α 430 (a phase of the first light element 202) changes from moment to moment with respect to another phase of the emission light 462 from the light emission point β 440 (another phase of the second light element 204). Even if their phases coincide at the specific time "t" and their amplitudes increase, at the next time, their phases may be inverted and their amplitudes may be canceled out. Therefore, a current scientific and technical device can detect only the cumulative summation of light intensity along time direction with respect to the phase difference variations from moment to moment. Wolf (M. Born and E. Wolf, "Principles of Optics," 6th Ed. (Pergamon Press, 1980), Chaps. 1, 7, 8, 10, and 13) and Zernike (F. Zernike, "The Concept of Degree of Coherence and Its Application to Optical Problems," Physica, vol. 5, No. 8 (1938) P. 785-P. 795) teach us that a current scientific and technical device detects only the summation result of light intensities with respect to both of the synthesized lights 434 and 444 when each of phases of the first and second light elements is unsynchronized with each other.

For the sake of simplicity, the right side of FIG. 22 illustrates the profiles of the emission light 434 passing through the pinholes A 432 (a part of the second light element 202) and the emission light 444 passing through the pinholes B 442 (another part of the second light element 202) when "ΔR=λ0/4". Equation 26 suggests that an optical interference phenomenon hardly occurs between the emission light 434 and the emission light 444 at this time.

Furthermore, according to Equation 26, the maximum value of the degree of coherence decreases to "½" in the unsynchronized optical phase state between the emission light 462 emitted from the light emission points α 430 (the first light element 202) and the emission light 462 emitted from the light emission point β 440 (the second light element 204). That is, in this case, the upper limit of the degree of coherence is limited.

FIG. 22 illustrates a case where the number of light emission points having an unsynchronized optical phase relation is two. Furthermore, a case where a light emission point γ having an unsynchronized optical phase is added will be considered. This case extends "ΨαA+ΨβA" in Equation 20 "ΨαA+ΨβA+ΨγA", and "ΨαB+ΨβB" to "ΨαB+ΨβB+ΨγB". Then, as a result of performing calculation similar to Equation 20, the maximum value of the degree of coherence decreases to "⅓". When the number of light emission points having the unsynchronized optical phase relation is increased in this manner, the maximum value of the degree of coherence further decreases.

The difference between the two degrees of coherence results from the difference in the optical phase synchronizing and unsynchronized characteristics between the light emission points α 430 and β 440. And the difference results from the difference in the method of generating the synthesized lights 434 and 444 at the pinholes A 432 and B 442.

When the optical phase synchronizing characteristic is established between the light emission points α 430 and β 440, the synthesized lights 434 and 444 are generated by "amplitude summation". On the other hand, in a case where the optical phase unsynchronized characteristic is established between the light emission points α 430 and β 440, it is considered that the synthesized lights 434 and 444 are generated as the result of accumulation along time direction or intensity summation. Then, the coherence profile greatly changes due to the difference in the above summation method.

By examining which profile of Equation 24 or 26 is exhibited, it can be seen whether the corresponding VCSEL belongs to the phase synchronizing type multipoint light emitter or the phase unsynchronized type multipoint light emitter. Instead of performing Young's interference experiment using the emission lights 462 passing through the pinholes A 432 and B 442, the profile can be evaluated by using speckle noise profile obtained from a standard sample.

Figure 23:
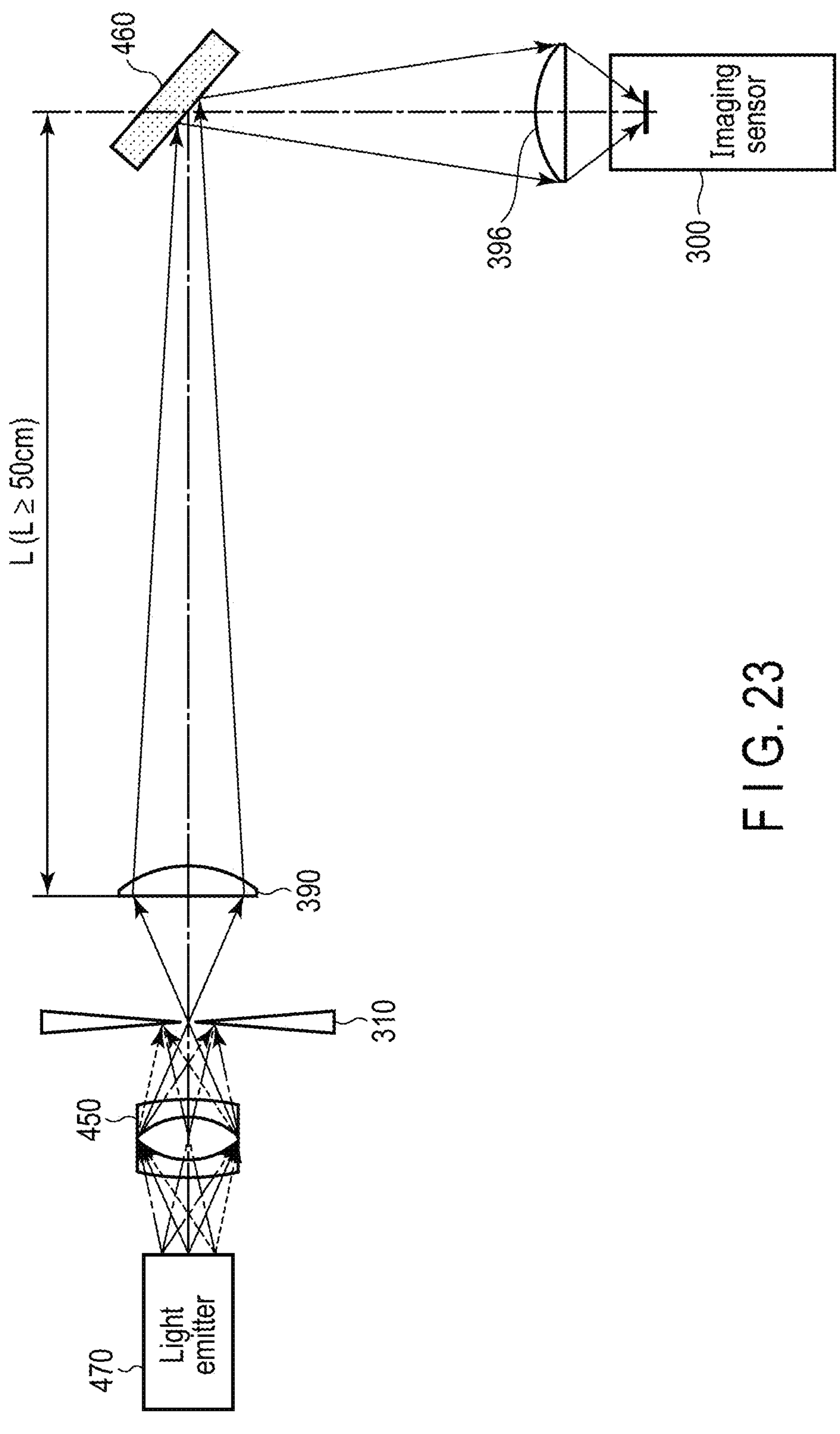
FIG. 23 is an explanatory diagram of a method of measuring the optical phase synchronizing characteristic between emitting light beams from a multipoint light emitter.

FIG. 23 shows an example of an optical system evaluating emission light profiles emitted from a wide area light emitter (or a multipoint light emitter). The optical evaluation system arranges WL-VCSEL 3535 manufactured by Wurth Elektronik Co. at the position of the light emitter 470, and the image forming lens (confocal lens) 450 forms each image of each light emission point on the wide light emitting area (or the multipoint emitting area) onto the pinhole 310. The variable pinhole size controls the corresponding area size of the wide light emitting area (or the multipoint emitting area) passing through the pinhole 310. That is, plural emission lights emitted from plural light emission points when the pinhole size is big enough, and the emission light emitted from only one light emission point when the pinhole size is set to be small. Here, the central wavelength λ0 of the evaluated VCSEL is 0.85 am.

A light-synthesizing lens 390 synthesizes the emission light 462 after passing through the pinhole 310, and the light-synthesizing lens 390 directs the synthesized light toward the diffuser 460. Instead of measuring the degree of coherence, the optical evaluation system uses the diffuser 460 as the standard sample to measure the speckle noise obtained from the diffuser 460.

Equation 24 indicates that the degree of coherence may approach "0" even if each of the phases of the two light emission points α 430 and β 440 synchronizes with each other. And as described above, the degree of coherence may approach "1" when the distance between the light emission points α 430 and β 440 and the pinholes A 432 and B 442 increases. Because the value "ΔR" reduces based on a geometric construction in FIG. 22 when the distance between the light emission points α 430 and β 440 and the pinholes A 432 and B 442 increases. Therefore, in order to ensure prescribed or higher light synthesis accuracy, the distance between the light synthesizing lens 390 and the diffuser 460 (the standard sample) may be more than 1 cm (desirably 50 cm or more). Moreover, the distance between the light synthesizing lens 390 and the diffuser 460 (the standard sample) may be less than 1 Km on the basis of a measurement convenience.

For the sake of introducing the value of degree of coherence, FIG. 22 uses two pinholes A 432 and B 442. In the meantime, FIG. 23 uses the diffuser 460 as the standard sample to obtain a speckle noise pattern, and the imaging sensor 300 measures the scattered lights from neighboring points on the surface of the diffuser 460. A relatively large value of 2.82 μm was used as the average surface roughness (averaged roughness) Ra of the diffuser 460. In order to measure the speckle noise, the average surface roughness (averaged roughness) Ra of the standard sample is desirably λ0/8 or more.

An image-forming lens (confocal lens) for imaging sensor 396 provides a surface image of the diffuser 460 (standard sample) including the speckle noise pattern on the imaging sensor 300. The standard sample (diffuser 460) was irradiated with the emission light 462 from a direction of 45 degrees, and scattered light characteristic in a direction of 90 degrees was measured. When speckle noise is generated, the scattered light intensity changes at a position on the surface of the standard sample (diffuser 460).

In response to the speckle noise, this embodiment explanation uses a well-known evaluation value that is a "speckle contrast Cs". The "speckle contrast Cs" is obtained by dividing 'the standard deviation of the scattered light intensity at each position on the surface of the standard sample (diffuser 460) from the scattered light intensity average value over the entire surface of the standard sample (diffuser 460)' by 'the average value'. Here, it seems that there is a mutual relation between the "speckle contrast Cs" and the "degree of coherence". That is, the measured value of the "speckle contrast Cs" increases when the standard sample (diffuser 460) is irradiated by prescribed light having a high degree of coherence.

And then, the imaging sensor 300 measured the variation of the "speckle contrast Cs" depending on the size of pinhole 310. Here, the number of the light emission points emitting lights that can pass through the pinhole 310 changes when the size of pinhole 310 varies. As described above, when the corresponding VCSEL belongs to the phase unsynchronized type multipoint light emitter, the value of speckle contrast Cs is to reduce as the number of light emission points passing through the pinhole 310 increases.

According to the optical evaluation system shown in FIG. 23, the experimental results indicated that the value of speckle contrast Cs did not change even when the size of the pinhole 390 (the number of light emission points passing through the pinhole 390) increased. Therefore, the corresponding VCSEL used in this experiment is considered to be a phase synchronizing type multipoint light emitter.

In addition, not limited to this experiment regarding only the particular VCSEL 128, the optical phase synchronizing characteristic of all kinds of the wide area light emitter (the multipoint light emitter or the 2D light emitter) 468 may be evaluated using the evaluation experimental system shown in FIG. 23.

That is, when the size of the light passage diameter of the pinhole 310 increases, the number of light emission points emitting the emission lights 462 that can pass through the pinhole 310 increases, and the effective light emitting area extracted by the action of the pinhole 310 also increases. This embodiment explanation presumes a case where the evaluated wide area light emitter (the multipoint light emitter or the 2D light emitter) 468 has the optical phase unsynchronized characteristic. And then, the value of the degree of coherence $|\mu AB|$ may change to "1/N" when the number of light emission points (the effective light emitting area) extracted by the pinhole 310 is multiplied by "N". Therefore, it is predicted that value of speckle contrast Cs may reduce (the rate of change may approach to "$1/(N^{1/2})$" or less) as the value of the degree of coherence $|\mu AB|$ changes to "1/N".

Therefore, the experimental evaluation system shown in FIG. 23 indicates whether the wide area light emitter (the multipoint light emitter or the 2D light emitter) 468 has the optical phase synchronizing characteristic or not. The size of the pinhole increases to multiply the effective light emitting area (the effective number of light emission points) by N. Not limited to it, an image forming magnification of the image-forming lens (confocal lens) 450 may change to multiply the effective light emitting area (the effective number of light emission points) by N.

And then, if the rate of change of speckle contrast Cs approaches to a value smaller than $1/(N^{1/2})$, the wide area light emitter (the multipoint light emitter or the 2D light emitter) 468 may have the optical phase unsynchronized characteristic. On the contrary, if the change in the value of speckle contrast Cs is small (the rate of change of speckle contrast Cs is more than $1/(N^{1/2})$), the wide area light emitter (the multipoint light emitter or the 2D light emitter) 468 may have the optical phase unsynchronized characteristic.

If the present embodiments of technical device explained in Chapters 3 to 5 are applied to the light emitter 470 (wide area light emitter (multipoint light emitter) 468) having the "phase synchronizing characteristic", the optical interference noise reduces. On the contrary, an effectiveness of the optical interference noise reduction is not anticipated even if the present embodiments of technical device explained in Chapters 3 to 5 are applied to the light emitter 470 (wide area light emitter (multipoint light emitter) 468) having the "phase unsynchronized characteristic". Therefore, it is important whether the corresponding wide area light emitter (multipoint light emitter) 468 has the phase synchronizing characteristic or not.

Using the optical evaluation system shown in FIG. 23, the emission light 462 emitted from the wide area light emitter (multipoint light emitter) 468 can be evaluated. And then, the evaluation results teach us whether the present embodiments of technical device explained in Chapters 3 to 5 are effective to reduce the optical interference noise or not. When the wide area light emitter (multipoint light emitter) 468 used for the light emitter 470 has the optical phase synchronizing characteristic, it may be said that an optical system including the wide area light emitter conflicts with a part of the present embodiment example.

In the experiment using the optical system in FIG. 23, "correlation between "the magnitude of the degree of coherence of the light passing through the pinhole 310" and "the magnitude of the speckle noise generated in the scattered light from the standard sample (diffuser plate 460)" is assumed. The basis of the assumption will be described below.

FIG. 24 is an explanatory diagram of the optical characteristics when a transparent dielectric object 386 having thickness t is arranged at the outlet of the pinhole B 442. In the description of the characteristic of Equation 24 (the case of optical phase synchronizing between the light emission point $\alpha$ 430 and the light emission point $\beta$ 440), it was described that "the coherence becomes large ($|\mu AB| \approx 1$) at a position ($\Delta R \approx 0$) greatly away from the light emission points $\alpha$ 430 and $\beta$ 440". Under the conditions of this optical system, the transparent dielectric object 386 having a thickness t is arranged at the outlet of the pinhole B 442.

For the same mechanical thickness t, the optical path length of the light passing through the transparent dielectric object 386 is larger than that at the time of passing in vacuum (air). As a result, in FIG. 24, the phase of the synthesized wave 434 after passing through the pinhole B 442 is delayed by "A0/2" from the synthesized wave 434 after passing through the pinhole A 432.

That is, the top position 436 and the bottom position 438 of the synthesized wave 434 after passing through the pinhole B 442 coincide with the bottom position 438 and the top position 436 of the synthesized wave 434 after passing through the pinhole A 432. Therefore, when both the synthesized waves 434 and 444 are subjected to "amplitude summation", the tops and bottoms of both the waves cancel each other out, and "the intensity of light traveling straight almost disappears".

FIG. 25 is an explanatory diagram of the optical characteristics when the transparent dielectric object 386 having a thickness of 2t is arranged at the outlet of the pinhole B 442. The optical conditions were set exactly the same as in FIG. 24, except that the thickness of the transparent dielectric object 386 was increased to "2t". In FIG. 25, the phase of the synthesized wave 434 after passing through the pinhole B 442 is delayed by "$\lambda 0$" from the synthesized wave 434 after passing through the pinhole A 432. As a result, the top position 436 and the bottom position 438 of the synthesized wave 434 after passing through the pinhole B 442 coincide with the top position 436 and the bottom position 438 of the synthesized wave 434 after passing through the pinhole A 432. Therefore, when both the synthesized waves 434 and 444 are subjected to "amplitude summation", the tops and bottoms of both the waves are emphasized with each other, and "the intensity of light traveling straight increases substantially 4 times".

In both of FIGS. 24 and 25, the light intensity obtained by simply summating the light intensity of both the synthesized waves 434 and 444 (intensity summation) is twice the light intensity of individual synthesized waves 434 and 444. However, under the optical conditions of FIGS. 24 and 25, optical interference occurs between the synthesized waves 434 and 444. As a result, the light intensity obtained by "amplitude summation" of both is greatly changed according to the phase shift amount of both. A light intensity change caused by this optical interference appears as "optical interference noise".

For convenience of explanation, FIGS. 24 and 25 illustrate the optical interference noise generated between the synthesized waves 434 and 444 passing through the pinholes A 432 and B 442. In the case of scattered light from the surface of the measured object 22 having a fine uneven shape on the surface, optical interference occurs between scattered lights from nearbγ positions on the surface. In this case, optical interference between scattered light from nearbγ positions on the surface corresponds to optical interference between light passing through the pinhole A 432 and light passing through the transparent dielectric object 386 in FIGS. 24 and 25. In many cases, the surface of the measured object 22 has an irregular uneven shape. Therefore, the scattered light intensity after optical interference changes depending on the position of the surface of the measured object 22. This appears as speckle noise (a kind of "optical interference noise").

FIG. 26 is an explanatory diagram illustrating a problem in a case where the light emitter 470 (or the phase synchronizing type multipoint light emitter) having an optical phase synchronizing characteristic within a spatially wide light emitting area (wide light emitting area) is used for optical communication. For example, an application example to optical communication in which plural different signals are multiplexed will be described with the aim of increasing the amount of signals to be transmitted in optical communication. The VCSEL structure described with reference to FIG. 21 has a feature that the interval between the light passing windows 490 can be narrowed. Therefore, when the modulation signal profile of the emission light 462 is changed for each light passing window 490, the multiplexing efficiency is greatly improved.

The light emission point α 430 and the light emission point β 440 (or their imaging points) are arranged at different positions on the incident surface of the core area 112 in the optical wave guide 110 such as an optical fiber. Here, a case where the light emission point α 430 (or its imaging point) is located at substantially the center in the core area 112 is considered. Here, a case where the light emission point β 440 (or its imaging point) is located at substantially the center in the core area 112 is considered.

The modulation signal at the time of light emission from the light emission point α 430 and the modulation signal at the time of light emission from the light emission point β 440 are independently given. As a result, a moment at which both light emission timings coincide with each other occurs. Then, a state is assumed in which both optical phases coincide with each other at the moment when both light emission timings coincide with each other.

FIG. 26(*a*) illustrates the change in the emitted light intensity Iα 338 with respect to the passing time t1250 at the light emission point α 430 (or its imaging point). FIG. 26(*b*) illustrates the change in the emitted light intensity Iβ 338 with respect to the passing time t1250 at the light emission point β 440 (or its imaging point). For simplification of description, only the situation in which the light emission timing and the emitted light intensity 338 of both coincide with each other is extracted and clearly illustrated.

FIG. 26(*c*) illustrates the optical path model in the core area 112 of the emitting light beams from the points 430 and 440. It is assumed that the emitting light beam Iα from the light emission point α 430 (or its imaging point) travel substantially straight in the center area in the core area 112. On the other hand, when the emitting light beam Iβ from the light emission point β 440 (or its imaging point) takes a zigzag optical path in the core area 112, the optical path length in the core area 112 becomes relatively long.

FIG. 26(*d*) illustrates the time-dependent change of the transmitted intensity Iα with respect to the passing time t1250 immediately after the emission from the optical wave guide 110 in the emitting light beam Iα from the light emission point α 430 (or its imaging point). As described in FIG. 16, the emitting light beam Iα from the light emission point α 430 (or its imaging point) includes light having different wavelengths. Therefore, since the phases of the different wavelengths are shifted according to the progress in the core area 112, the rising and falling characteristics of the transmitted intensity Iα are deteriorated. At the same time, the entire optical phase is disturbed in the rising and falling areas of the transmitted intensity Iα.

FIG. 26(*e*) illustrates the time-dependent change of the transmitted intensity Iβ with respect to the passing time t1250 immediately after the emission from the optical wave guide 110 in the emitting light beam Iβ from the light emission point β 440 (or its imaging point). Since the optical path length in the core area 112 relatively increases, the timing of the rising and the falling of the transmitted intensity Iβ is delayed from that in FIG. 26(*d*).

FIG. 26(*f*) illustrates the time-dependent change of the synthesized intensity 298 with respect to the passing time t1250 immediately after the emission from the optical wave guide 110. When the optical path length difference between the emitting light beam Iα from the light emission point α 430 (or its imaging point) and the emitting light beam Iβ from the light emission point β 440 (or its imaging point) is smaller than the coherence length ΔL0, both cause optical interference. The resultant synthesized intensity 298 is contaminated with a large optical noise, as illustrated in FIG. 26(*f*).

Figure 28:
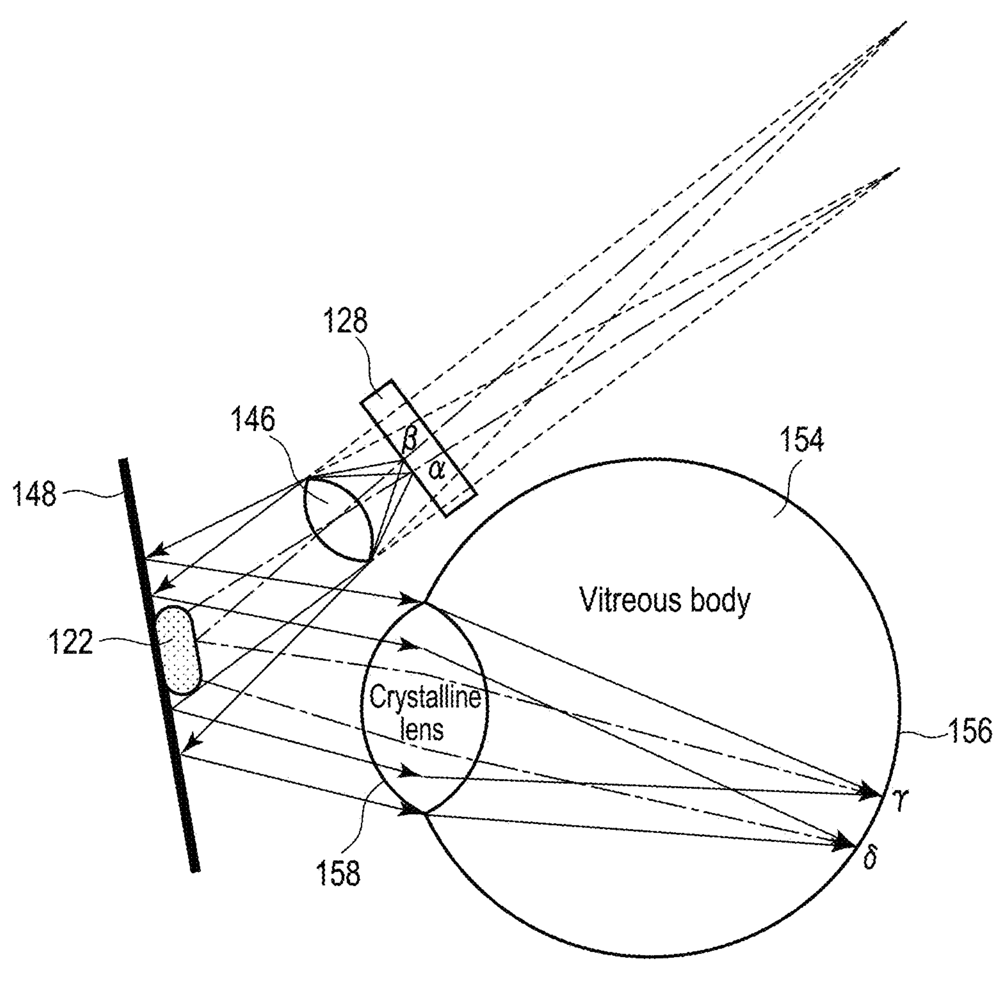
FIG. 28 is an explanatory diagram of a problem in a case where a phase synchronizing type multipoint light emitter is used for display.

With reference to FIGS. 27 and 28, a technical problem in the case of using the optical phase synchronizing wide area light emitter for image (moving image/still image) display will be described. The above-described optical phase synchronizing wide area light emitter includes a VCSEL and a linear light emitter having the characteristic of a phase synchronizing type multipoint light emitter, and panchromatic light sources including a thermal light source such as a halogen lamp.

When the quantum well structure is adopted in the active area 480 (FIG. 21) in the VCSEL 128, the light emission efficiency with respect to the supply power is high. In addition, since the light emission points α 430 and β 440 are easily integrated, the VCSEL 128 is highly suitable for a portable display. As an image display application example of the wide area light emitter (multipoint light emitter), its use in a portable display is illustrated in FIGS. 27 and 28. Not limited to that, a multipoint light emitter or a wide area light emitter such as the VCSEL 128 may be used for any image display application.

In FIGS. 27 and 28, an image (moving image or still image) displayed on the surface of the multipoint light emitter or the wide area light emitter such as the VCSEL 128 is formed on a retina 156. Here, in consideration of eyeball fatigue of the user, a virtual image for the image of the multipoint light emitter or the wide area light emitter such as the VCSEL 128 is generated on a virtual image forming plane 126 away from the user. Then, the user views the virtual image.

Therefore, a virtual image forming lens 146 changes the divergence angle of the divergent emission light 462 from the VCSEL 128 (multipoint light emitter or wide area light emitter). As a result, the emission light 462 after passing through the virtual image forming lens 146 appears to be emitted from the point α or the point β. Then, through a half mirror 148, a virtual image is generated at a point γ, which is the mirror image position of the point α and the point β.

In FIG. 27, the difference between the angle from an upper crystalline lens 158 toward the point γ and the angle from a lower crystalline lens 158 toward the point γ is referred to as "convergence angle". By changing this convergence angle, a pseudo stereoscopic image can be displayed.

The emission light 462 from one light passing window 490 (light emission point α 430) arranged in the VCSEL 128 have a large degree of spatial coherence (spatial coherence is high). Therefore, when an optical path length difference occurs between the optical paths a, b, c, and d reaching the retina 156 and the optical paths e, f, g, and h, the light intensity observed on the retina 156 greatly changes. That is, optical interference occurs between the optical paths a, b, c, and d and the optical paths e, f, g, and h, and appears as optical interference noise.

In addition, FIG. 28 illustrates a technical problem that occurs when two different points α and β in the VCSEL 128 simultaneously emit light beams with optical phase synchronization. The emission light 462 from the point α in the VCSEL 128 is converged on the point γ on the retina 156. Further, the emission light 462 from the point β in the VCSEL 128 is converged on the point δ on the retina 156.

Here, when there are dust, scratches, or dirt 122 on the surface of the half mirror 148, the beams of the emission light 462 from the points α and β are respectively diffracted. As a result, the beams of the emission light 462 from the points α and β partially overlap to generate speckle noise (optical interference noise).

It has been described that even a thermal light source such as a halogen lamp that generates panchromatic light belonging to a wide area light emitter (or a multipoint light emitter) having a wide light emitting area may have an optical phase synchronizing characteristic in the wide area light emitting area. In addition, from the experimental results, it was confirmed that at least one type of VCSEL also has an optical phase synchronizing characteristic. Then, when these wide area light emitters (or multipoint light emitters) are applied to the light source 2, the display 18, optical communication, or the like, it is understood that optical interference noise is easily generated.

Chapter 2 describes the technical problems of the optical interference characteristic of light including plural different wavelengths and optical interference noise generated by the optical interference characteristic. The contents described in Chapter 2 are summarized below. That is, "different wavelengths may be included even in monochromatic light". Then, "amplitude summation of different wavelengths creates Wave Trains". Further, "the phase is fixed in the same Wave Train". By the way, when "amplitude summation" is performed between light beams (waves) having individual fixed phases, an optical interference phenomenon appears. Then, optical interference noise occurs from the optical interference phenomenon.

Chapter 3: Method for reducing optical interference noise in the present embodiment As an embodiment for reducing the above-described optical interference noise, Chapter 3 describes "Technical embodiment for reducing optical interference phenomenon". The optical interference phenomenon described above basically occurs in the optical synthesizing area 220 between different light elements (for example, between the first light element 202 and the second light element 204).

Figure 29:
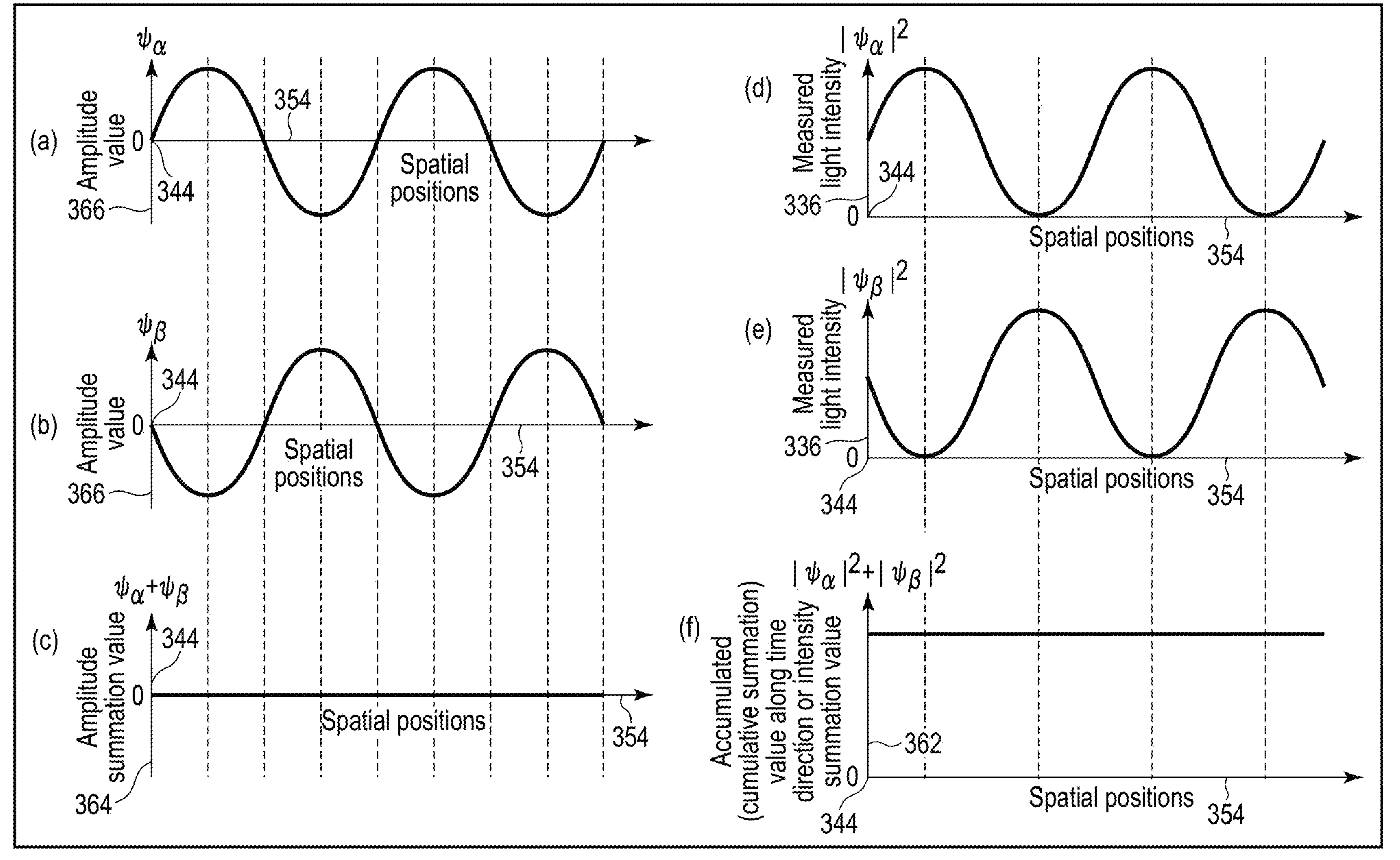
FIG. 29 is a view illustrating a difference in an optical synthesizing form between different light beams.

FIG. 29 illustrates the difference in optical synthesizing methods between different light elements (the first light element 202 and the second light element 204) in the optical synthesizing area 220. In this optical synthesizing method, the left side of FIG. 29 illustrates the characteristic of the synthesized light generated by "amplitude summation". In addition, the right side of FIG. 29 illustrates the characteristic of the synthesized light generated by "signal accumulation along time direction" or "intensity summation".

In the world of wave optics describing a profile by a scalar field, the amplitude profile of light is expressed by a complex function as in Equations 15 to 18. FIGS. 29(*a*) and 29(*b*) illustrate distribution profiles ψα and ψβ of an amplitude value 366 with respect to the spatial position 354 when two types of traveling waves ψα and TV having different phases are stopped at a prescribed time. Each of the amplitude distribution profiles ψα and TV have places where they take "negative values" based on Level "0" 344.

FIG. 29(*c*) illustrates a result example in which the amplitude distribution profiles ψα and ψβ in FIGS. 29(*a*) and 29(*b*) are caused "amplitude summation" (addition calculation between complex amplitude values for each spatial position 354 or each time). Since the complex amplitude value may take a "negative value" in the real or imaginary part, there may be a place where the value after the "amplitude summation" becomes "0". For example, as illustrated in FIGS. 29(*a*) and 29(*b*), the phase may shift by λ0/2 (180 degrees) between the amplitude distribution profiles ψα and ψβ. In this case, a canceling effect acts between the two, and the profile after the "amplitude summation" coincides with Level "0" 344.

As described above, in the "amplitude summation" in which summation is performed in the real part and the imaginary part in the complex amplitude, the value after the "amplitude summation" greatly changes. This large change appears as optical interference noise. Therefore, in order to reduce the occurrence of this optical interference noise, in the present embodiment, "an optical synthesizing operation other than amplitude summation" may be performed in the optical synthesizing area 220.

FIG. 29(*d*) illustrates a light intensity distribution profile $|\psi\alpha|^2$ with respect to the amplitude distribution profile Ta illustrated in FIG. 29. On the opposite side of the amplitude distribution profile Ta, the light intensity distribution profile $\psi\alpha|^2$ does not take a "negative value". FIG. 29(*e*) illustrates a light intensity distribution profile $|\beta|^2$ with respect to the amplitude distribution profile TV illustrated in FIG. 29(*b*).

FIG. 29(*f*) illustrates the result of "intensity summation" between FIG. 29(*d*) and FIG. 29(*e*).

In this "intensity summation", an addition operation is performed between the intensity distribution profiles of plural light elements (for example, the first light element 202 and the second light element 204) to be synthesized. That is, in this "intensity summation", an operation to obtain the intensity distribution profiles $|\psi\alpha|^2$ and $|\psi\beta|^2$ is previously performed on each of the first light element ψα 202 and the second light element ψβ 3 204 to be synthesized in advance. Then, the result of summation between the obtained intensity distribution profiles $|\psi\alpha|^2$ and $|\psi\beta|^2$ is obtained.

The intensity distribution profiles $|\psi\alpha|^2$ and $|\psi\beta|^2$ of the light to be synthesized (for example, the first light element 202 or the second light element 204) do not take a "negative value". Therefore, as illustrated in FIG. 29(*f*), the result of the "intensity summation" is not below Level "0" 344 (negative value). Even if the phase difference between the light elements to be synthesized (for example, the first light element 202 illustrated in FIG. 29(*d*) and the second light element 204 illustrated in FIG. 29(*e*)) greatly changes in this manner, the variation value of the result of the "intensity summation" is relatively small. From the above intuitive description, it may suggest "the synthesized light based on the intensity summation" generates a smaller optical interference noise than other optical interference noise resulting from "the synthesized light based on the amplitude summation".

The photodetector 250, the spectral component 320, and the imaging sensor 300 provided in the measurer 8 in FIGS. 1 and 2 all measure the "intensity (light intensity) profile" related to the detection light (second light) 16 to be received. Therefore, when "cumulative summation (signal accumulation) along time direction" is performed on the measured signals 6 obtained from the prescribed light to be synthesized (for example, the first light element 202 and the second light element 204 later described in FIG. 36), substantial "intensity summation" can be performed.

As a specific example, the measurement (detection) timing for each of the prescribed lights to be synthesized (for example, the first light element 202 and the second light element 204) may be shifted. That is, in the first measuring period, only the light intensity profile of the first light element 202 is measured (detected) by the measuring components 250, 320, and 300. Then, in the next measuring period, only the light intensity profile of the second light element 204 is measured (detected). Thereafter, when the "cumulative summation (signal accumulation) along time direction" is performed on both the measured signals 6, the result coincides with the result of the "intensity summation". Here, when the light emission timing is shifted between the first light element 202 and the second light element 204 (since there is no period in which the first light element 202 and the second light element 204 are simultaneously caused "amplitude summation"), no optical interference phenomenon occurs between the first light element 202 and the second light element 204.

The "cumulative summation along time direction" is not limited to the above method, and any method may be adopted. For example, "charge accumulation along time direction" may be used as another embodiment example related to the "cumulative summation (signal accumulation) along time direction". Both the spectral component 320 and the imaging sensor 300 used in the measurer 8 accumulate the detection charge corresponding to the detection signal. The accumulation time (exposure time) of the detected charges is appropriately set, and "cumulative summation (signal accumulation) along time direction" can be performed using the "accumulated value of charge along time direction".

As another method, for example, a "human afterimage effect" may be used. For example, the first light element 202 and the second light element 204 are not simultaneously emitted, and the light emission timing is shifted. When the shift time of the light emission timing is 1 second or less (or 0.1 seconds or less), the afterimage effect of human eyes acts, and light appears to be emitted simultaneously. On the other hand, since the coherence time $\Delta\tau$ (relating to the photon lifetime) of the Wave Train described above is on the order of 1 picosecond, the shift time of the light emission timing cannot be made shorter than that. Therefore, the shift time of the light emission timing in the present embodiment is set to 1 picosecond or more and 1 second or less (desirably 0.1 seconds or less).

An embodiment example in which the emission light 462 from the wide area light emitter described in Chapter 2 is combined with the "optical synthesizing operation other than amplitude summation" will be described. Within a wide light emitting area of a wide area light emitter or multipoint light emitter or within a m light emitting area, there are plural light emission points arranged at different positions from each other. For the sake of simplicity, let us pay attention to only two light emission points among the plural light emission points. That is, the first light emission point (light passing window 490 in FIG. 21) emits the first emission light 462 (first light element 202). Then, the second light emission point (light passing window 490) arranged at a position different from the first light emission point emits the second emission light 462 (second light element 204). In the optical synthesizing area 220 where the first emission light 462 (first light element 202) and the second emission light 462 (second light element 204) are synthesized, synthesized light 230 is generated by "cumulative summation along time direction" or "intensity summation". In order to perform this "cumulative summation along time direction" or "intensity summation", an optical operation unit described later is used in the present embodiment. Herein, each of embodiment examples regarding the optical operation unit may respectively represent the lower side of FIG. 32, FIG. 33, or FIG. 35. Then, the generated synthesized light 230 may be used to provide a service to the user.

When an optical phase synchronizing phenomenon occurs between different light emission points in the wide area light emitter or the multipoint light emitter, an optical interference phenomenon occurs between the two emission lights 462 from the respective points (between the first light element 202 and the second light element 204). Therefore, when "cumulative summation along time direction" or "intensity summation" is performed in the optical synthesizing area 220 using the optical operation unit, the optical interference noise is greatly reduced.

FIG. 30 illustrates an application example in which the above-described "cumulative summation along time direction" is applied to the display 18 (or the display method). As the display 18, a practical form of the portable display device illustrated in FIG. 27 or FIG. 28 may be adopted. In this case, the retina 156 of the user corresponds to the optical synthesizing area 220. Then, the operation of "cumulative summation along time direction" is performed using the "afterimage effect of human eyes".

A VCSEL array 1242 that emits red light, a VCSEL array 1244 that emits green light, and a VCSEL array 1246 that emits blue light are alternately arranged so that a color image in a visible range can be provided to the user. Here, within one VCSEL array 1242, 1244, 1246, plural light emission points (light passing windows 490) are arranged in a line. In the arrangement example illustrated in FIG. 30, one set is formed of light emission points (three light passing windows 490 arranged on the inclined broken line in the upper part in FIG. 30) that individually emit red light, green light, and blue light. Then, one set including three light emission points (light passing windows 490) of different emission colors constitutes one pixel.

The above-described stimulated emission phenomenon is not affected by the emission lights 462 having different emission colors. Therefore, adjacent arrangements between the VCSEL arrays 1242, 1244, and 1246 that emit the same emission color are avoided. That is, the VCSEL arrays 1242, 1244, and 1246 that emit different colors are always arranged in adjacent row (adjacent positions) of the VCSEL arrays 1242, 1244, and 1246 that emit specific colors. As a result, the arrangement distance between the VCSEL arrays 1242, 1244, 1246 that emit the same emission color increases.

Furthermore, in order to increase the distance between the active areas 480 in the different VCSEL arrays 1242, 1244, and 1246 emitting the same emission color, the positions between the light emission points (light passing windows 490) emitting the same emission color are shifted. That is, the structure is such that the light emission points (light passing windows 490) in the VCSEL array 1242 that emit red light arranged in the bottom row are arranged on the extension of the vertical broken line passing through the intermediate position between the adjacent light emission points (light passing windows 490) in the VCSEL array 1242 that emits red light arranged in the top row in FIG. 30.

Light emission timings between different light emission points (light passing windows 490) in the VCSEL array 1242 that emits red light arranged in the bottom row in FIG. 30 are illustrated from the center to the lower side of FIG. 30. The light emission timing of the different light emission points (light passing windows 490) is switched every prescribed cycle τ along the progress of the passing time t1250. That is, only during the first period τ, a drive current 324 of the light emission point (light passing window 490) arranged on the rightmost side flows. Then, in the next period τ, the drive current 324 of the light emission point (light passing window 490) arranged second from the right side flows.

In order to effectively exhibit the afterimage effect of human eyes, it is desirable to set the cycle τ to 1 second or less (desirably 0.1 seconds or less). Furthermore, in consideration of the coherence time Δτ (relating to the photon lifetime) of Wave Train, the cycle τ in the present embodiment is set to 1 picosecond or more and 1 second or less (desirably, 0.1 seconds or less).

The width w or the height h of the light emission pulse may be determined according to the display luminance (color tone) of each pixel in the display image provided to the user. In the present embodiment, the luminance or contrast of the entire display image displayed on the display 18 is changed according to the environmental brightness (background light) around the display 18. For example, when the surroundings of the display 18 are dark, energy saving can be achieved by suppressing the luminance of the entire display image to be low. Conversely, when the luminance and contrast of the entire display image are low even though the surroundings of the display 18 are bright, the user has difficulty in viewing the screen. Therefore, when the surroundings of the display 18 are bright, the luminance and contrast of the entire display image may be increased and displayed.

The pulse width w and the height (pulse peak value) h can be independently set as control parameters of the drive current 324 for each light emission point (light passing window 490) in the VCSEL arrays 1242, 1244, and 1246. Either the pulse width w or the height (pulse peak value) h may be controlled according to the emitted light intensity for each light emission point (light passing window 490) according to the surrounding brightness. The remaining parameters in the pulse width w and the height (pulse peak value) h may be used for control according to the ambient temperature. When the plural independent control parameters related to the drive current 324 are made variable according to the ambient temperature and the luminance desired to be displayed (the emitted light intensity of each light emission point), the display control can be simplified.

FIG. 31 illustrates the temperature dependency in the active area 480 regarding the profile of the emitted light intensity 338 with respect to the peak current value 296 of pulse profile for each light emission point (light passing window 490) in the VCSEL. In the low-temperature state Ta, the emitted light intensity 338 increases as the peak current value 296 of pulse profile increases. However, when the temperature rises to Tb, the gradient of the emitted light intensity 338 becomes smaller. When the temperature further rises to Tc, the emitted light intensity 338 with respect to the peak current value 296 of pulse profile is saturated. As described above, in the VCSEL, a thermal saturation phenomenon occurs even at a relatively low temperature (for example, about 90° C.). Therefore, when the pulse width w and the height (pulse peak value) h are controlled according to the monitored ambient temperature in this manner, a sufficient amount of emitted light intensity 338 can be ensured even if some thermal saturation phenomenon occurs.

Figure 32:
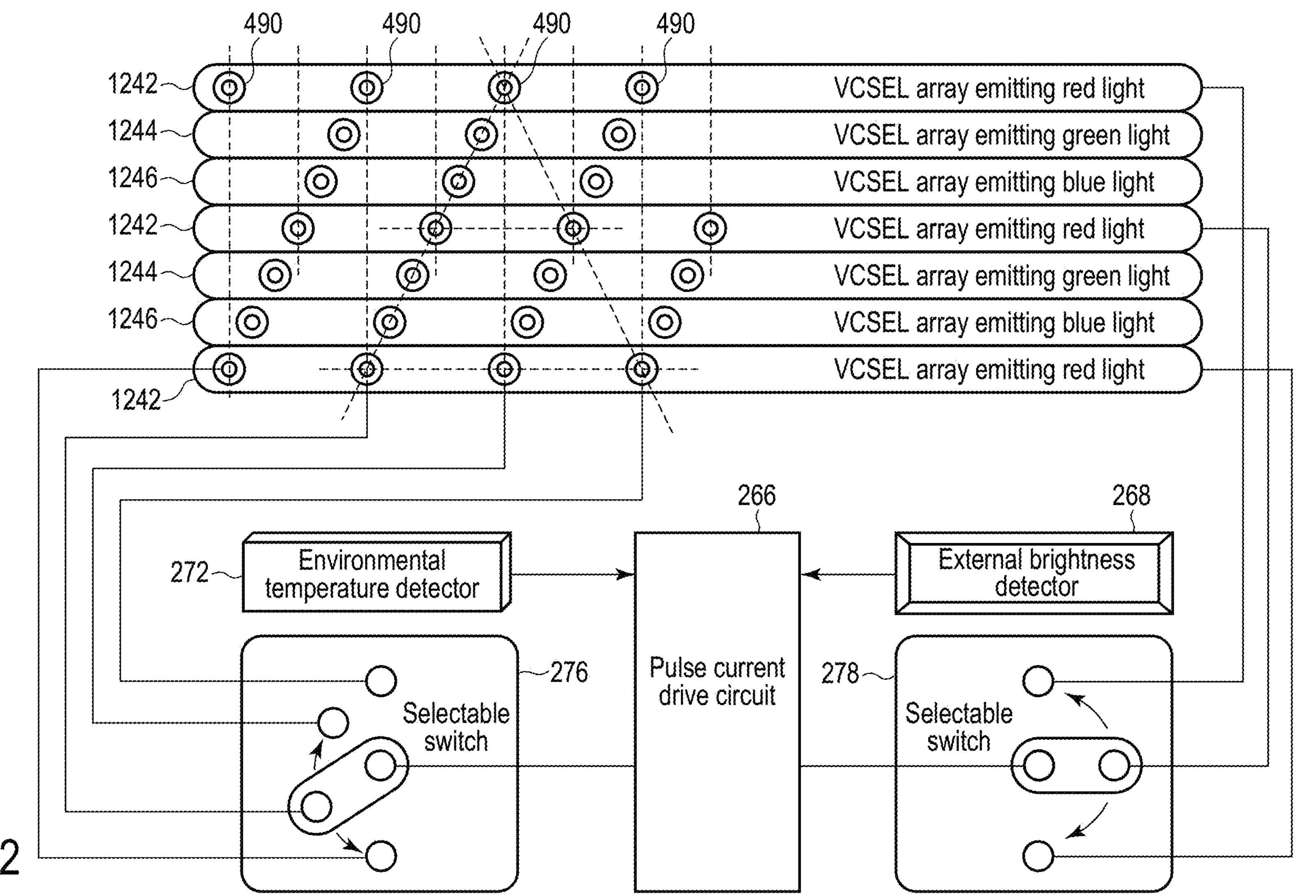
FIG. 32 is an explanatory diagram illustrating an example of the light emission control method for the multipoint light emitter in a case where accumulation along time direction is used.

FIG. 32 illustrates a specific electrical control method example in a case where the VCSEL arrays 1242 to 1246 corresponding to the wide area light emitter (multipoint light emitter) are applied to the display service. The lower side of FIG. 32 may represent one of embodiment examples regarding the optical operation unit mentioned above. In FIG. 21, the description has been made in which the emission light 462 is emitted by causing the drive current 324 to flow between the common bottom sided electrode 498 and the top sided electrode 496. Similarly, individual common electrodes are formed for the VCSEL arrays 1242, 1244, and 1246. Then, the selectable switch 278 selects the common electrode through which the drive current 324 (FIG. 30) flows.

On the other hand, the drive current 324 is selected for different light emission points (light passing windows 490) in the same VCSEL array 1242 by the selectable switch 276. For convenience of description, the selectable switches 276 and 278 represent the rotary mechanical selectable switches respectively. However, for the actual control circuit, the electrical selectable switches 276 and 278 such as a gate circuit may be used.

In the electrical control device, an environmental temperature detector 272 and an external brightness detector 268 are incorporated. Based on each measurement result, the pulse width w and the height (pulse peak value) h in the pulse current drive circuit 266 are automatically set.

As an example of applying the method of "cumulative summation along time direction" to the display 18, an embodiment example of a portable display has been previously described in FIG. 27. In the above embodiment example, the user's retina 156 corresponds to the optical synthesizing area 220. Not limited to that, an optical operation of shifting light emission timing between different light emission points (between different active areas 480) in a wide area light emitter (multipoint light emitter) may be applied to any technical field. In particular, when each of different light emission points (different active areas 480) on the wide area light emitter (multipoint light emitter) can emits the optical phase synchronizing lights simultaneously, the light operation of shifting the light emission timing achieves the effect of reducing the optical interference noise.

As an embodiment example other than the portable display, the method of applying it to the light source 2 in FIG. 1 and FIG. 2 will be described. In a case where the light source 2 includes a wide area light emitter (multipoint light emitter) having plural light emission points that emit optical phase synchronizing emission light 462, the light emission timing of each light emission point may be switched in time sequence by the switching circuit of FIG. 32.

A case where the VCSEL is used as the wide area light emitter (multipoint light emitter) will be taken as an example. When only one light emission point (single active area 480) in the VCSEL is continuously emitted for a long time, heat is accumulated in the active area 480. As illustrated in FIG. 31, the light emission efficiency of the VCSEL decreases at a high temperature. Therefore, when the amount of accumulated heat in the active area 480 increases, the emitted light intensity 338 decreases. From the above relationship of thermal characteristics, continuous light emission at a single light emission point (active area 480) is impossible. Therefore, in the current VCSEL, intermittent light emission (for example, pulsed light emission) is recommended.

In the present embodiment example, the light emission timing of each light emission point in the wide area light emitter (multipoint light emitter) is switched when the pulse current drive circuit 266 connects to each of light emission points (active areas 480) in time sequence. Therefore, when each of light emission points (active areas 480) always changes to emit pulsed light in time sequence and one of light emission points (active areas 480) always emits pulsed light sequentially, the VCSEL light source 2 substantially emits continuous light. In this case, the pulse width w of the drive current 324 to each light emission point (light passing window 490) illustrated in FIG. 30 is matched with the cycle $\tau$, and the pulse peak value h is fixed.

In detail, since the pulsed light is switched every cycle $\tau$, "a subtle change in peak value" occurs at the switching point of the pulsed light. On the other hand, by performing "cumulative summation along time direction", a smooth continuous emitted light intensity can be obtained. For example, a case where the light source 2 is applied to the system in FIG. 1 and FIG. 2 and the measurer 8 measures the detection light (second light beam) 16 obtained from the measured object 22 will be considered. In this case, the inside of the measurer 8 or the inside of the signal processor and/or data analyzer 38 is used as the optical synthesizing area 220. That is, the process of "cumulative summation along time direction" is performed inside the measurer 8 or inside the signal processor and/or data analyzer 38.

For example, in a case where the photodetector 250 that responds at a high speed is used, a "subtle change in the peak emitted light intensity value" at the switching point of the pulsed light appears in the detection signal. In that case, "smoothing processing of the detection signal" is executed in the signal processor and/or data analyzer 38, and a measured smooth signal may be obtained when the VCSEL emits substantially continuous DC light. Furthermore, in the spectral component 320 and the imaging sensor 300, charge accumulation processing is executed at the time of measurement. In this charge accumulation processing, a result equivalent to the "cumulative summation along time direction" processing is obtained.

Figure 33:
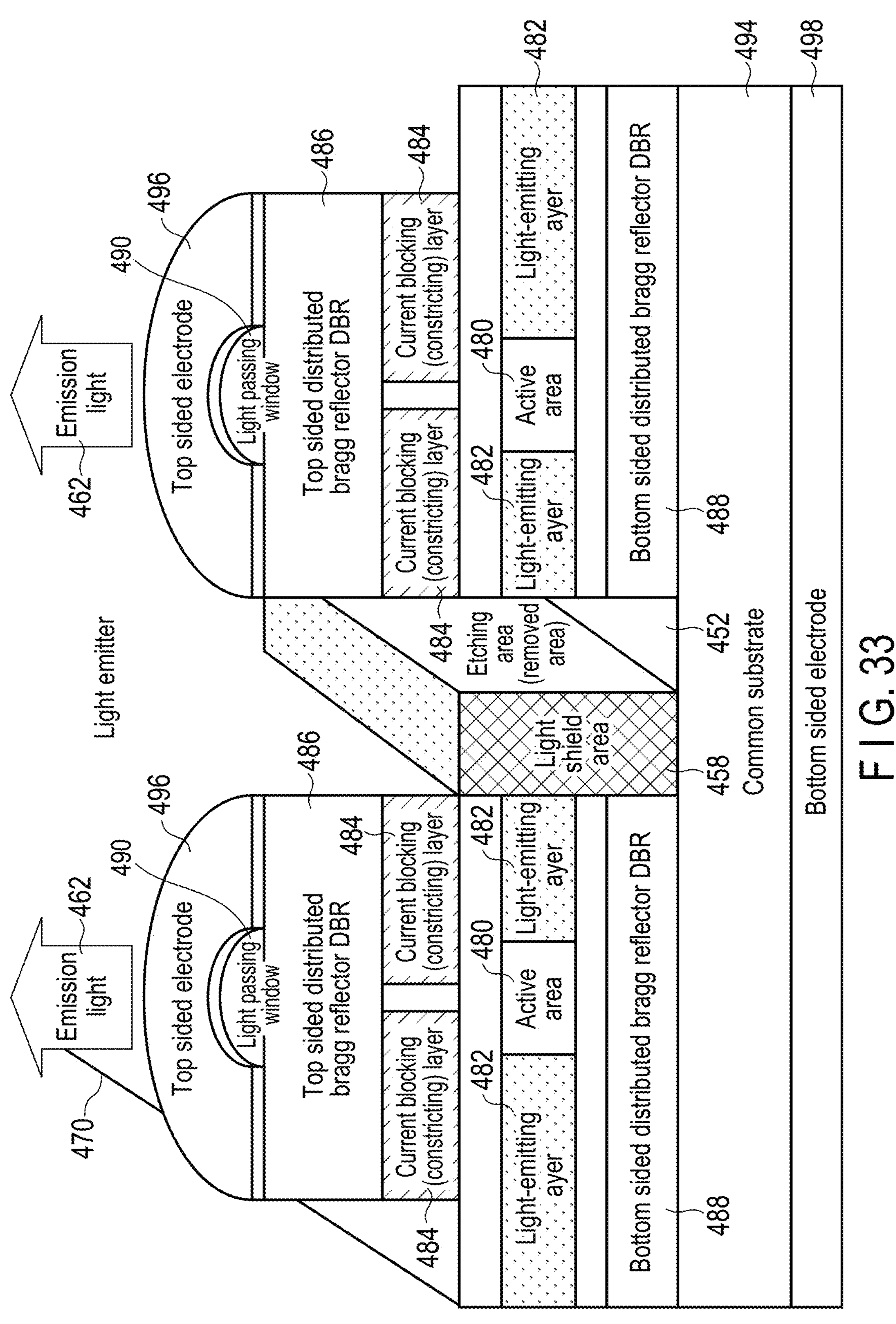
FIG. 33 is an explanatory diagram regarding an example of a multipoint light emitter structure that can support intensity summation.

FIG. 33 illustrates an embodiment example related to the optical operation unit that enables "intensity summation" in the optical synthesizing area 220. As described with reference to FIG. 21, the stimulation light 464 passing through the light emitting layer 482 or the stimulation light 466 passing through the bottom sided DBR 488 enters the adjacent active area 480 to cause a stimulated emission phenomenon. As a result, it is considered that "optical phase synchronization" occurs between the emission lights 462 from the different light passing windows 490.

As a method of inhibiting "optical phase synchronization" between the emission lights 462 from different light passing windows 490, in the present embodiment, an etching area (removed area) 452 is formed to locally delete a part of the light emitting layer 482 or a part of the bottom sided DBR 488. As a concrete method of forming the etching area 452, a part of the light emitting layer 482 or a part of the bottom sided DBR 488 may be locally deleted using etching processing.

Not limited to that, any optical operation unit for preventing the entry of the stimulation light 464 passing through the light emitting layer 482 or the stimulation light 466 passing through the bottom sided DBR 488 into the adjacent active area 480 may be used. As another concrete embodiment example, a light shield area 458 may be formed between adjacent active areas 480. As a function of the light shield area 458, the stimulation light 464 and 466 are absorbed or reflected. As a material for forming the specific light shield area 458, a carbon layer or a carbon compound may be used for light absorption. A metal material may be used for light reflection. Furthermore, as a specific method of forming the light shield area 458, a part of the light emitting layer 482 or a part of the bottom sided DBR 488 may be locally deleted by using etching processing, and then the light shield area 458 may be formed at this deletion location.

As described in Chapter 2, when the stimulation light 464 and 466 enter the adjacent active area 480, the stimulated emission phenomenon is more likely to occur. However, when the entry of the stimulation light 464 and 466 is blocked, the emission light 462 is uniquely emitted for each active area 480. As a result, as shown in Equation 26, the upper limit value of the degree of coherence $|\mu AB|$ significantly decreases.

The above reason will be described below. In a case where the amplitude distribution profile of the emission light 462 emitted from the left side of FIG. 33 may be expressed by Equation 15, and the amplitude distribution profile of the emission light 462 emitted from the right side of FIG. 33 may be expressed by Equation 16. The phase change value "$\Delta\tau(t)$" changes according to passing time t. In this state, Born and Wolf (M. Born and E. Wolf, "Principles of Optics," 6th Ed. (Pergamon Press, 1980), Chaps. 1, 7, 8, 10, and 13) explain that the synthesizing the both emission light elements 462 corresponds to "intensity summation". According to the description of Wolf, the measurement (detection) by the existing optical measurer 8 (photodetector 250, spectral component 320, and imaging sensor 300) detects the light intensity obtained by "cumulative summation" over a relatively long period of 1 nanosecond or more. Therefore, a measurement result similar to the situation in which the synthesized light is generated by the "intensity summation" is obtained.

Instead of using the optical operation unit illustrated in FIG. 33, a characteristic between Wave Trains generated before and after each other in time series may be used. When the characteristic between the front and rear Wave Trains is used, the phase difference "$\Delta\tau(t)$" between the first light element 202 and the second light element 204 changes. Therefore, in the optical synthesizing area 220, a phenomenon corresponding to the "intensity summation" occurs between the first light element 202 and the second light element 204.

Figure 34:
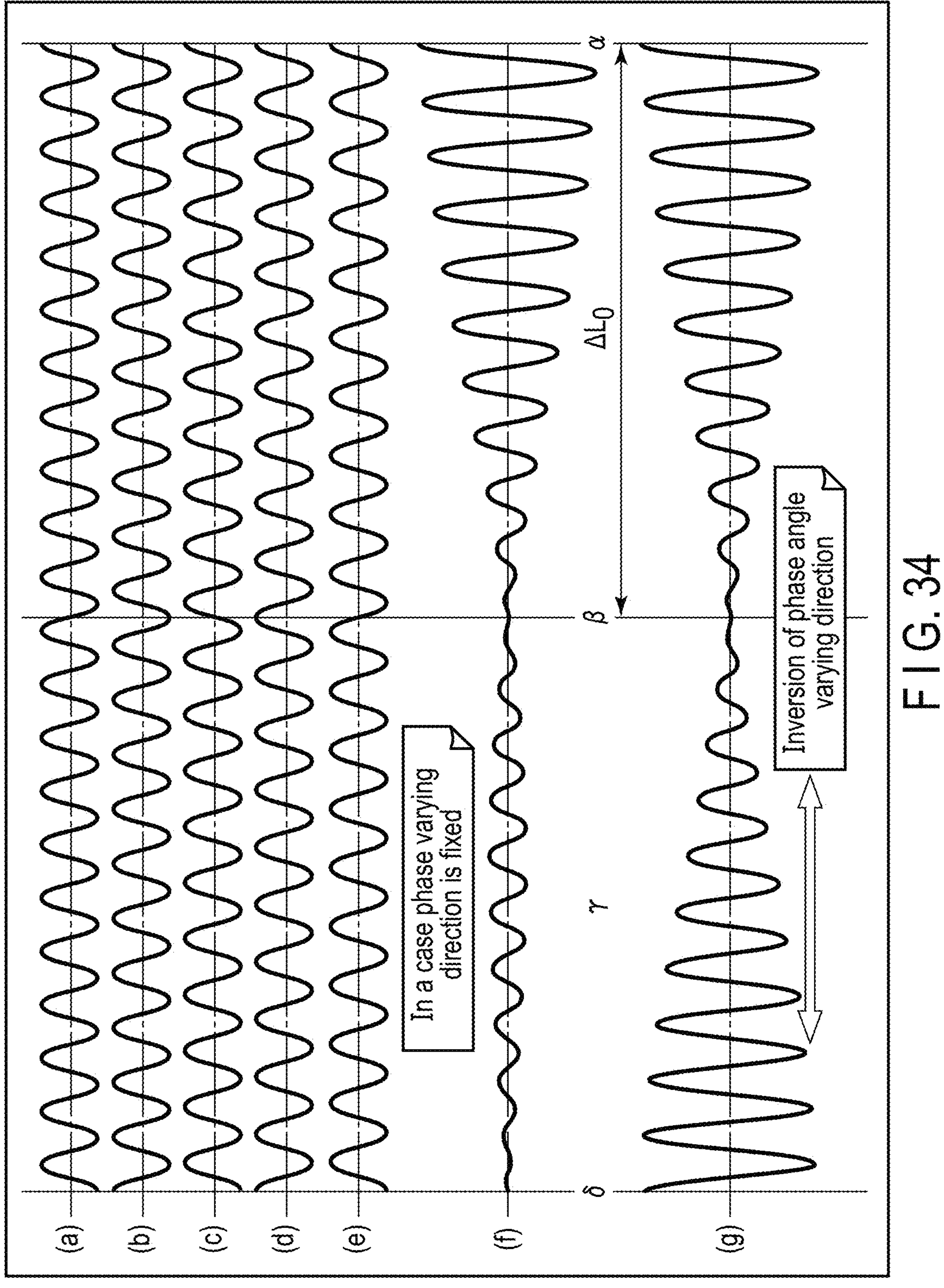
FIG. 34 illustrates a relationship between successive Wave Trains predicted based on the experimental result in FIG. 17.

With respect to FIG. 34, a relation characteristic between different Wave Trains is to be explained below. FIG. 34 illustrates a state in which the center position in FIG. 16(*f*) showing Wave Train is shifted to the right end. That is, the center position in FIG. 16 is shifted to the position α at the right end in FIG. 34. The left end position in FIG. 16 corresponds to the position β in the center portion in FIG. 34. The amplitude profile from the position α to the position β in FIG. 34(*f*) accounts for the experimental result in FIG. 19. Here, the right side of Equation 1 indicates the amplitude profile from the position α to the position β in FIG. 34(*f*), and "Sinc function" expressed in Equation 1 shows the envelope profile of the amplitude profile from the position α to the position β in FIG. 34(*f*). According to Equation 1, the position α in FIG. 34(*f*) corresponds to "sinc 0=1", and the position β in FIG. 34(*f*) corresponds to "sinc π=0". Because a formula "sinc π=0" is obtained when a condition of "$t=\tau_j=0$" and Equations 4 and 5 are substituted for Equation 1. Further, when "$|r|\geq\Delta L0$", the value of "Sinc function" may take a negative value. Here, the γ region in FIG. 34(*f*) corresponds to "$2\Delta L0\geq|r|\geq\Delta L0$" when "$t=\tau_j=0$". Therefore, according to the right side profile in Equation 1, the following profiles may appear for the γ area:

[α] the amplitude of Wave Train is to be also observed in the γ area that is outside (left side) of the left end β of the Wave Train: and

[b] the phase in the 'area between α and β in the Wave Train' is to invert in the 'γ area that is outside (left side) of the left end β of the Wave Train'.

However, in the experimental result shown in FIG. 19, neither of the characteristics [α] and [b] could be observed. That is, contrary to the theoretical expectation of Equation 1, the experimental result shows that one Wave Train completely disappears at the value of Equation 4 (at the position β of the Wave Train in FIG. 34(*f*)). However, even when one Wave Train disappears, the light emission from the light emitter 470 (halogen lamp HL) continues. Therefore, after one Wave Train disappears, the light emitter 470 (halogen lamp HL) needs to emit the next Wave Train.

One Wave Train in FIG. 34(*f*) is to be divided into plural different wavelength lights (FIGS. 34(*a*) and 34(*e*)). It is necessary to generate the next Wave Train while maintaining continuity for each of the plural divided different wavelength lights. And besides, according to the position α (the center portion in one Wave Train) in FIG. 34, the phases of the plural divided different wavelength lights coincide with each other (FIGS. 34(*a*) and 34(*e*)). Therefore, in the process of generating the next Wave Train after one Wave Train disappears, it is necessary to start matching phases between different wavelength lights toward the center portion of the next Wave Train (the position δ) while maintaining continuity for each of the plural divided different wavelength lights.

As a physical model that may satisfy to maintain continuity for each of the plural divided different wavelength lights and to start matching phases between different wavelength lights toward the center portion of the next Wave Train (the position δ), a hypothesis of a mechanism of "simultaneously inverting the varying direction of the phase angle at the position β" is considered.

The reversal hypothesis of the phase angle varying direction at the position β is to be described in detail below. The envelope profile of the Wave Train in the near field of the position β in FIG. 34(*f*) is approximated by Equation 27 from Equation 1 and Equation 5 because the value of "ct-r" is nearly equal to "$\Delta$L0" in the near field of the position β when "$\tau_j=0$":

$$\mathrm{sinc}\{\pi(ct-r)/\Delta L_0\}\approx\frac{\sin\{\pi(ct-r)/\Delta L_0\}}{\pi}\qquad\text{Equation 27}$$

Further, in terms of Sine function from the viewpoint of complex function theory, the following relationship is established:

$$\sin\theta=\frac{e^{i\theta}-e^{-i\theta}}{2i}\qquad\text{Equation 28}$$

Then, substituting Equations 27 and 28 for Equation 1, it can be transformed into:

$$\begin{aligned}\psi(\nu_0)&\approx\frac{\sin\{\pi(ct-r)/\Delta L_0\}}{\pi}\exp\{-i2\pi\nu_0(t-r/c)\}\\&=\frac{\sin\{\pi(ct-r)/\Delta L_0\}}{\pi}\exp\{+i2\pi\nu_0(t-r/c)\}-\\&\quad i\frac{2\sin\{\pi(ct-r)/\Delta L_0\}}{\pi}\sin\{2\pi\nu_0(t-r/c)\}\end{aligned}\qquad\text{Equation 29}$$

Where the conditions of Equation 30 are satisfied, Equation 31 is established.

$$\sin\{\pi(ct-r)/\Delta L_0\}\sin\{2\pi\nu_0(t-r/c)\}\approx 0\qquad\text{Equation 30}$$

$$\begin{aligned}\psi(\nu_0)&\approx\frac{\sin\{\pi(ct-r)/\Delta L_0\}}{\pi}\exp\{-i2\pi\nu_0(t-r/c)\}\\&=\frac{\sin\{\pi(ct-r)/\Delta L_0\}}{\pi}\exp\{+i2\pi\nu_0(t-r/c)\}\end{aligned}\qquad\text{Equation 31}$$

The right side on the upper side of Equation 31 represents the near field of the terminated portion of the "preceding (previously generated) Wave Train" in the near field of the position β. In addition, the lower expression in Equation 31 represents the start position of the "following (later generated) Wave Train" in the near field of the position β. A particularly notable point is that "inversion of phase angle varying direction" occurs between the upper right-hand side expression and the lower expression of Equation 31. As described above, when the "inversion of phase angle varying direction" occurs in the near field of the terminated portion of the "preceding Wave Train" (in the near field of the β position in FIG. 34(*f*)), the phases between different wavelength lights start matching toward the center portion of the next Wave Train (the position δ) immediately after that. As a result, a "subsequent Wave Train" is generated.

As a precondition for generating the "subsequent Wave Train" expressed by Equation 31, Equation 30 must be satisfied. The precondition for Equation 30 to hold is that "generation of a subsequent Wave Train in the middle of a preceding Wave Train is prohibited". That is, when the amplitude value of envelope profile of the "preceding Wave Train" is not "0" (when the condition of Equation 30 does not occur), the generation of the "subsequent Wave Train" does not start. Because Equation 31 is not satisfied when the condition of Equation 30 does not occur.

It may be considered that the physical phenomenon that is the basis for this "continuous repetition of the generation and disappearance of Wave Train occurring continuously along time series" relates to the stimulated emission phenomenon (induced emission phenomenon) described with reference to FIG. 21. As described above, Laser Diode emits the emission light 462 that includes plural different wavelength lights within the spectral bandwidth (wavelength width) $\Delta\lambda$. Therefore, Laser Diode or VCSEL may form the "continuous repetition of the generation and disappearance of Wave Train". That is, when the active area 480 exhausts the carrier, the preceding Wave Train disappears within a term of the photon life corresponding to the coherence time $\Delta\tau$. And then, when the carrier accumulation amount in the active area 480 increases, the active area 480 starts generating the subsequent Wave Train.

With respect to Equations 1 and 27, an approximate formula "$\mathrm{sinc}\{\pi(ct-r)/\Delta L\mathbf{0}\} \approx \cos\{\pi(ct-r)/(2\Delta L\mathbf{0})\}$" may be satisfied when "$|ct-r|<L\mathbf{0}$". And then, a formula "$\cos\{\pi(ct-r)/(2\Delta L\mathbf{0})\}\exp\{-i2\pi\nu0(t-r/c-\tau j)\}=\Sigma \quad \exp\{-i2\pi(\nu0\pm\Delta\nu/4)(t-r/c-\tau j)\}/2$" corresponds to one of particular solutions of "Wave Equation of light". Therefore, the approximated cosine function may suggest that "propagation of a series of continuously forming Wave Trains" is more stable than only a single Wave Train propagation.

The range of the position r satisfying Equation 30 is very long as compared with the length of the central wavelength $\lambda0$ of the Wave Train. Therefore, the position r at which the phase angle varying direction is reversed is not uniquely determined by the length accuracy of the central wavelength $\lambda0$ of the Wave Train. As a result, the phase of the "subsequent Wave Train" becomes discontinuous with respect to the phase of the "preceding Wave Train".

That is, the approximate relationship in Equation 31 under the conditions of Equation 30 lead to the following characteristics:

[c] the subsequent Wave Train are continuously generated at the position $\beta$ in the near field of the terminal end of the preceding Wave Train (continuous Wave Train generation); and

[d] the phase discontinuity between the preceding and subsequent Wave Trains (unsynchronized optical phase 402) occurs because the timing at which the subsequent Wave Train is started generating is uncertain.

A case where the preceding Wave Train is shifted and overlapped with the subsequent Wave Train is to be considered. If there is phase continuity (phase continuity or optical phase synchronization) between the preceding and subsequent Wave Trains, the phase of the synthesized light in which the preceding Wave Train and the subsequent Wave Train are superimposed is always uniquely determined. However, from the above feature [d], the phase shift value between the preceding and subsequent Wave Trains always changes. In the meantime, both of the photodetector 250, the spectral component 320, and the imaging sensor 300 shown in FIG. 1 and FIG. 2 do not have a higher signal response to detect each of the phase shift values. Therefore, this observable state is referred to as "incoherence between the preceding and subsequent Wave Trains".

The intensity of the synthesized light of the preceding and subsequent Wave Trains is equal to the value obtained by summating the average intensity of the preceding Wave Train and the average intensity of the subsequent Wave Train. This situation is referred to as "intensity summation" in the present embodiment.

FIG. 35 illustrates a basic operation principle related to the method for reducing optical interference noise common in various embodiments described in Chapter 4 and subsequent sections. As already described in the previous section, the initial Wave Trains 400 generated before and after each other have an unsynchronized optical phase relation 402.

A series of the initial Wave Trains 400 illustrated in FIG. 35(*a*) is divided by the optical characteristic converting component 210 described later. The method for dividing the initial light 200 may be any of wavefront division, amplitude division/intensity division, and a combination of both. FIGS. 35(*b*) and 35(*c*) illustrate the spatial propagation state of each Wave Train (state of divided Wave Trains 406 and 408) divided for each area in the optical characteristic converting component 210. The amplitude value of each of the divided Wave Trains 406 and 408 is smaller than the amplitude value of the initial Wave Train 400.

Further, when an optical path length difference occurs between the respective optical paths of Wave Trains 406 and 408 after wavefront division, the Wave Train 408 may be delayed in comparison with the Wave Train 406 in the light traveling direction.

Thereafter, synthesizing 410 is performed on each of the Wave Trains 406 and 408 in the optical synthesizing area 220 (FIG. 35(*d*)). According to FIG. 16, one Wave Train size (distance from the start end to the terminal end) is given by $2\Delta L\mathbf{0}$. Therefore, when the optical path length difference between the Wave Train 406 and the delayed Wave Train 408 is set to $2\Delta L\mathbf{0}$ or more, there is no place where the phases of the two are synchronized with each other after synthesis. Even if the optical path length difference between the two is $\Delta L\mathbf{0}$, the temporal coherence between the Wave Train 406 and the delayed Wave Train 408 is low. Therefore, the optical path length difference between them may be set to $\Delta L\mathbf{0}$ or more.

Chapter 2 explained that plural light emission points (light passing windows 490) in a kind of VCSEL (2D light emitter or multipoint light emitter) may have an optical phase synchronizing characteristic with each other. According to FIG. 22, the degree of coherence $|\mu AB|$ satisfies Equation 24 when both of optical phases of the light emission point $\alpha$ 430 and $\beta$ 440 are synchronizing with each other. On the contrary, the degree of coherence $|\mu AB|$ satisfies Equation 26 when an optical phase of the light emission point $\alpha$ 430 is unsynchronized with other optical phase of the light emission point $\beta$ 440, and Equation 24 is different from Equation 26. Meanwhile, FIG. 35 shows one of the operations that enable the intensity summation, and the operation may make phases of the plural light emission points (light passing windows 490) unsynchronized. Therefore, the synchronizing/unsynchronized phase light characteristics are to be described below in relation to the description with reference to FIG. 22.

In this case, the emitting light from the light emission point $\alpha$ 430 forms the Wave Train 406. The emitting light from the light emission point $\beta$ 440 forms the Wave Train 408. Since an unsynchronized optical phase relation is established between the two, the phase difference "$\Delta\tau(t)$" between the two changes with the lapse of time t. The resultant degree of coherence |μAB| is given by Equation 26. Here, the maximum degree of coherence |μAB| is small enough compared with "1".

It was described that the maximum value of the degree of coherence |μAB| decreases as the number of light emission points in an unsynchronized optical phase relation increases. Therefore, when the number of light elements (different Wave Trains) synthesized in FIG. 35(*d*) is increased, the maximum value of the degree of coherence |μAB| further decreases.

When optical measurement (or imaging or optical detection) is performed using only the initial Wave Train 400, the initial Wave Train 400 generates optical interference noise easily. Each of the Wave Trains 406 and 408 may also generate optical interference noise. Here, an optical interference noise pattern generated by the Wave Train after wavefront division 406 is different from another optical interference noise pattern generated by the Wave Train delayed after wavefront division 408 because the optical path of Wave Train 406 is slightly different from the optical path of Wave Train 408. Since the Wave Train after wavefront division 406 and the Wave Train delayed after wavefront division 408 are in unsynchronized optical phase 402, the synthesized light 230 is obtained based on the intensity summation (FIG. 35(*d*)). When the light intensities of both are summated, their intensity profiles are averaged 420. In the process of the ensemble average effect of intensities 420 shown in FIG. 35(*d*), the optical interference noise patterns different from each other are also averaged (smoothed). Then, mutually different portions in the optical interference noise patterns are canceled out. As a whole, the optical interference noise is reduced. On the contrary, a conventional amplitude summation does not form the ensemble average effect.

Figure 36:
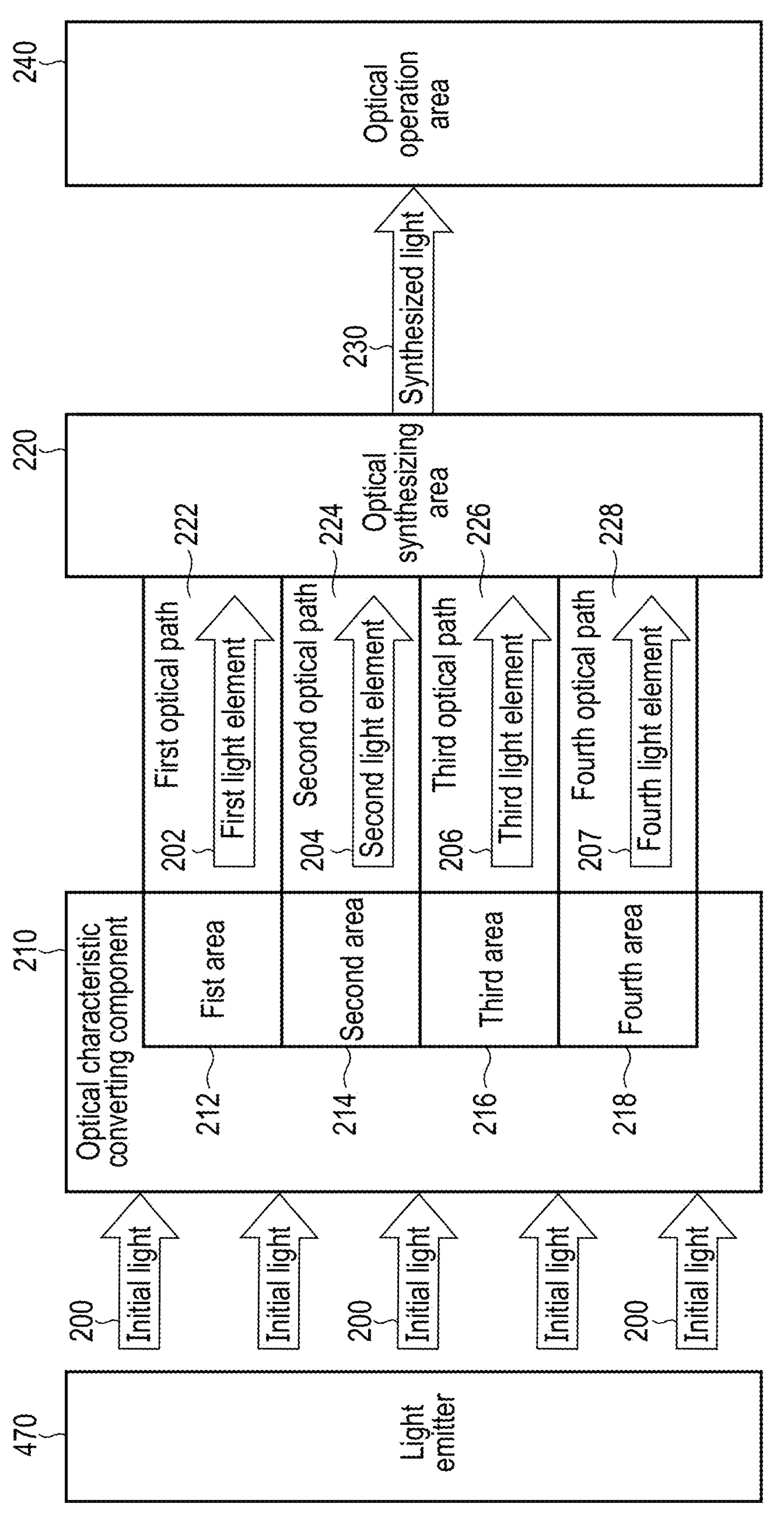
FIG. 36 is an explanatory diagram illustrating a specific optical arrangement example when the optical phase unsynchronized characteristic is used.

FIG. 36 illustrates an optical arrangement example that realizes the basic operation described with reference to FIG. 35. In the embodiment in FIG. 36, the optical characteristic converting component 210 is used as an optical operation unit for performing "intensity summation" in case of generating the synthesized light 230 in the optical synthesizing area 220. That is, the optical characteristic converting component 210 divides the initial light 200 emitted by the light emitter 470 into plural light elements 202 to 207. Here, the first optical path 222 in the optical characteristic converting component 210 forms the first light element 202 having the first optical characteristics, and the second optical path 224 forms the second light element 204 having the second optical characteristics. Similarly, the third optical path 226 in the optical characteristic converting component 210 forms the third light element 206 having the third optical characteristics, and the fourth optical path 226 forms the fourth light element 207 having the fourth optical characteristics. Thereafter, the optical synthesizing area 220 synthesizes the first light element 202 and the second light element 204 or the third light element 206 and the fourth light element 207 to form the synthesized light 230.

Meanwhile, at least a part between the first optical path 222 and the second optical path 224 is arranged at different spatial locations. At least a part between the third optical path 226 and the fourth optical path 228 is also arranged in different spatial locations. Furthermore, the first optical characteristics of the first light element 202 and the second optical characteristic of the second light element 204 are different from each other. Similarly, the third optical characteristics of the third light element 206 and the fourth optical characteristic of the fourth light element 207 are also different from each other. This "difference in optical characteristics" may indicate "phase discontinuity (unsynchronized optical phase characteristic 402)" between the two described in the previous chapter. Alternatively, "incoherence" (decrease in temporal coherence) between the two may mean the difference in the optical characteristics described above.

Here, as an example of the method for arranging at least a part between the first optical path 222 and the second optical path 224 or at least a part between the third optical path 226 and the fourth optical path 228 in different spatial locations (division method), wavefront division for the initial light 200 may be used. In this wavefront division, the areas 212 to 218 are arranged at different locations on the optical cross section of the incident initial light 200 (the plane obtained by cutting a light flux formed by the initial light 200 along a plane perpendicular to the traveling direction of the initial light 200) or on the wavefront of the initial light 200, and each light element 202 to 207 are individually extracted.

The above technical devices will be described again from the viewpoint of the structure of the optical characteristic converting component 210 that realizes the optical action. That is, the optical characteristic converting component 210 used in the present embodiment includes the first area 212 and the second area 214 or the third area 216 and the fourth area 218 different from each other. Then, the optical path length between the first optical path 222 in the first area 212 and the second optical path 224 in the second area 214 may be varied. Similarly, the optical path length between the third optical path 226 in the third area 216 and the fourth optical path 228 in the fourth area 218 may be varied.

Then, in a case where the difference (optical path length) between the optical path length of the first optical path 222 and the optical path length of the second optical path 224 is greater than or equal to the coherence length ΔL0 (or twice the coherence length 2ΔL0), "phase discontinuity (unsynchronized optical phase characteristic 402)" occurs between the first light element 202 and the second light element 204. Similarly, even when the optical path length difference between the third optical path 226 and the fourth optical path 228 is equal to or larger than the coherence length ΔL0 (or twice the coherence length 2ΔL0), "phase discontinuity (unsynchronized optical phase characteristic 402)" occurs between the third light element 206 and the fourth light element 207.

Furthermore, the spatial structure of the optical characteristic converting component 210 is a structure in which the first light element 202 and the second light element 204 are easily synthesized in the optical synthesizing area 220 to form the synthesized light 230. Not limited to that, the structure may be designed to easily synthesize the third light element 206 and the fourth light element 207 in the optical synthesizing area 220 to form the synthesized light 230.

As a specific example of the spatial structure in which the first light element 202 and the second light element 204 or the third light element 206 and the fourth light element 207 are easily synthesized to form the synthesized light 230, it may have a structure in which the incident initial light 200 is divided into the light elements 202 and 204 or the light elements 206 and 207 by wavefront division.

That is, a spatial structure in which the first area 212 is arranged in a prescribed area in a cross section of light flux obtained by cutting the light flux in a plane perpendicular to the traveling direction of the incident initial light 200 may be adopted. Then, a spatial structure in which the second area 214 is arranged in another area in the cross section of light flux is adopted. Similarly, a spatial structure may be adopted in which the third area 216 is arranged in a prescribed area in a cross section of light flux obtained by cutting the light flux in a plane perpendicular to the traveling direction of the initial light 200, and the fourth area 218 is arranged in another area in the light flux cross section.

In the optical synthesizing 410 performed immediately after this, the optical synthesizing area 220 synthesizes the first light element 202 and the second light element 204. According to the relationship between FIGS. 35 and 36, a kind of the optical synthesizing 410 corresponds to the intensity summation so that the optical synthesizing 410 creates the ensemble average effect of intensities 420. Similarly, the optical synthesizing area 220 synthesizes the third light element 206 and the fourth light element 207 (intensity summation). Then, the optical synthesizing (intensity summation processing) generates the synthesized light 230, which is used in the optical operation area 240.

As an embodiment example using the synthesized light 230, the synthesized light 230 may be used as irradiated light (first light) 12 for the measured object 22 shown in FIG. 1 and FIG. 2. In this case, the area from the measured object 22 irradiated with the irradiated light (first light) 12 to the measurer 8 (or the optical device 10 including the measurer 8) may correspond to the optical operation area 240.

The basic operation principle has been described with reference to FIG. 35, and the basic optical arrangement (structure of the optical system) for realizing it has been described with reference to FIG. 36. To summarize this technical device, the initial light 200 emitted by the light emitter 470 is separated into plural light elements 202 to 207, the optical path lengths thereof are varied, and then intensity summation (optical synthesizing) is performed. When the optical path length difference is set to be equal to or more than the coherence length $\Delta L\mathbf{0}$ (preferably twice the coherence length $2\Delta L\mathbf{0}$), the temporal coherence between the divided light elements 202 to 207 decreases.

The synthesized light 230 (intensity summated light) may provide a new method of more efficiently reducing the optical interference noise because the synthesized light 230 (intensity summated light) the divided light elements 202 to 207 which have reduced temporal coherence with each other. This optical interference noise mainly represents spectral interference noise and interference noise (particularly speckle noise) appearing in imaging (captured image).

The light intensity variation corresponding to the absorption band formed by near infrared light is very small. Here, the near infrared light has a wavelength range within the range of 0.8 μm to 2.5 μm. Therefore, in particular, in spectral profile (or absorbance profile) measurement using the near infrared light, the influence of optical interference noise is large. When "partial phase disturbance" occurs in the optical path from the light emitter 470 to the measurer 8 in FIG. 1 and FIG. 2, the partial phase disturbance appears as optical interference noise. For example, this "partial phase disturbance" results even from the fine uneven shape of the surface of the measured object 22.

In response to the optical phenomenon, the synthesized light 230 reduces the interference noise in the spectral (absorption) profile more effectively because the synthesized light 230 comprises each divided light elements 202 to 207 reducing individual temporal coherence with each other. Specifically, the optical characteristic converting component 210 may be arranged in the optical path from the light emitter 470 to the measurer 8. As optical characteristic converting component 210, the diffuser 460, a grating, a holography component, or the like may be used.

On the other hand, in particular, speckle noise is known as interference noise appearing in imaging (captured image). The speckle noise pattern changes depending on the irradiation angle of the irradiated light (first light) 12 that is irradiated onto the measured object 22. Therefore, when the irradiation angle is controlled for each of the divided light elements 202 to 207, the speckle noise amount is effectively reduced. Details will be described in Chapter 4.

Figure 37:
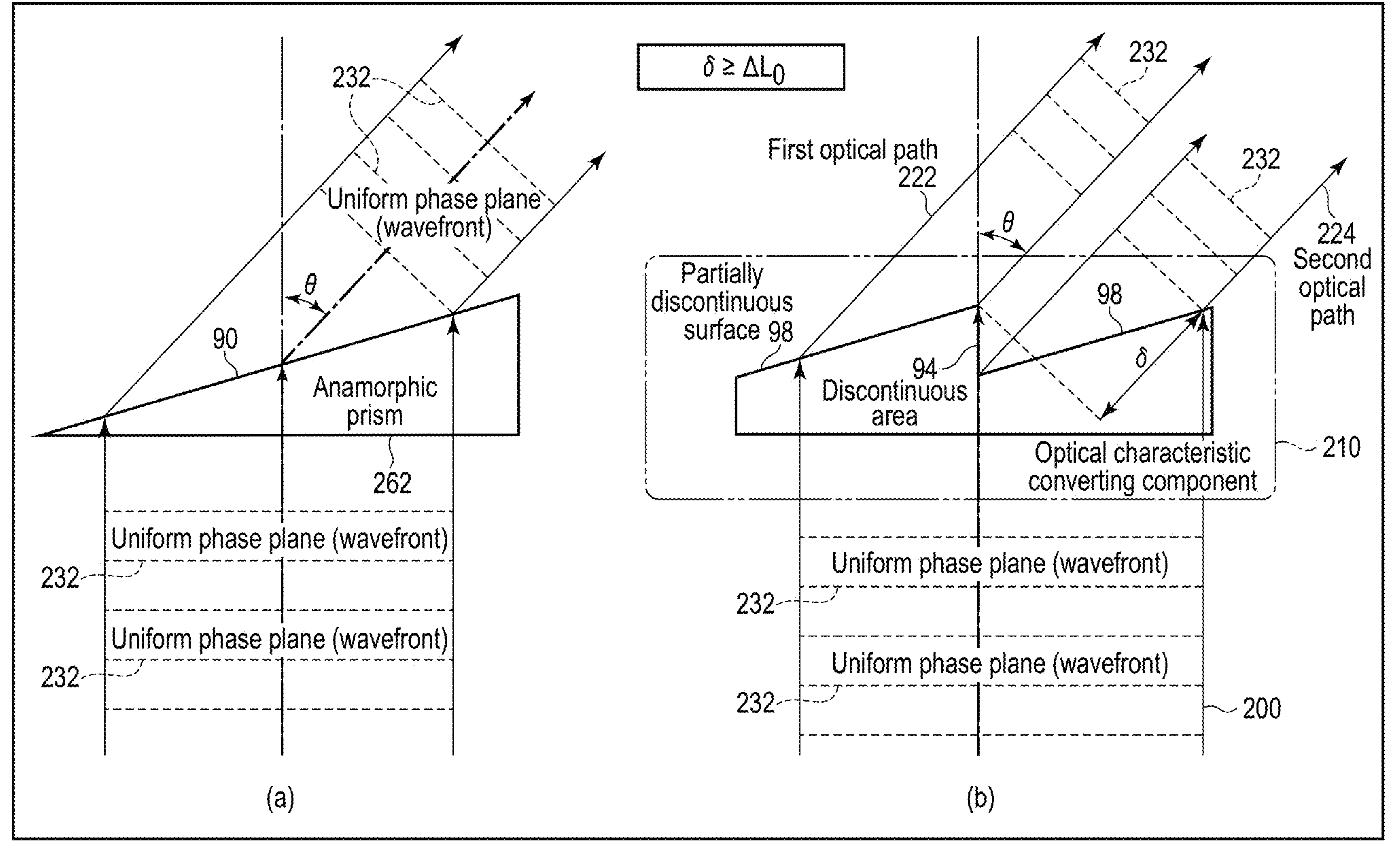
FIG. 37 is an explanatory diagram of a method of selecting different Wave Trains between different optical paths.

FIG. 37 shows an embodiment example of the optical characteristic converting component 210. As described with reference to FIG. 36, the optical characteristic converting component 210 is to have a function of dividing the initial light 200 into plural light elements 202 to 207 having different optical paths. Any of the following methods may be used as the method for dividing the initial light 200 performed by the optical characteristic converting component 210:

1) when the wide area light emitter (or multipoint light emitter) emits the initial light 200, the area is divided on the emitted wide light emitting area (or multipoint light emitting area) or on "its image forming (confocal) plane or a near-field area of the image forming plane";
2) wavefront division is performed in the optical path of the initial light 200; and
3) amplitude division is performed in the optical path of the initial light 200.

As described above, when the number of light elements 202 to 207 (different Wave Trains 406, 408) to be synthesized (intensity summation) increases, the maximum value of the degree of coherence |AB| decreases. Therefore, it is desirable that the number of divided areas 212 to 218 of the optical characteristic converting component 210 becomes larger.

Here, in the amplitude division (3) for dividing the initial light 200 into the transmitted light element and reflected light element, it is difficult to increase the number of divided light elements while maintaining an even light intensity. Therefore, in the present embodiment, it is desirable to use one of the following methods that can increase the number of divisions relatively easily:

1) area division on the wide light emitting area (on the multipoint light emitting area) or on "its image forming (confocal) plane or a near-field area of the image forming plane"; or
2) wavefront division in the middle of the optical path of the initial light 200.

The above division of a wavefront means "spatial area division within the optical cross-section of the initial light 200". Here, the optical cross-section of the initial light 200 indicates a two-dimensional intensity distribution profile that appears when the optical path of the initial light 200 is cut along a plane perpendicular to the traveling direction of the initial light 200.

The method of dividing the initial light 200 by the above method (1) or (2) in the present embodiment example is to be described below. As shown in FIG. 37(*b*), a discontinuous area 94 is formed on the partially discontinuous surface 98 in the optical characteristic converting component 210. Here, the partially discontinuous surface 98 forming the discontinuous area 94 may be either a plane or curved surface (or a mixture thereof). Then, when the optical characteristic converting component 210 is arranged in the optical path of the initial light 200, the optical characteristic converting component divides the initial light 200 into the first optical path 222 and the second optical path 224 with the discontinuous area 94 as a boundary portion. FIG. 37(*b*) shows the method in which the initial light 200 passes through the partially discontinuous surface (curved or plane surface) 98 according to light transmission. Not limited to that, the initial light 200 may be reflected by the partially discontinuous surface (curved or plane surface) 98.

The discontinuous area 94 in the partially discontinuous surface (curved or plane surface) 98 exhibits an original effect. In both FIGS. 37(*a*) and 37(*b*), an even uniform phase plane (wavefront) 232 exists in the initial light 200. FIG. 37(*a*) shows a case where an anamorphic prism 262 is arranged in the optical path of the initial light 200. On the surface of anamorphic prism 262, a continuous plane 90 is formed on both the incident surface and the outgoing surface. Therefore, even after passing through the anamorphic prism 250, an even uniform phase plane (wavefront) is held.

On the other hand, as shown in FIG. 37(*b*), after passing (light transmission or light reflection) through the partially discontinuous surface (curved or plane surface) 98 in the optical characteristic converting component 210, the discontinuous area 94 as a boundary portion divides the initial light 200 into the first optical path 222 (the left side of the discontinuous area 94) and the second optical path 224 (the right side of the discontinuous area 94). Therefore, the uniform phase plane (wavefront) in the initial light 200 is divided by the discontinuous area 94 as a boundary portion, so that the discontinuous area 94 on the partially discontinuous surface 98 may provide the "dividing action (division of the wavefront)" from the uniform phase plane generated in the initial light 200.

Based on the light operation of the optical characteristic converting component 210, the principle of "intensity summation" of the divided light elements 202 to 207 at the optical synthesizing area 220 is to be described. As illustrated in FIGS. 16(*a*) to 16(*e*), the different wavelength lights synthesize to form a Wave Train that is obtained by "amplitude summation". And FIG. 16(*f*) indicates that the frequency (wavelength) inside the Wave Train coincides with the center frequency $\nu 0$ (central wavelength $\lambda 0$) of the corresponding wavelength light (FIG. 16(*c*)). Then, the reference phase value $\tau_j$ (Equation 1) is fixed within the same Wave Train. That is to say, "the phase is fixed everywhere" in the same Wave Train. Therefore, when the divided light elements in the same Wave Train are synthesized in the optical synthesizing area 220, "amplitude summation occurs.

As described with reference to FIG. 34, the phase shift value "$\tau_j$" (expressed in Equation 1) between different Wave Trains formed before and after each other in time series (FIG. 35(*a*)) is always varying. In the measurer 8, a time-integrated light intensity for each prescribed time (for example, on the order of nanosecond) is acquired as the measured signals 6. Therefore, "intensity summation" can be performed only after optical synthesizing is performed between "different Wave Trains generated before and after each other in time series".

That is, in order to perform "intensity summation" on the divided light elements to be synthesized in the optical synthesizing area 220 (light elements 202 to 207 after passing through the different optical paths 222 to 228), it is desirable that "different Wave Trains generated before and after each other in time series" be individually included in the divided light elements to be synthesized (the light elements 202 to 207 after passing through the different optical paths 222 to 228).

In the present embodiment, as a method of providing each of the light elements 202 to 207 after passing through the different optical paths 222 to 228 with "different Wave Trains generated before and after each other in time series", the optical path length is varied by at least the coherence length $\Delta L\mathbf{0}$ (desirably, twice the coherence length $2\Delta L\mathbf{0}$) or more between the different optical paths 222 to 228.

In the present embodiment, as a method of varying the optical path length between the different optical paths 222 to 228, either of the following may be selected using the optical characteristic converting component 210:

[A] The optical path length is varied without changing a traveling direction from the traveling direction of the initial light 200; or

[B] The changing a traveling direction from the traveling direction of the initial light 200 varies the optical path length.

The method of [A] is to be described later in the latter half of Chapter 3 with reference to FIGS. 44 to 47. In the method [A], it is desirable to use the optical characteristic converting component 210 of light transmission type. On the other hand, the optical characteristic converting component 210 used in the above [B] may be either the light transmission type or the light reflective type, and thus the selection range is widened. Here, a description is made focusing on the embodiment example of the above [B].

FIG. 37(*b*) shows that a perpendicular line to continuous surface parts (other than the discontinuous area 94) in the partially discontinuous surface (curved or plane surface) 98 tilts away from the traveling direction of the initial light 200. As a result, the traveling direction of the light elements 202, 204 after passing through the partially discontinuous surface (curved or plane surface) 98 is inclined in the direction of "θ" with respect to the traveling direction of the initial light 200. Therefore, using the inclination angle "θ", an optical path length difference δ between the first optical path 222 and the second optical path 224 occurs automatically.

Then, the optical path length difference δ may be easily set to be larger than or equal to the coherence length $\Delta L\mathbf{0}$ (or twice or more the coherence length $2\Delta L\mathbf{0}$). As a result, optically temporal coherence between the first light element 202 passing through the first optical path 222 and the second light element 204 passing through the second optical path 224 is greatly reduced.

When the inclination angle "θ" between the traveling direction of the light elements 202, 204 after passing through the partially discontinuous surface (curved or plane surface) 98 and the traveling direction of the initial light 200 increases, the optical path length difference δ between the first optical path 222 and the second optical path 224 increases. Therefore, when the method of [B] of changing the traveling direction of the initial light 200 is applied, a large optical path length difference δ can be efficiently acquired. That is, in the embodiment example using the method [B], the effect of downsizing the entire optical system provides easily.

Figure 38:
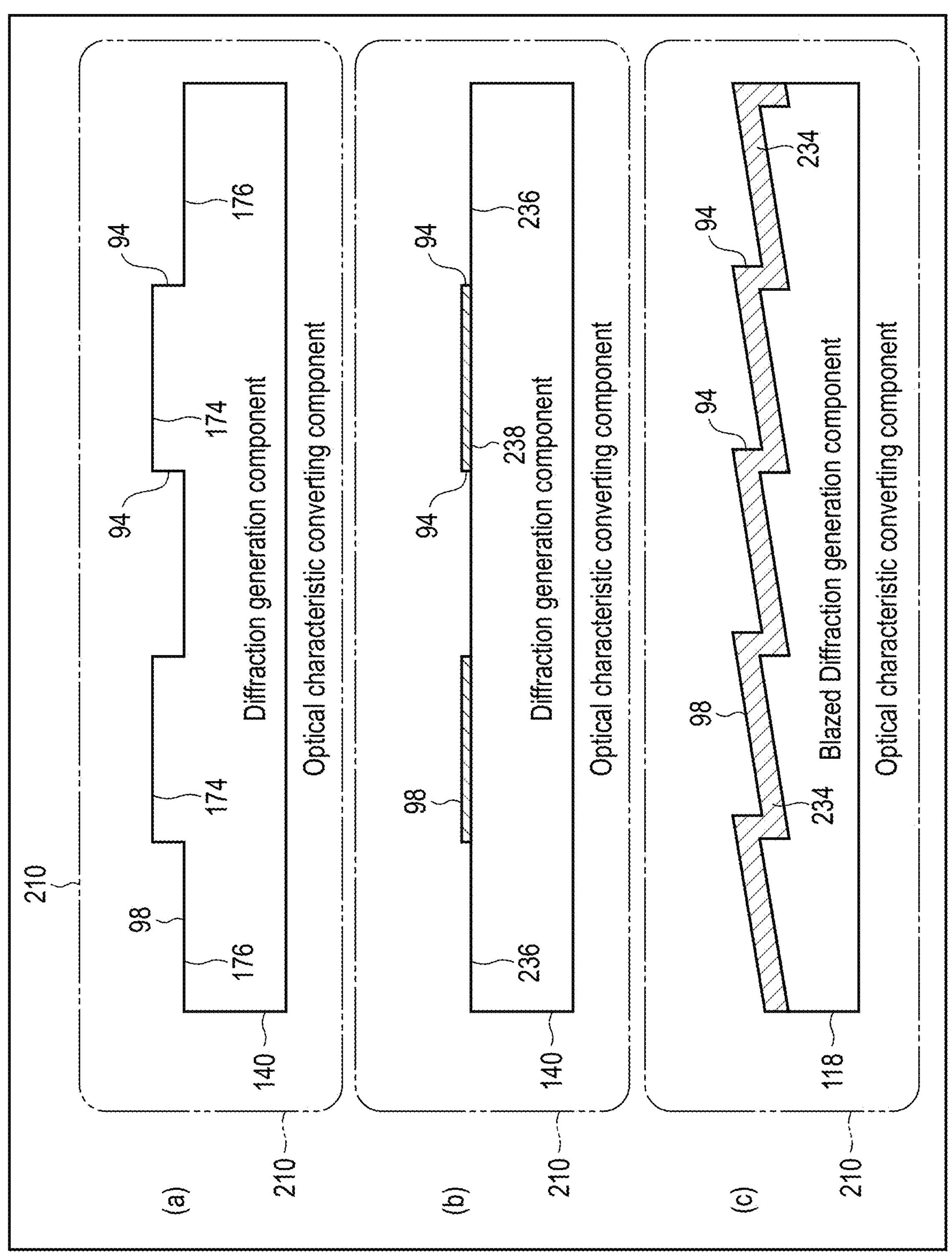
FIG. 38 is an explanatory diagram of a discontinuous portion existing in the diffraction generation component.

FIG. 38 illustrates another embodiment examples of the partially discontinuous surface (curved or plane surface) 98 used in the optical characteristic converting component 210. FIG. 38 also performs the light division with changing the traveling direction of the initial light 200. That is, in another embodiment example of FIG. 38, the diffraction light (1st ordered diffraction light) may generate the optical path length difference δ. Here, a traveling direction of the 1st ordered diffraction light tilts from the traveling direction of the incident light (initial light 200). Therefore, utilizing a diffraction generation component 140, the optical system can be downsized similarly to FIG. 37(*b*).

As explained in FIG. 37(*b*), either of the following may be used for the place where the light is divided:

1) Area division on the wide light emitting area (multi-point light emitting area) or on “its image forming (confocal) plane or a near-field area of the image forming plane”; and
2) wavefront division in the optical path of the initial light 200.

There is a difference in a utilization method of the discontinuous area 94 between FIG. 37(*b*) and FIG. 38. In FIG. 37(*b*), the discontinuous area 94 corresponds to a boundary portion to divide the initial light 200. In comparison with FIG. 37(*b*), FIG. 38 shows that the arrangement form of the discontinuous area 94 varies each of diffraction angles of light elements 202 to 207 to divide the initial light 200.

That is, a part of the partially discontinuous surface 98 may have a cycle term “T1” of the discontinuous areas 94 arranged periodically, and another part of the partially discontinuous surface 98 may have another cycle term “T2” of the discontinuous areas 94 arranged periodically. And the cycle term “T1” makes a diffraction angle of light element 202 (1st ordered diffraction light) when the cycle term “T2” makes another diffraction angle of light element 204 (1st ordered diffraction light). Therefore, a combination between the part having the cycle term “T1” and the another part having the cycle term “T1” performs a division of the wavefront 232 of the initial light 200.

In FIG. 38, basically, the optical characteristic converting component 210 is configured using the diffraction generation component 140. Here, the diffraction generation component 140 may be defined as “an optical component that changes the traveling direction of diffraction light (1st ordered diffraction light) from the traveling direction of the incident light beam (0th ordered diffraction light) by utilizing light diffraction”. Specific form of the diffraction generation component 140 may include a grating or a holography component. Not limited to that, any optical component conforming to the above definition may be referred to as a diffraction generation component 140.

As physical form examples of the diffraction generation component 140 used in the present embodiment, the phase type (FIG. 38(*a*)) and the light intensity change form (FIG. 38(*b*)) are illustrated. FIG. 38(*c*) illustrates a physical form example of a blazed diffraction generation component 118 in which the perpendicular line of a surface (curved or plane surface) other than the discontinuous area 94 in the partially discontinuous surface (curved or plane surface) 98 is inclined to the traveling direction of the incident light (initial light 200). In addition, FIG. 38(*c*) illustrates an example of the reflective type in which the surface is a light reflection face 234, but not limited to that, a transmission type may be adopted. Here, in case of the transmission type, the light reflection face 234 on the partially discontinuous surface 98 does not exist, and the partially discontinuous surface 98 is transparent.

The diffraction generation component 140 used in the present embodiment example has the discontinuous area 94 in the partially discontinuous surface (curved or plane surface) 98 in any of FIGS. 38(*a*) to 38(*c*). In case of the phase type diffraction generation component 140 illustrated in FIG. 38(*a*), the boundary portion between a top face 174 and a bottom face 176 is referred to as the discontinuous area 94. Even if there is an inclined surface (curved or plane surface) at the boundary portion between the top face 174 and the bottom face 176, the boundary portion area between the top face 174 and the bottom face 176 is also referred to as the discontinuous area 94.

In case of the phase type diffraction generation component 140 illustrated in FIG. 38(*a*), when the pitch (cycle term) between the top faces 174 (or between the bottom faces 176) adjacent to each other is changed, the diffraction angle of the 1st ordered diffraction light (the light element 202 to 207) with respect to the 0th ordered diffraction light (the initial light 200) changes. Therefore, the diffraction angles of the 1st ordered diffraction lights (the light elements 202 to 207) respectively depend on the pitches (cycle terms) of discontinuous areas 94. And varying each of pitches (cycle terms) of discontinuous areas 94, it is possible to divide the initial light 200 (division in which the traveling direction is changed between the first light element 202 and the second light element 204).

In the embodiment example illustrated in FIG. 38(*a*), the incident light (initial light 200) is transmitted through the phase type diffraction generation component 140 to cause diffraction. Not limited to that, diffraction may be generated using surface reflection of the phase type diffraction generation component 140. In this case, as in FIG. 38(*c*), light reflection faces 234 may be formed on both the top face 174 and the bottom face 176.

The light intensity changed diffraction generation component 140 illustrated in FIG. 38(*b*) has a structure in which a light reflection face or light shield face 238 is locally provided on a transparent face 236. Diffraction occurs using the difference in light transmittance or a difference in light reflectance between the transparent face 236 and the light reflection face or light shield face 238. Therefore, in this case, the boundary portion between the transparent face 236 and the light reflection face or light shield face 238 is referred to as the discontinuous area 94. The light intensity changed diffraction generation component 140 also performs light division (division in which the traveling direction is changed between the first light element 202 and the second light element 204) by varying the pitch (cycle term) between the transparent faces 236 adjacent to each other (or between the light reflection face or light shield face 238).

A blazed diffraction generation component 118 illustrated in FIG. 38(*c*) has a structure for enhancing the diffraction efficiency of the 1st ordered diffraction light. In this case, the different level area between the adjacent inclined surfaces (light reflection face 234) corresponds to the discontinuous area 94. In addition, the pitches (cycle terms) between the adjacent inclined surfaces (light reflection faces 234) may vary to perform light division (division in which the traveling direction is changed between the first light element 202 and the second light element 204).

In FIG. 38, the diffraction generation component that mainly generates the diffraction phenomenon has been mainly described. Not limited to that, a reflective Fresnel component 119 may be used instead of the blazed diffraction generation component 118 illustrated in FIG. 38(*c*). The reflective Fresnel component 119 includes the discontinuous area 94 and the inclined surface in common with the blazed diffraction generation component 118. However, since a pitch (cycle term) between adjacent inclined surfaces in the reflective Fresnel component 119 is relatively wide, a diffraction phenomenon hardly occurs. Since this inclined surface corresponds to a part of a curved mirror (or a mirror plane), it is similar to a state in which the embodiment illustrated in FIG. 37(*b*) is deformed into a reflective type.

Figure 39:
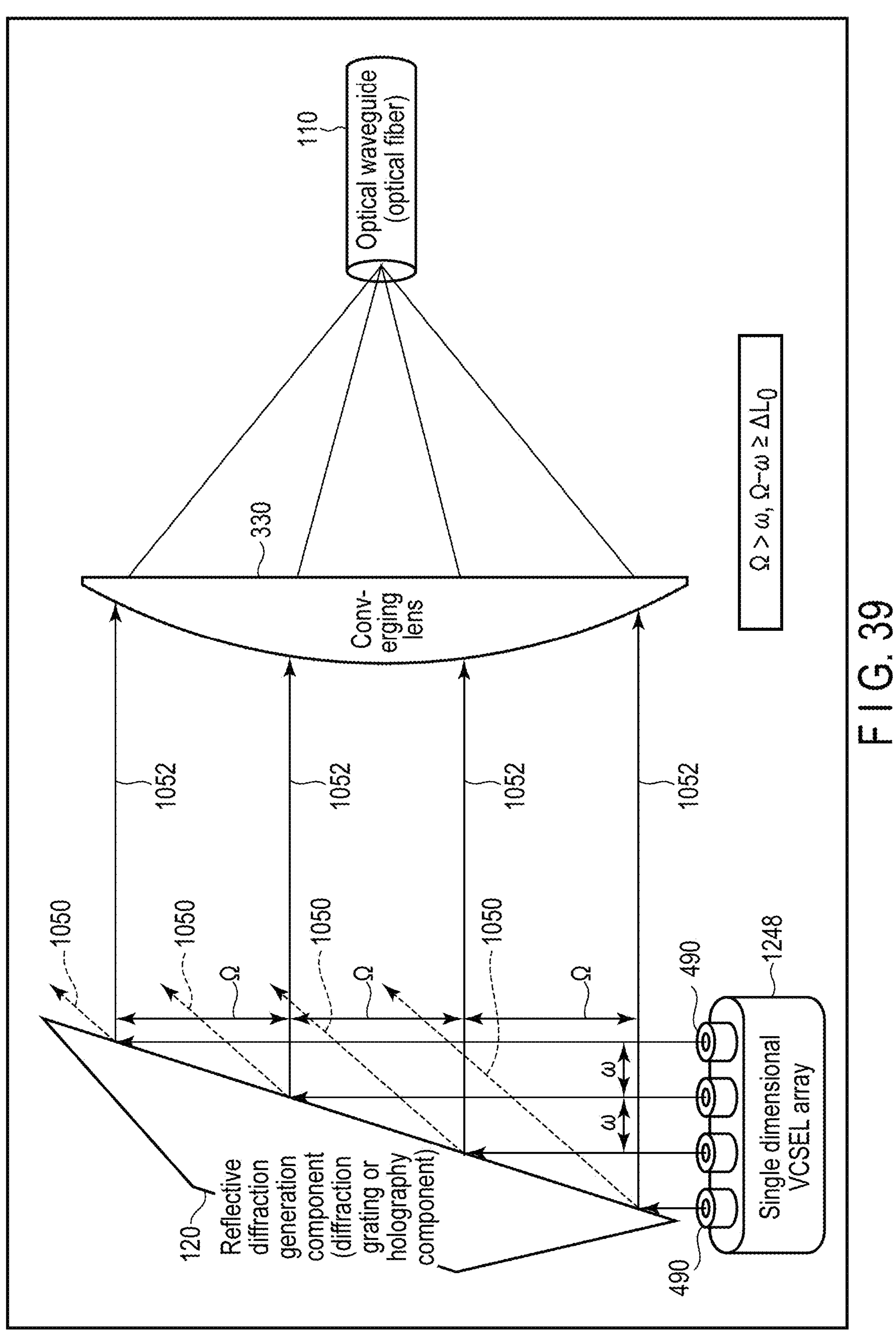
FIG. 39 is an explanatory diagram of a mode example in which a multipoint light emitter and a partially discontinuous surface are combined.

FIG. 39 illustrates an embodiment example in which the optical characteristic converting component 210 described with reference to FIG. 38 is applied to optical communication. When a phase synchronizing type multipoint light emitter is used for optical communication, as described with reference to FIG. 26, an optical interference phenomenon may occur to degrade transfer signal quality. FIG. 39 may reduce the risk to keep high quality of the transfer signal, and the optical system illustrated in FIG. 39 may provide a high-quality transfer signal. As explained in Chapter 2, a kind of single dimensional VCSEL array 1248 illustrated in FIG. 39 may have a phase synchronizing characteristic. That is, each light emission point (light passing window 490) on the single dimensional VCSEL array 1248 emits the phase synchronizing light 462 with each other. Therefore, the optical characteristic converting component 210 having the partially discontinuous surface 98 is effective to reduce the optical interference phenomenon.

Each light emission point (light passing window 490) on the single dimensional VCSEL array 1248 emits divergent emission light 462. But the optical system of FIG. 39 selectively extracts only the emission light 462 traveling only in a specific direction. Because the optical system illustrated in FIG. 39 arranges an optical waveguide (optical fiber) 110 on the rear-side focal plane of a converging lens 330. Here, only the parallel light traveling in the direction along the optical axis of the converging lens 330 can enter through the light incident surface of the optical waveguide (optical fiber) 110.

The reflective diffraction generation component (diffraction grating or holography component) 120 reflects the divergent emission lights 462 respectively emitted from plural light emission points (light passing windows 490) on the single dimensional VCSEL array 1248 to generate diffraction lights 1050, 1052. And then, only a part of the 1st ordered diffraction light 1052 traveling in the direction along the optical axis of the converging lens is selected to pass through the optical waveguide (optical fiber) 110.

Further, when the pitch (cycle term) between the discontinuous areas 94 in the reflective diffraction generation component (diffraction grating or holography component) 120 is made uniform throughout, the angle (diffraction angle) between the 0th ordered diffraction light and the 1st ordered diffraction light is fixed. Then, the reflective diffraction generation component (diffraction grating or holography component) 120 having a uniform angle (diffraction angle) between the 0th ordered diffraction light and the 1st ordered diffraction light everywhere is inclined and arranged at the outlet of a single dimensional VCSEL array 1248 (phase synchronizing type multipoint light emitter).

The interval value between adjacent light emission points (light passing windows 490) in the single dimensional VCSEL array 1248 (phase synchronizing type multipoint light emitter) represents "ω". When the optical system illustrated in FIG. 39 arranges the reflective diffraction generation component (diffraction grating or holography component) 120 to incline with respect to the emitting outlet of the single dimensional VCSEL array 1248 (phase synchronizing type multipoint light emitter), the interval value between the 1st ordered diffraction lights 1052 entering the optical waveguide 110 increases to "Ω".

Here, when the length of "Ω−ω" is set to be equal to or longer than the coherence length ΔL0 (or twice or more the coherence length 2ΔL0), the temporal coherence between the emission lights 462 emitted from adjacent light emission points (light passing windows 490) reduces greatly. As a result, optical interference noise caused by the optical interference phenomenon in optical communication reduces, and the effect of ensuring a high-quality transfer signal occurs.

FIG. 40 shows an embodiment example that arranges the partially discontinuous surface (curved or plane surface) 98 in the optical path of the emission light 462 from the wide area light emitter (or multipoint light emitter). FIG. 40 illustrates an example in which a phase synchronizing type multipoint light emitter (2D light emitter/VCSEL) 252 is used as the wide area light emitter. In the phase synchronizing type multipoint light emitter (2D light emitter/VCSEL) 252 such as VCSEL, the optical interference noise between the emission lights 462 from the corresponding light emission points (light passing windows 490) occurs. It has been described above that when the partially discontinuous surface (curved or plane surface) 98 is arranged in the optical path of the emission lights 462 (initial light 200), the optical interference noise reduces.

The embodiment example of FIG. 40 uses the reflective diffraction generation component 120 or the reflective Fresnel component 119 as the optical component having the partially discontinuous surface (curved or plane surface) 98. And the embodiment example of FIG. 40 arranges the partially discontinuous surface (curved or plane surface) 98 in the reflective diffraction generation component 120 or the reflective Fresnel component 119 at an oblique position with respect to the traveling direction of the emission light 462.

When the reflective diffraction generation component 120 is blazed in use, the diffraction efficiency of the 1st ordered diffraction light 1052 rises up. Meanwhile, when the reflective Fresnel component 119 is used, the inclination angle is optimized. In this way, the partially discontinuous surface (curved or plane surface) 98 reflects the emission light 462 to deflect downward in FIG. 40. That is, when a fine shape in the partially discontinuous surface (curved or plane surface) 98 is manipulated, the traveling direction of the reflected light can be efficiently controlled.

The divergence angle of the emission light 462 from the multipoint light emitter 252 such as VCSEL is relatively wide. Meanwhile, the optical system shown in FIG. 39 selectively extracted the prescribed light traveling only in a specific direction from the divergent emission light 462 emitted from the multipoint light emitter 252 such as VCSEL. On the contrary, in the embodiment example shown in FIG. 40, the divergence (large divergence angle) in the traveling direction of the divergent emission light 462 is effectively used, and the divergent emission light 462 is devised to travel in the wide divergence direction after being reflected by the partially discontinuous surface (curved or plane surface) 98.

The embodiment example shown in FIG. 40 arranges the partially discontinuous surface (curved or plane surface 98 at an oblique position with respect to the traveling direction of the emission light 462 to widen the light reflection area in the partially discontinuous surface (curved or plane surface) 98. That is, a structure in which the width "L" of the light reflection area in the partially discontinuous surface (curved or plane surface) 98 is sufficiently widened (W<<L) as compared with the width "W" of the wide light emitting area (that is, the multipoint light emitting area of VCSEL) in the light emitter 470 is provided.

When light that is simultaneously emitted by all the light emission points within the wide light emitting area (i.e., the multipoint light emitting area of the VCSEL) enters the user's eye, there is a risk of damaging the retina 156. By sufficiently widening the width "L" of the light reflection area as described above, the burden on the user's eyes can be greatly reduced. In consideration of the burden on the user's eyes, the light reflection area width "L" is desirably 1 mm or more (desirably 3 mm or more). In addition, the light reflection area width "L" is desirably 1 m or less (desirably 100 m or less) due to physical restrictions in implementation.

Figure 41:
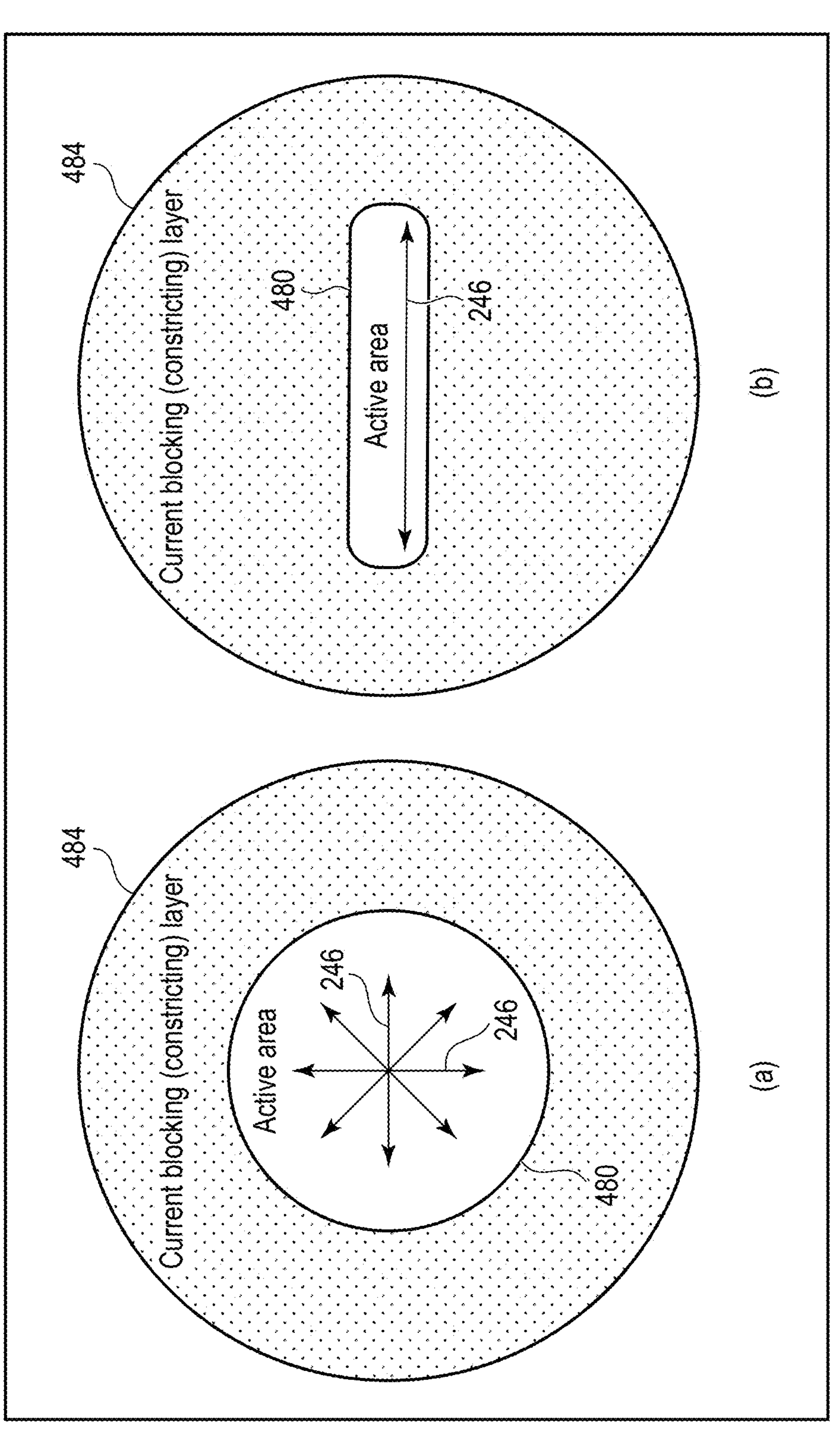
FIG. 41 is an explanatory diagram of a polarization characteristic control method for emitting light beams from the VCSEL.

FIG. 41 shows the relationship between the shape of the current blocking (constricting) layer 484 in the VCSEL and the polarization characteristics of the emission light 462. As described with reference to FIG. 21, carriers in the VCSEL pass through an aperture in the current blocking (constricting) layer 484 to reach an active area 480. Therefore, the aperture shape in the current blocking (constricting) layer 484 affects the actual viewed shape of the active area 480.

For example, when the aperture shape in the current blocking (constricting) layer 484 is circular as illustrated in FIG. 41(*a*), the actual viewed shape of the active area 480 also approaches circular. The polarization direction 246 of the emission light 462 at that time is directed in an arbitrary direction. On the other hand, when the aperture shape in the current blocking (constricting) layer 484 is made into a rectangle having a long major axis as illustrated in FIG. 41(*b*), the actual viewed shape of the active area 480 also approaches a rectangle having a long major axis. The polarization direction 246 of the emission light 462 at that time is expected to be parallel to the long axis direction of the active area 480. By optimizing the aperture shape in the current blocking (constricting) layer 484 in this manner, the polarization direction 246 of the emission light 462 may be controlled.

Figure 42:
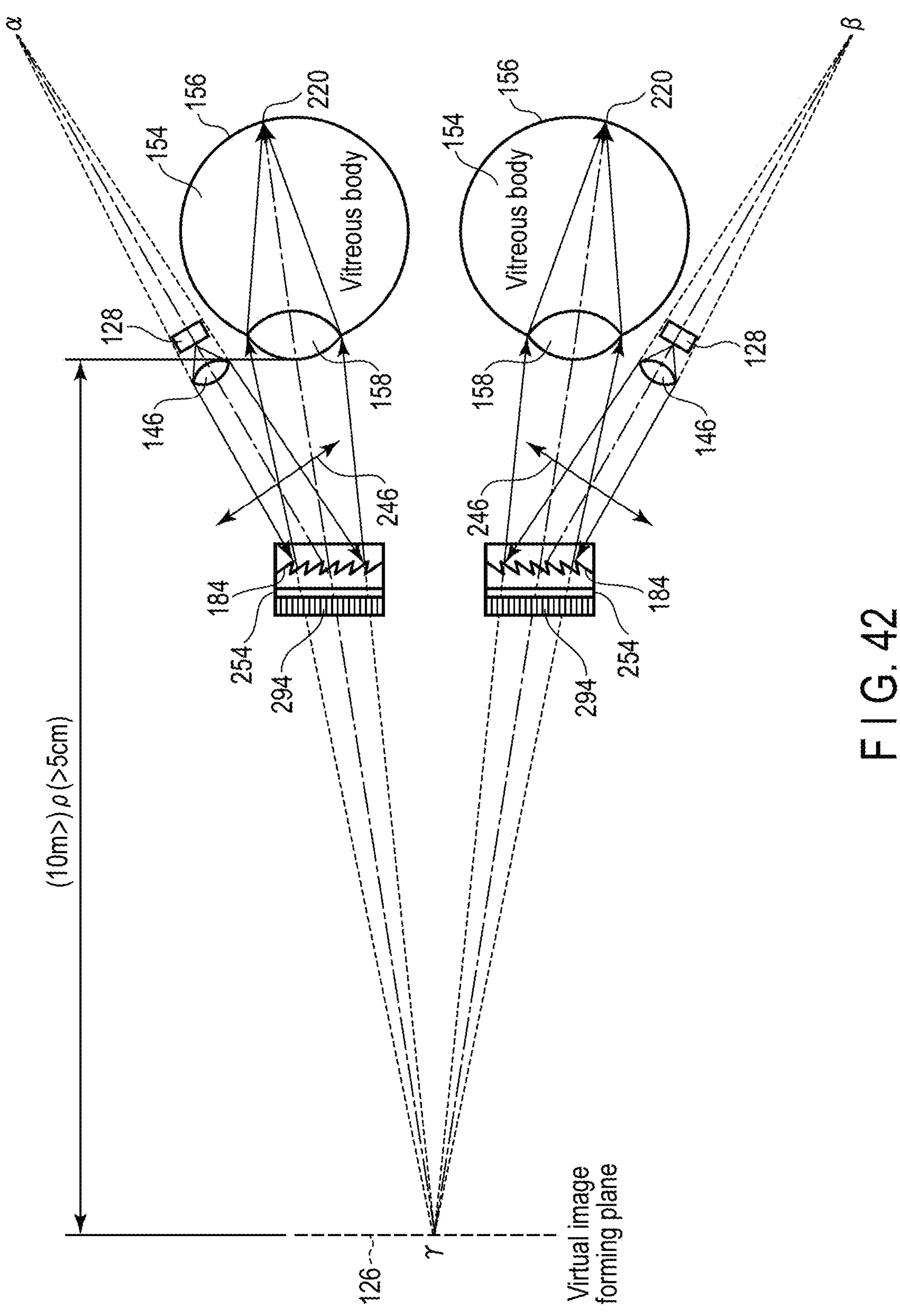
FIG. 42 is an explanatory diagram of an application example to a display device.

FIG. 42 shows an embodiment example of a display method (portable display device) using the partially discontinuous surface (curved or plane surface) 98. Similarly explained in FIG. 27, the virtual image forming lens 146 reduces the divergence angle of the divergent emission light 462 from VCSEL 128. Also in this case, the optical synthesizing area 220 is located on the retina 156 of the user. In the optical structure shown in FIG. 27, optical interference noise is likely to occur from the emission light 462 from VCSEL 128.

The embodiment example of FIG. 42, arranges a half mirror surface (Fresnel type or Hologram type) 184 having the partially discontinuous surface (curved or plane surface) 98 in the optical path of the emission light 462. A Fresnel typed half mirror surface 184 may be used as the partially discontinuous surface (curved or plane surface) 98. Not limited to that, a half mirror surface of hologram type 184 may be used. When the embodiment example arranges the half mirror surface (Fresnel type or Hologram type) 184 having the partially discontinuous surface (curved or plane surface) 98 in the optical path of the emission light 462 in this manner, the optical interference noise described with reference to FIG. 27 can be reduced.

Furthermore, the shift of the light emission timing from each light emission point (light passing window 490) in the VCSEL 128 may be controlled by the method described with reference to FIGS. 30 and 32. Therefore, the optical interference noise with reference to FIG. 28 can reduces furthermore.

The embodiment example shown in FIG. 42 may set 'the distance ρ from the crystalline lens 158 of the user to the virtual image forming plane 126' to 5 cm or more and 10 m or less. The distance ρ narrower than 5 cm imposes a burden of the user's eyes. On the other hand, when the distance ρ is 10 m or more, it becomes difficult to create a stereoscopic display image using a change in the convergence angle with respect to the position γ viewed by the user.

According to FIG. 27, a part of the emission light 462 from the VCSEL 128 passes through the half mirror 148. As a result, an external person easily looks at the virtual image on the virtual image forming plane 126. This causes not only a security risk for the individual user, but also a disturbance for the external person.

When the polarization direction of the emission light 462 from the VCSEL 128 is controlled as described in FIG. 41, the external person hardly looks at the virtual image on the virtual image forming plane 126. For example, the polarization direction of the emission light 462 from the VCSEL 128 may be aligned with the direction parallel to the paper surface of FIG. 41, and the embodiment example shown in FIG. 42 may arrange a polarizer 254 outside the half mirror surface 184. Here, the polarizer 254 may absorb the prescribed light whose polarization direction is in a direction parallel to the paper surface. According to the principle of crossed Nichol, the emission light 462 from the VCSEL 128 does not leak to the outside, and formation of a virtual image outside can be suppressed.

Conversely, light from the outside passes through the polarizer 254. The light absorption direction of the polarizer 254 coincides with "polarizable goggles used on ski slopes". Ski slopes tend to reflect a large amount of "sunlight having polarization characteristics in a direction parallel to the snow surface", which accounts for a burden on the ski user's eyes. Then, the polarization direction of the polarizer 254 in the polarizable goggles is aligned with the above. Therefore, "sunlight having polarization characteristics in a direction parallel to the snow surface" does not reach the user's eyes. On the other hand, since "sunlight having a polarization characteristic in a direction perpendicular to the snow surface" is visible, the activities of the user are not hindered.

Here, the polarization characteristic of the emission light 462 from the VCSEL 128 is controlled. Not limited to that, another polarizer may be arranged in the optical path of the emission light 462 (for example, immediately after the virtual image forming lens 146) to control the polarization characteristic of the emission light 462.

With only the structure in which the polarizer 254 is arranged outside the half mirror surface (Fresnel type or Hologram type) 184, a part of the external light enters the user's eyes. As a result, the outside view overlaps with the virtual image, and hinders the "virtual image gaze" of the user. Therefore, the present embodiment may further arrange a liquid crystal shutter 294 outside the polarizer surface 254. When the liquid crystal shutter 294 is released, the user can see the outside view. On the other hand, when the liquid crystal shutter 294 is closed, external light is shielded. Then, the user can focus only on the virtual image.

In the embodiment example of FIG. 42, the half mirror surface (Fresnel type or Hologram type) 184 having the partially discontinuous surface (curved or plane surface) 98 can be used to display the virtual image with less optical interference noise. The liquid crystal shutter 294 can also be used to provide an environment in which the user can easily gaze at the virtual image with less optical interference noise. Further, when the polarization direction of the emission light 462 from the VCSEL 128 is controlled, it is difficult to see the virtual image from the outside, so that the external person is not disturbed and the security of the user is ensured.

Figure 43:
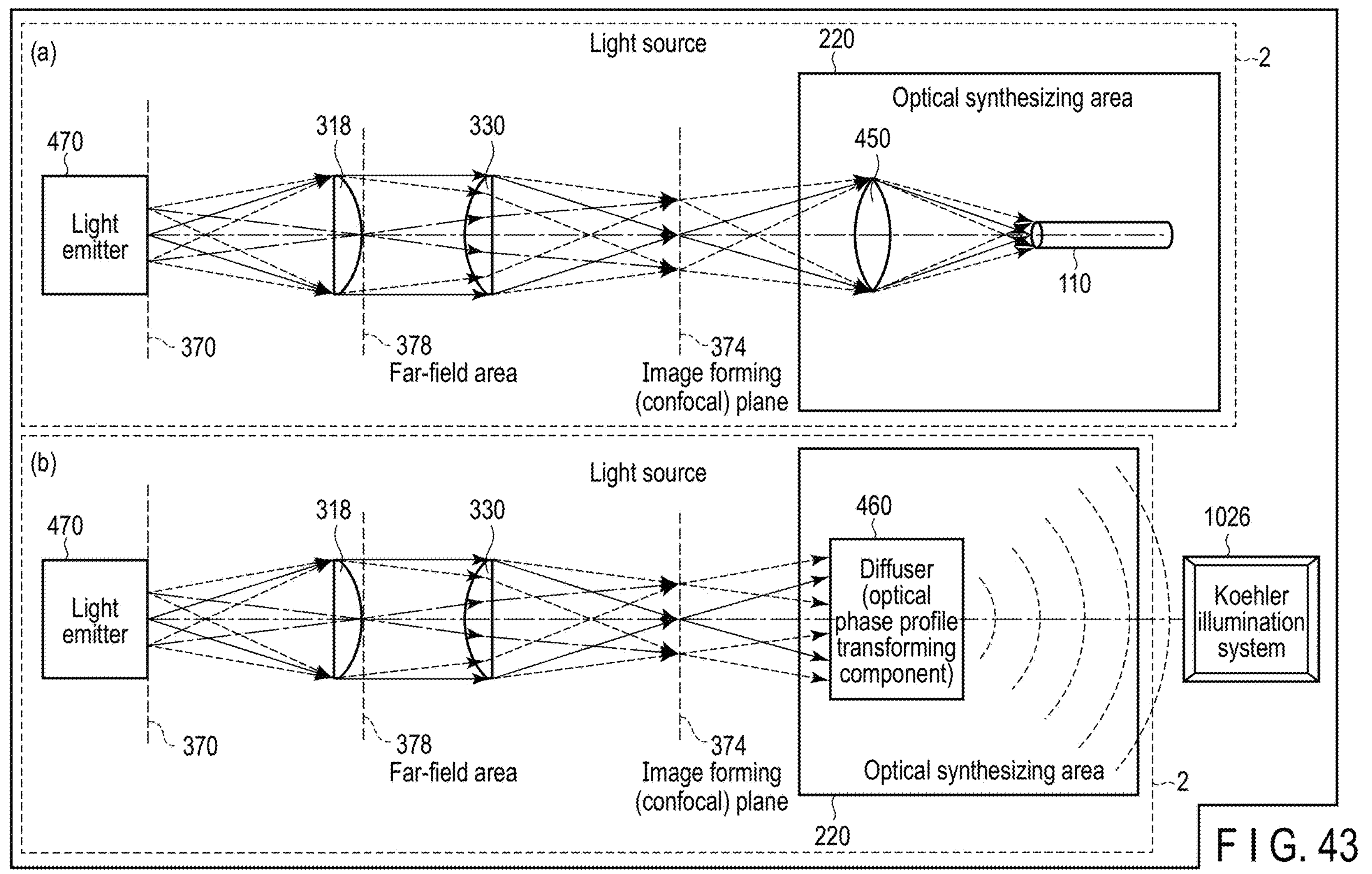
FIG. 43 is an explanatory diagram of an arrangement location of the optical characteristic converting component in the optical system using the optical phase unsynchronized characteristic.

FIG. 43 illustrates a specific form example of the optical system from the light emitter 470 to the optical synthesizing area 220 in the light source 2. According to FIG. 43, the light emitter 470 may be the wide area light emitter (or multipoint light emitter) having plural light emission points (or light passing windows 490), and the plural light emission points (or light passing windows 490) are arranged on the light emitting plane 370 (or near-field area 372) of light emitter 470. And the plural light emission points emit plural light elements 202, 204 respectively. That is, the first and the second light emission points emit the first and second light elements 202, 204 respectively.

In FIG. 43(*a*), as a specific embodiment example in the optical synthesizing area 220, different lights having corresponding optical characteristics are synthesized (intensity summation) in the optical waveguide (optical fiber, optical waveguide, or optical guide, etc.) 110. In this case, the image forming lens 450 simultaneously converges 'the first light element 202 and the second light element 204' or 'the third light element 206 and the fourth light element 207' inside the optical waveguide (optical fiber, optical waveguide, or optical guide, etc.) 110. As explained later, an optical characteristic converting component 210 arranged in a far-field area 378 may divide both of the first light element 202 and the second light element 204 into the third light element 206 and the fourth light element 207. Although not illustrated in FIG. 43(*a*), Koehler illumination system 1026 may irradiate the measured object 22 with irradiated light (first light) 12 emitted from the optical waveguide 110.

In FIG. 43(*b*), the diffuser plate (optical phase profile transforming component) 460 may be used as another optical synthesizing method 410 in the optical synthesizing area 220. After the light elements 202 to 207 pass through the diffuser (optical phase profile transforming component) 460 or are reflected by the diffuser 460, each of the light elements 202 to 207 travels in a wide angular direction (as widely divergent light elements). Using the light traveling at this wide angle, light elements 202 to 207 are synthesized (intensity summation). The synthesized light 230 generated by the synthesizing (intensity summation) may be used in the Koehler illumination system 1026.

When each of the plural light emission points (or light passing windows 490) emits each of widely divergent light elements 202 and 204, each of widely divergent light elements 202 and 204 tends to spatially overlap with each other in the far-field area 378 from the light emitter 470. Therefore, as another embodiment example of the optical synthesizing area 220, instead of the above diffuser 460, the different light elements 202 and 204 may be synthesized (intensity summation) using the spatial overlap between widely divergent light elements 202 and 204 in the far-field area 378 from the light emitter 470.

Based on the description in Chapter 2, in a case where at least a part (one direction) of the light emitting area in the light emitter 470 was wider than the coherence length ΔL0, it was defined that the light emitter 470 has a spatially wide light emitting area. Therefore, the above definition applies even when, for example, the light emitting area in only one axial direction is wider than the coherence length ΔL0, as in the case of a single dimensional laser diode array. As described in Chapter 2, each of different light elements 202 and 204 emitted by each of light emission points (or light passing windows 490) on the spatially wide light emitting area also has a large temporal coherence with each other.

The area immediately behind a spatially wide light emitting area (light emitting plane 370 on the light emitter) and the area in the near field thereof are referred to as a near-field area. In the embodiment example of the optical system shown in FIG. 43, the combination of a collimator lens 318 and the converging lens 330 constitutes an imaging optical system (or optical confocal system) with respect to the light emitting plane 370 on the light emitter (the light emitting area of the light emitter 470). The image forming plane (or confocal plane) 374 of light emitter (near-field area 372) and its near field also correspond to the near-field area 372 with respect to the light emitting area.

The light elements emitted from arbitrary light emission points in the light emitting plane 370 on the light emitter (light emitting area of the light emitter 470) become parallel light immediately after passing through a collimator lens 318. The area immediately after the light has passed through the collimator lens 318, where the light has become parallel light, is referred to as a far-field area 378 from the light emitter.

The optical pattern obtained in the far-field area 378 from the light emitter has a Fourier transformation relation with the image (optical pattern) of the light emitting plane 370 on the light emitter (light emitting area of the light emitter 470). Therefore, the function of the optical characteristic converting component 210 is greatly different between one case where the optical characteristic converting component 210 is arranged in the far-field area 378 and other case where the optical characteristic converting component 210 is arranged in the near-field area 372.

In Chapter 3, it has been described that the optical interference noise is reduced when the optical path length difference is given between the first light element 202 and the second light element 204 or between the third light element 206 and the fourth light element 207 divided by the optical characteristic converting component 210. Therefore, two types of optical characteristic converting components 210 may be used, with one arranged in the near-field area 372, and the other in the far-field area 378 from the light emitter 470.

A specific embodiment example may arrange one optical characteristic converting component 210 in the near-field area 372, so that the optical characteristic converting component 210 may spatially separate the first light element 202 and the second light element 204. And then, the optical characteristic converting component 210 may make the optical path length difference between the first light element 202 and the second light element 204 larger than the coherence length ΔL0.

Another specific embodiment example may arrange other optical characteristic converting component 210 in the far-field area 378 from the light emitter 470, and the other optical characteristic converting component 210 may divide both the first light element 202 and the second light element 204 into the third light element 206 and the fourth light element 207. Then, the other optical characteristic converting component 210 may give an optical path length difference larger than the coherence length ΔL0 between the further divided third light element 206 and fourth light element 207. When the division and the generation of the change in the optical path length are performed in both the near-field area 372 and the far-field area 378 in this manner, the effect of further reducing the optical interference noise is created.

As shown in FIG. 43, the light flux diameter in the far-field area 378 from the light emitter is relatively large. Therefore, when the specific embodiment example arranges the optical characteristic converting component 210 in the near-field area 372, the wavefront division between the third light element 206 and the fourth light element 207 is more suitable than amplitude division or intensity division.

Figure 44:
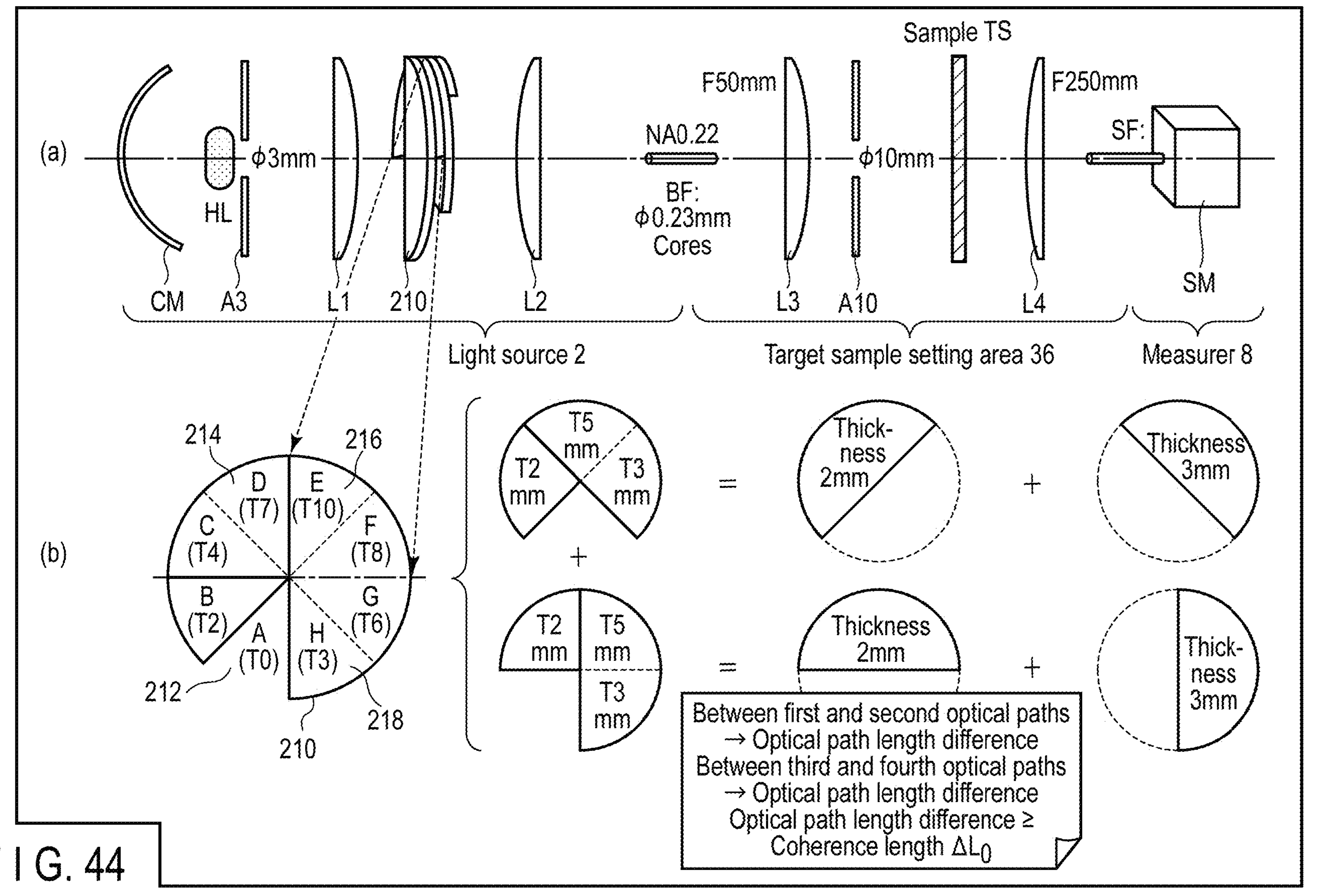
FIG. 44 illustrates a specific structure example of an optical characteristic converting component.

FIG. 44(*b*) illustrates an example of the structure of the optical characteristic converting component 210. Here, the optical arrangement in FIG. 44(*a*) coincides with that in FIG. 17(*a*) described above. In the optical system in FIG. 44(*a*), the optical characteristic converting component 210 is arranged at the position of the parallel light (in the far field area 378) between the two lenses L1 and L2.

In the optical characteristic converting component 210 in FIG. 44(*b*), semi-transparent plates having a thickness of 2 mm and 3 mm are bonded to each other in a form of being rotated by 90 degrees to form a pair. Next, each pair is rotated by 45 degrees and bonded together to complete an optical characteristic converting component that is divided into 8 sections in the angular direction. Here, the thicknesses of the transparent plates in the 8 divided areas are different from each other by 1 mm or more.

In the lower left area A in the optical characteristic converting component 210, the thickness of the optical characteristic converting component 210 is 0 mm. Therefore, the light passing through the area A passes without passing through the area where the transparent plate (transparent medium) does not exist in the optical characteristic converting component. Starting from the area A, as the light proceeds in a clockwise direction to the area B, the area C, and subsequent areas, the glass thickness sequentially changes to 2 mm, 4 mm, 7 mm, 10 mm, 8 mm, 6 mm, and 3 mm.

Light has a characteristic of slowing down when it passes through glass. Therefore, when light passes through the same mechanical distance, the optical distance (optical path length) changes between the vacuum and the glass. Therefore, the optical path length of the light beams after passing through the optical characteristic converting component 210 varies depending on which area it passed through from the area A to the area H. In the present embodiment, each light beam that has passed through each area is referred to as an "element". That is, different elements have profiles in which optical distances (optical path lengths) after passing through the optical characteristic converting component 210 are different from each other.

The lens L2 and the optical bundle fiber BF in FIG. 44(*a*) constitute the optical synthesizing area 220. That is, by the action of the lens L2 in FIG. 44(*a*), all the elements after passing through the optical characteristic converting component 210 are synthesized in the optical bundle fiber BF. Here, in a case where the optical path length difference between the elements is larger than the coherence length ΔL0 (or larger than twice the coherence length ΔL0), plural elements which are in a phase discontinuous/unsynchronized optical phase relation 402 with other (in which the temporal coherence of each other is lowered) are mixed in the optical bundle fiber BF.

BK7 was used as a material of the optical characteristic converting component 210 (glass), and an antireflection coating was formed on an interface (front and back surfaces) where light enters/exists. The refractive index of BK7 is represented by n, and the glass thickness in each area in FIG. 44(*b*) is represented by d. Then, the optical path length in each area can be calculated by "d (n−1)", and the glass thickness between the areas in FIG. 44(*b*) is different by 1 mm or more. The glass thickness difference between the areas is larger than the coherence length ΔL0 (or twice the coherence length ΔL0).

FIG. 44(*b*) illustrates an example of a relationship between the structure of the optical characteristic converting component 210 and FIG. 36. Basically, any of the area A to the area H may be associated with the first to fourth areas 212 to 218. For example, when the area A corresponds to the first area 212, the optical path of the element passing through the area A is associated with the first optical path 222. When the area D corresponds to the second area 214, the optical path of the element passing through the area D is associated with the second optical path 224. The glass thickness of the area A (first area 212) is 0 mm, and the glass thickness of the area D (second area 214) is 7 mm. Therefore, since the thickness difference of glass between both the areas 212 and 214 is 7 mm, an optical path length difference of 7×(1.5−1)≈3.5 mm occurs between both the optical paths 222 and 224. This optical path length difference is not only greater than or equal to the coherence length ΔL0 but also greater than twice the coherence length ΔL0.

Similarly, for example, when the area E corresponds to the third area 216, the optical path of the element passing through this area is associated with the third optical path 226. When the area H corresponds to the fourth area 218, the optical path of the element passing through this area is associated with the fourth optical path 228. Since the glass thickness difference between both the areas is 7 mm (10 mm-3 mm), the optical path length difference between the two optical paths 226 and 228 is also 3.5 mm.

Figure 45:
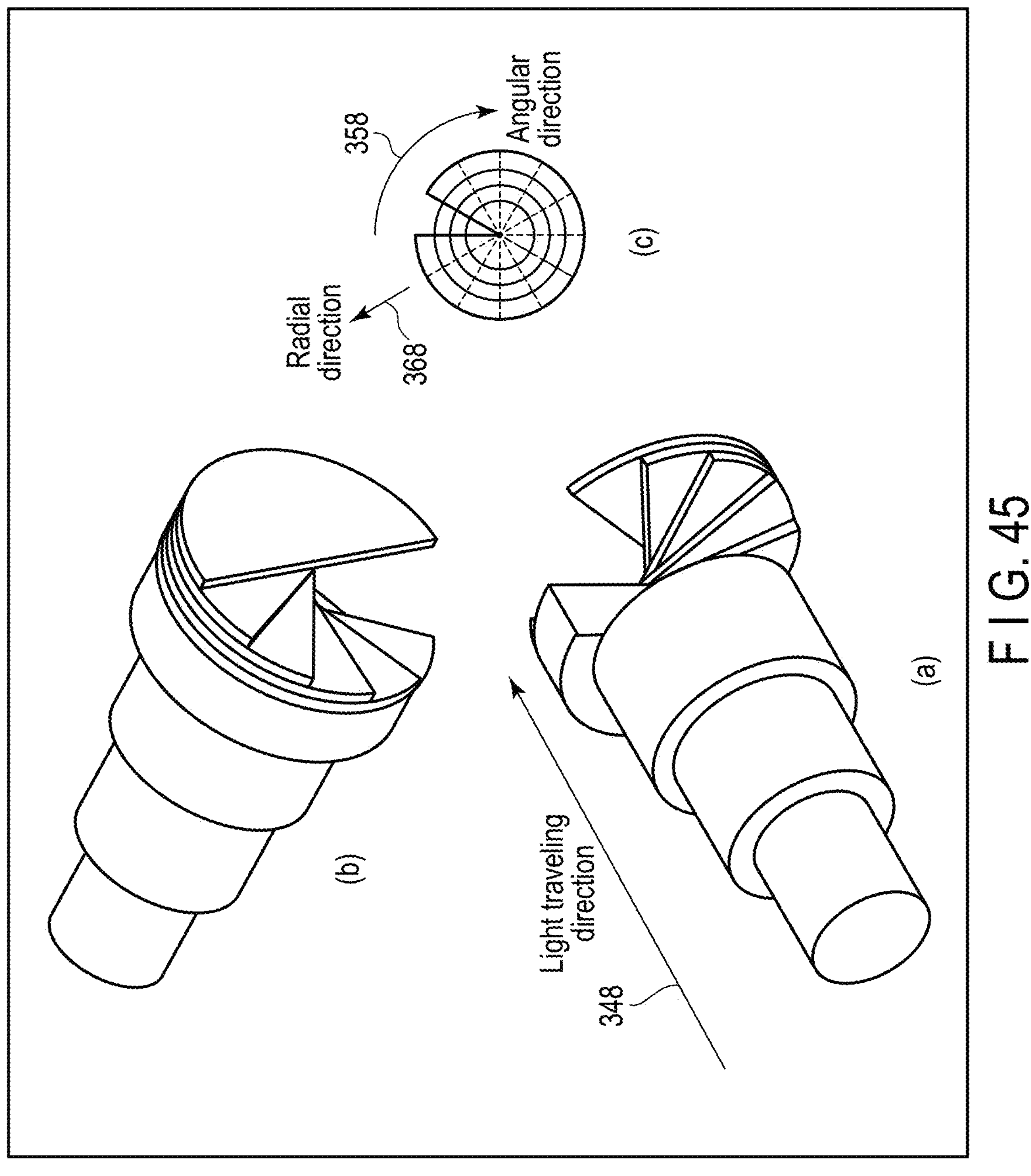
FIG. 45 illustrates another embodiment related to the specific structure of the optical characteristic converting component.

FIG. 45 illustrates another embodiment example related to the embodiment of the structure of the optical characteristic converting component 210. A semicircular glass having a thickness of 1 mm is rotated by 30 degrees for bonding, and a semicircular glass having a thickness of 6 mm is further bonded. Then, when viewed from a light traveling direction 348, 12 divisions are made at equal intervals in an angular direction 358. In the present embodiment, the division method of performing wavefront division of a wavefront cross-section of light in the angular direction 358 with respect to the optical axis in the light traveling direction 348 is referred to as "angle division". Specifically, it means area division (division of a wavefront) by a broken line in FIG. 45(*c*). In the embodiment in FIG. 45, 12 equally spaced divisions (12 angular divisions) are made in the angular direction. As a result, a difference in glass thickness of 1 mm or more occurs between the angularly divided areas.

In FIG. 45, the structure further includes cylindrical glasses having different diameters stacked and bonded together. In the present embodiment, a division method of performing division of a wavefront in a radial direction 368 of the wavefront cross-section of the light with reference to the optical axis in the light traveling direction 348 is referred to as "radius division". Specifically, it means area division (division of a wavefront) by a solid line in FIG. 45(*c*), and area division is performed for each circumference having different radii. In the embodiment of FIG. 45, it is divided into 4 sections in the radial direction 368 (four radial divisions). In the structure of the optical characteristic converting component 210 illustrated in FIG. 45, it is divided into 12 sections in the angular direction 358 and into 4 sections in the radial direction 368. Therefore, the number of divided areas is 48 (12×4). Not limited to that, the number of divisions may be arbitrarily set.

In the embodiment illustrated in FIG. 45, the diameter of the boundary line of the radius division is set such that the area of each radially divided area is equal. Not limited to that, the diameter of each cylindrical glass may be set at an arbitrary interval. Further, the dividing method may be changed according to the intensity profile of the light passing (or reflected) through the optical characteristic converting component 210. Here, a case where light having a non-uniform intensity distribution (for example, Gaussian distribution) uses the optical characteristic converting component 210 is considered. This light has high center intensity and may have an intensity distribution in which the intensity of the surroundings decreases. In this case, the boundary diameter of the radius division may be set such that the strength of each element passing through each divided area becomes substantially equal.

Figure 46:
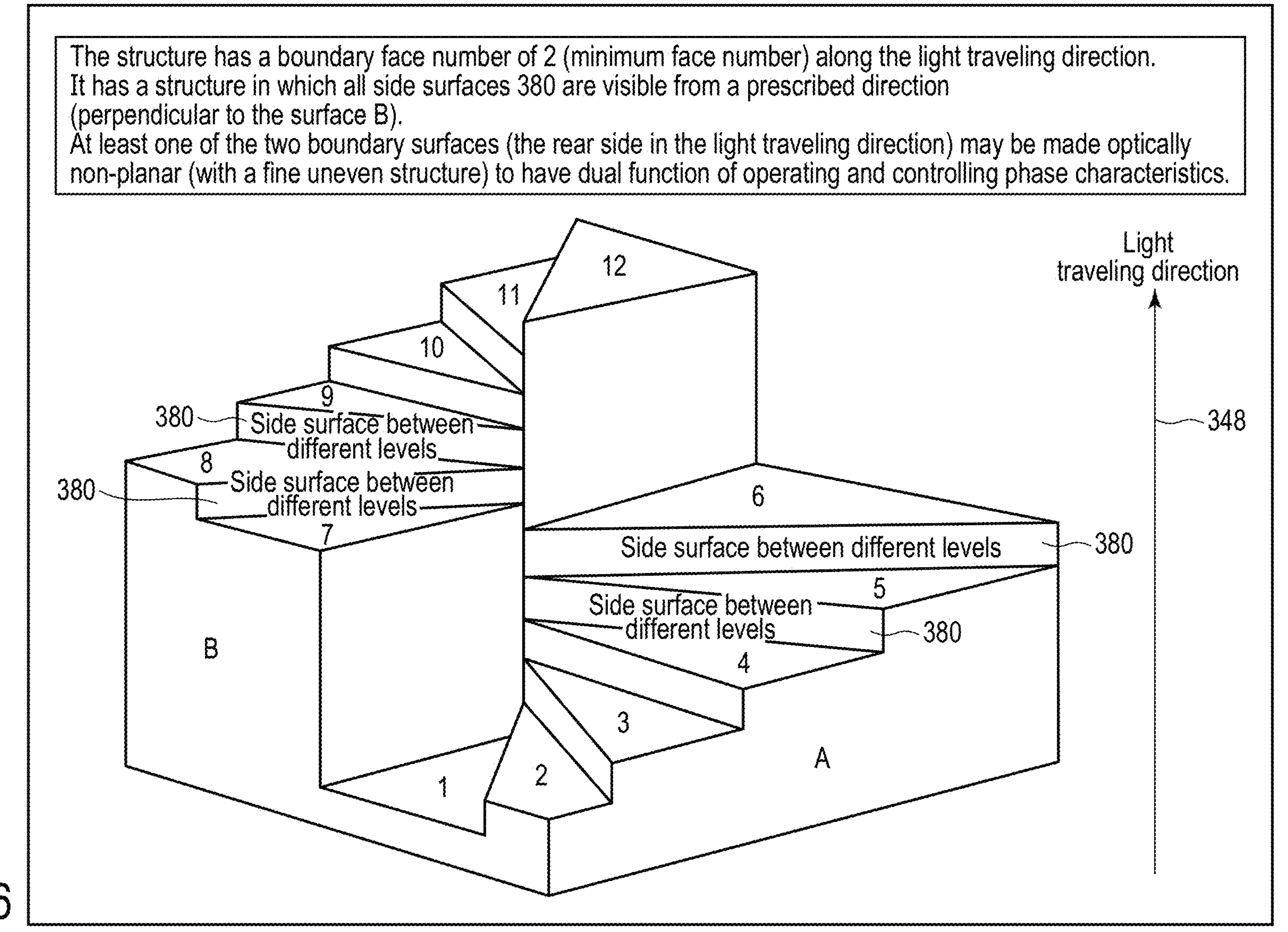
FIG. 46 illustrates an application example related to the specific structure of the optical characteristic converting component.

FIG. 46 illustrates an application example related to the structure of the optical characteristic converting component 210. In FIG. 46, as in FIGS. 44(*b*) and 45, the component is formed of a transparent medium (transparent glass, quartz glass, transparent plastic, and the like), and the initial light 200 passes through the transparent medium. The structure is then divided into 12 sections in the angular direction 358 with respect to the cross section of light flux of the initial light 200 that passes through. When viewed in the light traveling direction 348 of the initial light 200, the thickness changes from "1 mm" to "12 mm" in increments of 1 mm.

In the structure in FIG. 46, the number of boundary surfaces (incident surface and outgoing surface) arranged along the light traveling direction 348 of the initial light 200 passing therethrough is devised so as to be a minimum of "two planes each". That is, in the structure in FIG. 46, while the initial light 200 passes through the optical characteristic converting component 210, it passes through only one surface as the incident surface and one surface as the outgoing surface.

When the plane accuracy of the boundary surface existing at the interface between the transparent medium area and the air area constituting the optical characteristic converting component 210 is low, the wavefront accuracy of the light after passing through the boundary surface is deteriorated. Therefore, when the number of boundary surfaces is set to the minimum number of planes, deterioration in wavefront accuracy of light after passing through the optical characteristic converting component 210 can be reduced.

Furthermore, in the structure in FIG. 46, the side surface 380 between different levels between the respective areas in the optical characteristic converting component 210 (that is, the side surface of the boundary line where the thickness changes in the optical characteristic converting component 210) is all visible from the specific direction (direction perpendicular to the surface B). With this structure, the manufacturability of the optical characteristic converting component 210 is improved, and the cost of the optical characteristic converting component 210 can be reduced.

Although FIG. 46 illustrates the structure of the optical characteristic converting component 210, which may also serve the function of operating/controlling the phase profile (wavefront profile) of the light after passing through the optical characteristic converting component 210. That is, at least one of the boundary surfaces (the incident surface and the outgoing surface) arranged in the direction perpendicular to the light traveling direction 348 of the initial light 200 is not formed into an optical plane but has a fine uneven structure. Examples of this fine uneven structure include the structure of a diffuser (optical phase profile transforming component) 460 and a grating/hologram structure. As a result, the boundary surface (incident surface or outgoing surface) has a function of operating/controlling the phase profile (wavefront profile). As a result, a single optical component can combine the division of the initial light 200/generation of optical path length difference and the operation/control of the phase profile (wavefront profile), so that the optical noise reduction effect and the coherence reduction effect are improved. Furthermore, simplification and cost reduction of the entire optical system can be achieved. Note that the combination of the division of the initial light 200/generation of optical path length difference and operation/control of the phase profile (wavefront profile) is not limited to the structure in FIG. 46, and may be performed in the structures in FIGS. 44(*b*), 45, and 47.

By the way, when parallel light traveling in the same direction passes through the optical characteristic converting component 210, it is possible to efficiently divide the initial light 200 and generate an optical path length difference between divided light beams (elements). Therefore, the optical characteristic converting component 210 having the structure of FIGS. 44(*b*) to 47 is arranged in the far-field area 378 with respect to the light emitting area of the light emitter 470. On the other hand, light immediately after passing through a boundary surface (incident surface or outgoing surface) having a fine uneven structure becomes diffused light, and the traveling direction tends to spread (that is, when the parallel light passes through the boundary surface (incident surface or outgoing plane) having a fine uneven structure, the parallel light easily changes to divergent light). Therefore, it is desirable to provide a fine uneven structure on the surface of the boundary surface (outgoing surface) located on the rear side in the light traveling direction 348 among the boundary surfaces existing on the two surfaces in the optical characteristic converting component 210.

As an effective range of the size of the irregularity structure in the case of providing the boundary surface with a fine irregularity structure as described above, a value of "50 nm or more and 8 mm or less" can be defined as a setting range of the maximum amplitude value of the different levels. On the other hand, when expressed by the average value "Ra" of the surface roughness, when "50 nm≤Ra≤8 mm" (desirably "13 nm≤Ra≤2 mm") can be achieved, the effect of reducing the optical interference noise can be achieved.

Note that, in the structure of the optical characteristic converting component 210 described with reference to FIGS. 44 to 46, in order to simplify the description, the minimum unit of the different level between the glass (or transparent plastic) between the areas 212 to 218 is described as 1 mm (when the refractive index n of the glass or transparent plastic is regarded as 1.5, the minimum unit of the optical path length difference is $1\times(n-1)\approx0.5$ mm). However, the minimum unit of the optical path length difference may be set to any value as long as the minimum unit is equal to or more than the coherence length ΔL0 (desirably, twice or more the coherence length ΔL0).

Figure 47:
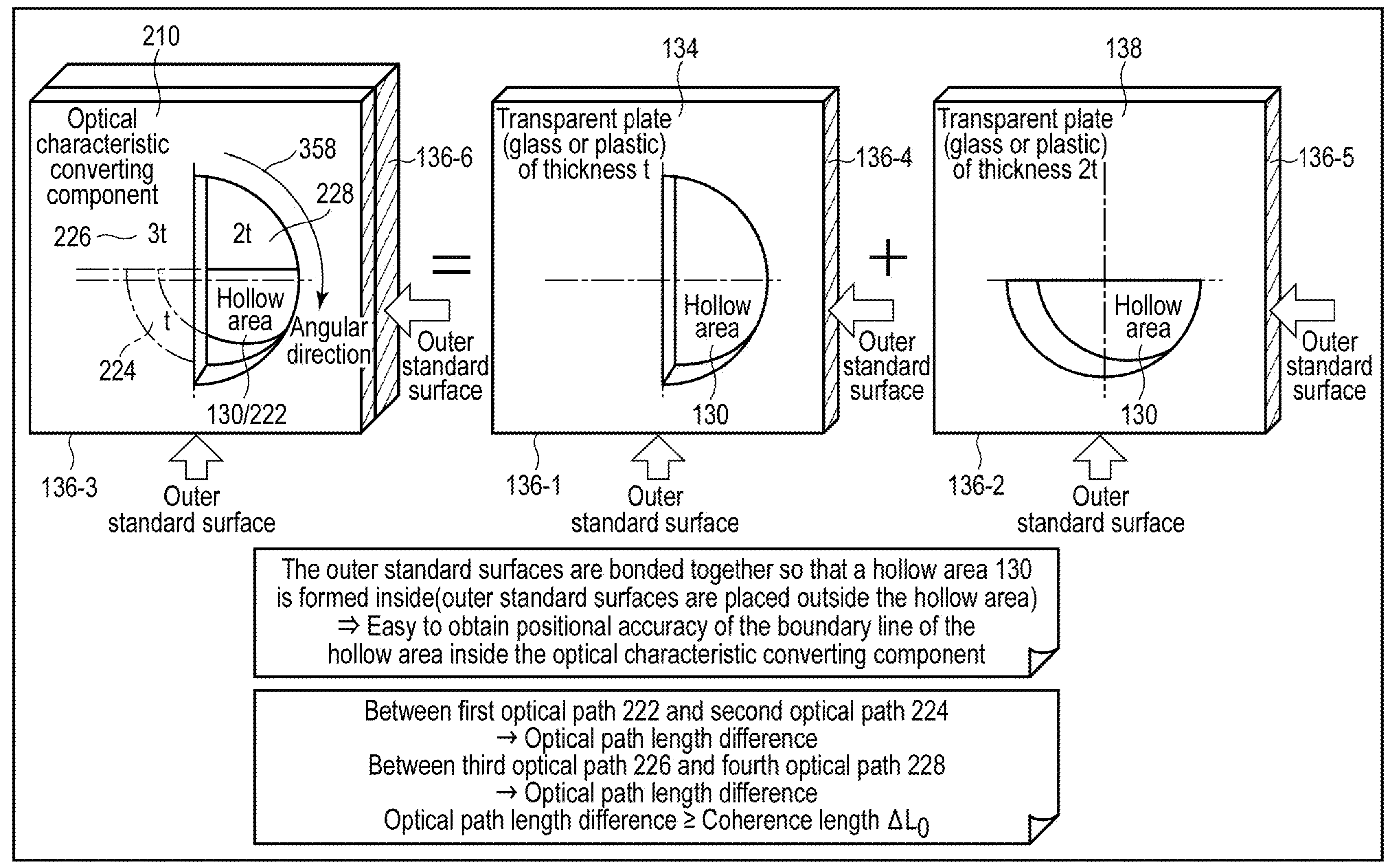
FIG. 47 illustrates an exemplary structure of the optical characteristic converting component having a hollow area.

FIG. 47 illustrates a further application example related to the embodiment example of the optical characteristic converting component 210. In the embodiment example of FIGS. 44(*b*) and 45, a transparent medium (transparent glass, quartz glass, transparent plastic, and the like) occupies a part of the optical path of the light (such as the initial light 200) that converts the optical characteristics. Then, there is no transparent medium at a place away to the outside of the optical path. On the contrary, in the embodiment example illustrated in FIG. 47, a hollow area 130 is provided inside the optical characteristic converting component 210. In the hollow area 130, there is no transparent medium, and the transparent medium is in a hollow state (empty state). Light (such as the initial light 200) also passes through the hollow area 130. Further, the optical characteristic converting component 210 made of a transparent medium is also present at a place away to the outside of the optical path. As the transparent medium, any material such as glass, quartz glass, or transparent plastic may be used.

In the optical characteristic converting component 210 illustrated on the left side of FIG. 47, as in FIG. 46, the total number of boundary surfaces (incident surface and outgoing surface) between the hollow area and the transparent medium area along the light traveling direction 348 is "2". That is, only one incident surface and one outgoing surface are provided along the light traveling direction 348. Therefore, the wavefront accuracy of the passing light derived from the flatness of the boundary surface is prevented from being lowered.

In the embodiment example of the optical characteristic converting component 210 illustrated in FIG. 47, the outer standard surface 136 is provided outside the hollow area 130 (a part of the optical characteristic converting component 210). Then, assembly and bonding are performed with reference to the outer standard surface 136 (by aligning the outer standard surfaces 136 with each other). Here, the light to be subjected to the optical characteristic conversion (such as the initial light 200) passes through the inside of the hollow area 130. An outer standard surface 136 is formed outside the optical path of the passing light (such as the initial light 200).

A method of producing the optical characteristic converting component 210 illustrated in FIG. 47 will be described in comparison with the embodiment example in FIG. 44(*b*). In FIG. 44(*b*), semicircular transparent flat plates (transparent media) having thicknesses of 2 mm and 3 mm are combined to form the optical characteristic converting component 210. In comparison, here, a transparent flat plate (transparent medium) 134 having a semicircular hollow area 130 inside and having a thickness of t and a transparent flat plate (transparent medium) 138 having a thickness of 2t are prepared. The semicircular shape between FIGS. 44(*b*) and 47 has a negative and positive relationship. Note that, for ease of description in comparison with FIG. 44(*b*), the shape of the hollow area 130 is merely a semicircular shape. Therefore, the shape of the hollow area 130 may be arbitrarily set.

In FIG. 44(*b*), two semicircular transparent flat plates are bonded in an area having a total thickness of 5 mm. On the other hand, in FIG. 47, the entire surfaces of two transparent flat plates 134 and 138 except for the hollow area 130 are bonded. When the bonding area is narrow, the inclination amount between the two semicircular transparent flat plates after bonding tends to be large. In comparison, when the two transparent flat plates 134 and 138 are bonded to each other over the entire surface, the bonding area increases, so that the effect of reducing the inclination amount between the two transparent flat plates 134 and 138 after bonding is created.

In addition, at the time of bonding in FIG. 44(*b*), accuracy of angle and position in a linear portion in a semicircle is increased using a special jig. In contrast, here, the lower outer standard surfaces 136-1 and 136-2 are aligned with each other on the outer standard surface 136-3 after bonding. Further, the right outer standard surfaces 136-4 and 136-5 are aligned with each other on the outer standard surface 136-6 after bonding. When this method is used, the jig used at the time of bonding can be simplified, and high positional accuracy and high angular accuracy of the boundary straight line (between the transparent medium and air) in each hollow area 130 can be easily obtained. Further, since the outer standard surface 136 is formed outside the optical path of the light whose optical characteristics are to be converted (such as the initial light 200), there is also an effect that the shape of the outer standard surface 136 can be arbitrarily set.

After bonding the two transparent flat plates (transparent media) 134 and 138, the thickness of the transparent medium in the optical path of the light (such as the initial light 200) is a hollow area 130, t, 3t, and 2t for each area along the angular direction 358. The optical characteristic converting component 210 formed here takes a form of being angularly divided into four areas along the angular direction 358.

Then, it is considered that the hollow area 130 in the optical characteristic converting component 210 corresponds to the first area 212 and forms the first optical path 222 within this area 212. Then, it is considered that the area where the thickness of the transparent medium is t corresponds to the second area 214 and forms the second optical path 224 within this area 214. Similarly, it is considered that the third area 216 corresponding to the area of 3t thickness of the transparent medium forms the third optical path 226, and the fourth area 218 corresponding to the area of 2t thickness of the transparent medium forms the fourth optical path 228.

The refractive index of the transparent medium constituting the optical characteristic converting component 210 is n. The optical path length in the air at the thickness t is t, whereas the optical path length in the transparent medium increases to nt. Therefore, an optical path length difference of (n−1)t occurs between the light passing through the air (in the hollow area 130) and the light passing through the transparent medium. When this value is set to be equal to or larger than the coherence length ΔL0 (desirably twice the coherence length ΔL0), the temporal coherence between the elements (the first to fourth light 202 to 207) passing through the different areas 212 to 218 decreases. Thereafter, when the intensity is summated between the elements (the first to fourth light 202 to 207), the optical interference noise generated for respective elements (the first to fourth light 202 to 207) is averaged 420, and the amount of optical interference noise is smoothed or reduced.

If the optical path length difference between the optical paths 222 to 228 satisfies the above condition, the unit t of the thickness difference can be set to an arbitrary value. However, it is preferable to set the value of t to 100 m or less (desirably 1 m or less or 1 cm or less) due to the restriction of the dimensions of the optical system on which the optical characteristic converting component 210 is mounted. This upper limit value means that the minimum unit of the optical path length difference is set to 50 m or less (desirably 50 cm or less or 5 mm or less).

As described above, when the hollow area 130 is provided inside as an embodiment example of the optical characteristic converting component 210, an effect of improving manufacturability at the time of creation and position accuracy and angle accuracy of a boundary straight line is created. Furthermore, when a standard surface 136 is set on a part (outer side) of the optical characteristic converting component 210, manufacturability at the time of creation and position accuracy and angle accuracy of the boundary straight line are further improved.

Note that the optical characteristic converting component 210 described with reference to FIGS. 44(*b*) to 47 illustrates an embodiment example of a light transmission type. Not limited to that, in the present embodiment example, a light reflective type may be used as described later with reference to FIG. 69. As a method of making this light reflective type, either the incident surface or the outgoing surface may have a light reflection characteristic.

Chapter 4. Method for reducing speckle noise in the present embodiment

A phenomenon in which speckle noise appears in laser light is well known. In general, a wavelength width Δλ of gas laser light or solid laser light is very narrow. In comparison with this, a wavelength width Δλ of semiconductor laser light is relatively large at around 2 nm even in single mode light in a wavelength direction. In addition, the wavelength width Δλ often takes a similar value regardless of the point light emission type, the multipoint light emission type, the linear light emission type, and the surface light emission type.

Since a value of the coherence length $\Delta L_0$ obtained by substituting DA 2 nm into Equation 4 is relatively small, the optical characteristic converting component 210 acting on the semiconductor laser light becomes relatively small. For this reason, the optical characteristic converting component 210 acting on the semiconductor laser light is suitable for optical mounting. Therefore, the reduction of the speckle noise generated by the semiconductor laser light is suitable for the application of the basic operation principle described in Chapter 3.

Figure 48:
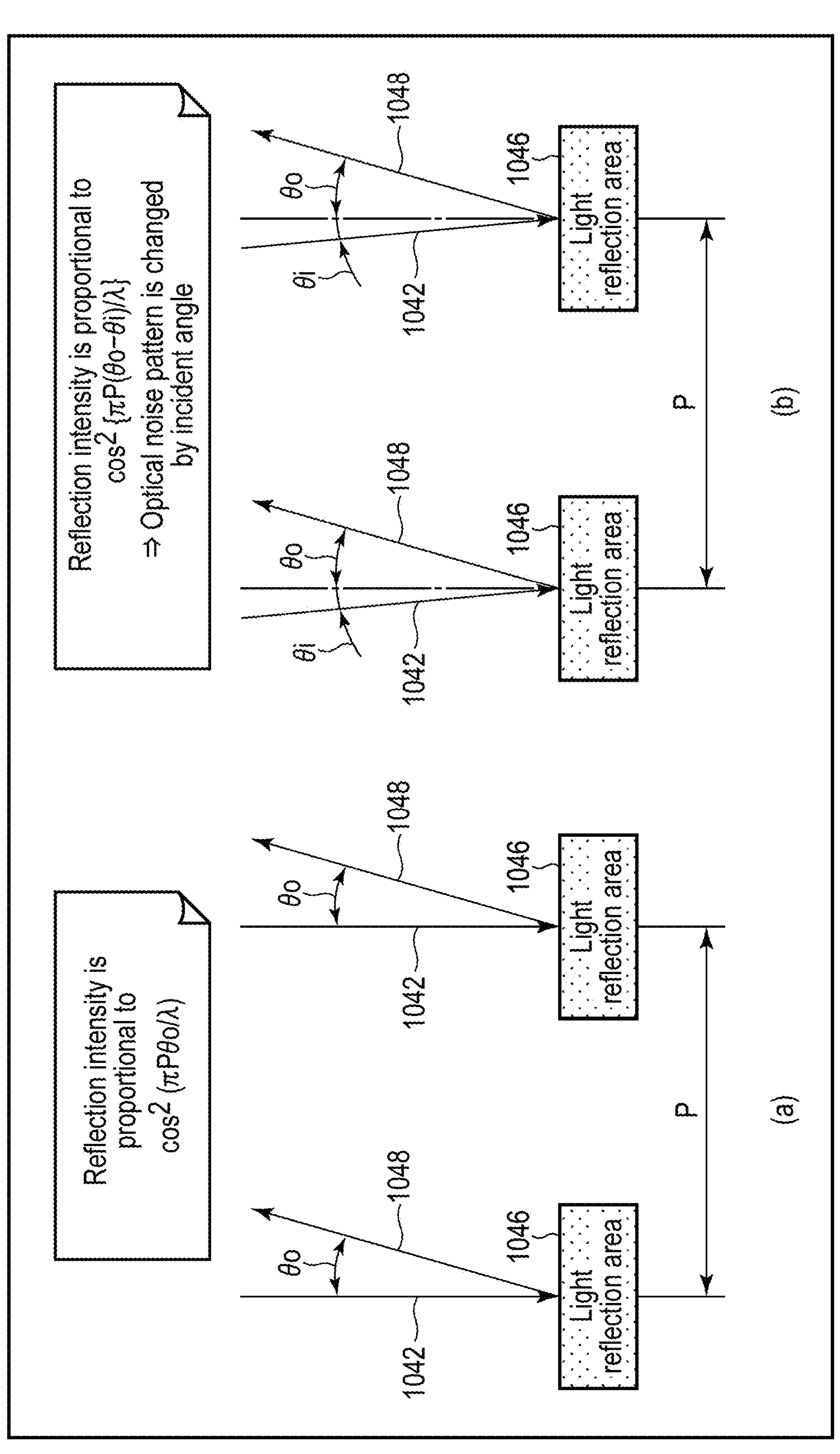
FIG. 48 is an explanatory diagram of a cause of speckle noise generation.

FIG. 48 illustrates a basic principle of occurrence of speckle noise, which is a type of optical interference noise. In FIG. 48(*a*), two light reflection areas 1046 separated by an interval P are arranged. FIG. 48(*a*) illustrates an incident light beam 1042 is perpendicularly incident on the light reflection area 1046 and a reflection intensity characteristic of a reflected light beam 1048 reflected in a $\theta_0$ direction. According to the interference theory of light, the reflection intensity at that time is proportional to "$\cos^2(\pi P\theta_0/\lambda)$". What is important here is that the reflection intensity periodically changes in the reflection direction $\theta_0$ of the reflected light beam 1048. This periodic change in reflection intensity is related to the speckle noise.

In FIG. 48(*a*), only two light reflection areas 1046 separated by the interval P are illustrated. This will be further expanded, and a case where a very large number of (three or more) light reflection areas 1046 are regularly arranged with an interval P will be considered. Then, a state in which the light reflection areas 1046 are periodically arranged over a wide area is assumed.

In a case where a position of the user's eye observing the reflected light beam 1048 is fixed, the reflection direction $\theta_0$ entering the user's eye changes for each reflection location in the light reflection areas 1046. Therefore, there are a location where the reflection amplitudes from the adjacent light reflection areas 1046 intensify each other and look bright, and a location where the reflection amplitudes cancel each other and look dark. Such appearance appears as a speckle noise pattern.

FIG. 48(*b*) illustrates the reflection intensity of the reflected light beam 1048 reflected in the $\theta_0$ direction when an incident angle of the incident light beam 1042 on the two light reflection areas 1046 changes to $\theta_i$. According to the interference theory of light, the reflection intensity at that time changes to $\cos^2\{\pi P(\theta_0-\theta_i)/\lambda\}$.

Since there is no optical interference (or mutual temporal coherence is low) between the different divided wave trains 406 and 408, optical synthesis between the different divided wave trains 406 and 408 results in intensity summation (synthesis of light intensity values).

For example, as illustrated in FIG. 48(*a*), the first light element 202 corresponding to at least one wave train 406 after wavefront division is caused to be perpendicularly incident on the two light reflection areas 1046. At the same time, the second light element 204 corresponding to the delay wave train 408 after wavefront division having low temporal coherence is caused to be incident on the wave train 406 after wavefront division at the incident angle $\theta_i$ as illustrated in FIG. 48(*b*). Then, the light intensity of the synthesized light (intensity-summated light) reflected in the $\theta_0$ direction is given by "$\cos^2(\pi P\theta_0/\lambda)+\cos^2\{\pi P(\theta_0-\theta_i)/\lambda\}$". For example, when the value of $\theta_i$ is optimized such that the light intensity of the second term is minimized at the maximum light intensity of the first term of the previous Equation, the maximum and minimum light intensities are cancelled (averaged or smoothed). As a result, the speckle noise (optical noise) is greatly reduced.

That is, the initial light 200 (initial wave train 400) emitted from the same light emitter 470 is divided into the first light element 202 and the second light element 204, or the third light element 206 and the fourth light element 207 individually passing through the optical paths 222 to 228. Then, an optical path length difference of the coherence length $\Delta L_0$ or more (desirably twice or more) is provided between the first light element 202 and the second light element 204 or between the third light element 206 and the fourth light element 207. When light obtained by performing the synthesizing 410 (intensity summation) so that the light traveling direction (irradiation angle with respect to the measured object 22) slightly changes between the first light element 202 (wave train 406 after wavefront division) and the second light element 204 (delay wave train 408 after wavefront division) or between the third light element 206 (wave train 406 after wavefront division) and the fourth light element 207 (delay wave train 408 after wavefront division) is used as the irradiated light (first light) 12, the speckle noise is reduced.

In FIG. 48, for simplification of description, the intensity summation of only the light elements 202 and 204 (206 and 207) having low temporal coherence has been described. However, the present invention is not limited thereto, and the measured object 22 may be simultaneously irradiated with three or more kinds of light elements 202 to 206 (or four or more kinds of light elements 202 to 207) having low temporal coherence slightly changed in irradiation angle. When the number of irradiations of light elements 202 to 207 having low temporal coherence is increased, the average number of speckle noises (optical interference noises) is increased, so that the effect of reducing the speckle noises (optical interference noises) is increased.

A method for controlling the light traveling direction (irradiation angle) after being emitted from the waveguide component using the optical path change of the light passing through the waveguide component (optical fibers, optical guides, optical waveguides, and the like) 110 in the present embodiment example will be described with reference to FIGS. 49 to 51.

Figure 49:
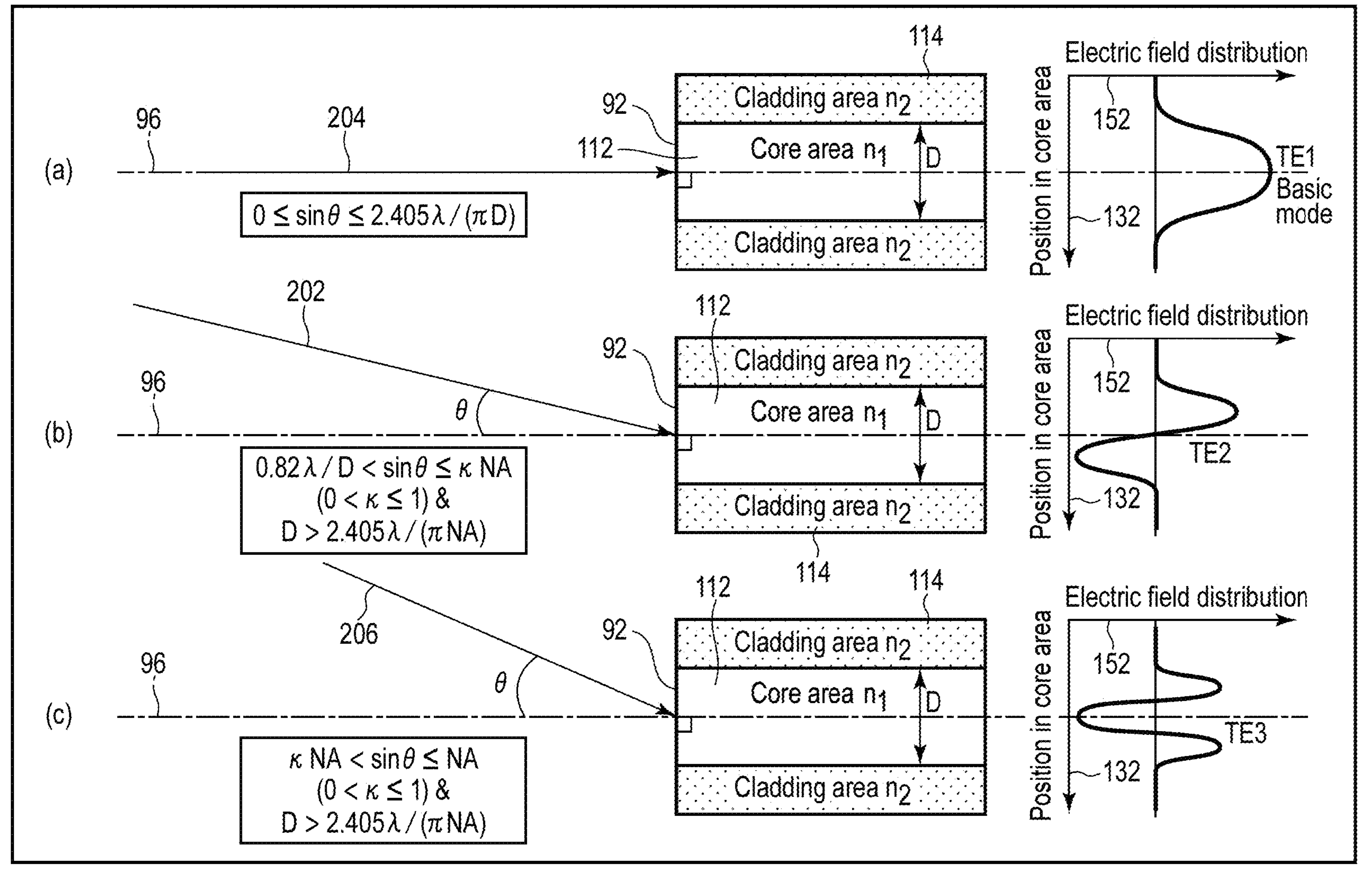
FIG. 49 is an explanatory diagram of a mode of light passing through a core area of an optical fiber.

FIG. 49 illustrates a relation between the incident angle θ on the waveguide component 110 and the light propagation mode (electric field distribution 152) in the core area 112. Here, as an example, a light propagation mode in an optical fiber that is a type of the waveguide component 110 will be described. With reference to a perpendicular line of the incident surface 92 of the optical fiber (predetermined optical member), an angle with light incident on the incident surface 92 is defined as an incident angle θ.

The optical fiber used in FIG. 49 is assumed to be a multimode fiber. As the multimode fiber used in the present embodiment example, either a step-index (SI) type or a graded index (GI) type may be used.

FIG. 49(*a*) illustrates a state in which the second light element 204 is incident on the core area 112 in the optical fiber. The second light element 204 is incident on the core area 112 from a direction substantially parallel to the incident surface side perpendicular line 96. At this time, a case where the second light element 204 is incident on a substantially center portion in the core area 112 is considered. Then, a state in which the electric field distribution 152 of the second light element 204 in the core area 112 forms a basic mode (transverse electric (TE) 1) is assumed. From the light propagation mode theory in the optical fiber, a range of the incident angle θ at which this state occurs satisfies a condition of "0≤sin θ≤2.405λ/(πD)". Here, a variable D indicates a diameter value in the core area 112. In addition, a variable λ indicates a wavelength of light propagating in the core area 112.

FIG. 49(*b*) illustrates a state in which the first light element 202 is incident on the core area 112. In the present embodiment, the incident angle θ of the first light element 202 is set to be larger than the incident angle θ of the second light element, and an electric field distribution mode (higher order mode) different from the second light element is formed in the core area 112. In a TE2 mode among the higher order modes, as illustrated on the right side in FIG. 49(*b*), an electric field value becomes "0" at a center portion of a cross section position 132 in the core area 112. Then, the polarity of the electric field is inverted in a direction in which the cross section position 132 in the core area 112 is shifted.

A condition of the incident angle θ for generating the TE2 mode in the core area 112 needs to simultaneously satisfy both a condition of "0.82λ/D<sin θ≤κNA" and a condition of "D>2.405λ/(πNA)" when calculated using the light propagation mode theory in the optical fiber. Here, a variable NA indicates an NA value of the optical fiber. That is, a maximum incident angle "θmax" at which light can propagate in the core area 112 of the optical fiber is defined as "NA≡sin θmax". Here, a value of a variable κ is considered to be appropriate at ¾ (desirably ½). Furthermore, when "κ=¼" is set, the probability of taking the TE2 mode increases.

A difference between the basic mode (TE1 mode) and the TE2 mode (higher order mode) in the core area 112 appears in a difference in intensity distribution characteristics of the outgoing light beam from the optical fiber. For example, in a case where the second light element 204 is propagated in the basic mode (TE1 mode) in the core area 112, the light cross section intensity distribution (far field pattern) at a location away from the emission location from the optical fiber is 'Intensity distribution in which the center is bright and the periphery is dark'. On the other hand, in a case where the first light element 202 is propagated in the TE2 mode in the core area 112, a 'doughnut-shaped intensity distribution in which a center portion is relatively dark and an area slightly deviated from the center portion is bright' is indicated. Therefore, by observing the intensity distribution of the outgoing light beam from the optical fiber, a difference in the mode of the light propagated through the core area 112 can be predicted.

FIG. 49(*c*) illustrates a state in which the incident angle θ (angle between the traveling direction of the third light element 206 immediately before being incident on the incident surface 92 of prescribed optical component and the perpendicular line 96 to incident surface) of the third light element 206 is set to be larger than that of the first light element 202. The condition of the incident angle θ at this time needs to simultaneously satisfy both conditions of "κNA<sinθ≤NA" and "D>2.405λ/(πNA)" as a result of calculation using the light propagation mode theory in the optical fiber.

The light propagation mode in the optical fiber in a case where the incident angle θ satisfies the above conditions is an electric field distribution 152 of a TE3 mode illustrated in a right diagram in FIG. 49(*c*). In this case, a value of the electric field takes a negative value at the center portion of the core area 112.

Figure 50:
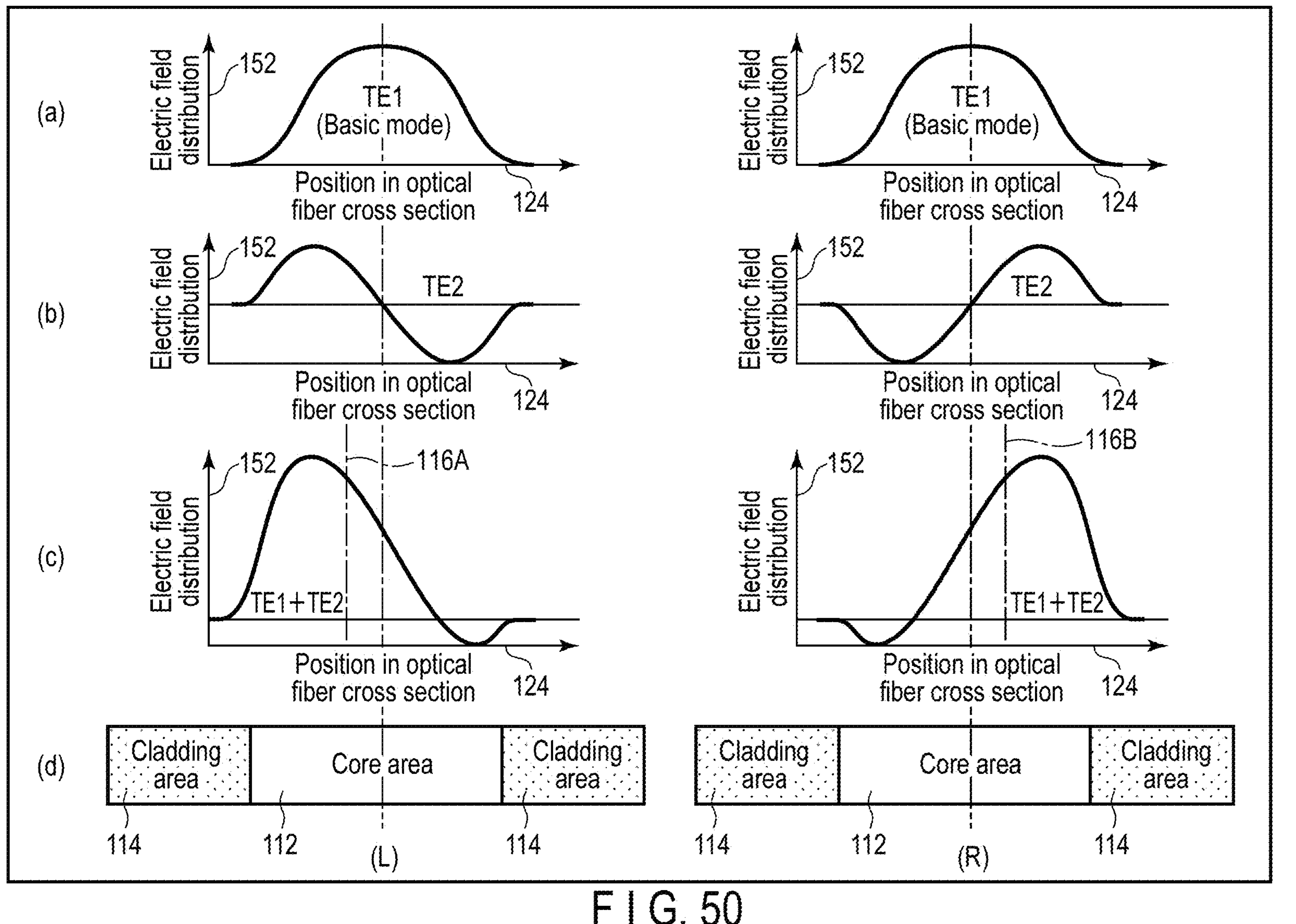
FIG. 50 is an explanatory diagram of generation of an intensity gravity center deviation using mode addition in the optical fiber.

FIG. 50 illustrates a combination state of the symmetric mode forming light and the asymmetric mode forming light with respect to the center position in the core area 112. FIG. 50(*a*) illustrates an electric field distribution 152 of the symmetric basic mode (TE1 mode) forming light. FIG. 50(*b*) illustrates an electric field distribution 152 of the asymmetric TE2 mode forming light. FIG. 50(*c*) illustrates an electric field distribution 152 obtained by combining the two electric field distributions.

In the TE2 mode illustrated in FIG. 50(*b*), there are two cases where the position 124 indicating a large electric field value is on the left side (L) and the right side (R). Therefore, the gravity center position when the intensity distribution of the synthesized light (FIG. 50(*c*)) is taken is shifted between the left diagram (L) and the right diagram (R). That is, in the left side (L) in FIG. 50(*c*), a gravity center position 116A is shifted to the left side from the center position in the core area 112. In addition, in the right side (R) in FIG. 50(*c*), a gravity center position 116B is shifted to the right side from the center position in the core area 112. The gravity center position shift is not limited to the light forming the TE2 mode. For example, when arbitrary light, such as TE4 or TE6, in which the electric field distribution 152 exhibits asymmetric characteristics is synthesized, a gravity center position shift occurs. In the above description, the SI type optical fiber has been mainly described. However, the present invention is not limited thereto, and the above description is similarly applied to a GI type optical fiber.

Figure 51:
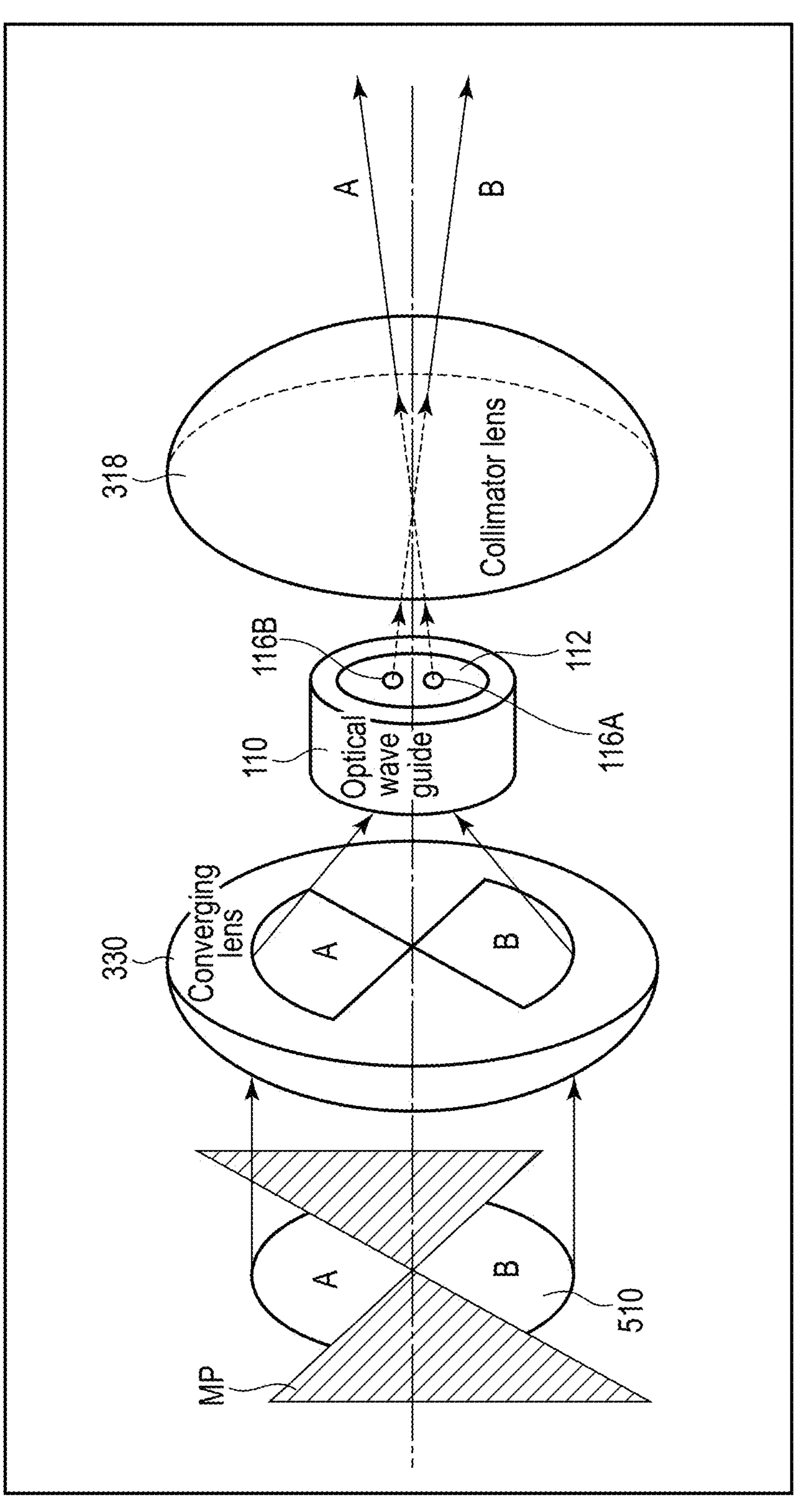
FIG. 51 illustrates a speckle noise reduction method using the intensity gravity center deviation.

FIG. 51 illustrates an embodiment example in which the speckle noise is reduced using the gravity center position shift. A mask pattern MP is arranged in the optical path of the parallel light, and only an upper sector area A in a cross-sectional profile of laser light 510 is extracted. The converging lens 330 converges the extracted light into the core area 112 of the waveguide component (optical fiber/optical waveguide/optical guide) 110. Then, at the outlet of the waveguide component (optical fiber/optical waveguide/optical guide) 110, a gravity center position 116A of the intensity distribution is generated at a position shifted from the center position of the core area 112. The collimator lens 318 converts the outgoing light beam from the waveguide component (optical fiber/optical waveguide/optical guide) 110 into parallel light.

Then, in a case where only a lower sector area B in the cross-sectional profile of laser light 510 is extracted, a gravity center position 116B of the intensity distribution is generated in the exit surface of the waveguide component (optical fiber/optical waveguide/optical guide) 110. The gravity center position 116B appears at a position opposite to the gravity center position 116A with respect to the center position of the core area 112.

The traveling directions of the parallel light after passing through the collimator lens 318 are slightly shifted from each other at A and B. A case where the temporal coherence between the light beam A extracted in the upper sector area A and the light beam B extracted in the lower sector area B is low (unsynchronized optical phase 402 is established) will be considered. When the measured object 22 is simultaneously irradiated with the light beams of A and B having different traveling directions using the Koehler illumination system 1026, the speckle noise amount is reduced.

FIG. 51 illustrates a speckle noise amount reduction method in the case of using two types of light beams having low temporal coherence (having a relation of the unsynchronized optical phase 402) and having passed through only the A area and the B area in the cross-sectional profile of laser light 510.

Next, a case where the optical characteristic converting component 210 divided into eight (divided into eight angles)

in the angular direction 358 illustrated in FIG. 44(*b*) is used will be described. The elements (the first to fourth light elements 202 to 207) having passed through the respective areas have an optical path length difference equal to or larger than the coherence length $\Delta L_0$ (a double value thereof). Then, eight gravity center positions 116 having mutually different intensity distributions are formed in the exit surface of the waveguide component (optical fiber/optical waveguide/optical guide) 110. When the outgoing light beam from the waveguide component (optical fiber/optical waveguide/optical guide) 110 is converted into parallel light by the collimator lens 318, traveling directions of the respective elements (first to fourth light elements 202 to 207) passing through the collimator lens 318 from the different gravity center positions 116 are shifted from each other. That is, when the cross-sectional profile of laser light 510 is angularly divided as a method for dividing the initial light 200 using the optical characteristic converting component 210, an asymmetric electric field mode (TE2 or the like) is easily formed in the core area 112. This produces an effect of improving the effect of reducing the speckle noise.

In FIG. 51, the converging lens 330 converges light onto the incident surface 92 in the core area 112. A phenomenon in which the effect of reducing the speckle noise is weakened when a spot size incident on the incident surface 92 in the core area 112 is increased by shifting the converging position was confirmed by an experiment. When the spot size on the incident surface 92 in the core area 112 is increased, the total reflection frequency at the interface between the core area 112 and the cladding area 114 increases. Since phase shift occurs due to total reflection at the interface, it is considered that the effect of reducing the speckle noise is weakened.

When a ratio of the spot size (diameter) on the incident surface 92 in the core area 112 to the diameter D in the core area 112 is set to 1 or less, the effect of reducing the speckle noise amount increases. The ratio is preferably ¾ or less or ½ or less.

Here, the definition of the spot size on the incident surface 92 in the core area 112 will be clarified as follows. For example, a maximum diameter of the cross-sectional profile of laser light 510 that can pass through the converging lens 330 is defined as the effective light flux diameter of the optical system. A maximum incident angle when the light within the effective light flux diameter is converged on the incident surface 92 in the core area 112 is defined as "θmax". The spot size at this time is "0.82λ/sin θmax". Here, "λ" represents the wavelength. Therefore, the ratio between the theoretical calculation value and the diameter D of the core area 112 may be set to 1 or less (desirably ¾ or less, or ½ or less).

The definition of the spot size is not limited to the above, and may be defined by another method. The converging spot intensity distribution on the converging surface does not have a rectangular characteristic, but often has a light intensity distribution in which the center is maximum and the periphery is reduced. In consideration of this situation, the diameter (half-value width) of the range in which the half value of the maximum intensity in the converging spot intensity distribution on the incident surface 92 in the core area 112 is obtained or the diameter ($e^{-2}$ width) of the range in which the $e^{-2}$ value of the maximum intensity is obtained may be regarded as the spot size.

When the center of the spot (cross-sectional profile of laser light 510) on the incident surface 92 in the core area 112 is greatly deviated from the center of the core area 112, the phase shift amount caused by total reflection at the interface between the core area 112 and the cladding area 114 increases. Therefore, when the allowable amount of deviation between the center of the spot (cross-sectional profile of laser light 510) on the incident surface 92 in the core area 112 and the center of the core area 112 is defined, a high reduction effect on the speckle noise amount can be obtained. That is, in the present embodiment example, the deviation amount may be set to D/2 or less. Here, the variable D means the diameter value in the core area 112. Furthermore, the deviation amount is desirably D/4 (or D/8) or less.

The light of the TE3 mode propagating in the core area 112 has a symmetric electric field distribution characteristic with respect to the center position of the core area 112. Therefore, the light of the TE3 mode does not contribute to an increase in the gravity center position shift amount of the intensity distribution. Therefore, in order to effectively reduce the speckle noise, it is desirable to satisfy a condition of "sin θ≤κNA" with respect to all incident angles θ of light incident on the core area 112. Here, as described above, ¾ (desirably ½ or ¼) is considered to be appropriate as the value of the variable κ.

In addition, the gravity center position shift amount (FIG. 50(*c*)) in the intensity distribution of the synthesized light changes depending on a difference in the total amplitude amount between the second light element 204 forming the reference mode (TE1 mode) and the first light element 202 forming the TE2 mode. That is, when the relative total amplitude amount of the first light element 202 forming the TE2 mode is increased, the gravity center position shift amount in the intensity distribution of the synthesized light increases. On the other hand, when the first light element 202 forming the TE2 mode does not exist, the shift of the gravity center position in the intensity distribution of the synthesized light does not occur. Therefore, in order to effectively reduce the speckle noise, it is desirable to satisfy "0.82λ/D<sin θmax κNA" as a condition of the maximum incident angle "θmax" for all light beams incident on the core area 112.

In the present embodiment example illustrated in FIG. 49, a difference in mode in the core area 112 is generated using a difference in incident angle (difference in traveling direction) between the first light element 202 and the second light element. Therefore, in the present embodiment example, it is assumed that a multimode fiber is used (either the SI type or the GI type). When "D>2.405λ/(πNA)" is satisfied with respect to the diameter D in the core area, it is understood from the light propagation mode theory in the optical fiber that the characteristics of the multimode fiber are shown. Therefore, when the speckle noise amount is reduced using the difference in the light propagation mode in the core area 112 of the waveguide component (optical fiber/optical waveguide/optical guide) 110, it is desirable to use the core area 112 satisfying the above condition as the diameter value D.

Figure 52:
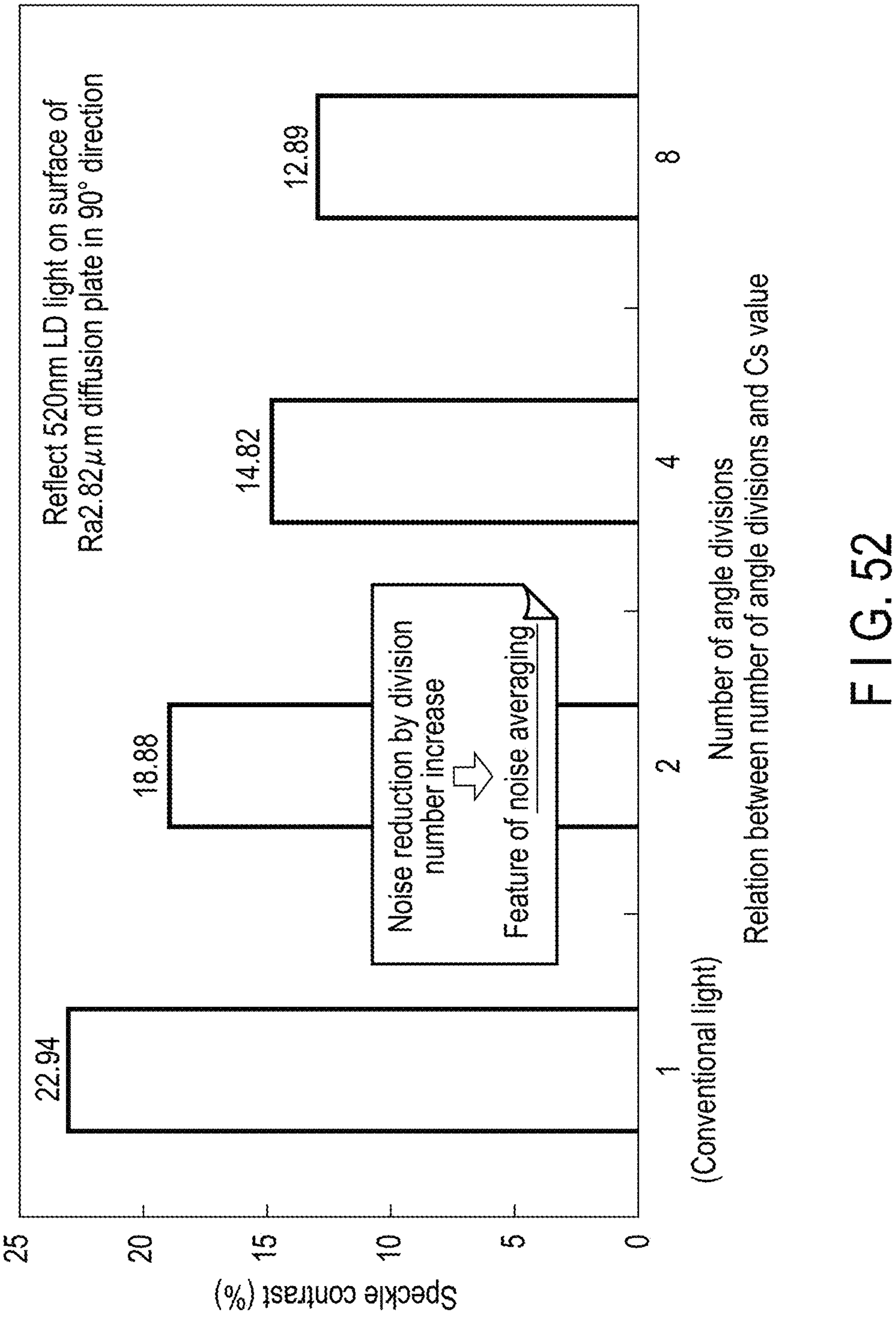
FIG. 52 is an explanatory diagram of a relation between the number of angle divisions of an optical characteristic converting component and an optical noise reduction effect.

FIG. 52 illustrates an experimental result of confirming the speckle noise reduction effect in the present embodiment example. First, the optical system used in the experiment will be described. The optical characteristic converting component 210 having the structure in FIG. 44(*b*) was arranged in the middle of an optical path in which light emitted from the point emission type laser diode and having a wavelength of 520 nm was converted into parallel light by a collimator lens. The optical characteristic converting component 210 divides the parallel light flux cross section of the initial light 200 into eight sections (eight sections at an angle) along the angular direction 358. A mask pattern MP (FIG. 51) was arranged immediately before the optical characteristic converting component 210. A pattern shape of the mask pattern MP was changed to set the number of angle divisions of the optical characteristic converting component 210. That is, in a case where light passes through the entire area of the optical characteristic converting component 210 divided by 8 angles, the number of angle divisions is "8". Then, for example, in a case where an experiment is performed using light passing through only the areas A, C, E, and G (the first to fourth areas 212 to 218), the number of angle divisions is "4".

The parallel light immediately after passing through the optical characteristic converting component 210 was converged in the core area 112 of the multimode optical fiber by the converging lens 330. As the multimode optical fiber used in the experiment, an SI type having a core diameter D of 600 μm, an NA value of 0.22, and a total length of 1.5 m was used. The outgoing light beam from the multimode optical fiber was converted into parallel light by the collimator lens 318 to obtain irradiated light (first light) 12.

As the measured object 22, a surface of a diffuser 460 having an average value Ra of surface roughness of 2.82 μm was used. Then, the irradiated light (first light) 12 was caused to be incident on the surface of the diffuser 460 at an incident angle of 45 degrees. Then, the imaging sensor 300 (CCD camera) was arranged in a direction of 90 degrees with respect to the irradiated light (first light) 12 based on the surface of the diffuser 460. The detection light (second light) 16 obtained from the surface of the diffuser 460 is in a scattered light state, but this scattered light was directly imaged on the imaging plane of the imaging sensor 300 (CCD camera).

As an index for evaluating the speckle noise amount, a speckle contrast Cs (speckle contrast) value was used. This is defined as the standard deviation of the fluctuation rate distribution after normalization with the local average value of the intensity values with respect to the intensity distribution characteristic on the imaging sensor 300 of the detection light (second light) 16 obtained from the surface of the diffuser 460.

FIG. 52 illustrates a change in Cs value when the angle division (horizontal axis) of the optical characteristic converting component 210 is changed. Here, when the angle division is "1", the conventional optical system before the optical characteristic converting component 210 is used is illustrated. When the number of angle divisions is increased, the speckle noise amount decreases. This tendency indicates a state in which the speckle noise amount is averaged.

That is, the optical path in the core area 112 of the waveguide component (optical fiber) 110 is different for each of the elements (first to fourth light elements 202 to 207) after passing through the optical characteristic converting component 210. As a result, the irradiation angle to the surface (measured object 22) of the diffuser 460 is different for each of the elements (first to fourth light elements 202 to 207). Therefore, the speckle noise pattern observed on the imaging sensor 300 changes for each of the elements (first to fourth light elements 202 to 207). Here, since the respective elements (first to fourth light elements 202 to 207) have low temporal coherence (have a relation of the unsynchronized optical phase 402 with each other), summation (intensity summation) of all the intensity distributions occurs on the imaging sensor 300. Since the speckle noise pattern is different for each of the elements (first to fourth light elements 202 to 207), a cancellation effect is generated between the different noise components (the noise components are averaged or smoothed). When the number of elements to be summated (the number of the first to fourth light elements 202 to 207) increases, averaging (smoothing) of the noise components proceeds. Therefore, when the number of angle divisions increases, the speckle noise amount (Cs value) decreases.

Chapter 5: Method for generating optical path length difference in near-field area or near field thereof It has been described in Chapter 2 that 'light emission phase can have gentle spatial continuity' in a small area in the near-field area 372 of the emitting light emitted from the same light emitter 470 having a spatially wide light emitting area. Therefore, the emitting light from the light emitting area in the small area of the same light emitter 470 has a high degree of coherence. Accordingly, large optical interference noise is likely to occur from the emitting light emitted from this.

In addition, it is considered that the light emitting plane 370 on the light emitter 470 having a spatially wide light emitting area is configured by a combination of small areas partially overlapping each other. Therefore, it can be assumed that a certain degree of 'spatial continuity of the light emission phase' is maintained even in the entire light emitting plane 370 configured by the combination of the small areas. From this situation, as described in Chapter 2, when the light emitting plane 370 on the light emitter 470 expands, the degree of spatial coherence decreases, but the degree of temporal coherence does not decrease. Therefore, optical interference noise is also generated from emitting light emitted from the wide light emitting plane 370.

In the present embodiment example described in Chapter 5, a method for reducing the temporal coherence within or in the vicinity of the near-field area 372 with respect to the light emitting area (light emitting plane 370) of the same light emitter 470 will be described. According to the temporal coherence reduction, the optical interference noise can be reduced.

In the specific embodiment example described in Chapter 5, the emitting light (initial light 200) passing through the near-field area 372 or the vicinity thereof with respect to the light emitting area (light emitting plane 370) of the same light emitter 470 is divided into the first optical path 222 and the second optical path 224, and the optical path length difference between the first light element 202 and the second light element 204 passing through the respective optical paths 222 and 224 is made larger than the coherence length $\Delta L_0$ (or a double value thereof). Here, when division of a wavefront is used as a division method of the emitting light (initial light 200) in or near the near-field area 372, an effect of easily increasing the number of divisions and increasing the effect of reducing the optical interference noise is generated.

Note that the drawings (FIGS. 53 to 66 and 69) used for description as the embodiment example of Chapter 5 are mainly drawn focusing on the optical arrangement in the light source 2. In many cases, the light emitter 472 having a spatially wide light emitting area is mainly used as the light emitter 470 in the light source 2 used in Chapter 5. The "spatially wide light emitting area" mentioned here means "a light emitting area different from single point light emission".

As an example of the light emitter 470 that emits light from only one point, a point emission type laser diode is exemplified. On the other hand, for example, a multipoint laser diode having a plurality of light emission points in one chip is regarded as the light emitter 472 having a "spatially wide light emitting area". Therefore, a line emission type laser diode, a surface emission type laser diode (VCSEL), and the like are also included in the light emitter 472 having a "spatially wide light emitting area". In addition, since a light emitting filament has a predetermined size, a thermal light source such as a halogen lamp is also included in the light emitter 472 having a "spatially wide light emitting area".

Figure 53:
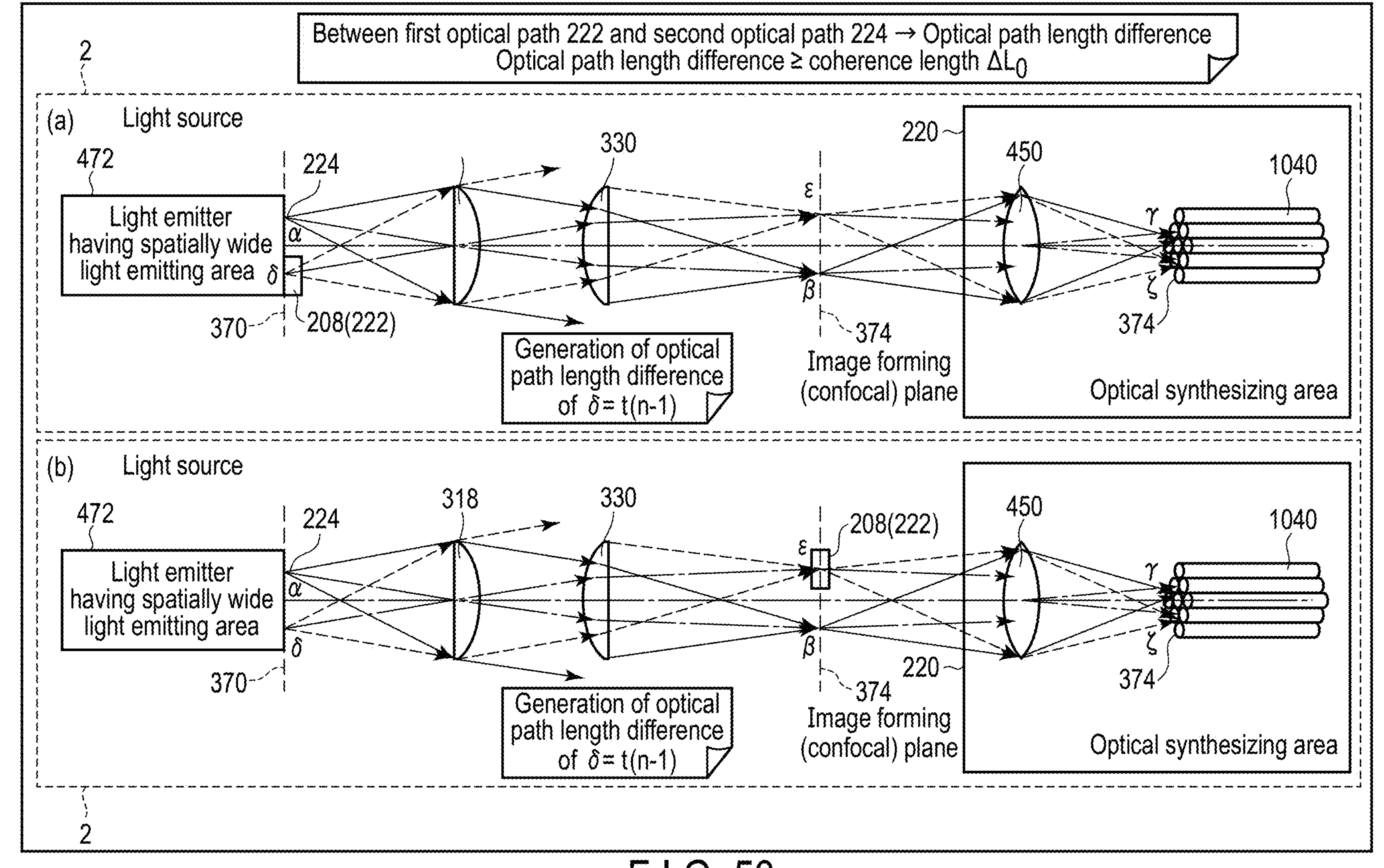
FIG. 53 is an explanatory diagram of an example in which a transmissive optical characteristic converting component is arranged in a near-field area.

With reference to FIG. 53, the location of the near-field area 372 with respect to the light emitting area of the light emitter 472 having a spatially wide light emitting area will be described. The collimator lens 318 in FIG. 53 converts emitting light emitted from one point (α point or δ point) in the light emitting area of the light emitter 472 having a spatially wide light emitting area into parallel light. Then, the converging lens 330 converges the parallel light on the image forming plane 374. Therefore, an image forming optical system is configured by a combination of the collimator lens 318 and the converging lens 330.

Then, the image forming lens 450 constitutes an image forming optical system again, and converges the converged light on the image forming plane 374 on an incident surface of an optical bundle fiber 1040 again. Here, a combination of the image forming lens 450 and the optical bundle fiber 1040 constitutes the optical synthesizing area 220. Although not illustrated, the outgoing light beam from the optical bundle fiber 1040 may be used as the irradiated light (first light) 12 and emitted to the measured object 22 through an illumination system such as the Koehler illumination system 1026. Alternatively, the collimator lens 318 may be arranged in the middle of the optical path of the outgoing light beam from the optical bundle fiber 1040, and the measured object 22 may be irradiated with the irradiated light (first light) 12 in a substantially parallel light state. In addition, the present invention is not limited to FIG. 53, and the same utilization method as described above may be adopted for the outgoing light beam from the optical bundle fiber 1040 described later with reference to FIGS. 54 to 66.

In the optical system of FIG. 53, there are three near-field areas 372 for the light emitter 472 having a spatially wide light emitting area. First, the light emitting plane 370 (light emitting area) on the light emitter 472 having a spatially wide light emitting area corresponds to the first near-field area 372. Next, the image forming plane 374 of the light emitter set by the combination of the collimator lens 318 and the converging lens 330 corresponds to the second near-field area 372. Further, the image forming lens 450 constitutes an image forming optical system. The image forming lens 450 generates the image forming plane 374 of the light emitter on the incident surface (on the inlet surface) of the optical bundle fiber 1040. The image forming plane 374 of the light emitter corresponds to the third near-field area 372.

In an embodiment example of this chapter, the emitting light (initial light 200) that passes (or reflects) through or near any of the near-field area 372 is divided. Then, an optical path length between the divided light beams (the first light element 202 and the second light element 204) is changed.

As a method for changing the optical path length, in the embodiment example illustrated in FIGS. 53 and 54, a difference in light passing through and out of a transparent medium (glass, quartz glass, transparent plastic, and the like) having a refractive index n and a thickness (step) t is used. When this transparent medium is used, an optical path length difference of "$\delta=t(n-1)$" occurs in the light passing through and out of the transparent medium. The optical path length difference δ is set to be equal to or larger than the coherence length $\Delta L_0$ (desirably a double value thereof).

In FIGS. 53(*a*) and 53(*b*) and FIG. 54(*a*), emitting light from an α point in the light emitting plane 370 (light emitting area) on the light emitter 472 having a spatially wide light emitting area is converged at a β point and then converged again at a γ point. In addition, emitting light from a δ point in the light emitting plane 370 (light emitting area) on the light emitter 472 having a spatially wide light emitting area is converged at a ε point and then converged again at a ζ point. In order to simplify the description, one of the divided first optical path 222 and second optical path 224 is defined as an optical path passing through the α point, the β point, and the γ point, and the other is defined as an optical path passing through the δ point, the ε point, and the ζ point.

In FIG. 53(*a*), the division of the emitting light (initial light 200) and the setting of the optical path length difference between the divided light (the first light element 202 and the second light element 204) are performed on or near the light emitting plane 370 (light emitting area) on the light emitter. That is, a transmissive optical characteristic converting component 208 having a thickness (step) t is arranged only in the vicinity of the δ point in the middle of the first optical path 222. As a result, the optical path length of the first optical path 222 is larger than the optical path length of the second optical path 224 passing through the α point, the β point, and the γ point.

In FIG. 53(*b*), the division of the emitting light (initial light 200) and the setting of the optical path length difference between the divided light (the first light element 202 and the second light element 204) are performed on or near the image forming plane 374 of the light emitter. That is, the transmissive optical characteristic converting component 208 having the thickness (step) t is arranged only in the vicinity of the ε point in the middle of the first optical path 222. As a result, the optical path length of the first optical path 222 is larger than the optical path length of the second optical path 224 passing through the α point, the β point, and the γ point.

When attempting division of a wavefront with a large number of divisions in or near the near-field area 372 with respect to the emitting light (initial light 200) from the light emitter 470, a relatively wide area for division of the wavefront is required. In a case where division of the wavefront is performed in the light emitting area (the light emitting plane 370 on the light emitter) in the light emitter 472 having a spatially wide light emitting area or immediately after the light emitting area, if the area is small, the upper limit of the number of divisions of the wavefront is restricted for reasons of spatial arrangement.

When the image forming optical system is configured in the middle of the optical path as illustrated in FIG. 53(*b*), an arbitrary image forming magnification can be set on the image forming plane 374 of the light emitter. When the image forming magnification (enlargement magnification) with respect to the light emitting area (the light emitting plane 370 on the light emitter) in the light emitter 472 having a spatially wide light emitting area is increased, the number of divisions of the wavefront is easily increased. Therefore, when division of the emitting light (the initial light 200) and optical path length difference formation between the divided lights are performed on the image forming plane 374 of the light emitter, the effect of reducing the optical interference noise is improved. Note that the above effect is not limited to the optical arrangement in FIG. 53(*b*), and is also applied to the embodiment examples of FIGS. 54 to 67 described later.

In FIG. 54(*a*), the division of the emitting light (initial light 200) and the setting of the optical path length difference between the divided light (first light element 202 to fourth light element 207) are performed on the incident surface (on the inlet surface) of the optical fiber (optical bundle fiber 1040) corresponding to the image forming plane 374 of the light emitter or in the vicinity thereof. After passing through the image forming lens 450 in FIG. 54(*a*), the light converged on the incident surface (on the inlet surface) of the optical fiber (optical bundle fiber 1040) corresponds to the initial light 200.

FIG. 54(*b*) illustrates an embodiment example of the transmissive optical characteristic converting component 198 arranged at the inlet (immediately before the incident surface) of the optical fiber (optical bundle fiber 1040). The transmissive optical characteristic converting component 198 has a structure in which a plurality of cylindrical bodies made of a transparent medium (glass, quartz glass, transparent plastic, and the like) and having different diameters are overlapped. Then, the initial light 200 is radially divided using the difference in the diameter of the cylindrical body. In the embodiment example in FIG. 54(*b*), the light is divided into four in a radial direction 368 (radially divided into four).

A cylindrical portion having the smallest diameter forms the first optical path 222. Among the initial light 200 having passed through the image forming lens 450, the light having passed through the first optical path 222 becomes the first light element 202. A cylindrical portion arranged on an outer peripheral portion of the first optical path 222 and having the second smallest diameter forms the second optical path 224. Among the initial light 200 having passed through the image forming lens 450, the light having passed through the second optical path 224 becomes the second light element 204. Further, the outer periphery thereof constitutes the third optical path 226, and an area having the largest diameter forms the fourth optical path 228.

The thickness of each of the cylindrical bodies having different diameters is defined as "t". Then, the first light element 202 passing through the first optical path 222 passes through the area of the thickness 4t in the transmissive optical characteristic converting component 198. Similarly, the thicknesses of the passing areas of the second, third, and fourth light elements 204, 206, and 207 in the transmissive optical characteristic converting component 198 change to 3t, 2t, and t.

When a value of "t" is set such that the optical path length difference of the light passing through the inside and outside of the transmissive optical characteristic converting component 198 including the transparent medium is equal to or larger than the coherence length $\Delta L_0$ (or a double value thereof), the first to fourth light elements 202 to 207 have a relation of the unsynchronized optical phase 402 (temporal coherence thereof is lowered).

In the embodiment example of the transmissive optical characteristic converting component 198 illustrated in FIG. 54(*b*), the total thickness increases near the center. However, the present invention is not limited thereto, and for example, the total thickness may be small near the center and the total thickness may increase at the peripheral portion in the present embodiment example. Furthermore, the thickness may increase or decrease non-monotonically along the radial direction 368. In FIG. 54(*b*), the initial light 200 is radially divided. However, the present invention is not limited thereto, and angle division or division in an arbitrary direction may be performed.

FIGS. 55 to 67 illustrate another embodiment example in which the reflective optical characteristic converting component 196 is arranged in the near-field area 372 or the vicinity thereof with respect to the light emitting area (light emitting plane 370) of the light emitter 472 having a spatially wide light emitting area. The optical system in FIGS. 55 and 56 is the same as that in FIG. 53 and FIG. 54(*a*) except that the transmissive optical characteristic converting component 208 is changed to the reflective optical characteristic converting component 196.

Figure 55:
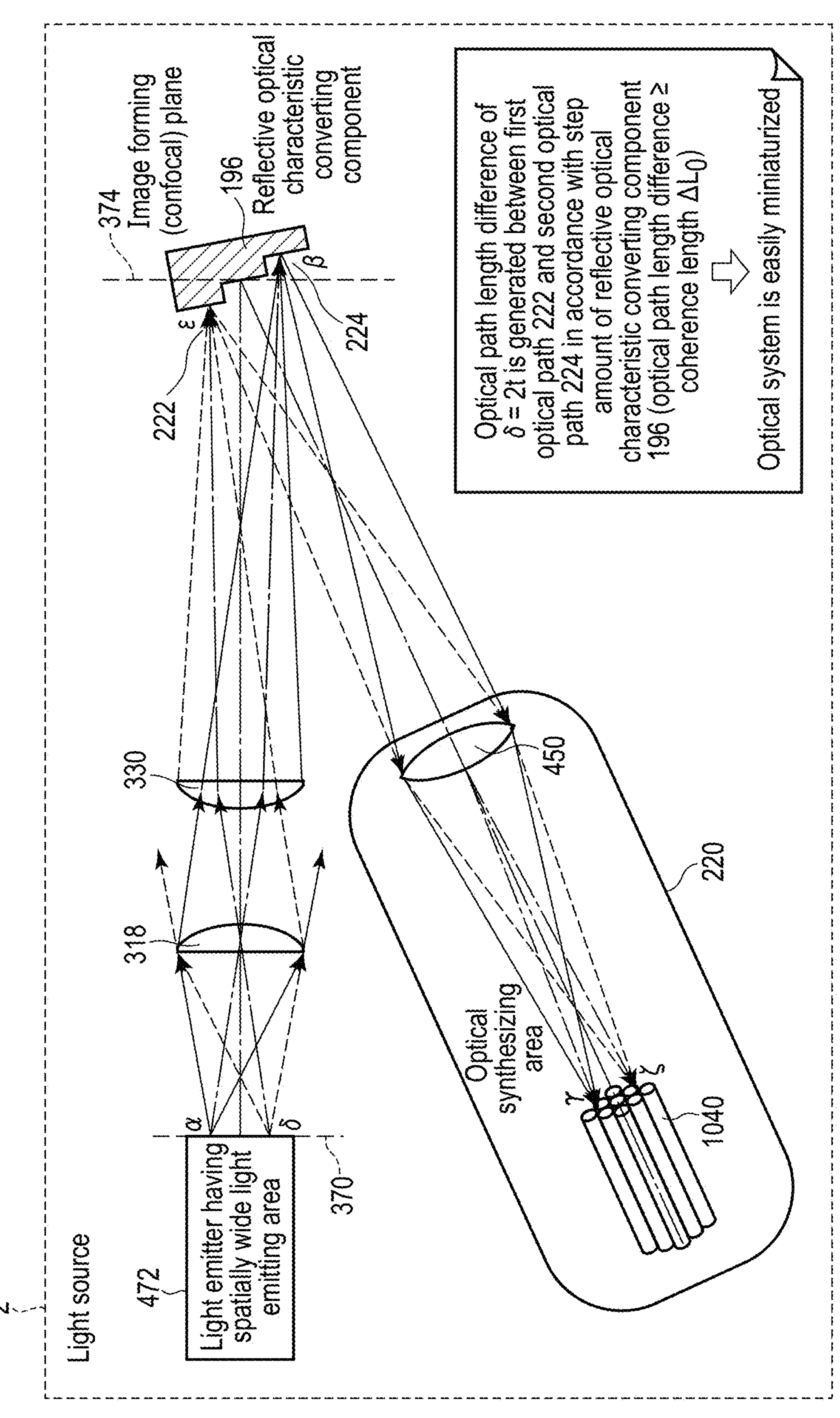
FIG. 55 is an explanatory diagram of an example in which a reflective optical characteristic converting component is arranged in a near-field area.
Figure 56:
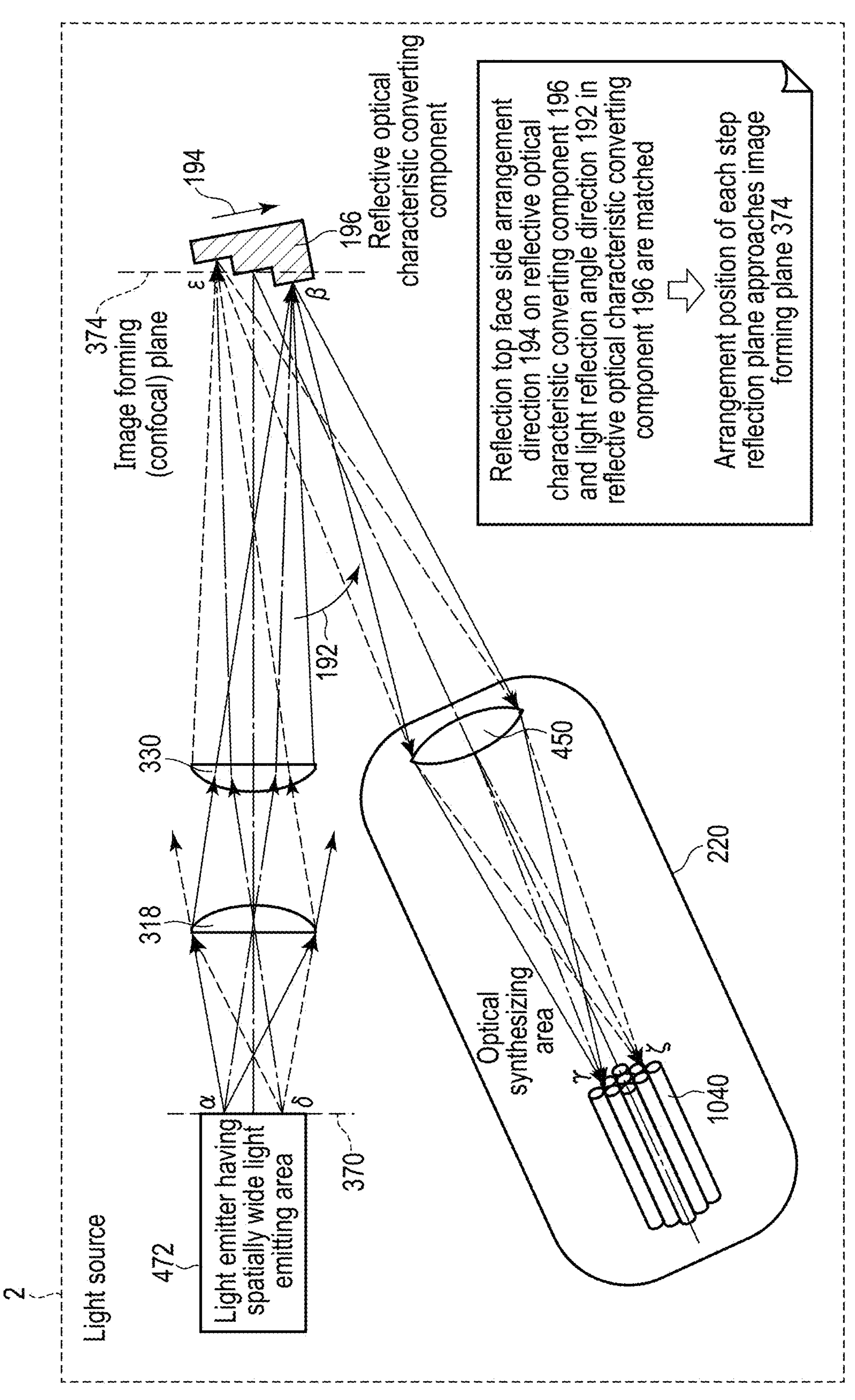
FIG. 56 is an explanatory diagram of an application example in which the reflective optical characteristic converting component is arranged in a near-field area.

In FIGS. 55 and 56, the emitting light from the α point in the light emitting area (light emitting plane 370) of the light emitter 472 having a spatially wide light emitting area reaches the γ point via the β point. The emitting light from the δ point reaches the ζ point via the ε point. The optical path length changes between the optical paths 222 and 224.

Assuming that the step amount on the surface of the reflective optical characteristic converting component 196 is "t", a relation of "δ=2t" is established for the optical path length difference δ generated by the step amount t. The optical path length difference δ is set to be equal to or larger than the coherence length $\Delta L_0$ (desirably a double value thereof). When the reflective optical characteristic converting component 196 is used, the step amount t for securing the necessary set optical path length difference δ is only a half value of δ. Therefore, when the reflective optical characteristic converting component 196 is used, there is an effect that the optical system can be miniaturized as compared with when the transmissive optical characteristic converting component 208 is used.

The reflective optical characteristic converting component 196 can take any shape as long as it satisfies the wavefront division function of the emitting light. Further, the wavefront division method is not limited to angle division or radius division, and emitting light in an arbitrary direction may be divided. Here, as illustrated in FIGS. 55 to 67, when the step on the surface of the reflective optical characteristic converting component 196 is used, one reflective optical characteristic converting component 196 can simultaneously perform division of the emitting light and generation of the optical path length difference between the divided light beams. The step includes a plurality of reflection planes having different heights. Therefore, when a step is formed on the reflection face on the surface of the reflective optical characteristic converting component 196, an effect of achieving miniaturization and cost reduction of the entire optical system is produced.

As a specific example of the step, FIGS. 55 and 56 illustrate a structure example in which the step is formed by three reflection planes of the reflection plane including the β point, the reflection plane including the ε point, and the reflection plane arranged in the middle thereof. Each of the three reflection planes may constitute an elongated rectangular plane, or each of the three reflection planes (not illustrated) may be formed by a finer step. In the embodiment example illustrated in FIGS. 55 and 56, a step is formed by a plurality of reflection planes having different heights. However, the present invention is not limited thereto, and the step may be formed by a plurality of reflective curved surfaces having different heights in the present embodiment example.

In a case where the step is formed by a plurality of reflection planes having different heights, the reflection planes are distinguished into reflection planes arranged on the front side and the back side with respect to the traveling direction of the emitting light from the light emitter 472. In the embodiment example of FIG. 55, the reflection plane including the ε point is the reflection plane arranged on the front side with respect to the traveling direction of the emitting light. Conversely, the reflection plane including the β point is the reflection plane arranged on the back side with respect to the traveling direction of the emitting light. A direction from the reflection plane on the back side (the plane including the β point) to the reflection plane on the front side (the plane including the ε point) is referred to as a "reflection top face side arrangement direction 194" herein.

For example, a metal thin film such as aluminum or gold or an inorganic optical thin film may be formed on the surface of the reflective optical characteristic converting component 196. A base material of the reflective optical characteristic converting component 196 is not limited to plastic (organic substance), and carbon fiber, metal, an inorganic substance, or a mixed material thereof may be used.

FIG. 56 illustrates a relation between the above-described reflection top face side arrangement direction 194 and a light reflection angle direction 192 of the reflected light beam at that position. Each reflection plane constituting the step on the surface of the reflective optical characteristic converting component 196 is inclined from a plane perpendicular to the direction in which the emitting light from the light emitter 472 having a spatially wide light emitting area is incident. The inclination direction of each reflection plane (the inclination direction from the vertical plane) is the same direction as the light reflection angle direction 192 of the emitting light. The reflection top face side arrangement directions 194 between FIGS. 56 and 55 are directions opposite to each other. Therefore, in FIG. 56, the reflection top face side arrangement direction 194 and the light reflection angle direction 192 of the emitting light are the same direction, whereas in FIG. 55, the reflection top face side arrangement direction 194 and the light reflection angle direction 192 are opposite directions.

The image forming plane 374 (near-field area 372) of the light emitter 472 has a parallel relation with a plane perpendicular to the direction in which the emitting light from the light emitter 472 is incident. Therefore, as clear from comparison between FIGS. 56 and 55, when the reflection top face side arrangement direction 194 illustrated in FIG. 56 and the light reflection angle direction 192 of the emitting light are the same direction, each reflection plane constituting the step approaches the image forming plane 374 (near-field area 372). As described above, when the optical system is arranged such that the reflection top face side arrangement direction 194 and the light reflection angle direction 192 of the emitting light are the same direction, the light division in the near-field area 372 or the vicinity thereof and the generation of the optical path length difference between the divided light beams become easy, and the effect of reducing the optical interference noise is improved.

Figure 57:
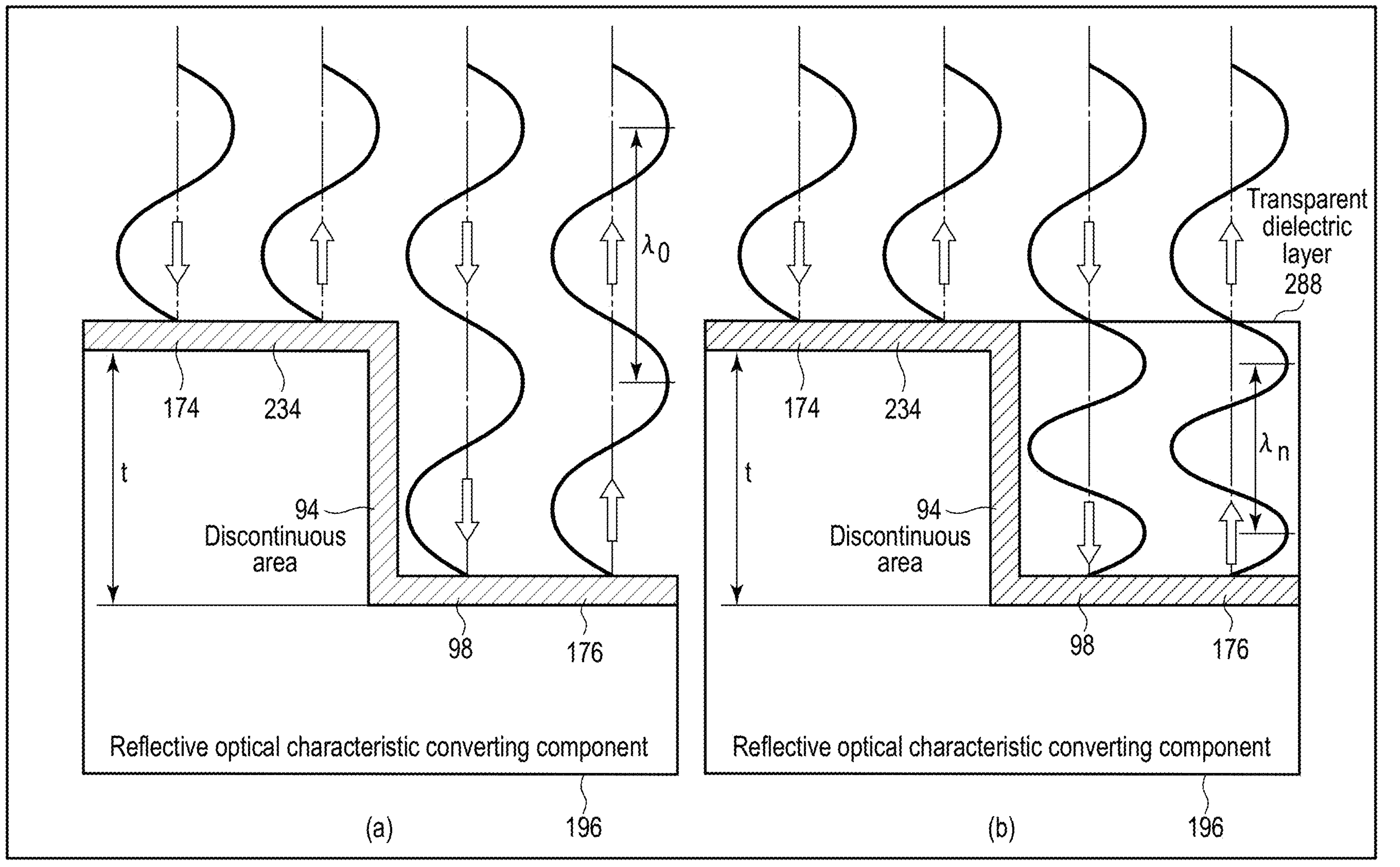
FIG. 57 is an explanatory diagram of an influence of a difference in a state immediately before a light reflection face in the optical characteristic converting component.

FIG. 57 illustrates a basic principle related to the present embodiment application example related to the reflective optical characteristic converting component 196. In FIGS. 57(*a*) and 57(*b*), similarly to FIG. 38(*c*), a light reflection face 234 exists on a partially discontinuous surface (curved or plane surface) 98. In the partially discontinuous surface (curved or plane surface) 98, a top face 174 and a bottom face 176 are configured with a discontinuous area 94 as a boundary. Here, the amount of a mechanical step between the top face 174 and the bottom face 176 is defined as "t". The wavelength of the light reflected by the light reflection face 234 in the air (or in vacuum) is represented by "$\lambda_0$".

A portion immediately before the light reflection face 234 installed on the bottom face 176 in FIG. 57(*a*) is directly exposed to the air. Therefore, the wavelength of the light reflected by the light reflection face 234 installed on the bottom face 176 in FIG. 57(*a*) remains "$\lambda_0$". As described with reference to FIGS. 55 and 56, the optical path length difference δ between the reflected light beam from the top face 174 and the reflected light beam from the bottom face 176 in FIG. 57(*a*) satisfies the relation of "$\delta=2t$". With respect to the mechanical step amount t between the top face 174 and the bottom face 176, it is desirable to satisfy a condition of "$t=\delta/2\geq\Delta L_0/2=\lambda_0^2/2\Delta\lambda$" or "$t\geq\Delta L_0=\lambda_0^2/\Delta\lambda$".

In comparison with this, a portion immediately before the light reflection face 234 provided on the bottom face 176 in FIG. 33(*b*) is covered with a transparent dielectric layer 288. A refractive index of the transparent dielectric layer 288 is represented by "n". A value of the wavelength "$\lambda n$" of light passing through the transparent dielectric layer 288 is as short as "$\lambda n=\lambda_0/n$". Therefore, a required condition for the mechanical step amount t between the top face 174 and the bottom face 176 in FIG. 33(*b*) is "$t=\delta/2\geq\Delta\ Ln/2=\Delta n^2/2\Delta\lambda n=\Delta_0^2/2n\Delta\lambda$" or "$t\geq\Delta\ Ln=\lambda_0^2/n\Delta\lambda$". That is, when the portion immediately before the light reflection face 234 is covered with the transparent dielectric layer 288 having a refractive index "n", the allowable lower limit of the mechanical step amount t decreases by "1/n".

The step amount t in the reflective optical characteristic converting component 196 is a half of the necessary set optical path length difference δ. Therefore, the effect of miniaturizing the optical system by using the reflective optical characteristic converting component 196 has already been described. Further, as described above, the transparent dielectric layer 288 having the refractive index n (n>1) is arranged in the middle of the optical path to the light reflection face 234 (or immediately before the light reflection face 234). Then, since the allowable lower limit of the mechanical step amount t decreases, an effect of further reducing the thickness of the entire reflective optical characteristic converting component 196 is produced. As a result, when the transparent dielectric layer 288 is arranged immediately before the light reflection face 234 in the reflective optical characteristic converting component 196, the optical system can be further miniaturized.

Here, arrangement conditions of the transparent dielectric layer 288 are summarized as follows. In the present embodiment example, (the light reflection face 234 in) the partially discontinuous surface (curved or plane surface) 98 optically reflects the initial light 200 emitted by the light emitter 470. The position of the discontinuous area 94 in the partially discontinuous surface (curved or plane surface) 98 is used (for the boundary area) to spatially divide the initial light 200. The optical path length difference between the individual optical paths (the first optical path 222 to the fourth optical path 228) through which the divided light elements (the first light element 202 to the fourth light element 207) pass is equal to or larger than the coherence length $\Delta L_0$ (or a double value thereof). As a result, the temporal coherence between the individual light elements (the first light element 202 to the fourth light element 207) decreases. Here, the initial light 200 passes through the transparent dielectric layer 288 in the middle of the optical path in which the initial light 200 is reflected. The transparent dielectric layer 288 may be formed on at least one light reflection face 234 with the discontinuous area 94 in the partially discontinuous surface (curved or plane surface) 98 as a boundary. The optical synthesizing area 220 performs intensity summation (light synthesis) of the light elements 202 to 207 having passed through the optical paths 222 to 228 having different optical path lengths.

The transparent dielectric layer 288 is desirably arranged at least:

1) on the wide area light emitting area (or on the multipoint light emitting area) 370 or on the image forming plane 374 thereof (and the near-field area 372 thereof), in a case where the wide area light emitter (or the multipoint light emitter) emits the initial light 200, and
2) at a location capable of wavefront division in the middle of optical path of the initial light 200.

FIG. 58 illustrates an embodiment example of the reflective optical characteristic converting component 196 using the transparent dielectric layer 288. FIGS. 58(*a*) and 58(*b*) each illustrate a cross-sectional shape of the reflective optical characteristic converting component 196. FIG. 58(*b*) illustrates a cross-sectional shape when the section is rotated by 90 degrees with respect to the section of the reflective optical characteristic converting component 196 illustrated in FIG. 58(*a*).

Figure 59:
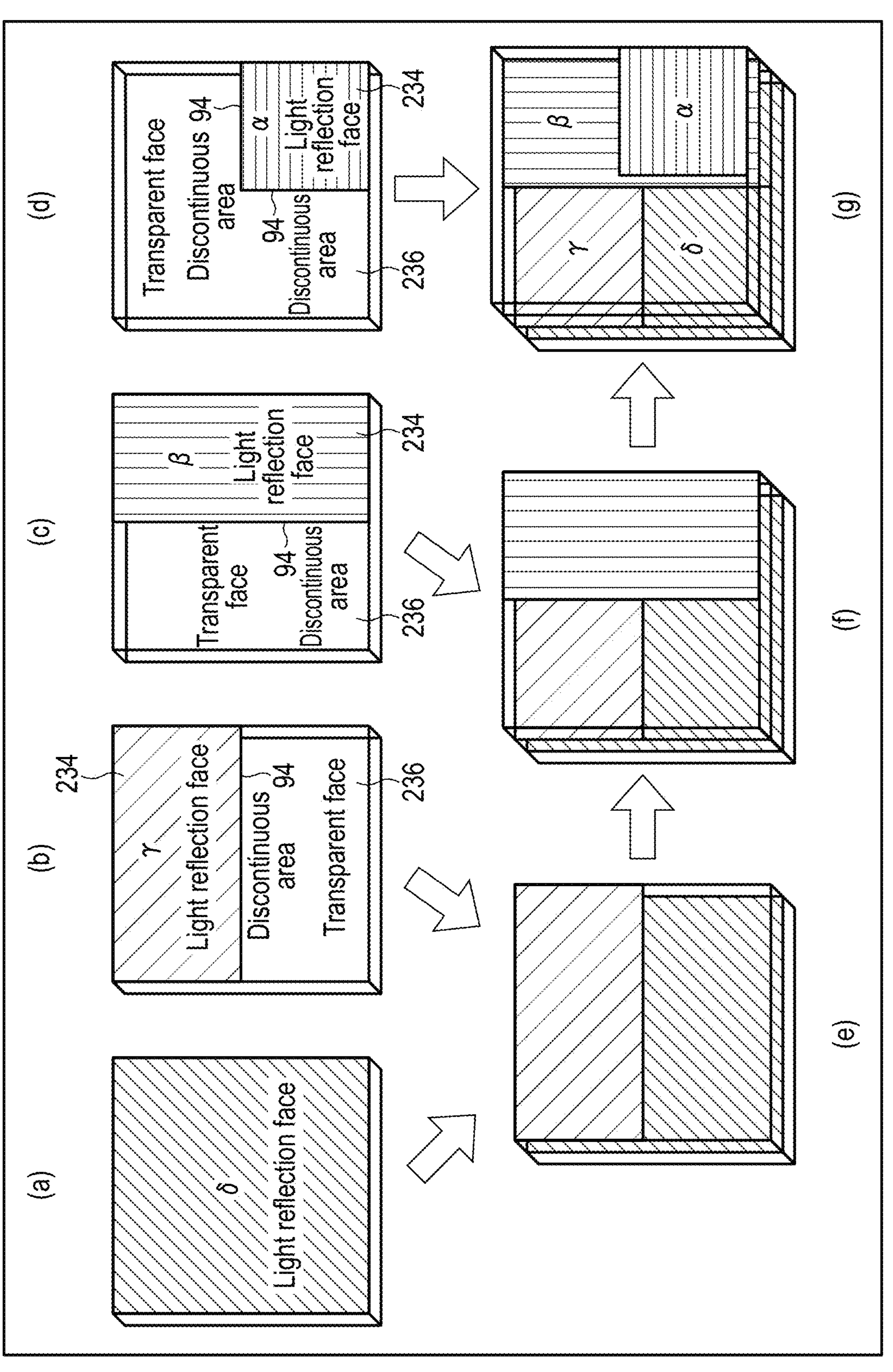
FIG. 59 is an explanatory diagram of an embodiment example related to a method for manufacturing an exemplary reflective optical characteristic converting component.

FIG. 59(*g*) illustrates a shape of the reflective optical characteristic converting component 196 in FIG. 58 as viewed from the incident side of the initial light 200. The reflective optical characteristic converting component 196 divides the initial light 200 into four areas. That is, an α area of the light reflection face 234 corresponds to the first area 212. Similarly, a β area, a γ area, and a δ area of the light reflection face 234 correspond to the second, third, and fourth areas 214 to 218, respectively. The first optical path 222 to the fourth optical path 228 different from each other are formed using the optical path length difference until the light returns after being reflected by the light reflection face 234 installed in each area.

Therefore, the mechanical thickness t between the transparent dielectric layers 288 is set such that the optical path length difference between the optical paths 222 to 228 exceeds the coherence length "Δ Ln" (or a double value thereof). The value of the coherence length "Δ Ln" can be calculated by substituting the values of the wavelength "λn" and the wavelength width "Δλn" of the initial light 200 passing through the transparent dielectric layer 288 into the corresponding parts in Equation 4. Depending on the optical characteristics of the initial light 200, the range of the mechanical thickness t between the transparent dielectric layers 288 is generally 0.05 mm or more and 10 mm or less in many cases. As the transparent dielectric layer 288 suitable for this thickness range, a transparent dielectric plate may be used instead of the coating layer. As an example of a material used for the transparent dielectric plate, for example, a transparent inorganic material such as an optical glass plate or a quartz glass plate may be used. Alternatively, a transparent organic material such as an acrylic plate or a polycarbonate plate may be used.

A light reflection face 234-4 (corresponding to the light reflection face 6 in FIG. 59) arranged on the lowermost side in the reflective optical characteristic converting component 196 illustrated in FIG. 58 exists on the entire surface in the cross section. However, a transparent face 236 always exists in a plane where the other light reflection faces 234-1 to 234-3 (corresponding to the light reflection faces α to γ in FIG. 59) exist. That is, the light reflection face 234 and the transparent face 236 are always mixed on one surface of the transparent dielectric layer 288 formed of the transparent dielectric plate.

As a method for forming the light reflection face 234 and the transparent face 236 in a mixed manner on one surface of the transparent dielectric plate, the light reflection face 234 may be locally formed (using masking or the like) on one surface of the transparent dielectric plate. In the local formation of the light reflection face 234, dimensional accuracy of the discontinuous area 94 (boundary area between the light reflection face 234 and the transparent face 236) is important.

Incidentally, as can be seen from a situation in which 'masking technology is used for highly accurate semiconductor manufacturing', the positional accuracy of the masking is very high. Therefore, in the present embodiment example in which the reflective optical characteristic converting component 196 is produced, high dimensional accuracy of the discontinuous area 94 (boundary area between the light reflection face 234 and the transparent face 236) can be obtained. As a result, the number of divisions of each of the areas 212 to 218 in the reflective optical characteristic converting component 196 can be significantly increased (as compared with the four divisions illustrated in FIGS. 58 and 59). As shown by the data of FIG. 52, speckle noise can be greatly reduced by increasing the number of divisions. Therefore, when the structure of the reflective optical characteristic converting component 196 illustrated in the present embodiment example is used, the number of divisions can be significantly increased, so that an effect of significantly reducing speckle noise is produced.

When a metal material is used as the material of the light reflection face 234, aluminum may be used, or a stacked structure of a gold layer with a chromium layer as a base may be used. Alternatively, an inorganic dielectric such as titanium oxide or silicon oxide may be used as the material of the light reflection face 234. As a method for forming the light reflection face 234, any method such as vacuum deposition, a sputtering method, or an ion plating method may be used.

FIG. 58 illustrates a structure in which a plurality of transparent dielectric plates (transparent dielectric layers 288) in which the light reflection face 234 and the transparent face 236 are formed on the one surface in a mixed manner are stacked. The stacked transparent dielectric plates (transparent dielectric layers 288) are bonded to each other and integrated. For this bonding, a photo-curable adhesive resin or the like may be used.

FIG. 59 illustrates an example of a method for producing the reflective optical characteristic converting component 196 illustrated in FIG. 58. First, a transparent dielectric plate having a thickness t is prepared as the transparent dielectric layer 288. In FIG. 59(*a*), the light reflection face 234 is formed on one front surface of the transparent dielectric plate. A part of the δ area in the light reflection face 234 is used as the fourth area 218.

On the other hand, in FIG. 59(*b*), the light reflection face 234 exists in a partial area in one surface of the transparent dielectric plate. Here, the discontinuous area 94 corresponding to the boundary area between the light reflection face 234 and the transparent face 236 is arranged in a laterally straight line. A part in the light reflection face 234 constitutes the third area 216 as the γ area. Further, in FIG. 59(*c*), the light reflection face 234 exists in a partial area in one surface of the transparent dielectric plate. Here, the discontinuous area 94 corresponding to the boundary area between the light reflection face 234 and the transparent face 236 is arranged in a longitudinally straight line. A part in the light reflection face 234 constitutes the second area 214 as the β area. In FIG. 59(*d*), the light reflection face 234 exists only in a ¼ area in one surface of the transparent dielectric plate. The entire light reflection face 234 constitutes the first area 212 as the α area.

FIG. 59(*e*) illustrates a state in which the plate in FIG. 59(*b*) is stacked on the light reflection face 234 in FIG. 59(*a*) and both are bonded. Further, the plate in FIG. 59(*c*) is stacked thereon and bonded to form the structure of FIG. 58. Further, the plate in FIG. 59(*d*) is stacked thereon and bonded to complete the structure of FIG. 59.

Figure 60:
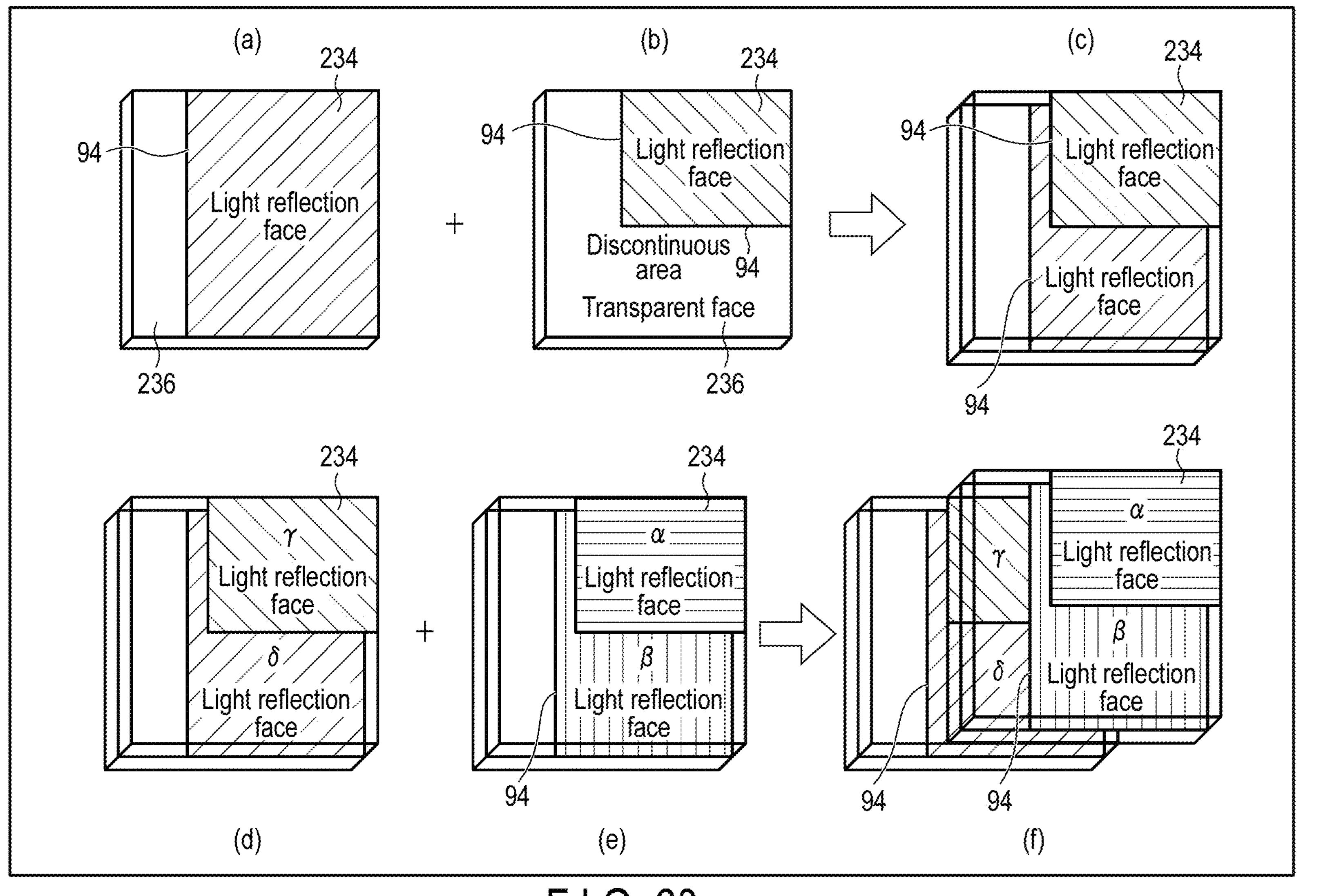
FIG. 60 illustrates another embodiment example related to a method for manufacturing an exemplary reflective optical characteristic converting component.

FIG. 60 illustrates the present embodiment application example related to the structure of the reflective optical characteristic converting component 196. In the embodiment example of FIG. 59, three types of mask patterns are required to form the light reflection face 234. In comparison with this, in the structure of the present embodiment application example illustrated in FIG. 60, the type of mask pattern necessary for forming the light reflection face 234 can be reduced, and the number of divisions can be easily increased. Therefore, when the structure of the present embodiment application example illustrated in FIG. 60 is adopted, there is an effect that the reflective optical characteristic converting component 196 can be produced relatively inexpensively.

In the structure of the present embodiment application example illustrated in FIG. 60, the transparent face 236 is arranged on one surface of all the transparent dielectric plates (transparent dielectric layers 288). The discontinuous area 94 constituting the boundary between the light reflection face 234 and the transparent face 236 is arranged to be connected in the longitudinal direction (or the lateral direction). In the mask pattern forming FIG. 60(*a*), the discontinuous area 94 is arranged in a straight line in the longitudinal direction. In the mask pattern forming FIG. 60(*b*), the discontinuous area 94 is arranged in the longitudinal direction and the lateral direction.

FIG. 60(*c*) illustrates a structure after a plate having the structure in FIG. 60(*b*) is stacked on a plate having the structure in FIG. 60(*a*) and the plates are bonded to each other. A structure illustrated in FIG. 60(*c*) is referred to as a "block", and blocks are stacked/bonded while being shifted from each other to constitute the reflective optical characteristic converting component 196. When the number of blocks constituting the reflective optical characteristic converting component 196 is increased, the number of divisions of the areas 212 to 218 as the reflective optical characteristic converting component 196 can be arbitrarily increased. When the number of divisions increases, speckle noise (optical interference noise amount) decreases.

FIGS. 60(*d*) and 60(*e*) each forms a "block" similar to FIG. 60(*c*). FIG. 60(*f*) illustrates a structure obtained by laminating/bonding FIGS. 60(*d*) and 60(*e*) to be shifted in the direction in which the transparent face 236 exists (direction perpendicular to the direction in which the discontinuous areas 94 commonly existing in the block are connected). The third light element 206 and the fourth light element 207 in the initial light 200 pass through the front transparent face 236 and are reflected by the γ area and the δ area in the light reflection face 234.

In the embodiment examples of FIG. 59(*g*) and FIG. 60(*f*), the area is divided into the four divided areas 212 to 218 of α to δ. However, the present invention is not limited thereto, and the number of divisions of each of the areas 212 to 218 may be arbitrarily increased. As described immediately after Equation 26 is described, when the number of divisions of each of the areas 212 to 218 increases, an effect of reducing the amount of optical interference noise is produced.

Figure 61:
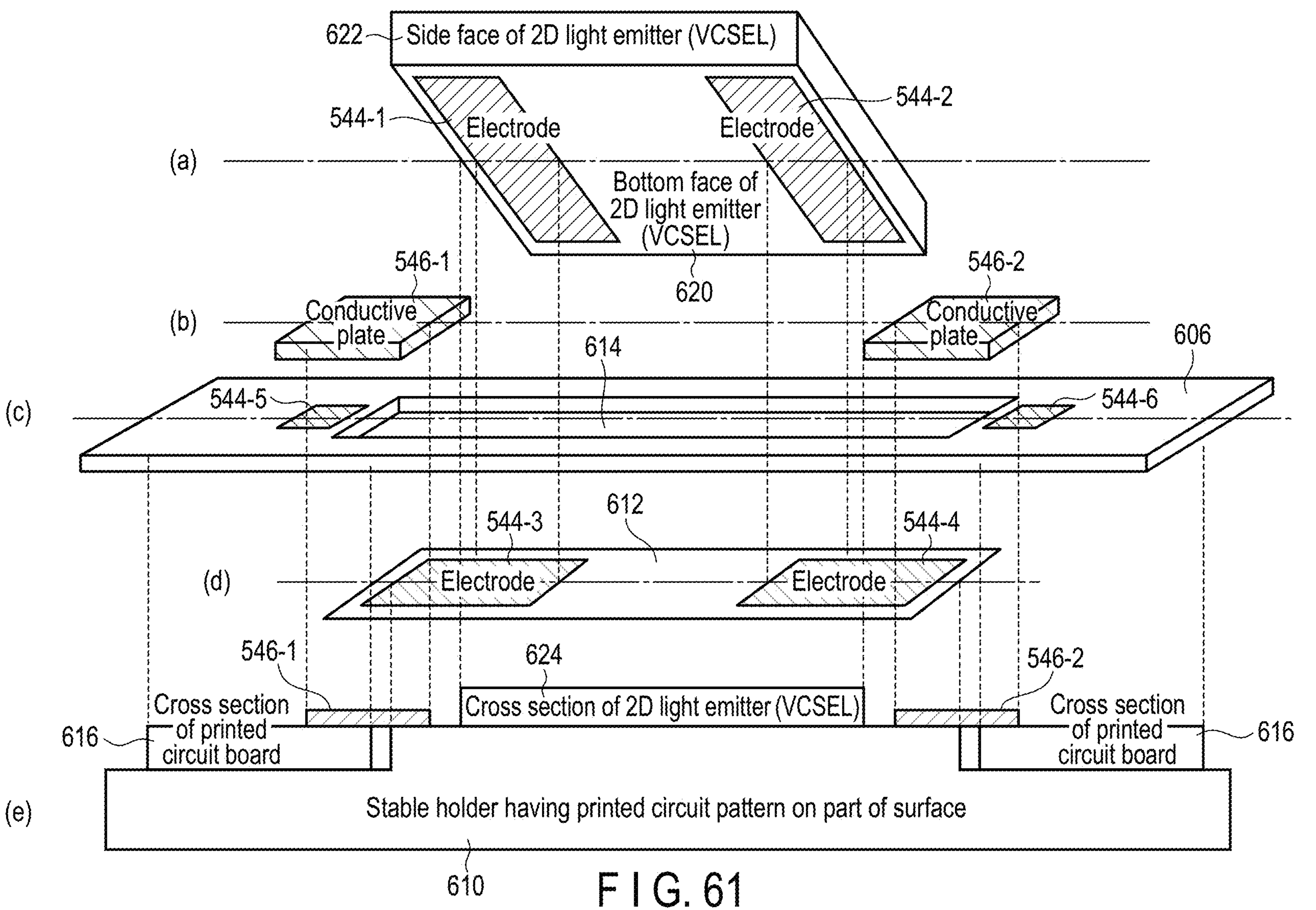
FIG. 61 is an explanatory diagram of an example of a method for fixing a 2D light emitter (VCSEL).
Figure 62:
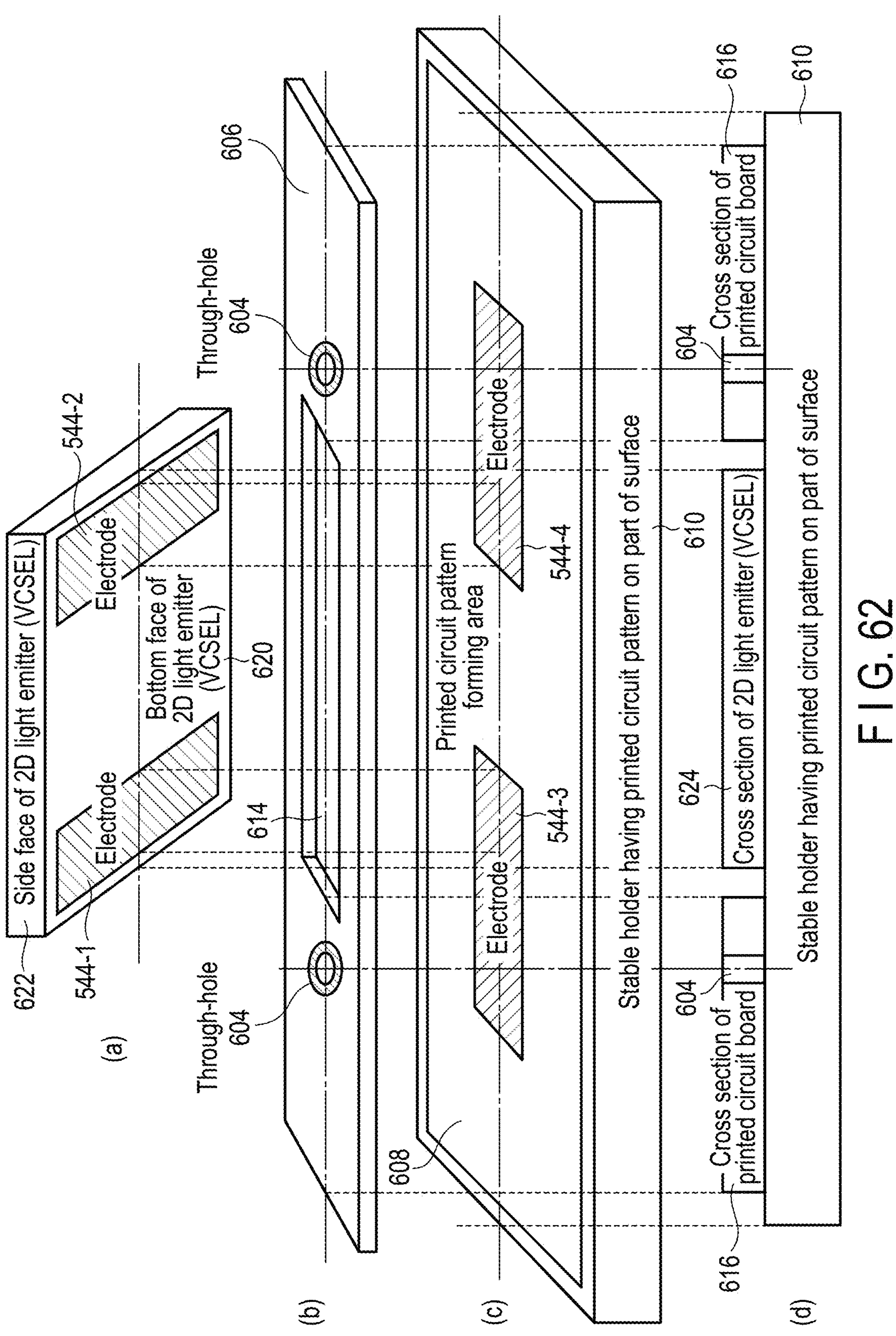
FIG. 62 is an explanatory diagram of an application example of a method for fixing a 2D light emitter (VCSEL).

FIGS. 61 and 62 illustrate the present embodiment example related to a method for fixing the light emitter 470 and a method for connecting the light emitter 470 to a printed circuit board for driving the light emitter. In recent years, with the miniaturization of the printed circuit board, the miniaturization of a package of the light emitter 470 has progressed. As an example of a package structure of the miniaturized light emitter 470, FIG. 61(*a*) and FIG. 62(*a*) illustrate a package of a VCSEL (wide area light emitter, multipoint light emitter, or 2D light emitter) as viewed from below. In FIG. 61(*a*) and FIG. 62(*a*), emitting light 462 from the VCSEL (wide area light emitter or multipoint light emitter) is emitted toward the back side of the paper plane.

An example of dimensions of a bottom face 620 of the 2D light emitter (VCSEL) as viewed from below is as very small as 3 mm in width×2.7 mm in depth. Therefore, only two electrodes 544-1 and 544-2 are arranged on the bottom face 620 of the 2D light emitter (VCSEL).

Such miniaturization makes it difficult to mechanically fix the package of the light emitter 470. Therefore, it is necessary to improve the mechanical strength, moisture absorption resistance, and temperature characteristics of joint portions (to which the electrodes 544-1 and 544-2 are soldered) with respect to the two electrodes 544-1 and 544-2. In a "glass-epoxy substrate" generally used as a material of a printed circuit board, temperature deformation is large (thermal expansion coefficient is high), and swelling due to moisture absorption easily occurs. Furthermore, since the "glass-epoxy substrate" has low thermal conductivity, the heat dissipation effect on the light emitter 470 is low. In addition, in a case where the VCSEL (wide area light emitter, multipoint light emitter, or 2D light emitter) 128 is used as the light emitter 470, as illustrated in FIG. 31, the emission light intensity 338 is significantly reduced with a slight temperature rise (exceeding Tc). Therefore, it is important to take a heat dissipation measure for the VCSEL (wide area light emitter, multipoint light emitter, or 2D light emitter) 128.

In the present embodiment example illustrated in FIG. 61(*a*) and FIG. 62(*a*), a printed circuit pattern 612 is formed directly on a surface of a stable holder 610 with respect to the light emitter 470. Then, electrodes 544-3 and 544-4 are formed in a part in the printed circuit pattern 612 on the surface of the stable holder. The electrodes 544-3 and 544-4 on the printed circuit pattern 612 (the printed circuit pattern forming area 608) and the electrodes 544-1 and 544-2 in the bottom face 620 of the 2D light emitter (VCSEL) are electrically joined by soldering. In addition, the 2D light emitter (VCSEL) is fixed to the stable holder 610 in which the printed circuit pattern is formed on a part of the surface by mechanical bonding between the electrodes 544-1 to 544-4 using soldering.

The material of the stable holder 610 in which the printed circuit pattern is formed on a part of the surface is desirably a material having high thermal conductivity and high shape stability (low thermal conductivity and no swelling due to moisture absorption). As a material that meets the above requirements, an inorganic material is desirable. For example, the stable holder 610 on which the printed circuit pattern is formed may be made of a metal-containing material such as an aluminum plate or a copper plate.

Figure 111:
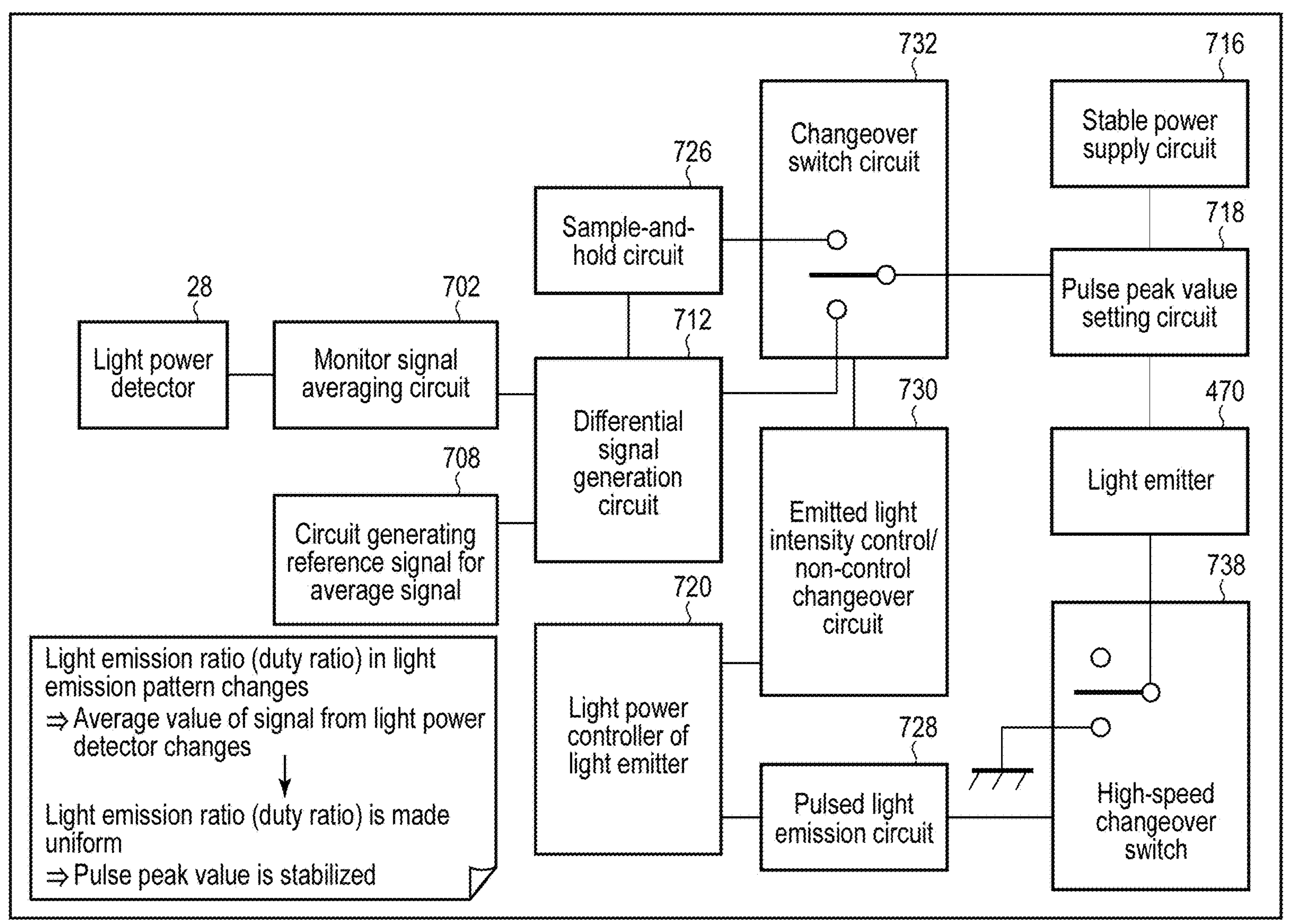
FIG. 111 is an explanatory diagram of an example of a structure of a light impulse control circuit in a light source.

For the light emission of the light emitter 470 (for example, the wide area light emitter, the multipoint light emitter, or the 2D light emitter such as the VCSEL), for example, a drive circuit described later using FIG. 111 is required. As the present embodiment example, the printed circuit pattern for the drive circuit may be formed on the printed circuit pattern 612 on the surface of the stable holder.

In addition, as the present embodiment application example, the above-described drive circuit may be formed on the printed circuit board 606 having a partially lacking area such as a lacking area 614 of the printed circuit board. Then, the package of the miniaturized light emitter 470 (for example, the wide area light emitter, the multipoint light emitter, or the 2D light emitter such as the VCSEL) may be arranged in a partially lacking area in the printed circuit board 606.

In the printed circuit pattern 612 on the surface of the stable holder in FIG. 61(*d*) or the printed circuit pattern forming area in FIG. 62(*c*), there are many “single-layer structures” of the circuit. If this is changed to a “multilayer structure”, an expensive manufacturing cost is required. However, if the “multilayer structure” can be adopted, a drive frequency of the light emitter 470 (for example, the wide area light emitter, the multipoint light emitter, or the 2D light emitter such as the VCSEL) can be increased. In addition, since the printed circuit pattern 612 on the surface of the stable holder in FIG. 61(*d*) or the printed circuit pattern forming area in FIG. 62(*c*) has high thermal conductivity, it takes time and effort to replace a chip resistor and a chip capacitor mounted thereon.

Therefore, if a “mixed material of glass-epoxy resin” is used as the material of the printed circuit board 606 having a partially lacking area such as the lacking area 614 of the printed circuit board as in the present embodiment application example, and a circuit configuration of a “multilayer structure” can be achieved, the drive frequency of the light emitter 470 (for example, the wide area light emitter, the multipoint light emitter, or the 2D light emitter such as the VCSEL) becomes high. Furthermore, since the “mixed material of glass-epoxy resin” has low thermal conductivity, an effect of facilitating replacement of a chip resistor and a chip capacitor mounted by soldering is also produced.

In the present embodiment application example, electrical connection is required between the printed circuit board 606 lacking a portion (center area) and the electrodes 544-1 and 544-2 in the bottom face 620 of the 2D light emitter (VCSEL). As an electrical connection method, in FIG. 61, the conductive plates 546-1 and 546-2 are interposed. In FIG. 62, a through-hole 604 in the printed circuit board 606 lacking a portion (center area) is used.

FIGS. 61(*a*) to 61(*d*) illustrate a stacking procedure between components. FIG. 61(*e*) is a cross-sectional view of the respective components assembled. As illustrated in FIG. 61(*e*), a protrusion structure (step) is provided on a part of a top face of the stable holder 610 in which a printed circuit pattern is formed on a part of a surface. A protrusion flat portion has the printed circuit pattern 612 on the surface of the stable holder illustrated in FIG. 61(*d*).

The printed circuit pattern 612 on the surface of the stable holder has electrodes 544-3 and 544-4. As illustrated in FIG. 61(*a*), the bottom face 620 of the 2D light emitter (VCSEL) has electrodes 544-1 and 544-2. Then, the electrode 544-1 is electrically connected to the electrode 544-3 by soldering. Similarly, the electrode 544-2 is electrically connected to the electrode 544-4 by soldering. By this soldering, the bottom face 620 of the 2D light emitter (VCSEL) is mechanically fixed to the stable holder 610 in which the printed circuit pattern is formed on a part of the surface. When the 2D light emitter (VCSEL) emits the emitting light 462, the 2D light emitter (VCSEL) has a high temperature. The heat generated at this time is dissipated through the stable holder 610 having a high heat dissipation effect. Since the temperature rise of the 2D light emitter (VCSEL) is suppressed, the large emission light intensity 338 (see FIG. 31) can be continuously secured.

The cross section 616 of the printed circuit board in FIG. 61(*e*) is arranged outside the cross section 624 of the 2D light emitter (VCSEL). Moreover, since the cross section 616 of the printed circuit board is close to the cross section 624 of the 2D light emitter (VCSEL), the drive frequency of the 2D light emitter (VCSEL) increases. In order to avoid physical interference (collision) between the 2D light emitter (VCSEL) and the printed circuit board, the printed circuit board 606 has the lacking area 614. In the assembled stage, the 2D light emitter (VCSEL) enters the lacking area 614 of the printed circuit board. In the present embodiment application example, the printed circuit board 606 is not limited to the structure having the lacking area 614, and any method for avoiding physical interference (collision) may be used. For example, a partially lacking area may be provided in a part of the outer side of the printed circuit board 606, and the 2D light emitter (VCSEL) may enter the partially lacking area.

As illustrated in FIG. 61(*c*), the surface of the printed circuit board 606 lacking a portion (center area) has electrodes 544-5 and 544-6. Then, parts of the conductive plates 546-1 and 546-2 in FIG. 61(*b*) are electrically connected to the electrodes 544-5 and 544-6 by soldering. Other parts of the conductive plates 546-1 and 546-2 are electrically connected to the electrodes 544-3 and 544-4 in the printed circuit pattern 612 on the surface of the stable holder by soldering.

Note that the conductive plates 546-1 and 546-2 are made of a material having high electrical conductivity such as a copper plate. In addition, when the thicknesses of the conductive plates 546-1 and 546-2 are sufficiently increased, resistance values in the conductive plates 546-1 and 546-2 can be sufficiently reduced. Therefore, when the structure of FIG. 61 is provided as the present embodiment application example, the drive frequency of the 2D light emitter (VCSEL) can be further increased.

FIGS. 62(*a*) to 62(*c*) illustrate a stacking procedure between components. FIG. 62(*d*) is a cross-sectional view of the respective components assembled. A basic structure is matched with FIG. 61. As illustrated in FIG. 62(*d*), the top face of the stable holder 610 in which the printed circuit pattern is formed on a part of the surface is flattened. The flat top face has a printed circuit pattern forming area 608. The electrodes 544-3 and 544-4 are formed in the printed circuit pattern forming area 608.

The electrodes 544-1 and 544-2 are formed in the bottom face 620 of the 2D light emitter (VCSEL) in FIG. 62(*a*). The electrodes 544-1 and 544-2 are electrically connected to the electrodes 544-3 and 544-4 in the printed circuit pattern forming area 608 by soldering. In addition, the printed circuit board 606 lacking a portion (center area) in FIG. 62(*b*) has a through-hole 604.

As illustrated in FIG. 62(*d*), the printed circuit board 606 lacking a portion (center area) is placed on the printed circuit pattern forming area 608 above the stable holder 610 in which the printed circuit pattern is formed on a part of the surface. When solder flows through the through-hole 604, the solder is electrically connected to the electrodes 544-3 and 544-4.

Figure 63:
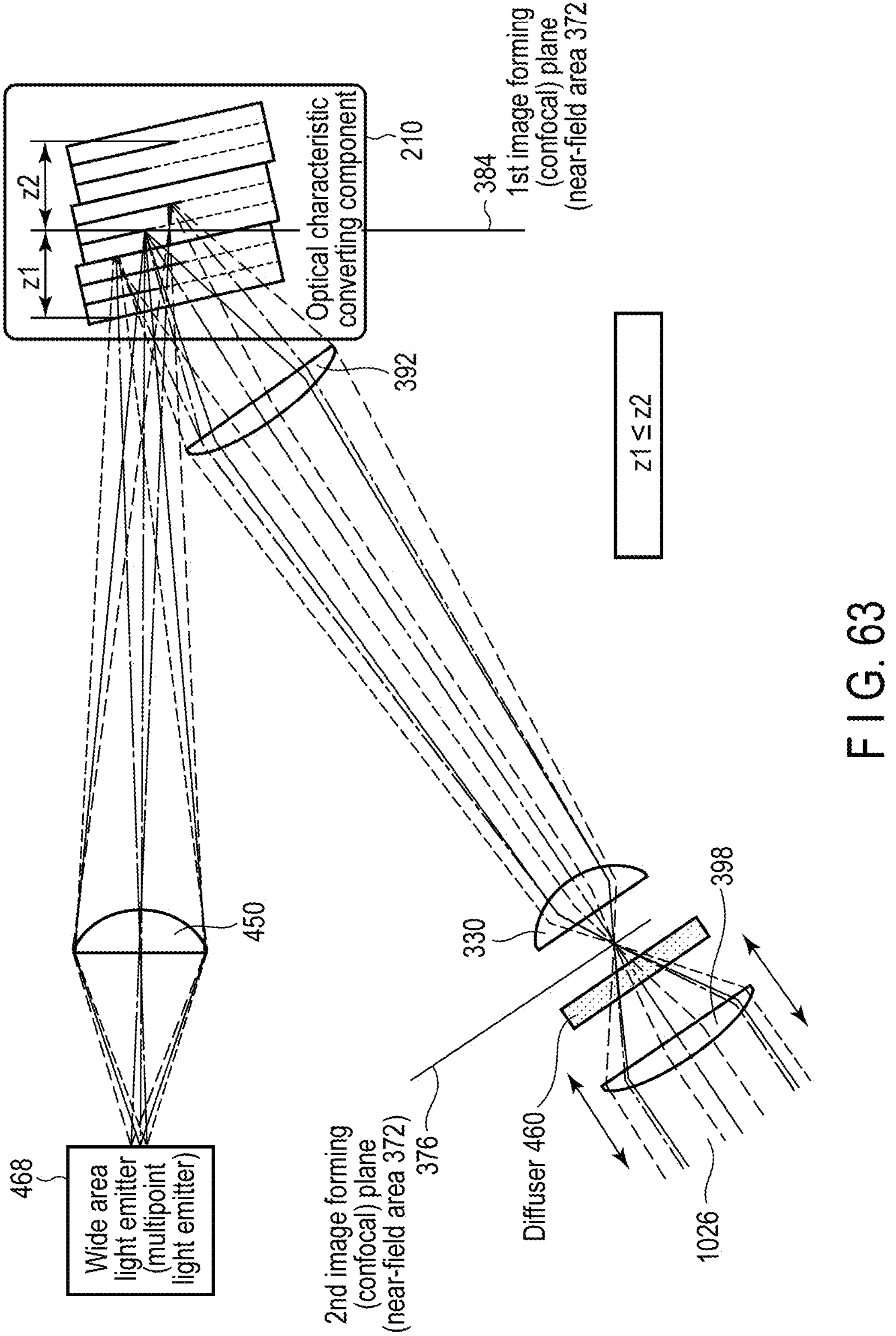
FIG. 63 illustrates an embodiment application example of an optical system in a light source using the reflective optical characteristic converting component.

FIG. 63 illustrates an embodiment example of an optical system in the light source 2. The VCSEL (2D light emitter) 128 included in the wide area light emitter (multipoint light emitter) 488 is used for the light source 2 in FIG. 63. Therefore, the method described with reference to FIG. 61 or FIG. 62 may be used for fixing the wide area light emitter (multipoint light emitter) 488 in FIG. 63.

Further, as the optical characteristic converting component 210 in FIG. 63, the reflective optical characteristic converting component 196 illustrated in FIG. 60 (or FIG. 59) may be used. A portion indicated by a thick solid line on the upper side in the optical characteristic converting component 210 in FIG. 63 indicates the light reflection face 234.

A portion indicated by a thin broken line on the lower side indicates the transparent face 236.

In FIG. 60(*c*), two transparent dielectric plates partially provided with the light reflection face 234 on one surface were stacked to form a "block". On the other hand, in FIG. 63, three transparent dielectric plates partially provided with the light reflection face 234 formed on one surface are stacked and bonded to form a "block". In FIG. 63, three blocks are shifted and stacked and bonded. Here, the three blocks have a structure shifted in a direction perpendicular to the paper plane.

As a result, the optical characteristic converting component 210 in FIG. 63 has a structure in which the initial light 200 is divided into nine. When the light beams reaching all nine areas are illustrated in the drawing, the drawing becomes complicated and difficult to understand. Therefore, the description is simplified, and only light beams reaching three areas (within one block) in the nine areas are illustrated in FIG. 63.

As illustrated in FIG. 21, the VCSEL (2D light emitter) 128 illustrated as an example of the wide area light emitter (multipoint light emitter) 488 has a structure in which a large number of light passing windows 490 (light emission points) corresponding to emitting ports of the emitting light 462 are arranged. In FIG. 63, for simplification of the drawing, only the optical path of the emitting light 462 emitted by the three light passing windows 490 (light emission points) is illustrated.

The image forming lens 450 magnifies and forms the light passing window 490 (light emission point) in the VCSEL (2D light emitter) 128 (wide area light emitter (multipoint light emitter) 488) on the first image forming plane 384 (near-field area 372) for the light emitter. Then, the optical characteristic converting component 210 is arranged at a position of the first image forming plane 384 (near-field area 372) with respect to the light emitter.

A light emitting area in the wide area light emitter (multipoint light emitter) 488 (VCSEL) has a predetermined width (and a predetermined height). Therefore, the light reflected by the light reflection face 234 in the optical characteristic converting component 210 has a divergence characteristic as a whole. A coordinating lens 392 converts a divergent reflected light beam into convergent light or parallel light and advances the convergent light or parallel light to the converging lens 330.

The converging lens 330 forms an image (converges) of the light reflected by the optical characteristic converting component 210 again at a position of the second image forming plane 376 (near-field area 372) with respect to the light emitter. As a result, an array pattern of the light passing windows 490 (light emission points) in the VCSEL (2D light emitter) 128 (wide area light emitter (multipoint light emitter) 488) is formed on the second image forming plane 376 (near-field area 372) for the light emitter.

In the experimental optical system illustrated in FIG. 23, it is confirmed that at least a type of the VCSEL (2D light emitter) 128 (wide area light emitter (multipoint light emitter) 488) has the characteristics of the phase synchronizing type multipoint light emitter. The optical characteristic converting component 210 is arranged in the middle of an optical path (the first image forming plane 384 (or the near-field area 372 thereof)) to the second image forming plane 376 (or the near-field area 372 thereof) with respect to the wide area light emitting area (the multipoint light emitting area) of the wide area light emitter (the multipoint light emitter) 488 having the optical phase synchronizing characteristic. Then, on the second image forming plane 376 (or the near-field area 372 thereof) with respect to the light emitter, the optical phase synchronizing characteristic between the different light emission points (light passing windows 490) disappears (that is, a relation of the unsynchronized optical phase is established). Even when the wide area light emitter (or the 2D light emitter) 468 having the optical phase synchronizing characteristic in the wide area light emitting area is used in addition to the multipoint light emitter such as the VCSEL, the optical phase synchronizing characteristic between the different light emitting areas disappears (that is, a relation of the unsynchronized optical phase is established) on the second image forming plane 376 (or the near-field area 372 thereof) with respect to the light emitter.

On the second image forming plane 376 (or the near-field area 372 thereof) for the light emitter, for example, an array pattern between multiple light emission points (light passing windows 490) in the VCSEL is formed. Then, after the second image forming plane 376 (or the near-field area 372 thereof) for the light emitter, the light from the multiple light emission points (the light passing windows 490) in the second image forming plane 376 becomes divergent light.

Here, depending on the combination characteristics of the image forming lens 450, the coordinating lens 392, and the converging lens 330, the divergence from the multiple light emission points (light passing windows 490) in the second image forming plane 376 may be insufficient. When the divergence from the multiple light emission points (light passing windows 490) in the second image forming plane 376 is insufficient, 'synthesis between the emitting light 462 from the respective multiple light emission points (the respective light passing windows 490) in the second image forming plane 376 is insufficient' occurs at the position where the light passes through the floodlight lens 398. When the synthesis between the emitting light 462 from the multiple light emission points (the light passing windows 490) having a relation of unsynchronized optical phase with each other in the second image forming plane 376 is insufficient, the effect of reducing the optical interference noise is weakened.

In the present embodiment example, the diffuser 460 is arranged behind the second image forming plane 376 (or the near-field area 372 thereof) with respect to the light emitter. The diffuser 460 increases a divergence angle of the "emitting light 462 from each of the multiple light emission points (each of the light passing windows 490) having a relation of unsynchronized optical phase with each other in the second image forming plane 376". As a result, the light passes through the floodlight lens 398 in a state in which "the emitting light 462 from the multiple light emission points (the light passing windows 490) having a relation of unsynchronized optical phase with each other in the second image forming plane 376"" are sufficiently synthesized.

The light after passing through the floodlight lens 398 becomes irradiated light (first light) 12, and irradiates the measured object 22. The form of the irradiated light (first light) 12 irradiating the measured object 22 may form the Koehler illumination system 1026 in a broad sense. Here, the floodlight lens 398 has a mechanism movable in the optical axis direction. When the floodlight lens 398 is moved in the optical axis direction as described above, the spot size with which the measured object 22 is irradiated is arbitrarily changed. Note that an embodiment example of the optical system after the floodlight lens 398 will be described later with reference to FIG. 114.

In a case where the reflective optical characteristic converting component 196 described in FIG. 60 (or FIG. 59) is used as the optical characteristic converting component 210, the optical characteristic converting component has a thickness "Z1+Z2" in a direction along the optical axis. Here, the total thickness in front of the reflective optical characteristic converting component 196 is set to "Z1" with reference to the position of the first image forming plane 384 with respect to the light emitter. Similarly, the total thickness behind the reflective optical characteristic converting component 196 is set to "Z2". In the present embodiment example, the reflective optical characteristic converting component 196 (optical characteristic converting component 210) may be arranged such that "Z1≤Z2" is satisfied.

Figure 64:
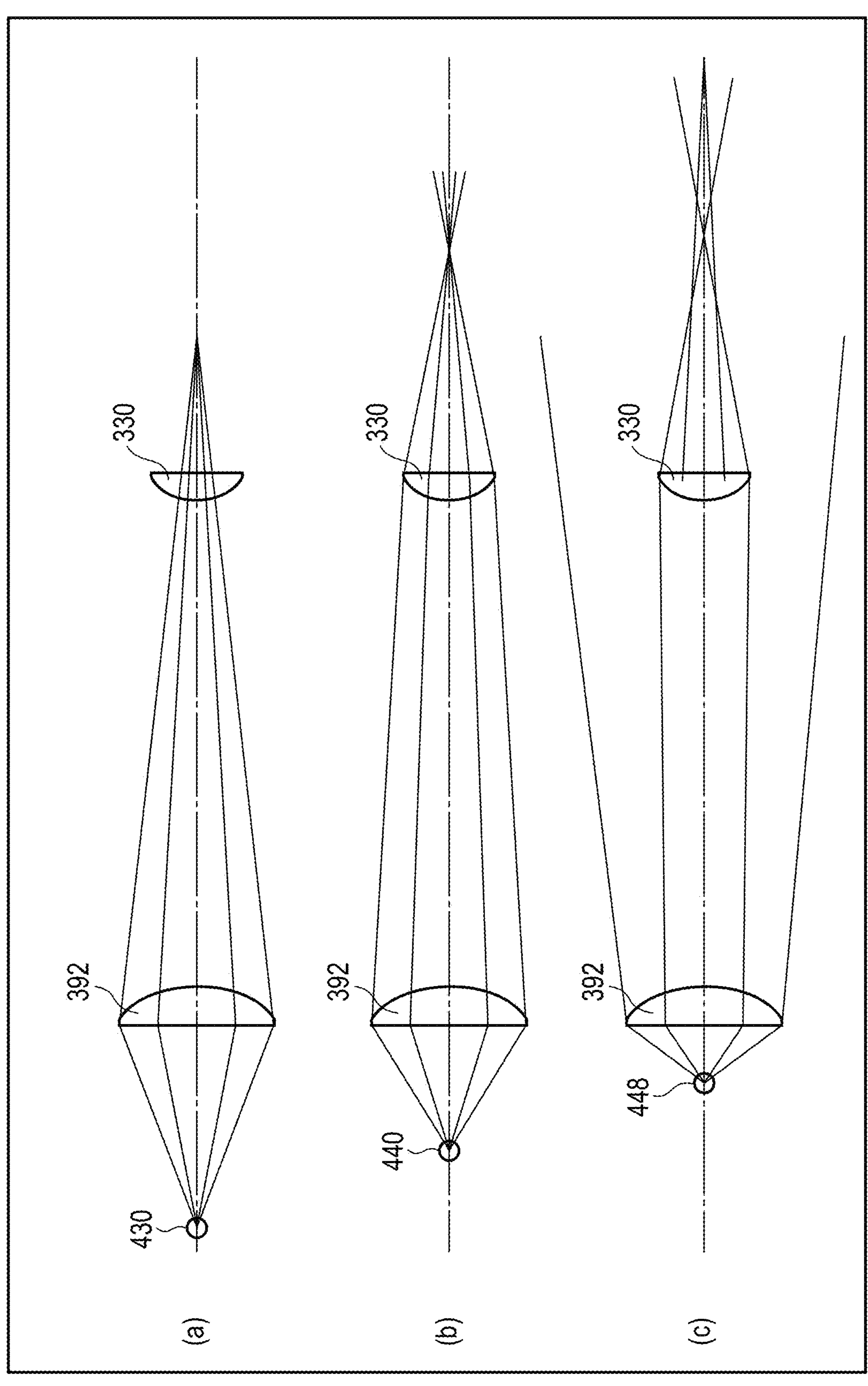
FIG. 64 is an explanatory diagram illustrating an influence of a light reflection location in the optical characteristic converting component on the optical system.

FIG. 64 is a diagram illustrating a difference in optical path after passing through the coordinating lens 392 and the converging lens 330. As illustrated in FIG. 63, when the position of the light reflection face 234 in the optical characteristic converting component 210 (reflective optical characteristic converting component 196) changes, the position of the image formation point viewed from the coordinating lens 392 is shifted.

In FIG. 64, the image formation point position shifted according to the position change of the light reflection face 234 is represented by the light emission points α 430 to γ448 in a pseudo manner. The light emission point β440 in FIG. 64(*b*) is used as a reference. In the case of FIG. 64(*a*) in which the light emission point α 430 is arranged behind the light emission point β440, all light beams having passed through the coordinating lens 392 pass through the converging lens 330. In this case, the aberration in the converging spot by the converging lens 330 is relatively small.

In the case of FIG. 64(*c*) in which the light emission point γ448 is arranged in front of the light emission point β440, a part of the light having passed through the coordinating lens 392 is emitted to the outside of the converging lens 330. In this case, the aberration in the converging spot by the converging lens 330 becomes large. Therefore, when the situation in FIG. 64(*a*) is generated more than the situation in FIG. 64(*c*), good optical characteristics can be obtained as a whole.

For the reason described with reference to FIG. 64, the arrangement of the optical characteristic converting component 210 (reflective optical characteristic converting component 196) is devised so as to satisfy the condition of "Z1≤Z2" in FIG. 63. As a result, the utilization efficiency of light in FIG. 63 is improved, and an effect of improving the converging spot characteristic (aberration characteristic) in the vicinity of the second image forming plane 376 (the near-field area 372 thereof) with respect to the light emitter is produced.

Figure 66:
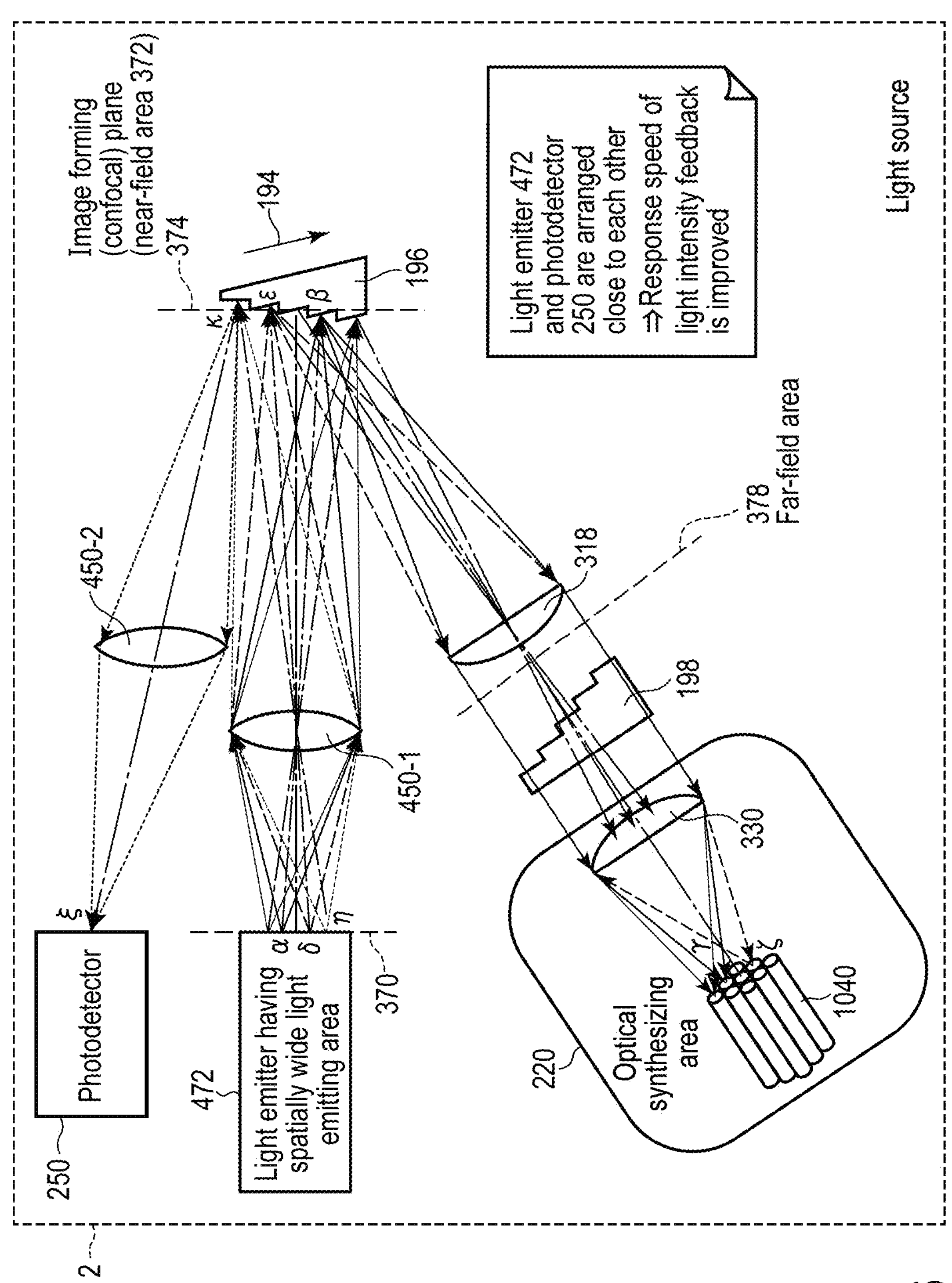
FIG. 66 is an explanatory diagram of another embodiment of a case where optical characteristic converting components are arranged in both the near-field area and the far-field area.

In the embodiment application example illustrated in FIGS. 65 and 66, division of emitting light and generation of an optical path length difference between divided light beams are performed in both the far-field area 378 and the near-field area 372 of the light emitter 472. The emitting light from the light emission point α in the light emitting area (light emitting plane 370) of the light emitter 472 having a spatially wide light emitting area reaches the γ point via the β point. The emitting light from the light emission point δ reaches the ζ point via the ε point. Further, the emitting light from the light emission point η reaches the point in a photodetector 250 via the ζ point in the reflective optical characteristic converting component 196.

The image forming lens 450-1 constitutes an image forming optical system, and generates the image forming plane 374 (near-field area 372) with respect to a light emitting area (light emitting plane 370) of the light emitter 472 having a spatially wide light emitting area. Then, the reflection plane of the reflective optical characteristic converting component 196 is arranged in this area or the vicinity thereof.

An optical path passing through the ε point on the surface of the reflective optical characteristic converting component 196 corresponds to the first optical path 222, and an optical path passing through the β point corresponds to the second optical path 224. The ε point and the β point are arranged on mutually different reflection planes constituting the step on the surface of the reflective optical characteristic converting component 196. As a result, an optical path length difference is generated between the first optical path 222 and the second optical path 224 in or near the near-field area 372.

The transmissive optical characteristic converting component 198 is arranged between the collimator lens 318 and the converging lens 330 constituting the image forming optical system between the surface of the reflective optical characteristic converting component 196 and the incident surface (inlet surface) of the optical fiber (optical bundle fiber 1040). The transmissive optical characteristic converting component 198 is not limited to the structure described with reference to FIGS. 44(*b*) to 47, and may have any shape/structure having functions of light division and optical path length difference generation.

In addition, the transmissive optical characteristic converting component 198 is arranged in the far-field area 378 of the light emitter 472, and forms the third optical path 226 and the fourth optical path 228. The third optical path 226 and the fourth optical path 228 have different thicknesses inside the transmissive optical characteristic converting component 198. As a result, an optical path length difference (the coherence length $\Delta L_0$ or twice or more thereof) occurs between the third optical path 226 and the fourth optical path 228.

The optical pattern observed in the near-field area 372 and the optical pattern observed in the far-field area 378 are in a relation of Fourier transform with each other. Therefore, the light reflected at each of the ε point and the β point in the near-field area 372 spreads and overlaps each other on the far-field area 378 immediately after the collimator lens 318. Therefore, when the transmissive optical characteristic converting component 198 is arranged on the far-field area 378 and division of the wavefront is performed, the light spreading and overlapping each other is divided.

That is, a part of the light reflected at the ε point and a part of the light reflected at the β point in the near-field area 372 pass through the third optical path 226 in the transmissive optical characteristic converting component 198 arranged on the far-field area 378 at the same time. Similarly, another part of the light reflected at the ε point and another part of the light reflected at the β point in the near-field area 372 also pass through the fourth optical path 228 in the transmissive optical characteristic converting component 198 at the same time.

As described above, the division number of the product of the wavefront division number of the reflective optical characteristic converting component 196 arranged in or near the near-field area 372 with respect to the light emitting area (light emitting plane 370) of the light emitter 472 and the wavefront division number of the transmissive optical characteristic converting component 198 arranged in the far-field area 378 is generated in the optical system.

As described above, the effect of reducing the optical interference noise is further improved as the number of divisions of the emitting light (initial light 200) of the light emitter 472 increases. Therefore, when division of emitting light and generation of an optical path length difference between divided light beams are performed in both the far-field area 378 and the near-field area 372 of the light emitter 472 as illustrated in FIGS. 65 and 66, an effect of further improving the effect of reducing the optical interference noise is produced.

In both FIGS. 65 and 66, the intensity of the emitting light from the light emission point η reaching the ξ point in the photodetector 250 is monitored, and the total emitting light intensity from the light emitter 472 is controlled using a control circuit described later with reference to FIG. 111. In the embodiment application example of FIG. 65, the image forming lens 450-2 converges the light passing through the pinhole 310 installed at the ζ point position in the reflective optical characteristic converting component 196 on the ξ point in the photodetector 250.

On the other hand, in the embodiment application example of FIG. 66, the inclination angle of the reflection plane including the ζ point in the reflective optical characteristic converting component 196 is set to a value different from the inclination angle of the reflection plane including the other ε point and β point. As a result, the traveling direction of the emitting light reflected by the reflection plane including the ζ point changes with respect to the traveling direction of the emitting light reflected by the other reflection plane. Then, the image forming lens 450-2 converges the emitting light on the ξ point in the photodetector 250.

As illustrated in the embodiment application example of FIG. 66, when the monitor light is extracted using the light reflection on a part of the reflection plane in the reflective optical characteristic converting component 196, the light emitter 472 and the photodetector 250 can be arranged in a close location. When both can be arranged close to each other, a wire rod connecting both can be shortened. As a result, an effect of improving the response speed of the light intensity feedback is produced.

Figure 67:
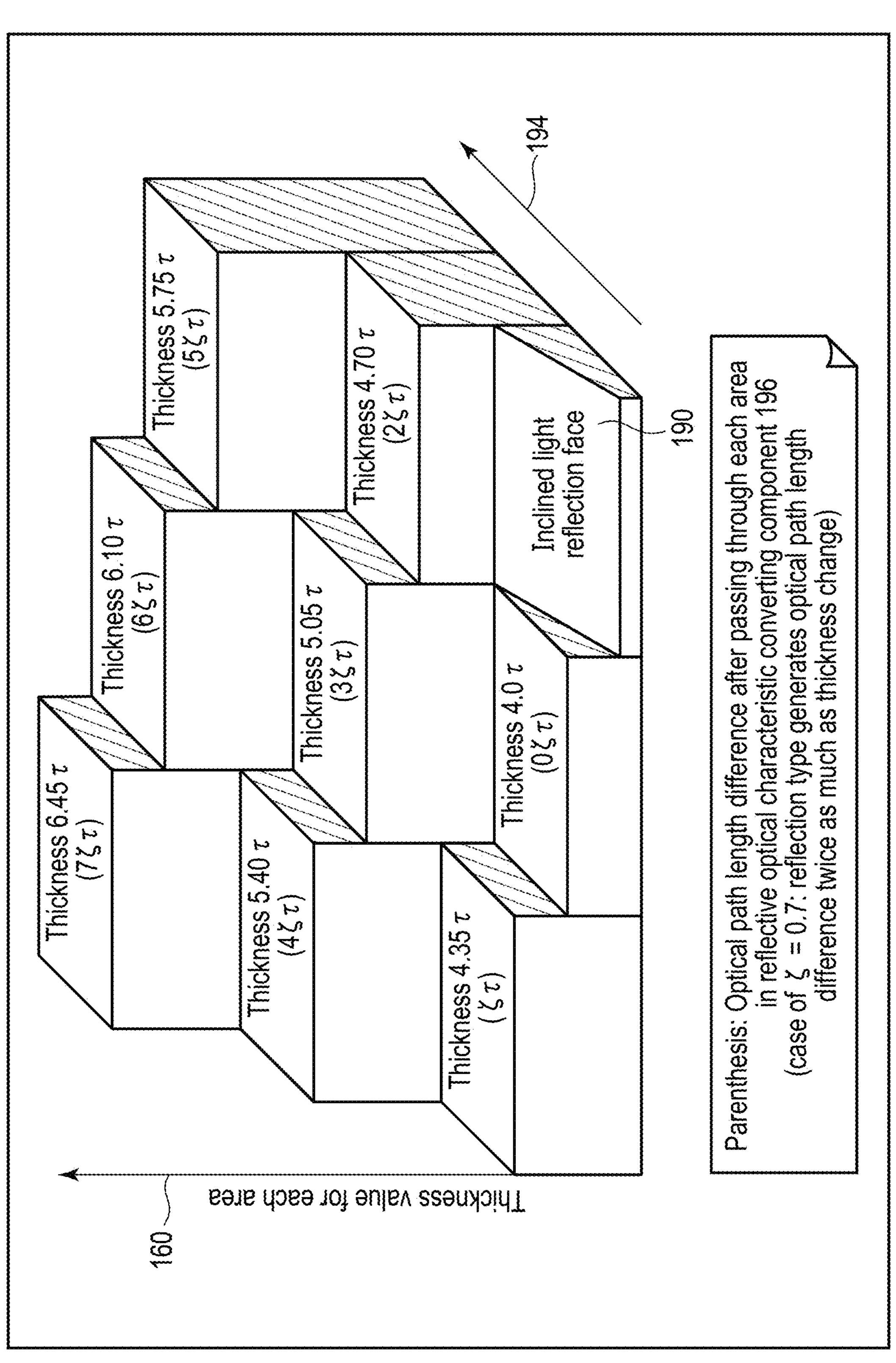
FIG. 67 is an explanatory diagram of a structure example of the reflective optical characteristic converting component arranged in the near-field area.

FIG. 67 illustrates an embodiment example of a reflection face of the reflective optical characteristic converting component 196 used in FIG. 66. The reflection face of the reflective optical characteristic converting component 196 forms a step constituted by a plurality of reflection planes. The emitting light (initial light 200) from the light emitter 472 having a spatially wide light emitting area is incident from above in FIG. 67, and a reflected light beam on each reflection plane returns upward again.

A vertical axis in FIG. 67 indicates an example of a thickness value for each of the areas (corresponding to the first to fourth areas 212 to 218) formed by the same reflection plane. An increase in the thickness value is observed on the back side of the paper plane, and the back side direction of the paper plane is matched with a reflection top face side arrangement direction 194. Here, a variable "τ" represents a reference unit of the thickness value change.

In addition, a parenthesis indicates a value of the optical path length difference generated in the reflected light beam for each reflection plane. This optical path length difference is based on a reflected light beam reflected by a reflection plane having a thickness of "4.0 T" at the front center portion (optical path length difference=0). Here, "ζτ" is a reference unit of the optical path length difference generated between the reflected light beams on the reflection plane. In the embodiment example of FIG. 67, the value of the optical path length difference generated for each reflected light beam on the reflection plane is a positive number multiple of "ζτ".

For example, there is a difference in thickness corresponding to "0.35τ" between the reflection plane having the thickness "4.0 T" at the front center portion and the reflection plane having the thickness "4.35τ" on the left of the reflection plane. Here, when "ζ=0.7" is substituted, the value of the optical path length difference indicated in the parenthesis of the left adjacent reflection plane is "ζτ=0.7τ". The optical path length difference value is twice the thickness difference of "0.35ζ". That is, the optical path length difference generated by the reflective optical characteristic converting component 196 is twice the step (thickness difference) between the reflection planes. When the optical path length difference interval "ζτ" is set to be equal to or larger than the coherence length $\Delta L_0$ (desirably a double value thereof), the unsynchronized optical phase 402 (decrease in temporal coherence) between the reflected light beams on the reflection plane occurs.

In the embodiment example of the reflective optical characteristic converting component 196 illustrated in FIG. 67, eight reflection planes having steps have a parallel relation with each other. Then, only the light reflection face 190 having the right front inclination has a non-parallel relation with the other reflection planes. The light reflection face 190 having the inclination corresponds to a plane including the ζ point in FIG. 66. Then, the image forming lens 450-2 converges the reflected light beam on the light reflection face 190 having the inclination on the ξ point of the photodetector 250.

In a case where the intensity of emitting light from the light emitter 472 is subjected to high-speed modulation control using a circuit described later with reference to FIG. 111 or in a case where the intensity of emitting light is controlled with a narrow pulse waveform, high-speed response characteristics are required for light intensity control. For this high-speed control, it is necessary to reduce the area of a light receiver of the photodetector 250. On the other hand, in a case where the light emitting area (light emitting plane 370) in the light emitter 472 having a spatially wide light emitting area is sufficiently wide, it is difficult to irradiate the light receiver having the small area with emitting light from the entire light emitting area (light emitting plane 370).

In addition, when a partial phase disturbance occurs in the middle of the optical path of the emitting light from the light emitter 472, optical interference noise occurs in the light intensity distribution (pattern in the light cross section) in the far-field area 378 of the light emitter. Therefore, when only a part of the light cross section in the far-field area 378 of the light emitter 472 is detected by the photodetector 250, the detection accuracy of the intensity of emitting light from the light emitter 472 is deteriorated.

Therefore, as illustrated in the present embodiment example, a part of light in the light emitting area (light emitting plane 370) may be extracted in the near-field area 372 of the light emitting area (light emitting plane 370) in the light emitter, and the light receiver of the photodetector 250 having a small area may be arranged on the image forming plane of the extracted light. As a result, it is possible to control the intensity of emitting light from the light emitter 472 at high speed, and it is possible to monitor the emitted light intensity with high accuracy with less optical interference noise.

Furthermore, when a part of the light in the light emitting area (light emitting plane 370) is extracted using a part (inclined light reflection face 190) of the reflective optical characteristic converting component 196 arranged in or near the near-field area 372 of the light emitting area (light emitting plane 370) in the light emitter, an effect of achieving miniaturization, simplification, and cost reduction of the entire optical system is produced.

Figure 68:
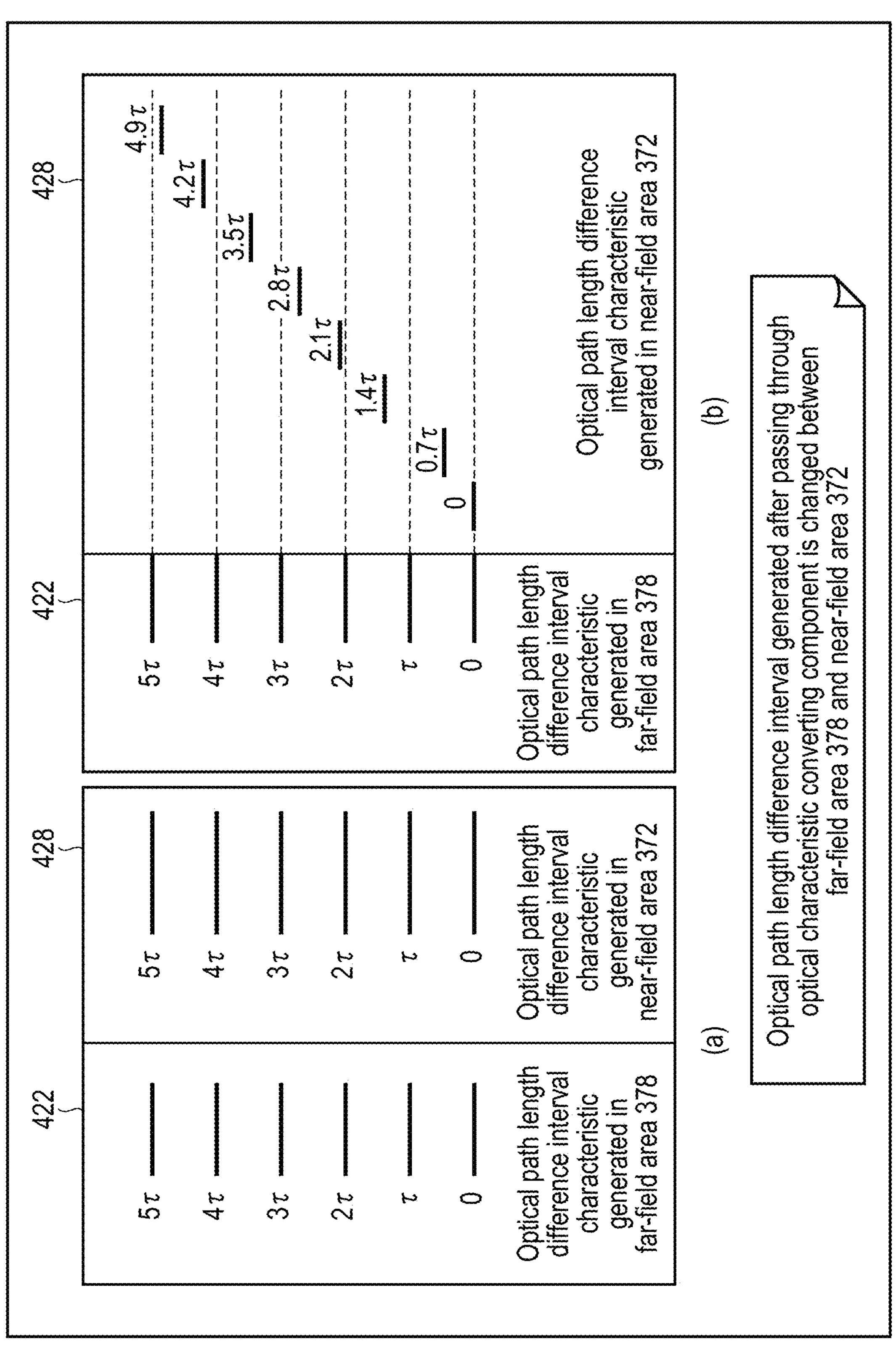
FIG. 68 illustrates a relation between optical path length differences after passing through optical characteristic converting components arranged in the near-field area and the far-field area.

FIG. 68 illustrates a relation between the optical path length difference intervals generated in the far-field area 378 and the near-field area 372 in the present embodiment example. When the optical path length difference interval generated in the far-field area 378 and the optical path length difference interval generated in the near-field area 372 are matched as illustrated in FIG. 68(*a*), there is a risk that the effect of reducing the optical interference noise is deteriorated. Details of the degradation risk of the optical interference noise reduction effect will be described below.

For example, a case where an optical path length difference of "2τ" occurs after reflection on the second optical path 224 with reference to an optical path length difference after reflection on the first optical path 222 in the reflective optical characteristic converting component 196 arranged in or near the near-field area 372 is assumed. Similarly, a case where an optical path length difference of 2τ occurs after transmission through the fourth optical path 228 with reference to the optical path length difference after transmission through the third optical path 226 in the transmissive optical characteristic converting component 198 arranged in the far-field area 378 is assumed.

When a part of the emitting light from the light emitter 472 is reflected by the first optical path 222 and then transmitted through the fourth optical path, the optical path length difference of "2τ" occurs as the entire optical path. When the other part of the emitting light from the light emitter 472 is reflected by the second optical path 224 and then transmitted through the third optical path, the optical path length difference generated in the entire optical path is also "2τ". Then, since the optical path length differences between the two become equal, the two light beams have large temporal coherence.

When the optical path length difference interval generated in the far-field area 378 and the optical path length difference interval generated in the near-field area 372 are matched as illustrated in FIG. 68(*a*), the degradation risk of the optical interference noise reduction effect occurs for the above reason. In the present embodiment example, as illustrated in FIG. 68(*b*), the optical path length difference interval generated in the far-field area 378 and the optical path length difference interval generated in the near-field area 372 may be changed. Then, a total value of the optical path length differences between the reflection paths in the optical paths 222 and 224 in the reflective optical characteristic converting component 196 arranged in or near the near-field area 372 and the transmission paths of the optical paths 226 and 228 in the transmissive optical characteristic converting component 198 arranged in the far-field area 378 is different in all combinations. When the optical path length difference interval generated in the far-field area 378 and the optical path length difference interval generated in the near-field area 372 are changed as described above, an effect of avoiding the degradation risk of the above-described optical interference noise reduction effect is produced.

Here, for ease of explanation, an embodiment example in which the reflective optical characteristic converting component 196 is arranged in or near the near-field area 372 and the transmissive optical characteristic converting component 198 is arranged in the far-field area 378 has been described. However, the present invention is not limited thereto, and the transmissive optical characteristic converting component 198 may be arranged in or near the near-field area 372. In addition, the reflective optical characteristic converting component 196 may be arranged in the far-field area 378.

In addition, the embodiment example of FIG. 68(*b*) illustrates an example in which a basic unit of the optical path length difference interval generated in the far-field area 378 is set to "τ", and a reference unit of the optical path length difference interval generated in or near the near-field area 372 is set to "0.7τ". However, the present invention is not limited thereto, and the size of the reference unit may be reversed, or the reference unit of the other interval may be set to an arbitrary value other than "τ".

Figure 69:
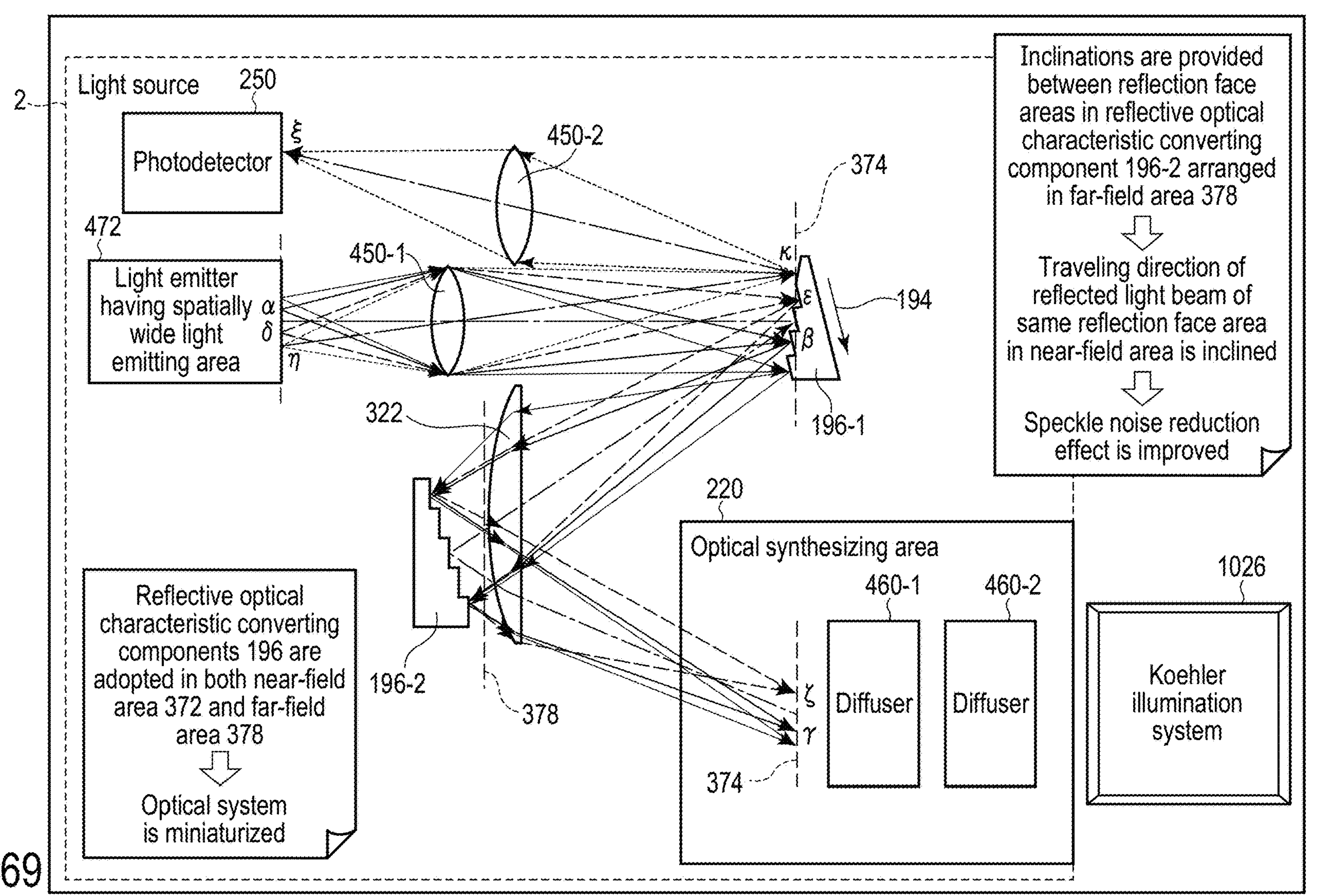
FIG. 69 is an explanatory diagram of another embodiment of a case where optical characteristic converting components are arranged in both the near-field area and the far-field area.

FIG. 69 illustrates another embodiment application example in which the reflective optical characteristic converting component 196 is arranged in both the far-field area 378 and the near-field area 372 of the light emitter 472. An optical system from the light emitter 472 having a spatially wide light emitting area in FIG. 69 to the reflective optical characteristic converting component 196-1 and the photodetector 250 is matched with that in FIG. 66.

In FIG. 69, the transmissive optical characteristic converting component 198 used in FIG. 66 is replaced with a reflective optical characteristic converting component 196-2. Accordingly, the functions of the collimator lens 318 and the converging lens 330 in FIG. 66 are provided to one collimator lens or an Fθ lens 322. That is, the emitting light reflected by the surface of the reflective optical characteristic converting component 196-1 passes through the collimator lens or the Fθ lens 322, and passes through the collimator lens or the Fθ lens 322 again after being reflected by the surface of the reflective optical characteristic converting component 196-2.

The reflection face of the reflective optical characteristic converting component 196-1 is arranged on the image forming plane 374 (near-field area 372 or the vicinity thereof) with respect to the light emitting area (light emitting plane 370) in the light emitter 472 having a spatially wide light emitting area by the action of the image forming lens 450-1. Therefore, immediately after the collimator lens or the Fθ lens 322, the far-field area 378 of the light emitter is formed. Therefore, the reflection face of the reflective optical characteristic converting component 196-2 arranged immediately after the collimator lens or the Fθ lens 322 is located in the far-field area 378 of the light emitter.

As described above, the optical path length difference δ generated at the step t between the planes that perform the wavefront division of the emitting light (initial light 200) is about 4 times larger in the reflection type ($\delta=2t$) than in the transmission type ($\delta=t(n-1)\approx t/2$). Therefore, when the optical characteristic converting component 196 is used in both the near-field area 372 or the vicinity thereof and the far-field area 378, an effect of miniaturizing and simplifying the optical system is produced.

As the reflection face of the reflective optical characteristic converting component 196-2 arranged in the far-field area 378 of the light emitter, an arbitrary shape can be taken as long as wavefront division of the emitting light (initial light 200) or generation of the optical path length difference (equal to or larger than the coherence length $\Delta L_0$) between the divided light beams can be realized. As a specific condition thereof, it is desirable to include a light reflection plane or a light reflection curved surface having a step. As a further specific example, the shapes in FIG. 44(*b*), FIGS. 45 to 47, and FIG. 67 may be used. In addition, the wavefront division direction of the emitting light (initial light 200) may be the angular division or the radial division illustrated in FIGS. 44(*b*) and 45 to 47, or the division in two orthogonal axial directions illustrated in FIG. 67. Alternatively, wavefront division or amplitude division (intensity division) in an arbitrary direction may be adopted.

Furthermore, inclination angles different from each other may be individually provided between the reflection faces divided in the reflective optical characteristic converting component 196-2 arranged in the far-field area 378 of the light emitter. When the reflection faces divided in the reflective optical characteristic converting component 196-2 are inclined at the inclination angles different from each other, the traveling directions of the individual reflected light beams of the respective reflection faces are inclined from each other. Since the individual reflected light beams on the different reflection faces divided in the reflective optical characteristic converting component 196-2 have characteristics of the unsynchronized optical phase 402, temporal coherence is low. When the measured object 22 is irradiated with the light elements (the third light element 206 and the fourth light element 207) having the low temporal coherence while the traveling directions of the light elements are inclined to each other, the speckle noise pattern is averaged (smoothed or canceled) (see the description using FIG. 48).

This situation will be specifically described with reference to FIG. 69. The emitting light from the light emission point α in the light emitting area (light emitting plane 370) of the light emitter 472 having a spatially wide light emitting area is reflected at the β point, and then converged at the γ point on the image forming plane 374 (near-field area 372) of the light emitter. Here, the cross section of the light reflected from the converging point β greatly spreads immediately after the collimator lens or the Fθ lens 322 (the far-field area 378 of the light emitter). As a result, the light reflected by the converging point β is simultaneously applied to a plurality of mutually inclined reflection planes on the surface of the reflective optical characteristic converting component 196-2. Therefore, the γ point on the image forming plane 374 (near-field area 372) is separated into a plurality of converging points.

For each light (the third light element 206 and the fourth light element 207) that has passed through the converging points separated at the γ position, the traveling directions are inclined to each other even after passing through the Koehler illumination system 1026. Note that, in the present embodiment application example illustrated in FIG. 69, two diffusers 460-1 and 460-2 are arranged in the optical synthesizing area 220, and the light (the third light element 206 and the fourth light element 207) having passed through the converging points separated at the γ position is synthesized. Further, when the optical paths of the two diffusers 460-1 and 460-2 are diffused for each passing location, an effect of reducing spatial coherence is produced.

When the reflection faces divided in the reflective optical characteristic converting component 196-2 arranged in the far-field area 378 are inclined with respect to each other as described above, a speckle noise reduction effect is produced. Alternatively, in the present embodiment application example, there may be an inclination between the divided reflection faces in the reflective optical characteristic converting component 196-1 arranged in the near-field area 372 or the vicinity thereof.

As a specific example of the above, between the reflection planes in the reflective optical characteristic converting component 196-1 arranged in the near-field area 372 or the vicinity thereof, for example, a state in which the reflection plane including the ε point (second area 214) and the reflection plane including the β point (first area 212) are slightly inclined with respect to each other is assumed. Then, the traveling direction is different between the light (second light element 204) after passing through the ζ point and the light (first light element 202) after passing through the γ point on the image forming plane 374 of the light emitter. As a result, as described with reference to FIG. 48, a canceling effect (averaging or smoothing) occurs between the speckle noise pattern generated by the first light element 202 and the speckle noise pattern generated by the second light element 204. As described above, in the present embodiment application example, the reflection planes in the reflective optical characteristic converting component 196-1 arranged in the near-field area 372 or the vicinity thereof may be further inclined. As a result, the light traveling directions are inclined to each other between the reflected light beams reflected for the respective reflection planes, and the effect of reducing the speckle noise is further improved.

Chapter 6: Example of 3D imaging using optical interference in present embodiment In Chapters 2 to 5, the method for generating light beams by summating intensities of the light beams with reduced temporal coherence and the mechanism for realizing the method have been mainly described. In the following description, an application method using light generated by the above method (for example, a light measurement method and a service providing method utilizing measurement information obtained therefrom) will be mainly described. That is, in Chapters 3 to 5, the description mainly focuses on the method for reducing the optical interference noise. Unlike the above, in Chapter 6, an application example to 3D imaging technology using an optical interference characteristic generated in one wave train including a plurality of different wavelength light beams described in Chapter 2 will be described. Note that, in the optical application field 100 illustrated in FIG. 6 and FIG. 7, the present embodiment example described in Chapter 6 can be classified into 'imaging utilizing optical interference phenomenon'.

As technology for acquiring a 3D tomographic image using optical interference, technology for optical computer tomography (OCT) is known. This is that, among the detection light (second light) 16 obtained from the measured object 22, the tomographic image in the measured object 22 having the same optical path length as that of the reference light prepared in advance is extracted. However, this technology can be applied only in a state where the distance between the optical device 10 that performs measurement and the measured object 22 is short. The reason is that, as the distance between the optical device 10 and the measured object 22 increases, it is necessary to increase the optical path of the reference light in the optical device 10. Therefore, currently, it is desired to provide technology capable of performing 3D imaging on the measured object 22 at a position sufficiently away from the optical device 10.

The present embodiment example described in Chapters 3 to 5 contributes to reduction of optical interference noise unintentionally mixed in the middle of the optical path of the detection light 16 from the irradiated light (first light) 12. Therefore, even when the present embodiment example described in Chapters 3 to 5 is executed, the interference phenomenon intentionally generated in the optical device 10 is not inhibited. Conversely, since the optical interference noise is reduced, the interference phenomenon intentionally generated in the optical device 10 can be more clearly observed.

The reason why the optical interference phenomenon intentionally generated by the user can be observed although the optical interference noise is reduced will be described. For example, when the optical characteristic converting component 210 in FIG. 44(*b*) is used, each of the divided elements (the first to fourth light elements 202 to 207 after each division) has high coherence. The optical system in which the user intentionally causes the optical interference phenomenon gives the same interference occurrence condition to all the elements (all the first to fourth light elements 202 to 207). As a result, a common interference phenomenon occurs for each of the divided elements (the first to fourth light elements 202 to 207 after each division), so that the common interference phenomenon does not disappear even if intensities of all the elements are summated.

In the experimental data illustrated in FIG. 19 as the above example, clear interference fringes are observed. As illustrated in FIG. 17, the optical characteristic converting component 210 is used in the experimental optical system used in this experiment. Furthermore, a detailed interference characteristic at a measurement wavelength of 1.4 μm or less can be observed by the optical interference noise reduction effect by the optical characteristic converting component 210.

In FIGS. 70 to 74 used in the description of Chapter 6, the optical system of only the measured object 22 and the subsequent parts will be described. Therefore, in the light source 2 that generates the irradiated light (first light) 12 used for irradiation of the measured object 22, the present embodiment example described in Chapters 3 to 5 may be used.

A difference of the embodiment example described in Chapter 6 from the conventional OCT technology is a method for extracting reference light for causing optical interference. In the conventional OCT technology, the reference light is uniquely generated in the optical device 10. In comparison with this, in the embodiment example described below, the reference light is extracted from the detection light (second light) 16 obtained from the measured object 22. Further, only a part of the detection light (second light) 16 obtained from a specific point on the surface of the measured object 22 may be extracted as the reference light. When the reference light is extracted from the detection light (second light) 16 obtained from the measured object 22 as described above, an effect that an uneven shape of the surface of the measured object 22 can be measured in detail is produced even if the distance between the measured object 22 and the measurer 8 (or the optical device 10) greatly changes.

Further, in the embodiment example described in Chapter 6, the optical path length difference between the two optical paths is changed while a two-dimensional image (still image or moving image) is acquired at a time using the imaging sensor 300. Therefore, an effect of enabling 3D imaging at high speed is also produced.

Figure 70:
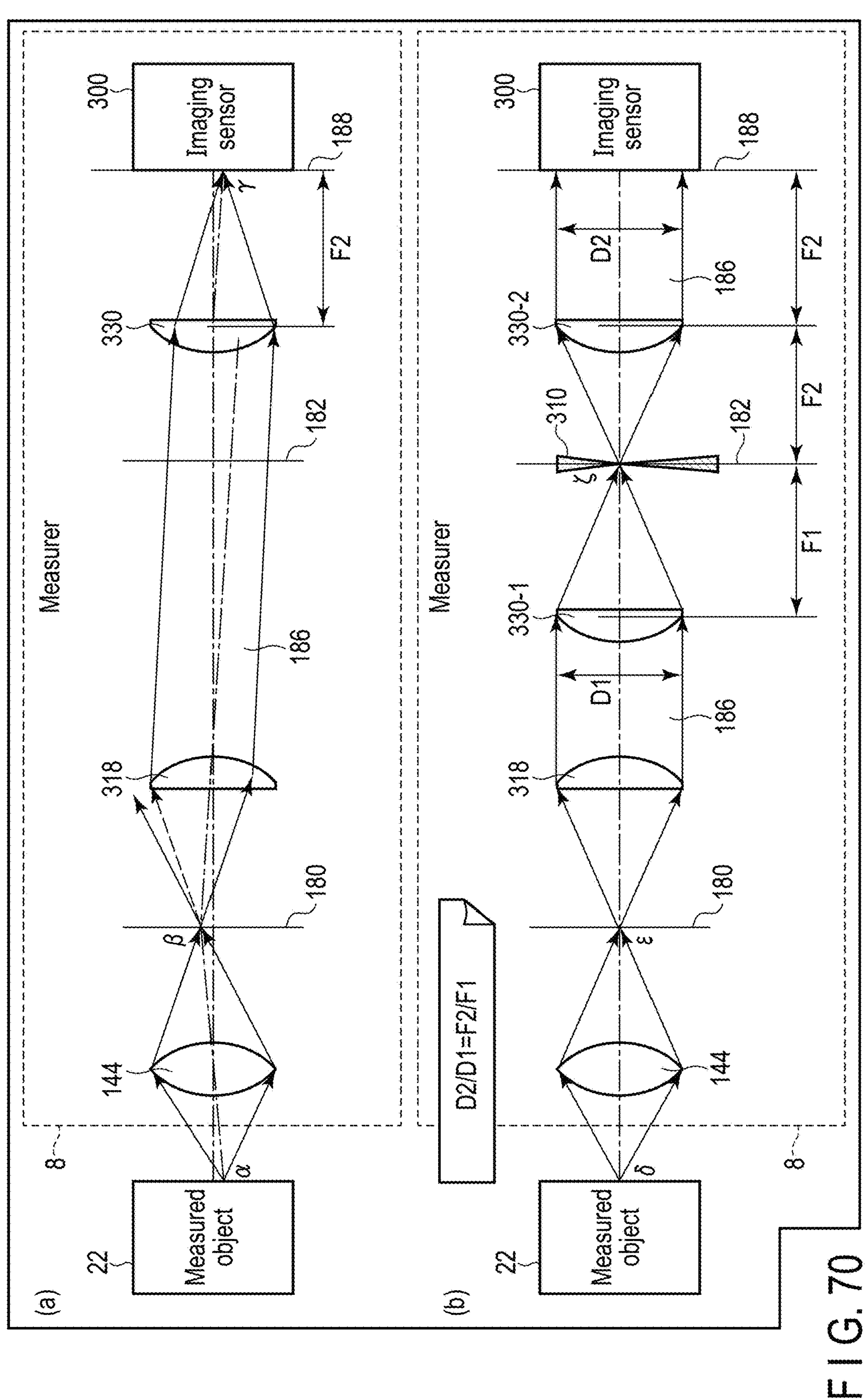
FIG. 70 is an explanatory diagram of a basic principle in imaging using an optical interference phenomenon performed in the present embodiment.

FIG. 70 illustrates a principle of a method for extracting only a part of detection light (second light) 16 obtained from a specific point on a surface of the measured object 22 as reference light. FIG. 70(*a*) illustrates an optical path of the detection light (second light) 16 used for measuring an uneven shape in a wide area on the surface of the measured object 22. Here, the light irregularly reflected at the α point on the surface of the measured object 22 forms an image at the γ point in the imaging plane in the imaging sensor 300.

FIG. 70(*b*) illustrates an optical system that extracts the detection light (second light) 16 irregularly reflected at a specific δ point on the surface of the measured object 22 as reference light. For simplification of description, in FIG. 70(*b*), the detection light (second light) 16 irregularly reflected at the δ point on the optical axis is used as the reference light. However, the present invention is not limited thereto, and the detection light (second light) 16 irregularly reflected at an arbitrary point on the surface of the measured object 22 may be extracted as the reference light in the present embodiment example. In this case, the ζ point of the light passing point in the pinhole 310 is aligned with a corresponding position on the image forming plane with respect to an arbitrary point on the surface of the measured object 22 used as the reference light.

Only a portion of a parallel light path 186 immediately after the collimator lens 318 in FIG. 70(*a*) and a portion where the front converging lens 330-1 and the pinhole 310 are arranged in FIG. 70(*b*) pass through different optical paths. The other optical paths are commonly used between FIGS. 70(*a*) and 70(*b*).

The parallel light path 186 is provided immediately after the collimator lens 318 so that the optical path length from the surface of the measured object 22 to the imaging sensor 300 can be matched and adjusted between FIGS. 70(*a*) and 70(*b*). In addition, here, the distance between the measured object 22 and the measurer 8 has a degree of freedom. If the light irregularly reflected on the surface of the measured object 22 is directly transmitted through the collimator lens 318, the light immediately after the collimator lens 318 becomes non-parallel light when the distance between the measured object 22 and the measurer 8 is sufficiently large.

Therefore, in the present embodiment example, the image forming lens 144 is arranged at the inlet of the measurer 8, and the α point and the δ point on the surface of the measured object 22 are imaged on the image forming plane 180. Although not illustrated, another imaging sensor may be arranged on the image forming plane 180, and the position of the image forming lens 144 may be adjusted while observing the imaging pattern here. Alternatively, the distance to the measured object 22 may be measured using a TOF camera to be described later, and the position of the image forming lens 144 may be set in accordance with the measured distance. When the image forming lens 144 is arranged at the inlet of the measurer 8 as described above, there is an effect that the fine uneven shape of the surface of the measured object 22 placed at an arbitrary position (even if the image forming lens is placed sufficiently far) can be measured.

In FIG. 70(*a*), the converging lens 330 is arranged in the middle of the parallel light path 186 immediately after the collimator lens 318 to form an image at the γ point on the imaging plane of the imaging sensor 300. Here, when the distance of the α point on the surface of the measured object 22 from the optical axis increases, the distance of the γ point on the imaging plane of the imaging sensor 300 from the optical axis also increases. Therefore, measurement over a relatively wide area is required on the imaging plane of the imaging sensor 300.

The converging lens 330 in FIG. 70(*a*) includes two converging lenses 330-1 and 330-2 in FIG. 70(*b*). Here, the converging lens 330 in FIG. 70(*a*) and the rear converging lens 330-2 in FIG. 70(*b*) are shared. The front converging lens 330-1 converges the light in the parallel light path 186 immediately after the collimator lens 318. The converging position at this time is matched with a front focal plane 182 of the rear converging lens 330-2. Then, the light having passed through the rear converging lens 330-2 passes through the parallel light path 186.

A diameter of a light cross section in the parallel light path 186 immediately after the collimator lens 318 is defined as D1, and a diameter of a light cross section in the parallel light path 186 after passing through the rear converging lens 330-2 is defined as D2. The focal length of the front converging lens 330-1 is defined as F1, and the focal length of the rear converging lens 330-2 is defined as F2. Then, a relation of D2/D1=F1/F2 is established between the diameters of the light cross sections. Therefore, when the focal lengths F1 and F2 of the front and rear converging lenses 330-1 and 330-2 are changed, the diameter D2 of the light cross section of the parallel light with which the imaging plane of the imaging sensor 300 is irradiated can be arbitrarily changed. When the value of D2 is optimized in accordance with the maximum distance from the optical axis of the γ point converged on the imaging plane of the imaging sensor 300 in FIG. 70(*a*), the light passing through the optical path in FIG. 70(*a*) and the light passing through the optical path in FIG. 70(*b*) overlap each other on the imaging plane of the imaging sensor 300.

In addition, when the length of the parallel light path 186 immediately after the collimator lens 318 is changed between FIGS. 70(*a*) and 70(*b*), interference fringes appear when the optical path length from the α point on the surface of the measured object 22 to the γ point on the imaging sensor 300 is matched with the optical path length from the δ point on the surface of the measured object 22 to the imaging plane on the imaging sensor 300. As described with reference to FIG. 18, the interference fringes appear in a range in which the absolute value of the optical path length difference between the two is equal to or less than the double value $2\Delta L_0$ of the coherence length. In general, since the coherence length $\Delta L_0$ is sufficiently small, it is possible to perform highly accurate length measurement by measuring a position where the interference fringes appear between the two.

In FIG. 70(*b*), the pinhole 310 is arranged on the front focal plane 182 of the rear converging lens 330-2. The light passing point (in the pinhole 310 is in an image forming relation with the δ point on the surface of the measured object 22. Therefore, if the position of the light passing point (in the pinhole 310 is adjusted, the light irregularly reflected at an arbitrary point on the surface of the measured object 22 can be used as the reference light.

FIG. 71 illustrates an arrangement between optical components in the measurer 8 as an optical implementation example for realizing the principle described in FIG. 70. A path from the measured object 22 to the converging lens 330-2 via a pentaprism 316-2 on the lower right side in FIG. 71 corresponds to an optical path in FIG. 70(*a*). In addition, a path from the measured object 22 to the converging lens 330-2 via a pentaprism 316-1 on the upper left side in FIG. 71 corresponds to an optical path in FIG. 70(*b*).

As a mechanism for changing the optical path length between FIGS. 70(*a*) and 70(*b*), a moving mechanism 290 of the pentaprism 316-2 drawn at the lower right of FIG. 71 is provided. When the moving mechanism 290 is operated to move the pentaprism 316-2 in an arrow direction in FIG. 71, the optical path length in the path from the collimator lens 318 to the converging lens 330-2 via the pentaprism 316-2 on the lower right side changes.

The interference optical system is greatly affected by slight position shifting and angle changing of each optical component constituting the interference optical system. In consideration of this, in the present embodiment example illustrated in FIG. 71, special optical components of a prescribed half-mirror component 312 and the pentaprisms 316-1 and 316-2, which are hardly affected by the inclination of the single optical component, are used. Since light is reflected twice in the pentaprisms 316-1 and 316-2, an angle between the incident light beam and the outgoing light beam does not change even if the pentaprisms 316-1 and 316-2 are inclined. In the prescribed half-mirror component 312, only a parallel plate passing-through optical path and a two-reflection optical path are formed.

That is, in the optical path passing through the pentaprism 316-2 on the lower right side, the optical path passes through a lower portion in the prescribed half-mirror component 312 and reaches the pentaprism 316-2 on the lower right side. The lower portion in the prescribed half-mirror component 312 serves as a parallel plate having a large thickness. The light emitted from the pentaprism 316-2 on the lower right side passes through the inclined parallel plate in an upper portion of the prescribed half-mirror component 312. Even if the parallel plate through which the light passes is inclined, a traveling direction of the light after passing remains unchanged without being affected by the inclination.

That is, in the optical path passing through the pentaprism 316-1 on the upper left side, the light is reflected once upward on the lower left side in the prescribed half-mirror component 312. Then, the divergent light reflected in the pentaprism 316-1 on the upper left side and passing through the pinhole 310 is reflected by the top face of the inclined parallel plate in the upper portion of the prescribed half-mirror component 312 and travels toward the converging lens 330-2. As a result, in the optical path passing through the pentaprism 316-1 on the upper left side, the light is reflected twice in the prescribed half-mirror component 312.

As described above, the 'passing through the parallel plate' or the 'reflection twice (even number of times)' is realized by all (or individual) optical components through which the light passes, thereby reducing the influence of the inclination of the optical components. In a large number of highly accurate interferometers, measurement is performed using a vibration isolation table under a temperature control environment. On the other hand, by reducing the influence of the inclination of the optical component, there is an effect that highly accurate measurement can be performed in an outdoor environment at a high temperature or a low temperature even if a relatively simple housing is used.

Further, as described with reference to FIG. 70, the focal lengths F1 and F2 of the converging lenses 330-1 and 330-2 before and after the pinhole 310 are optimized (F1>F2), and the reference light intensity on the surface of the imaging sensor 300 is appropriately controlled.

In FIG. 71, as a method for measuring the fine uneven shape of the surface of the measured object 22, the moving mechanism 290 is operated to move the lower left pentaprism 316-2 in the arrow direction. However, the present invention is not limited thereto, and the center wavelength $\lambda_0$ of the irradiated light (first light) 12 with respect to the measured object 22 may be changed.

Figure 72:
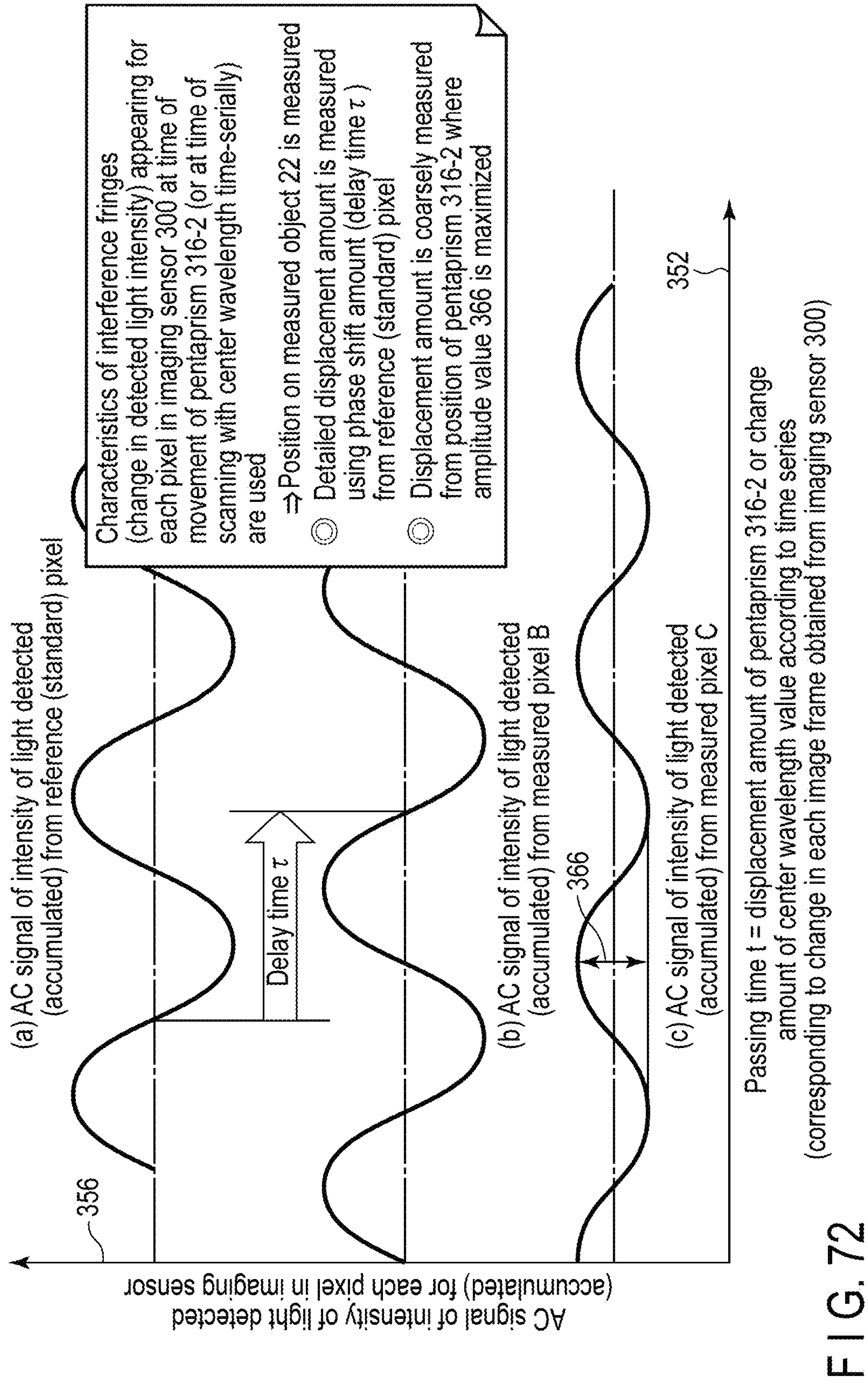
FIG. 72 is an explanatory diagram of a relative position detection principle in the imaging method using the optical interference phenomenon.

FIG. 72 illustrates a length measurement method using the measurer 8 in FIG. 71. A vertical axis in FIG. 72 represents an AC signal 356 of the detected (accumulated) light intensity for each pixel in the imaging plane of the imaging sensor 300. A horizontal axis in FIG. 72 represents a passing time 352. For example, in a case where the above-described pentaprism 316-2 is slowly moved at a constant speed, the passing time 352 corresponds to the amount of change in the optical path length difference between the reference light and the measurement light. On the other hand, in a case where the center wavelength $\lambda_0$ of the irradiated light (first light) 12 with respect to the measured object 22 is changed, the passing time corresponds to the change amount of the center wavelength $\lambda_0$.

The α point on the surface of the measured object 22 illustrated in FIG. 70(*a*) can be set to an arbitrary position on the surface of the measured object 22. In addition, a pixel corresponding to the position of the γ point on the imaging plane of the imaging sensor 300 when the α point is matched with the δ point in FIG. 70(*b*) (that is, the position where the reference light is irregularly reflected) is referred to as a "reference (standard) pixel".

By shifting the pentaprism 316-2 or changing the center wavelength $\lambda_0$ of the irradiated light (first light) 12, a location where the AC signal amplitude of the intensity of detected (accumulated) light from the reference (standard) pixel illustrated in FIG. 72(*a*) is maximized is searched. Then, the maximum amplitude position of the AC signal (interference fringes) is set as a standard distance for length measurement.

FIG. 72(*b*) illustrates an AC signal of the intensity of detected (accumulated) light from a pixel B arranged in the vicinity of the reference (standard) pixel on the imaging plane of the imaging sensor 300. A case where position shift (optical path length difference) occurs in the optical axis direction between the δ point position on the surface of the measured object 22 corresponding to the reference (standard) pixel and the corresponding position on the surface of the measured object 22 corresponding to the pixel B will be considered. In this case, a delay time τ occurs between FIGS. 72(*a*) and 72(*b*). One cycle of the interference fringes corresponds to the center wavelength $\lambda_0$ of the irradiated light (first light) 12. Therefore, from a relation between the delay time τ and the passing time corresponding to one cycle of the interference fringes, the distance (optical path length difference) between the δ point position on the surface of the measured object 22 and the corresponding position on the surface of the measured object 22 corresponding to the pixel B can be measured.

FIG. 72(*c*) illustrates an AC signal of the intensity of detected (accumulated) light from a pixel C greatly away from the reference (standard) pixel on the imaging plane of the imaging sensor 300. A case where an amplitude value 366 in FIG. 72(*c*) greatly decreases as compared with FIG. 72(*a*) is considered. When the corresponding position on the surface of the measured object 22 with respect to the pixel C greatly deviates in the optical axis direction, the interference fringe amplitude greatly decreases. The amount of decrease in the interference fringe amplitude can be calculated from the amount of overlapping between two wave trains as described with reference to FIG. 18.

Therefore, from the interference fringe amplitude decrease amount in FIG. 72(*c*), the shifting value in the optical axis direction of the corresponding position on the surface of the measured object 22 with respect to the pixel C can be calculated. As another method, the distance can also be calculated from the position of the pentaprism 316-2 or the change amount of the center wavelength $\lambda_0$ of the irradiated light (first light) 12 when the interference fringe amplitude in FIG. 72(*c*) is maximized.

As described above, when the characteristics of the interference fringes (change in the detected light intensity) appearing for each pixel in the imaging sensor 300 at the time of movement of the pentaprism 316-2 or at the time of scanning with the center wavelength $\lambda_0$ of the time-series irradiated light (first light) 12 are used, it is possible to measure the position on the measured object 22 and measure the fine uneven shape of the surface. Here, as a highly accurate length measurement method, a detailed displacement amount can be measured from the phase shifting value corresponding to the delay time τ along the passing time 352 for each pixel from the reference (standard) pixel. Also, the distance can be coarsely measured from the position of the pentaprism 316-2 or the change amount of the center wavelength $\lambda_0$ of the irradiated light (first light) 12 when the interference fringe amplitude is maximized.

Figure 73:
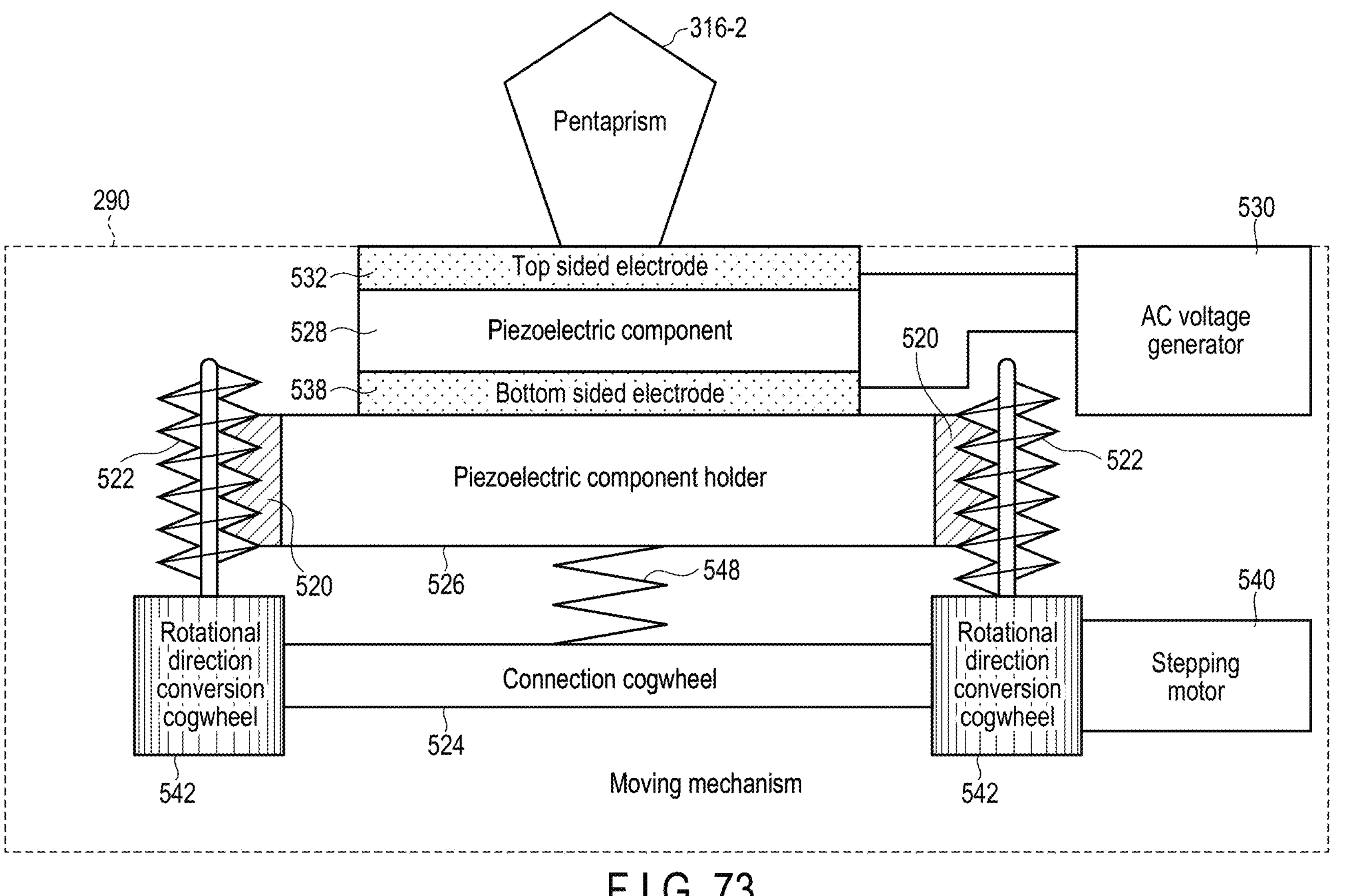
FIG. 73 is an explanatory diagram of a specific structure of a moving mechanism of a pentaprism.

FIG. 73 illustrates a specific structure example in the moving mechanism 290 of FIG. 71. The moving mechanism 290 of the pentaprism 316-2 is equipped with both a fine moving mechanism and a coarse moving mechanism. In the fine moving mechanism that moves the pentaprism 316-2 in the order of the center wavelength $\lambda_0$ of the irradiated light (first light) 12, a piezoelectric component 528 is used.

An AC voltage is applied from an AC voltage generator 530 to a top sided electrode 532 and a bottom sided electrode 538 installed on top and bottom faces of the piezoelectric component 528. The thickness of the piezoelectric component 528 slightly changes according to the applied AC voltage. The bottom sided electrode 538 is held by a piezoelectric component holder 526.

The coarse moving mechanism moves the piezoelectric component holder 526 in the vertical direction. A stepping motor 540, a rotational direction conversion cogwheel 542, and a connection cogwheel 524 are arranged in a fixing portion in the moving mechanism 290. The two rotational direction conversion cogwheels 542 rotate in conjunction with the rotation of the connection cogwheel 524, and the stepping motor 540 rotates the connection cogwheel 524. In addition, the two rotational direction conversion cogwheels 542 are individually integrated with a screw 522, and the screw 522 also rotates simultaneously in accordance with the rotation of the rotational direction conversion cogwheel 542.

A linear gear 520 is installed on a side face of the piezoelectric component holder 526, and the piezoelectric component holder 526 moves up and down according to the rotation of the screw 522. In order to reduce the amount of backlash between the screw 522 and the linear gear 520, the piezoelectric component holder 526 is constantly pressed upward by a pressure spring 548.

Figure 74:
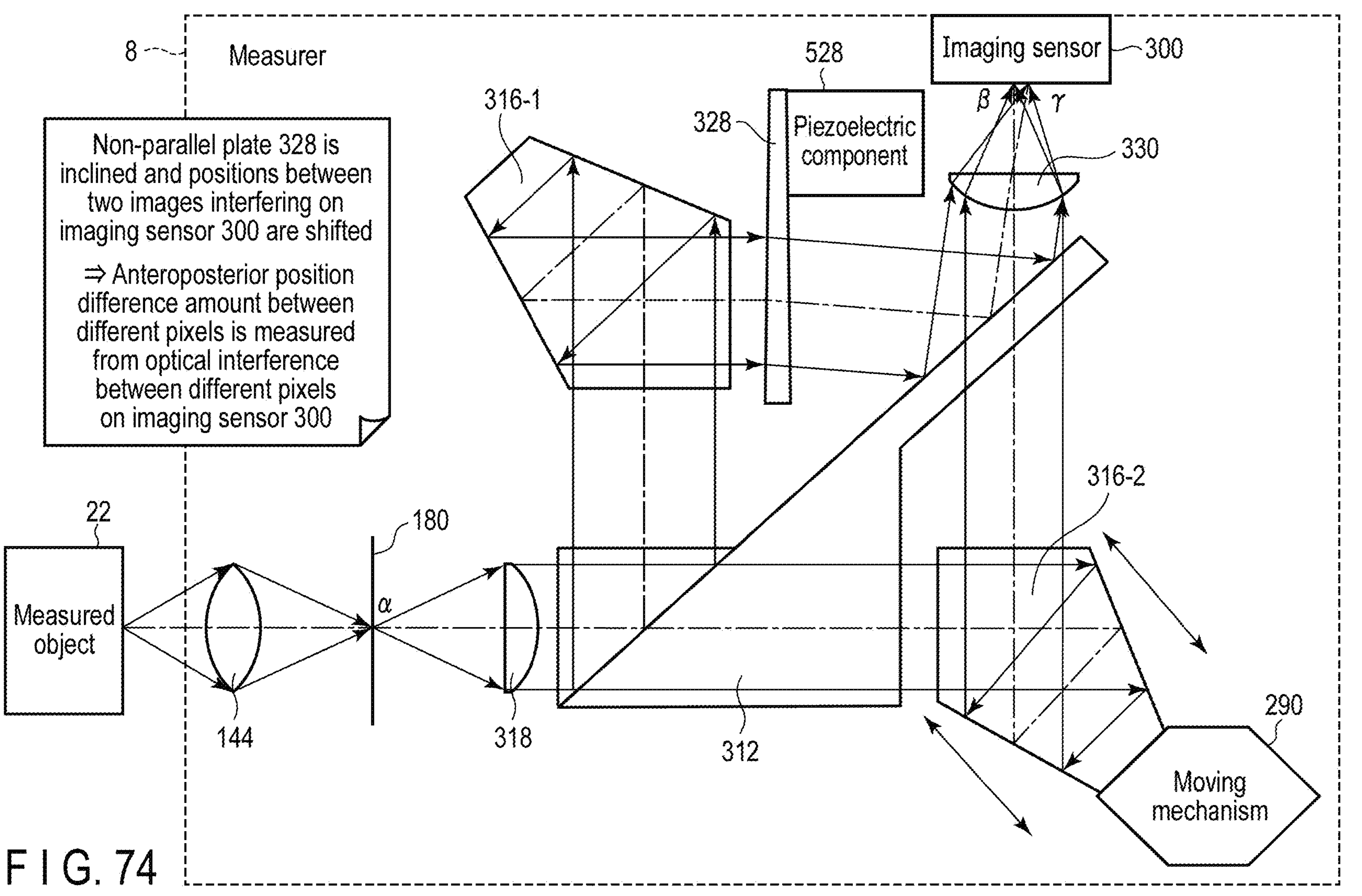
FIG. 74 is an explanatory diagram of an application example of imaging using the optical interference phenomenon.

FIG. 74 illustrates an embodiment application example with respect to FIG. 71. In FIG. 71, the position δ on the surface of the measured object 22 used as the reference light is fixed. On the other hand, in the present embodiment application example illustrated in FIG. 74, a pixel position separated by a predetermined distance in the imaging plane of the imaging sensor 300 is used as a reference (standard) pixel.

In FIG. 74, a non-parallel plate 328 is provided instead of the front converging lens 330-1 and the pinhole 310 in FIG. 71. In the other portion, FIG. 74 is matched with FIG. 71. The piezoelectric component 528 acts, and the non-parallel plate 328 has a structure that can be inclined at an arbitrary angle.

The light passing through the collimator lens 318 and passing through the lower right pentaprism 316-2 forms an image at the β point on the imaging sensor 300 with respect to the α point on the image forming plane 180. Similarly, the light passing through the upper left pentaprism 316-1 forms an image at the γ point on the imaging sensor 300 with respect to the α point on the image forming plane 180. The distance between the β point and the γ point on the imaging plane of the imaging sensor 300 is the distance between the reference (standard) pixel and the measured pixel. When an inclination angle of the non-parallel plate 328 is changed, the distance between the β point and the γ point on the imaging plane changes.

In the pixel corresponding to the position of the γ point on the imaging plane, the detection light 16 that has passed through the α point on the image forming plane 180 is used as the reference light. An image forming point on the image forming plane 180 on the optical path passing through the upper left pentaprism 316-1 with respect to the γ point is used as measured light. That is, at the position of the γ point on the imaging plane, the reference light having passed through the α point on the image forming plane 180 and the measured light having passed through another point on the image forming plane 180 overlap each other. When the absolute value of the optical path length difference between both the optical paths from the surface position of the measured object 22 to the γ point position on the imaging plane is smaller than twice the coherence length ΔL0, the interference fringes are observed on the γ point. That is, the pentaprism 316-2 arranged on the lower right side of FIG. 74 is finely moved, and the interference fringes can be observed by the presence or absence of the change in the detection signal at the γ point according to the passing time 352.

As described with reference to FIG. 72, the highly accurate displacement amount (height of unevenness) in the optical axis direction between the two points on the surface of the measured object 22 can be calculated with the detection signal amplitude value 366 and the delay time τ (phase change amount) at the γ point at the time of fine movement of the pentaprism 316-2. Further, if the pentaprism 316-2 is coarsely moved to measure the position of the pentaprism 316-2 when the detection signal amplitude value 366 is maximized, an approximate displacement amount (height of unevenness) between the two points on the surface of the measured object 22 can be calculated.

Chapter 7: Example of method for measuring absorbance of single solute in solution FIG. 75 illustrates an embodiment example of the system outline described in FIG. 1 and FIG. 2. The irradiated light (first light) 12 generated in the light source 2 propagates along the inside of the optical fiber 326. The collimator lens converts the irradiated light (first light) 12 in the divergent light state emitted from the outlet of the optical fiber 326 into parallel light. The detection light (second light) 16 after passing through the diffuser (optical phase profile transforming component) 460 and a holder case 1080 of the measured object is converged on the incident surface of the optical fiber 326 by the converging lens 314. Then, the detection light (second light) 16 propagates through the optical fiber 326 and enters the measurer 8. The measured signal 6 is generated by the function of a spectral component 320 installed in the measurer 8, and is subjected to signal processing or data analysis by a signal processor and/or data analyzer of the system controller. In FIG. 75, the entirety including all the components described above is installed in the optical device 10. However, the present invention is not limited thereto, and a part of the above-described components may be installed in the optical device 10 and the entirety of FIG. 75 may constitute the system.

In the light source 2, emitting light emitted from the same light emitter 470 is divided into a plurality of elements (first to fourth light elements 202 to 207), and temporal coherence between different elements (first to fourth light elements 202 to 207) is reduced. At the time of measuring the spectral profile of the detection light (second light) 16, the diffuser (optical phase profile transforming component) 460 may be arranged in the middle of the optical path of the irradiated light (first light) 12 to lower the spatial coherence in the same element (first to fourth light elements 202 to 207).

A situation is assumed in which the measured object 22 irradiated with the irradiated light (first light) includes a plurality of different constituents, and it is desired to measure a spectral profile or an absorbance profile of only a specific constituent among the constituents. In this case, in the present embodiment example, as illustrated in FIGS. 3, 4, 5, and 6, a plurality of measured signal constituents 104 and 106 are extracted from the measured signal 6, and calculation combination 108 is performed to perform highly accurate measurement information generation 88.

Figure 76:
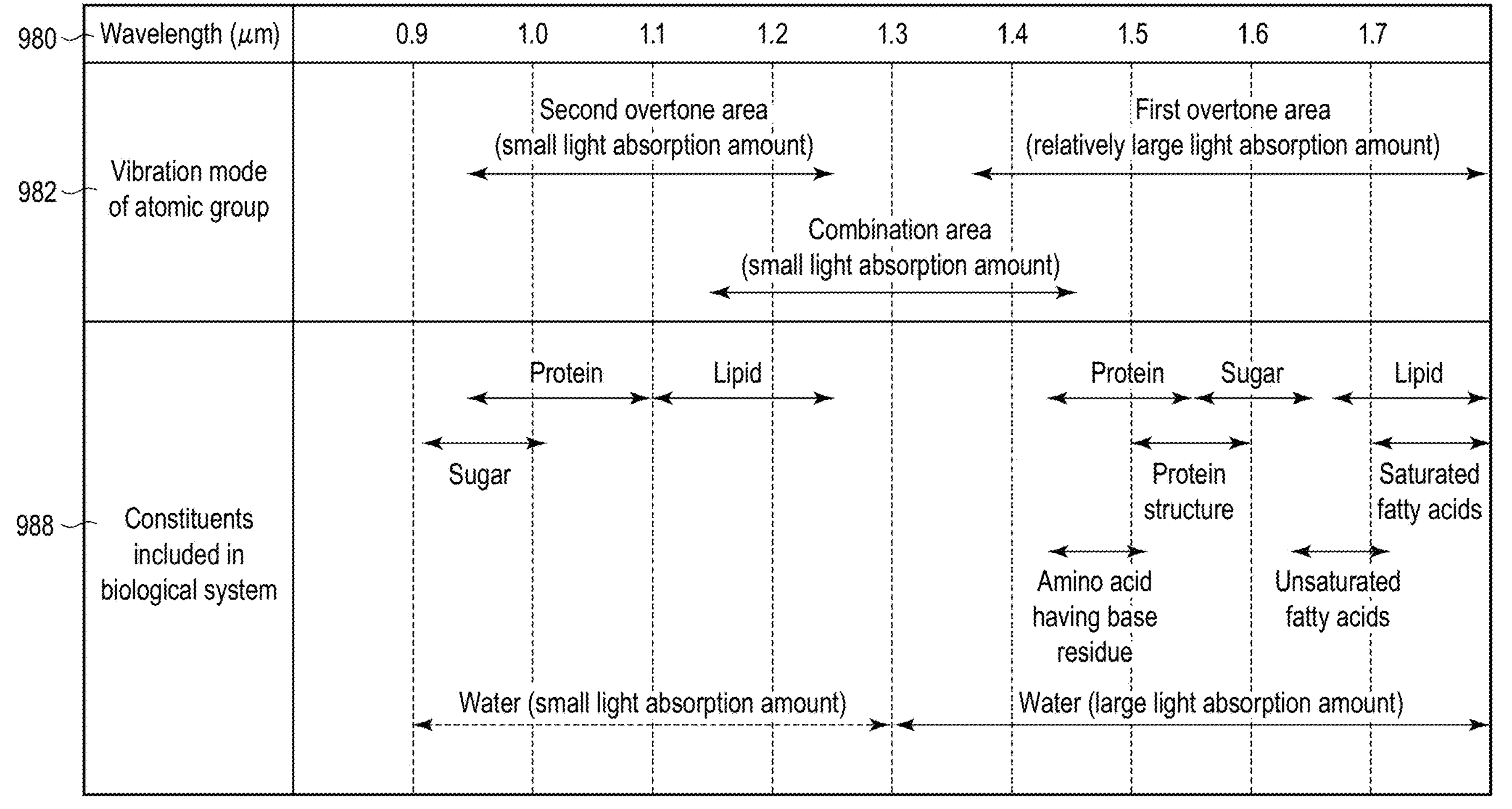
FIG. 76 is an explanatory diagram of a relation between constituents included in a biological system and corresponding absorption wavelengths.

As illustrated in FIG. 76, a living body suitable for near infrared light analysis in a 0.8 to 2.5 μm wavelength band includes a large number of constituents 988. In particular, the water content in the living body is high. Therefore, at the time of measuring the spectral profile (or absorbance profile) of the in-vivo constituent 988, it is necessary to remove an influence of the contained water from the measured signal 6 obtained from the detection light (second light) 16.

In a method for removing the influence of the contained water in the present embodiment example, pure water is put into the holder case 1080, and the absorbance profile of the pure water is measured in advance and used as the first measured signal constituent (reference signal constituent) 104. Next, the absorbance profile obtained from the measured object 22 containing water is set as the second measured signal constituent 106, and the influence of the contained water is removed by the calculation combination between them. Instead of measuring the absorbance profile of pure water for each measurement of the measured object 22, the absorbance profile of pure water for each measurement environment (temperature and humidity at the time of measurement) may be stored in advance as the file data 80 (see FIG. 5).

As an example other than the entire living body or the section in the living body related to the measured object 22 containing water, the present invention may be used for spectral profile measurement of a solute in a solution. This application example corresponds to "Spectral profile of solute included in a solution (spectral profile of solute constituent)" in the column of the measured object type (category) 102 of FIG. 6 and FIG. 7. Here, the solution is not limited to pure water, and for example, a hydrophobic solution such as alcohol, benzene, acetone, or oil may be used.

Then, by using the measured signal 6 obtained from the measured object 22 containing water, the signal processor and/or data analyzer 38 performs execution processing. At this time, the display 18 may display the display example content of FIG. 8 to 13 or perform notification to the user at the time of executing the software program.

An example of the method for removing the influence of water from the measured signal 6 obtained from the measured object 22 containing water has been described above. For example, the living body includes a plurality of different constituents 988. When information of FIG. 76 is used for measurement information 88 obtained after the removal of the influence of water, wavelength separation in the absorbance profile can be performed.

When near infrared light in a wavelength band of 0.8 to 2.5 μm is used as the detection light (second light) 16, information of a vibration mode 982 of an atomic group is obtained from an absorption band that can be identified by wavelength separation. Here, the atomic group refers to an atomic group in which a carbon atom, a nitrogen atom, or an oxygen atom is arranged at the center and one to three hydrogen atoms are bonded to the center atom. A group vibration frequency generated at (between the center atom and) one to three hydrogen atoms varies depending on the difference in the center atom and the difference in the number of hydrogen atoms in the atomic group. Then, wavelength light corresponding to the group vibration frequency is absorbed, and an absorption band is observed. Therefore, the constituents 988 forming the living body can be identified from a value of the wavelength (center wavelength of the absorption band) at which the detection light (second light) 16 is absorbed.

Considering this group vibration from a quantum mechanical point of view, there is a ground state of a vibration mode as described later. There are a plurality of vibration modes in an excited state. The excited state having the lowest energy level is referred to as normal vibration. The vibration modes in which the energy level further increases correspond to a 1st-order overtone vibration and a 2nd-order overtone vibration. In addition, a combination vibration between different vibration directions is referred to as a combination vibration.

In addition, there are symmetrical stretching, asymmetrical stretching, and deformation depending on the vibration direction of the group vibration. In many cases, a center wavelength value of the absorption band corresponding to the symmetrical stretching and a center wavelength value of the absorption band corresponding to the asymmetrical stretching are close to each other. In many cases, a light absorption amount based on the deformation is about half of a light absorption amount based on the symmetrical stretching or the asymmetrical stretching. Therefore, only the light absorption based on the symmetrical stretching and the asymmetrical stretching will be approximately collectively described as an absorption band.

As illustrated in FIG. 76, a wavelength range of 1.35 μm to 1.80 μm is called a first overtone area, and has a relatively large light absorption amount. Within this wavelength range, protein, sugar, and lipid absorb light relatively large in this order from the short wavelength side. Within a wavelength range mainly absorbed by the lipid, an absorption wavelength value of saturated fatty acids is larger than an absorption wavelength value of unsaturated fatty acids.

In addition, in a wavelength range mainly absorbed by the protein, amino acid having base residue (amino acid containing lysine residues, histidine residues, and arginine residues) absorbs light in a wavelength range of 1.45 μm to 1.53 μm. In addition, a peptide bond portion in the protein or a secondary structure of a protein called α-helix or β-sheet appears in an absorption band within a wavelength range of 1.48 μm to 1.57 μm.

A wavelength range of 0.90 μm to 1.25 μm is called a second overtone area, and the light absorption amount is relatively small. The absorption wavelengths of the respective constituents 988 included in the biological system within this wavelength range are arranged in the order of sugar, protein, and lipid from the short wavelength side.

Here, in a wavelength range of 1.35 μm or more corresponding to the first overtone area and the combination area, the characteristic that the absorption amount of water is very large becomes a problem. On the other hand, the absorption amount of water is small in a wavelength range of 1.35 μm or less corresponding to the second overtone area. Therefore, in a case of trying to analyze the constituent 988 using the first overtone area, it is necessary to remove the influence of water from the measured signal 6 obtained from the measurer 8.

Figure 77:
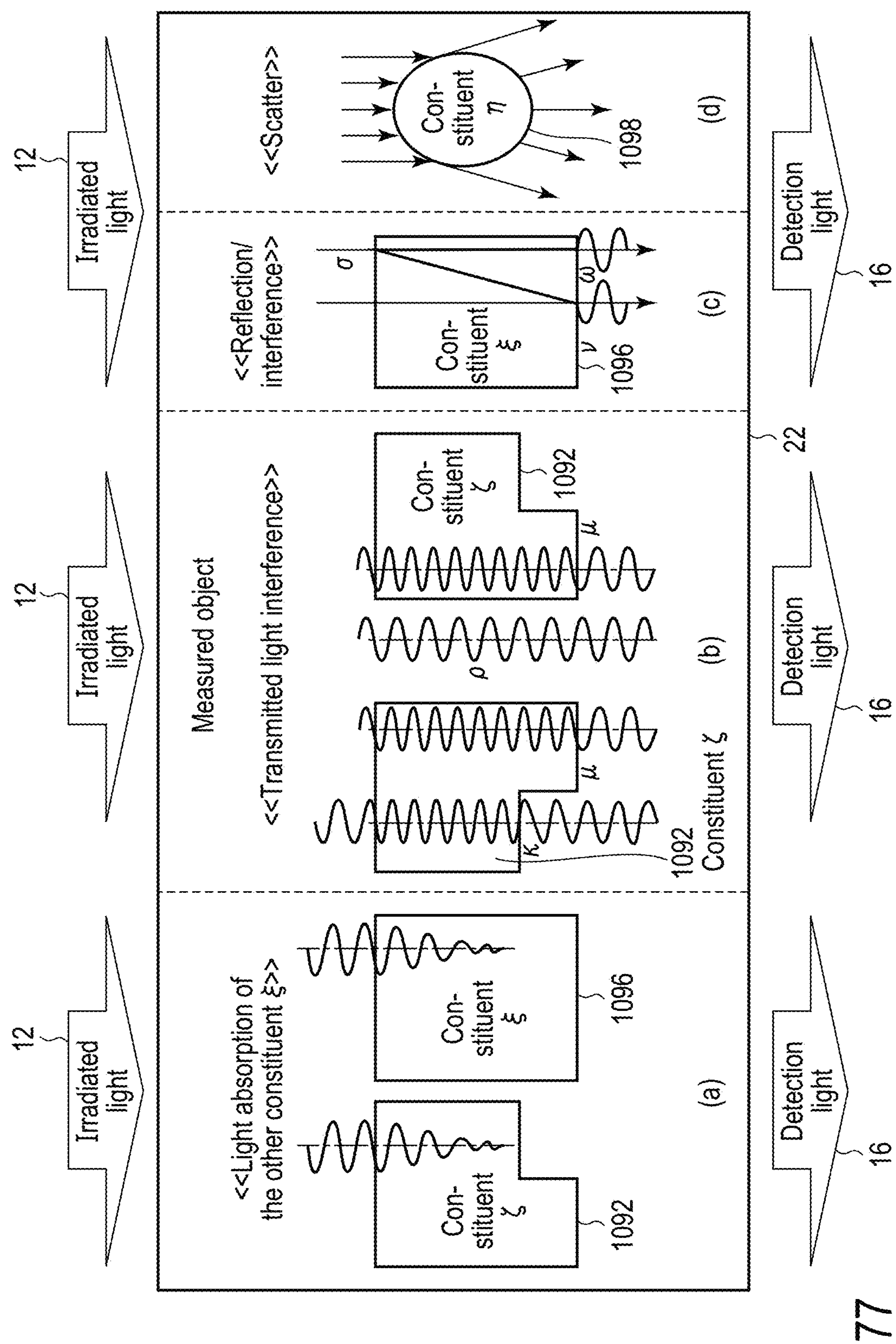
FIG. 77 is an explanatory diagram of an influence of a structure/shape of constituents constituting the measured object on detection light.

FIG. 77 illustrates various types of optical disturbance noise generated by interaction with light inside the measured object 22. Various interactions occur with the irradiated light 12 inside the measured object 22. The detection light 16 obtained from the measured object 22 is affected by the various interactions. That is, the influence of the various interactions is mixed in the detection light 16 as the optical disturbance noise.

A case where the measured object 22 has a complicated composition will be first described. For example, many biological systems include sugar, lipid, protein, and nucleotides, and contain more water. Therefore, for example, even if an attempt is made to measure the optical characteristics of only the protein in the living body, the influence of the optical characteristics of water is mixed in the measurement data.

In infrared spectral profile measurement, near infrared spectral profile measurement, Raman spectral profile measurement, fluorescent/phosphorescent spectral profile measurement, and the like, composition analysis is performed using a light absorption amount (absorbance) characteristic of specific wavelength light in the measured object 22. Therefore, an influence of light absorption of the other constituent is mixed as optical disturbance noise.

FIG. 77(*a*) illustrates an influence of light absorption of the other constituent ξ 1096 in the case of attempting to measure the absorbance profiles of only the constituent ζ 1092 in the measured object 22 for each wavelength. For example, a case where the absorbance of the constituent ζ 1092 to be measured at the specific wavelength light is low (light is hardly absorbed) while the absorbance of the other constituent ξ 1096 at the same specific wavelength light is high (a large amount of light is absorbed) is considered. When the irradiated light 12 having the specific wavelength light is emitted, a large amount of specific wavelength light is absorbed in the other constituent ξ 1096 in the measured object 22. Therefore, the intensity of the specific wavelength light included in the detection light 16 obtained from the measured object 22 is greatly reduced.

The right side of FIG. 77(*b*) illustrates an influence of an example of a light scattering characteristic of the light transmitting through the constituent ζ 1092. The physical wavelength of light is inversely proportional to the refractive index in the medium through which the passes. The physical wavelength of light passing through the inside and outside of the constituent ζ 1092 varies depending on the refractive index inside the constituent ζ 1092. Therefore, when a phase difference occurs between the light beam after passing through the constituent ζ 1092 and the light beam traveling straight outside the constituent ζ 1092, the light beams interfere with each other and the intensity of light beam traveling straight decreases. This phenomenon occurs not only when the constituent ζ 1092 is present alone in the air but also when the constituent ζ 1092 is dispersed in an aqueous solution.

The left side of FIG. 77(*b*) illustrates an influence of light diffraction and light interference occurring when the surface of the constituent ζ 1092 has a minute uneven shape. When the phase changes between light beams after passing through a convex portion μ and a concave portion κ on the surface of the constituent ζ 1092, the light beams interfere with each other and the intensity of light beam traveling straight decreases.

FIG. 77(*c*) illustrates an example of an influence of a light reflection characteristic and a light interference characteristic. For example, a case is considered in which the top face σ and the bottom faces ν and ω of the constituent ξ 1096 are flat and parallel to each other. Most of the light that has passed through the constituent ξ 1096 passes through the bottom face ν. However, some light is reflected by the bottom face ν and returns to the inside of the constituent ξ. After being reflected by the top face σ of the constituent ξ 1096, the light goes out of the constituent ξ 1096 via the bottom face ω. Then, the light having passed through the bottom face ν and the light having passed through the bottom face ω through the top face σ interfere with each other, and a substantial transmitted intensity changes.

FIG. 77(*d*) illustrates an influence of a light scattering example at the constituent η 1098 included in the measured object 22. When light scatter 2 occurs in the constituent η 1098, a linearly transmitted intensity decreases. On the other hand, most of the light is bent in a direction greatly deviated from the incident direction of the irradiated light 12 and travels. As described above, a wide variety of optical interactions occur inside the measured object 22.

In FIG. 77(*a*), the light is affected by the light absorption of the other constituent ξ 1096. However, under the other influences of FIGS. 77(*b*) to 77(*d*), the intensity of straight light traveling in the same direction as the irradiated light 12 in the detection light 16 decreases, but the light absorption phenomenon does not occur. Therefore, the decrease in the intensity of the straight light can be referred to as "light intensity loss". The spectral profile or the spectral profile signal of the detection light 16 obtained by this phenomenon can also be referred to as a light intensity loss spectral profile or light intensity loss spectral profile signal.

Next, an example of a method for extracting absorbance information or linear absorption ratio information of only the constituent ζ 1092 will be described in detail. Here, the absorbance profile or linear absorption ratio profile of the constituent ξ 1096 in FIG. 77(*a*) corresponds to the spectral profile (absorbance profile) of the solvent in the column of the first measured signal constituent (reference signal constituent) 104 in FIG. 6 and FIG. 7. The spectral profile signal including both the constituent ξ 1096 and the constituent ζ 1092 in FIG. 77(*a*) corresponds to the spectral profile (absorbance profile) of the entire solution in the column of the second measured signal constituent 106 in FIG. 6 and FIG. 7. Therefore, processing of subtracting the known absorbance profile or linear absorption ratio profile of the other constituent ξ 1096 from the spectral profile signal including both the constituent ξ 1096 and the constituent ζ 1092 corresponds to "processing of subtracting solvent characteristic from solution characteristic" in the column of the calculation combination example 108 in FIG. 6 and FIG. 7.

However, the spectral profile signal obtained by the subtraction processing includes the influence of the interaction in FIGS. 77(*b*) to 77(*d*). Therefore, in the present embodiment example, the influence of the interaction in FIGS. 77(*b*) to 77(*d*) may be sequentially removed from the spectral profile signals in the signal processor and/or data analyzer (in the corresponding soft program), and the absorbance information or linear absorption ratio information of only the constituent ζ 1092 may be extracted.

Incidentally, it is difficult to individually measure degrees of influences of the interactions in FIGS. 77(*b*) to 77(*d*). Therefore, in the present embodiment example, signal optimization processing is performed from the spectral profile signal, and a correction curve in which the influences of the interactions in FIGS. 77(*b*) to 77(*d*) are mixed is automatically extracted. This correction curve is extracted from the spectral profile signals including the influences of the interactions in FIGS. 77(*b*) to 77(*d*). Then, the signal constituent of the correction curve is removed from the spectral profile signal in a state in which the influences of the interactions in FIGS. 77(*b*) to 77(*d*) are mixed, and the absorbance or linear absorption ratio profile information of the constituent ζ 1092 with high measurement accuracy is extracted.

The influence of the interaction in FIGS. 77(*b*) to 77(*d*), which appears in the spectral profile signal obtained by subtracting the known absorbance information or linear absorption ratio information (first extraction information) of the other constituent 1096 from the spectral profile signal including both the constituent ξ 1096 and the constituent ζ 1092, mainly appears in the profile change of the baseline in the spectral profile signal. Therefore, the optical disturbance noise reduction processing using the correction curve characteristic performed in the present embodiment example may be referred to as "baseline correction".

In the above description, for convenience of explanation, the embodiment example in which the baseline correction is performed after the influence of the absorbance (linear absorption ratio) profile of the other constituent ξ 1096 is removed has been described. However, the present invention is not limited thereto, and for example, when the measured object 22 includes only the constituent ζ 1092, the baseline correction may be directly performed on the spectral profile signal (measured signal 6) obtained from the measurer 8.

Chapter 8: Example of method for measuring profile inside measured object 22 using specific reference signal The signal processor and/or data analyzer (hardware circuit and/or software program) 38 in the system controller 50 performs signal processing and/or data analysis according to the procedure of FIG. 3 and FIG. 4 or FIG. 5 on the measured object type (category) 102 (spectral profile of solute in a solution and the like) described in Chapter 7. In Chapter 8, with respect to the measured object type (category) 102 different from Chapter 7, another embodiment example of the signal processing and/or data analysis performed by the signal processor and/or data analyzer 38 will be mainly described.

Other embodiment examples (different from Chapter 7) executed by the signal processor and/or data analyzer 38 described in Chapter 8 are also basically based on the procedure of FIG. 3 and FIG. 4 or FIG. 5. In other embodiment examples described below, technology related to lock-in processing (pattern matching or extraction of a constituent having a maximum correlation coefficient value) using the (DC-free) reference signal constituent 104 from which the DC signal is completely removed may be used. In connection with the following processing in the signal processor and/or data analyzer 38, the notification to the user may be performed at appropriate timing by the methods of FIGS. 8 to 13. Similarly to Chapter 7, also in Chapter 8, the irradiated light (first light) 12 described in Chapters 3 to 5 may be used.

In Chapter 8, a basic concept of a signal processing method or a data analysis method executed by the signal processor and/or data analyzer 38 will be first described. A case where the first measured signal constituent (reference signal constituent) 104 obtained by performing the extraction processing 82 to be used for the reference signal constituent described with reference to FIG. 5 is given with a waveform F(t) from which the DC signal has been removed in advance is considered. When the waveform F(t) is subjected to Fourier sine expansion, it can be expressed as follows.

$$F(t) = \frac{1}{\sqrt{2\pi}} \int_{\nu \neq 0} f(\nu)\sin\{2\pi\nu[t + \alpha(\nu)]\}d\nu \qquad \text{Equation 32}$$

In Equation 32, α(ν) represents a phase component for each frequency ν. In the waveform F(t), since the DC signal is removed in advance, following equations are established.

$$F(0) = 0 \qquad \text{Equation 33}$$

-continued $$\frac{1}{T}\int_{-T/2}^{T/2} F(t)dt = 0 \quad \text{Equation 34}$$

A waveform K(t) of the second measured signal constituent 106 obtained by the extraction processing 84 in FIG. 5 is expressed as follows.

$$K(t) = kF(t) + \frac{1}{\sqrt{2\pi}} \int_{v \neq 0} N(v)\sin\{2\pi v[t + \beta(v)]\}dv + P \quad \text{Equation 35}$$

As shown in Equation 35, the second measured signal constituent 106 includes a disturbance noise component N(ν) and a DC signal P. Here, an unknown coefficient k in Equation 35 corresponds to the measurement information 88 and 1018 to be calculated by data analysis.

$$\sin A \times \sin B = \cos(A - B) - \cos(A + B) \quad \text{Equation 36}$$

By using a product-sum formula of a trigonometrical function (Equation 36), a result obtained by multiplying the waveform K(t) of the second measured signal constituent 106 by the waveform F(t) of the first measured signal constituent (reference signal constituent) 104 after removing the DC signal can be calculated as follows.

$$F(t) \times K(t) = k \int_{v \neq 0} f^2(v)dv + PF(t) \quad \text{Equation 37}$$

Then, a result obtained by extracting only the time-series DC signal for each wavelength or each pixel with respect to the multiplied result is given as follows.

$$\frac{1}{T}\int_{-T/2}^{T/2} F(t) \times K(t)dt = k \int_{v \neq 0} f^2(v)dv \quad \text{Equation 38}$$

As a result, a value of the unknown coefficient k corresponding to the measurement information 88 and 1018 can be obtained with high accuracy. What is important in the above calculation process is that the disturbance noise component N(ν) included in the second measured signal constituent 106 is removed from Equation 38. That is, the above calculation processing has an ability to remove the disturbance noise component N(ν). Accordingly, it is possible to calculate the measurement information 88 and 1018 with high accuracy.

Figure 78:
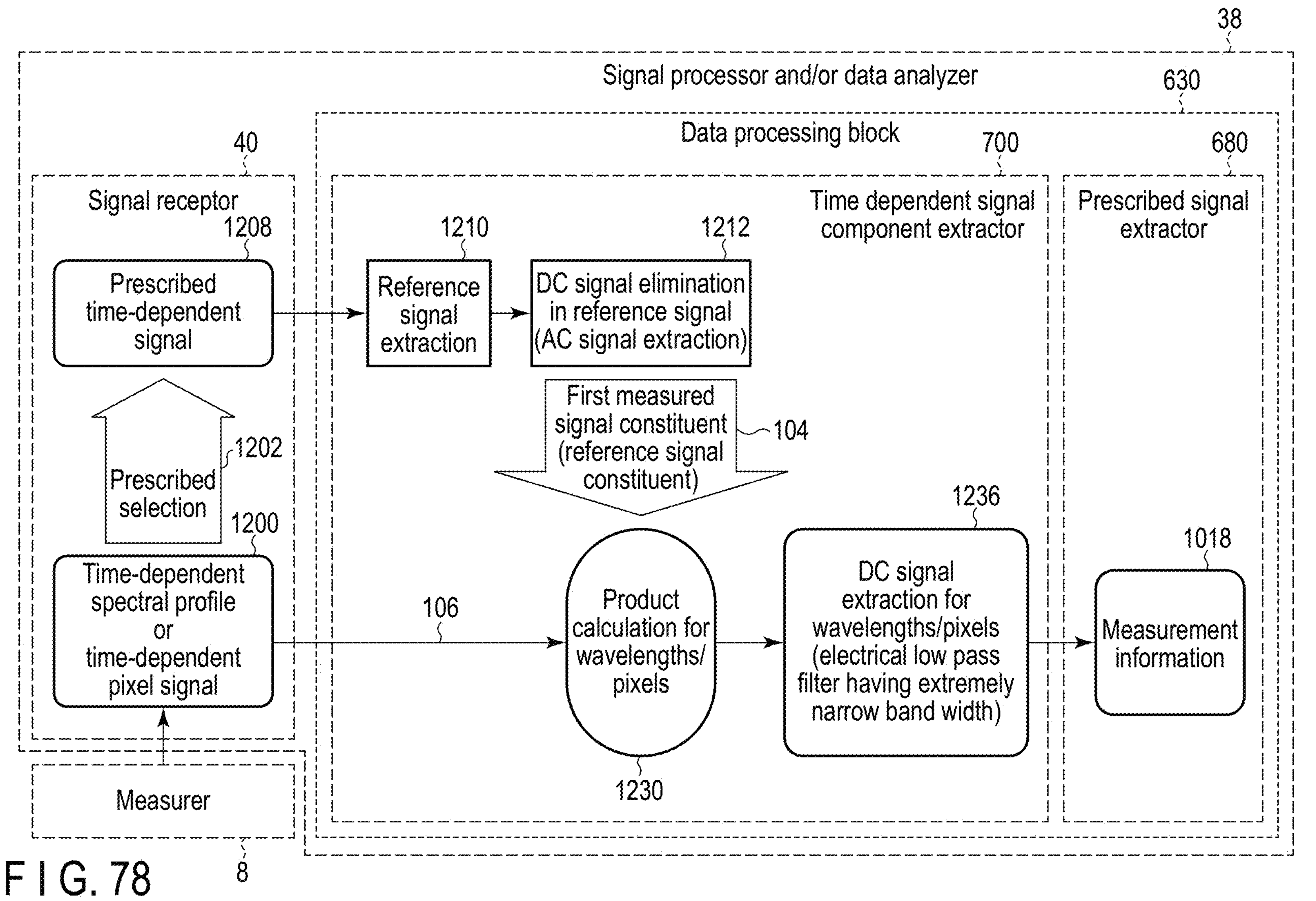
FIG. 78 illustrates a basic data processing method in the present embodiment for a spectral profile and an image signal that change in time series.
Figure 79:
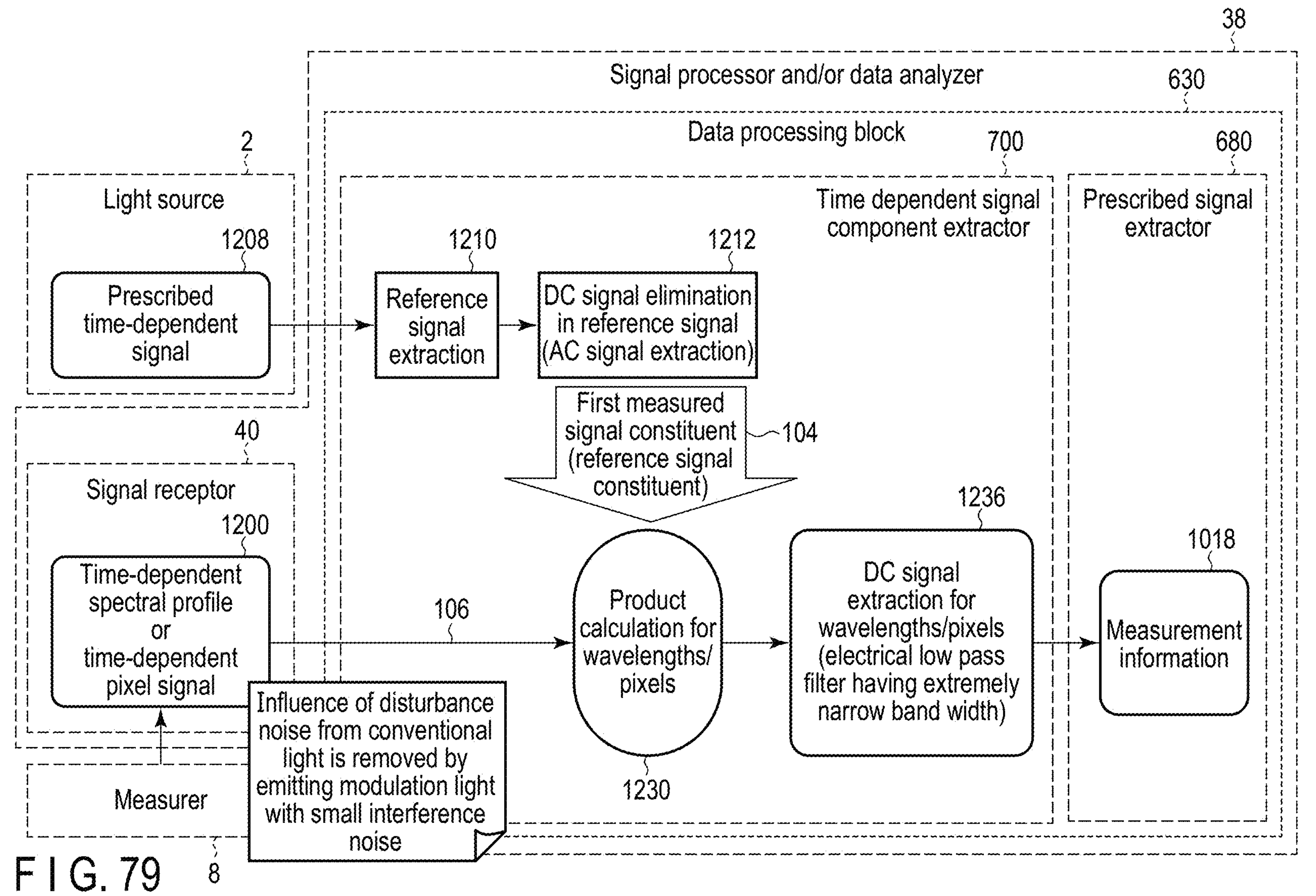
FIG. 79 illustrates another embodiment related to a data processing method for a spectral profile and an image signal that change in time series.
Figure 80:
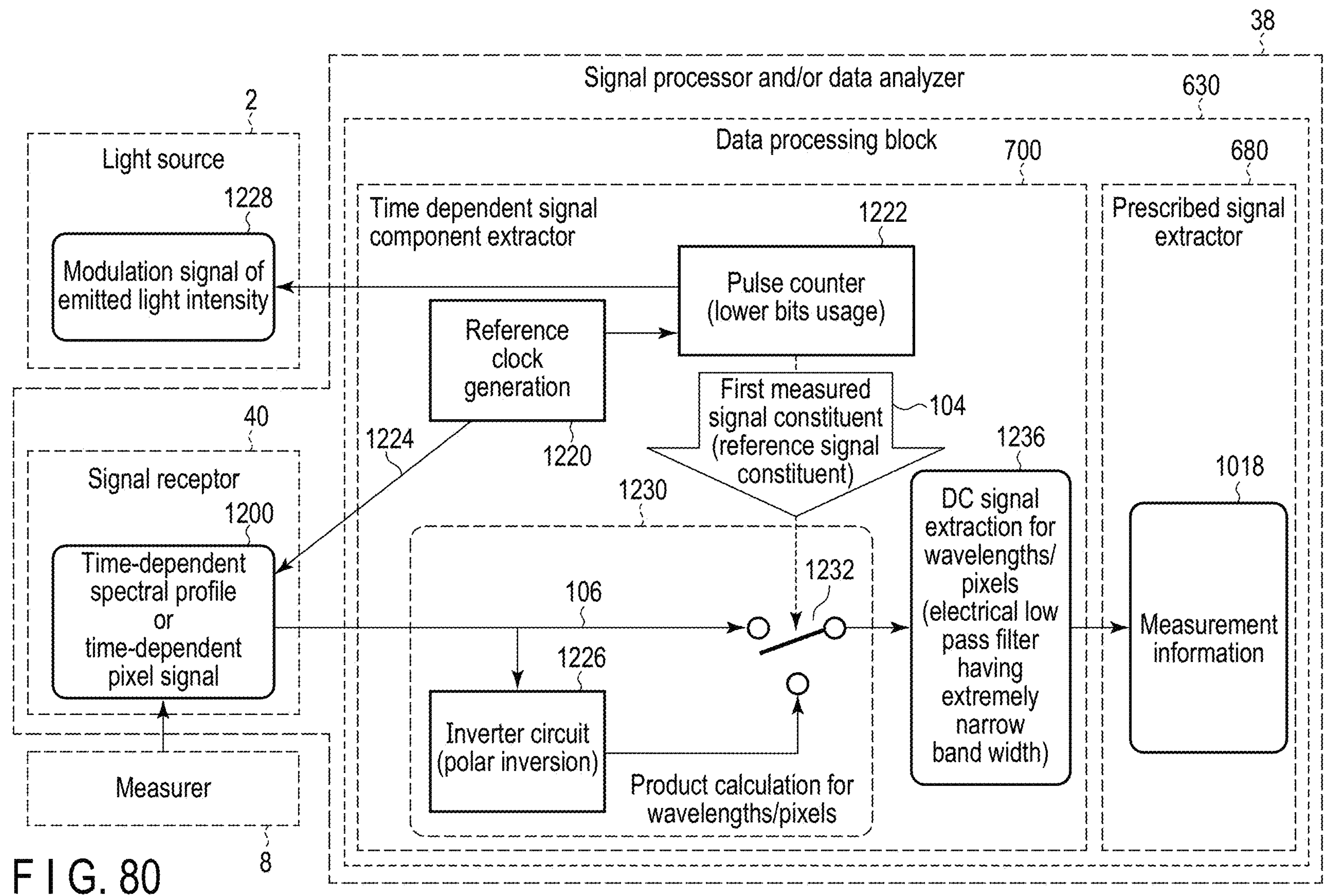
FIG. 80 illustrates an application example related to a data processing method for a spectral profile and an image signal using exposure by pulsed light emission.

FIGS. 78 to 80 are explanatory diagrams illustrating content of signal processing or data analysis executed in the signal processor and/or data analyzer 38 in a combination of block diagrams for easy understanding. Therefore, the combination of the block diagrams of FIGS. 78 to 80 is not limited to a combination of unique hardware circuits, and may indicate the operation process of a data analysis program executed in the signal processor and/or data analyzer 38.

In another embodiment example (different from Chapter 7) illustrated in FIG. 78, the waveform F(t) of the first measured signal constituent (reference signal constituent) 104 is extracted from the measured signal 6 obtained from the measurer 8. That is, the measured signal 6 such as the time-series spectral profile signal, the time-series image signal, or the data cube signal obtained from the measurer 8 in the optical device 10 is transmitted to the signal processor and/or data analyzer (hardware circuit and/or software program) 38 installed in the system controller 50. A signal receptor 40 in the signal processor and/or data analyzer 38 performs prescribed selection 1202 of a prescribed time-dependent signal 1208 from the measured signal 6.

Then, a data processing block 630 in the signal processor and/or data analyzer 38 performs reference signal extraction 1210 from the prescribed time-dependent signal 1208 subjected to the prescribed selection 1202. Then, the DC signal is further removed 1212 from the reference signal, and a waveform F(t) corresponding to the first measured signal constituent (reference signal constituent) 104 having a form of only the AC signal is generated.

In parallel therewith, a waveform K(t) corresponding to the second measured signal constituent 106 is generated from the measured signal 6 such as the time-series spectral profile signal, the time-series image signal, or the data cube signal transmitted from the signal receptor 40 in the signal processor and/or data analyzer 38 to the data processing block 630. As an example of the calculation combination 86 of both the measured signal constituents 104 and 106 described in FIG. 5, in FIG. 78, processing of the product calculation 1230 for wavelengths/pixels corresponding to Equation 37 is executed. Here, in a case where the measured signal 6 transmitted to the signal receptor 40 is a time-series spectral profile signal, product calculation for each measurement wavelength is performed in a product calculation processing block 1230. Further, in a case where the measured signal 6 transmitted to the signal receptor 40 is a time-series image signal, product calculation for each pixel is performed in the product calculation processing block 1230. On the other hand, when the data cube signal is transmitted, product calculation is performed for each measurement wavelength in each pixel.

A result obtained from the product calculation processing block 1230 is subjected to extraction 1236 of a time-series DC signal for each wavelength or for each pixel using an ultra-narrow band low pass filter. Then, in a prescribed signal extractor 680, the extracted time-series DC signal is output as the measurement information 1018. Here, time-series DC signal extraction processing 1236 corresponds to calculation processing based on Equation 38.

Incidentally, the use method of the result obtained in the product calculation processing 1230 is not limited to the above, and for example, only a specific carrier component may be extracted by performing band limitation. However, when only the above-described DC signal is extracted 1236 (application of Equation 38) rather than the carrier component extraction based on the band limitation, the DC signal extraction effect is high, and the accuracy of the measurement information 1018 is improved.

FIG. 79 illustrates another embodiment example in which the disturbance noise can be reduced. Hereinafter, only portions of FIG. 79 different from those in FIG. 78 will be described. Portions in FIG. 79 common to those in FIG. 78 are common to the content described above. In FIG. 78, the first measured signal constituent (reference signal constituent) 104 is extracted (reference signal extraction 1210) from the measured signal 6 obtained from the measurer 8. In comparison with this, in the application example of the embodiment illustrated in FIG. 79, the first measured signal constituent (reference signal constituent) 104 is extracted (reference signal extraction 1210) from the prescribed time-dependent signal 1208 generated in the light source 2. As the prescribed time-dependent signal 1208 generated in the light source 2, for example, an output signal from a pulsed light emission circuit 728 in an emitted light intensity control circuit described later with reference to FIG. 111 or an output signal from a light power detector 28 may be used.

For example, in a case where measurement is performed in an environment where disturbance light is likely to be mixed, the measurement accuracy is greatly reduced due to the influence of the disturbance light. In this case, when the emission light intensity 338 of the irradiated light (first light) 12 emitted from the light source 2 is modulated, and the measurement information 1018 is extracted with only the signal constituent corresponding to the modulated light as the second measured signal constituent 106 as illustrated in FIG. 79, the measurement accuracy is greatly improved.

FIG. 80 illustrates a method for reducing the disturbance noise by irradiating the measured object 22 with the pulse light as an application embodiment example of FIG. 79. Only portions of FIG. 80 different from FIGS. 78 and 79 will be described below. Since portions in FIG. 80 common to those in FIG. 78 is already described above, the following description will be omitted. Here, the emitted light intensity modulation signal 1228 transmitted from the signal processor and/or data analyzer 38 to the light source 2 may take the form of a rectangular pulse waveform. Alternatively, an arbitrary waveform such as a sinusoidal waveform or a triangular waveform may be taken.

In the application embodiment example of FIG. 80, a time dependent signal component extractor 700 in the data processing block 630 performs reference clock generation 1220. In a pulse counter 1222, a pulse is generated once for each predetermined pulse generation of the reference pulse 1220. The pulse output from the pulse counter 1222 is used as the first measured signal constituent (reference signal constituent) 104. The first measured signal constituent (reference signal constituent) 104 is used as a modulation signal 1228 related to the emission light intensity 338 of the irradiated light (first light) 12 emitted from the light source 2. In accordance with the emitted light intensity modulation signal 1228, the emission light intensity 338 of the irradiated light (first light) to the measured object 22 changes in a rectangular pulse shape. In addition, the first measured signal constituent (reference signal constituent) 104 (output pulse of the pulse counter 1222) is simultaneously transmitted to the product calculation circuit 1230 for wavelengths/pixels. As described above, in the application embodiment example illustrated in FIG. 80, the same first measured signal constituent (reference signal constituent) 104 is simultaneously used for a plurality of purposes.

The second measured signal constituent 106 such as the time-series spectral profile signal, the time-series pixel signal, or the data cube signal obtained from the measurer 8 is detected in synchronization 1224 with the reference pulse 1220 generated in the time dependent signal component extractor 700, and is processed in the product calculation circuit 1230 for wavelengths/pixels in the time dependent signal component extractor 700.

In a case where the first measured signal constituent (reference signal constituent) 104 has a pulse-like rectangular waveform as illustrated in FIG. 80, the product calculation circuit 1230 for wavelengths/pixels can be configured by a very simple circuit. The product calculation circuit 1230 for wavelengths/pixels includes only an inverter (polar inversion) circuit 1226 and a switch 1232. Then, according to the first measured signal constituent (reference signal constituent) 104 provided from the pulse counter 1222, the polarity of the signal to be transmitted to a DC signal extraction circuit 1236 for wavelengths/pixels (electrical low pass filter having extremely narrow band width) is switched.

Figure 81:
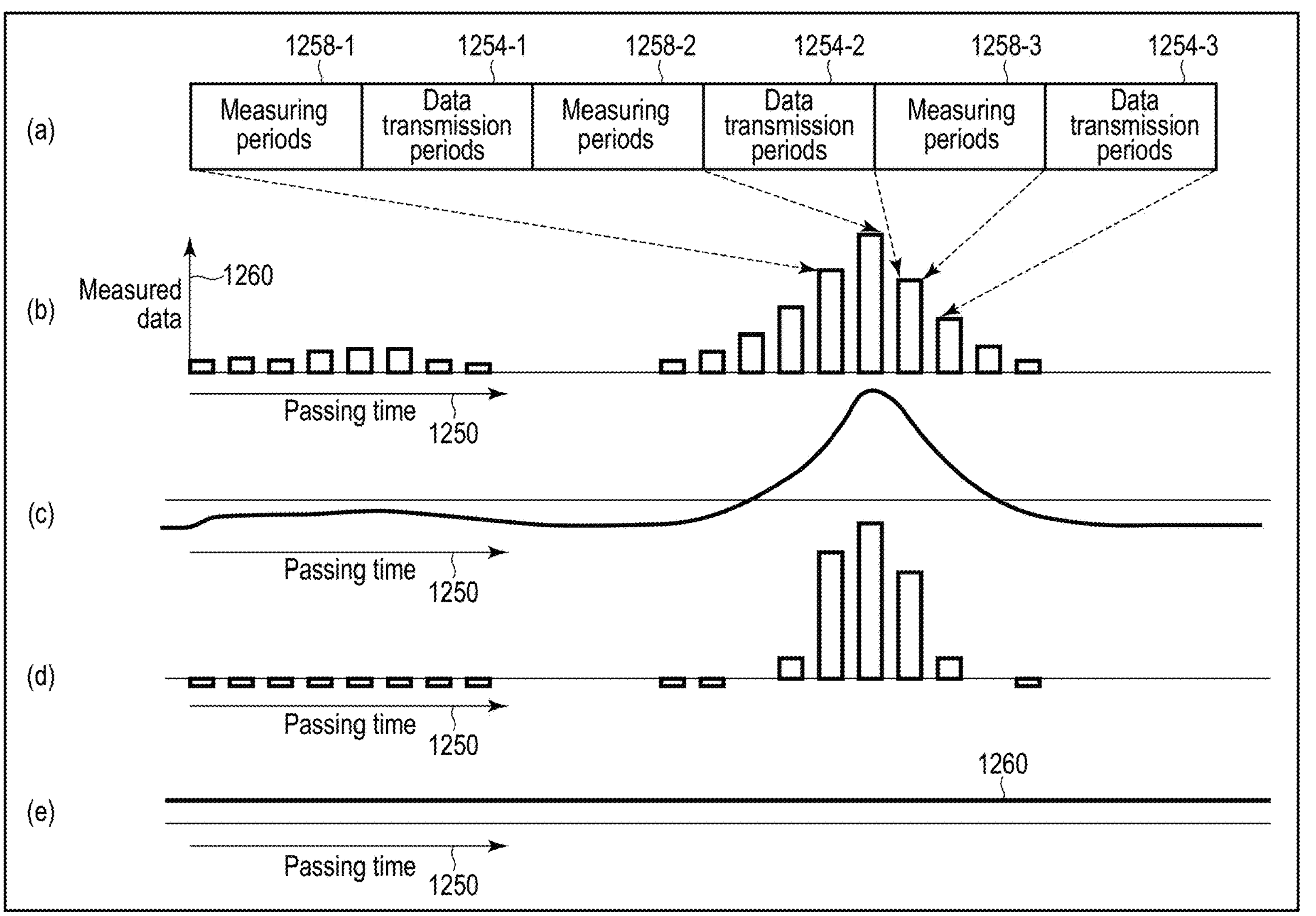
FIG. 81 is an explanatory diagram of an example of a signal processing/data analysis method for each wavelength or for each pixel.

FIG. 81 illustrates an example of a signal form or an example of a data form generated during the signal processing process or the data analysis process according to the above basic concept. A horizontal axis in FIG. 81 represents a passing time t1250. In addition, a vertical axis in FIG. 81 represents measured data 1260, or a signal amount or a data value generated during the signal processing process or the data analysis process. For convenience of description of FIG. 81, an example of a signal form or an example of a data form generated for each block configuration of FIG. 78 will be described below. However, the present invention is not limited thereto, and each signal form example or data form example obtained in FIG. 81 may be generated in, for example, FIGS. 79 and 80 or any other block configuration.

FIG. 81(*a*) illustrates a form example of the measured signal 6 transmitted by the measurer 8. For example, each wavelength light obtained by dividing the detection light (second light) 16 by the spectral component 320 in the measurer 8 is converged on a line sensor. The line sensor or the optical receiver such as the imaging sensor 300 is referred to as a charge accumulation type optical receiver. For example, in the photodetector in the measurer 8, a continuous temporal change signal of the detected light intensity is obtained. In comparison with this, in the detection signal 6 obtained from the charge accumulation type optical receiver, only a discrete signal along the time series is obtained. Specifically, from the charge accumulation type optical receiver, as illustrated in FIG. 81(*a*), time is divided into measuring periods 1258 and data transmission periods 1254. Then, the detection signal 6 is transmitted in the data transmission periods 1254.

FIG. 81(*b*) illustrates a specific example of the measured signal 6 such as time-series data for each measurement wavelength in the spectral profile signal or time-series data for each pixel in the imaging sensor 300, and time-series data for each measurement wavelength in the spectral profile signal for each pixel in the imaging sensor included in the data cube. Since the data transmission periods 1254 are not measured, the signal is sent as intermittent rectangular (pulse-like) time-series data. Here, the signal form example or the data form example in FIG. 81(*b*) corresponds to the second measured signal constituent 106 transmitted from the signal receptor 40 in FIG. 78. Further, this corresponds to the waveform of K(t) on the left side of Equation 35.

FIG. 81(*c*) illustrates a waveform of the first measured signal constituent (reference signal constituent) 104 having only the AC signal obtained by removing (1212) the DC signal of the reference signal of FIG. 78. In addition, this waveform corresponds to "F(t)" described on the left side of Equation 32. FIG. 81(*d*) illustrates a result of product calculation for each passing time t1250 between FIGS. 81(*b*) and 81(*c*). The result of the product calculation means the output of the product calculation 1230 for wavelengths/pixels in FIG. 78, and indicates a waveform obtained by "F(t)×K(t)" described on the left side of Equation 37. In FIG. 81(*c*), since there is a time to take a "negative value", a period to take a "negative value" is also generated in the waveform of FIG. 81(*d*).

FIG. 81(*e*) illustrates a value of the finally obtained measurement information 1018. That is, here, the DC signal of the discrete signal in FIG. 81(*d*) is extracted using the action of the DC signal extractor 1236 for wavelengths/ pixels (electrical low pass filter having extremely narrow band width) in FIG. 78. The value of the measurement information 1018 represents a result of summating discrete signal values at every passing time t1250 illustrated in FIG. 81(*d*) at all the passing times t1250. Therefore, the value of the measurement information 1018 means the calculation result of Equation 38.

An embodiment example of the measurement information 1018 obtained by the experiment using the signal processing or the data analysis described above in Chapter 8 will be described below. As the measured object type (category) 102, a result of blood (mainly arterial flow) component (constituent element) analysis in vivo illustrated in FIG. 6 and FIG. 7 is exemplified. Here, a blood pulsation profile (time-dependent blood flow value) is extracted 82 as the first measured signal constituent (reference signal constituent) 104. The spectral profile of the detection light (second light) 16 obtained by transmitting the living body (forefinger) is measured as the second measured signal constituent 106. The second measured signal constituent 106 includes all information in the living body (forefinger).

A blood pulsation profile (time-dependent blood flow value) is used for the reference signal (first measured signal) 104 to perform lock-in processing (pattern matching or extraction of a constituent having a maximum correlation coefficient value) for deriving the calculation results of Equations 32 to 38. As a result, only the component profile (measurement information 1018) in the blood synchronized with the pulsation can be extracted. The embodiment of FIG. 78 was used in the signal processor and/or data analyzer 38 installed in the system controller 50 used here. In a conventional blood test, blood is collected using a syringe. Then, at the time of the blood collection, pain (strong pain) was given to the user. Since a method described below is a non-invasive method, there is an effect of greatly reducing the burden on the user.

Figure 82:
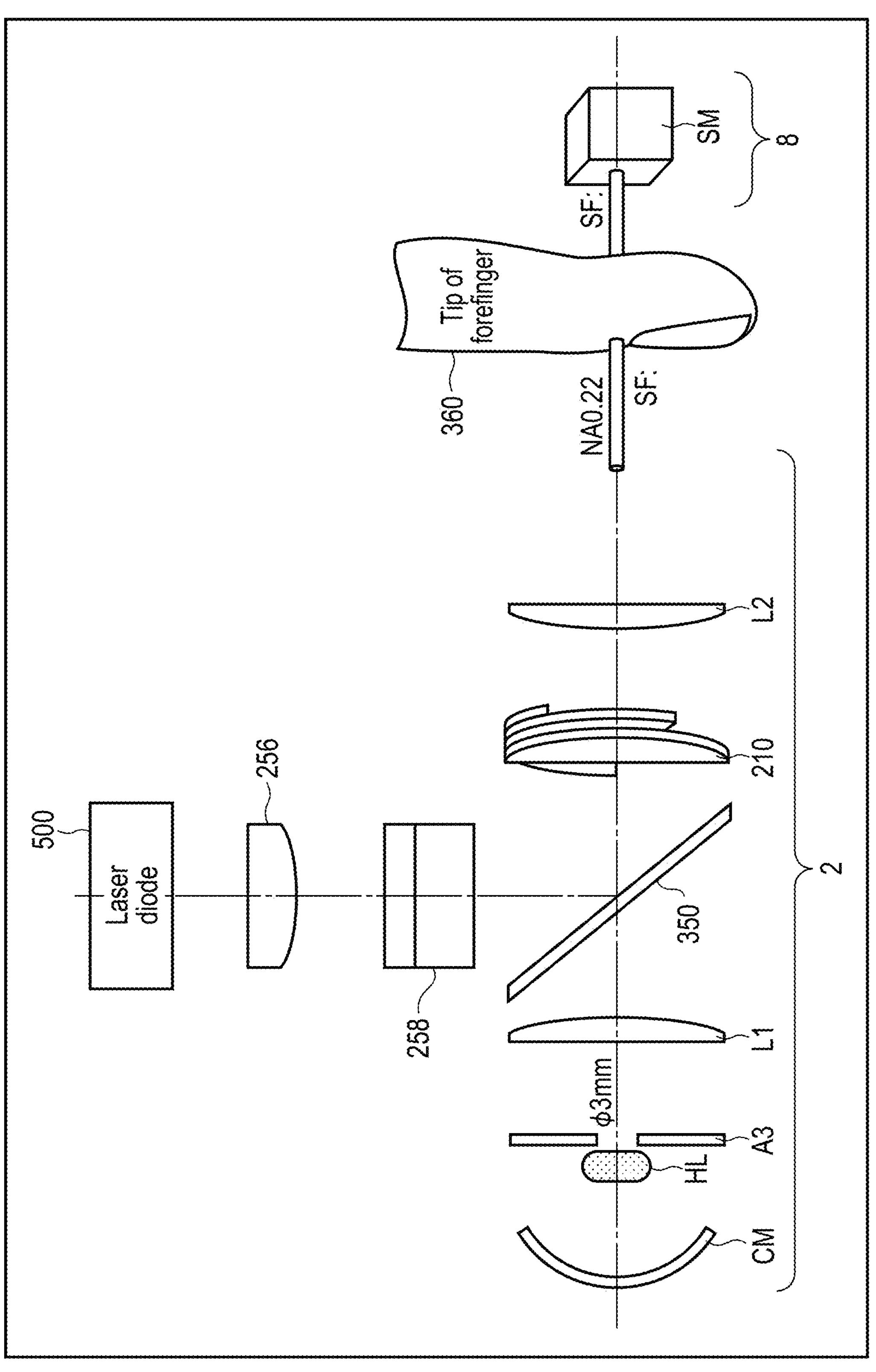
FIG. 82 is an explanatory diagram of an experimental optical system used in an experiment for signal processing/data analysis.

FIG. 82 illustrates the entire measurement system (or the inside of the optical device 10) including the optical arrangement in the light source 2 used for measurement, the measured object 22, and the measurer 8. A laser optical system was synthesized with the optical system described with reference to FIG. 44 using a dichroic mirror 350. Here, a point emission type single mode laser having an emission wavelength of 1330 nm was used for the laser diode 500.

A cylindrical lens effective against major axis 256 and a cylindrical lens effective against minor axis 258 were used for elliptical correction of the emitting light cross section of the laser diode 500. In addition, since the optical characteristic converting component 210 divided by eight angles is arranged in the middle of the optical path of the laser optical system, the optical interference noise generated in the laser light is also reduced.

An SI-type multimode single fiber SF having a core diameter of 0.6 mm guides the synthesized light to a tip of forefinger 360. Another SI-type multimode single fiber SF having a core diameter of 0.6 mm guides light (scattered light in the tip of forefinger 360) having passing through the tip of forefinger 360 to a spectrometer SM in the measurer 8. As described above, the tip of forefinger 360 is sandwiched between the two SI-type multimode single core fibers SF in a detachable manner. In this way, measurement was performed in a non-invasive manner.

Figure 83:
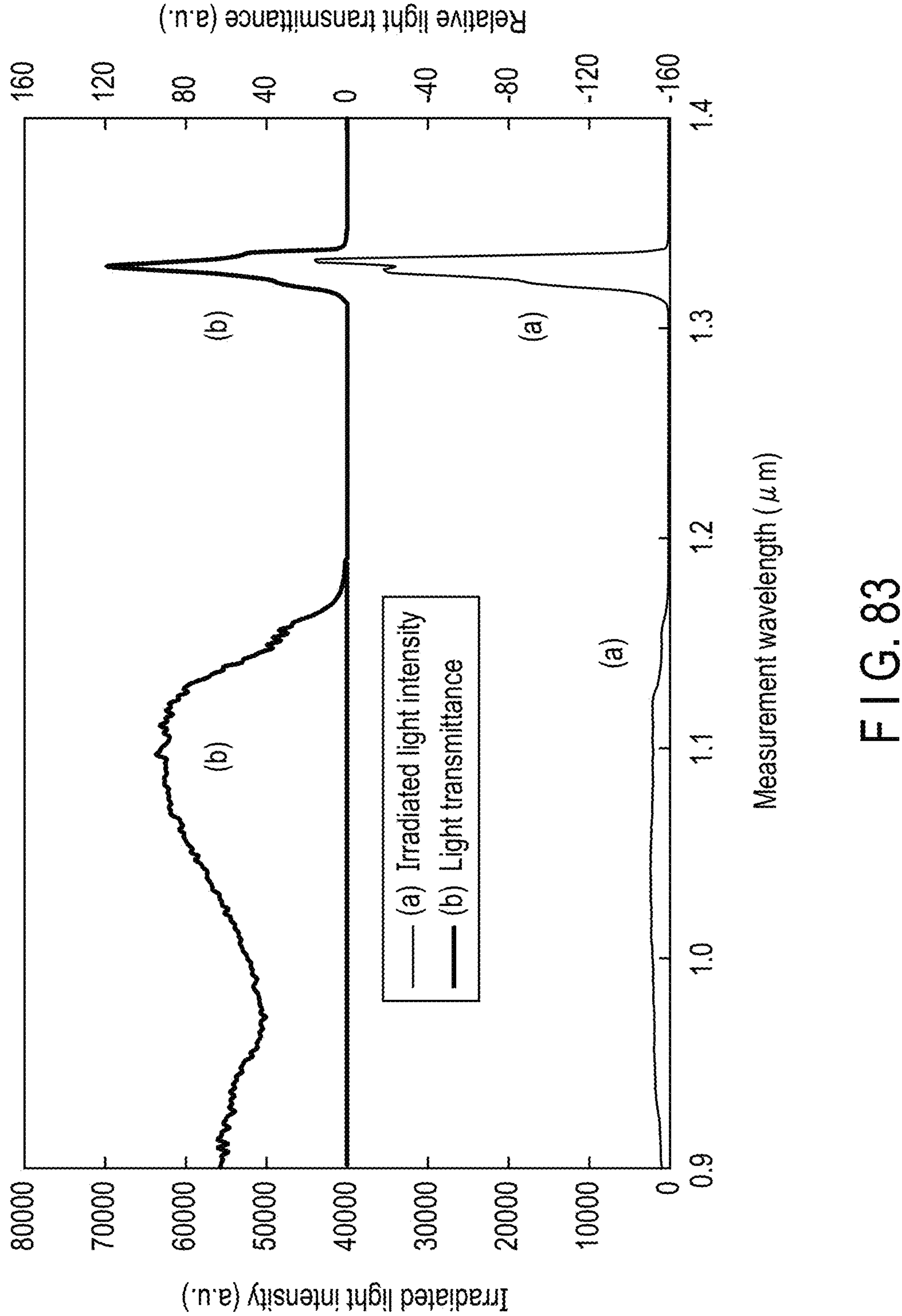
FIG. 83 illustrates spectral profiles of irradiated light and detection light with respect to the measured object.

FIG. 83(*a*) illustrates a spectral profile of the irradiated light (first light) 12 to the tip of forefinger 360. The emission light intensity 338 of laser light at an emission wavelength (1330 nm) is predominantly large. The pulsation of the blood flow flowing through the artery in the tip of forefinger 360 is detected using the laser light having the large emission light intensity 338. Note that the dichroic mirror 350 shields the long-wavelength side of the emitting light from a halogen lamp HL.

FIG. 83(*b*) illustrates a spectral profile of the light transmittance of the transmitted light (light emitted from the opposite side of the tip of forefinger 360 after repeated light scattering inside the tip of forefinger 360) transmitted through the tip of forefinger 360 corresponding to the detection light (second light) 16 obtained from the measured object 22. The spectral profile of the light transmittance indicates the spectral profile after the spectral profile of the transmitted light transmitted through the tip of forefinger 360 is normalized (divided) by the spectral profile of the irradiated light (first light) 12.

Figure 85:
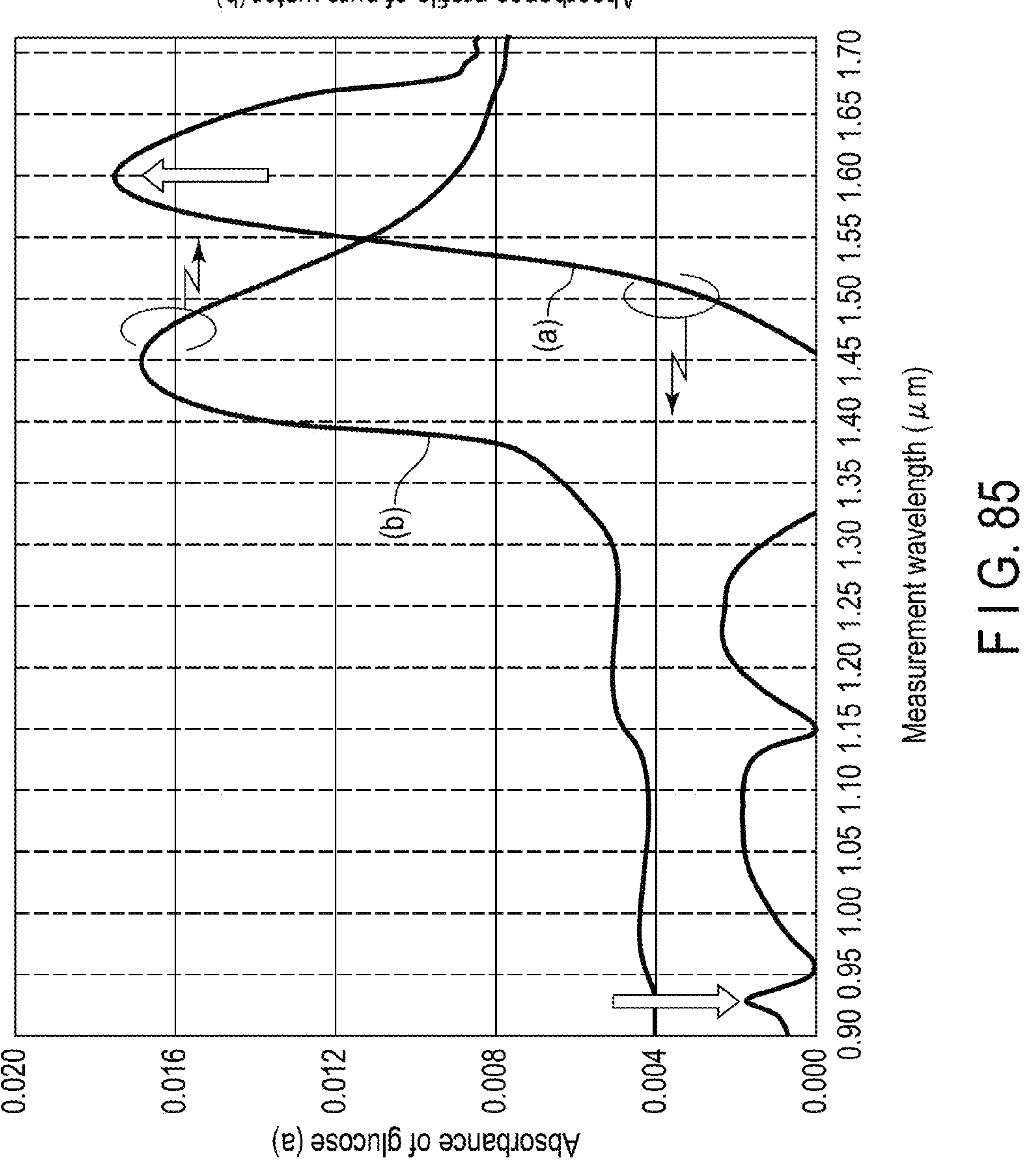
FIG. 85 is an explanatory diagram illustrating absorbance profiles of glucose dissolved in an aqueous solution.

As illustrated in FIG. 76 or FIG. 85(*b*), in vivo water greatly absorbs long-wavelength light. For this reason, the long-wavelength light is strongly absorbed by the water in the tip of forefinger 360, and does not come out from the opposite side of the tip of forefinger 360. Therefore, it is difficult to use the near infrared light on the long wavelength side as the detection light (second light) 16 in the measurement of the inside of the living body using the in vivo transmitted light.

As illustrated in FIG. 76 or 85(*b*), the wavelength range in which the light absorption amount of water is large is 1.3 μm or more. However, as illustrated in FIG. 85(*b*), the actual absorbance profile of water does not change rapidly with 1.3 μm as a boundary, but gradually increases in a wavelength range exceeding 1.3 μm. When the laser light intensity around a wavelength of 1330 nm and the halogen lamp HL light intensity at a wavelength of 1160 nm or less are compared between FIGS. 83(*a*) and 83(*b*), it can be seen that the laser light around a wavelength of 1330 nm is largely absorbed by the water in the tip of forefinger 360. However, when viewed from the spectral profile of the light transmittance in FIG. 83(*b*), a sufficient amount of light as the detection light (second light) 16 can be detected by the spectrometer for 1330 nm wavelength light (laser light).

As the first measured signal constituent (reference signal constituent) 104 used for detecting the pulsation from the blood flow, a measurable transmitted light intensity can be secured, and wavelength light largely absorbed by water is optimal. Meanwhile, wavelength light with large absorption of pure water is absorbed in the living body and is difficult to detect outside the living body. The absorbance profile of pure water in the first overtone area illustrated in FIG. 85(*b*) takes a maximum value in the vicinity of a wavelength of 1.45 μm. Therefore, it is considered that the wavelength of the pulsation detection light for the reference signal constituent (first measured signal constituent) 104 is appropriately 1.42 μm or less (desirably 1.38 μm or less).

Here, the pulsation profile is used to measure the content of each constituent 988 contained in the wavelength-separated blood. Therefore, when the constituent 988 of the biological system other than the pure water constituent is included in the reference signal constituent (first measured signal constituent) 104, the measurement accuracy decreases. For example, the absorption band of lipid in the second overtone area appears in the vicinity of 1.2 μm. Therefore, by setting a wavelength of 1.2 μm or more as a wavelength appropriate for extraction of the reference signal constituent (first measured signal constituent) 104, the measurement accuracy of the measurement information 1018 is improved.

From the above examination results, it is desirable that the wavelength range appropriate for pulsation detection in the blood flow is 1.20 μm to 1.42 μm (or 1.25 μm to 1.38 μm) in which light absorption is small in the first overtone area and the second overtone area in various biological system constituents 988.

The water amount contained in the fixing area in the living body (in the tip of forefinger 360) does not change at the passing time t1250 of a short time. However, in a blood vessel (particularly an artery), the value of blood flowing according to the pulsation and the thickness of the blood vessel change with the passing time t1250. When the blood vessel becomes thicker and the blood flow value increases, the amount of water absorbed in the blood vessel of the scattering light in the living body (in the tip of forefinger 360) increases. As a result, the intensity of transmitted light transmitted through the tip of forefinger 360 decreases. Therefore, the pulsation profile is observed from a change in the intensity of transmitted light from the tip of forefinger 360. The pulsation profile obtained by the change in the intensity of transmitted light shows a waveform slightly different from an electrical signal waveform obtained by the electrocardiogram. In the electrical signal waveform obtained by the electrocardiogram, a maximum value peak appears in one beat. In comparison with this, in the pulsation profile obtained by the change in the intensity of transmitted light, similar two vibrations are observed in one beat.

Incidentally, not only the pure water amount in the blood vessel changes according to the pulsation, but also the amounts of the various constituents 988 in the blood change at the same time. Therefore, the pulsation profile extracted from the change in the pure water amount in the blood flow is used as the first measured signal constituent (reference signal constituent) 104, and the measurement information 1018 in which the wavelength is separated for each constituent 988 included in the blood is obtained from the spectral profile of the detection light (second light) 16 obtained from the halogen lamp HL.

In addition, although the tip of forefinger 360 is used as the measurement location in FIG. 82, the measurement is not limited thereto, and the measurement may be performed at any location as long as the pulsation can be detected. Furthermore, the pulsation measurement location (the measurement location of the first measured signal constituent 104) and the measurement location of the constituent 988 in the blood (the measurement location of the second measured signal constituent 106) may be different.

Further, in FIG. 82, the tips of the two SI-type multimode single core fibers SF are in direct contact with the tip of forefinger 360. However, the present invention is not limited thereto, and for example, measurement may be performed in a non-contact manner. As a non-contact method, for example, the irradiated light (first light) 12 may be converged on the surface of the living body (measured object 22) to be measured, and the detection light (second light) 16 obtained from the back surface of the living body (measured object 22) may be imaged on the surface of the imaging sensor 300. Alternatively, the irradiated light (first light) 12 may be converged on the surface of the living body (measured object 22) to be measured, and the detection light (second light) 16 (that is, a reflected light beam in the vicinity of the surface of the living body) obtained from the surface of the living body (measured object 22) may be imaged on the surface of the imaging sensor 300.

In such non-contact measurement, measurement accuracy is likely to decrease due to the influence of disturbance light. As a countermeasure, modulation along the passing time t1250 may be added to the emission light intensity 338 of the irradiated light (first light) 12, and only the measurement information 1018 synchronized with the modulation signal may be extracted from the measured signal 6 as illustrated in FIGS. 79 and 80. Specifically, the first measured signal constituent (reference signal constituent) 104 is extracted from the emitted light intensity modulation signal 1228 in FIG. 79 or 80, and the transmittance profile for each wavelength light of 1.16 μm or less obtained from the spectrometer SM is used as the second measured signal constituent 106. As a method for changing the emitted light intensity of the irradiated light (first light) 12 along the passing time t1250, for example, a transmitted light intensity control component such as a liquid crystal shutter may be installed in the light source 2 in FIG. 82. Alternatively, the light emitter 470 may be controlled using an emitted light intensity control circuit described later with reference to FIG. 111.

For an adult human, the pulsation cycle is often around 1 second. Therefore, it is desirable to set the modulation frequency related to the emission light intensity 338 of the irradiated light (first light) 12 to 10 Hz that is 10 times thereof or more, or 100 Hz that is 100 times thereof or more. A case where the modulation frequency is used for the reference signal constituent (first measured signal constituent) 104, and the measurement information 1018 is calculated by performing the signal processing (data analysis) of Equations 32 to 38 will be considered. Here, when the modulation frequency and the pulsation frequency are set to greatly deviate from each other, and a time integration cycle $\tau$ in Equation 38 is set to be significantly smaller than a pulsation cycle (about 1 second), pulsation related information remains in the measurement information 1018. Next, the pulsation profile may be used for the reference signal constituent (first measured signal constituent) 104, and the signal processing (data analysis) of Equations 32 to 38 may be performed to calculate the measurement information 1018. When the signal processing or the data analysis is repeatedly executed as described above, it is possible to perform highly accurate measurement related to the content of each biological system constituent 988 in the blood.

Figure 84:
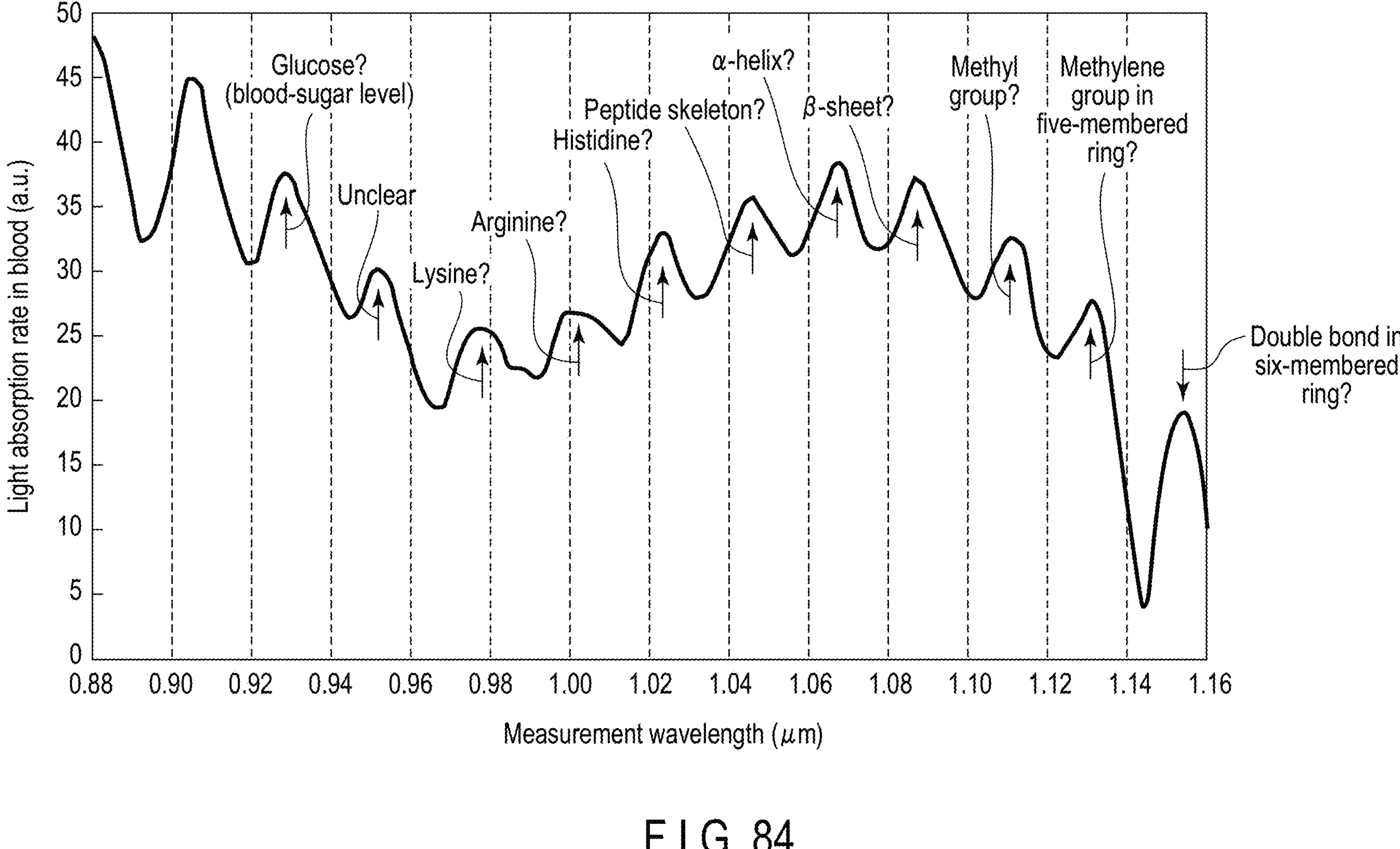
FIG. 84 illustrates an example of signal processing/data analysis results in the present embodiment.

FIG. 84 illustrates an example of the measurement information 1018 obtained by performing the calculation of Equations 32 to 38 in the signal processor and/or data analyzer 38 illustrated in FIG. 78. A horizontal axis in FIG. 84 indicates a measured wavelength value. In addition, a vertical axis in FIG. 84 represents a light absorption rate in the blood at the linear scale. Here, as the vertical axis value increases, the light absorption amount increases. The waveform in FIG. 84 has an uneven shape in the measurement wavelength direction, and each peak corresponds to the center wavelength for each individual absorption band. It can be seen that the constituents 988 in the blood are wavelength-separated as absorption bands different from each other.

Note that a lower envelope characteristic in FIG. 84 takes a minimum value in the vicinity of a measurement wavelength of 0.97 μm. A maximum value is taken in the vicinity of 1.08 μm. The increase/decrease characteristic of the lower envelope tracing minimum values corresponding to the change in the measurement wavelength shows a tendency that the increase/decrease direction is reversed from the light absorption rate characteristic of pure water illustrated in FIG. 85(*b*). This is because the pulsation profile is extracted from the time change related to the increase/decrease amount of the water constituent in the blood flow, and there is a possibility that the light absorption rate characteristic of the water constituent in the blood is removed in FIG. 84.

It is expected that an absorption band assigned to amino acid having base residue appears within a measurement wavelength range of 0.97 μm to 1.03 μm. Here, the center wavelength of the absorption band decreases in the descending order of the number of hydrogen atoms bonded to the nitrogen atom present at the center in the atomic group. That is, the number of hydrogen atoms bonded to the nitrogen atom is 3 for lysine, 2 for arginine, and 1 for histidine. In addition, during the in vivo reaction (chemical reaction between biological substances), the amino acid having base residue and an anion such as a γ phosphate group may be hydrogen-bonded. At this time, the center wavelength value of the absorption band shifts to the long wavelength side. Therefore, when the center wavelength change (shift to the long wavelength side) of the absorption band assigned to the amino acid having base residue is observed, the in vivo reaction can be analyzed.

Similarly to the case where the center atom is the nitrogen atom, the center wavelength of the absorption band decreases in the descending order of the number of hydrogen atoms bonded to the carbon atom present at the center in the atomic group. An atomic group having three hydrogen atoms bonded to a nitrogen atom is referred to as a methyl group, and an atomic group having two hydrogen atoms is referred to as a methylene group. In FIG. 84, the center wavelength of the absorption band assigned to the methyl group appears in the vicinity of a measurement wavelength of 1.11 μm. Although not illustrated, other experimental results show that the center wavelength of the absorption band assigned to the methylene group appears in the vicinity of a measurement wavelength of 1.20 μm.

In addition, it is expected that a secondary structure of protein is observed within a measurement wavelength range of 1.03 μm to 1.10 μm. In the secondary structure of the protein, a hydrogen bond occurs between a "hydrogen atom bonded to a nitrogen atom" and an "oxygen atom double-bonded to a carbon atom". A peptide skeleton portion in which this hydrogen bond does not occur has the shortest center wavelength of the absorption band. On the other hand, the hydrogen bond distance between the hydrogen atom and the oxygen atom becomes shorter as the β-sheet structure is taken from the α-helix structure as the secondary structure. As a result, the center wavelength of the absorption band becomes longer as the β-sheet structure is taken from the α-helix structure.

As described above, the absorbance profiles within the measurement wavelength range of 0.97 μm to 1.10 μm may be measured to identify the amino acid having base residue and the protein structure in the measured object 22 or observe the biological reactions. For reference, as illustrated in FIG. 76, in the measurement wavelength range of 1.45 μm to 1.58 μm, an absorption band related to the amino acid having base residue and the protein structure in the first overtone area is observed. Therefore, identification of the amino acid having base residue and the protein structure or observation of the biological reactions may be performed using the absorbance profiles observed within the wavelength range.

An absorption band based on atomic group vibration in which a carbon atom is arranged at the center is observed in a wavelength range of 1.1 μm to 1.25 μm in the second overtone area and in a wavelength range of 1.65 μm to 1.8 μm in the first overtone area. The center wavelength of the absorption band assigned to the methyl group appears in the vicinity of 1.11 μm in the second overtone area and in the vicinity of 1.63 μm in the first overtone area. For reference, the center wavelength of the absorption band in the first overtone area assigned to the methylene group appears in the vicinity of 1.72 μm.

In the absorbance value of the absorption band within the range of 0.97 μm to 1.12 μm assigned to the atomic group described above, individual differences and time variations among users are relatively small. In comparison with this, a blood-sugar level corresponding to the content of glucose contained in the blood has large individual differences and time variations. In addition, the content of cortisol in the blood also changes according to the stress state of the user. Therefore, the individual difference or the temporal change amount of the difference value up to the maximum value of the absorption band related to glucose or cortisol may be measured with reference to the absorbance profile (or the upper envelope of absorbance) in the wavelength range (for example, a linear change area including a range of 0.94 μm to 1.12 μm, desirably a range of 0.96 μm to 1.10 μm, or a range of 0.98 μm to 1.07 μm) corresponding to the in vivo constituent 988 having relatively small individual difference or temporal variation among users. As a result, the individual difference of the blood-sugar level and the temporal change of the user stress may be measured to provide a service for the user.

As a form of service provision to the user, insulin administration may be urged to a user or a doctor in charge when the blood-sugar level abnormally increases, or a food providing service for a hungry user, a decrease in the intensity of illumination light for a high-stress user, or provision of music for calming the mind may be performed.

During the experiment related to FIG. 84, the temporal change of the light absorption amount was observed in the vicinity of 1.13 μm and the vicinity of 1.15 μm. It is estimated that the center wavelength of the absorption band assigned to a methylene group in a five-membered ring contained in cortisol appears in the vicinity of 1.13 μm. In addition, it is estimated that a vibration mode of the hydrogen atom bonded to a double bond carbon atom in a six-membered ring contained in cortisol appears in the vicinity of 1.15 μm. Therefore, there is a possibility that the cortisol content in the blood can be predicted by measuring the temporal change of the light absorption amount (or the upper envelope of absorbance) in the wavelength range of 1.10 μm to 1.20 μm with reference to the light absorption amount in the wavelength range corresponding to the in-vivo constituent 988 having relatively small individual differences and temporal variation among users. As a result, a stress state (or an excitement state or a concentration state) of the user in real time may be estimated, and an appropriate service may be provided.

FIG. 85(*a*) illustrates absorbance profiles of glucose in an aqueous solution. In this measurement, the experimental system (optical device 10) described in FIG. 75 was used. Further, the absorbance profiles of pure water are superimposed and displayed in FIG. 85(*b*). Here, the measured signal 6 (spectral profile signal) obtained using the spectral component 320 in the measurer 8 was subjected to the pure water constituent removal processing and the like described in Chapter 7 by the signal processor and/or data analyzer 38 to calculate the measurement information 1018 in FIG. 85(*a*).

In FIG. 85(*a*), the absorbance of glucose does not take a positive value in the wavelength range of 1.32 μm to 1.46 μm. Since glucose has high hydrophilicity, the water solvent in the aqueous glucose solution hardens (the hydrogen bonding ratio between water molecules increases). When the absorbance profiles of pure water (having a relatively low hydrogen bonding ratio between water molecules) are subtracted from the absorbance profiles of the glucose aqueous solution, the influence of hardening of the water solvent appears. The wavelength range of 1.32 μm to 1.46 μm does not affect the absorbance profiles of glucose. Therefore, the fact that the absorbance of glucose does not take a positive value in the wavelength range of 1.32 μm to 1.46 μm has no influence on the absorption band characteristic measurement of glucose in the first overtone area and the second overtone area.

As illustrated in FIG. 85(*a*), the center wavelength of the absorption band of glucose in the aqueous solution appears in the vicinity of 1.6 μm in the first overtone area. In the second overtone area, the center wavelength appears in the vicinity of 0.93 μm. Therefore, the blood-sugar level change may be estimated by the magnitude of the maximum absorbance (or the maximum absorption rate or the area of the entire absorption band) of the absorption band appearing in the wavelength range of 0.9 μm to 1.0 μm based on the light absorption amount in the wavelength range corresponding to the in-vivo constituent 988 in which individual differences and time variations of users are relatively small, and an appropriate service may be provided.

Assignment (identification of a corresponding atomic group) for each absorption band appearing by wavelength separation in the absorbance spectrum (absorbance profile) illustrated in FIG. 84 can be estimated not only from the correspondence with experimental data such as FIG. 85 but also from theoretical calculation. In JP 2019-015709 A, detailed theoretical formula development is described. Here, an excerpt thereof will be described. The group vibration (interatomic vibration) in the atomic group absorbs a prescribed wavelength light that belongs to the near infrared light having a wavelength range of 0.8 μm to 2.5 μm. In the group vibration, one to three peripheral hydrogen atoms bonded to the center atom simultaneously vibrate.

The center atom and the peripheral hydrogen atom(s) in the atomic group have different electronegativity. Therefore, an imbalance of electric charge distribution in an electron orbit involved in the covalent bond occurs. The magnitude and direction of the imbalance of electric charge distribution represents a dipole moment vector "μ". The vibration amplitude of the electric field in the irradiated light (first light) 12 represents "E". And the center frequency of the irradiated light (first light) 12 is described as "ν".

The interatomic distance between the center atom and each hydrogen atom at a position where the total energy value of the entire atomic group at rest is minimized is taken as a standard. It is assumed that all the hydrogen atoms constituting the atomic group are simultaneously changed by x from the standard distance. Here, in the symmetrical stretching, the polarity of x for each hydrogen atom is matched. In the asymmetrical stretching, the polarity of x for each hydrogen atom is reversed. An equation of one intra atomic group vibration in this calculation model can be expressed by an approximate expression as follows.

$$i\hbar\frac{\partial}{\partial t}\phi_X = \left\{-\frac{\hbar^2}{2M_X}\frac{\partial^2}{\partial x^2} + \kappa_2x^2 + \kappa_3x^3 + \kappa_4x^4 - (E\cdot\mu)\exp(-i2\pi\nu t)\right\}\phi_X \quad \text{Equation 39}$$

A similar equation can be established for the deformation. However, since the light absorption amount by the deformation is small (about half of the light absorption amount by the symmetrical/asymmetrical stretching), only the stretching is considered as an approximation. The converted mass $M_X$ in Equation 39 is given by follows.

$$M_X \equiv nM_H\left(1 - \frac{M_H}{M_C + nM_H}\right) \quad \text{Equation 40}$$

In Equation 40, a variable n represents the number of hydrogen atoms contained in the atomic group. In addition, $M_C$ and $M_H$ represent the mass of a center atom and the mass of a hydrogen atom in the atomic group, respectively. An eigen value of energy of the wave function depends on perturbation calculation, and becomes as follows.

$$\varepsilon_m \cong \underline{\varepsilon_m} + \langle \underline{m}|\kappa_3x^3 + \kappa_4x^4|\underline{m}\rangle = \frac{2\kappa_2}{\beta}\left(m + \frac{1}{2}\right) + \frac{3\kappa_4}{4\beta^2}(2m^2 + 2m + 1) \quad \text{Equation 41}$$

A variable "β" used here is given as follows.

$$\beta \equiv \sqrt{2M_X\kappa_2}/\hbar \quad \text{Equation 42}$$

Incidentally, "$\varepsilon_0$" in Equation 41 corresponds to a ground state. The excitation energy from the ground state to the excited state corresponds to the frequency of the absorbed light. Therefore, from Equation 41, a following relation is established.

$$h\nu_m = \varepsilon_m - \varepsilon_0 = \frac{2\kappa_2}{\beta}m + \frac{3\kappa_4}{2\beta^2}(m^2 + m) \quad \text{Equation 43}$$

The frequency "$\nu_1$" when "m=1" is substituted in Equation 43 corresponds to the normal vibration. In addition, "$\nu_2$" and "$\nu_3$" correspond to the first overtone frequency and the second overtone frequency, respectively.

In a molecular structure of sugar such as glucose, a carbon atom constituting a six-membered ring or a five-membered ring is bonded to a hydroxyl group. Since the electronegativity of oxygen atoms is high, a strong repulsive force acts between hydroxyl groups. Due to an influence of the strong repulsive force between the hydroxyl groups, the 3D shape of the carbon atom skeleton constituting a six-membered ring or a five-membered ring is slightly distorted. Furthermore, the hydroxyl group arranged across the carbon atom strongly attracts the hydrogen atom arranged on the opposite side. As a result, regarding the hydrogen atoms in the sugar, a value of a coefficient "$\kappa_4$" in Equation 39 becomes abnormally large. Conversely, the value of the coefficient "$\kappa_4$" corresponding to the atomic group having a nitrogen atom or a carbon atom at the center takes a smaller value than that of the hydrogen atom in the sugar.

For this reason, nonlinearity in Equation 43 becomes strong for sugar such as glucose. As a result, the wavelength ranges occupied by the sugar in the first overtone area and the second overtone area illustrated in FIG. 76 are different. That is, in the first overtone area, the sugar occupies a wavelength range between the lipid and the protein. On the other hand, in the second overtone area, the sugar occupies a shorter wavelength range than the protein.

When molecular structure analysis software using molecular orbital calculation is used, molecular structure optimization calculation in an arbitrary atomic group can be executed. First, the atomic arrangement in the atomic group to be examined is optimally calculated. Next, an energy change amount of the entire atomic group when the distance between the center atom and the hydrogen atom is changed at a constant interval is plotted. Next, the plotted result is superimposed on a potential energy term ($\kappa_2 x^2+\kappa_3 x^3+\kappa_4 x^4$) in Equation 39. Then, respective coefficient values "$\kappa_2$", "$\kappa_3$", and "$\kappa_4$" are fitted so as to be matched with a plotted curve. Then, when the respective coefficient values are substituted into Equation 42 and Equation 43, the values of the frequencies "$\nu_2$" and "$\nu_3$" of the absorbed light can be calculated by theoretical calculation. In an atomic group having high nonlinearity (having a large value of the coefficient "$\kappa_4$") in Equation 43 like the sugar, the above calculation method is effective.

On the other hand, when the coefficient value of "$\kappa_4$" is relatively small in Equation 43, the linearity with respect to the value of the variable m becomes high. With respect to the atomic group other than the sugar, the center wavelength value of the absorption band in the second overtone area can be easily estimated using the linearity described above. Many molecular structure analysis software using the molecular orbital calculation can calculate the excitation light frequency of the normal vibration. However, in many molecular structure analysis software, the excitation light frequency of the normal vibration is calculated using a classical dynamic model. For each different atomic group, the excitation light frequency of the normal vibration calculated by the molecular structure analysis software is arranged in descending order. When the linearity in the above Equation 43 is high (when the coefficient value of "$\kappa_4$" is small), this arrangement order is similarly maintained in both the first overtone area and the second overtone area.

By using this method, the correspondence (assignment relation of the absorption band) between the center wavelength of the absorption band in the first overtone area and the second overtone area and the corresponding atomic group can be predicted only by calculating only the excitation light frequency of the normal vibration using the molecular structure analysis software. Then, by combining the calculation results of the above two methods and experimental data using known molecules, a correspondence relation (assignment relation) of atomic groups for each absorption band in FIG. 84 is predicted.

Actually, the center wavelength of the absorption band greatly changes due to changes in hardness (hydrogen bonding ratio) and temperature of water in blood, acidity/alkalinity in an aqueous solution, and the like. Therefore, the corresponding atomic group information described in FIG. 84 is merely within the assumed range. The corresponding wavelength changes to some extent due to a difference in measurement environment.

FIG. 86 illustrates an embodiment example of a system (or the optical device 10) that measures only the content of a specific molecule in blood. Since the halogen lamp HL having a high temperature and the expensive spectrometer are not used, an effect of facilitating miniaturization and cost reduction is produced. As illustrated in the example of FIG. 84, the absorption band for each biological system constituent 988 appears by being wavelength-separated for each corresponding wavelength. Therefore, in a case where only the predetermined content of the biological system constituent 988 is measured, the measurement can be performed only by a combination of the light emitter 470 having a wavelength range in which the corresponding absorption band appears and the photodetector 250 corresponding to the wavelength range thereof.

When a plurality of light emitters 470 are required, emitting light from the light emitters 470 may be synthesized by dichroic mirrors 350-1 and 350-2 inside the light source 2. In addition, in a case where it is desired to separate and detect each biological system constituent 988 to be measured, the wavelength range to be measured may be separated and extracted using optical band pass filters 248-1 and 248-2 and the like in the measurer 8.

As the light emitter 470 for measuring the pulsation profile of the blood flow corresponding to the first measured signal constituent (reference signal constituent) 104, the laser diode 502 having a center wavelength within a range of 1.2 μm to 1.45 μm is prepared. The dichroic mirror 350-2 synthesizes the divergent emitting light from here with light of another wavelength in the middle of the optical path after the collimator lens 318-3 converts the divergent emitting light into parallel light, and the optical characteristic converting component 210 reduces the temporal coherence between the elements.

The converging lens 330 converges the synthesized light at the inlet of the optical fiber 326, and the optical fiber 326 guides the synthesized light to the tip of forefinger 360. The optical fiber 326 guides the detection light (second light) 16 emitted from the rear side of the tip of forefinger 360 after scattering in the tip of forefinger 360 into the measurer 8. The collimator lens 318-4 converts divergent light immediately after the emission of the optical fiber 326 into parallel light.

The band pass filter 248-1 separates and extracts wavelength light within a range of 1.2 μm to 1.45 μm from the parallel light, and directs the wavelength light to a photodetector detecting blood pulsation profile obtained from L.D. light 474. A pulsation profile extractor from the blood flow 742 in the signal processor and/or data analyzer 38 installed in the system controller 50 extracts the pulsation profile from the measured signal 6 obtained here. This pulsation profile is used as the first measured signal constituent (reference signal constituent) 104.

An LED 508 including light having a wavelength within a range of 0.9 μm to 1.0 μm is used in the light emitter 470 used for measuring the glucose content in the blood. This wavelength light passes through an optical path similar to that described above, and then reaches a photodetector 476 detecting Glucose absorption band. The measured signal 6 from the photodetector 476 is input to a signal processor 748 utilizing lock-in detection and/or amplifier, and the output thereof is determined in an estimator 750 for Glucose constituent content. Service provision is performed to the user based on the determination result. Note that, in the signal processor 748 utilizing lock-in detection and/or amplifier, the processing described in FIG. 78 and notification to the user are performed using the output signal of the pulsation profile extractor from the blood flow 742 as a reference signal.

An LED 506 including light having a wavelength within a range of 1.1 μm to 1.2 μm is used in the light emitter 470 used for measuring the cortisol content in the blood. This wavelength light passes through an optical path similar to that described above, and then reaches a photodetector 478 detecting Cortisol absorption band. The measured signal 6 obtained here is transmitted to an estimator 760 for Cortisol constituent content via a signal processor 746 utilizing lock-in detection and/or amplifier.

Also in the signal processor 746 utilizing lock-in detection and/or amplifier, processing similar to that of the signal processor 748 utilizing lock-in detection and/or amplifier is performed. The cortisol content in the blood changes in real time according to the stress, tension, and concentration of the user. There is an effect that an appropriate service according to the user's feeling estimated by the estimator 760 for Cortisol constituent content can be provided in real time.

In FIG. 86, an LED 508 including light having a wavelength within a range of 0.9 μm to 1.0 μm is used for detecting the content (blood-sugar level) of the glucose constituent in the blood. On the other hand, an emission wavelength of a VCSEL of a surface emission type laser diode having high output currently commercially available is often about 0.94 μm. Therefore, a VCSEL having a high output characteristic may be used instead of the LED 508 including the wavelength light in the range of 0.9 μm to 1.0 μm. As a result, since the irradiated light intensity around 0.94 μm increases, there is an effect that the detection accuracy of the content (blood-sugar level) of the glucose constituent in the blood is improved.

Note that, although FIG. 86 illustrates the contact-type detection method, performing the non-contact measurement described above significantly reduces the burden on the user. Further, FIG. 86 illustrates an optical system that causes three different light emitters 470 to simultaneously emit light. However, when it is not necessary to simultaneously measure the high-speed change, the light emission of the three light emitters 470 may be switched according to the passing time t1250. In this case, only one light emitter 470 emits light at the same time. Therefore, wavelength separation using the band pass filter 248 becomes unnecessary, and the content of the biological system constituents 988 can be measured by one photodetector 250. As described above, when the light emission of the light emitters 470 that emit different wavelength light is switched according to the passing time t1250, the optical system is further simplified, and an effect of enabling the measurer 8 to be small, light, and inexpensive is produced.

Chapter 9: Example of 3D imaging using spatial propagation speed of light

An embodiment application example in which the processing method and the analysis method in the signal processor and/or data analyzer 38 described in Chapter 8 are applied to another optical application field 100 will be described in Chapter 9. A TOF camera is known as 3D imaging using a spatial propagation speed of light. As the present embodiment application example, an application example to the TOF camera will be described. In addition, in the application example of Chapter 9, the irradiated light (first light) 12 described in Chapters 3 to 5 may be used.

Figure 87:
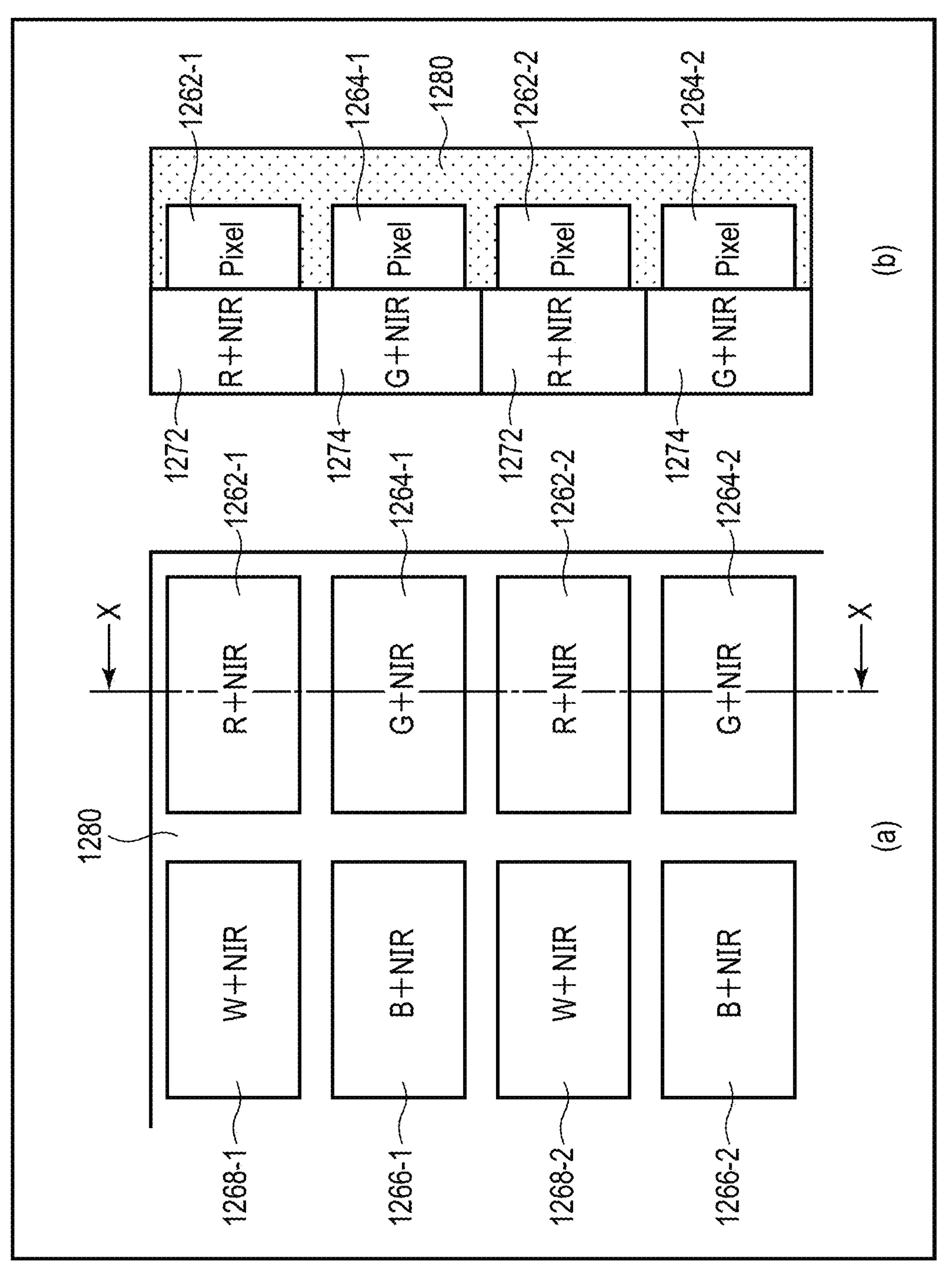
FIG. 87 is an enlarged view of an inside of an imaging sensor used in the present embodiment.

FIG. 87 illustrates a structure of a 3D color image sensor 1280 (which can correspond to length measurement). Various optical filters 1272 and 1274 are arranged on the surface of each of the pixels 1262 and 1264 to be imaged, and wavelength limitation is applied to light that can reach each of the pixels 1262 and 1264 to be imaged.

That is, immediately before pixels 1262-1 and 1262-2 detecting red and near infrared light, optical band pass filters 1272 adjusted to red and near infrared light are installed. In addition, immediately before pixels 1264-1 and 1264-2 detecting green and near infrared light, optical band pass filters 1274 adjusted to green and near infrared light are installed. In addition, immediately before pixels 1266-1 and 1266-2 detecting blue and near infrared light, optical band pass filters adjusted to blue and near infrared light are installed. Similarly, immediately before pixels 1268-1 and 1268-2 detecting white and near infrared light, optical band pass filters adjusted to white and near infrared light are installed. Here, near infrared laser light is used for distance measurement (length measurement) using laser light.

Figure 88:
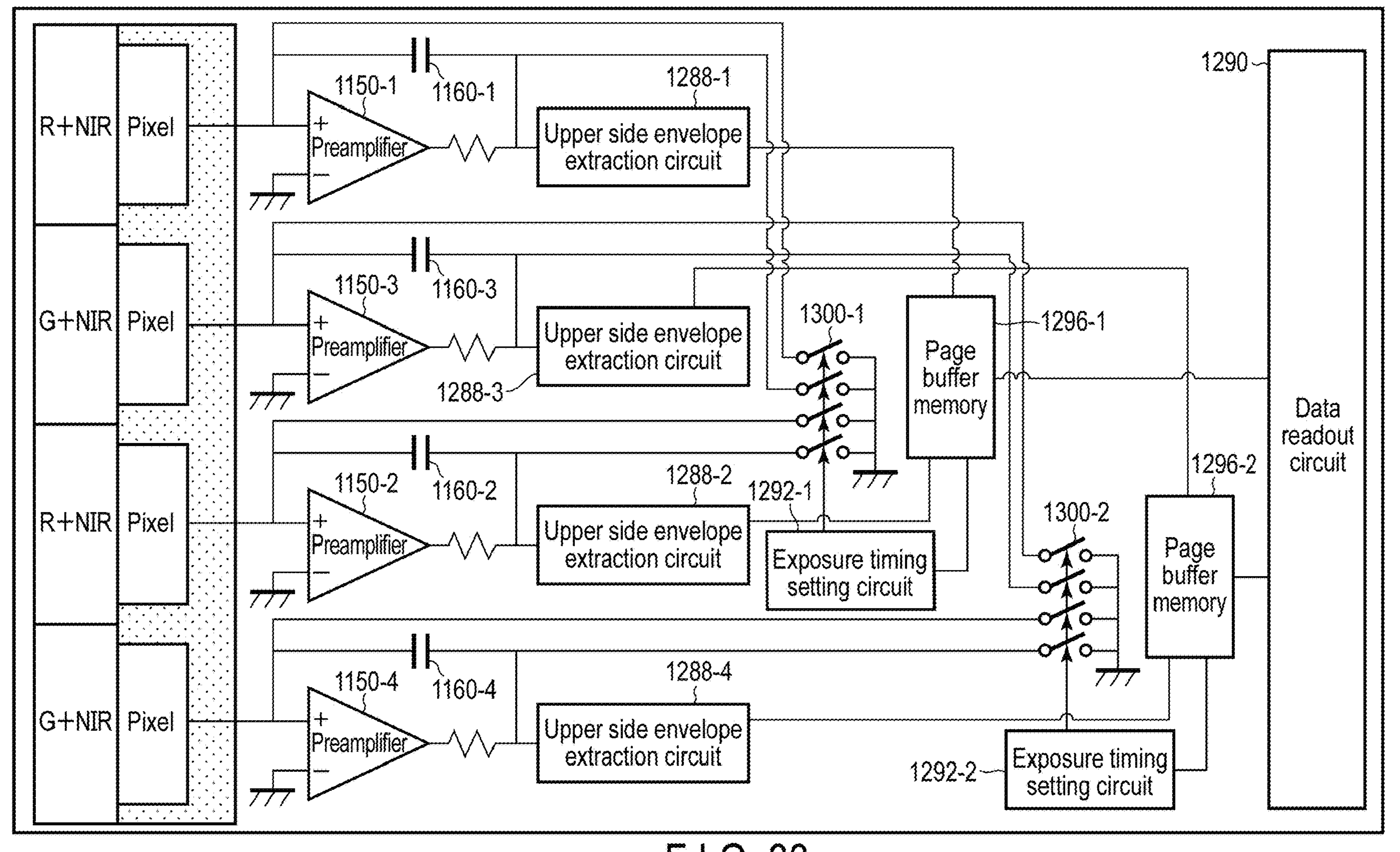
FIG. 88 is a partial explanatory diagram of a drive circuit in the imaging sensor used in the present embodiment.

FIG. 88 illustrates (an equivalent circuit of) an electronic circuit in the 3D color image sensor 1280. Preamplifiers 1150-1 and 1150-2 are connected to the pixels 1262-1 and 1262-2 detecting red and near infrared light, respectively. Preamplifiers 1150-3 and 1150-4 are connected to the pixels 1264-1 and 1264-2 detecting green and near infrared light, respectively. During an exposure period, charges are accumulated in capacitors 1160-1 to 1160-4 according to detection signals of the preamplifiers 1150-1 to 1150-4.

Interlocking switches 1300-1 and 1300-2 are separately interlocked and turned on/off according to the exposure time and the non-exposure time. The ON/OFF timings of the interlocking switches 1300-1 and 1300-2 are controlled by exposure timing setting circuits 1292-1 and 1292-2. Here, at the time of exposure, the interlocking switches 1300-1 and 1300-2 are separately disconnected, and charges are accumulated in the capacitors 1160-1 to 1160-4 which the preamplifiers 1150-1 to 1150-4 correspond to. Further, at the time of non-exposure, the interlocking switches 1300-1 and 1300-2 are separately disconnected, and detection signals from the respective pixels 1262-1 and 1262-2, and 1264-1 and 1264-2 in the 3D color image sensor 1280 are emitted toward a ground line. At the same time, the charges accumulated in the capacitors 1160-1 to 1160-4 are discharged.

Upper side envelope extraction circuits 1288-1 to 1288-4 are individually connected to the preamplifiers 1150-1 to 1150-4. At the exposure end timing, output voltages of the upper side envelope extraction circuits 1288-1 to 1288-4 are temporarily stored in page buffer memories 1296-1 and 1296-2. In addition, output voltage data temporarily stored in the page buffer memories 1296-1 and 1296-2 periodically moves to the outside via a data readout circuit 1290.

In the electronic circuit of FIG. 88, the detection signals are temporarily stored in the page buffer memories 1296-1 and 1296-2 at each exposure timing. When the page buffer memories 1296-1 and 1296-2 are arranged in which the detection signals can be stored at each exposure timing, an effect of stably detecting detection signals in a very short exposure period is produced.

Figure 89:
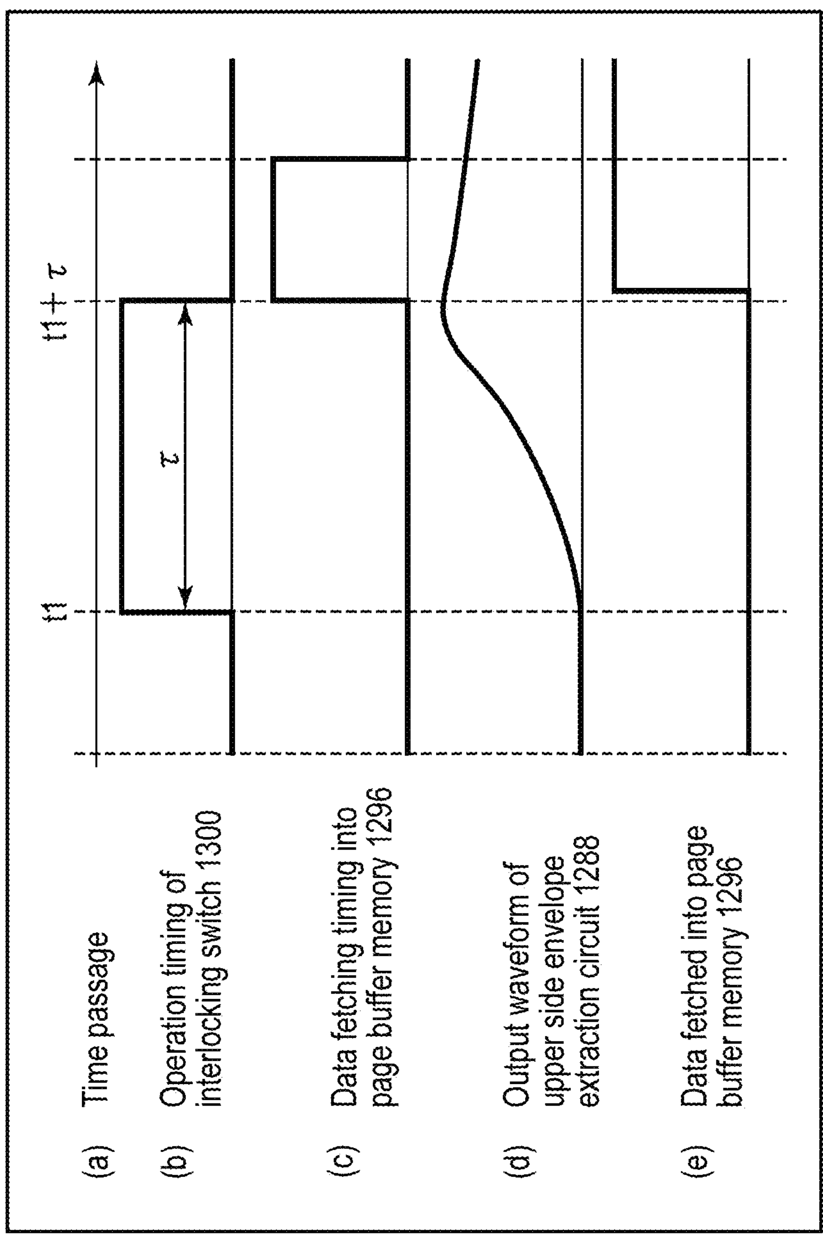
FIG. 89 illustrates operation timings in the drive circuit described with reference to FIG. 88.

FIG. 89 illustrates control timing of the exposure timing setting circuit 1292 in FIG. 88. The exposure period (that is, a period in which the preamplifier 1150 continues to transmit a signal in which the detection signals from the pixels 1262 and 1264 in the 3D color imaging sensor are stored in the capacitor 1160 to the upper side envelope extraction circuit 1288) in FIG. 88 is defined as T. Then, the connection of the interlocking switch 1300 is cut off (FIG. 89(*b*)) only while time elapses from time t1 to t1+τ (FIG. 89(*a*)).

FIG. 89(*c*) illustrates timing at which the output of the upper side envelope extraction circuit 1288 is fetched into the page buffer memory 1296. In this way, immediately after the end of the exposure period τ, the output is fetched into the page buffer memory 1296.

FIG. 89(*d*) illustrates an output signal waveform of the upper side envelope extraction circuit 1288 before and after the exposure period. Since the charge amount accumulated in the capacitors 1160-1 to 1160-4 before the exposure period is "0", an output signal of the upper side envelope extraction circuit 1288 is held in a state of "0". At the exposure period, charges start to be accumulated in the capacitors 1160-1 to 1160-4, so that the output signal of the upper side envelope extraction circuit 1288 starts to increase. Charges in the capacitors 1160-1 to 1160-4 are discharged immediately after the end of the exposure period τ, but the upper side envelope extraction circuit 1288 holds the state immediately before the end of the exposure period τ.

FIG. 89(*e*) illustrates data fetched into the page buffer memory 1296. Data in the page buffer memory 1296 before the exposure period τ is "0" as an initial value. Immediately after the end of the exposure period τ, a data fetching instruction to the page buffer memory 1296 is output from the exposure timing setting circuit 1292. At the timing of the data fetching instruction, output data of the upper side envelope extraction circuit 1288 is fetched into the page buffer memory 1296. The fetched data is delivered to the data readout circuit 1290 at appropriate timing.

Figure 90:
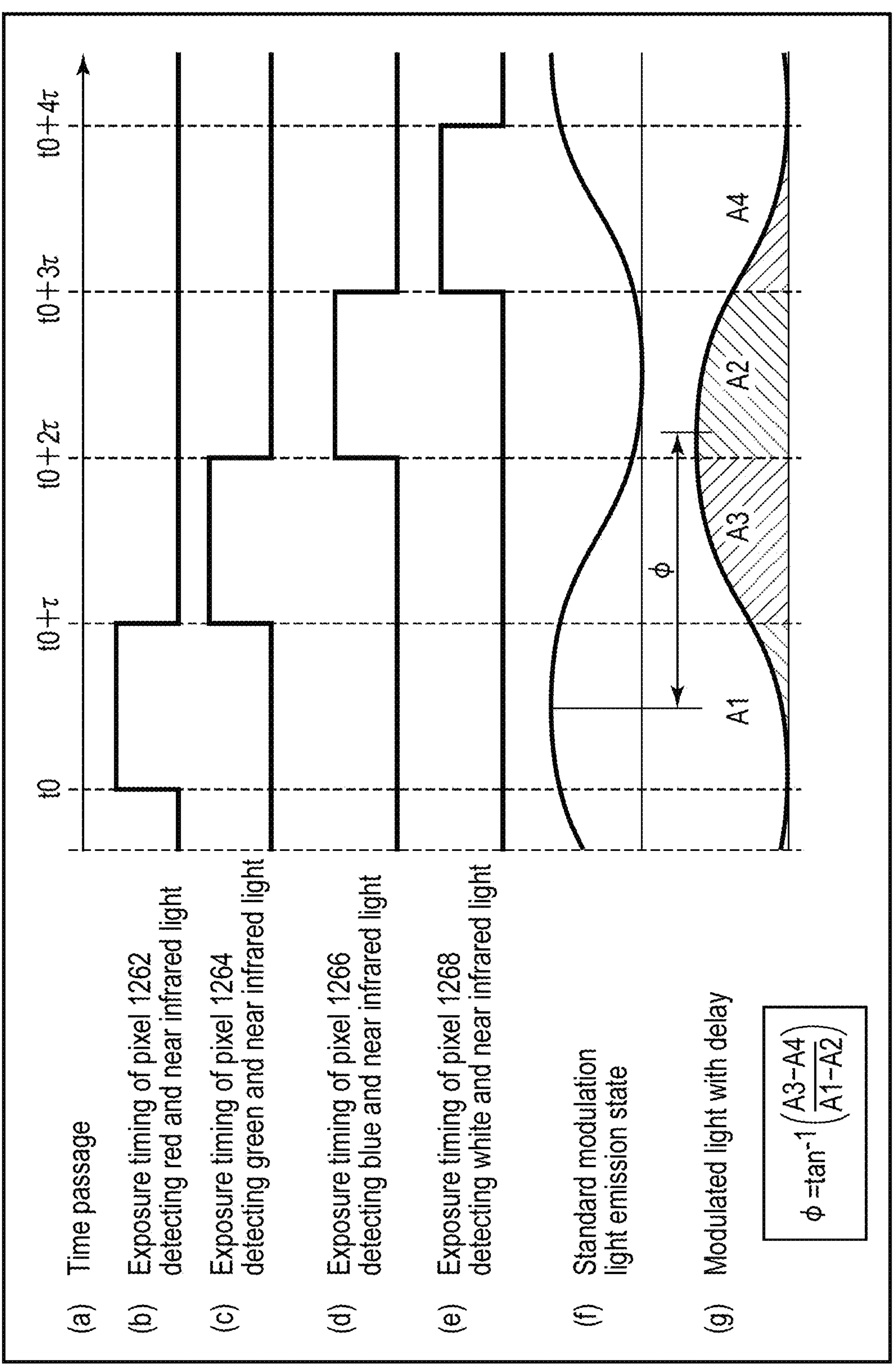
FIG. 90 is an explanatory diagram of a distance measurement method in which a plurality of pixels are combined.

FIG. 90 is an explanatory diagram of a distance measurement (length measurement) method using an indirect time of flight (iTOF) method. The structure in the 3D color image sensor 1280 has been described with reference to FIG. 87. Here, for distance measurement (length measurement), a set of four pixels 1262-1, 1264-1, 1266-1, and 1268-1 is used. Then, respective exposure timings are shifted in accordance with an emitted light intensity modulation state (FIG. 90(*f*)) of the irradiated light (first light) 12 emitted by the light source 2.

FIGS. 90(*b*) to 90(*e*) illustrate exposure timings of the four pixels 1262, 1264, 1266, and 1268, respectively. Here, all of the exposure periods "τ" of the four pixels 1262, 1264, 1266, and 1268 are matched with each other. Then, the exposure timing is shifted by the exposure period "τ". Here, as illustrated in FIG. 90(*f*), a modulation cycle T of the light source 2 is set to "4 ζ".

In a case where the detection light in FIG. 90(*g*) is shifted by a phase φ with respect to the standard modulation light emission state in FIG. 90(*f*), signal amounts input from the four pixels 1262, 1264, 1266, and 1268 to the page buffer memory 1296 (FIG. 88) correspond to area values of A1, A2, A3, and A4.

Therefore, a delay phase amount p of the detection light can be calculated as follows.

$$\phi = \tan^{-1}\left(\frac{A3 - A4}{A1 - A2}\right) \quad \text{Equation 44}$$

By using this method, a delay amount of detection light (first light) 12 reaching the measurer 8 (3D color image sensor 1280 arranged in the measurer 8) can be known with high accuracy.

For example, "1 nS" is assumed as the exposure period τ. Then, the cycle of the standard modulation light emission in FIG. 90(*f*) becomes "4τ=4 nS". Assuming that the light velocity in the air is about "$3\times10^8$ m/S" and the reciprocating light with respect to the measured object 22 is detected, the above cycle is "$3\times10^{8\times4}\times10^{-9}/2=0.6$ m". Therefore, in the exposure period "τ=1 nanosecond", an anteroposterior position change within a measurement distance range of "δ0 cm" can be measured. The length measurement accuracy in this case is determined by the area accuracy of the A1 to A4 areas in FIG. 90(*g*). Therefore, the technologies for reducing optical noise described in Chapters 3 to 5 are very important.

However, even if the optical noise is completely removed, the electrical noise remains. For this reason, in the calculation method using Equation 44, there is a limit to the length measurement accuracy within the measurement distance range of "δ0 cm". Meanwhile, the signal processing method or the data analysis method described in Chapter 8 has a function of greatly removing the electrical noise. The function of removing the electrical noise will be described. It is assumed that the noise component of N(ν) in Equation 35 is mixed in the measured signal 6 (the second measured signal constituent 106) from the measurer 8. This noise component N(ν) is completely removed in the measurement information 1018 obtained from the calculation result of Equation 38. Therefore, when the signal processing method or the data analysis method described in Chapter 8 is applied to the iTOF method, an effect of dramatically improving the length measurement accuracy is produced.

FIG. 91 illustrates the present embodiment application example (optical device 10). As described above, in the iTOF camera, it is important to significantly reduce speckle noise. Therefore, a surface emission type laser diode VCSEL is suitable as the light emitter 470 used here. Since the light emitter 470 has a spatially wide light emitting area, emitting light has low spatial coherence. Further, the optical characteristic converting components 196, 198, and 210 are arranged in the near-field area 372 or the vicinity thereof in the middle of the optical path of the emitting light from the light emitter 470. The embodiment examples of (b) to FIGS. 44 to 47 and FIGS. 53 to 69 may be adopted as form examples of the optical characteristic converting components 196, 198, and 210. Further, other optical characteristic converting component 196, 198, and 210 may be arranged in the far-field area 378. The embodiment examples of (b) to FIGS. 44 to 47 and FIGS. 65 to 69 may be adopted as form examples of the optical characteristic converting components 196, 198, and 210. Furthermore, although not illustrated, a plurality of diffusers 460 illustrated in FIG. 69 may be installed at the outlet of the light source 2 to further lower the spatial coherence of the irradiated light (first light) 12.

In addition, a light power detector 28 is installed in the light source 2. Here, a change in the intensity of emitting light of the light emitter 470 is detected, and a light impulse control circuit 260 controls the intensity of emitting light. As a specific structure inside the light impulse control circuit 260, a control circuit described later with reference to FIG. 111 may be used.

The dichroic mirror 350 divides the detection light (second light) 16 irregularly reflected on the surface of the measured object 22 in different wavelength ranges. That is, the detection light (second light) 16 in a visible light area is directed to an image sensor 280 obtaining color image patterns, and the detection light (second light) 16 in a near infrared light area is directed to an image sensor 270 obtaining 3D image patterns. Here, the image forming lens 144 forms an image of the surface of the measured object 22 on the surface of the image sensor 280 obtaining color image patterns and the surface of the image sensor 270 obtaining 3D image patterns.

An image pattern adjusting processor between 3D image patterns and color image patterns 600 installed in the system controller 50 generates a 3D color image using the measured signals 6 from both the image sensors 270 and 280. The image sensor 280 obtaining color image patterns generates a color image (a color still image or a color moving image), but does not generate a length measurement-related signal. Further, the image sensor 270 obtaining 3D image patterns generates the length measurement-related signal and a monotone (black-and-white) image, but does not generate a color signal. Therefore, the measured signals 6 obtained from both the image sensors are combined to generate a 3D color image. In a case where the number of pixels (image resolution) is different between the image sensor 280 obtaining color image patterns and the image sensor 270 obtaining 3D image patterns at this stage, image pattern adjusting processing is required at a stage of combining the two.

In this chapter, for convenience of the following description, an embodiment in which the measurer 8 of FIG. 91 individually includes the image sensor 280 obtaining color image patterns and the image sensor 270 obtaining 3D image patterns will be described. In the following description of this chapter, a description will be given focusing on a use form example of the image sensor 270 obtaining 3D image patterns. However, the present invention is not limited thereto, and the color signal and the distance measurement (length measurement)-related signal may be simultaneously generated using a 3D color image sensor 1280 illustrated in FIG. 87 in the present embodiment example.

In a case where the surface shape of the measured object 22 is measured (measured in length) using the image sensor 270 obtaining 3D image patterns in FIG. 91, imaging processing at timing synchronized with pulsed light emission of the light emitter 470 is required. Therefore, pulsed light emission timing control from the system controller 50 to the light impulse control circuit 260 may be performed.

Figure 92:
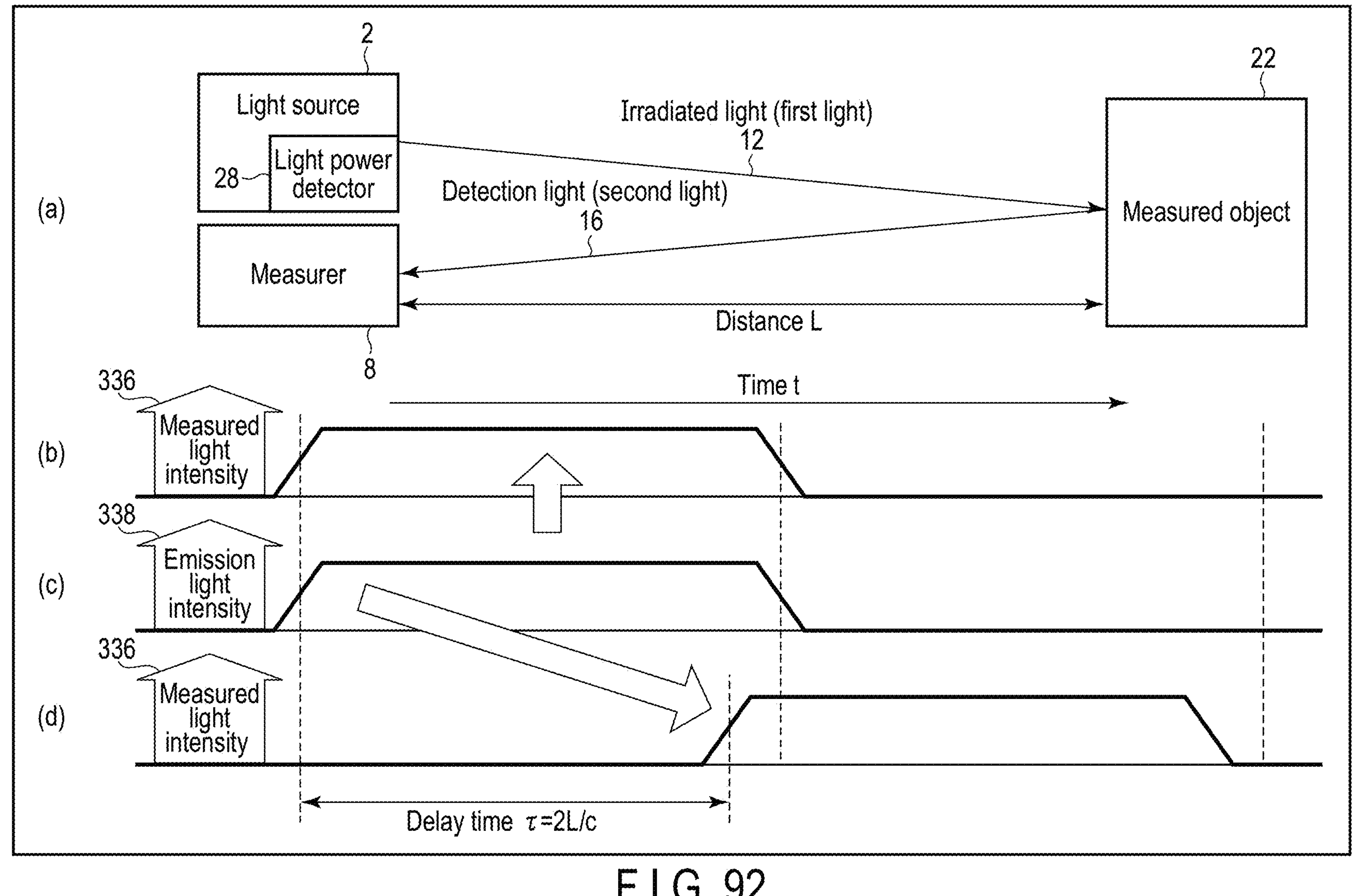
FIG. 92 is an explanatory diagram of a basic concept related to distance measurement.

FIG. 92 is a diagram illustrating a basic principle of distance measurement (length measurement). FIG. 92(*a*) arranges the surface of the measured object 22 separated by a distance L from the location where the light source 2 having the light power detector 28 and the measurer 8. FIG. 92(*c*) illustrates a variation profile of the emission light intensity 338 of the irradiated light (first light) 12 emitted from the light source 2 along the time direction "τ".

FIG. 92(*b*) illustrates a variation profile of the first measured light intensity 336 measured by the light power detector 28 along the time direction "t". The light source 2 includes the light power detector 28. Therefore, the increase/decrease timing of the first measured light intensity 336 measured by the light power detector 28 along the time direction "t" is matched with the increase/decrease timing related to the emission light intensity 338 of the irradiated light (first light) 12 illustrated in FIG. 92(*c*).

FIG. 92(*d*) illustrates a variation profile of the second measured light intensity 336 measured by one pixel in the image sensor 270 obtaining 3D image patterns in the measurer 8. The emission light (irradiated light (first light) 12) emitted from the light source 2 travels to the measured object 22 separated by the distance L. Then, a part of the light irregularly reflected (scattered) by the surface of the measured object 22 travels toward the measurer 8 as the detection light (second light) 16. Here, the irradiated light (first light) 12 emitted from the light source 2 passes through the optical path of the distance 2L until the irradiated light reaches the measurer 8 as the detection light (second light) 16. The required time 2L/c for reciprocation with respect to the light velocity c corresponds to the delay time τ until arrival.

Therefore, the increase/decrease timing of the second measured light intensity 336 measured by one pixel in the image sensor 270 obtaining 3D image patterns in the measurer 8 is delayed by the delay time "τ=2L/c" from the increase/decrease timing of the emission light intensity 338 of the irradiated light (first light) 12 illustrated in FIG. 92(*c*). The delay time τ is measured to measure the distance L to the measured object 22.

Incidentally, FIGS. 92(*b*) and 92(*d*) show that both of variation profiles of the first and the second measured light intensities 336 along the time direction "t" draw the same pattern. Therefore, the description in Chapter 9 focuses on a method for accurately calculating the delay time τ between FIGS. 92(*b*) and 92(*d*). The signal processing or data analysis method described in Chapter 8 may be adapted for accurately calculating the delay time τ. That is, the description in Chapter 9 adapts the lock-in processing (pattern matching or extraction of a constituent having a maximum correlation coefficient value) to the entire increase/decrease pattern of the measured light intensity 336 in the time t direction.

To enter into details, the variation profile of the second measured light intensities 336 of the detection light (second light) 16 illustrated in FIG. 92(*d*) may belong to the second measured signal constituent 106 expressed in FIG. 6 and FIG. 7. And the variation profile of the first measured light intensities 336 obtained from the light power detector 28 and illustrated in FIG. 92(*b*) may belong to the first measured signal constituent (reference signal constituent) 104 expressed in FIG. 6 and FIG. 7. In addition, there is a method for performing lock-in processing (pattern matching processing or waveform correlation processing) as the calculation combinations 108 of the two (see FIG. 6 and FIG. 7). Here, the calculation combination between first and second measured signal constituents 86 shown in FIG. 5 also may perform lock-in processing (pattern matching processing or waveform correlation processing).

Alternatively, another measured signal 6 may be used as the first measured signal constituent (reference signal constituent) 104. For example, a standard substance having a known light reflection characteristic is set as the measured object 22, and the standard substance is arranged at a location of a distance (standard distance) measured with high accuracy in advance. The characteristic of the third measured light intensity 336 obtained from the standard substance arranged at the standard distance may be used as the first measured signal constituent (reference signal constituent) 104.

With respect to Equation 44, the measurement accuracy decreases due to the influence of the disturbance noise mixed in any of A1 to A4 in FIG. 90. In comparison with this, the signal processing or data analysis method described in Chapter 8 has a special function of removing the influence of the disturbance noise. That is, when the prescribed signal extractor 680 in FIGS. 78 to 80 finally calculates to obtain the measurement information 1018 based on Equation 38, the noise component N(v), which is mixed in the measured signal 6 and expressed in Equation 35, is removed. Therefore, when the shifting value is calculated using the entire increase/decrease pattern of the second measured light intensity 336 in the time t direction as in the present embodiment example described in detail below, there is an effect that the influence of the disturbance noise is removed and the measurement accuracy is significantly improved.

From now on, using the basic principle described above, a detailed embodiment example related to the measurement of the distance L to the surface of the measured object 22 and the measurement of the uneven shape (height distribution in the uneven shape) of the surface of the measured object 22 are mainly described. However, tomographic imaging of the inside of the living body also may be performed using the above basic principle. As illustrated in FIG. 76 or FIG. 85(*b*), absorption of in-vivo water is relatively small with light having a wavelength of 1.3 μm or less. Therefore, the near infrared light in the wavelength range of 0.9 μm to 1.3 μm or 0.90 μm to 1.13 μm easily enters the inside of the living body.

As a specific embodiment example, the optical device 10 of FIG. 91 is used to irradiate the inside of the measured object 22 with the near infrared light in the wavelength range. The position of the image forming (confocal) lens 144 in the optical axis direction is adjusted, and the imaging plane position of the image sensor 270 obtaining 3D image patterns is set at an image forming position from a predetermined depth position inside the measured object 22.

The light source 2 in FIG. 92 may periodically emit a series of pulse lights having a narrow width (small duty ratio) as irradiated light (first light) 12. The periodic exposure timing of the image sensor 270 obtaining 3D image patterns may be set at timing shifted by the delay time "$\tau$=2 (L+$\delta$)/c" from the predetermined depth position "$\delta$" inside the measured object 22. When this method is used, the distance L to the living body (measured object 22) that is the imaging target of a tomographic image inside the measured object 22 is taken large, and there is an effect that the restriction on the method for fixing the living body (measured object 22) is greatly released. That is, the living body (measured object 22) can move freely when the optical device 10 measures the variation profile of the second measured light intensity 336.

As still another application example shown in FIG. 86, a plurality of light emitters 502 to 508 having different emission wavelength ranges may be arranged inside the light source 2 of FIG. 92. And the irradiation timing of the periodic pulsed light may be shifted for each of the light emitters 502 to 508. Then, for each irradiation timing of the periodic pulsed light, the periodic exposure timing of the image sensor 270 obtaining 3D image patterns is controlled at timing shifted by the delay time "$\tau$=2 (L+$\delta$)/c" from the predetermined depth position "$\delta$" inside the measured object 22. A tomographic image at the predetermined depth position inside the measured object 22 can be formed for each different wavelength of emitting light from the light emitter 502 to 508.

As shown in the measurement result example of FIG. 84, the content distribution characteristic in the tomographic image of each of the different biological system constituents 988 appears by wavelength separation for each measurement wavelength. Therefore, it is possible to measure the content distribution characteristic of each of the different biological system constituents 988 on the tomographic image of the inside of the living body.

A case where the irradiated light (first light) 12 is modulated along the lapse of time as illustrated in FIG. 90(*f*) is considered. The modulation signal of the emitted light intensity is not limited to a sine wave in FIG. 90(*f*), and an arbitrary waveform such as a rectangular pulse waveform may be set. When the phase of the exposure timing of the image sensor 1280 with respect to the modulation signal is changed, different measurement values are obtained as illustrated in A1 to A4 of FIG. 90(*g*). When measurement is performed by finely changing the phase of the exposure timing with respect to the modulation signal of the irradiated light (first light) 12 as described above, various measurement values can be obtained.

FIG. 90 shows that the phase of the exposure timing is divided into "4" with respect to the modulation cycle T of the modulation signal of irradiated light (first light) 12. Not limited to it, the phase of exposure timing may be divided into "8" as a method for finely dividing the phase of the exposure timing, or the modulation cycle T of the modulation signal may be divided into "16" or more (preferably "32" or more) to change the phase.

Figure 93:
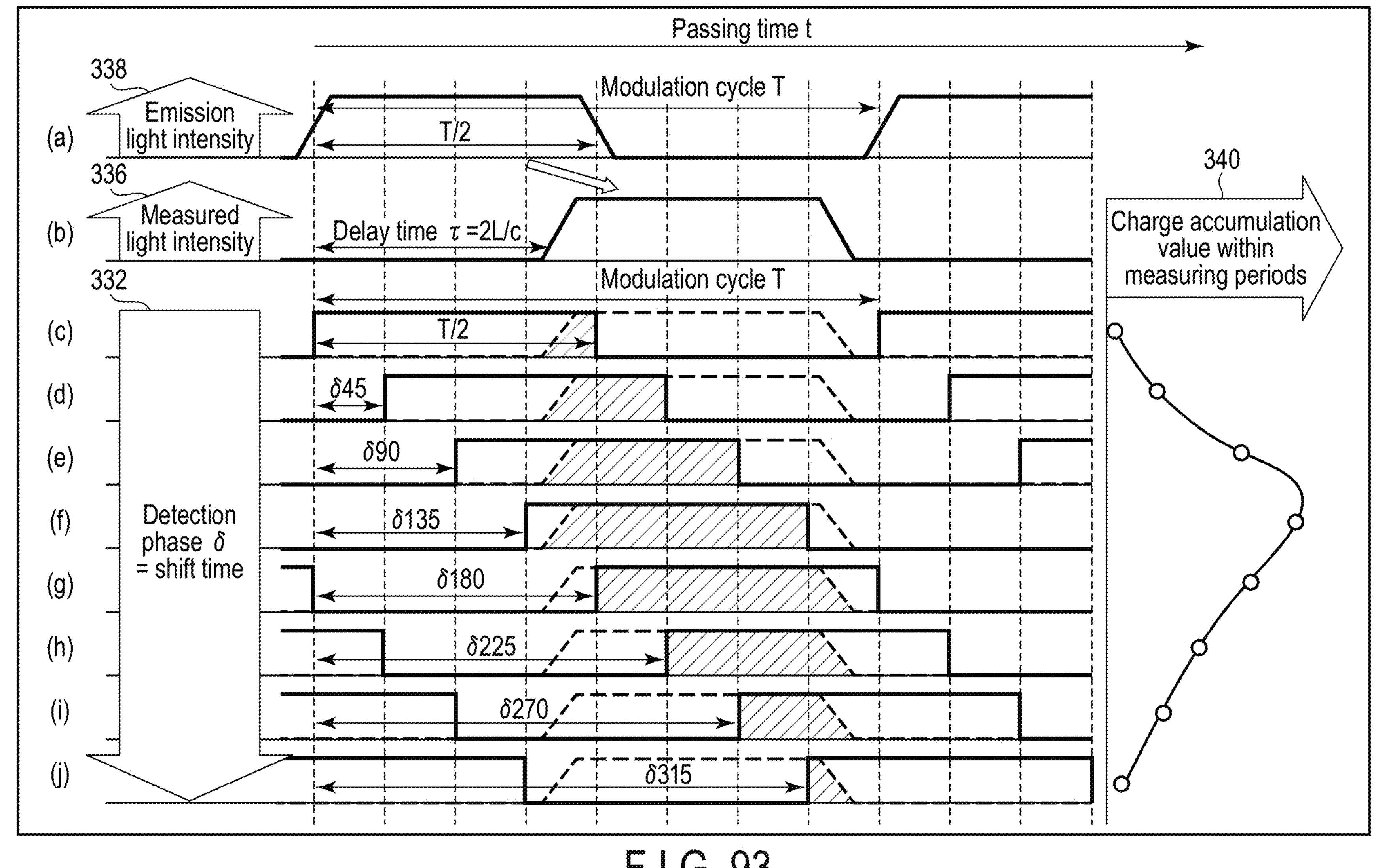
FIG. 93 is an explanatory diagram of a distance measurement method in which a detection phase is changed.

FIG. 93 illustrates an imaging method example in which the phase of the modulation signal of the irradiated light (first light) 12 is fixed and the exposure timing (the detection phase $\delta$) in the image sensor 270 is changed. As shown in FIG. 93(*c*) to FIG. 93(*j*), FIG. 93 divides the phase of the exposure timing (the detection phase $\delta$) into "eight". A horizontal axis in FIG. 93 represents a passing time "t". FIG. 93(*a*) shows a modulation characteristic of the irradiated light (first light) 12 immediately after emission from the light source 2. For simplification of description, the irradiated light (first light) 12 has been described as the pulsed light emission example. However, the present embodiment is not limited thereto, and the irradiated light (first light) 12 may be emitted with any modulation profile.

In FIG. 93(*a*), a vertical axis represents the emission light intensity 338. The light source 2 repeatedly emits a modulated light of the irradiated light (first light) 12 on the modulation cycle "T". And the modulated light emission term represents "T/2". Here, the light source 2 may repeatedly emit the modulated light within the term "T/2". In consideration of the rising characteristic and the falling characteristic at the switching timing between the light emission start time and the light blocking start time depending on the response characteristic of the light emitter 470, a trapezoidal waveform may be approximated temporarily and drawn.

FIG. 93(*b*) shows a variation profile of the second measured light intensity 336 when the detection light (second light) 16 from the measured object 22 separated by the distance L reaches the measurer 8. The variation profile shown in FIG. 93(*b*) corresponds to the same variation profile shown in FIG. 92(*d*). As compared with FIG. 93(*a*), the timing is shifted by the delay time "$\tau$=2L/c" in the time direction (the passing time t).

FIGS. 93(*c*) to 93(*j*) show each of exposure timings (measuring (charge accumulation) periods) of one pixel in the image sensor obtaining 3D image patterns 270 and a profile example of charge accumulation value 340 within each of measuring periods. Bold rectangular lines in FIGS. 93(*c*) to 93(*j*) indicate the exposure timings of one pixel. The pixel can detect the second measured light intensity 336 and accumulate charges in proportion to the second measured light intensity 336 when the bold line indicates "high level". Therefore, the oblique lined areas in FIGS. 93(*c*) to 93(*j*) indicate overlaps between the second measured light intensity 336 and the exposure periods (measuring periods) of the pixel.

FIGS. 93(*c*) to 93(*j*) show that the exposure (the detection of the second measured light intensity 336) of the pixel is performed only in a period T/2 in which a level of the bold line is high. Then, the charge value generated by the pixel can be accumulated when the pixel receives the second measured light intensity 336 of the detection light (second light) 16 within the exposure period (measuring period) of T/2. This exposure period (measuring period) repeatedly set a predetermined number of times at intervals of the modulation cycle T. That is, each exposure period (measuring period) exists within each modulation cycle T.

The light source 2 repeatedly emits a modulated light on the modulation cycle "T", and a term of the modulated light is defined as a modulated light emission term. And each modulated light emission term also exists within each modulation cycle "T". Here, a term of one frame includes many modulation cycles. Therefore, one pixel may repeatedly accumulate charges in proportion to the received light intensity of the detection light (second light) 16 within the same frame. And the measurement accuracy of the charge accumulation value 340 or 341 tends to increase when a repeat number of accumulation increases. So it is desirable that a term of one frame longer than "10 T". And it is more desirable that a term of one frame longer than "100 T".

Using the repeatedly modulation profile of the irradiated light (first light) 12, one pixel may sequentially obtain each of the charge accumulation values 340 along the passing time direction. That is, at the start, the pixel may obtain the first charge accumulation value 340 as shown in FIG. 93(*c*). After obtaining the first charge accumulation value 340, the pixel may obtain the second charge accumulation value 340 as shown in FIG. 93(*d*). Next, the pixel may obtain the third charge accumulation value 340 as shown in FIG. 93(*e*).

For example, a relation example between FIGS. 93(*b*) and 93(*c*) is described. In FIG. 93(*c*), the exposure period (measuring period) is started from an earlier time. However, as shown in FIG. 93(*b*), a delay time of "τ=2 L/c" occurs when the detection light (second light) 16 arrives. Therefore, in an early stage of the exposure period (measuring period), the detection light (second light) 16 does not arrive at the corresponding pixel, and no charge is accumulated in the pixel.

A part of the detection light (second light) 16 arrives after the delay time of "τ=2 L/c", and the corresponding pixel starts accumulating the charge value.

And then, the corresponding pixel obtains the charge accumulation value 340 in proportion to the oblique lined area within the measuring periods (exposure period) shown FIG. 93(*c*). The remaining portion of the detection light (second light) 16 arrives thereafter. However, since this time is after the end of the exposure period (measuring period), no charge is accumulated in the pixel.

Note that the detection light (second light) 16 repeatedly arrives at the corresponding pixel a predetermined number of times in a pulsed light state of the modulation cycle T. Here, the predetermined number of times corresponds to a ratio of a term of one frame to the modulation cycle T. Then, the exposure period (measuring period) is repeated the corresponding predetermined number of times. Therefore, even if the charge accumulation value in FIG. 93(*c*) is small during one exposure period (measuring period), the charge accumulation is repeated the predetermined number of times, so that the amount of the measured signal 6 increases. By repeating the modulated light and the exposure period (measuring period) in this manner, there is an effect of increasing a signal to noise ratio (S/N ratio) of the measured signal 6.

FIG. 93(*d*) shows that the exposure start time is delayed by "δ45=T/8" with respect to FIG. 93(*c*) without changing the exposure period T/2. When a part of the detection light (second light) 16 arrives within the exposure period of "T/2", the pixel starts accumulating the charge value, and the pixel obtains the charge accumulation value 340 in proportion to the oblique lined area. Here, the oblique lined area corresponds to the overlap between FIGS. 93(*b*) and 93(*d*).

However, the exposure end time in FIG. 93(*d*) is delayed from that in FIG. 93(*c*) by "δ45=T/8". Therefore, the oblique lined area in FIG. 93(*d*) is wider than that in FIG. 93(*c*). As a result, the charge accumulation value 340 within the corresponding measuring period increases in FIG. 93(*d*) as compared with FIG. 93(*c*). Therefore, the right side of FIG. 93 shows an increased charge accumulation value 340 in response to FIG. 93(*d*).

The delay time "T/8" of the exposure start time of FIG. 93(*d*) with respect to FIG. 93(*c*) corresponds to a phase delay value of "45 degrees" with respect to the modulation cycle "T (=360 degrees)". The phase delay value of the exposure start time displayed in units of "degrees" is referred to as a detection phase δ (shift time of exposure start). FIGS. 93(*c*) to 93(*j*) show characteristic changes of the charge accumulation value 340 within the measuring periods (exposure periods) when the detection phase δ changes.

FIG. 93(*e*) shows another characteristic when the detection phase "δ90" is set to "90 degrees". Since the exposure end time in FIG. 93(*e*) is further delayed, the oblique lined area further expands. As a result, the charge accumulation value 340 in the corresponding measuring periods (exposure periods) further increases. In the characteristic example corresponding to the detection phase "δ135" shown in FIG. 93(*f*), the corresponding exposure period substantially overlaps with the variation profile of the repeatedly pulsed detection light (second light) 16 shown in FIG. 93(*b*). Therefore, the charge accumulation value 340 in the corresponding measuring period approaches the maximum value.

According to FIG. 93(*g*), when the detection phase "δ180" exceeds "180 degrees", the pulsed light emission of the detection light (second light) 16 ends before the exposure end time. Therefore, after the detection phase "δ225" in FIG. 93(*h*), the charge accumulation values 340 within the measuring periods decreases as the detection phase δ increases.

The right side of FIG. 93 shows a variation profile of the charge accumulation value 340 within the measuring periods with respect to the detection phase δ. In response to the right side of FIG. 93, the horizontal axis represents the charge accumulation value 340, and the vertical axis represents the detection phase δ. And the variation profile of the charge accumulation value 340 changes when the delay time "τ=2 L/c" varies. In other words, a position indicating the maximum value of the charge accumulation value 340 moves along the vertical direction (vertical axis) when the delay time "τ=2 L/c" varies.

Therefore, by measuring the position of the entire change characteristic of the charge accumulation value 340 with respect to the detection phase δ, the distance L to the measured object 22 is determined with high accuracy. According to FIG. 93, there are "eight" different detection phase values divided into at intervals of "45 degrees". In addition, not limited to it, the detection phase may be divided into more than "8". Furthermore, the detection phase may be divided into "16" or more (preferably "32" or more).

When a duty ratio representing a ratio of the modulated light emission term "T/2" to the modulation cycle T is set to around (near) "50%", the distance L to the measured object 22 is determined with the highest accuracy. Because the pixel does not obtain the charge accumulation value 340 in responses to a few detection phases 6 if the duty ratio becomes small enough. And when there are a few detection phases 6 indicating no charge accumulation value 340 in the right side of FIG. 93, the accuracy of distance measurement falls down. Therefore, it is desirable that the duty ratio is more than "10%", and it is more desirable that the duty ratio is more than "20%". And the same reason suggests that it is desirable that the duty ratio is less than "90%", and it is more desirable that the duty ratio is less than "80%".

According to FIGS. 93(*c*) to 93(*j*), one pixel has to obtain eight kinds of the charge accumulation values 340 for each of different detection phase values. If one pixel comprises 8 "sub-pixels", each of 8 sub-pixels may simultaneously obtain each of the charge accumulation values 340. As shown in the embodiment examples of FIGS. 87 and 88, each of discrete pixels may correspond to each of sub-pixels. Therefore, plural discrete pixels may respectively obtain plural kinds of the charge accumulation values 340 for different detection phase values simultaneously. For example, each of pixels 1262-1 and 1264-1 in FIG. 87 may correspond to a sub-pixel. And one pixel obtaining many kinds of the charge accumulation values 340 may comprise the pixels 1262-1 and 1264-1 in FIG. 87. And FIG. 88 shows that the pixel 1262-1 obtains a charge accumulation value 340 for a detection phase value and the pixel 1264-1 obtains another charge accumulation value 340 for another detection phase value.

The present embodiment is not limited thereto, using the repeatedly modulation profile of the irradiated light (first light) 12, one pixel may sequentially obtain each of the charge accumulation values 340 along the passing time direction. And the exposure period (measuring period) for the detection phase value δ is sequentially shifted between different frames. Here, each of the different frames has a different measuring timing (different exposure timing) with each other along the passing time direction. According to FIG. 93, 8 frames construct one "frame group", and the frame group can provide the variation profile of the charge accumulation value 340 with respect to the detection phase δ shown in the right side of FIG. 93.

In the same frame, all the pixels constituting the image sensor 270 obtaining 3D image patterns have the same exposure timing (measuring timing) for the same detection phase value δ. For another embodiment example, when the detection phase δ is divided into N (the detection phase value δ is shifted at intervals of 360/N degrees), one set of frame group may include N frames. In this case, when imaging of one set of frame groups is completed, measurement of a 3D image (including distance measurement (length measurement) in the optical axis direction) is completed.

As explained above, it is desirable that the duty ratio representing a ratio of the modulated light emission term to the modulation cycle T is set to around (near) "50%". And the light modulation condition makes a desirable width (length) of the exposure period (measuring period) at around (near) "50%" of the light modulation cycle T. Therefore, it is desirable that the width (length) of the exposure period (measuring period) is more than "10%" of the light modulation cycle T, and it is more desirable that the width (length) is more than "20%" of the light modulation cycle τ. And the same reason suggests that the width (length) of the exposure period (measuring period) is less than "90%" of the light modulation cycle T, and it is more desirable that the width (length) is less than "80%" of the light modulation cycle T.

FIG. 93 shows that there are plural overlap areas between neighbor exposure periods (measuring periods) regarding neighbor detection phase values δ. Therefore, it is impossible that one pixel obtains all of the charge accumulation values 340 corresponding to all of the different detection phase values δ at a time.

FIG. 94 shows an applied method of another embodiment example. The applied method narrows the width (length) of the actual exposure period (measuring period) to obtain a part of the charge accumulation value 340. When the detection phase δ is divided into N (the detection phase value δ is shifted at intervals of 360/N degrees), the applied method sets the width (length) of the actual exposure period (measuring period) to "T/N". Therefore, at a time, one pixel can obtain all parts of the charge accumulation values 340 corresponding to all different detection phase values δ. Moreover, the applied method defines a virtual exposure period (a virtual measuring period), and the width (length) of the virtual exposure period (measuring period) is wider (bigger) than that of the actual exposure period (measuring period). And then, the applied method sums up between the corresponding parts of the charge accumulation value 340 to generate each charge accumulation value 340 relating to each virtual exposure period (measuring period). Here, as described above, it is desirable that a term of one frame longer than "10 T". And it is more desirable that a term of one frame longer than "100 T".

The embodiment example shown in FIG. 94 equally divides the modulation cycle T of the irradiated light (first light) 12 into four. Therefore, the width (length) of the actual exposure period (actual measuring period) equals to "T/4". Here, the embodiment example shown in FIG. 94 defines each exposure start time of the actual exposure period (measuring period) as the corresponding detection phase value δ. That is, FIG. 94(*c*) sets a detection phase value "δ0" to "0 degrees". And FIG. 94(*e*) sets a detection phase "δ90" to "90 degrees", and FIG. 94(*g*) sets a detection phase "δ180" to "180 degrees". And then, FIG. 94(*i*) sets a detection phase "δ270" to "270 degrees".

First one pixel may obtain a part of the charge accumulation value 340 in proportion to the oblique lined area in FIG. 94(*c*), and then the same pixel may obtain another part of the charge accumulation value 340 in proportion to the oblique lined area in FIG. 94(*e*). Next the same pixel may obtain next part of the charge accumulation value 340 in proportion to the oblique lined area in FIG. 94(*g*). Finally the same pixel may obtain different part of the charge accumulation value 340 in proportion to the oblique lined area in FIG. 94(*i*). There is no overlap area between neighbor actual exposure periods (actual measuring periods) regarding neighbor detection phase values δ. Therefore, it is possible that the same pixel obtains all parts of the charge accumulation values 340 corresponding to all different detection phase values δ at a time. The light source 2 repeatedly emits modulated light on the modulation cycle "T", and the distance measuring term includes many modulated light emission terms. Therefore, one pixel repeatedly accumulates each charge in proportion to each state relating to each of FIGS. 94(*c*), 94(*e*), 94(*g*), and 94(*i*). As explained above, even if each of parts of charge accumulation values in FIGS. 94(*c*), 94(*e*), 94(*g*), and 94(*i*) is small during one actual exposure period (actual measuring period), the charge accumulation is repeated the predetermined number of times, so that the amount of the measured signal 6 increases.

FIG. 93(*a*) and FIG. 94(*a*) show the same emission light intensity profiles of the irradiated light (first light) 12 immediately after emission from the light source 2. Here, both FIG. 93(*a*) and FIG. 94(*a*) fix the light emission phase within the modulation cycle T. And FIG. 93(*b*) and FIG. 94(*b*) show the same measured light intensity profiles of the detection light (second light) 16.

In the actual exposure period (actual measuring period) in FIG. 94(*c*), the detection light (second light) 16 does not reach the measurer 8. Then, a part of the detection light (second light) 16 starts reaching the measurer 8 from the latter half of the actual exposure period (actual measuring period) in FIG. 94(*e*). Therefore, only a part of the latter half of the actual exposure period (actual measuring period) in FIG. 94(*e*) becomes the oblique lined area, and contributes to a part of the charge accumulation value 340. On the other hand, the detection light (second light) 16 continues to reach the measurer 8 during the actual exposure period (entire actual measuring period) in FIG. 94(*g*). Therefore, a part of the charge accumulation value 340 within the actual measuring period in FIG. 94(*g*) takes a maximum value. Then, the end time in the actual exposure period (actual measuring period) in FIG. 94(*i*) is after the detection light (second light) 16 completely reaches the measurer 8.

When the transmission destination of each part of the charge accumulation value into the same pixel of the image sensor 270 obtaining 3D image patterns is sequentially switched in a short time, each part of the charge accumulation value into the same pixel can be distributed in time series to FIGS. 94(*c*), 94(*e*), 94(*g*), and 94(*i*). As an implementation method, for example, in FIG. 88, the number of page buffer memories 1296 may be increased to four times, and an interlocking switch 1300 that switches the output of the upper side envelope extraction circuit 1288 between the different page buffer memories 1296 may be added. Then, every "T/4" period corresponding to the actual exposure period (actual measuring period), the output of the upper side envelope extraction circuit 1288 is sequentially switched between the different page buffer memories 1296, and the interlocking switch 1300 is operated to appropriately discharge the charge accumulated in the capacitor 1160, so that the above can be realized.

As explained above, a measurement accuracy of the distance to the measured object 22 tends to have a maximum value when the width (length) of the exposure period (measuring period) is around (near) "50%" of the light modulation cycle T. But FIGS. 94(*c*), 94(*e*), 94(*g*), and 94(*i*) set the width (length) of the actual exposure period (actual measuring period) to "T/4". Therefore, as shown in FIGS. 94(*d*), 94(*f*), 94(*h*), and 94(*j*), the embodiment example may newly define a virtual exposure period (virtual measuring period), and the width (length) of the virtual exposure period (virtual measuring period) approaches "50%" of the light modulation cycle T. And then, within each virtual exposure period (virtual measuring period), the embodiment example may obtain each charge accumulation value 340 in proportion to each oblique lined area. Using the virtual exposure period (virtual measuring period) to calculate each of charge accumulation values 340, the embodiment example obtains a high measurement accuracy of the distance to the measured object 22.

At the stage of outputting as the measured signal 6 from the image sensor 270 obtaining 3D image patterns, the sum of FIGS. 94(*c*) and 94(*e*) is given to FIG. 94(*d*), and the charge accumulation value in FIG. 94(*d*) is output. Similarly, the sum of FIGS. 94(*e*) and 94(*g*) is output as the charge accumulation value in FIG. 94(*f*). The sum of FIGS. 94(*g*) and 94(*i*) is output as the charge accumulation value in FIG. 94(*h*), and the sum of FIGS. 94(*c*) and 94(*i*) is output as the charge accumulation value in FIG. 94(*j*).

The outputs of charge accumulation values in FIGS. 94(*d*), 94(*f*), 94(*h*), and 94(*j*) correspond to the charge accumulation amount 340 within the virtual measuring period in the virtual exposure period of "T/2". Each detection phase value corresponds to "0 degrees" in FIG. 94(*d*), corresponds to "90 degrees" in FIG. 94(*f*), corresponds to "180 degrees" in FIG. 94(*h*), and corresponds to "270 degrees" in FIG. 94(*j*). Therefore, as shown in the right side of FIG. 94, the embodiment example calculates the variation profile of charge accumulation values 340 with respect to the detection phase.

As described above, when the charge accumulation value 340 in the virtual measuring period (virtual exposure period) in the same pixel is distributed to and recorded in a plurality of different memories by time division, there is an effect that the charge accumulation value 340 for each of a plurality of different detection phases 6 in the same pixel can be collected at high speed. That is, in the above-described example shown in FIG. 93, imaging of N frames is required for imaging of a set of frame groups, but in the above-described method shown in FIG. 94, imaging of only one frame is required.

Note that FIG. 94 illustrates an example of a method for collecting the charge accumulation value 340 within the measuring periods at four types of different detection phase values in a short time. However, the present invention is not limited thereto, and the charge accumulation value 340 within the measuring periods at an arbitrary number of types of different detection phase values (for example, 8 types, 16 types, 32 types, more than 4 types and the like) may be collected from one pixel in a short time.

Figure 95:
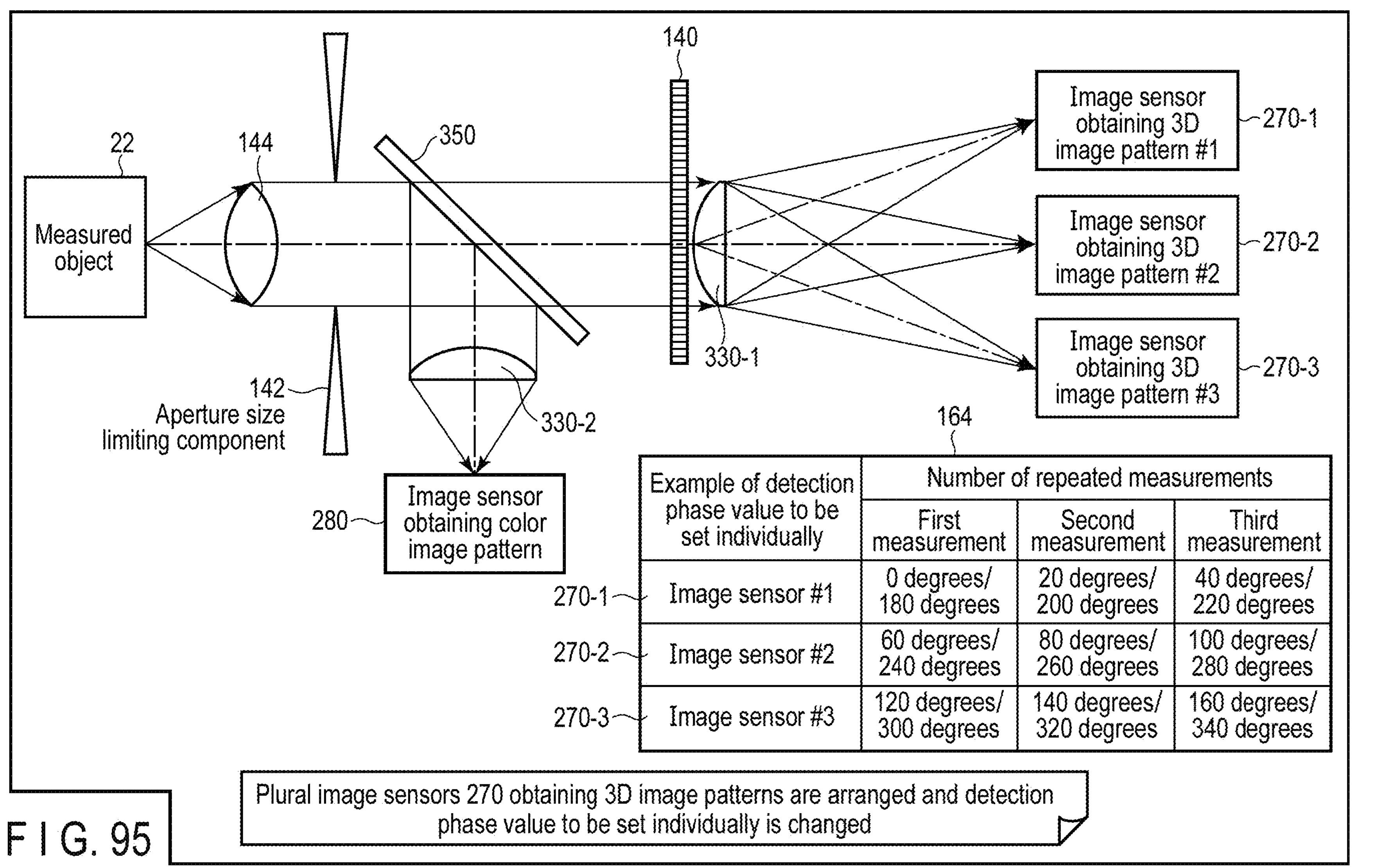
FIG. 95 illustrates an example of a measurement method using a plurality of imaging sensors.

FIG. 95 shows the present embodiment application example in which signals of the charge accumulation value 340 within the measuring periods from a plurality of different detection phase values δ using a plurality of image sensors 270 are simultaneously acquired. The image forming lens 144 converts the detection light (second light) 16 obtained from the measured object 22 into parallel light. The converging lens 330-2 forms an image of visible light reflected by the dichroic mirror 350 arranged in the middle of the parallel light optical path on the image sensor 280 obtaining color image patterns.

A diffraction generation component (grating or holography component) 140 divides the traveling direction of the near infrared light having passed through the dichroic mirror 350 into three directions. Then, the near infrared light divided in the three directions is imaged on image sensors 270-1 to 270-3 obtaining 3D image patterns of #1 to #3 arranged on the same plane by the converging lens 330-1. Here, an aperture size limiting component 142 existing in the middle of the optical path of the parallel light prevents the disturbance light from being mixed on each of the image sensors 270-1 to 270-3 obtaining 3D image patterns.

In the embodiment application example of FIG. 95, the image sensors 270 obtaining 3D image patterns are arranged in the middle of the optical path, and the detection phase value δ set for each of the image sensors 270-1 to 270-3 obtaining 3D image patterns is changed. An example of setting the detection phase value δ for each of the image sensors 270-1 to 270-3 is expressed in a lower right table in FIG. 95. An example in which the charge accumulation value 340 within the measuring periods at two detection phase values shifted by 180 degrees from each other can be simultaneously measured in one of the image sensors 270-1 to 270-3 obtaining 3D image patterns is described.

First, the set detection phase values of the image sensor 270-1 obtaining 3D image patterns of #1 are set to 0 degrees and 180 degrees. Then, the set detection phase values of the image sensor 270-2 obtaining 3D image patterns of #2 are set to 60 degrees and 240 degrees, and the set detection phase values of the image sensor 270-3 obtaining 3D image patterns of #3 are set to 120 degrees and 300 degrees. Then, at the first measurement of the number of repeated measurements 164, measured signals 6 (the charge accumulation value 340 within the measuring periods) related to six types of different detection phase values are simultaneously obtained.

Even with only the measured signals 6 (the charge accumulation value 340 within the measuring periods) related to the six types of different detection phase values, it is possible to perform distance measurement (length measurement) with sufficiently high accuracy. Therefore, when the image sensors 270-1 to 270-3 in which different detection phase values are set are used, there is an effect that highly accurate distance measurement (length measurement) can be performed in a short time.

Further, when the detection phase value is finely divided and measured, distance measurement (length measurement) with higher accuracy can be performed. In a case where it is desired to perform distance measurement (length measurement) with higher accuracy, the second or third measurement of the number of repeated measurements 164 may be further performed. An example of the detection phase value δ set to each of the image sensors 270-1 to 270-3 obtaining 3D image patterns at the second and third times may be set as follows.

For example, at the second measurement of the number of repeated measurements 164, the set detection phase values of the image sensor 270-1 obtaining 3D image patterns of #1 are set to 20 degrees and 200 degrees. Then, the set detection phase values of the image sensor 270-2 obtaining 3D image patterns of #2 may be set to 80 degrees and 260 degrees, and the set detection phase values of the image sensor 270-3 obtaining 3D image patterns of #3 may be set to 140 degrees and 320 degrees.

Further, at the third measurement of the number of repeated measurements 164, the set detection phase values of the image sensor 270-1 obtaining 3D image patterns of #1 are set to 40 degrees and 220 degrees. Then, the set detection phase values of the image sensor 270-2 obtaining 3D image patterns of #2 may be set to 100 degrees and 280 degrees, and the set detection phase values of the image sensor 270-3 obtaining 3D image patterns of #3 may be set to 160 degrees and 340 degrees. Then, only by repeating the measurement three times as the number of repeated measurements 164, the measured signals 6 at a total of 18 types of different detection phase values are obtained.

As a method for finely changing the relative phase between "the exposure timing (including the exposure period or the measuring period) of same pixel in the image sensor 270 obtaining 3D image pattern" and "the modulated light emission term of the irradiated light (first light) 12" and for performing measurement, the following methods are considered:

1. A method (the first method) for fixing the phase with respect to the emitted light intensity modulation signal (the modulated light emission term) of the irradiated light (first light) 12 without depending on the time passage and changing only the detection phase δ according to the time passage;
2. A method (the second method) for fixing the detection phase without depending on the passing time and changing the light emission phase δ of the emitted light intensity modulation signal (the modulated light emission term) of the irradiated light (first light) 12 according to the time passage; and
3. A method (the third method) for changing both the detection phase and the light emission phase according to the time passage.

The above explanations (in FIGS. 93 to 95) illustrated a classification example (of the first method) in a case where the same detection phase value is set in all the pixels in the image sensor 270 obtaining 3D image patterns at the same time. Furthermore, as described with reference to FIGS. 87 to 90, the detection phase value may be changed between different pixels in the image sensor 270 obtaining 3D image patterns at the same time. And FIGS. 87 to 90 are classified into the first method. In this case, any combination between the method for setting the detection phase value between the pixels and the above classification becomes possible. Next, another embodiment example corresponding to the second method is described.

Figure 96:
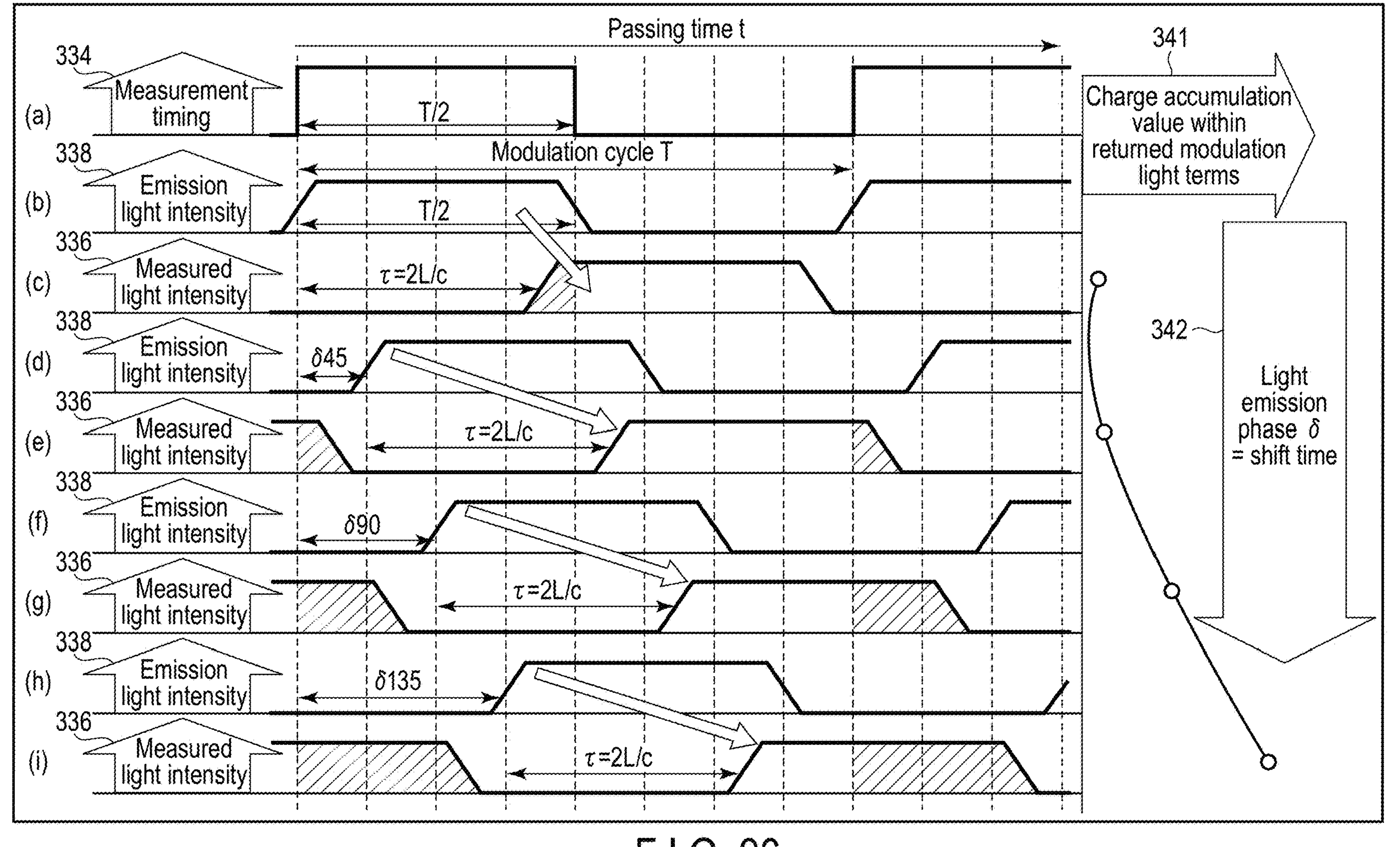
FIG. 96 is an explanatory diagram of a distance measurement method in which a light emission phase is changed.

FIG. 96 shows another embodiment example that performs the distance measurement (length measurement) with changing the light emission phase δ along the passing time t. Chapter 9 defines shift time of the modulated light emission timing of the irradiated light (first light) 12 in response to the passing time t as the "light emission phase δ". As described above, the light source 2 repeatedly emits plural modulated lights of the irradiated light (first light) 12 on the modulation cycle "T". And the irradiated light (first light) 12 has the modulated light emission term. And Chapter 9 defined the ratio of the modulated light emission term to the modulation cycle T as the duty ratio.

In the whole distance measurement term, the light source 2 may keep constant values of the modulation cycle T and the duty ratio. Here, the embodiment example may set the period of the modulation cycle T set to 360 degrees, so that the embodiment example may express the light emission phase δ based on a unit of "degree". For example, when the light emission phase δ is divided into N, the light emission phase value δ is shifted at intervals of 360/N degrees.

Moreover, the modulated light emission timing may correspond to the start timing of the modulated light emission term. In other words, Chapter 9 may define the shift time of the start timing of the modulated light emission term of the irradiated light (first light) 12 in response to the passing time t as the "light emission phase δ".

Within the modulated light emission term, the modulation waveform of the emission light intensity 338 is not limited to a pulse waveform, and may be any waveform such as a sinusoidal waveform or a sawtooth waveform. The detection light (second light) 16 from the measured object 22 reaches the measurer 8 after the delay time τ=2 L/c. For this reason, when the light source 2 shifts the modulated light emission timing in accordance with a predetermined light emission phase value δ, the time of arrival at the measurer 8 also changes.

The light source 2 repeatedly emits modulated light on the modulation cycle "T", and a term of one frame includes many modulation cycles. Therefore, there are many modulated light emission terms within the same frame. With respect to FIG. 96, the light source 2 keeps the same light emission phase value δ within the same frame. Therefore, one pixel repeatedly accumulates charges in proportion to the received light intensity of the detection light (second light) 16 within the same frame. And at the end timing of one frame, the pixel obtains the charge accumulation value within light emission phases 341.

And then, the next frame having an incremental number of frame changes the light emission phase value δ. That is, the next frame adds an interval value of 360/N degrees to the previous light emission phase value δ. At the end timing of the next frame, the pixel obtains the next charge accumulation value within light emission phases 341. Finally, as shown in the right side of FIG. 96, the variation profile of the charge accumulation values within light emission phases 341 can be obtained at the end timing of the last frame included in a frame group.

FIG. 96(*a*) shows the measurement timing 334 (exposure period) in one pixel in the image sensor 270 obtaining 3D image patterns. The period in which FIG. 96(*a*) holds a high level corresponds to the measuring period (exposure period) of the corresponding pixel. FIG. 96(*a*) fixes the detection phase (the measurement timing 334) within the whole term of a frame group. That is, a phase of the start timing of measuring period (exposure period) may always coincide with "0 degrees" of light emission phase in all frames. In other words, a detection phase (a phase of the start timing of measuring period) based on the modulation cycle T is fixed in all frames although the light emission phase value based on the modulation cycle T changes in accordance with a different frame.

One pixel detects the detection light (second light) 16 received within the measuring period (exposure period) of one modulation cycle to generate charges in proportion to the modulated light intensity. Here, one frame term includes many modulation cycle. Therefore, the pixel repeatedly accumulates charges within the whole term of the frame, so that the pixel obtains the charge accumulation value for each light emission phase 341.

The width of the measurement timing 334 (exposure period) is "T/2" with respect to the modulation cycle "T" of the irradiated light (first light) 12. Then, the measurement timing 334 (exposure period) repeatedly appears every cycle "τ". The distance measurement (length measurement) accuracy is improved when the characteristic of the charge accumulation value 341 within the measuring periods with respect to the light emission phase δ is set such that the change becomes large within the entire light emission phase range.

Therefore, when the width of the measurement timing 334 (exposure period) is set to T/2, the distance measurement (length measurement) accuracy is most improved. Not limited to it, it is desirable that the width of the measurement timing 334 (exposure period) is more than "10%" of the modulation cycle "T" and less than "90%" of the modulation cycle "T". Furthermore, it is more desirable that the width of the measurement timing 334 (exposure period) is more than "20%" of the modulation cycle "T" and less than "80%" of the modulation cycle "T".

Similarly to FIG. 93(*a*), FIG. 96(*b*) shows a modulation characteristic of the emission light intensity 338 regarding the irradiated light (first light) 12 immediately after emission from the light source 2. Here, the light emission phase value "δ0" corresponds to "0 degrees" in FIG. 96(*b*). The irradiated light (first light) 12 repeatedly emits pulsed light with a pulse width of "T/2". For the same reason as the above, when the pulse width of the irradiated light (first light) 12 is set to "T/2", the distance measurement (length measurement) accuracy is most improved. Not limited to it, it is desirable that the width of the modulated light emission term is more than "10%" of the modulation cycle "T" and less than "90%" of the modulation cycle "T". Furthermore, it is more desirable that the width of the modulated light emission term is more than "20%" of the modulation cycle "T" and less than "80%" of the modulation cycle "T".

Similarly to FIG. 94(*b*), FIG. 96(*c*) shows a variation profile of the measured light intensity 336 when the detection light (second light) 16 reaches the measurer 8. The time delay of "τ=2L/c" occurs until the detection light reaches the measurer 8 immediately after the radiation of the light source 2. As shown in a oblique lined area of FIG. 96(*c*), an overlap between the measuring period (exposure period) shown in FIG. 96(*a*) and the measured light intensity 336 shown in FIG. 96(*c*) provides the charge accumulation value 341 in response to the light emission phase value "0 degrees".

FIGS. 96(*d*), 96(*f*), and 96(*h*) illustrate modulation characteristics regarding the emission light intensity 338 of the irradiated light (first light) 12 immediately after emission from the light source 2 when the value of the light emission phase δ is changed. The light emission phase value "δ45" in FIG. 96(*d*) with reference to FIG. 96(*b*) is "45 degrees". That is, as compared with the modulation characteristic regarding the emission light intensity 338 of the irradiated light (first light) 12 immediately after emission from the light source 2 shown in FIG. 96(*b*), the pulsed light emission delay corresponding to "T/8" (360 degrees/8=45 degrees) occurs in FIG. 96(*d*).

In addition, the light emission phase amount "δ90" in FIG. 96(*f*) with reference to FIG. 96(*b*) is "90 degrees", and the pulsed light emission delay corresponding to "T/4" (360 degrees/4=90 degrees) occurs. The light emission phase amount "δ135" in FIG. 96(*h*) with reference to FIG. 96(*b*) becomes "135 degrees", and the pulsed light emission delay corresponding to "3 T/8" occurs.

FIGS. 96(*c*), 96(*e*), 96(*g*), and 96(*i*) show variation profiles along the passing time t regarding the measured light intensity 336 of the detection light (second light) 16 when the detection light (second light) 16 is caused to reach the measurer 8 in accordance with each light emission phase value δ. And the right side of FIG. 96 shows a variation profile of the charge accumulation value 341 depending on the light emission phase.

FIG. 96(*c*) illustrates a variation profile along the passing time t regarding the measured light intensity 336 of the detection light (second light) 16 in the measurer 8 when the irradiated light (first light) 12 is emitted at the light emission phase of "0 degrees". As compared with the modulation characteristic (time-dependent change of the emission light intensity 338) of the irradiated light (first light) 12 immediately after emission from the light source 2 in FIG. 96(*b*), the variation profile along the passing time t regarding the measured light intensity 336 in FIG. 96(*c*) causes the delay time of "τ=2 L/c". In another embodiment example illustrated in FIG. 96, since the delay time is big (large), most of the detection light (second light) 16 tends to be out of the measurement timing 334 (exposure period). Therefore, the oblique lined area in FIG. 96(*c*) is narrow, so that the charge accumulation value 341 is small with respect to "0 degrees" of the light emission phase δ.

In contrast to the characteristic of the emission light intensity 338 when the irradiated light (first light) 12 is emitted with the light emission phase value "δ45" of "45 degrees" shown in FIG. 96(*d*), the detection light (second light) 16 reaches the measurer 8 with the delay time of "τ=2 L/c" as shown in FIG. 96(*e*). As a result, in FIG. 96(*e*), only a rear end (oblique lined area) of the detection light (second light) 16 overlaps the measurement timing 334 (exposure period) shown in FIG. 96(*a*). Therefore, the charge accumulation value 341 is also small with respect to "45 degrees" of the light emission phase in FIG. 96(*e*).

As shown in FIGS. 96(*g*) and 96(*i*), when the light emission phase values "δ90" and "δ135" increase to "90 degrees" and "135 degrees", the oblique lined area overlapping the measurement timing 334 (exposure period) in the detection light (second light) 16 reaching the measurer 8 increases. As a result, in FIGS. 96(*g*) and 96(*i*), the charge accumulation values 341 within the returned modulation light terms also increase.

As shown in the right side of FIG. 96, the charge accumulation value 341 within the returned modulation light terms also changes according to the value change of the light emission phase 342. Therefore, the variation profile of the charge accumulation value 341 within the returned modulation light terms may also be used for the measurement (length measurement) of the distance L to the measured object 22.

FIG. 96 divides the modulation cycle "T" into "4" to generate different light emission phase δ. When the light emission phase δ is divided into "N", the light emission phase value δ is shifted at intervals of "360/N degrees" and one set of frame group may include "N" frames. The embodiment example may set "N" to more than "4", or the embodiment example may set "N" to equal to or more than "8". Not limited to it, N may be set to equal to or more than "16" or "32". Because the distance (length) measurement accuracy tends to increase when the division number "N" increases.

Figure 97:
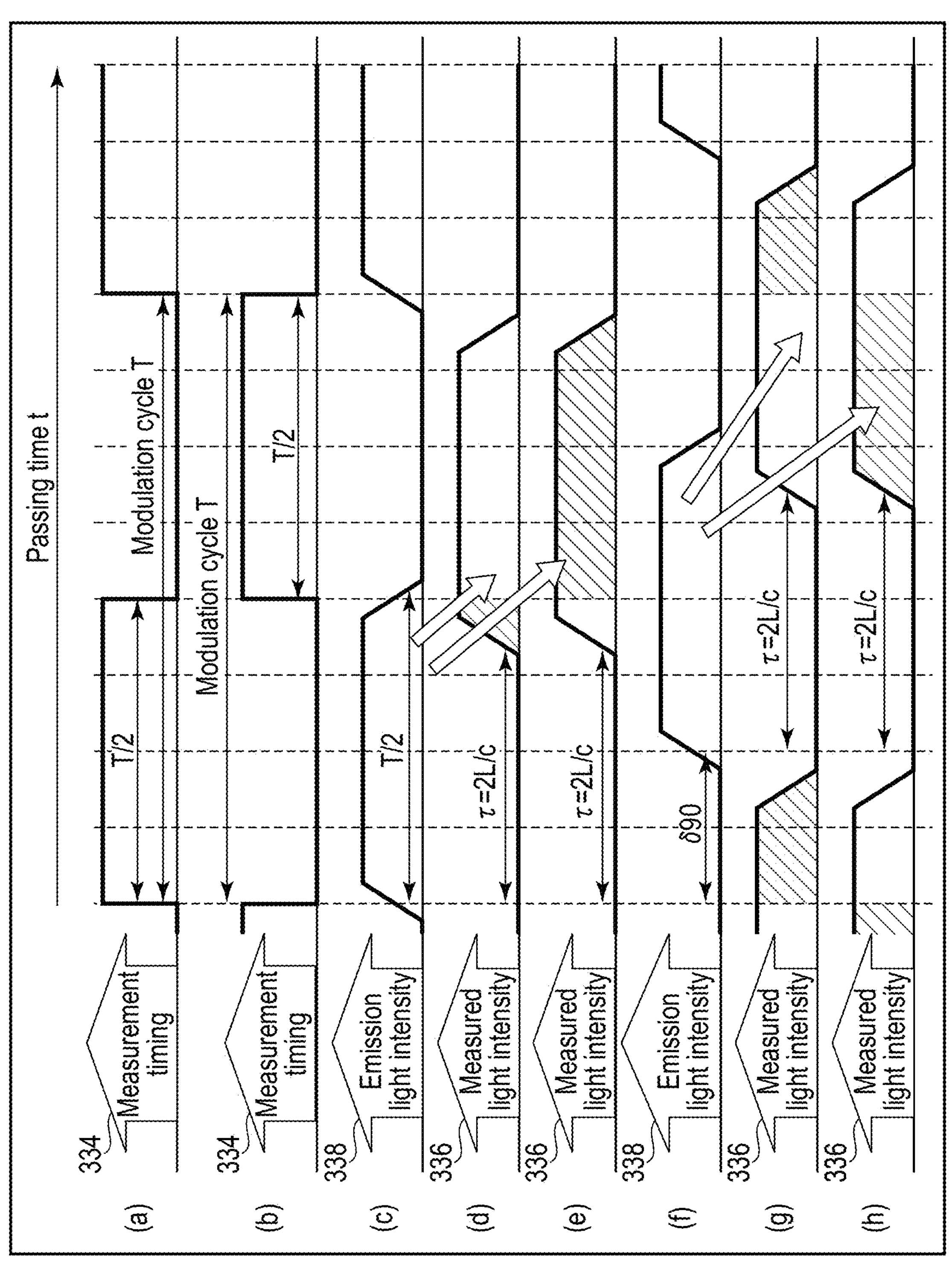
FIG. 97 illustrates an example of a measurement method in which both a light emission phase and a detection phase are changed.

FIG. 97 shows an embodiment application example in which distance measurement (length measurement) is performed by changing both the detection phase and the light emission phase. This embodiment application example corresponds to the third method mentioned above for changing both the detection phase and the light emission phase according to the time passage.

FIG. 97 also has the same modulation cycle T. The detection phase value of FIG. 97(*a*) is "0 degrees", and the detection phase value of FIG. 97(*b*) is "180 degrees". And FIG. 97(*a*) and FIG. 97(*b*) have the same exposure period (measuring period) "T/2".

Furthermore, the light emission phase value of FIG. 97(*c*) is "0 degrees", and the light emission phase value of FIG. 97(*f*) is "90 degrees". Here, the duty ratio is "50%". FIG. 97 shows that one set of frame group may include 2 frames. More specifically, the light source 2 repeatedly generates plural modulated light emission term based on the light emission phase of "0 degrees" within a frame, and the light source 2 repeatedly generates plural modulated light emission term based on the light emission phase of "90 degrees" within other frame.

FIG. 97(*d*) obtains the charge accumulation value based on a combination between the detection phase of "0 degrees" (FIG. 97(*a*)) and the light emission phase of "0 degrees" (FIG. 97(*c*)). According to FIG. 97(*d*), the measured light intensity 336 of the detection light (second light) 16 has reached the measurer 8 after the delay time of "τ=2L/c" when the irradiated light (first light) 12 is emitted at the light emission phase of "0 degrees" (FIG. 97(*c*)).

When the timings in FIGS. 97(*a*) and 97(*d*) are combined, it can be seen that only the tip in the area where the measured light intensity 336 of the detection light (second light) 16 is at the high level (FIG. 97(*d*)) overlaps with the measurement timing 334 (exposure period shown in FIG. 97(*a*)). Therefore, after the corresponding pixel repeatedly accumulates the charge in proportion to the oblique lined area within the whole term of a frame, the charge accumulation value obtained is small.

FIG. 97(*e*) obtains the charge accumulation value based on a combination between the detection phase of "180 degrees" (FIG. 97(*b*)) and the light emission phase of "0 degrees" (FIG. 97(*c*)). According to FIG. 97(*e*), the measured light intensity 336 of the detection light (second light) 16 has reached the measurer 8 after the delay time "2L/c" when the irradiated light (first light) 12 is emitted at the light emission phase of "0 degrees" (FIG. 97(*c*)).

When the timings in FIGS. 97(*b*) and 97(*e*) are combined, most of the area where the measured light intensity 336 of the detection light (second light) 16 is at the high level overlaps the measurement timing 334 (exposure period). Therefore, in FIG. 97(*e*), most of the measured light intensity 336 is the oblique lined area. Therefore, after the corresponding pixel repeatedly accumulates the charge in proportion to the oblique lined area within the whole term of a frame, the charge accumulation value approaches the maximum value.

In addition, FIGS. 97(*g*) and 97(*h*) shows a temporal variation along the passing time t regarding the measured light intensity 336 of the detection light (second light) 16 that has reached the measurer 8 after the delay time of "τ=2 L/c" when the irradiated light (first light) 12 is emitted at the light emission phase "δ90" of "90 degrees". Comparison between FIGS. 97(*d*) and 97(*g*) shows a difference in the charge accumulation values within the measuring periods when the detection phase value is fixed and the light emission phase value is changed. Here, in FIGS. 97(*d*) and 97(*g*), the detection phase value indicating the measurement timing 334 (exposure period) is fixed to "0 degrees".

When the timings in FIGS. 97(*a*) and 97(*g*) are combined, it can be seen that the latter half (right half) in the area where the measured light intensity 336 of the detection light (second light) 16 is at the high level overlaps the measurement timing 334 (exposure period). Therefore, in FIG. 97(*g*), the latter half (right side area) in the area where the measured light intensity 336 increases is the oblique lined area.

Comparison between FIGS. 97(*e*) and 97(*h*) also represents a difference in the charge accumulation values within the measuring periods when the detection phase value is fixed and the light emission phase value is changed. Here, a location where the detection phase value is fixed and the light emission phase value is changed is matched in both the set of FIGS. 97(*e*) and 97(*h*) and the set of FIGS. 97(*d*) and 97(*g*). However, while the detection phase value in the set of FIGS. 97(*d*) and 97(*g*) is set to "0 degrees", the detection phase value in the set of FIGS. 97(*e*) and 97(*h*) is set to "180 degrees".

On the other hand, when the timings in FIGS. 97(*b*) and 97(*h*) are combined, the former half (left half) of the area where the measured light intensity 336 of the detection light (second light) 16 is at the high level overlaps the measurement timing 334 (exposure period). Therefore, in FIG. 97(*h*), the former half (left half) of the measured light intensity 336 is the oblique lined area.

As described above, the area of the oblique lined area (the charge accumulation value within the measuring periods) changes between FIGS. 97(*d*), 97(*e*), 97(*g*), and 97(*h*). Therefore, by collecting these measured signals 6, the distance L to the measured object 22 can be measured (length measurement).

FIG. 98 and FIG. 99 shows an embodiment application example of a procedure related to signal processing or data analysis using the measured signal 6 performed by the signal processor and/or data analyzer 38. As shown in FIG. 1 and FIG. 2, the optical device 10 comprises a light source 2, a measurer 8, and a system controller 50. And the system controller 50 includes (or installed) a signal processor and/or data analyzer 38. The measurer 8 receives the detection light (second light) 16 obtained from the measured object 22 to generates the measured signal 6, and the measurer 8 transmits the measured signal 6 to the signal processor and/or data analyzer 38.

The basic processing procedure performed by the signal processor and/or data analyzer 38 has been described with reference to FIG. 3 and FIG. 4. Here, the measured signal 6 to be operated to signal processing or data analysis corresponds to the "variation profile of the charge accumulation value 340 or 341 with respect to the detection phase or the light emission phase" obtained in FIGS. 91 to 97. A procedure embodiment of signal processing or data analysis is described below in detail.

The measured signal collection step (ST02) in FIG. 3 and FIG. 4 corresponds to the distance measurement term (ST06) in FIG. 98 and FIG. 99. The signal processing and/or data analysis step (ST03) in FIG. 3 and FIG. 4 corresponds to the rough distance calculation (ST07) and the highly accurate distance calculation (ST08) in FIG. 98 and FIG. 99. In particular, in the highly accurate distance calculation executed in step 08, the signal processing or data analysis described in Chapter 8 is executed based on the basic concept described in FIG. 5. In addition, the display or notification of FIGS. 8 to 15 may be performed to the user during or before or after execution of step 07 and step 08.

When the user starts the distance measurement (ST05), the distance measurement term of step 06 start. In step 61, the optical device 10 shown in FIG. 1 and FIG. 2, 15A, or 18A achieves a series of operations, and an embodiment example of the series of operations may show one of FIGS. 90, 93, 94, 96, and 97. More specifically, the image sensor 270 obtaining 3D image pattern measures a variation profile of the charge accumulation value 340 or 341 with respect to the detection phase or the light emission phase. And then, the image sensor 270 obtaining 3D image pattern transmits the measured signal 6 collected here (the variation profile of the charge accumulation value 340 or 341) to the signal processor and/or data analyzer 38.

In a case where the detection phase δ is controlled in order to obtain the variation profile of the charge accumulation value 340, the signal processor and/or data analyzer 38 sequentially transmits the setting value of the detection phase δ to the image sensor 270 obtaining 3D image pattern in a time-varying manner. Here, one set of frame group may include one or more frames, and the detection phase value δ is fixed within a frame.

On the other hand, when the light emission phase δ is controlled, the signal processor and/or data analyzer 38 controls the light impulse control circuit 260 in the light source 2 in shown in FIG. 91. There are two kinds of data formats to be transmitted to the light impulse control circuit 260 from the system controller 50. As described above, the light emission phase δ also is fixed within a frame. Therefore, with respect to the first kind of data format, the signal processor and/or data analyzer 38 may send the emission phase value δ within the whole term of the corresponding frame. Alternatively, in the second kind of data format, the signal processor and/or data analyzer 38 may directly send the modulation signal of the emitted light intensity.

In step 62 included in the distance measurement term (ST06), the light power detector 28 in the light source 2 may measure a series of time-dependent modulation patterns of the emitted light intensity regarding the irradiated light (first light) 12 simultaneously with step 61. And then, the light power detector 28 appropriately transmits the collected measured signal 6 (the measured time-dependent modulation patterns) to the signal processor and/or data analyzer 38.

The signal processor and/or data analyzer 38 performs both the rough distance calculation in step 07 and the highly accurate distance calculation in step 08. Here, in the rough distance calculation (ST07), the delay time τ between the measured signal 6 collected from the standard distance (the variation profile of the charge accumulation value 340 or 341 with respect to the detection phase or the light emission phase) and the similar measured signal 6 obtained from the measured object 22 is calculated (ST71), and a rough distance L is calculated from a relational expression of $\tau=2L/c$ (ST72). Then, the rough distance information L calculated in step 72 is used in step 82 in the highly accurate distance calculation (ST08).

The highly accurate distance calculation (ST08) is based on a series of theoretical proof expressed in Equations 32 to 38, and the highly accurate distance calculation performs noise reduction. Here, the highly accurate distance calculation (ST08) substitutes the detection phase value or the light emission phase value "δ" for the parameter "t" in Equations 32 to 38.

Steps 82 and 83 in the highly accurate distance calculation (ST08) correspond to the "extraction of first measured signal constituent (used for reference signal constituent)" 82 shown in FIG. 5. And step 81 also corresponds to the "extraction of second measured signal constituent" 84 shown in FIG. 5. Steps 84 and 85 correspond to the "calculation combination between first and second measured signal constituents" 86 in FIG. 5. And then, step 86 executed as a result corresponds to the "highly accurate measured information generation" 88 in FIG. 5.

In order to clarify the operation for each step in the highly accurate distance calculation (ST08), FIGS. 78 and 79 are used as specific examples below. Here, the highly accurate distance calculation (ST08) may substitute "product calculation for different detection phases or different light emission phases" for "product calculation for wavelengths/pixels 1230" in FIGS. 78 and 79, and the highly accurate distance calculation (ST08) may substitute "phase-dependent" for "time-dependent" in FIGS. 78 and 79. However, the present invention is not limited to FIGS. 78 and 79, and for example, an arbitrary block form such as FIG. 80 is also applicable.

In the execution of step 82 in the highly accurate distance calculation (ST08), the measured signal 6 (the measured time-dependent modulation patterns) transmitted by the light power detector 28 corresponds to the prescribed time-dependent signal 1208 in the light source 2 illustrated in FIG. 79. In FIG. 79, the reference signal extraction 1210 is performed from the prescribed time-dependent signal 1208. According to FIG. 79, a variable of the reference signal after the reference signal extraction 1210 may be the passing time "t" because the light source 2 outputs the prescribed time-dependent signal 1208. In the meantime, a variable used in step 82 is the "phase δ" (the detection phase or the light emission phase). Moreover, the signal processor and/or data analyzer 38 transforms the time-dependent modulation patterns obtained from the light power detector 28 into the variation profiles of charge accumulation value 340 or 341 in response to the detection phase or the light emission phase as shown in the right side of FIG. 93, 94, or 96. In addition, the variation profile handled here is not one set, but is calculated as a collection of a very large number of sets using the delay time τ as a parameter.

More specifically, it is considered that the detection light (second light) 16 holding "the time-dependent modulation patterns of the emission light intensity 338 regarding the irradiated light (first light) 12" arrives at the measurer 8. Each variation profile of the charge accumulation value 340 or 341 is theoretically predicted by finely varying each delay time τ until the detection light (second light) 16 arrives. Therefore, the variation profiles of the charge accumulation values 340 or 341 are calculated by the number of finely divided delay times τ.

Here, the present embodiment application example uses a series of the calculated variation profiles of the charge accumulation values 340 or 341 as the first measured signal constituent (reference signal constituent) 104 explained in FIG. 6 and FIG. 7. In other words, the series of the calculated variation profiles of the charge accumulation values 340 or 341 corresponds to the results of reference signal extraction 1210 shown in FIG. 79.

The theoretically predicted calculation method of the variation profiles of the charge accumulation value 340 or 341 is different depending on which of the detection phase value and the light emission phase value is varied in step 61.

For example, in a case where the charge accumulation value 340 is measured by varying the detection phase value in step 61, the theoretical prediction is performed according to the algorithm of FIG. 93 (or FIG. 94). Further, in a case where the charge accumulation value 341 is measured by varying the light emission phase value in step 61, theoretical prediction is performed according to the algorithm of FIG. 96.

The above theoretically predicted calculation levies a large load on the signal processor and/or data analyzer 38 and requires a long calculation time. Therefore, the delay time τ may be finely changed only in the vicinity thereof using the calculation result of the rough distance L obtained in step 72. When the result of the rough distance calculation (ST07) is used, the load on the signal processor and/or data analyzer 38 is significantly reduced, and the calculation time may be significantly shortened.

In the description of step 82, the signal processor and/or data analyzer 38 transformed the time-dependent modulation patterns obtained from the light power detector 28 into the variation profiles of charge accumulation value 340 or 341. However, the present embodiment application example is not limited thereto, the signal processor and/or data analyzer 38 may use a measured variation profile of charge accumulation value 340 or 341 from the standard distance acquired in advance. More specifically, step 82 may use a reference sample using a reference material disposed at the standard distance. As described in step 71, the present embodiment application example previously measured the variation profile of the charge accumulation value 340 or 341 with respect to the detection phase or the light emission phase of the reference sample disposed at the standard distance.

In this case, the variation profile handled here is not one set, but is calculated as a collection of a very large number of sets using the delay time τ as a parameter. Here, the present embodiment application example defines the previously measured variation profile of the charge accumulation value 340 or 341 of the reference sample disposed at the standard distance as fundamental data. On the basis of the fundamental data, step 82 theoretically predicts each variation profile of the charge accumulation value 340 or 341 in response to the detection phase or the light emission phase by finely varying each delay time τ until the detection light (second light) 16 arrives.

And the present embodiment application example uses a series of the calculated variation profiles of the charge accumulation values 340 or 341 as the first measured signal constituent (reference signal constituent) 104 explained in FIG. 6 and FIG. 7. In other words, the series of the calculated variation profiles of the charge accumulation values 340 or 341 corresponds to the results of reference signal extraction 1210 shown in FIG. 78.

Then, in step 83, DC signal elimination (conversion into only AC signal) 1212 in the reference signal (FIG. 78 or 79) is performed. The obtained first measured signal constituent (reference signal constituent) 104 in FIG. 6 and FIG. 7 corresponds to F(t) on the left side of Equation 32. It is noticed that F(t) is not a single function but is represented by a large number of function groups corresponding to all the finely changed delay times T. In addition, from the conditions of Equations 33 and 34, F(t) of the left side of Equation 32 indicates a function including only the AC signal after elimination of the DC signal. Note that the variable of the left side F(t) of Equation 32 is given by time. However, since the variable of the first measured signal constituent (reference signal constituent) 104 defined here is the detection phase value δ or the light emission phase value δ, F(δ) is correct instead of F(t).

The output of step 61 (the measured variation profile of the charge accumulation value 340 or 341) corresponds to the second measured signal constituent 106 expressed in FIG. 6 and FIG. 7, and it also corresponds to the left side K(t) of Equation 35. For the reasons described above, the variable in the second measured signal constituent 106 also becomes the detection phase value δ or the light emission phase value δ. Therefore, the function to be defined here is more correctly described as K(δ).

In step 81, in order to improve the accuracy of the distance measurement (length measurement) to the measured object 22, the DC signal of the measured variation profile of the charge accumulation value 340 or 341 for each detection phase or light emission phase (timing shift time) δ obtained from the measured object 22 may be eliminated.

Step 84 multiplies the measured signal constituent and one of the reference signal constituents corresponding to a delay time value τ together by each phase value δ. And then the step 84 summates all of the multiplied results. More specifically, as described above, the calculated reference signal constituents obtained from step 82 are a very large number of sets using the delay time τ as a parameter. At the start, the step 84 sets a prescribed delay time value τ. And on the basis of the prescribed delay time value τ, the step 84 selects the corresponding calculated variation profile of the charge accumulation value 340 or 341 for each detection phase or light emission phase δ obtained from step 83 as a reference signal constituent 104.

And then, the step 84 sets a prescribed detection phase value δ or light emission phase value δ. Applying the prescribed phase value δ to the selected variation profile of the charge accumulation value 340 or 341, the step 84 extracts the corresponding charge accumulation value 340 or 341 "F(δ)" relating to Equation 32. In the meantime, step 84 applies the same prescribed phase value δ to the measured variation profile of the charge accumulation value 340 or 341 resulting from step 81 as a measured signal constituent 106. And step 84 extracts the corresponding charge accumulation value 340 or 341 "K(δ)" relating to Equation 35. And then, step 84 multiplies "F(δ)" and "K(δ)" together to obtain "F(δ)×K(δ)" that corresponds to Equation 37.

The multiplication result "F(δ)×K(δ)" is a function depending on a variable of the detection phase δ or the light emission phase δ. And step 84 summates all of the multiplication results "F(δ)×K(δ)" by each phase value δ. In other words, step 84 integrates the multiplication result "F(δ)×K (δ)" within the whole term of the phase δ. Here, the integration result (summation result) corresponds to Equation 38. The calculated variation profile "F(δ)" changes when the delay time value τ varies. So that, the integration result (summation result) corresponding to Equation 38 also changes when the delay time value τ varies. Therefore, in step 84, the present embodiment application example repeatedly calculates the integration (summation) based on each different delay time value τ.

The multiplication calculation "F(δ)×K(δ)" achieved in step 84 corresponds to the product calculation 1230 shown in FIGS. 78 and 79, and the integration result (summation result) obtained in step 84 corresponds to the result of the DC signal extraction 1236 shown in FIGS. 78 and 79.

Step 85 extracts the optimum delay time τ. In step 84, each integration result (summation result) is repeatedly calculated based on each different delay time value τ. And step 85 selects the maximum value of integration result (summation result) among many integration results (summation results), and step 85 extracts the optimum delay time τ relating to the maximum value of integration result (summation result). The extraction of the optimum delay time τ in which the integration value (summation value) is maximized corresponds to the phase matching (phase lock) processing of the lock-in processing (lock-in detection/amplification).

Alternatively, the present embodiment application example previously created a group of reference signal constituent candidates 104 by finely changing the delay time τ. And it may be said that the calculation is processing of selecting the optimum reference signal constituent 104 having a pattern matched with that of the second measured signal constituent 106. In other words, it may be said that the present embodiment application example selects the optimum reference signal constituent 104 having the maximum correlation coefficient value with that of the second measured signal constituent 106.

Step 86 calculates the distance L to the measured object 22 with high accuracy. Here, using the relational expression "τ=2 L/c" and the delay time τ calculated in step 85, the distance L is calculated. When the calculation of the distance L to the measured object 22 is completed, the distance measurement ends (ST09). However, after the end of the distance measurement (ST09), 3D coordinate value estimation (described later with reference to FIGS. 105 and 116) using the calculation (length measurement) result of the distance L may be performed.

Figure 100:
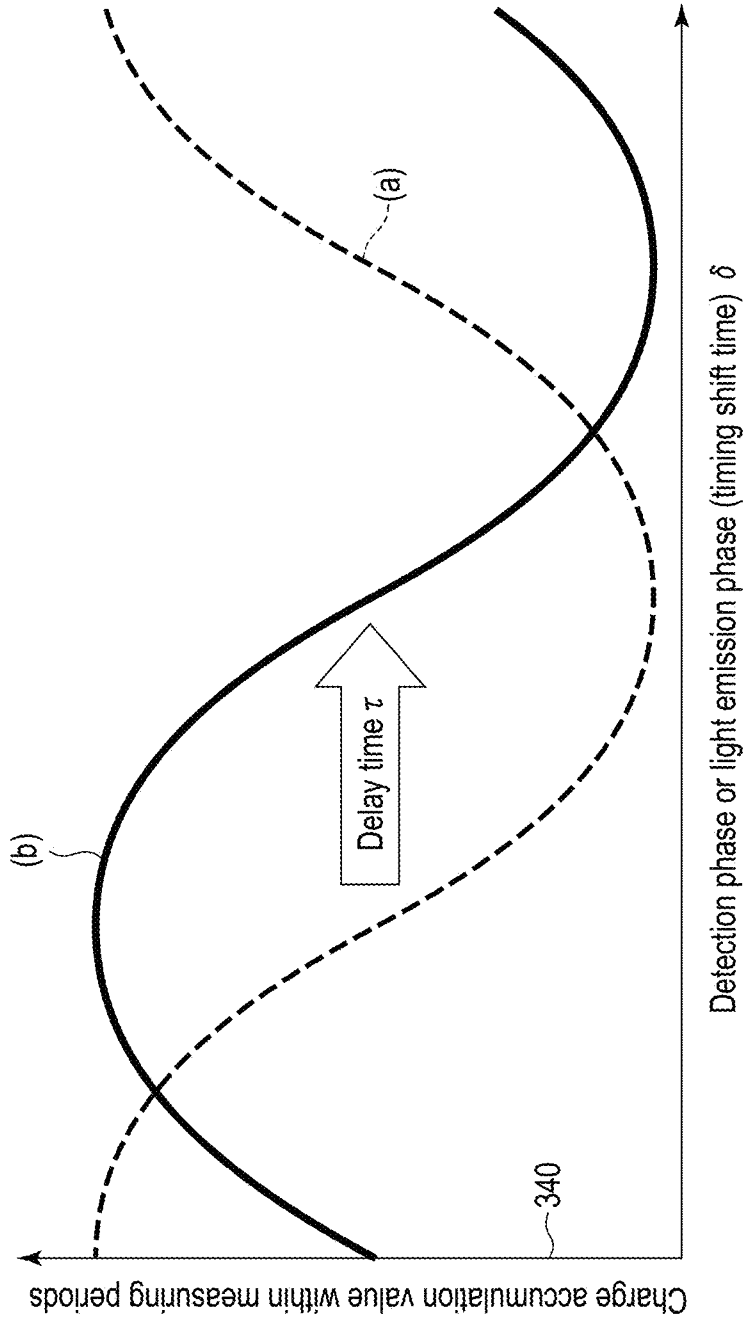
FIG. 100 is an explanatory diagram of a rough distance measurement method in the present embodiment.

FIG. 100 shows an image diagram regarding the "method for calculating the delay time τ between the measured variation profile obtained from the standard distance and the measured variation profile obtained from the measured object 22" executed in step 71 in FIG. 98 and FIG. 99. A horizontal axis in FIG. 100 represents the detection phase or the light emission phase (timing shift time) δ. A vertical axis represents the value of the charge accumulation value 340 or 341 within the measuring periods. FIG. 100 corresponds to the graph described in the right side of FIG. 93 or FIG. 96.

FIG. 100(*a*) shows an example of the measured variation profile obtained from the standard distance. Here, FIG. 100(*a*) requires a reference sample, and the reference sample using a reference material is disposed at the standard distance measured with high accuracy from the optical device 10 incorporating the light source 2 and the measurer 8. Meanwhile, FIG. 100(*b*) shows another example of the measured variation profile obtained from the measured object 22. Here, it is desired to measure (measure the length) the distance L from the optical device 10 to the measured object 22.

The delay time τ until the detection light (second light) 16 arrives at the measurer 8 changes based on the distance L from the optical device 10 to the measured object 22. According to the delay time τ, a shift in the detection phase δ direction or the light emission phase δ direction occurs between FIGS. 100(*a*) and 100(*b*). Therefore, when the shifting value is read on the graph, the delay time τ is expected, and the rough distance L can be calculated.

The entire area width on the horizontal axis in FIG. 100 corresponds to the maximum value of 360 degrees of the detection phase value δ (or the light emission phase value δ). The detection phase value 6360 (or the light emission phase value δ360) at 360 degrees corresponds to the maximum distance "Lmax=cT/2" at which the length can be measured. Here, "τ" represents a modulation cycle related to the emission light intensity 338 of the irradiated light (first light) 12, and "c" represents the light velocity. There is a relation of "τ=2 L/c" between the distance L to the measured object 22 and the delay time τ until the detection light (second light) 16 arrives at the measurer 8.

Therefore, the delay time τ can be calculated from the shifting value in the detection phase δ direction or the light emission phase δ direction between FIGS. 100(*a*) and 100 (*b*), and the rough distance L can be calculated.

Figure 101:
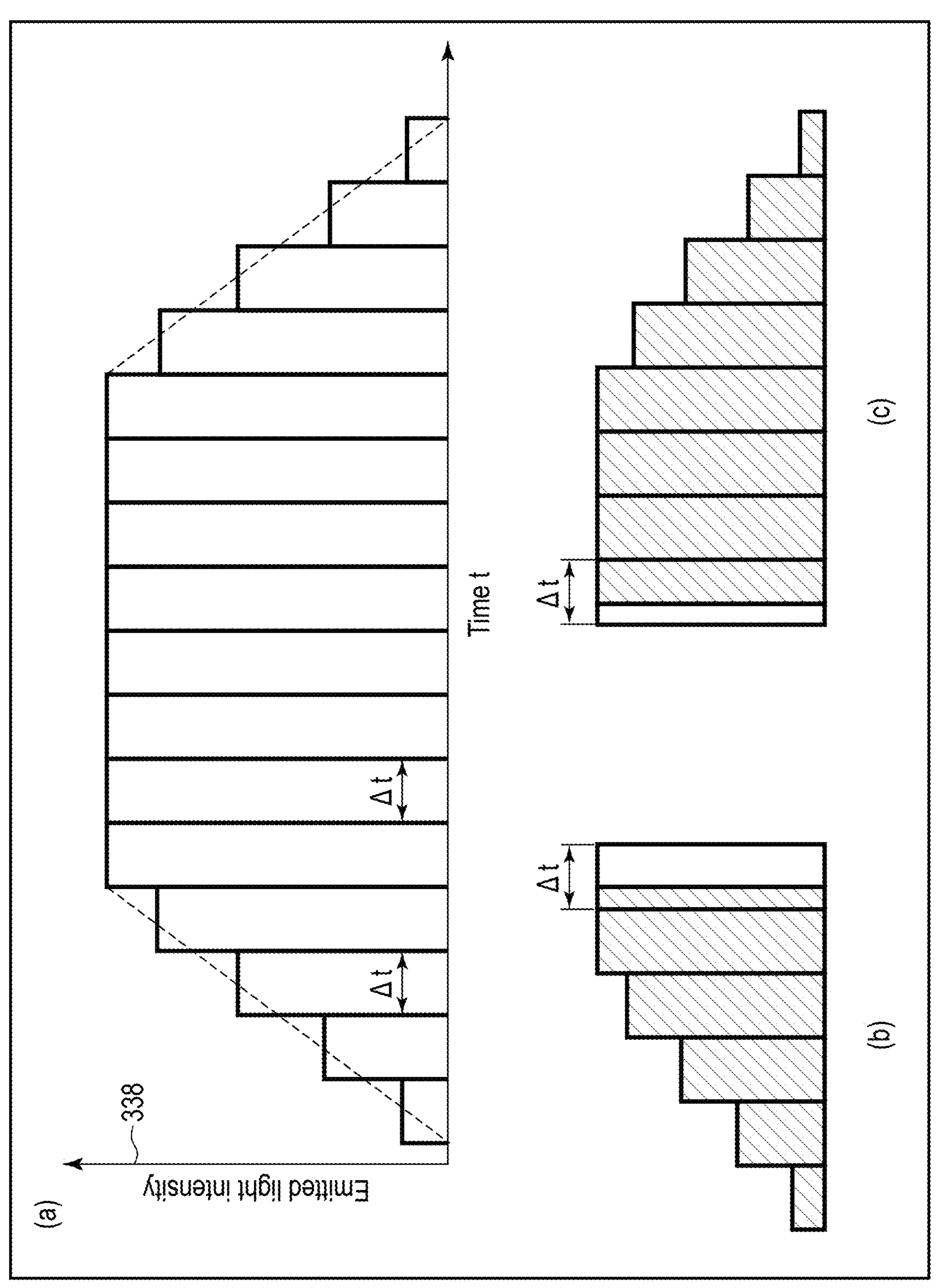
FIG. 101 is an explanatory diagram using temporal change information of an irradiated light intensity in the present embodiment.

FIG. 101 illustrates an explanatory diagram of the "theoretical prediction method using the temporal change measurement result of the emission light intensity 338" executed in step 82 of FIG. 98 and FIG. 99. In FIG. 101, a horizontal axis represents time, and a vertical axis represents the emission light intensity 338 of the irradiated light (first light) 12. FIG. 101(*a*) illustrates an example of a measurement result regarding a temporal change of the emission light intensity 338 for one pulse. The emission light intensity 338 is sampled at each time interval "Δt". The light power detector 28 in the light source 2 appropriately transmits the sampled data of the emission light intensity 338 to the system controller 50.

The temporal change characteristic regarding the emission light intensity 338 of the irradiated light (first light) 12 emitted by the light source 2 is transferred to the temporal change characteristic regarding the measured light intensity 336 of the detection light (second light) 16 arriving at the measurer 8 as it is. Incidentally, shaded areas in FIGS. 93, 94, 96, and 97 correspond to the charge accumulation amounts 340 within the measuring periods. A part of the shaded area corresponds to the area from the rising start time of the measured light intensity 336 of the detection light (second light) 16 to the end time of the measurement timing 334 (exposure period). An enlarged view of the shaded area is illustrated in FIG. 101(*b*). The end time of the measurement timing 334 (exposure period) is shifted from the boundary time of the sampling period "Δt". Therefore, the signal processor and/or data analyzer 38 calculates the accurate shaded area in FIG. 101(*b*) from the sampling data of the emission light intensity 338 received from the light power detector 28. Then, the calculation result becomes a value of the charge accumulation amount 340 within the measuring periods at the predetermined detection phase value (light emission phase value) δ.

Other shaded areas in FIGS. 93, 94, 96, and 97 correspond to the area from the start time of the measurement timing 334 (exposure period) to the falling end time of the measured light intensity 336. As illustrated in an enlarged view of the shaded area in FIG. 101(*c*), the start timing of the measurement timing 334 (exposure period) is shifted from the boundary time of the sampling period "Δt". Therefore, the signal processor and/or data analyzer 38 also calculates the accurate shaded area in FIG. 101(*c*) from the sampling data of the emission light intensity 338 received from the light power detector 28. Then, the calculation result becomes a value of the charge accumulation amount 340 within the measuring periods at the predetermined detection phase value (light emission phase value) δ.

FIG. 102 is an explanatory diagram regarding the processing contents of step 84 and step 85 in FIG. 98 and FIG. 99. A horizontal axis in FIG. 102 also indicates the detection phase value δ or the light emission phase value δ (timing shift time), and a vertical axis indicates the AC signal 346 (variation profile after DC signal elimination) of the charge accumulation value within the measuring periods. FIG. 102(*a*) indicates a measured variation profile obtained from the measured object 22. The measured variation profile corresponds to the second measured signal constituent 106 described with reference to FIGS. 5, 6, and 7.

FIGS. 101(*b*) to 101(*d*) shows theoretically predicted variation profiles calculated for different delay times "τ1" to "τ3". Moreover, FIGS. 102(*b*) to 102(*d*) show the AC signals 346 of the theoretically predicted variation profiles of the charge accumulation value 340 or 341 within the measuring periods. Here, the calculation result described in FIG. 101 may be applied to one of the measuring methods shown in FIGS. 93, 94, 96, and 97 to generate FIGS. 101(*b*) to 101(*d*). In addition, not limited to it, the previously measured variation profiles of the charge accumulation value 340 or 341 obtained from the standard substance arranged at a location of a standard distance may be applied to generate FIGS. 101(*b*) to 101(*d*).

The theoretically predicted variation profiles shown in FIGS. 101(*b*) to 101(*d*) correspond to the first measured signal constituent (reference signal constituent) 104 described with reference to FIGS. 5, 6, and 7. In the actual processing in step 84 and step 85 in FIG. 98 and FIG. 99, the delay time τ is finely changed, and the theoretically predicted variation profiles for all the delay times "τ" are calculated. For convenience of description, description in FIG. 102 is narrowed down to only three values of "τ1" to "τ3" as the delay times.

As specific calculation processing content based on Equation 37, product calculation is performed between the vertical axis values in FIGS. 102(*a*) and 102(*b*) for each of different detection phase values δ (or light emission phase values δ). More specifically, the measured variation profile of the charge accumulation value 340 or 341 shown in FIG. 102(*a*) represents "Kac(δ)". Here, substituting the variable "δ" for the variable "t" and eliminating the DC signal constituent from "K(δ)", the function "K(t)" expressed in Equation 35 may be transformed into "Kac(δ)". Similarly the function "F(t)" expressed in Equation 32 may be transformed into "F(δ)". Specially the theoretically predicted (calculated) variation profile of the charge accumulation value 340 or 341 shown in FIG. 102(*b*) represents "Fb(δ)". And FIGS. 102(*c*) and 102(*d*) represent "Fc(δ)" and "Fd(δ)" respectively. In case of the product calculation, step 84 expressed in FIGS. 98 and 99 multiplies a charge accumulation value "Kac(δ)" and another charge accumulation value "Fb(δ)" together to obtain "Kac(δ)×Fb(δ)" by a prescribed phase value "δ".

Next, as specific calculation processing content based on Equation 38, the product calculation result is summated with the entire detection phase value δ (or the entire light emission phase value δ). That is, the summation calculation may represent "Σ Kac(δ)×Fb(δ)".

Similarly, for each detection phase value δ (or light emission phase value δ), product calculation between the vertical axis values in FIGS. 102(*a*) and 102(*c*) is performed to obtain "Kac(δ)×Fc(δ)", and the product calculation result is summated with the entire detection phase value δ (or the entire light emission phase value δ) to obtain "Σ Kac(δ)× Fc(δ)". Further, for each detection phase value δ (or light emission phase value δ), product calculation between the vertical axis values in FIGS. 102(*a*) and 102(*d*) is performed to obtain "Kac(δ)×Fd(δ)", and the product calculation result is summated with the entire detection phase value δ (or the entire light emission phase value δ) to obtain "Σ Kac(δ) x Fd(δ)".

The meaning of the "extraction of the delay time "τ" having the maximum summation value" executed in step 85 of FIG. 98 and FIG. 99 is described with reference to FIG. 102. A zero point level 344 in the AC signal 346 of the charge accumulation value indicating the vertical axis in FIG. 102 is set in the center portion in FIG. 102. In a location where a value of an A area is taken as the detection phase value δ (or the light emission phase value δ), the polarities of the vertical axis values in FIGS. 102(*a*) and 102(*b*) are inverted.

That is, while the vertical axis value in FIG. 102(*a*) takes a positive value (Kac(δ)>0 in A area), the vertical axis value in FIG. 102(*b*) takes a negative value (Fb(δ)<0 in A area). Therefore, in the vicinity of the A area, a product calculation result between the vertical axis values in FIGS. 102(*a*) and 102(*b*) is a negative value (Kac(δ)×Fb(δ)<0 in A area). Therefore, a value obtained by summating the product calculation result between the vertical axis values in FIGS. 102(*a*) and 102(*b*) with the entire detection phase value δ (or the entire light emission phase value δ) (Σ Kac(δ)×Fb(δ)) is not able to take a very big value.

In a location where a value of a B area is taken as the detection phase value δ (or the light emission phase value δ), the polarities of the vertical axis values in FIGS. 102(*a*) and 102(*d*) are inverted. That is, while the vertical axis value in FIG. 102(*a*) takes a negative value (Kac(δ)<0 in B area), the vertical axis value in FIG. 102(*d*) takes a positive value (Fd(δ)>0 in B area). Therefore, in the vicinity of the B area, a product calculation result between the vertical axis values in FIGS. 102(*a*) and 102(*d*) is a negative value (Kac(δ)×Fd(δ)<0 in B area). Therefore, a value obtained by summating the product calculation result between the vertical axis values in FIGS. 102(*a*) and 102(*d*) with the entire detection phase value δ (or the entire light emission phase value δ) (Σ Kac(δ)×Fd(δ)) also does not become a very big value.

On the other hand, a product calculation result between the vertical axis values in FIGS. 102(*a*) and 102(*c*) is a positive value (Kac(δ)×Fc(6)>0) throughout the detection phase value δ (or the light emission phase value δ). As a result, a value obtained by summating the product calculation result between the vertical axis values in FIGS. 102(*a*) and 102(*c*) with the entire detection phase value δ (or the entire light emission phase value δ) (Σ Kac(δ)×Fc(δ)) takes a maximum value. In step 86 of FIG. 98 and FIG. 99, the distance L is calculated from the delay time "T2" when the summation value takes the maximum value using the method described in FIG. 100.

The AC signal of the theoretically predicted variation profile for each delay time τ finely changed as described above is prepared in advance. Between a measured variation profile (a) obtained from the measured object 22 and individual AC signals of theoretically predicted variation profiles (b) to (d), product calculation for each detection phase or light emission phase δ is performed. Then, a delay time τ when a value obtained by summating a product calculation result with the entire detection phase (light emission phase) is maximized is searched.

There are so many candidates of theoretically predicted variation profiles. When the summation value is maximized, it is considered that the corresponding variation profile and the corresponding delay time τ are true. As described above, the disturbance noise component mixed in the measured variation profile obtained from the measured object 22 is removed in the course of the calculation processing, so that the distance measurement (length measurement) can be performed with very high accuracy.

FIG. 103 illustrates another application example of the present embodiment that enables more accurate length measurement. FIG. 103 has a structure in which FIG. 71 and FIG. 91 are combined. Therefore, the description of the parts common to FIGS. 71 and 91 will be omitted because they overlap. The distance to the measured object 22 is measured by the method described so far in Chapter 9. Further, the fine uneven shape and the height of the unevenness on the surface of the measured object 22 are measured using the light interference system described with reference to FIG. 71. When the distance measurement (length measurement) is performed in two stages as described above, it is possible to perform measurement with very high accuracy.

Figure 104:
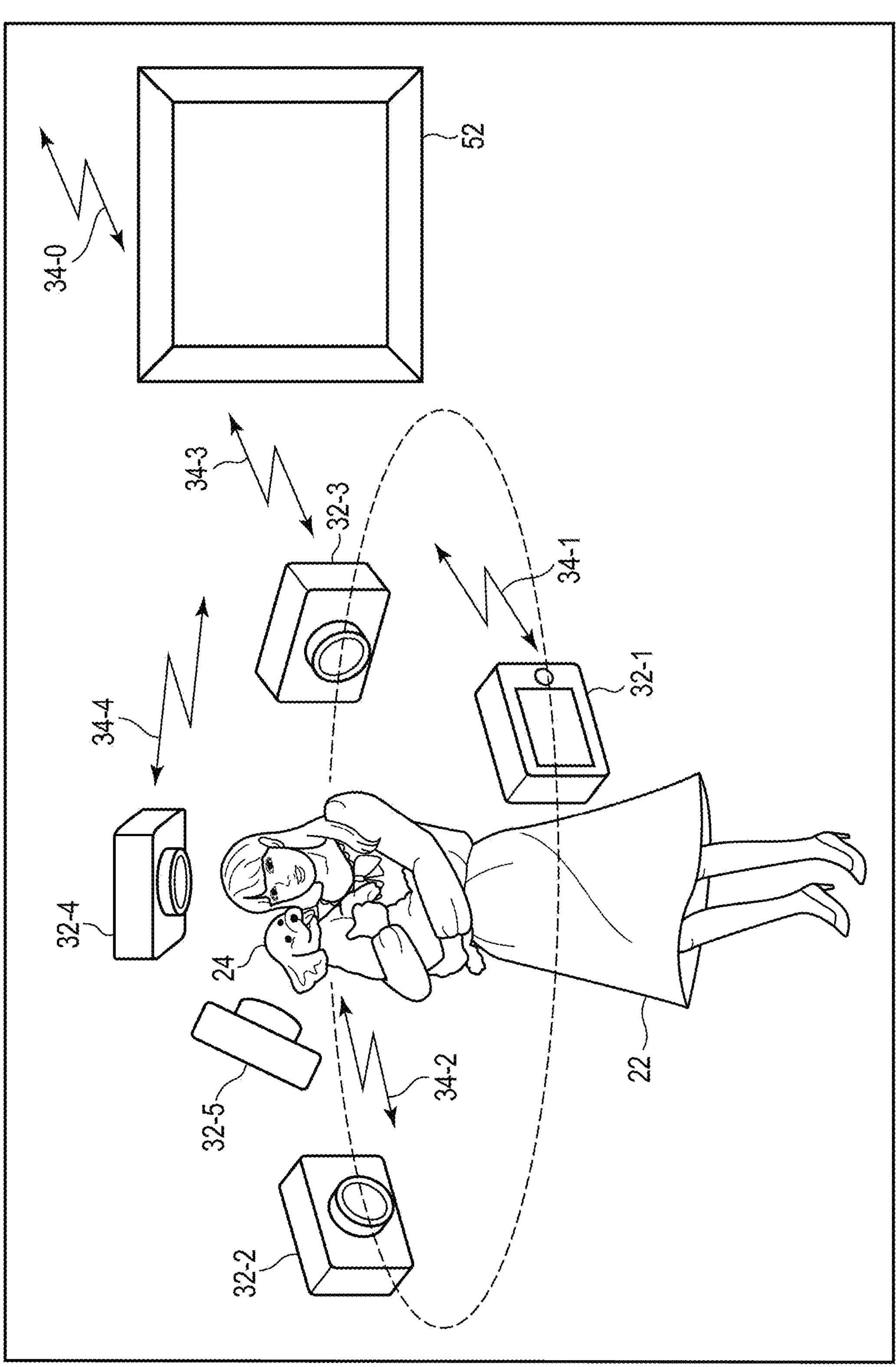
FIG. 104 illustrates an example of a system using a plurality of 3D measurement cameras in the present embodiment.

FIG. 104 illustrates an embodiment example of a 3D measurement system using a plurality of cameras 32. When 3D measurement is performed using only one TOF camera 32, the back side of the measured object 22 viewed from the TOF camera 32 with respect to the front side cannot be imaged. As illustrated in FIG. 104, when the results of simultaneous imaging using a plurality of TOF cameras 32-1 to 32-5 are combined, there is an effect that an omnidirectional stereoscopic image (still image or moving image) relating to the entire surface of the measured object 22 can be acquired.

In this system embodiment example, a single system controller 50 serves as a controller simultaneously managing plural cameras. The controller simultaneously managing plural cameras (system controller) 50 uses communication functions (communication transmission functions) 34-1 to 34-4 to control interlocking imaging with the respective cameras 32-1 to 32-4. The controller simultaneously managing plural cameras (system controller) 50 controls the imaging operation of each of the cameras 32-1 to 32-4, and collects a 3D captured image (still image or moving image) captured for each of the cameras 32-1 to 32-4 as the measured signal 6.

The signal processor and/or data analyzer 38 in the controller simultaneously managing plural cameras (system controller) 50 integrates distance data for each pixel in all the cameras 32-1 to 32-4. Then, the 3D coordinates of the color regarding the entire surface of the measured object 22 are constructed (however, when a moving image is captured, the 4D coordinates including a time axis are constructed). Further, as a physical form of the controller simultaneously managing plural cameras (system controller) 50, an arbitrary physical embodiment such as a personal computer (PC) or a mobile terminal may be adopted.

Information of the 3D coordinates of the color regarding the entire surface with respect to the measured object 22 constructed by the signal processor and/or data analyzer 38 in the controller simultaneously managing plural cameras (system controller) 50 is transmitted to a server (or a cloud server) or the like using a communication function (information transmission) 34-0. Then, the server (or cloud server) provides the user with a service using the transmitted information of the 3D coordinates of the color regarding the entire surface of the measured object 22.

Each of the cameras 32-1 to 32-4 of #1 to #4 has a structure obtained by removing the system controller 50 from FIG. 91. That is, the system controller 50 and the others are separated in the optical device 10 of FIG. 91. Then, the system controller 50 is separated and independent as the controller simultaneously managing plural cameras 50, and is used in common in the entire system. In addition, the cameras 32-1 to 32-4 of #1 to #4 are individually configured in the rest of the optical device 10 of FIG. 91 excluding the system controller 50.

Therefore, at the time of distance measurement (length measurement) to each point on the surface of the measured object 22, the irradiated light (first light) 12 is intermittently emitted from the cameras 32-1 to 32-4 of #1 to #4. When emission times of the irradiated light (first light) 12 overlap between the cameras 32-1 to 32-4 of #1 to #4, stable distance measurement (length measurement) is hindered. Therefore, the signal processor and/or data analyzer 38 in the controller simultaneously managing plural cameras (system controller) 50 controls radiation timing regarding the irradiated light (first light) 12 of each of the cameras 32-1 to 32-4 of #1 to #4.

In the embodiment example of FIG. 104, stereoscopic whole-body images (still images or moving images) of a female model holding a puppy 24 are captured in cooperation by the four cameras 32-1 to 32-4 of #1 to #4. Here, it is assumed that the third person approaches the puppy 24 at the same time and attempts to take a close-up picture of the puppy 24 using a conventional color camera 32-5 of #5. Since the conventional color camera 32-5 of #5 does not have the communication function (information transmission) 34, it is not controlled by the controller simultaneously managing plural cameras (system controller) 50. Therefore, there is a risk that the photographing of the conventional color camera 32-5 of #5 is hindered by the influence of the irradiated light (first light) 12 emitted from any one of the cameras 32-1 to 32-4 of #1 to #4. Here, a method is proposed in which all the cameras 32-1 to 32-5 can stably capture images even in the above situation.

The camera 32-5 of #5 in FIG. 104 shows a conventional color camera 32-5 that does not emit light. On the other hand, the cameras 32-1 to 32-4 of #1 to #4 show 3D color cameras (TOF cameras) that emit the irradiated light 12. In order to avoid confusion between the two, the 3D color camera (TOF camera) is particularly referred to as a TOF camera.

In the embodiment example of FIG. 104, the cameras 32-1 to 32-4 are used to acquire an omnidirectional stereoscopic image (still image or moving image) with respect to the entire surface of the same measured object 22. Here, photographing directions of the cameras 32-1 to 32-4 facing the same measured object 22 are different. Therefore, it is necessary to efficiently combine 3D images different from each other acquired from different photographing directions for each of the cameras 32-1 to 32-4.

In the present system embodiment example, at the time of capturing a 3D color image using one camera 32, 3D coordinate information (4D coordinate information including time coordinates in a case of a moving image) of each point on the surface of the measured object 22 corresponding to each pixel may be collected. Then, 3D (4D) coordinate information of each point on the surface of the measured object 22 is matched between the different cameras 32-1 to 32-4. Furthermore, when the 3D (4D) coordinate information of each point on the surface of the measured object 22 is used as a basis, an effect of efficiently combining different 3D images collected by the different cameras 32-1 to 32-4 is produced.

Figure 105:
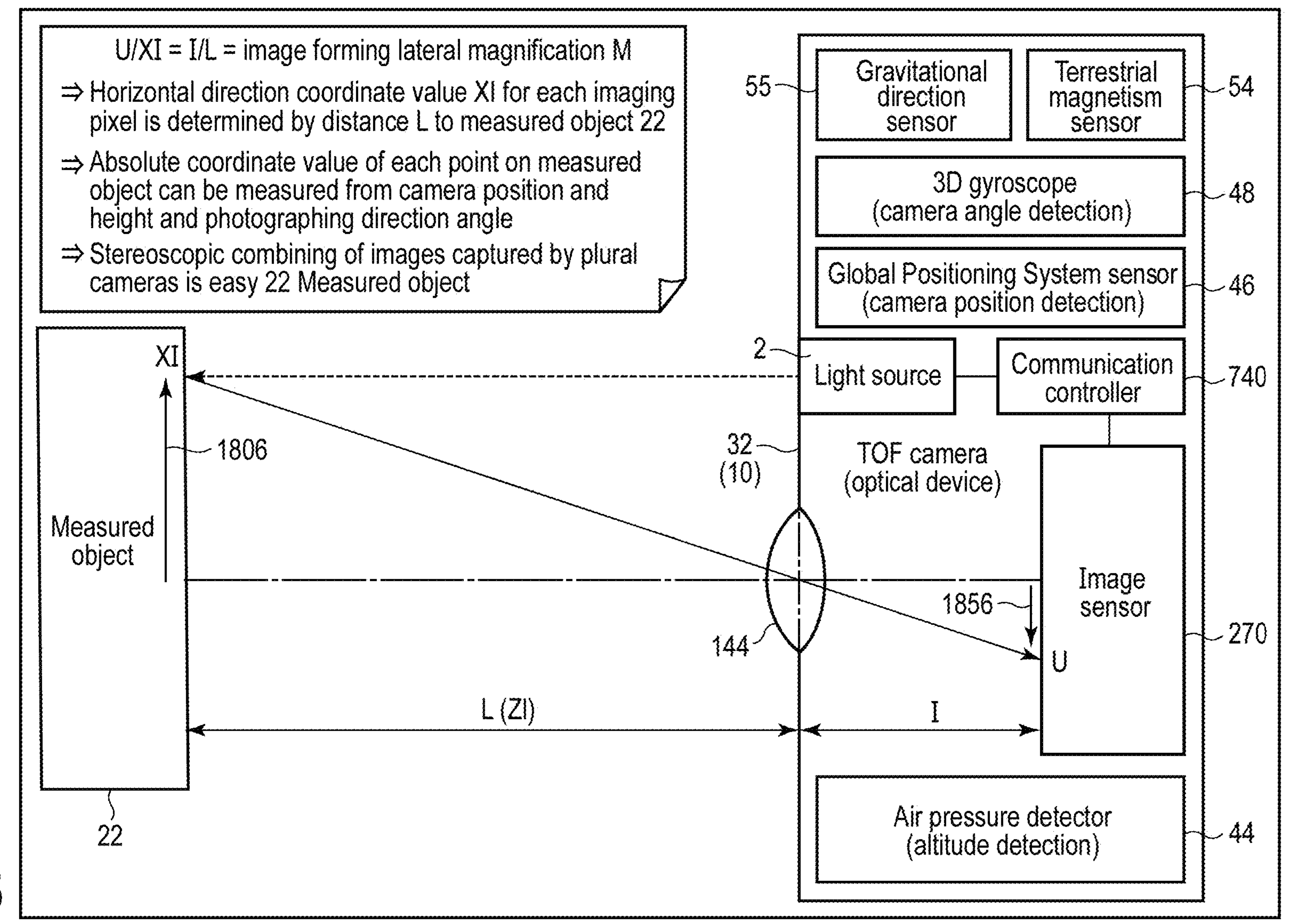
FIG. 105 illustrates an example of a 3D simultaneous measurement method in the present embodiment.

FIG. 105 illustrates an example of a 3D (4D) coordinate information collection method of each point on the surface of the measured object 22 using the present embodiment example of the TOF camera 28. The TOF camera 32 (optical device 10) incorporates a global position sensor (GPS sensor) 46 as a position coordinate detection of the camera 32. The position coordinate detection 46 of the TOF camera 32 (optical device 10) is not limited to the GPS sensor, and for example, a beacon may be used.

Further, a 3D gyroscope (camera angle detection) 48 that detects the direction of the TOF camera 32 (optical device 10) is also incorporated. Furthermore, as a standard angle measurement method in the photographing direction, a terrestrial magnetism sensor 54 and a gravitational direction sensor 55 are also provided. As a mechanism for knowing the altitude of the location where the TOF camera 32 (optical device 10) is arranged, an air pressure detector (altitude detection) 44 is also incorporated.

Here, a point at which the optical axis of the image forming lens 144 incorporated in the TOF camera 32 intersects the surface of the measured object 22 is referred to as an optical axis point. The TOF camera 32 can measure a distance L (location value on Z1-coordinate) from image forming lens 144 to the optical axis point on the surface of the measured object 22. That is, when the optical axis direction of the image forming lens 144 is represented by the Z1-coordinates, the location value on Z1-coordinate of the optical axis point on the surface of the measured object 22 corresponds to "L".

In addition, since the distance I from the image forming lens 144 to the imaging plane of the image sensor 270 obtaining 3D image patterns is known in advance, the image forming lateral magnification M is obtained by calculation of I/L. Further, a location value on U-coordinate 1856 of a specific pixel in the image sensor 270 obtaining 3D image patterns is determined in advance. Therefore, a similar relation of the image forming lateral magnification M=I/L=U/X1 is established with respect to the location value on X1-coordinate 1806 of the measurement point on the surface of the measured object 22 corresponding to the specific pixel. The location value on X1-coordinate 1806 can be calculated from this relational expression.

The above content is summarized below. Since the TOF camera 28 can measure the distance L (Z1) from the image forming lens 144 to the optical axis point on the surface of the measured object 22, the location value on X1-coordinate 1806 of the measurement point can be calculated from the distance L (Z1) to the optical axis point on the surface of the measured object 22. Both the location value on X1-coordinate 1806 and the location value on Z1-coordinate are the relative coordinates with respect to the TOF camera 28.

An absolute coordinate value of the measurement point on the surface of the measured object 22 is determined from the position and height of the TOF camera 32 (optical device 10) and the angle of the photographing direction. In addition, there is an effect of efficiently combining different 3D images collected by the different cameras 32-1 to 32-4 (TOF camera 32) based on the absolute coordinate value of each measurement point on the surface of the measured object 22.

A communication controller 740 incorporated in the TOF camera 32 exchanges information with the controller simultaneously managing plural cameras (system controller) 50. The light source 2 emits the irradiated light (first light) 12 in response to a command from the controller simultaneously managing plural cameras (system controller) 50. The relative coordinate values and the luminance/color tone information of each point on the surface of the measured object 22 calculated based on the measured signal 6 from the image sensor 270 are transmitted to the controller simultaneously managing plural cameras (system controller) 50.

Then, the signal processor and/or data analyzer 38 in the system controller (controller simultaneously managing plural cameras) 50 combines different 3D images collected by the different cameras 32-1 to 32-4. Therefore, the signal processor and/or data analyzer 38 may convert the position information of each point on the surface of the measured object 22 into an absolute coordinate value using the position and height of each of the cameras 32-1 to 32-4 and the angle information of the photographing direction. Therefore, as the position information of each point on the surface of the measured object 22 measured in the cameras 32-1 to 32-4, only the relative coordinate value of each of the cameras 32-1 to 32-4 is calculated.

It is relatively easy to calculate the position information of each point on the surface of the measured object 22 using the relative coordinate value for each of the cameras 32-1 to 32-4. However, converting the relative coordinate values into absolute coordinate values in the cameras 32-1 to 32-4 is burdensome. Therefore, when the relative coordinate values, the position and the height of each of the cameras 32-1 to 32-4, and the angle information of the photographing direction are transmitted from the cameras 32-1 to 32-4 to the system controller (controller simultaneously managing plural cameras) 50, the load balance of the entire system can be made uniform.

FIG. 106 illustrates an example of a method for setting the relative coordinates based on the arrangement of the 3D color image sensor 1280 (or the image sensor 270 obtaining 3D image patterns and the imaging sensor 300). The relative coordinate direction may be set such that a horizontal direction of a pixel array viewed from the 3D color image sensor 1280 is X1 and a vertical direction thereof is Y1. In addition, a perpendicular direction with respect to the imaging plane may be set as Z1.

FIG. 107 illustrates a description format example of 3D color information for each pixel described by the relative coordinates. Information (list information) created in this format may be transmitted from each of the cameras 34-1 to 34-4 (TOF cameras) to the controller simultaneously managing plural cameras (system controller) 50.

FIG. 107(*a*) illustrates a pixel arrangement example on the imaging plane of the 3D color image sensor 1280 (or the image sensor 270 obtaining 3D image patterns and the imaging sensor 300). A horizontal direction of the pixel array indicates an X1 direction, and a column number 1802 increases as an X1 value increases. In addition, a vertical direction of the pixel array indicates a Y1 direction, and a row number 1800 increases as the Y1 value increases.

As illustrated in FIG. 107(*b*), the relative coordinate value and the color tone information including the luminance of each point on the surface of the measured object 22 corresponding to each pixel are arranged in a list format (a comma separated value (CSV) format, a Relational Data Base format, or the like). Specifically, as identification information for each pixel in the 3D color image sensor 1280 (or the image sensor 270 obtaining 3D image patterns and the imaging sensor 300), a row number on an image sensor 1800 and a column number on an image sensor 1802 are used.

In addition, as the relative coordinate values of each point on the surface of the measured object 22 corresponding to each pixel, a location value on X1-coordinate 1806, a location value on Y1-coordinate 1808, and a location value on Z1-coordinate 1810 are described in the above list. Furthermore, as the luminance/color tone information of each point on the surface of the measured object 22 corresponding to each pixel, white intensity 1812, red intensity 1814, green intensity 1816, and blue intensity 1818 are described in the above list.

Figure 108:
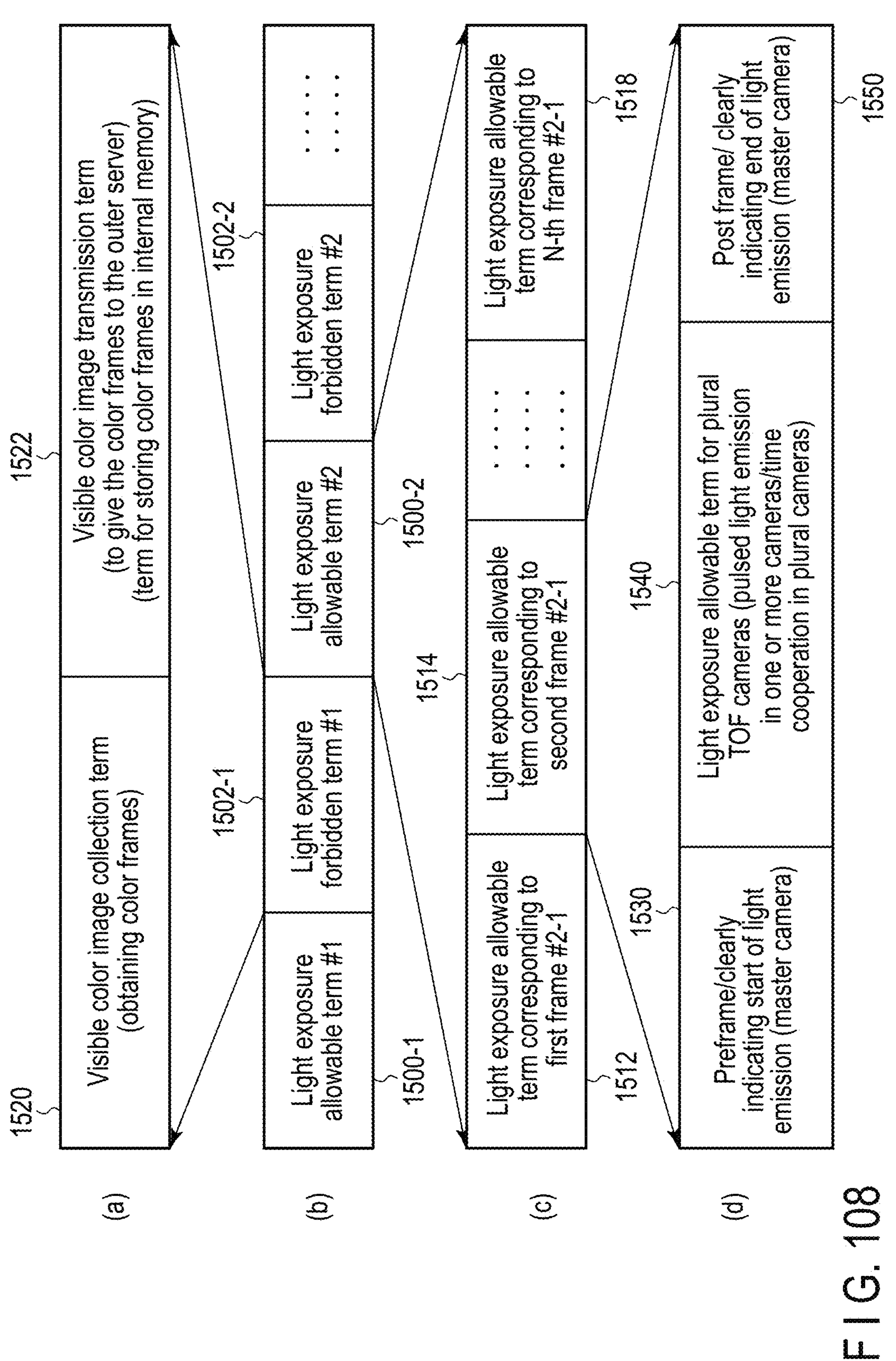
FIG. 108 illustrates a relation between a light exposure allowable term and a light exposure forbidden term that occur in time series in the present embodiment.

FIG. 108 illustrates an embodiment example that enables simultaneous photographing of the TOF camera 28 with a light exposure allowable term and the conventional camera 32-5 without a light exposure allowable term. As illustrated in FIG. 108(*b*), in the present embodiment example, light exposure allowable terms 1500-1 and 1500-2 and light exposure forbidden terms 1502-1 and 1502-2 are divided in time series. The TOF camera 28 can emit the irradiated light (first light) 12 within the light exposure allowable terms 1500-1 and 1500-2. On the other hand, the emission of the irradiated light (first light) 12 of the TOF camera 28 is forbidden in the light exposure forbidden terms 1502-1 and 1502-2. In addition, one TOF camera (master camera to be described later) in the photographing site may set the light exposure allowable terms 1500-1 and 1500-2 and the light exposure forbidden terms 1502-1 and 1502-2 by time division.

Therefore, the conventional camera 32-5 can perform photographing within the light exposure forbidden terms 1502-1 and 1502-2. As a method in which the conventional camera 32-5 captures still images using the light exposure forbidden terms 1502-1 and 1502-2, a plurality of still images may be captured in a cycle different from a cycle in which the light exposure allowable term 1500-1 and the light exposure forbidden term 1502-1 are combined. Then, only a still image that is not affected by the irradiated light (first light) 12 is selected from the captured still images.

Since the imaging sensor 300 in the conventional camera 32-5 has sensitivity to the wavelength of the irradiated light (first light) 12, it is possible to detect the light exposure allowable terms 1500-1 and 1500-2 before photographing. Therefore, after the user presses a shutter, the imaging sensor 300 can detect the boundary time between the light exposure allowable term 1500-1 and the light exposure forbidden term 1502-1. Then, within the detected light exposure forbidden terms 1502-1 and 1502-2, the conventional camera 32-5 executes photographing. In addition, when a moving image is captured by the conventional camera 32-5, a moving image may be intermittently captured within the light exposure forbidden terms 1502-1 and 1502-2.

Note that, within the light exposure forbidden terms 1502-1 and 1502-2, the TOF camera 28 may capture a color image as in the conventional case. During these terms, the TOF camera 28 does not emit the irradiated light (first light) 12 similarly to the conventional camera 32-5, and the image sensor 280 obtaining color image patterns in FIG. 91 images scattered light of external light on the surface of the measured object 22.

FIG. 108(*a*) illustrates an example of photographing timing within the light exposure forbidden terms 1502-1 and 1502-2 of the conventional camera 32-5. This photographing timing example is also applied when the TOF camera 28 captures a color image. First, color frames are obtained during a visible color image collection term 1520. When the collection of visible color images is completed, a visible color image transmission term 1522 is set. During this term, the collected color frames are transmitted to the outside or stored in an internal memory.

FIG. 108(*c*) illustrates an operation example of the TOF camera 28 in the light exposure allowable terms 1500-1 and 1500-2. At the same time, an example of a case in which the detection phases 6 of all the pixels in the image sensor 270 obtaining 3D image patterns are matched with each other will be described. In this case, a value of the detection phase δ or a value of the light emission phase δ is switched between different frames. When the number of divisions of the detection phase δ or the light emission phase δ is set to "N", a frame group is constituted by N frames. Then, imaging of the frame group (imaging of all the N frames) is performed at a time within the same light exposure allowable terms 1500-1 and 1500-2. Therefore, the same light exposure allowable term 1500-2 of #2 includes a light exposure allowable term corresponding to the first frame 1512 of #2-1 to a light exposure allowable term corresponding to the N-th frame 1518 of #2-N.

FIG. 108(*d*) illustrates an example of a time-series term division method within a light exposure allowable term corresponding to one frame 1514. In the present embodiment example, it is possible to perform mixed photographing of the conventional camera 32-5 and the TOF camera 28, and it is possible to perform mixed photographing of a plurality of TOF cameras 28 (cameras 32-1 to 32-4) at the same time. When a plurality of TOF cameras 28 (cameras 32-1 to 32-4) exist in the same photographing location, one TOF camera 28 (camera 32-1) is set as the master camera, and the other TOF cameras 28 (cameras 32-2 to 32-4) are set as the slave cameras.

The system controller (the controller simultaneously managing plural cameras) 50 may select the master camera, or any one of the TOF cameras 28 (cameras 32-1 to 32-4) in the same photographing location may voluntarily stand for the master camera. Note that a method for voluntarily standing for the master camera the master camera will be described later with reference to FIG. 112 and FIG. 113. In any case, the light emission pattern of the irradiated light (first light) 12 emitted from the master camera is used to perform temporal division between the light exposure allowable terms 1500-1 and 1500-2 and the light exposure forbidden terms 1502-1 and 1502-2.

The light exposure allowable term corresponding to one frame 1514 is divided into a preframe term 1530 clearly indicating the start of light emission, a light exposure allowable term for plural TOF cameras 1540, and a post frame term 1550 clearly indicating the end of light emission in time series. Here, the preframe term 1530 and the post frame term 1550 are defined by modulation patterns regarding the emission light intensity 338 of the irradiated light (first light) emitted by the master camera.

Emission of the irradiated light (first light) from other slave camera is allowable within the light exposure allowable term for plural TOF cameras 1540 sandwiched between the preframe term 1530 and the post frame term 1550 defined by the master camera. For example, in the case that only one TOF camera 28 (master camera) exists in the same photographing location, one TOF camera 28 (master camera) emits the irradiated light (first light) 12 within the light exposure allowable term for plural TOF cameras 1540.

On the other hand, when there are the TOF cameras 28 and 32-1 to 32-4 (one master camera and other slave cameras) in the same photographing location, all the cameras 32-1 to 32-4 (TOF camera 28) sequentially emit light within the light exposure allowable term for plural TOF cameras 1540. Even in this case, control is performed such that simultaneous light emission does not occur between the different cameras 32-1 to 32-4 (TOF camera 28).

Figure 109:
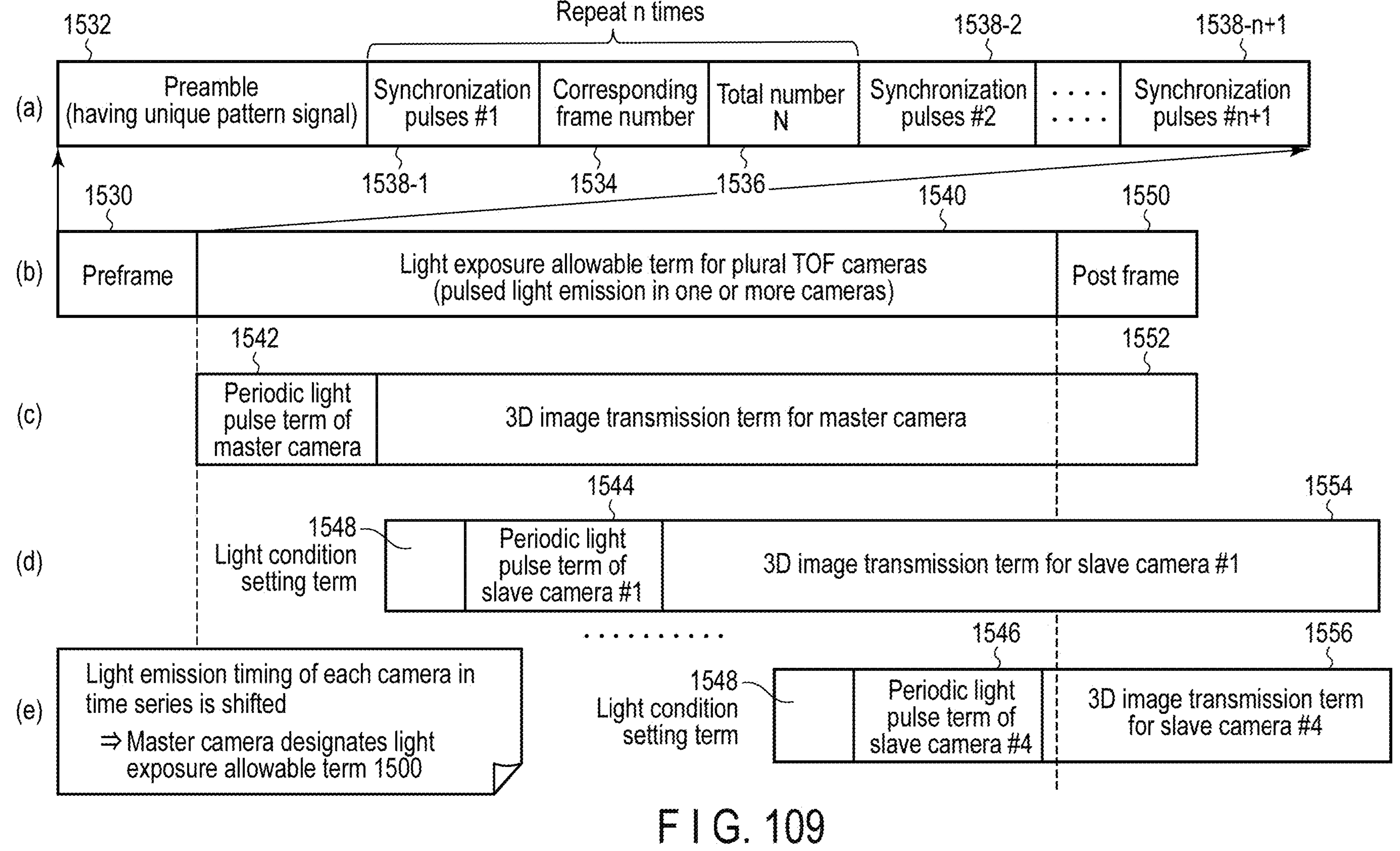
FIG. 109 illustrates an example of a format within a light exposure allowable term in the present embodiment.

FIG. 109 illustrates an operation example of the master camera and the slave camera within the light exposure allowable term corresponding to one frame 1514. Here, the time-series arrangement in FIG. 108(*d*) was transcribed as it is to FIG. 109(*b*). FIG. 109(*a*) illustrates an example of a light emission pattern in the preframe 1530. N frames are included in one frame group. Therefore, the number of frames constituting the frame group is indicated within a light exposure allowable term regarding the total number N 1536 in the preframe 1530. In addition, currently, information indicating "which frame light exposure allowable term corresponds to?" is shown within a light exposure allowable term related to a corresponding frame number 1534. Here, a numerical value is expressed by a binary system. In addition, a light emission pattern corresponding to "1" and a light emission pattern corresponding to "0" in the binary system are defined in advance.

A light exposure allowable term of synchronization pulses 1538 is set prior to the light exposure allowable term of the corresponding frame number 1534. Then, the corresponding frame number 1534 immediately after the synchronization pulses 1538 and the total number N 1536 immediately after the corresponding frame number form a set. Then, the set is repeatedly emitted n times. Note that a preamble term 1532 having a unique light emission pattern is provided in a start term of the preframe 1530.

FIG. 109(*c*) illustrates timing of the distance measurement (length measurement) operation of the master camera. The master camera emits light from the preframe 1530 and the post frame 1550 to designate a light exposure allowable term 1500. FIGS. 109(*d*) and (*e*) illustrate timing of the distance measurement (length measurement) operation of the slave camera. In order to prevent simultaneous light emission between the different cameras 32-1 to 32-4 (TOF camera 28) in the same photographing location, in the present embodiment example, light emission timing of each of the cameras 32-1 to 32-4 is shifted. Regarding the light emission timing, the priority is automatically set between the different cameras 32-1 to 32-4 (TOF camera 28).

As illustrated in FIG. 109(*c*), light emission timing for distance measurement (length measurement) of the master camera is given first priority within the light exposure allowable term for plural TOF cameras 1540. That is, a periodic light pulse term of master camera 1542 comes immediately after the light exposure allowable term of the preframe 1530. The light emission pattern of the irradiated light (first light) 12 emitted by the master camera within this term corresponds to, for example, pulsed light emission illustrated in FIG. 93(*a*) or FIG. 96(*b*). However, the modulation waveform (light emission pattern) related to the emission light intensity 338 of the irradiated light (first light) 12 emitted by the master camera is not limited to the pulse waveform, and may take any waveform such as a sinusoidal waveform or a triangular waveform.

The image sensor 270 obtaining 3D image patterns transmits the charge accumulation amount 340 (measured signal 6) within the measuring periods acquired at the predetermined detection phase and the predetermined light emission phase to the signal processor and/or data analyzer 38. The transmission of the measured signal 6 takes time for a transmission term 1552 of the pulse image emitted by the master camera.

FIG. 109(*d*) illustrates timing of the distance measurement (length measurement) operation of the first slave camera. At the time of detecting the end of the periodic light pulse term of master camera 1542, the first slave camera starts a light condition setting term 1548 immediately thereafter. The light emission pattern during the light condition setting term 1548 may be matched with the light emission pattern of the preamble 1532.

The first slave camera #1 starts a periodic light pulse term of slave camera #1 1544 immediately after the light condition setting term 1548. The light emission pattern of the irradiated light (first light) 12 emitted by the first slave camera within this term may be the same as the light emission pattern of the periodic light pulse term of master camera 1542. During a 3D image transmission term for the slave camera #1 1554, the slave camera #1 transmits the charge accumulation amount 340 (measured signal 6) within the measuring periods to the signal processor and/or data analyzer 38.

FIG. 109(*e*) illustrates timing of the subsequent distance measurement (length measurement) operation of the slave camera #4. The slave camera #4 detects the end of the periodic light pulse term of the immediately preceding slave camera #3. After the light condition setting term 1548, a periodic light pulse term of slave camera #4 1546 is performed. The light emission pattern of the periodic light pulse term of slave camera #4 1546 may be the same as the light emission pattern of the periodic light pulse term of master camera 1542. Then, the image sensor 270 obtaining 3D image patterns incorporated in the slave camera #4 transmits the charge accumulation amount 340 (measured signal 6) within the measuring periods to the signal processor and/or data analyzer 38 during a 3D image transmission term for the slave camera #4 1556.

FIG. 110 illustrates an example of a light emission pattern within each light exposure allowable term. In the present embodiment example, light emission ratios (duty ratios) may become uniform in all light emission patterns. When the light emission ratios (duty ratios) in all the light emission patterns become uniform, there is an effect that a peak value of the light emission pulse tends to become uniform. That is, in relation to the response speed of the light impulse control circuit 260 in the light source 2 illustrated in FIG. 91, it is difficult to perform individual emitted light intensity control APC (auto-power control) for each emitted pulsed light intensity. However, when the light emission ratios (duty ratios) in all the light emission patterns are constant, the emitted light intensity control APC using an average value of the emitted pulsed light intensity becomes possible. In particular, when the light emission ratios (duty ratios) in all the light emission patterns are made uniform in the vicinity of 50%, there is an effect that the diversity of the light emission patterns is improved.

FIG. 110(*a*) illustrates an example of a light emission pattern in the periodic light pulse terms 1542, 1544, and 1546. As illustrated in FIG. 93(*a*) and FIG. 96(*b*), one pulse width is set to T/2 with respect to the modulation cycle T related to the emission light intensity 338 of the irradiated light (first light) 12. This periodic pulse is repeated for a predetermined period.

FIG. 110(*b*) illustrates an example of the light emission pattern within the term of the synchronization pulses 1538. In a case where light is emitted by combining a plurality of different light emission patterns in time series, a bit shift may occur at the time of decoding the light emission pattern on the light receiving side (in the measurer 8). By detecting the synchronization pulses 1538, the bit shift on the light receiving side can be corrected. Therefore, the light emission pattern of the synchronization pulses 1538 desirably forms a unique pattern that does not appear in other light emission patterns.

Therefore, in this pattern, a plurality of locations of the cycle 1.5 T are set. Then, the light emission pattern of the cycle τ and the light emission pattern of the cycle 1.5 T are combined. Here, a condition of "light emission ratio (duty ratio) 50%" is satisfied even within the cycle 1.5 T. Therefore, the light emission pulse width within the cycle 1.5 T is 0.75 T. As a result, two and three (odd number and even number) light emission pulses having a width of T/2 are arranged between two light emission pulses having a width of 0.75 T. Further, FIG. 110(*c*) illustrates an example of a light emission pattern within the term of the post frame 1550. Here, the light emission pulse of "light emission ratio (duty ratio) 50%" is repeated at the cycle of 1.5 T.

FIGS. 109(*e*) and 109(*f*) illustrate examples of light emission patterns corresponding to "0" and "1" in the binary display of the numerical value. In the light emission pattern corresponding to "0", as illustrated in FIG. 109(*e*), three light emission pulses having a width of T/2 are repeated at the cycle τ. In the light emission pattern corresponding to "1", as illustrated in FIG. 109(*f*), two light emission pulses having a width of "0.75 T" are repeated at the cycle of "1.5 T".

FIG. 110(*d*) illustrates an example of a light emission pattern within the terms of the preamble 1532 and the light condition setting term 1548. Here, the condition of "light emission ratio (duty ratio) 50%" is maintained, and one set is configured by repeating the light emission pulse of the cycle τ three times and repeating the light emission pulse of the cycle 1.5 T two times. Then, this set of light emission is repeated a predetermined number of times. This set of light emission patterns corresponds to a numerical value "01" in the binary display. Therefore, the light emission pattern example within the terms of the preamble 1532 and the light condition setting term 1548 corresponds to repeating a numerical value "01010101" in the binary display.

FIG. 111 illustrates a circuit configuration example in the light impulse control circuit 260 of FIG. 91. The pulsed light emission timing signal transmitted from the system controller 50 is input to a light power controller of light emitter 720. Then, the pulsed light emission circuit 728 controls a high-speed changeover switch 738 in accordance with a signal from the light power controller of light emitter 720.

The light emitter 470 is directly connected to the high-speed changeover switch 738. When a lower end of the light emitter 470 is connected to the ground, a current flows through both ends of the light emitter 470, and pulsed light (pulsed irradiated light (first light) 12) is emitted. A peak value of the emitted light intensity at this time is adjusted by a pulse peak value setting circuit 718. That is, a current value supplied from a stable power supply circuit 716 is controlled by the pulse peak value setting circuit 718, and a current flows through the light emitter 470.

A voltage value for controlling the pulse peak value setting circuit 718 is switched between the output of a differential signal generation circuit 712 and the output of a sample-and-hold circuit 726. That is, the pulse peak value setting circuit 718 is connected to the differential signal generation circuit 712 during a period in which the light emitter 470 repeats pulsed light emission. On the other hand, when the light emitter 470 does not emit the irradiated light (first light) 12 over a long period, the pulse peak value setting circuit 718 is connected to the sample-and-hold circuit 726.

The sample-and-hold circuit 726 is connected to the differential signal generation circuit 712, and holds an output voltage of the differential signal generation circuit 712 immediately before the light emitter 470 ends the pulsed light emission for a long period. The sample-and-hold circuit 726 holds the voltage immediately before the end of the pulsed light emission, so that the light emitter 470 can secure a stable light emission pulse peak value even immediately after the restart of the pulsed light emission.

The control of a changeover switch circuit 732 is performed by an emitted light intensity control/non-control changeover circuit 730. In addition, switching timing between a continuous pulse light exposure allowable term and a long-term light exposure stopped term is received from the light power controller of light emitter 720.

The light power detector 28 measures the light intensity of the irradiated light (first light) 12 emitted from the light emitter 470 in real time. A monitor signal averaging circuit 702 averages the measured signal 6 (the time-varying signal of the emission light intensity 338) from the light power detector 28. The differential signal generation circuit 712 outputs a difference value between the output of a circuit generating a reference signal for an average signal 708 and the output of the monitor signal averaging circuit 702.

In averaging processing in the monitor signal averaging circuit 702, the band limitation may be applied to the measured signal 6 (the time-varying signal of the emission light intensity 338) from the light power detector 28. When a high-speed noise component is mixed in the measured signal 6 from the light power detector 28, a temporal variation of the light emission pulse peak value occurs. Therefore, the averaging processing with respect to the emission light intensity 338 in the monitor signal averaging circuit 702 has an effect of stabilizing the temporal variation of the light emission pulse peak value.

On the other hand, when the light emission ratio (duty ratio) in the light emission pattern changes, there is a side effect that the average value of the measured signal 6 from the light power detector 28 changes. Therefore, in the present embodiment example, the light emission ratio (duty ratio) in the pulsed light emission pattern of the light emitter 470 is made uniform to stabilize the temporal variation of the light emission pulse peak value.

Figure 113:
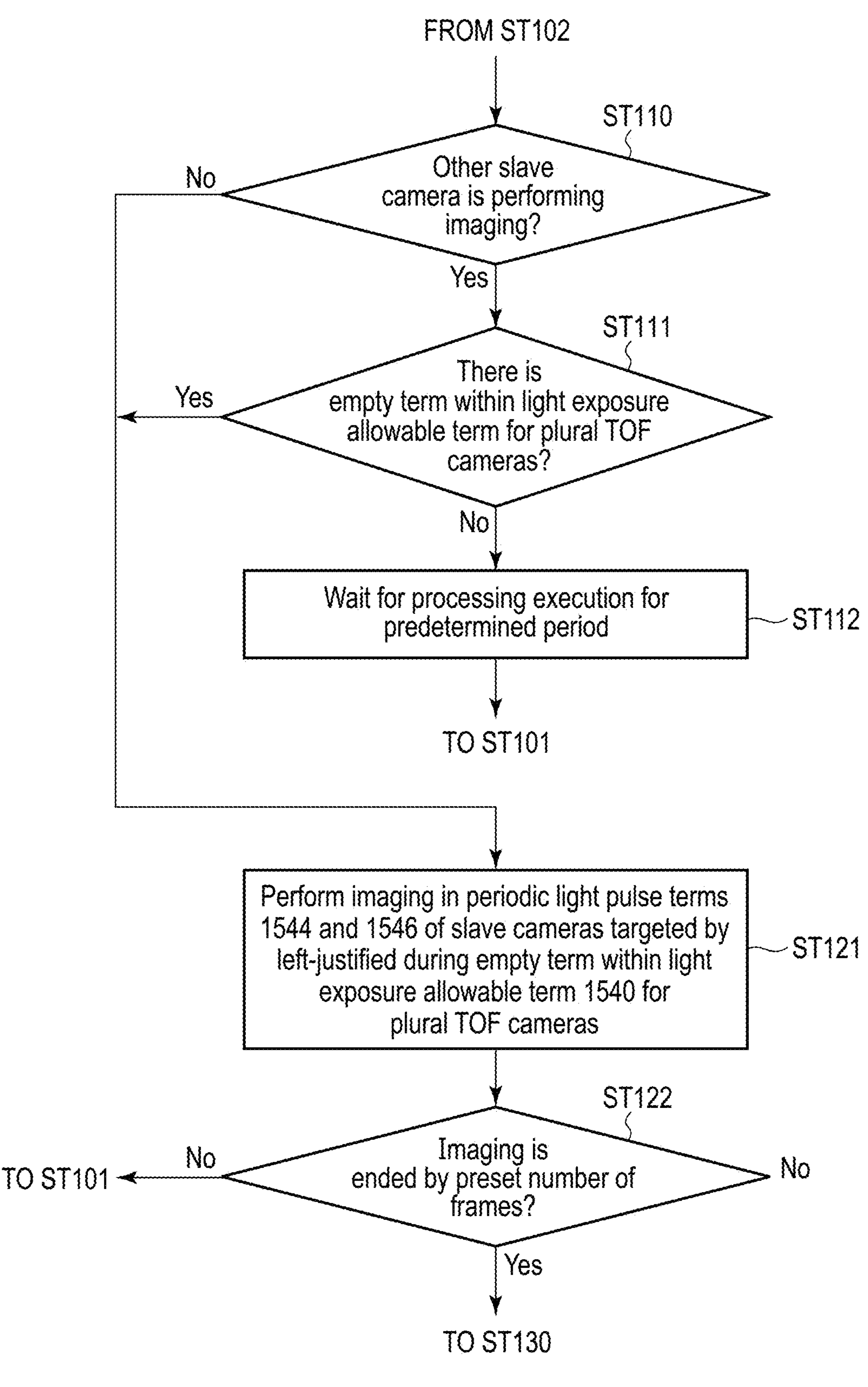
FIG. 113 illustrates an example of cooperation between cameras in a case where a plurality of 3D measurement cameras are used.

FIG. 112 and FIG. 113 illustrates an example of an automatic setting method between the master camera and the slave camera. As illustrated in FIG. 104, in a case where there is only one system controller (controller simultaneously managing plural cameras) 50 in the photographing location, the system controller (controller simultaneously managing plural cameras) 50 performs automatic setting between the master camera and the slave camera. However, in a case where a plurality of different system controllers (controllers simultaneously managing plural cameras) 50 are mixed in the photographing location, it is not possible to rely only on the communication function 34. In addition, when the different system controllers (controllers simultaneously managing plural cameras) 50 are mixed, the number of cameras 32-1 to 32-4 existing in the same photographing location is also unknown. Therefore, as illustrated in FIG. 112 and FIG. 113, when the automatic setting between the master camera and the slave camera is performed using the irradiated light (first light) 12 emitted from the master camera, the convenience of the user is improved.

When the user starts imaging of the TOF camera 28 (ST100), light emission states from other cameras 32-1 to 32-4 during a predetermined period immediately before the start of imaging are monitored in first step 100. As an example of this monitoring method, the presence or absence of light reception of pulsed light in all pixels in the image sensor 270 obtaining 3D image patterns in the TOF camera 28 may be detected.

When the light emission states from other cameras 32-1 to 32-4 are not observed as the monitoring result within the predetermined period (when the determination result in step 102 is "No"), the own camera becomes the master camera (ST103). Then, in step 104, the light exposure allowable term 1500 and the light exposure forbidden term 1502 are set using the light emission in the preframe 1530 and the light emission in the post frame 1550. Then, a plurality of frames are continuously imaged within the light exposure allowable term 1500.

In the case of capturing a moving image, the above-described imaging is repeated until the imaging is completed (when the end of the imaging term is "No" in step 105). When the imaging is completed (when the end of the imaging term is "Yes" in step 105), the imaging of the TOF camera 28 is ended (ST130).

When the light emission states from other cameras 32-1 to 32-4 are observed as the monitoring result within the predetermined period (when the determination result is "Yes" in step 102), whether or not another slave camera is performing imaging is determined in step 110. When another slave camera is performing imaging, the periodic light pulse term of slave camera #1 1544 is observed as illustrated in FIG. 109(*d*). As an example of this observation method, the presence or absence of light reception of the periodic light pulse term of slave camera #1 1544 may be detected in all the pixels in the image sensor 270 obtaining 3D image patterns in the TOF camera 28.

Here, when another slave camera is performing imaging (the determination result is "Yes" in step 110), whether or not an empty term exists within the light exposure allowable term for plural TOF cameras 1540 is determined in step 111. Here, when the light condition setting term 1548 and the periodic light pulse term 1546 of the targeted slave camera cannot be secured within the light exposure allowable term for plural TOF cameras 1540 (when the presence determination result of the empty term is "No" in step 111), the processing waits for execution for a predetermined period (ST112), and then the process returns to step 100.

When no other slave camera is performing imaging (the determination result is "No" in step 110), or when there is an empty term within the light exposure allowable term for plural TOF cameras 1540 (the presence determination result of the empty term is "Yes" in step 111), imaging of the targeted slave camera (ST121) is performed. As specific content of this step 121, the periodic light pulse term of slave camera 1544 targeted by left-justified is performed during the empty term within the light exposure allowable term for plural TOF cameras 1540.

Then, when the photographing is ended by the preset number of frames (when the determination result is "Yes" in ST122), the imaging of the TOF camera is ended (ST130). On the other hand, when the photographing is not completed by the preset number of frames (when the determination result is "No" in ST122), the process returns to step 100.

Chapter 10: Embodiment example of real size construction

In Chapter 9, the description of the outline of the present embodiment directed to (0) Conversion into 3D coordinates of each point on the surface of the measured object 22 using the measured signal 6 from the TOF camera . . . the method for calculating 3D coordinates of each point on the surface of the measured object 22 from Information of the imaging position on the image sensor 270 of the TOF camera and the distance data (measured distance) has been given.

In Chapter 10, the above basic embodiment technology is applied.

(1) Connection between a plurality of TOF captured images on a 3D coordinate space . . . Connection and expansion of a portion that cannot be imaged by one-shot TOF imaging to 3D coordinate information using calculated 3D coordinate information (2) Separation/extraction of specific measured object using discontinuity area of distance data (measured distance)

. . . A discontinuity area of distance data (measured distance) is detected in the TOF captured image including a background image (or an unnecessary image). A contour line is formed by continuing the detection location, and a specific measured object is separated and extracted.

(3) Virtual arrangement (configuration) among a plurality of measured objects based on actual dimensions and two-dimensional display of projection drawing utilization . . . Based on the actual dimension of each measured object 22 captured by the TOF imaging, a virtual arrangement (configuration) between the measured objects 22 is performed. Here, the arrangement location and the arrangement direction are designated for each measured object 22, and the presence or absence of physical interference (mutual collision location) between the measured objects 22 is evaluated. An example embodiment will be described with a focus on generation and display of a 2D image using a projection drawing based on the arrangement location of each measured object 22.

When the series of processing from (1) to (3) is performed, the arrangement optimization between the measured objects 22 can be easily performed. Therefore, the work convenience of the user who desires the optimum arrangement between the measured objects 22 is greatly improved. Furthermore, when display using the projection drawing is performed, an image with high realistic feeling can be provided to the user.

Figure 114:
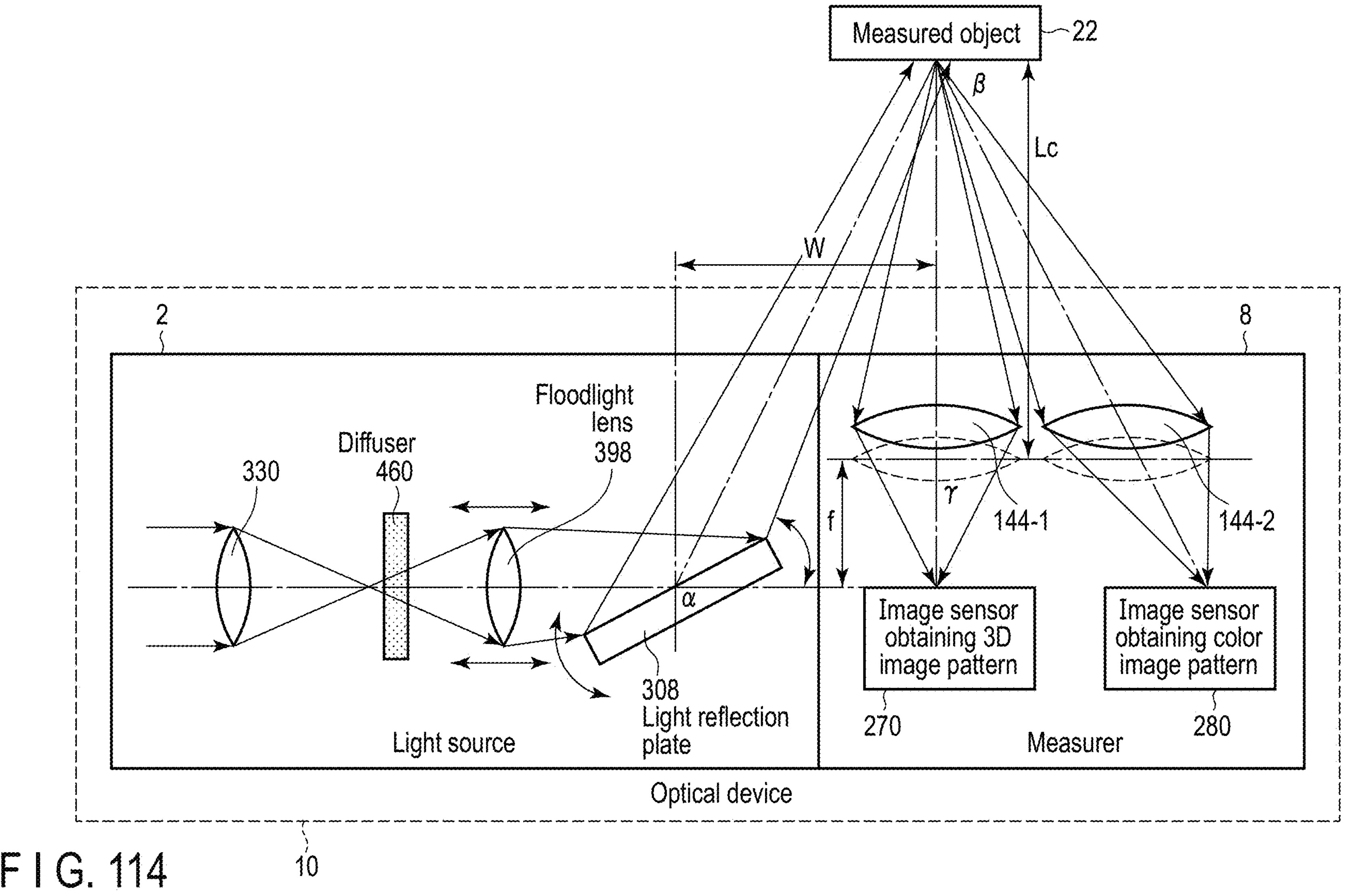
FIG. 114 is an explanatory diagram of an application example of a simultaneous 3D coordinate measurement device with high accuracy in the present embodiment.

FIG. 114 illustrates an embodiment application example to a 3D measurement device (optical device 10) of the color image/moving image described in FIG. 91. In FIG. 91, a common image forming lens 144 is used. The image forming magnification with respect to the measured object 22 is matched between the image sensor 270 obtaining 3D image patterns and the image sensor 280 obtaining color image patterns.

At present, it is easy to obtain the image sensor 280 obtaining color image patterns having a large number of pixels. On the other hand, it is difficult to obtain the image sensor 270 obtaining 3D image patterns having an excessively large number of pixels. In the embodiment example illustrated in FIG. 114, an image forming lens 144-1 for forming an image on the image sensor 270 obtaining 3D image patterns and an image forming lens 144-2 for forming an image on the image sensor 280 obtaining color image patterns are individually arranged. In a case where an effective imaging size (width×height) of the image sensors 270 and 280 is determined in advance, the visual field (viewing angle) in which imaging can be performed is changed by changing the focal length f of the image forming lens 144. Therefore, the focal length to be set may be changed between the image forming lenses 144-1 and 144-2 according to the number of pixels of each of the image sensors 270 and 280. As a result, the resolution of the 3D image and the substantial resolution of the color image can be individually optimized.

Also in FIG. 114, similarly to FIG. 91, the system controller 50 includes the image pattern adjusting processor between 3D image patterns and color image patterns 600. The 3D image and the color image are combined for each pixel to generate a 3D color image (color image having information of distance data (measured distance) for each pixel).

In the image pattern adjusting processor between 3D image patterns and color image patterns 600, feature image locations that commonly appear in the 3D image and the color image are extracted. Then, size adjustment and center position adjustment between the two images are performed so that the feature image locations are matched with each other. As a method for performing size adjustment between images, thinning of pixel information (performed at the time of image size reduction), intermediate pixel insertion using pixel complementation (performed at the time of image size enlargement), and the like may be performed.

Incidentally, a background image may be used to extract the feature image location commonly appearing in both the images. For example, as will be described later with reference to FIG. 119, a discrimination mark 286 may be set on a part of a background object (pedestal) 282. In this case, first, the pixel position of the discrimination mark 286 (or the outline of the discrimination mark 286) appearing in the 3D image output by the image sensor 270 obtaining 3D image patterns is extracted. Next, the pixel position of the discrimination mark 286 (or the outline of the discrimination mark 286) appearing in the color image output by the image sensor 280 obtaining color image patterns is extracted. Thereafter, size adjustment and center position adjustment between the two images are performed so that the pixel positions of the two images are matched with each other.

Due to the difference in focal length between the image forming lenses 144-1 and 144-2, an imaging range displayed in the 3D image may be smaller than an imaging range displayed in one (or one frame) color image. In this case, a plurality of (or a plurality of frames of) 3D images may be captured while the imaging positions of the image forming lens 144-1 and the image sensor 270 obtaining 3D image patterns are shifted. Then, one (or one frame) color image and a plurality of (or a plurality of frames of) 3D images may be combined to generate one (or one frame) 3D color image in advance.

In the following description, on the assumption that a 3D color image obtained by combining a 3D image and a color image is generated in advance, a signal processing and/or data analysis method for the generated 3D color image will be described. Therefore, in the following description, an expression of "3D color image" is used. However, the present invention is not limited thereto, and a color image may be combined after a series of processing described later is performed on a 3D image. In this case, an expression of a "3D image" can be applied instead of a "3D color image".

When the distance between the optical device 10 (TOF camera) and the measured object 22 increases, the emitting light density (irradiated light density) from the light source 2 decreases on the surface of the measured object 22. In the embodiment example of FIG. 114, the floodlight lens 398 in the light source 2 is configured to be movable along the optical axis. The spot size of the emitting light (irradiated light 12) on the surface of the measured object 22 is variable. As a result, since the emitting light density on the surface of the measured object 22 can be changed, sufficient length measurement accuracy can be secured even if the measured object 22 is arranged far away. Note that the optical system described with reference to FIG. 63 may be adopted as the optical system in front of the converging lens 330.

A light reflection plate 308 rotatable in two axial directions is arranged in the light source 2 in FIG. 114. When the light reflection plate 308 is inclined, a traveling direction of emitting light (irradiated light 12) emitted from the light source 2 changes. As a result, an arbitrary position on the surface of the measured object 22 can be irradiated with emitting light (irradiated light 12) having a small spot size. Then, the length measurement accuracy of the specific area in the imaging area of the image sensor 270 obtaining 3D image patterns can be improved. That is, when emitting light having a small spot size is emitted only to the specific area, the irradiated light intensity (light density of the irradiated light (first light) 12) in the specific area increases. When the irradiated light intensity in the specific area increases, the measured signal 6 obtained from the measurer 8 increases. As a result, an S/N ratio (signal to noise ratio) of the measured signal 6 is improved, so that the measurement accuracy is improved.

The rotation center of the light reflection plate 308 is matched in two axial directions. This rotation center point may be set on an extension surface of the imaging plane of the image sensor 270 obtaining 3D image patterns. This arrangement facilitates calculation of distance data (measured distance) to the measured object 22.

As described above, an effective imaging size (width×height) of the image sensor 270 obtaining 3D image patterns is often determined in advance. In this case, when the focal length f of the image forming lens 144-1 is changed, an effective visual field range (effective viewing angle) of the imaging target is changed. In addition, a mount standard in which the imaging plane position of the image sensor 270 obtaining 3D image patterns is fixed and the image forming lens 144-1 having a different focal length f can be replaced is determined. Therefore, when the rotation center point of the light reflection plate 308 is set on the extension surface of the imaging plane of the image sensor 270 obtaining 3D image patterns as in the present embodiment example, replacement with the image forming lens 144-1 having an arbitrary focal length f becomes possible, and it becomes easy to change the effective visual field range (effective viewing angle) of the imaging target.

The irradiated light (first light) 12 from the light source 2 is reflected (scattered) by the surface of the measured object 22, and then passes through the image forming lens 144-1. At this time, an optical path length from an α point to the imaging plane via a β point changes according to the change in distance to the measured object 22. Here, the α point means the rotation center point of the light reflection plate 308. The length measurement target position on the measured object 22 corresponds to the β point. For convenience, a γ point corresponds to a principal point position (optical axis center position (center position of the image forming lens on principal ray)) in a principal plane (front side principal plane or rear side principal plane) of the image forming lens 144-1. In the present embodiment example, a change in an optical path length from the α point to the γ point is measured to calculate a distance "Lc" to the measured object 22 for each pixel.

In the embodiment example of FIG. 114, the optical path length from the α point to the imaging plane via the β point is a measured distance (distance data) with respect to the measured object 22. However, in order to calculate an approximate value of the 3D coordinate value of the measured object 22 (inner measurement point), a calculation formula can be simplified by using the distance "Lc" from the measured object 22 to the principal plane of the image forming lens 144-1. Therefore, here, the principal point position of the image forming lens 144-1 is defined as a γ point for convenience. Note that the distance from the measured object 22 (inner measurement point) to the imaging plane in the optical path of FIG. 114 is "Lc+f".

In the optical system of FIG. 114, a distance W from the α point to a position of a principal axis of the image forming lens 144-1 (the center of the optical axis of the image forming lens 144-1) is determined in advance. The distance from the α point to the β point is given by "$(W^2+Lc^2)^{1/2}$". Therefore, the optical path length from the α point to the γ point is "$(W^2+Lc^2)^{1/2}+Lc$". By using this relational expression, the distance "Lc" to the measured object 22 for each pixel is obtained. That is, the distance data (measured distance) to the measured object 22 can be calculated by the above simple calculation formula.

Further, as an application example of the present embodiment, a distance “Lc'” from the measured object 22 to the imaging plane of the image sensor 270 obtaining 3D image patterns may be defined in detail as follows. That is, an intersection of an extension line of a straight line from the measured point “β'” on the surface of the measured object 22 to the optical axis center point position of the image forming lens 144 and the imaging plane of the image sensor 270 obtaining 3D image patterns is set as “γ'”. A distance obtained by connecting both points by a straight line is defined as “Lc'”.

When scattered light from the measured point “β'” on the surface of the measured object 22 forms an image at a corresponding point “γ'” on the imaging plane, the β point and the γ' point are in a confocal relation. The scattered light from the measured point “β'” passes through an arbitrary point in an aperture of the image forming lens 144 and is converged on the γ' point having a confocal relation. Here, in a case where the image forming lens 144 is an ideal aplanatic lens, optical path lengths of all optical paths from the β' point to the γ' point are matched with each other. That is, the optical path lengths are matched with each other in the optical paths passing through all points in the aperture of the image forming lens 144. Therefore, as the optical path length from the β' point to the γ' point, a linear distance “Lc'” passing through the optical axis center point position of the image forming lens 144 may be represented.

In many image forming lenses 144, the front side principal plane and the rear side principal plane are separated from each other. Therefore, when the above-described “straight line passing through the optical axis center point position of the image forming lens 144” is strictly expressed, it needs to be described that the “straight line from the β' point to the center point in the front side principal plane of the image forming lens 144” and the “straight line from the center point in the rear side principal plane of the image forming lens 144 to the γ' point” are parallel. However, the light beam will be described under a condition that the front side principal plane and the rear side principal plane are virtually matched with each other by simplifying the description.

The difference between the distance “Lc” defined in the present embodiment example and the distance “Lc'” defined in the present embodiment application example will be confirmed again. That is, in the present embodiment example, “the distance from the principal plane (the front side principal plane or the rear side principal plane) of the image forming lens 144-1 arranged at the rearmost position to the measured object 22” is defined as “the distance “Lc” to the measured object 22”. When the value of “Lc” is used, the position in a 3D space with respect to the measured object 22 can be easily calculated. On the other hand, in the present embodiment application example, the position in the 3D space with respect to the measured object 22 is calculated using the “distance Lc'” from the specific measurement point ‘on the surface of the measured object 22 to the corresponding point γ ’ on the imaging plane. The utilization of “Lc'” increases the 3D coordinate accuracy, but the calculation formula becomes complicated. Therefore, in consideration of convenience of description, first, a method for calculating the position in the 3D space with respect to the measured object 22 will be described. Thereafter, a calculation method using “Lc'” will be described.

In FIG. 114, the irradiated light 12 (emitting light) reaching the measured object 22 does not pass through the image forming lens 144-1. However, unlike FIG. 114, an optical system that passes through the image forming lens 144-1 in the middle of the optical path of the irradiated light 12 (emitting light) may be set. In this case, the distance between the image forming lens 144-1 and the measured object 22 is common to the irradiated light 12 (emitting light) and the detection light 16. Therefore, in this case, the distance between the β point and the γ point is a measured distance (distance data).

Figure 115:
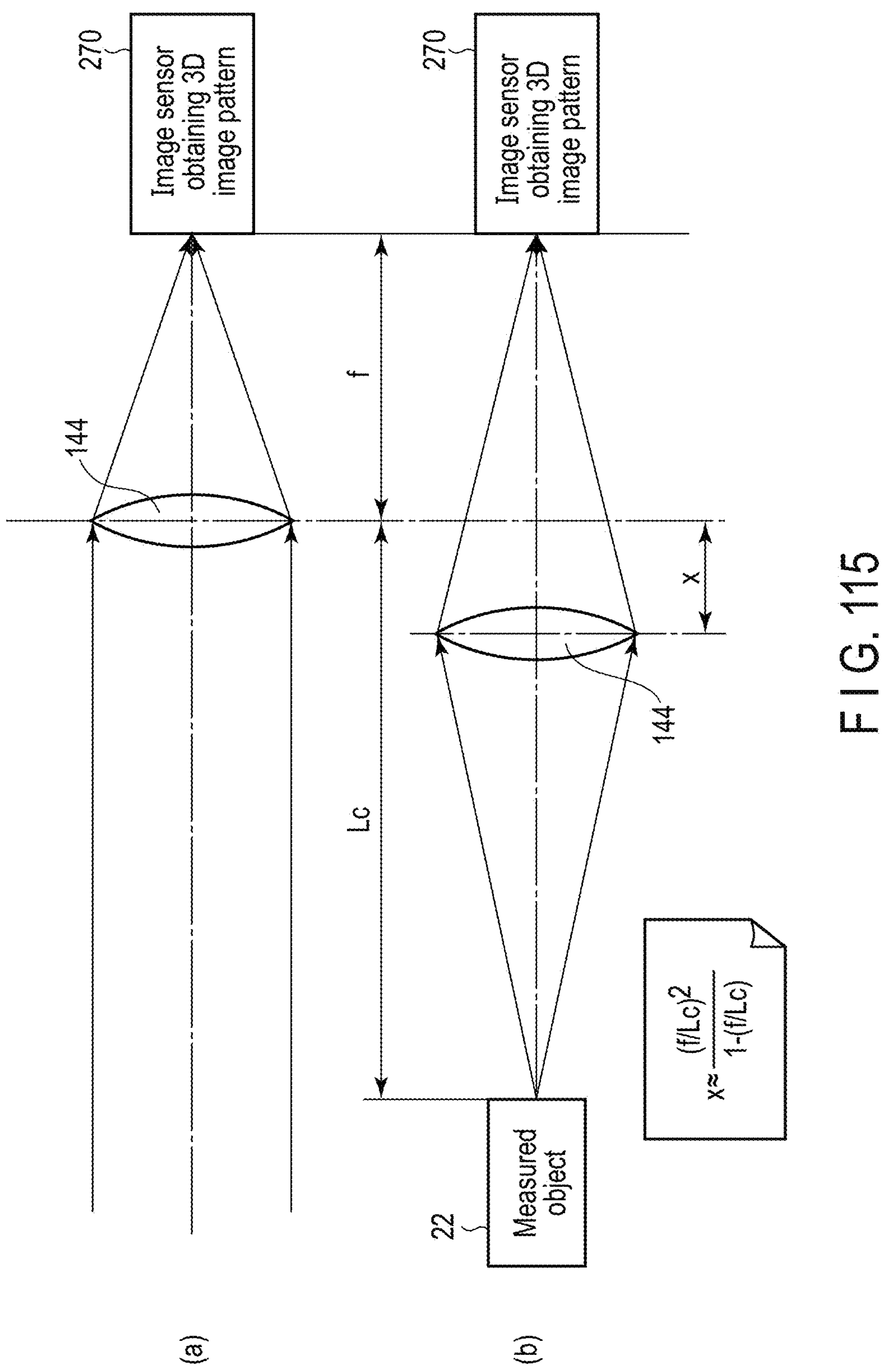
FIG. 115 is an explanatory diagram of a relation between a fixed focal length lens position for imaging and a measured distance.

FIG. 115 is an explanatory diagram of the position of the image forming lens 144 when the measured object 22 arranged at a finite distance is focused. A focal length “f” of a fixed focal length lens used as a general camera lens means a distance from a rear side principal point to an imaging plane at the time of infinite distance imaging.

FIG. 115(*a*) illustrates a state in which the fixed focal length lens (image forming lens 144) is arranged at the rearmost position. When the parallel light is incident on the fixed focal length lens (image forming lens 144) in this state, the parallel light is converged on the imaging plane of the image sensor 270 obtaining 3D image patterns. In the present embodiment example, the distance to the measured object 22 is defined based on the position of the principal plane (front side principal plane or rear side principal plane) of the image forming lens 144 (fixed focal length lens) at this time.

FIG. 115(*b*) illustrates a state in which a length measurement target surface of the measured object 22 is arranged at a distance “Lc” from the principal plane of the image forming lens 144 (fixed focal length lens) at the rearmost position. In order to form an image on the surface of the measured object 22 on the imaging plane of the image sensor 270 obtaining 3D image patterns, the image forming lens 144 moves forward by a distance x.

In the optical arrangement in FIG. 115(*b*), a following relation is established by using the formula of a thin-walled lens.

$$\frac{1}{f}=\frac{1}{Lc-x}+\frac{1}{f+x} \qquad \text{Equation 45}$$

When Equation 45 is transformed, a following relational expression is obtained.

$$(x/Lc)^2+\{(f/Lc)-1\}x+(f/Lc)^2=0 \qquad \text{Equation 46}$$

In particular, when the distance “Lc” to the measured object 22 is sufficiently large, “x/Lc” can be approximated as “x/Lc≈0”. Therefore, at this time, a following equation is established.

$$x\approx\frac{(f/Lc)^2}{1-(f/Lc)} \qquad \text{Equation 47}$$

In FIG. 115(*b*), since a relation of “Lc=Lc'−f” is established, this relational expression can be substituted into Equation 47.

In this manner, scattered light from the measured object 22 (measured point on the surface) is imaged on (the imaging plane of) the image sensor 270 obtaining 3D image patterns. When the distance “Lc” (or Lc') to the measured object 22 (measured point on the surface) at the time of imaging is measured (the length is measured), the position x of the image forming lens 144 can be calculated with high accuracy.

FIG. 116 is an explanatory diagram illustrating a 3D coordinate estimation method of the measured object 22 that can be measured with high accuracy corresponding to the position change of the image forming lens 144 in the present embodiment. When a distance between a TOF camera 32 and a measured object C22-3 changes, the image forming lens 144 moves in the optical axis direction and focuses on the image sensor 270 obtaining 3D image patterns. Then, as illustrated in FIG. 116(*c*), when the position of the image forming lens 144 is shifted forward by x from the rearmost position, the measured object C22-3 and the imaging plane are in a confocal relation.

In the present embodiment example, the 3D coordinates of a measured object A22-1 arranged on the front side of the focused measured object C22-3 and the 3D coordinates of a measured object B22-2 arranged on the far side can be simultaneously measured. In this case, a confocal relation as a positional relation between the imaging plane on the image sensor 270 obtaining 3D image patterns and the measured object A22-1 or B22-2 is broken. Alternatively, the positional relation between the imaging plane on the image sensor 270 obtaining 3D image patterns and the measured object A22-1 or B22-2 may be expressed as "deviating from the confocal relation".

That is, the scattered light from the measured object A22-1 arranged in front of the focused measured object C22-3 is imaged behind the imaging plane on the image sensor 270 obtaining 3D image patterns as illustrated in of FIG. 116(*a*). The scattered light from the measured object B22-2 arranged on the far side of the focused measured object C22-3 is imaged on the front side of the imaging plane on the image sensor 270 obtaining 3D image patterns as illustrated in FIG. 116(*b*).

An image obtained from the position shifted from the focused position (the position of the confocal relation) as described above is an out-of-focus image on the imaging plane on the image sensor 270 obtaining 3D image patterns. However, by image analysis (signal processing or data analysis) on the out-of-focus image, it is possible to estimate "a position at which the center light of the image forming lens 144 reaches the imaging plane". An optical path of the center light can be expressed by a "straight line that scatters at the measured point on the surface of the measured object A22-1 or B22-2, passes through the center position of the optical axis in the principal plane (the front side principal plane or the rear side principal plane) of the image forming lens 144, and reaches the imaging plane on the image sensor 270 obtaining 3D image patterns".

For convenience of description, the position of the image forming lens 144 in FIG. 116(*c*) is arranged at a position where the "measured object 22 existing on the optical axis of the image forming lens 144" and the "center pixel in the imaging plane of the image sensor 270 obtaining 3D image patterns" are in a confocal relation. However, the present invention is not limited thereto, and the image forming lens 144 may be arranged at a position where an arbitrary pixel in the imaging plane and the measured object 22 are in a confocal relation.

An effective imaging size (width and height) of the image sensor 270 obtaining 3D image patterns is known in advance. When the pixel position on the imaging plane which the center light of the image forming lens 144 reaches is known, a position coordinate value "-ya (or -yb)" where the center light reaches within the effective imaging size can be calculated. The position coordinate value on the imaging plane which the center light of the image forming lens 144 reaches is represented by the two-dimensional coordinates. In FIG. 116, for simplification of description, coordinate values only in the y-axis direction are used.

In the present embodiment example, the position (3D coordinate value) of the measured object A22-1 or B22-2 on the 3D space is calculated using the basic principle of the lens that "the light passing through the optical axis center of the image forming lens 144 travels straight". That is, the coordinate value "-ya (or -yb)" on the imaging plane of the image sensor 270 obtaining 3D image patterns and the coordinate value "Ya (or Yb)" of the measured object A22-1 (or B22-2) are in a similar relation. Therefore, as clear from of FIGS. 116(*a*) and 116(*b*), a following relational expression is obtained.

$$Ya = \frac{La - x}{f + x} ya \quad \text{Equation 48}$$

or $$Yb = \frac{Lb - x}{f + x} yb \quad \text{Equation 49}$$

The coordinate value "Ya (or Yb)" of the measured object A22-1 (or B22-2) can be calculated using the above Equation 48 or Equation 49.

As illustrated in FIGS. 116(*a*) and 116(*b*), the position of the measured object 22 may be shifted from the optical axis of the image forming lens 144. The distance from the α point to the β point in FIG. 114 at this time may be corrected to "$\{(W+Ya)^2+La^2\}^{1/2}$" or the like.

Next, a calculation method using "Lc'" used in the present embodiment application example will be described. An angle between a "straight line passing through the optical axis center point of the image forming lens 144 and connecting the measured object A22-1 (or B22-2)" and the image forming plane and the optical axis of the image forming lens 144 is represented by "θa" and "θb". From FIG. 116(*a*), a relation of "$\theta a=\tan^{-1}\{ya/(X+f)\}$" is established. Similarly, from FIG. 116(*b*), a relation of "$\theta b=\tan^{-1}\{yb/(X+f)\}$" is established.

The "distance of the straight line passing through the center point of the optical axis of the image forming lens 144 and connecting the measured object A22-1 and the image forming plane" is represented by "La'". From FIG. 116(*a*), the coordinate value of the measured object A22-1 can be calculated from the relational expression of "Ya=La' sin θa−ya". Similarly, the "distance of the straight line passing through the center point of the optical axis of the image forming lens 144 and connecting the measured object B22-2 and the image forming plane" is represented by "Lb'". Then, the coordinate value of the measured object B22-2 can be calculated from the relational expression "Yb=Lb' sin θb−yb" from FIG. 116(*b*).

In this case, the positions of the measured objects A22-1 and B22-2 are shifted by Ya or Yb from the optical axis of the image forming lens 144-1 in FIG. 114. Therefore, the distance from the α point to the β point in FIG. 114 in the present embodiment application example is transformed to "$\{(W+Ya)^2+(La' \cos \theta a)^2\}^{1/2}$" or "$\{(W+Yb)^2+(Lb' \cos \theta b)^2\}^{1/2}$".

The contents of the present embodiment example and the present embodiment application example described so far are summarized below. As illustrated in FIG. 1 and FIG. 2, the TOF camera 32 (optical device 10) according to the present embodiment includes the light source 2, the measurer 8, and the signal processor and/or data analyzer 38. Here, the signal processor and/or data analyzer 38 may be configured by hardware (electric circuit) or may be processed by a software program. In addition, the light emitter 470 in the light source 2 may include a wide area light emitter (or a multipoint light emitter). Alternatively, only one point in the light emitter 470 may emit the emitting light 462.

The measurer 8 includes the image forming lens 144 and the image sensor 270. Here, the inside of the imaging plane in the image sensor 270 includes a plurality of pixels arranged in an aligned manner. The measured distance (distance data) for each of the different pixels in the image sensor 270 obtaining 3D image patterns is simultaneously obtained. Here, a time until the irradiated light (first light) 12 from the light source 2 passes through the measured object 22 (is reflected and scattered on the surface of the measured object 22) and reaches the measurer 8 (the image sensor 270 therein) as the detection light (second light) is measured, and the measured distance (distance data) for each pixel is measured.

Here, it is possible to measure not only the measured distance (distance data) to the measured object 22 (measurement target point in the surface) arranged in a confocal relation with each pixel in the image sensor 270 obtaining 3D image patterns, but also the measured distance (distance data) to the measured object 22 (measurement target point in the surface) arranged at a position other than the confocal relation with each pixel.

In a case where a fixed focal length lens is used as the image forming lens 144, the image forming lens 144 has a structure movable along the optical axis direction. The position of the image forming lens 144 on the optical axis may be set such that at least one arbitrary pixel in the image sensor 270 obtaining 3D image patterns and a corresponding point on the surface of the measured object 22 present at a corresponding position (to be a target for measuring a measured distance (distance data)) are in a confocal relation.

The state of FIG. 116(*c*) can be expressed as follows. That is, when the image forming lens 144 is arranged at the predetermined position x, the first pixel in the image sensor 270 has a confocal relation with the first measured point on the surface of the measured object C22-3. The state of FIG. 116(*a*) or 116(*b*) can be expressed as follows. That is, a straight line from the second measured point on the surface of the measured object A22-1 or B22-2 toward the front side principal plane inner center position (front side principal point) of the image forming lens 144 and a straight line from the rear side principal plane inner center position (rear side principal point) of the image forming lens 144 toward the second pixel in the image sensor 270 are in a parallel relation. The second measured point and the second pixel have a relation other than the confocal relation.

The position of the first measured point in the 3D space is determined from the position of the first pixel in the image sensor 270 and the focal length f of the image forming lens 144. Further, similarly, the position "La or Lb" and "Ya or Yb" of the second measured point in the 3D space are determined from the position "-ya or -yb" of the second pixel in the image sensor 270 and the focal length f of the image forming lens 144.

Further, the position x of the image forming lens 144 that ensures a confocal relation between the first pixel and the first measured point may participate in positioning of the first and second measured points in the 3D space. From the focal length "f" of the image forming lens 144 used in the TOF camera 32 (optical device 10) and the effective imaging size (width and height) of the image sensor 270 obtaining 3D image patterns, the 3D coordinate values of the different measured points of the measured object 22 can be simultaneously calculated using Equation 47 and Equation 48 (Equation 48).

In the existing 3D measurement method using the stereo method, when the distance between the measured object 22 and the optical device 10 (measurer 8) increases, the measurement accuracy significantly decreases. In comparison with this, in the present embodiment example, there is an effect that high measurement accuracy can be maintained even for the measured object 22 sufficiently far away. In the 3D measurement method using laser scanning, it is difficult to simultaneously measure a plurality of measured points. In comparison with this, in the present embodiment example, it is possible to perform simultaneous measurement by the number of pixels in the image sensor 270. Therefore, the present embodiment example has an effect of enabling high-speed measurement.

In addition, the spatial resolution in the scanning direction is higher in the present embodiment example than in the 3D measurement method using laser scanning. From this viewpoint, a unique effect of the present embodiment example will be described. In many laser light application products without being limited by 3D measurement, it is necessary to understand characteristics of a beam waist. That is, the laser optical system cannot produce geometrically optical "perfectly parallel light", and there is always a beam waist position where the light cross-sectional size is minimized in the middle of the optical path. Therefore, spatial resolution in an operation direction in 3D measurement using laser scanning is limited by a beam waist size.

The 3D measurement often uses a wide area light emitter (multipoint light emitter) such as a VCSEL that can obtain a large light intensity for measurement. However, in this case, since the light emitting area of the light emitter 470 expands, the spot size of the irradiated light (first light) with respect to the measured object 22 does not decrease. That is, when the wide area light emitter (multipoint light emitter) is used for 3D measurement using laser scanning, the minimum spot size of the irradiated light (first light) 12 on the surface of the measured object 22 is determined by the image forming magnification of the wide area light emitter (multipoint light emitter). The image forming magnification increases as the measured object 22 moves away. Therefore, the spatial resolution in the operation direction decreases as the position of the measured object 22, which is the target of the 3D measurement, is separated. As described above, in the 3D measurement method using the laser scanning, the spatial resolution in the operation direction is limited by the spot size of the irradiated light (first light) 12.

The allowable minimum value of the spot size of the irradiated light (first light) fixed on the measured object 22 in the present embodiment example is also limited similarly to the 3D measurement method using laser scanning. However, in the present embodiment example, the spot can be formed on the imaging plane multi-divided in the two-dimensional direction. Therefore, there is an effect that the inside of the spot irradiated on the measured object 22 can be divided and measured for each pixel in the imaging plane.

For example, a case where the measured object 22 is irradiated with the irradiated light (first light) 12 with the spot size of the allowable minimum value will be considered. When a telephoto lens or a zoom lens is used as the image forming lens 144, an image forming pattern having a large magnification can be formed on the imaging plane. When the number of pixels constituting the effective imaging size (width×height) is increased, the spatial resolution (in the scanning direction) is further improved.

Figure 117:
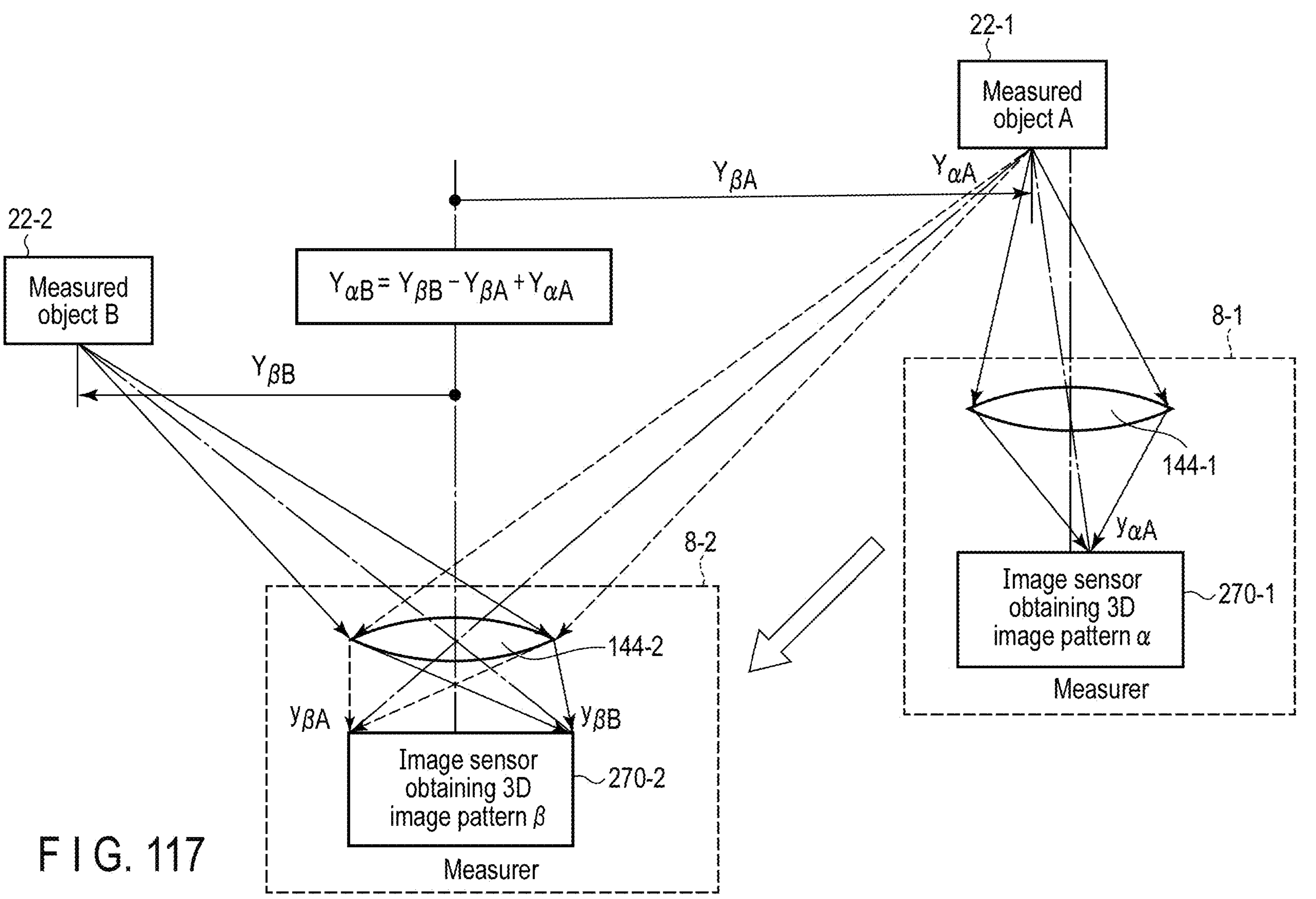
FIG. 117 is an explanatory diagram of the movement distance estimation using an imaging position change of the same measured object during the movement of a TOF camera and a 3D coordinate estimation method of another measured object imaged at the movement destination.

FIG. 117 illustrates an example of a method for performing 3D stereoscopic measurement on a portion that cannot be imaged by one-shot TOF imaging. Here, a method of 1) connection between a plurality of TOF captured images on a 3D coordinate space . . . connection and expansion of a portion that cannot be imaged by one-shot TOF imaging to calculated 3D coordinate information using the 3D coordinate information, which has been schematically described, will be described. This method is similar to the idea of 'connecting a plurality of pictures to generate a panoramic picture'.

That is, a 3D coordinate value $Y_{\alpha A}$ of the specific point in the measured object A22-1 is calculated by one-shot TOF imaging (3D measurement using one TOF camera (optical device 10)). Next, any one of A) moving the same TOF camera (optical device 10), B) using another TOF camera (optical device 10) disposed at a different position from the above, and C) moving or rotating the measured object 22 is performed, and a 3D coordinate value $Y_{\beta A}$ regarding the specific point in the measured object A22-1 is obtained again. As the 3D coordinate value of the specific point, coordinate values in the X, Y, and Z directions can be calculated. Here, the description is simplified, and only $Y_{\beta A}$ is represented.

Thereafter, when the 3D coordinate value $Y_{\alpha A}$ is calculated, a subject (measured object B22-2) that is not projected on an image sensor α270-1 obtaining 3D image patterns is imaged simultaneously with the specific point in the measured object A22-1. Then, a 3D coordinate value $Y_{\beta B}$ of the subject (measured object B22-2) is calculated.

After the above operation is performed, the 3D coordinate value $Y_{\beta B}$ for a portion that cannot be imaged by one-shot TOF imaging is connected using a relation between the 3D coordinate values $Y_{\alpha A}$ and $Y_{\beta A}$ of the same specific point in the measured object A22-1 obtained under different imaging environments. The term "connection" used herein means "coordinate transformation processing". That is, with respect to the 3D coordinate value $Y_{\beta B}$ obtained after any one of the above operations (A) to (C), "coordinate transformation" is performed to a value of the 3D coordinate system before any one of the above operations (A) to (C). Specifically, the value $Y_{\alpha B}$ of the 3D coordinate system before any one of the above operations (A) to (C) can be calculated by a relational expression of "$Y_{\alpha B}=Y_{\beta B}-Y_{\beta A}+Y_{\alpha A}$".

Note that, in a case where only the translation operation is performed in any of the above (A) to (C), numerical conversion processing is performed only in each coordinate axis. In comparison with this, when "rotation operation" is applied to the above (A) to (C), more complicated coordinate transformation is required.

FIG. 117 illustrates an embodiment example in which (A) in the above (A) to (C) is performed. First, the TOF camera (measurer 8-1) performs 3D measurement on the measured object A22-1. A specific measurement point in the measured object A22-1 is projected onto the coordinate $Y_{\alpha A}$ on the image sensor α270-1 obtaining 3D image patterns. Then, the coordinate value $Y_{\alpha A}$ of the specific measurement point in the measured object A22-1 can be calculated by the method described with reference to FIG. 116.

Next, the TOF camera is moved and set to the position of the measurer 8-2. Here, when the specific measurement point in the measured object A22-1 is imaged, the specific measurement point is projected onto the coordinate $Y_{\beta A}$ on the image sensor β270-2 obtaining 3D image patterns. Then, with reference to the coordinate system on the image sensor β270-2 obtaining 3D image patterns, the 3D coordinates of the specific measurement point in the measured object A22-1 are $Y_{\beta A}$.

At the same time as the imaging of the specific measurement point in the measured object A22-1, the measured object B22-2 is also imaged. The measured object B22-2 is projected onto the coordinate $Y_{\beta B}$ on the image sensor β270-2 obtaining 3D image patterns. Then, the 3D coordinates of the measured object B22-2 are $Y_{\beta B}$ with reference to the coordinate system on the image sensor β270-2 obtaining 3D image patterns. Then, the 3D coordinates based on the coordinate system on the image sensor α270-1 obtaining 3D image patterns may be transformed to $Y_{\alpha B}$.

The imaging range (3D measurement range) is limited only by one-shot TOF imaging. However, when the method of the present embodiment example described above is used, 3D measurement with respect to the measured object 22 having an arbitrary size becomes possible. Alternatively, it is possible to perform highly accurate 3D measurement to reach the details even for the measured object 22 having a stereoscopically complicated structure.

Figure 118:
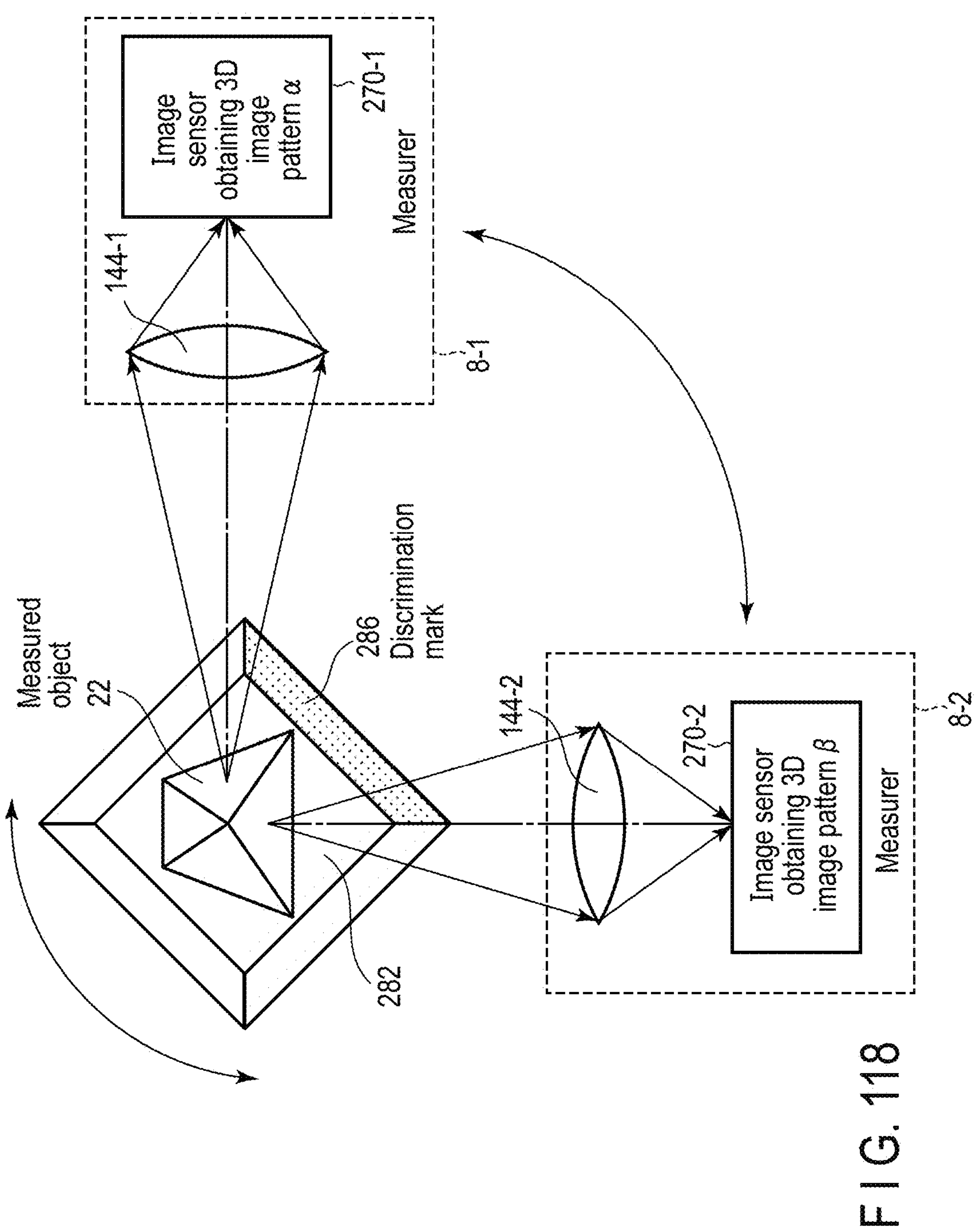
FIG. 118 illustrates a 3D coordinate estimation method of a surface of the measured object in the present embodiment.

FIG. 118 illustrates an application example of the present embodiment in which a background image (background object) is used for 3D measurement of a portion that cannot be imaged by one-shot TOF imaging. When the measured object 22 is imaged, a background image around the measured object is often imaged together. In this case, 3D coordinate information regarding the background object arranged around the measured object 22 can also be calculated simultaneously with the measured object 22. In the present embodiment application example, a feature portion in the background image is used. In the present embodiment application example, the coordinate value conversion of the specific measurement point on the measured object 22 is performed based on (a difference of) a 3D coordinate value of the feature portion.

As the feature portion in the background image, a discrimination mark 286 in the background image may be set in advance. The discrimination mark 286 has a structure that can be easily identified with respect to other portions. The amount of change in 3D coordinate value of the discrimination mark 286 before and after any one of the above operations (A) to (C) is calculated. The coordinate value of the measured object 22 is converted based on the 3D coordinate value of the discrimination mark 286.

Figure 119:
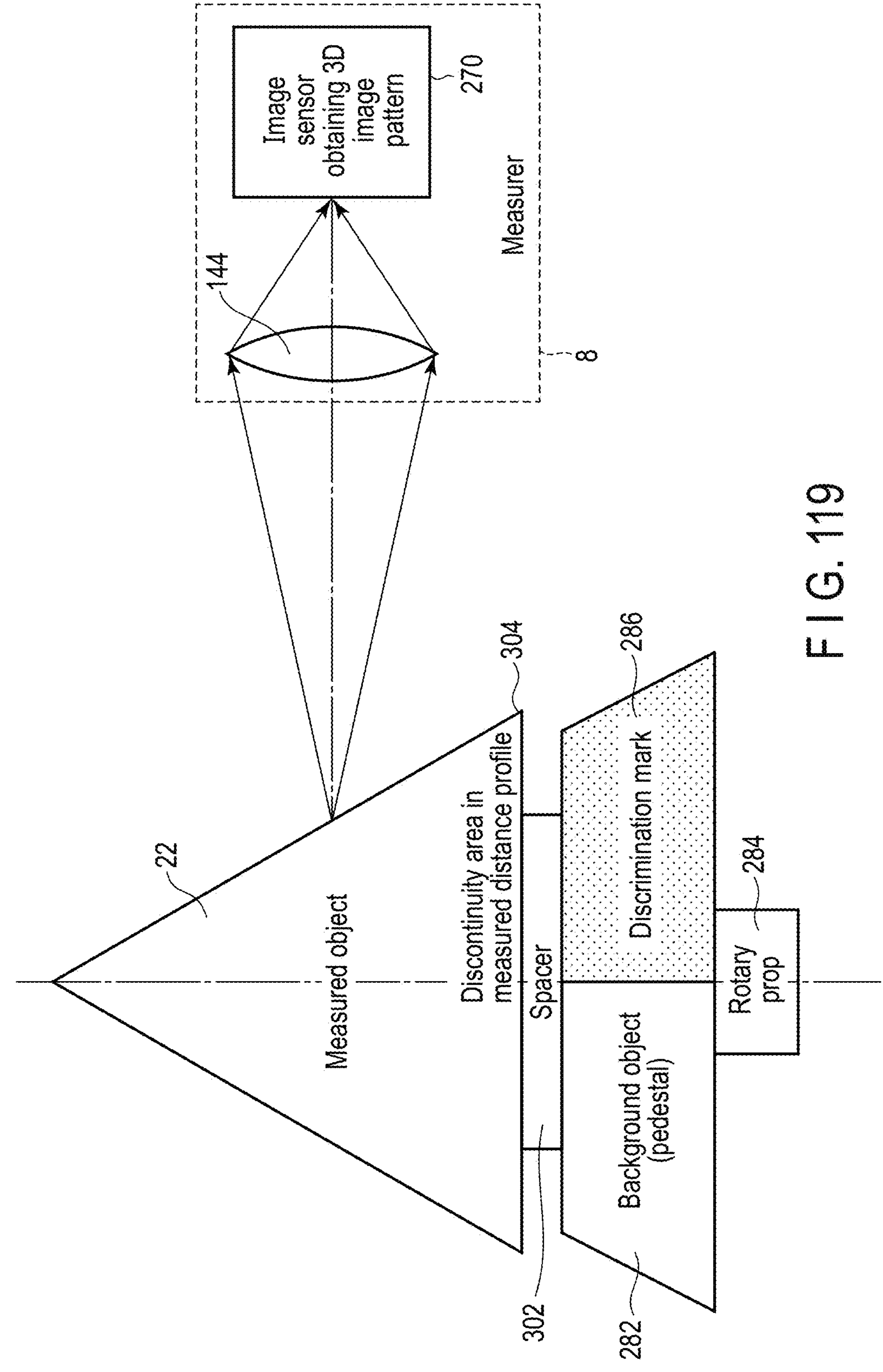

FIG. 119 illustrates a state in which the measured object 22 is placed on a rotatable pedestal (background object) 282 and the measured object 22 is rotatable together with the background object (pedestal) 282. As an example of the discrimination mark 286, a part of a side face of the pedestal (background object) 282 has some features. As a method for providing the features, a "color" or a "shape" may be changed with respect to other portions. Here, as a method of the "shape change", a "specific protrusion (or depressed) area" may be provided, or "surface roughness" may be changed.

A case where the position of the measurer 8-1 in the TOF camera is fixed and the pedestal (background object) 282 is rotated is considered. The rotation angle of the pedestal (background object) 282 can be easily known from the shape of the projected image of the discrimination mark 286 captured by the image sensor α270-1 obtaining 3D image patterns. By using the rotation angle of the pedestal (background object) 282, 3D coordinate values in all directions of the surface of the measured object 22 can be calculated.

When imaging in which the measurer 8-1 is moved to the position of the measurer 8-2 while the pedestal (background object) 282 is fixed is repeated, 3D coordinate values in all directions of the surface of the measured object 22 can be calculated. Alternatively, two TOF cameras (optical device 10) may be arranged at the position of the measurer 8-1 and the position of the measurer 8-2 to simultaneously capture images from multiple directions. In either case, the appearance of the discrimination mark 286 is different between the image sensors α270-1 and β270-2 obtaining 3D image patterns. The 3D coordinate values of the surface of the measured object 22 obtained by imaging from different directions may be stereoscopically combined using the captured image pattern of the discrimination mark 286.

In the above description, the 3D coordinate values of the surface of the measured object 22 are stereoscopically combined using the 3D coordinate values of the discrimination mark 286 in the background object (pedestal) 282. However, instead of using the 3D coordinate values of the discrimination mark 286, the 3D coordinate values may be stereoscopically combined using "position information" and "orientation information" of the image sensor 270 obtaining 3D image patterns. In this case, signals from a GPS sensor 46, a 3D gyroscope 48, a gravitational direction sensor 55, a terrestrial magnetism sensor 54, and an air pressure detector 44 in FIG. 105 may be used.

FIG. 119 illustrates a view of a part of the optical arrangement illustrated in FIG. 118 as viewed from the lateral direction. By using the embodiment example of the 3D measurement described in Chapter 10, the detailed 3D structure and size of the measured object 22 can be simply measured with a real size.

As a result, a plurality of different measured objects 22 can be arranged at a real size level on a virtual space. The arrangement (or assembly) of the different measured objects 22 at the real size level is referred to as a real size construction herein. Specifically, a plurality of objects can be arranged in a virtually formed narrow space. When the arrangement situation can be displayed to the user, the user can easily select the optimum arrangement form. In addition, it is possible to visually display, to the user, a physical interference situation that may occur when a plurality of objects is arranged in a narrow space (a situation where two objects cannot be arranged due to physical collision). When the service for visualizing the arrangement state between the different objects on the virtual space can be provided to the user in this manner, the convenience of the user is improved.

As described with reference to FIG. 118, the background image (background object 282) is also captured at the same time when the measured object 22 is captured by the image sensor 270 obtaining 3D image patterns. Therefore, it is necessary to extract the 3D structure of only each of the measured objects 22 before performing the real size construction processing between the different measured objects 22.

In the present embodiment example, distance data (measured distance) to individual measurement positions (individual positions corresponding to individual pixels in the image sensor 270 obtaining 3D image patterns) on the surface of the measured object 22 can be measured. Therefore, when the discontinuous area between the distance data (measured distance) is extracted, "contour extraction" of the measured object 22 becomes possible. It is outlined at the beginning of chapter 10 that (2) Separation/extraction of specific measured object using discontinuity area of distance data (measured distance)

. . . A discontinuity area of distance data (measured distance) is detected in the TOF captured image including a background image (or an unnecessary image). Detailed description regarding separation and extraction of a specific measured object by forming a contour line by continuing the detection locations will be given with reference to FIG. 119.

FIG. 119 illustrates a state in which the measured object 22 is placed on the pedestal (background object) 282 via a spacer 302. There is continuity between measured distances (distance data) between adjacent measurement points (locations corresponding to pixels in the image sensor 270 obtaining 3D image patterns) on the surface of the measured object 22. On the other hand, a "step" is formed between the bottom portion of the measured object 22 and the side face of the spacer 302. Therefore, the "step" results in a discontinuity area 304 in measured distance profile. Even when the pedestal (background object) 282 is rotated about a rotary prop 284 of a rotator, an approximate range of the discontinuity area 304 in measured distance profile does not change.

The irradiated light (first light) 12 travels straight toward the rear of the measured object 22 at a position away from the measured object 22 near the center of the surface of the measured object 22. This straight light is reflected (scattered) by the surface of another background object 282 and returns as detection light (second light) 16. Therefore, it is possible to easily distinguish between "reflected light (scattered light) from the measured object 22" and "reflected light (scattered light) from the background object 282 behind the measured object 22" from the measured distance (distance data) using the detection light (second light) 16.

When the measured object 22 and the background object 282 are simultaneously imaged as described above, the discontinuity area 304 in measured distance profile can be extracted. When the plural discontinuity areas 304 in measured distance profile extracted are connected, the contour of the measured object 22 can be extracted. The measured object 22 having the contour extracted in this manner is separated from the other background objects 282. Then, the detailed 3D structure and dimensions of the measured object 22 are constructed using the methods described in FIGS. 116 and 117.

Figure 120:
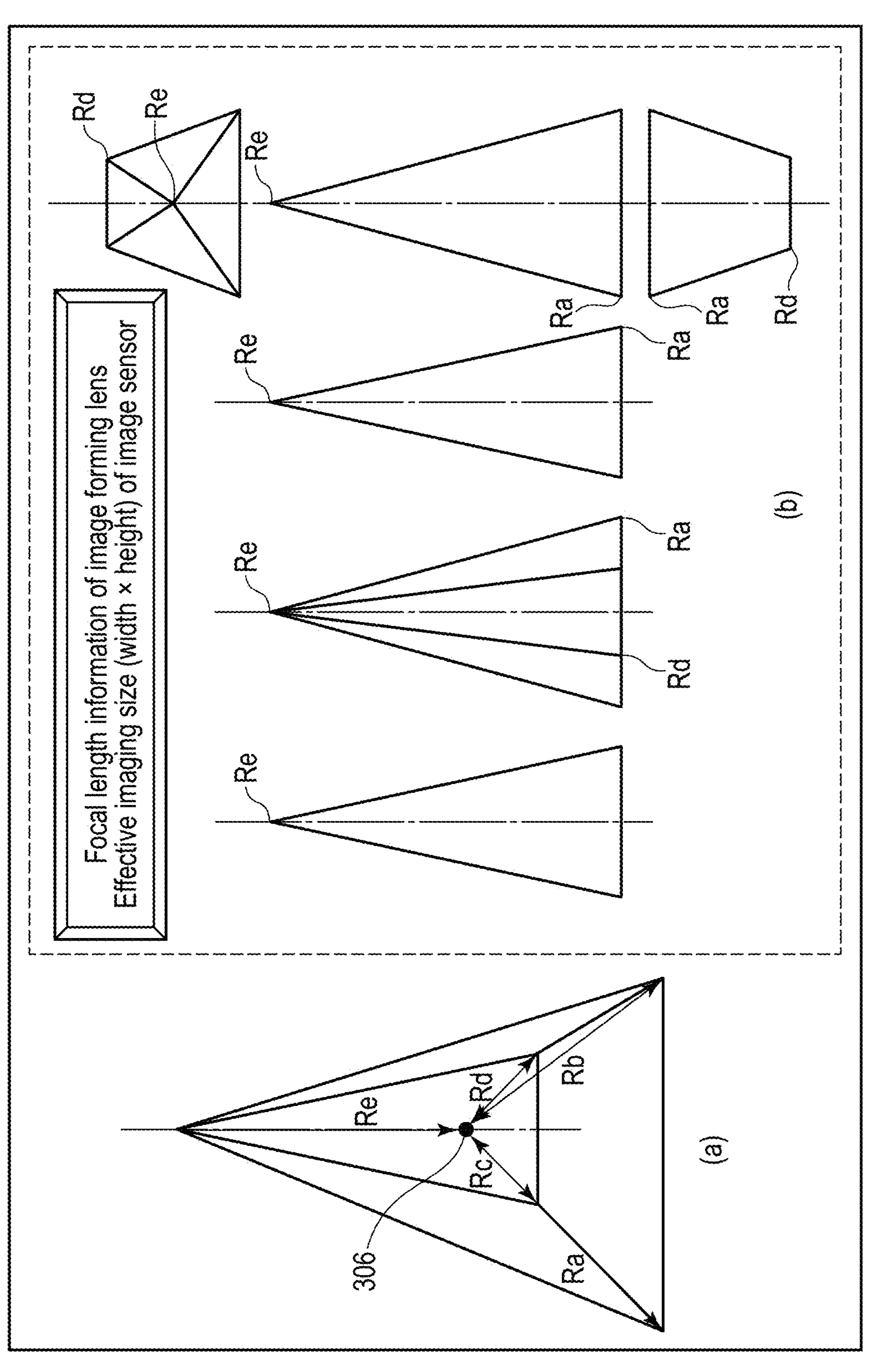

FIG. 120 illustrates a format example when the detailed 3D structure information and the dimension (real size) information of each measured object 22 constructed above are stored. In general, information of a 3D structure is often treated as "point group data". Also in the present embodiment example, the above-described point group data format may be used.

On the other hand, in the video industry, a stereoscopic image is often expressed with depth information in addition to intensity information for each RGB (red, green, and blue) set for each pixel. Therefore, in the case of imaging with one TOF camera (optical device 10) arranged at a fixed position in the present embodiment example, instead of the depth information, distance data (measured distance) to each measurement point on the measured object 22 may be added for each pixel.

Here, FIGS. 116 and 117 illustrate a method for supporting an omnidirectional (360 degrees) compatible image (still image or moving image). As a method for generating an omnidirectional (360 degrees) corresponding image in the case of imaging from the inside to the outside, a plurality of pieces of imaging information may be connected like a "panoramic picture". Meanwhile, as a method for generating an omnidirectional (360 degrees) correspondence image in the case of imaging from the outside toward the inside, there is a notation method of a "world map developed on a plane". However, in this method, since an area around the south pole and an area around the north pole are abnormally enlarged and displayed, inconvenience is likely to occur.

FIG. 120(*a*) illustrates an example in which a 3D structure of a quadrangular cone (trapezoidal cone) is taken as the measured object 22. FIG. 120(*b*) illustrates a developed view of the present embodiment example with respect to FIG. 120(*a*). Basically, the notation of the machine drawing is expanded and displayed, and individual images viewed from six directions are arranged. Then, distance data (distance measurement) is provided for each pixel in the image sensor 270 obtaining 3D image patterns. Then, in a case where "display for each pixel in the image sensor 270 obtaining 3D image patterns" is simply performed as this scale, information of the focal length f of the image forming lens 144 and the effective imaging size (width×height) of the image sensor is added. With the additional information, the 3D structure and the actual dimension of the measured object 22 can be constructed. As another example of the present embodiment, the information described in FIG. 107(*b*) may be added to each point in FIG. 120(*b*). The spread diagram illustrated in FIG. 120(*b*) is referred to as an "RGB spread image".

In addition, as an application example of the present embodiment, color display may be performed in FIG. 120(*b*) according to the information of the red intensity 1814, the green intensity 1816, and the blue intensity 1818 described in FIG. 107(*b*). Then, only the actual distance information from the barycentric position 306 on the volume may be added to each pixel (each point). For example, a distance Ra from the gravity center position 306 on the volume illustrated in FIG. 120(*a*) to the a position and a distance Rd to the d position are added to the corresponding positions in FIG. 120(*b*). When only one type of distance information (actual dimension value) is set on the screen in this manner, the overall data size can be reduced.

Figure 121:
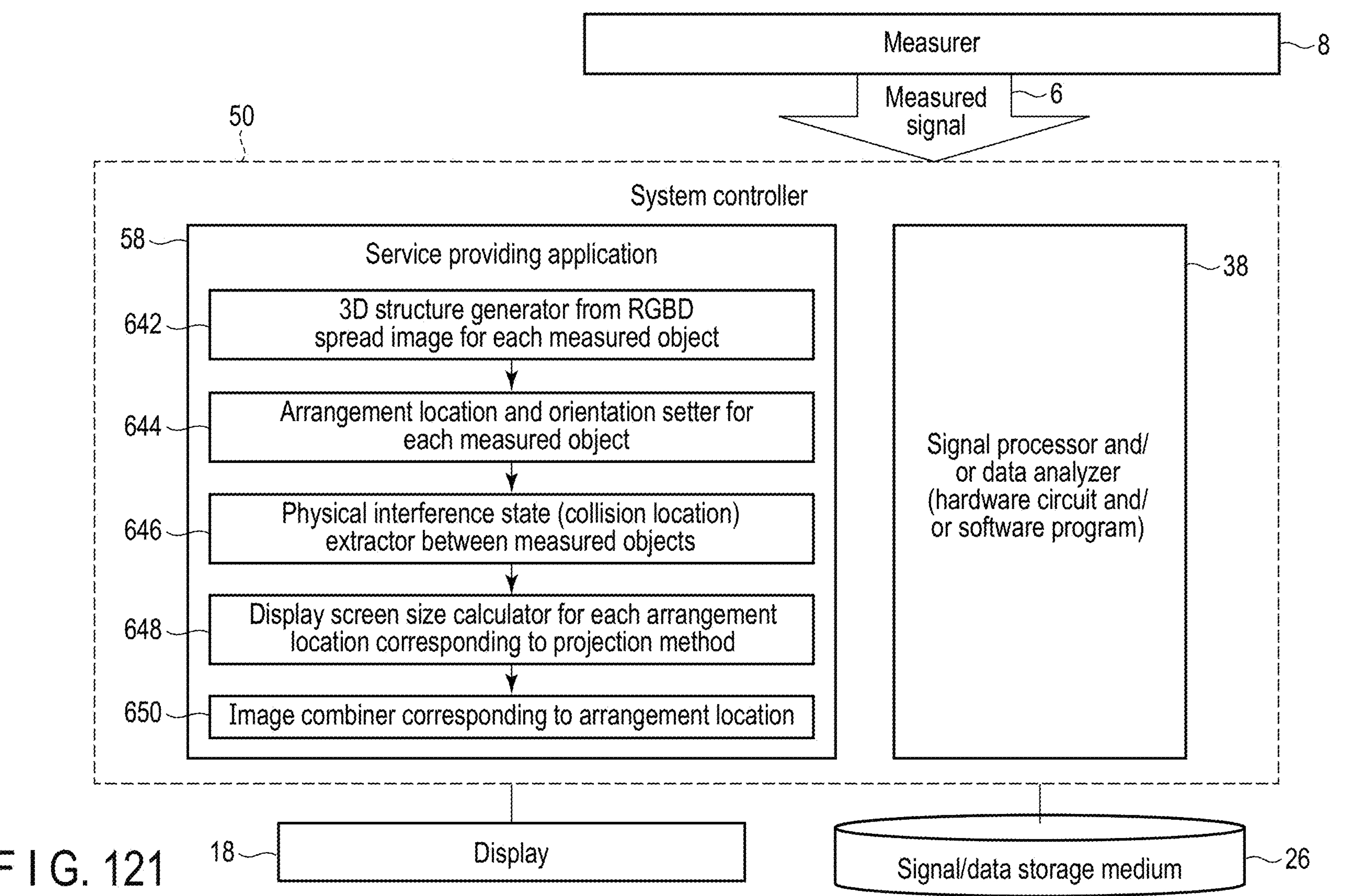
Figure 122:
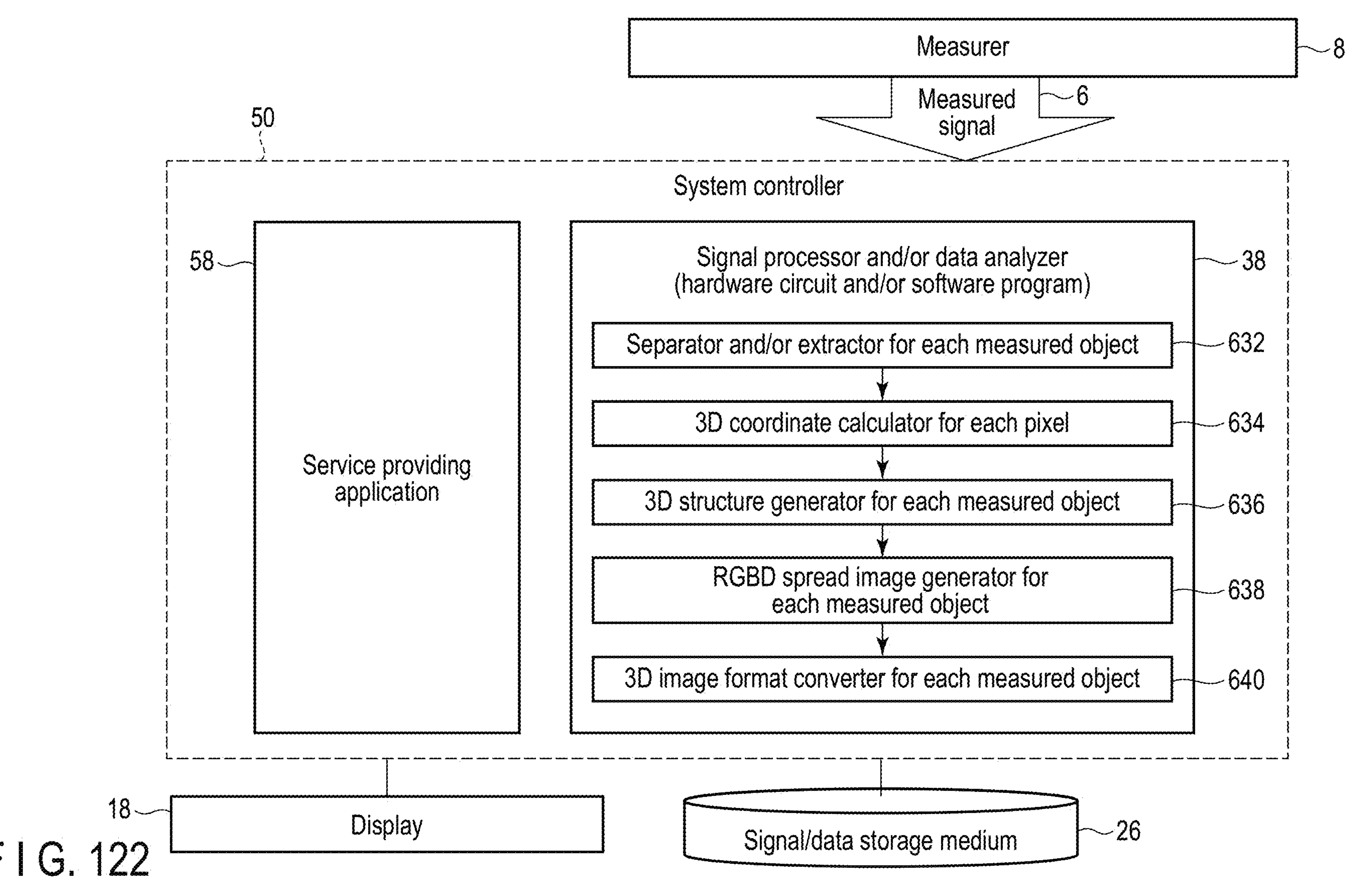

FIG. 121 and FIG. 122 each illustrates a functional block configuration in the system controller 50. A corresponding circuit (hardware) may configure this block configuration. Alternatively, a part thereof may be d by a software program such as a "corresponding processing program". The system controller 50 is arranged in the optical device 10 illustrated in FIG. 1 and FIG. 2.

The signal processor and/or data analyzer 38 includes a separator and/or extractor for each measured object 632, a 3D coordinate calculator for each measurement distance utilization pixel 634, a 3D structure generator for each measured object 636, an RGBD spread image generator for each measured object 638, and a 3D image format converter for each measured object 640.

In the measured signal 6 from the measurer 8, an imaging signal of a background image is mixed together with an imaging signal of the measured object 22. The measured object-specific separation/extraction unit 632 performs separation/extraction for each measured object 22 different from each other using the continuity of the distance data (long distance measurement) (by extracting the discontinuity area 304 in the long distance measurement characteristic).

The measured distance-use pixel-by-pixel 3D coordinate calculating unit 634 calculates a 3D coordinate value corresponding to each pixel in the image sensor 270 obtaining 3D image patterns using the measured long distance (distance data). This 3D coordinate value calculation is individually performed for each of the separated and extracted measured objects 22. The measured object-specific 3D structure generation unit 636 uses the above-described 3D coordinate values to generate (virtually assemble) a 3D structure for each measured object 22.

The 3D structure information generated here for each measured object 22 (virtually assembled) is stored in the signal/data storage recording medium 26 based on a predetermined format. Alternatively, it may be transmitted to the outside via a communication interface controller 56 for external (internet) system. Regarding the conversion from the 3D structure to the predetermined format, the RGBD spread image for each measured object 22 is generated in the measured object-specific RGBD spread image generation unit 638. The present invention is not limited thereto, and the measured-object-specific 3D image format conversion unit 640 performs format conversion into an arbitrary format. In (1) Connection between a plurality of TOF captured images in a 3D coordinate space (2) Separation/extraction of specific measured object using discontinuity area of distance data (measured distance)

(3) Virtual arrangement (configuration) among a plurality of measured objects based on actual dimensions and two-dimensional display of projection drawing utilization outlined at the beginning of chapter 10, for convenience of explanation, the signal processor and/or data analyzer 38 is responsible for the roles (1) and (2).

For convenience of explanation, the service providing application 58 is caused to play the role of (3). That is, the service providing application 58 includes a 3D structure generator from an RGBD spread image for each measured object 642, an arrangement location orientation setter for each measured object 644, a physical interference state (collision location) extractor between measured objects 646, a display screen size calculator for each arrangement location corresponding to projection drawing 648, and an image combiner corresponding to arrangement location 650.

If the operation content in the signal processor and/or data analyzer 38 and the operation content in the service providing means 58 are shared as described above, the function can be easily described. However, the present invention is not limited thereto, and the sharing of the operation contents in the signal processor and/or data analyzer 38 and the service providing means 58 may be arbitrarily changed.

The 3D structure generator from an RGBD spread image for each measured object 642 reproduces the RGBD spread image for each measured object temporarily stored in the signal/data storage recording medium 28, and generates a 3D structure (virtual assembly) for each measured object 22. When the 3D structure information generated (assembled) by the measured object-specific 3D structure generation unit 636 is used as it is, the flow directly proceeds to the operation of the arrangement location orientation setter for each measured object 644 without going through the 3D structure generator from an RGBD spread image for each measured object 642.

In a case of virtually attempting arrangement (configuration) between a plurality of different measured objects based on actual dimensions, it is necessary to set "arrangement position" and "arrangement angle (orientation)" for each measured object. This setting is performed by the arrangement location orientation setter for each measured object 644. The arrangement location orientation setter for each measured object 644 is directly connected to the user-interface processing unit 20. Then, the user directly sets "arrangement position" and "arrangement angle (orientation)" for each measured object via the interface processing unit 20 with the user.

Then, a plurality of different measured objects are arranged (configured) in the same virtual space based on the setting results of the "arrangement position" and the "arrangement angle (orientation)" for each measured object. Since the arrangement (configuration) between the different measured objects is performed based on actual dimensions, physical interference (collision point) between the different measured objects may partially occur. The physical interference state (collision location) extractor between measured objects 646 virtually arranges (configures) a plurality of different measured objects based on actual dimensions. Then, a physical interference location (collision location) is extracted. The extracted physical interference location (collision location) can be displayed by a method for drawing user's attention (For example, changing the color, thickening the contour line, and the like).

As a method for displaying the state in which the different measured objects are arranged (configured) to the user (including the display of the physical interference location (collision location)), in the present embodiment example, output is performed from the display 18 using projection drawing. As a result, the stereoscopic effect of the display is increased, and the realistic feeling given to the user is improved. Specifically, the size of the display screen according to the projection drawing is calculated based on the "arrangement position" of each measured object 22 preset by the user. The size calculation of the display screen for each measured object 22 is performed by the display screen size calculator for each arrangement location corresponding to projection drawing 648.

The arrangement location corresponding image combining unit 650 combines images of a plurality of measured objects in accordance with the "arrangement position" and the "display screen size" for each of the measured objects 22. Here, display/non-display processing is performed according to the front-back position between the measured objects. That is, the measured object arranged on the front side is displayed on the front surface. The measured object arranged on the far side is not displayed at the position corresponding to the shadow of the measured object arranged on the near side. At the same time, display processing of the physical interference location (collision location) is also performed. For example, only the physical interference location (collision location) may be displayed in a "conspicuous color" (for example, red).

Figure 124:
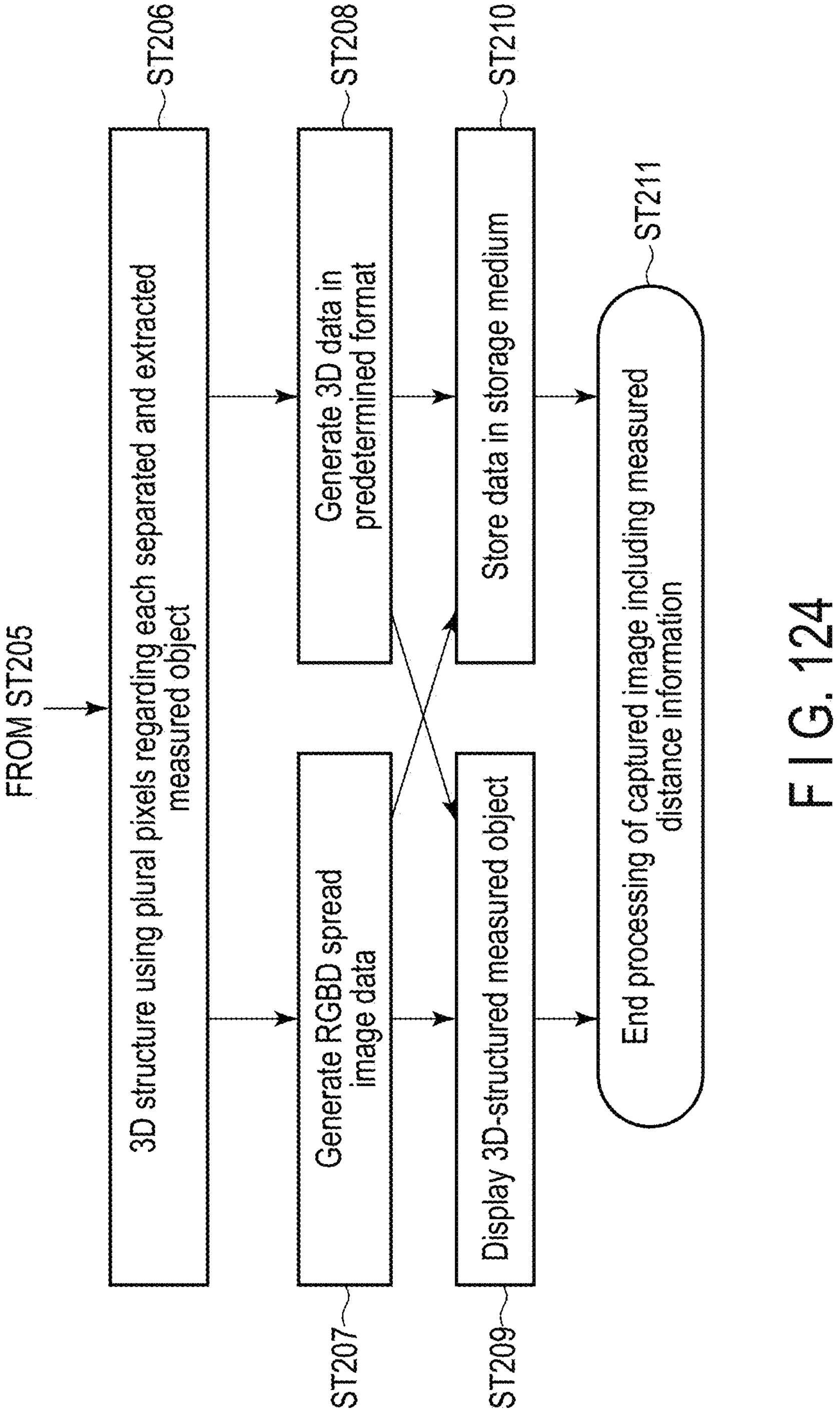

FIG. 123 and FIG. 124 each illustrates a procedure example of "3D structure generation (assembly) for each measured object 22" performed in the signal processor and/or data analyzer 38 of FIG. 121 and FIG. 122. When the processing of the captured image including the measured distance information is started (ST200), it is necessary to read a captured image (moving image or still image) in which information of distance data (distance measurement) for each pixel in the image sensor 270 obtaining 3D image patterns is described. There are two ways of reading. In step 201, the captured image is collected as the measured signal 6 from the measurer 8. On the other hand, in a case where the captured image is stored in advance in the signal/data storage recording medium 26, the stored data from the recording medium 26 is reproduced in Step 202.

In the captured image including the measured distance information, an image related to the measured object 22 and a background image (an image of the background object 282) are mixed. Therefore, in the first step 203, the location of the discontinuity area 304 in the long distance measuring characteristic is extracted. When the discontinuity areas 304 in the extracted long distance measurement characteristics are connected, the contour of the measured object 22 appears. Then, the individual measured objects 22 are separated and extracted using the appearing contour line (ST204).

The measurement distance-use pixel-by-pixel 3D coordinate calculating unit 634 calculates 3D coordinate values regarding the entire surfaces of the 22 separately extracted measured objects (ST205). 3D coordinate values in the captured images from all directions (360 degrees) with respect to the entire surface of the individual measured object 22 are synthesized to perform 3D structuring (ST206).

In step 209, the individual measured objects 22 having the 3D structure may be displayed on the display 18. Alternatively, this information may be stored in the signal/data storage recording medium 26 (ST210). With respect to this display (ST209) and storage (ST210), RGBD spread image data (ST207) or 3D data generation (ST208) in a predetermined format is performed in advance. When the display (ST209) and the storage (ST210) are completed, the processing of the captured image including the measured distance information is terminated in step 211.

Figure 125:
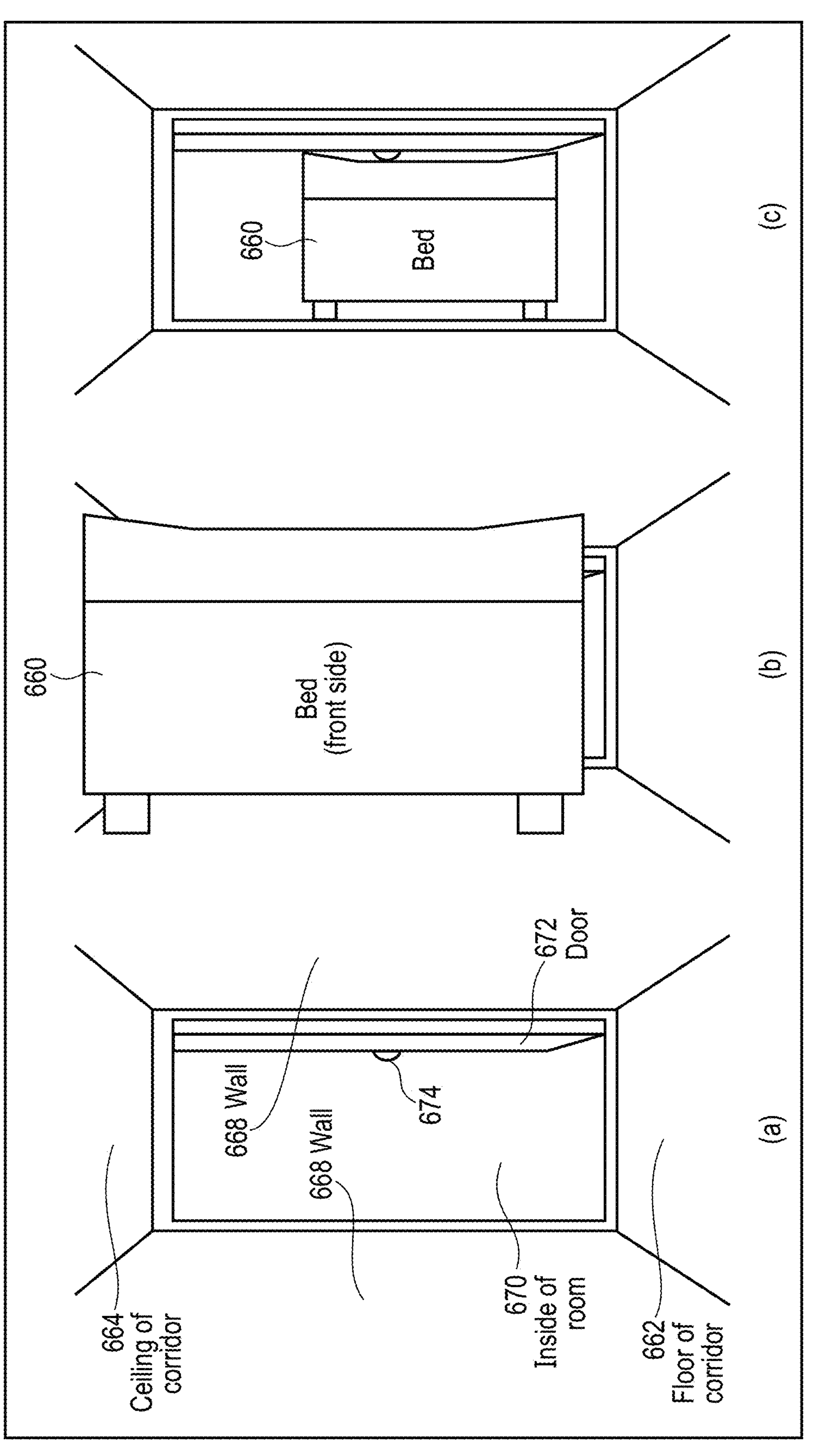

FIG. 125 illustrates a screen example of the actual size configuration processing result displayed in the display 18. In particular (3) Virtual arrangement (configuration) among a plurality of measured objects based on actual dimensions and two-dimensional display of projection drawing utilization A specific example is illustrated mainly by the following. In the description example of FIG. 125(*a*), the door 672 is at the tip of the floor 662 of the corridor. When the door 672 is opened, the inside 670 of the room can be seen. FIG. 125(*b*) illustrates an image in the middle of putting the bed 660 into the room 670 through the corridor. FIG. 125(*c*) illustrates a state in which the bed 660 passes through the opened door 672.

A long distance measurement characteristic between pixels in the image sensor 270 obtaining 3D image patterns is considered. Between pixels projected from the floor 662 of the corridor, the ceiling 664 of the corridor, or the wall 668 in FIG. 125(*a*). Continuous distance measurement characteristics are obtained. On the other hand, a discontinuous distance measurement characteristic is generated at a boundary line between the floor 662 of the corridor or the ceiling 664 of the corridor and the inside 670 of the room. That is, the discontinuity area 304 in the long distance measuring characteristic is concentrated in the peripheral portion of the image in which the inside 670 of the room is visible. Therefore, when the discontinuity areas 304 in the distance measurement characteristics are connected, the 3D structure and the dimensions (actual dimensions) of the inlet of the door 672 can be predicted. Here, the 3D structure of the inlet of the door 672 corresponds to the contour line of the measured object 22 described above.

The dimensions (actual dimensions) of the bed 660 to be placed in the room 670 are measured in advance using the TOF camera 32 (optical device 10). By comparing this measurement value with the dimension (actual dimension) of the inlet of the door 672, it can be seen on the virtual space whether or not the bed 660 enters the room 670. Furthermore, it is possible to simulate, on the virtual space, an optimal way (arrangement angle) to put the bed 660 when the user enters the room 670.

Specifically, the arrangement location orientation setter for each measured object 644 changes the arrangement angle of the bed 660 to simulate whether or not the measured object enters the room 670. The simulation results are shown in FIG. 125(*c*). Here, a location where the physical interference state (collision location) extractor between measured objects 646 collides with the bed 660 may be found in advance and specified on the display screen. In this way, if the collision location is known every time the arrangement angle (insertion method) of the bed 660 is changed, the convenience of the user is remarkably improved.

Before putting the bed 660 into the room 670, the bed 660 passes through the corridor. The bed 660 at this time is located on the front side of the door 672 at the inlet of the room. When the bed 660 is displayed based on the projection drawing, the apparent size of the bed 660 increases as illustrated in FIG. 125(*b*). When the position of the bed 660 is shifted to the far side, the apparent size of the bed 660 decreases. Here, the display screen size calculator for each arrangement location corresponding to projection drawing 648 appropriately calculates the apparent size of the bed 660. As described above, when the display based on the projection drawing is performed in the present embodiment example, the stereoscopic effect is improved and the user can have a more realistic feeling.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical device comprising:

a light source including a light emitter and a light control circuit, the light control circuit configured to flow an electric current through the light emitter to emit irradiated modulation light to a measured object in accordance with a light emission signal, the light control circuit further configured to control a peak value of light intensity of the irradiated modulation light, a measurer including an image sensor configured to receive modulated detection light to generate a measured signal, the modulated detection light corresponding to the irradiated modulation light being reflected by the measured object, the measurer having relative exposure timings, one of the relative exposure timings corresponding to a relative timing between an exposure timing and the light emission signal, the modulated detection light accounting for charge accumulation in the measurer, each of values of the charge accumulation relating to each of the relative exposure timings, and the measured signal including the values of the charge accumulation;

an image forming lens to form an image pattern of the measured object on the image sensor; and a system controller configured to calculate a first distance to the measured object by a use of the measured signal, the system controller further configured to calculate 3D coordinate information of the measured object based on a second distance between the image forming lens and the image sensor, wherein the light control circuit includes a changeover switch configured to flow the electric current through the light emitter.

2. An optical device according to claim 1, wherein:

the system controller is further configured to calculate the 3D coordinate information based on the first distance, the second distance, a focal length of the image forming lens, and an imaging size of the image pattern on the image sensor.

3. A method, comprising:

flowing an electric current through a light emitter to emit irradiated modulation light, the irradiated modulation light traveling to a measured object;

controlling a peak value of light intensity of the irradiated modulation light;

causing the irradiated modulation light to be reflected by the measured object to form modulated detection light;

receiving the modulated detection light;

accumulating charge according to the modulated detection light;

forming, by an image forming lens, an image pattern of the measured object on an image sensor;

calculating a first distance to the measured object;

calculating 3D coordinate information of the measured object based on a second distance between the image forming lens and the image sensor; and flowing the electric current through the light emitter based on a changeover switch.

4. The method according to claim 3, further comprising:

calculating the 3D coordinate information based on the first distance, the second distance to the measured object, a focal length of the image forming lens, and an imaging size of the image pattern on the image sensor.

5. A method, comprising:

flowing an electric current through a light emitter to emit irradiated modulation light, the irradiated modulation light traveling to a measured object;

controlling a peak value of light intensity of the irradiated modulation light;

causing the irradiated modulation light to be reflected by the measured object to form modulated detection light;

receiving the modulated detection light;

accumulating charge according to the modulated detection light, forming, by an image forming lens, an image pattern of the measured object on an image sensor;

calculating a first distance to the measured object;

calculating 3D coordinate information of the measured object based on a second distance between the image forming lens and the image sensor;

providing a service for a user based on the calculated 3D coordinate information of the measured object;

flowing the electric current through the light emitter based on a changeover switch.

6. The method according to claim 5, further comprising:

calculating the 3D coordinate information based on the first distance, the second distance, a focal length of the image forming lens, and an imaging size of the image pattern on the image sensor.

7. An optical device comprising:

a light source including a light emitter and a light control circuit, the light control circuit configured to flow an electric current through the light emitter to emit irradiated modulation light to a measured object in accordance with a light emission signal, the light control circuit further configured to control a peak value of light intensity of the irradiated modulation light, a measurer including an image sensor configured to receive modulated detection light to generate a measured signal, the modulated detection light corresponding to the irradiated modulation light being reflected by the measured object, the measurer having relative exposure timings, one of the relative exposure timings corresponding to a relative timing between an exposure timing and the light emission signal, the modulated detection light accounting for charge accumulation in the measurer, each of values of the charge accumulation relating to each of the relative exposure timings, and the measured signal including the values of the charge accumulation;

an image forming lens to form an image pattern of the measured object on the image sensor; and a system controller configured to calculate a first distance to the measured object by a use of the measured signal, the system controller further configured to calculate 3D coordinate information of the measured object based on a second distance between the image forming lens and the image sensor, wherein the optical device further comprises a light power detector to generate a time-varying signal relating to the light intensity, wherein the light control circuit is further configured to smooth the time-varying signal to control the peak value of light intensity of the irradiated modulation light.

8. A method comprising:

flowing an electric current through a light emitter to emit irradiated modulation light, the irradiated modulation light traveling to a measured object;

controlling a peak value of light intensity of the irradiated modulation light;

causing the irradiated modulation light to be reflected by the measured object to form modulated detection light;

receiving the modulated detection light;

accumulating charge according to the modulated detection light;

forming, by an image forming lens, an image pattern of the measured object on an image sensor;

calculating a first distance to the measured object;

calculating 3D coordinate information of the measured object based on a second distance between the image forming lens and the image sensor;

measuring at least a part of the light intensity of the irradiated modulation light;

generating a time-varying signal relating to the light intensity; and smoothing the time-varying signal to control the peak value of light intensity of the irradiated modulation light.

9. A method comprising:

flowing an electric current through a light emitter to emit irradiated modulation light, the irradiated modulation light traveling to a measured object;

controlling a peak value of light intensity of the irradiated modulation light;

causing the irradiated modulation light to be reflected by the measured object to form modulated detection light;

receiving the modulated detection light;

accumulating charge according to the modulated detection light, forming, by an image forming lens, an image pattern of the measured object on an image sensor;

calculating a first distance to the measured object;

calculating 3D coordinate information of the measured object based on a second distance between the image forming lens and the image sensor;

providing a service for a user based on the calculated 3D coordinate information of the measured object;

measuring at least a part of the light intensity of the irradiated modulation light;

generating a time-varying signal relating to the light intensity; and smoothing the time-varying signal to control the peak value of light intensity of the irradiated modulation light.

* * * * *